US008018464B2

(12) United States Patent
Hansen et al.

(10) Patent No.: US 8,018,464 B2

(45) **Date of Patent: *Sep. 13, 2011**

(54) COMPUTER SYSTEM FOR EXECUTING SWITCH AND TABLE TRANSLATE INSTRUCTIONS REQUIRING WIDE OPERANDS

(75) Inventors: Craig Hansen, Santa Clara, CA (US); John Moussouris, Santa Clara, CA (US); Alexia Massalin, Santa Clara, CA (US)

(73) Assignee: MicroUnity Systems Engineering, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/981,996

(22) Filed: Oct. 31, 2007

(65) Prior Publication Data

US 2009/0113176 A1 Apr. 30, 2009

Related U.S. Application Data

(63) Continuation of application No. 11/346,213, filed on Feb. 3, 2006, which is a continuation of application No. 10/616,303, filed on Jul. 10, 2003, now Pat. No. 7,301,541, which is a continuation-in-part of application No. 09/922,319, filed on Aug. 2, 2001, now Pat. No. 6,725,356, which is a continuation of application No. 09/382,402, filed on Aug. 24, 1999, now Pat. No. 6,295,599.

(60) Provisional application No. 60/097,635, filed on Aug. 24, 1998.

(51) Int. Cl.
*G06T 1/00* (2006.01)
*G06F 7/38* (2006.01)

(52) U.S. Cl. ....................................... 345/522; 712/225

(58) Field of Classification Search .................. 345/522; 712/225
See application file for complete search history.

(56) References Cited

U.S. PATENT DOCUMENTS 3,581,279 A 5/1971 Arbuckle
3,833,889 A 9/1974 Cray
4,251,875 A 2/1981 Marver et al.

(Continued)

FOREIGN PATENT DOCUMENTS

EP 0651514 A2 5/1995

(Continued)

OTHER PUBLICATIONS

U.S. Appl. No. 11/346,213 Office Action mailed on Jan. 21, 2010.

(Continued)

*Primary Examiner* — Daniel Washburn

(74) *Attorney, Agent, or Firm* — Kilpatrick Townsend & Stockton LLP

(57) ABSTRACT

A programmable processor and method for improving the performance of processors by expanding at least two source operands, or a source and a result operand, to a width greater than the width of either the general purpose register or the data path width. The present invention provides operands which are substantially larger than the data path width of the processor by using the contents of a general purpose register to specify a memory address at which a plurality of data path widths of data can be read or written, as well as the size and shape of the operand. In addition, several instructions and apparatus for implementing these instructions are described which obtain performance advantages if the operands are not limited to the width and accessible number of general purpose registers.

27 Claims, 509 Drawing Sheets

U.S. PATENT DOCUMENTS

| | | | |
|---|---|---|---|
| 4,393,468 | A | 7/1983 | New |
| 4,658,349 | A | 4/1987 | Tabata et al. |
| 4,658,908 | A | 4/1987 | Hannukainen |
| 4,785,393 | A | 11/1988 | Chu et al. |
| 4,823,259 | A | 4/1989 | Aichelmann et al. |
| 4,930,106 | A | 5/1990 | Danilenko et al. |
| 5,031,135 | A | 7/1991 | Patel et al. |
| 5,170,399 | A | 12/1992 | Cameron et al. |
| 5,185,861 | A | 2/1993 | Valencia |
| 5,280,598 | A | 1/1994 | Osaki et al. |
| 5,283,886 | A | 2/1994 | Nishii et al. |
| 5,325,493 | A | 6/1994 | Herrell et al. |
| 5,333,280 | A | 7/1994 | Ishikawa et al. |
| 5,375,215 | A | 12/1994 | Hanawa et al. |
| 5,426,379 | A | 6/1995 | Trimberger |
| 5,430,556 | A | 7/1995 | Ito |
| 5,471,593 | A | 11/1995 | Branigin |
| 5,481,686 | A | 1/1996 | Dockser |
| 5,487,024 | A | 1/1996 | Girardeau, Jr. |
| 5,509,137 | A | 4/1996 | Itomitsu et al. |
| 5,535,225 | A | 7/1996 | Mayhew et al. |
| 5,550,988 | A | 8/1996 | Sarangdhar et al. |
| 5,551,005 | A | 8/1996 | Sarangdhar et al. |
| 5,579,253 | A | 11/1996 | Lee et al. |
| 5,598,362 | A | 1/1997 | Adelman et al. |
| 5,600,814 | A | 2/1997 | Gahan et al. |
| 5,604,864 | A | 2/1997 | Noda |
| 5,636,363 | A | 6/1997 | Bourekas et al. |
| 5,646,626 | A | 7/1997 | Willis |
| 5,669,012 | A * | 9/1997 | Shimizu et al. .................. 712/1 |
| 5,671,170 | A | 9/1997 | Markstein et al. |
| 5,675,526 | A | 10/1997 | Peleg et al. |
| 5,717,946 | A * | 2/1998 | Satou et al. .................. 712/225 |
| 5,721,892 | A | 2/1998 | Peleg et al. |
| 5,740,093 | A | 4/1998 | Sharangpani |
| 5,742,840 | A | 4/1998 | Hansen et al. |
| 5,745,729 | A | 4/1998 | Greenley et al. |
| 5,745,778 | A | 4/1998 | Alfieri |
| 5,752,001 | A | 5/1998 | Dulong |
| 5,752,264 | A | 5/1998 | Blake et al. |
| 5,765,216 | A * | 6/1998 | Weng et al. .................. 711/214 |
| 5,768,546 | A | 6/1998 | Kwon |
| 5,778,412 | A | 7/1998 | Gafken |
| 5,799,165 | A | 8/1998 | Favor et al. |
| 5,802,336 | A | 9/1998 | Peleg et al. |
| 5,826,079 | A | 10/1998 | Boland et al. |
| 5,826,081 | A | 10/1998 | Zolnowsky |
| 5,835,744 | A | 11/1998 | Tran et al. |
| 5,835,782 | A | 11/1998 | Lin et al. |
| 5,835,968 | A | 11/1998 | Mahalingaiah et al. |
| 5,872,972 | A | 2/1999 | Boland et al. |
| 5,889,983 | A | 3/1999 | Mittal et al. |
| 5,933,650 | A | 8/1999 | van Hook et al. |
| 5,935,240 | A | 8/1999 | Mennemeier et al. |
| 5,940,859 | A | 8/1999 | Bistry et al. |
| 5,991,531 | A | 11/1999 | Song et al. |
| 5,999,959 | A | 12/1999 | Weng et al. |
| 6,006,299 | A | 12/1999 | Wang et al. |
| 6,038,675 | A | 3/2000 | Gabzdyl et al. |
| 6,041,404 | A | 3/2000 | Roussel et al. |
| 6,058,408 | A | 5/2000 | Fischer et al. |
| 6,061,780 | A | 5/2000 | Shippy et al. |
| 6,105,053 | A | 8/2000 | Kimmel et al. |
| 6,131,145 | A | 10/2000 | Matsubara et al. |
| 6,134,635 | A | 10/2000 | Reams |
| 6,141,384 | A | 10/2000 | Wittig et al. |
| 6,141,675 | A | 10/2000 | Slavenburg et al. |
| 6,211,892 | B1 | 4/2001 | Huff et al. |
| 6,212,618 | B1 | 4/2001 | Roussel |
| 6,237,016 | B1 | 5/2001 | Fischer et al. |
| 6,243,803 | B1 | 6/2001 | Abdallah et al. |
| 6,263,428 | B1 | 7/2001 | Nonomura et al. |
| 6,266,758 | B1 | 7/2001 | Van Hook et al. |
| 6,269,390 | B1 | 7/2001 | Boland |
| 6,292,815 | B1 | 9/2001 | Abdallah et al. |
| 6,295,599 | B1 | 9/2001 | Hansen et al. |
| 6,317,824 | B1 | 11/2001 | Thakkar et al. |
| 6,370,559 | B1 | 4/2002 | Hoffman |
| 6,377,970 | B1 | 4/2002 | Abdallah et al. |
| 6,378,060 | B1 | 4/2002 | Hansen et al. |
| 6,385,634 | B1 | 5/2002 | Peleg et al. |
| 6,408,325 | B1 * | 6/2002 | Shaylor ........................ 718/108 |
| 6,418,529 | B1 | 7/2002 | Roussel |
| 6,426,746 | B2 | 7/2002 | Hsieh et al. |
| 6,438,660 | B1 | 8/2002 | Reams |
| 6,453,368 | B2 | 9/2002 | Yamamoto |
| 6,463,525 | B1 | 10/2002 | Prabhu |
| 6,470,370 | B2 | 10/2002 | Fischer et al. |
| 6,516,406 | B1 | 2/2003 | Peleg et al. |
| 6,567,908 | B1 | 5/2003 | Furuhashi |
| 6,631,389 | B2 | 10/2003 | Lin et al. |
| 6,633,897 | B1 | 10/2003 | Browning et al. |
| 6,725,356 | B2 | 4/2004 | Hansen et al. |
| 6,766,515 | B1 | 7/2004 | Bitar et al. |
| 6,804,766 | B1 | 10/2004 | Noel et al. |

FOREIGN PATENT DOCUMENTS

| | | | |
|---|---|---|---|
| EP | 0800280 | A1 | 10/1997 |
| EP | 1024603 | A2 | 8/2000 |
| EP | 1102161 | | 5/2001 |
| JP | 03-098145 | A | 4/1991 |
| JP | 06-149723 | A | 5/1994 |
| JP | 07-114496 | A | 5/1995 |
| WO | WO00/23875 | A1 | 4/2000 |

OTHER PUBLICATIONS

U.S. Appl. No. 11/982,230 Office Action mailed on Sep. 28, 2009.
U.S. Appl. No. 11/982,051 Office Action mailed on Dec. 11, 2009.
U.S. Appl. No. 11/894,584 Office Action mailed on Nov. 10, 2009.
U.S. Appl. No. 11/982,106 Office Action mailed on Feb. 3, 2010.
U.S. Appl. No. 11/982,124 Office Action mailed on Mar. 2, 2010.
U.S. Appl. No. 11/982,142 Notice of Allowance mailed on Mar. 12, 2010.
Office Action in inter partes Reexamination 95/000100 (May 3, 2006).
Office Action in inter partes Reexamination 95/000100 (Mar. 19, 2009).
Right of Appeal Notice (37 CFR 1.953) in inter partes Reexamination 95/000100 (Jul. 11, 2009).
Hansen Architecture of a Broadband Mediaprocessor (1996) Proceedings of Compcon. New York, IEEE Computer Science, pp. 334-340 (1996).
Hansen "MicroUnity's MediaProcessor Architecture" IEEE Micro archive 16: 34-41 (Aug. 1996).
Japan Patent Office (JPO) office action for JPO patent application JP2005-107012 (Apr. 28, 2010).
U.S. Appl. No. 11/982,171 Office Action mailed on May 27, 2010.
Rice "Multiprecision Division on an 8-bit Processor", Proceedings of the 13th IEEE Symposium on Computer Arithmetic, pp. 74-81 (Jul. 1997).
U.S. Appl. No. 11/982,230 Office Action mailed on Jun. 21, 2010.
U.S. Appl. No. 11/982,106 Notice of Allowance mailed on Sep. 29, 2010.
U.S. Appl. No. 11/894,584 Office Action mailed on Sep. 16, 2010.
U.S. Appl. No. 11/982,051 Office Action mailed on Sep. 16, 2010.
U.S. Appl. No. 11/982,230 Office Action mailed on Sep. 27, 2010.
U.S. Appl. No. 11/982,124 Office Action mailed on Sep. 16, 2010.
U.S. Appl. No. 11/982,171 Office Action mailed on Sep. 8, 2010.
European Patent Office (EPO) search report for EPO patent application EP10160103.7 (Sep. 30, 2010).
Gwennap "UltraSPARC Adds Multimedia Instructions," Microprocessor Report, vol. 8, No. 6, pp. 1-3 (Dec. 5, 1994).
Hendrix "Viterbi Decoding Techniques in the TMS320C54x Family," Texas Instruments, (Jan. 2002).
Lee "High-speed VLSI architecture for parallel Reed-Solomon decoder," IEEE Transactions on Very Large Scale Integration (VLSI) Systems 11:288-294 (Apr. 2003).
Lee et al. "An efficient recursive cell architecture of modified Euclid's algorithm for decoding Reed-Solomon codes," IEEE Transactions on Consumer Electronics 48:845-849 (Nov 2002).

Leijten-Nowak et al. "An FPGA architecture with enhanced datapath functionality," Proceedings of the 2003 ACM/SIGDA eleventh international symposium on Field Programmable Gate Arrays pp. 195-204 (Feb. 2003).
Sarwate et al. "High-speed architectures for Reed-Solomon decoders," IEEE Transactions on Very Large Scale Integration (VLSI) Systems 9:641-655 (Oct. 2001).
European Search Report for application EP10167233.5 (Oct. 6, 2010).
European Search Report for application EP10167240.0 (Sep. 16, 2010).
European Search Report for application 10167237.6 (Sep. 16, 2010).
Office Action for U.S. Appl. No. 11/346,213 (Oct. 22, 2010).
U.S. Appl. No. 11/984,584 Notice of Allowance mailed on Feb. 9, 2011.
U.S. Appl. No. 11/982,051 Notice of Allowance mailed on Feb. 9, 2011.
U.S. Appl. No. 11/982,171 Notice of Allowance mailed on Feb. 24, 2011.
U.S. Appl. No. 11/982,230 Notice of Allowance mailed on Feb. 7, 2011.
U.S. Appl. No. 11/982,124 Notice of Allowance mailed on Feb. 3, 2011.

* cited by examiner $\square\ rd_{128} = m[rc]_{(128*64/size)} * rb_{128}$

210

Operation codes

| | |
|---|---|
| W.SWITCH.B | Wide switch big-endian |
| W.SWITCH.L | Wide switch little-endian |

Selection

| class | op | order |
|---|---|---|
| Wide switch | W.SWITCH | B L |

Format

W.op.order ra=rc,rd,rb ra=woporder(rc,rd,rb)

| 31 24 | 23 18 | 17 12 | 11 6 | 5 0 |
|---|---|---|---|---|
| W.op.order | rd | rc | rb | ra |
| 8 | 6 | 6 | 6 | 6 |

Definition

```
defWideSwitch(op,rd,rc,rb,ra)
    d ← RegRead(rd, 128)
    c ← RegRead(rc, 64)
    b ← RegRead(rb, 128)
    if c_{1..0} ≠ 0 then
            raise AccessDisallowedByVirtual Address
    elseif c_{6..0} ≠0 then
            VirtAddr ← c and (c-1)
            W ← wsize ← (c and (0-c)) || 0^1
    else
            VirAddr ← c
            w ← wsize ← 128
    endif
    msize ← 8*wsize
    lwsize ← log(wsize)
    case op of
            W.SWITCH.B:
                order ← B
            W.SWITCH.L:
                order ← L
    endcase
    m ← LoadMemory(c, VirtAddr,msize,order)
    db ← d || b
    for i ← 0 to 127
            j ← 0|| i_{lwsize-1..0}
            k ← m_{7*w+j} || m_{6*w+j} || m_{5*w+j} || m_{4*w+j} || m_{3*w+j} || m_{2*w+j} || m_{w+j} || m_j
            1 ← i_{7..lwsize} || j_{lwsize-1..0}
            a_i ← db_1
    endfor
    RegWrite(ra, 128, a)
enddef
```

Exceptions

Operand Boundary
Access disallowed by tag
Access disallowed by global TB
Access disallowed by local TB
Access detail required by tag
Access detail required by global TB
Local TB miss
Global TB miss

FIG. 12D

Wide operand specifier for wide switch

Definition

```
def WideSwitch(op,rd,rc,rb,ra)
      d ← RegRead(rd, 128)
      c ← RegRead(rc, 64)
      b ← RegRead(rb, 128)
      if c1..0 ≠ 0 then
            raise OperandBoundary
      elseif c6..0 ≠ 0 then
            VirtAddr ← c and (c-1)
            w ← wsize ← (c and (0-c)) || 0^1
      else
            raise OperandBoundary
      endif
      msize ← 8*wsize
      lwsize ← log(wsize)
      case op of
            W.SWITCH.B:
                  order ← B
            W.SWITCH.L:
                  order ← L
      endcase
      m ← LoadMemory(c,VirtAddr,msize,order)
      db ← d || b
      for i ← 0 to 127
            j ← 0 || i_{lwsize-1..0}
            k ← m_{7*w+j}||m_{6*w+j}||m_{5*w+j}||m_{4*w+j}||m_{3*w+j}||m_{2*w+j}||m_{w+j}||m_j
            l ← i_{6..lwsize} || lwsize-1..0
            z_i ← db_l
      endfor
      RegWrite(ra, 128, z)
enddef
```

Operation codes

| | |
|---|---|
| W.TRANSLATE.8.B | Wide translate bytes big-endian |
| W.TRANSLATE.16.B | Wide translate doublets bit-endian |
| W.TRANSLATE.32.B | Wide translate quadlets bit-endian |
| W.TRANSLATE.64.B | Wide translate octlets big-endian |
| W.TRANSLATE.8.L | Wide translate bytes little-endian |
| W.TRANSLATE.16.L | Wide translate doublets little-endian |
| W.TRANSLATE.32.L | Wide translate quadlets little-endian |
| W.TRANSLATE.64.L | Wide translate octlets little-endian |

Selection

| class | size | order |
|---|---|---|
| Wide translate | 8 16 32 64 | B L |

Format

W.TRANSLATE.size.order rd=rc,rb rd=wtranslatesizeorder(rc,rb)

| 31 24 | 34 18 | 17 12 | 11 6 | 5 2 | 1 0 |
|---|---|---|---|---|---|
| W.TRANSLATE.order | rd | rc | rb | 0 | sz |
| 6 | 6 | 6 | 6 | 4 | 2 |

sz ← log(size) = 3

Definition

```
def Wide Translate(op,gsize,rd,rc,rb)
    c ← RegRead(rc, 64)
    b ← RegRead(rb, 128)
    lgsize ← log(gsize)
    if c_{lgsize-4..0} ≠ 0 then
        raise AccessDisallowedByVirtual Address
    endif
    if c_{4..lgsize-3} ≠ 0 then
        wsize ← (c and (0-c)) || 0^3
        t ← c and (c-1)
    else
        wsize ← 128
        t ← c
    endif
    lwsize ← log(wsize)
if t_{lwsize+4..lwsize-2} ≠ 0 then
        msize ← (t and (0-t)) || 0^4
        VirtAddr ← t and (t-1)
    else
        msize ← 256*wsize
        VirtAddr ← t
    endif
    case op of
        W.TRANSLATE.B:
            order ← B
        W.TRANSLATE.L:
            order ← L
    endcase
    m ← LoadMemory(c,VirtAddr,msize,order)
    vsize ← msize/wsize
    lvsize ← log(vsize)
    for i ← 0 to 128-gsize by gsize
        j ← ((order=B)^{lvsize} )^(b_{lvsize-1+i..i} ))*wsize+i_{lwsize-1..0}
        a_{gsize-1+i..i} ← m_{j+gsize-1..j}
    endfor
    RegWrite(rd, 128, a)
enddef
```

Exceptions

Operand Boundary
Access disallowed by tag
Access disallowed by global TB
Access disallowed by local TB
Access detail required by tag
Access detail required by local TB
Access detail required by global TB
Local TB miss
Global TB miss

FIG. 13D msize = wsize * vsize spec = base + msize/16 + wsize/8

Wide operand specifier for wide translate

Wide translate: 16 entries by 64 bits

Definition

```
def WideTranslate(op,gsize,rd,rc,rb)
    c ← RegRead(rc, 64)
    b ← RegRead(rb, 128)
    lgsize ← log(gsize)
    if c_{lgsize-4..0} ≠ 0 then
        raise OperandBoundary
    endif
    if c_{4..lgsize-3} ≠ 0 then
        wsize ← (c and (0-c)) || 0^3
        t ← c and (c-1)
    else
        raise OperandBoundary
    endif
    lwsize ← log(wsize)
    if t_{gsize+lwsize-4..lwsize-2} ≠ 0 then
        msize ← (t and (0-t)) || 0^4
        VirtAddr ← t and (t-1)
    else
        raise OperandBoundary
    endif
    case op of
        W.TRANSLATE.B:
            order ← B
        W.TRANSLATE.L:
            order ← L
    endcase
    m ← LoadMemory(c,VirtAddr,msize,order)
    vsize ← msize/wsize
    lvsize ← log(vsize)
    for i ← 0 to 128-gsize by gsize
        j ← ((order=B)^lvsize)^(b_{lvsize-1+i..i}))*wsize+i_{lwsize-1..0}
        z_{gsize-1+i..i} ← m_{j+gsize-1..j}
    endfor
    RegWrite(rd, 128, z)
enddef
```

FIG. 13G

Figure 14A:
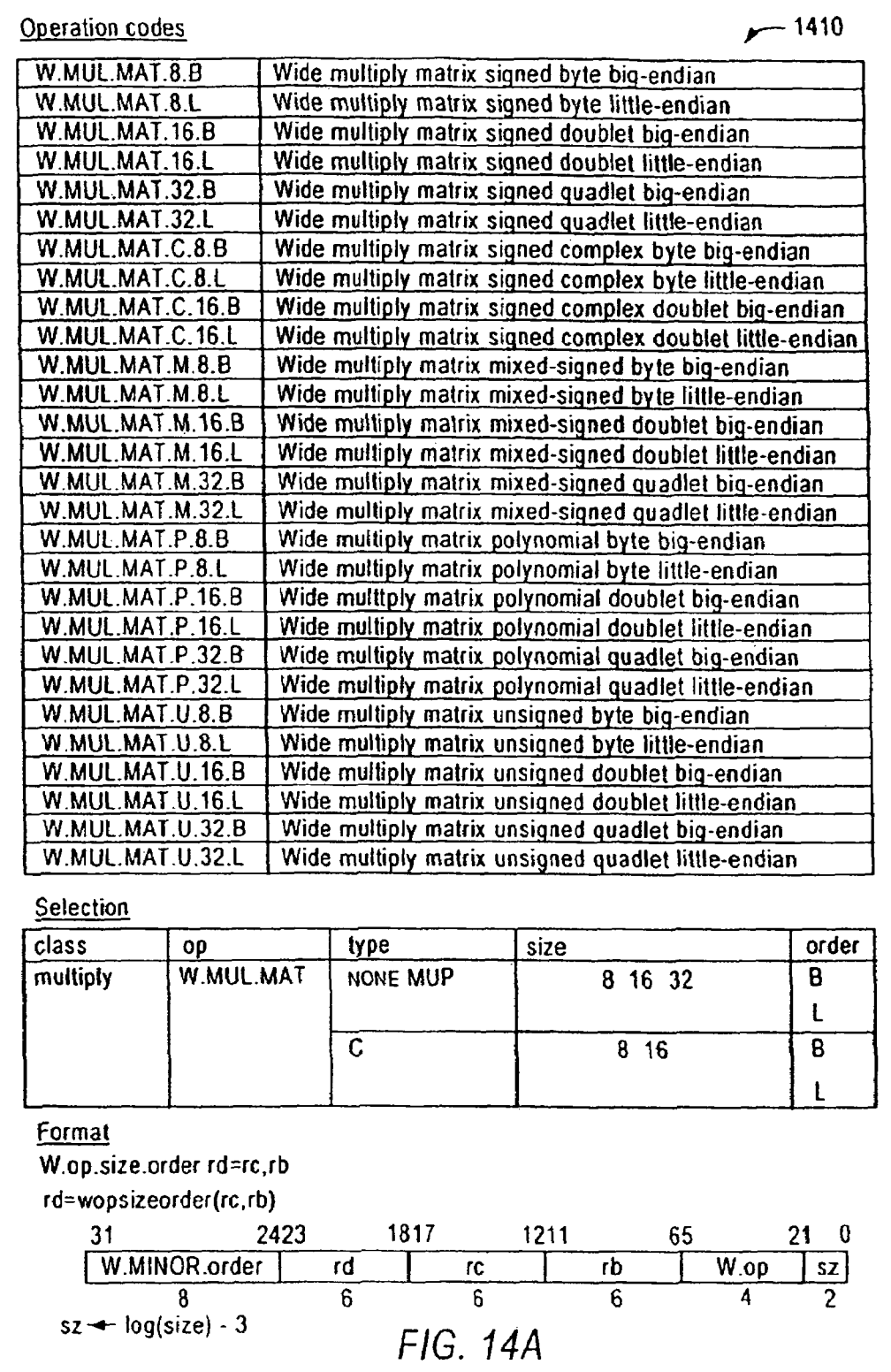

Operation codes 1410

| | |
|---|---|
| W.MUL.MAT.8.B | Wide multiply matrix signed byte big-endian |
| W.MUL.MAT.8.L | Wide multiply matrix signed byte little-endian |
| W.MUL.MAT.16.B | Wide multiply matrix signed doublet big-endian |
| W.MUL.MAT.16.L | Wide multiply matrix signed doublet little-endian |
| W.MUL.MAT.32.B | Wide multiply matrix signed quadlet big-endian |
| W.MUL.MAT.32.L | Wide multiply matrix signed quadlet little-endian |
| W.MUL.MAT.C.8.B | Wide multiply matrix signed complex byte big-endian |
| W.MUL.MAT.C.8.L | Wide multiply matrix signed complex byte little-endian |
| W.MUL.MAT.C.16.B | Wide multiply matrix signed complex doublet big-endian |
| W.MUL.MAT.C.16.L | Wide multiply matrix signed complex doublet little-endian |
| W.MUL.MAT.M.8.B | Wide multiply matrix mixed-signed byte big-endian |
| W.MUL.MAT.M.8.L | Wide multiply matrix mixed-signed byte little-endian |
| W.MUL.MAT.M.16.B | Wide multiply matrix mixed-signed doublet big-endian |
| W.MUL.MAT.M.16.L | Wide multiply matrix mixed-signed doublet little-endian |
| W.MUL.MAT.M.32.B | Wide multiply matrix mixed-signed quadlet big-endian |
| W.MUL.MAT.M.32.L | Wide multiply matrix mixed-signed quadlet little-endian |
| W.MUL.MAT.P.8.B | Wide multiply matrix polynomial byte big-endian |
| W.MUL.MAT.P.8.L | Wide multiply matrix polynomial byte little-endian |
| W.MUL.MAT.P.16.B | Wide multtply matrix polynomial doublet big-endian |
| W.MUL.MAT.P.16.L | Wide multiply matrix polynomial doublet little-endian |
| W.MUL.MAT.P.32.B | Wide multiply matrix polynomial quadlet big-endian |
| W.MUL.MAT.P.32.L | Wide multiply matrix polynomial quadlet little-endian |
| W.MUL.MAT.U.8.B | Wide multiply matrix unsigned byte big-endian |
| W.MUL.MAT.U.8.L | Wide multiply matrix unsigned byte little-endian |
| W.MUL.MAT.U.16.B | Wide multiply matrix unsigned doublet big-endian |
| W.MUL.MAT.U.16.L | Wide multiply matrix unsigned doublet little-endian |
| W.MUL.MAT.U.32.B | Wide multiply matrix unsigned quadlet big-endian |
| W.MUL.MAT.U.32.L | Wide multiply matrix unsigned quadlet little-endian |

Selection

| class | op | type | size | order |
|---|---|---|---|---|
| multiply | W.MUL.MAT | NONE MUP | 8 16 32 | B L |
| | | C | 8 16 | B L |

Format

W.op.size.order rd=rc,rb rd=wopsizeorder(rc,rb)

| 31 24 | 23 18 | 17 12 | 11 6 | 5 2 | 1 0 |
|---|---|---|---|---|---|
| W.MINOR.order | rd | rc | rb | W.op | sz |
| 8 | 6 | 6 | 6 | 4 | 2 |

sz ← log(size) - 3

Definition

```
def mul(size,h,vs,v,i,ws,j)as
    mul ← ((vs&v_size-1+i)^h-size || v_size-1+i..i) * ((ws&w_size-1+j)^h-size || w_size-1+j..j)
enddef

def c ← PolyMultiply(size,a,b) as
    p[0] ← 0^2*size
    for k ← 0 to size-1
        p[k+1] ← p[k] ^ a_k ? (0^size-k || b || 0^k) : 0^2*size
    endfor
    c ← p[size]
enddef

def WideMultiplyMatrix(major,op,gsize,rd,rc,rb)
    d ← RegRead(rd, 128)
    c ← RegRead(rc, 64)
    b ← RegRead(rb,128)
    lgsize ← log(gsize)
    if c_lgsize-4..0 ≠ 0 then
        raise AccessDisallowedByVirtualAddress
    endif
    if c_2..lgsize-3 ≠ 0 then
        wsize ← (c and (0-c)) || 0^4
        t ← c and (c-1)
    else
        wsize ← 64
        t ← a
    endif
    lwsize ← log(wsize)
    if t_lwsize+6-lgsize..lwsize-3 ≠ 0 then
        msize ← (t and (0-t)) || 0^4
        VirtAddr ← t and (t-1)
    else
        msize ← 128*wsize/gsize
        VirtAddr ← t
    endif
    case major of
        W.MINOR.B:
            order ← B
        W.MINOR.L:
            order ← L
    endcase
```

```
    case op of
        M.MUL.MAT.U.8, W.MUL.MAT.U.16, W.MUL.MAT.U.32,
        W.MUL.MAT.U.64:
            ms ← bs ← 0
        W.MUL.MAT.M.8, W.MUL.MAT.M.16, W.MUL.MAT.M.32,
        W.MUL.MAT.M.64
            ms ← 0
            bs ← 1
        W.MUL.MAT.8, W.MUL.MAT.16, W.MUL.MAT.32,
        W.MUL.MAT.64, W.MUL.MAT.C.8, W.MUL.MAT.C.16,
        W.MUL.MAT.C.32, W.MUL.MAT.C.64:
            ms ← bs ← 1
        W.MUL.MAT.P.8, W.MUL.MAT.P.16, W.MUL.MAT.P.32,
        W.MUL.MAT.P.64:
    endcase
m ← LoadMemory(c,VirtAddr,msize,order)
h ← 2*gsize

for i ← 0 to wsize-gsize by gsize
    q[0] ← 0^(2*gsize)
    for j ← 0 to vsize-gsize by gsize
        case op of
            W.MUL.MAT.P.8, W.MUL.MAT.P.16,
            W.MUL.MAT.P.32, W.MUL.MAT.P.64:
                k ← i+wsize*j_(8..lgsize)
                q[j+gsize] ← q[j] ^ PolyMultiply(gsize,m_(k+gsize-1..k),
                b_(j+gsize-1..j))
            W.MUL.MAT.C.8, W.MUL.MAT.C.16, W.MUL.MAT.C.32,
            W.MUL.MAT.C.64:
                if (~i) & gsize = 0 then
                    k ← i-(j&gsize)+wsize*j_(8..lgsize+1)
                    q[j+gsize] ← q[i] + mul(gsize,h,ms,m,k,bs,b,j)
                else
                    k ← i+gsize+wsize*j_(8..lgsize+1)
                    q[i+gsize] ← q[i] = mul(gsize,h,ms,m,k,bs,b,j)
                endif
```

Figure 14D-3:
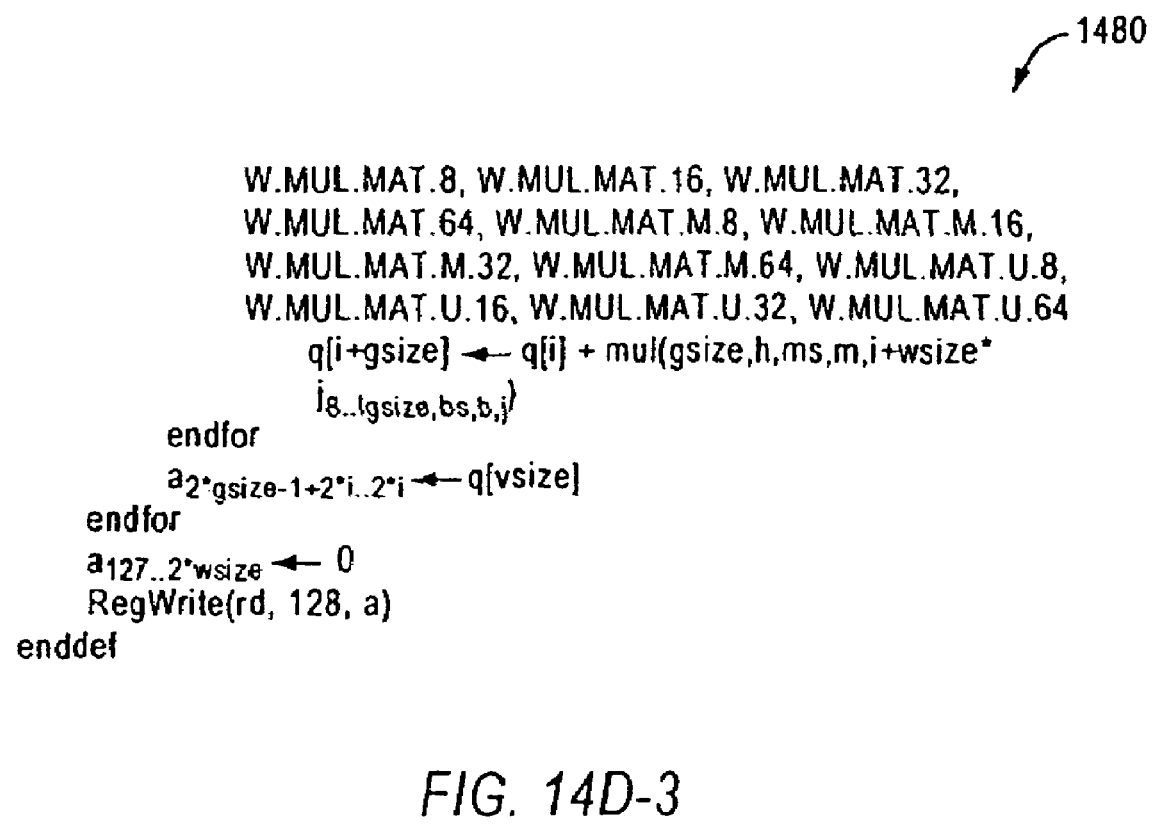

```
            W.MUL.MAT.8, W.MUL.MAT.16, W.MUL.MAT.32,
            W.MUL.MAT.64, W.MUL.MAT.M.8, W.MUL.MAT.M.16,
            W.MUL.MAT.M.32, W.MUL.MAT.M.64, W.MUL.MAT.U.8,
            W.MUL.MAT.U.16, W.MUL.MAT.U.32, W.MUL.MAT.U.64
                q[i+gsize] ← q[i] + mul(gsize,h,ms,m,i+wsize*
                j8..tgsize,bs,b,j)
        endfor
        a2*gsize-1+2*i..2*i ← q[vsize]
    endfor
    a127..2*wsize ← 0
    RegWrite(rd, 128, a)
enddef
```

Exceptions

Operand Boundary
Access disallowed by tag
Access disallowed by global TB
Access disallowed by local TB
Access detail required by tag
Access detail required by local TB
Access detail required by global TB
Local TB miss
Global TB miss

FIG. 14E msize = wsize * vsize spec = base + msize/16 + wsize/16

Wide operand specifier for wide multiply matrix

Definition

```
def mul(size,h,vs,v,i,ws,w,j) as
    mul ← ((vs&v_{size-1+i})^{h-size} || v_{size-1+i..i}) * ((ws&w_{size-1+j})^{h-size} || w_{size-1+j..j})
enddef

def c ← PolyMultiply(size,a,b) as
    p[0] ← 0^{2*size}
    for k ← 0 to size-1
        p[k+1] ← p[k] ^ a_k ? (0^{size-k} || b || 0^k) : 0^{2*size}
    endfor
    c ← p[size]
enddef

def WideMultiplyMatrix(major,op,gsize,rd,rc,rb)
    d ← RegRead(rd, 128)
    c ← RegRead(rc, 64)
    b ← RegRead(rb, 128)
    lgsize ← log(gsize)
    if c_{lgsize-4..0} ≠ 0 then
        raise OperandBoundary
    endif
    if c_{2..lgsize-3} ≠ 0 then
        wsize ← (c and (0-c)) || 0^4
        t ← c and (c-1)
    else

        raise OperandBoundary
    endif
    lwsize ← log(wsize)
    if t_{lwsize+3-lgsize..lwsize-3} ≠ 0 then
        msize ← (t and (0-t)) || 0^4
        VirtAddr ← t and (t-1)
    else

        raise OperandBoundary
    endif
    case major of
        W.MINOR.B:
            order ← B
        W.MINOR.L:
            order ← L
```

FIG. 14G-1

```
endcase
    case op of
        W.MUL.MAT.U.8, W.MUL.MAT.U.16, W.MUL.MAT.U.32, W.MUL.MAT.U.64:
            ms ← bs ← 0
        W.MUL.MAT.M.8, W.MUL.MAT.M.16, W.MUL.MAT.M.32, W.MUL.MAT.M.64:
            ms ← 0
            bs ← 1
        W.MUL.MAT.8, W.MUL.MAT.16, W.MUL.MAT.32, W.MUL.MAT.64,
        W.MUL.MAT.C.8, W.MUL.MAT.C.16, W.MUL.MAT.C.32, W.MUL.MAT.C.64:
            ms ← bs ← 1
        W.MUL.MAT.P.8, W.MUL.MAT.P.16, W.MUL.MAT.P.32, W.MUL.MAT.P.64:
    endcase
    m ← LoadMemory(c,VirtAddr,msize,order)
    h ← 2*gsize
    for i ← 0 to wsize-gsize by gsize
        q[0] ← 0^h
        for j ← 0 to vsize-gsize by gsize
            case op of
                W.MUL.MAT.P.8, W.MUL.MAT.P.16, W.MUL.MAT.P.32, W.MUL.MAT.P.64:
                    k ← i+wsize*j_8..lgsize
                    q[j+gsize] ← q[j] ^ PolyMultiply(gsize,m_k+gsize-1..k,b_j+gsize-1..j)
                W.MUL.MAT.C.8, W.MUL.MAT.C.16, W.MUL.MAT.C.32, W.MUL.MAT.C.64:
                    if (~i) & j & gsize = 0 then
                        k ← i-(j&gsize)+wsize*j_8..lgsize+1
                        q[j+gsize] ← q[j] + mul(gsize,h,ms,m,k,bs,b,j)
                    else
                        k ← i+gsize+wsize*j_8..lgsize+1
                        q[j+gsize] ← q[j] - mul(gsize,h,ms,m,k,bs,b,j)
                    endif
                W.MUL.MAT.8, W.MUL.MAT.16, W.MUL.MAT.32, W.MUL.MAT.64,
                W.MUL.MAT.M.8, W.MUL.MAT.M.16, W.MUL.MAT.M.32, W.MUL.MAT.M.64,
                W.MUL.MAT.U.8, W.MUL.MAT.U.16, W.MUL.MAT.U.32, W.MUL.MAT.U.64:
                    q[j+gsize] ← q[j] + mul(gsize,h,ms,m,i+wsize*j_8..lgsize,bs,b,j)
        endfor
        z_2*gsize-1+2*i..2*i ← q[vsize]
    endfor
    z_127..2*wsize ← 0
    RegWrite(rd, 128, az)
enddef
```

Operation codes

| | |
|---|---|
| W.MUL.MAT.X.B | Wide multiply matrix extract big-endian |
| W.MUL.MAT.X.L | Wide multiply matrix extract little-indian |

Selection

| class | op | order |
|---|---|---|
| Multiply matrix extract | W.MUL.MAT.X | B L |

Format

W.op.order ra=rc,rd,rb ra=wop(rc,rd,rb)

| 31 24 | 23 18 | 17 12 | 11 6 | 5 0 |
|---|---|---|---|---|
| W.op.order | rd | rc | rb | ra |
| 8 | 6 | 6 | 6 | 6 |

*FIG. 15A*

Wide multiply matrix extract complex doublets

1580

```
Definition
def mul(size,h,vs,v,i,ws,w,j) as
    mul ← ((vs&v_{size-1+i})^{h-size} || v_{size-1+i..i}) * ((ws&w_{size-1+j})^{h-size} || w_{size-1+j..j})
enddef

def WideMultiplyMatrixExtract(op,ra,rb,rc,rd)
    d ← RegRead(rd, 128)
    c ← RegRead(rc, 64)
    b ← RegRead(rb, 128)
    case b_{8..0} of
        0..255:
            sgsize ← 128
        256..383:
            sgsize ← 64
        384..447:
            sgsize ← 32
        448..479:
            sgsize ← 16
        480..495:
            sgsize ← 8
        496..503:
            sgsize ← 4
        504..507:
            sgsize ← 2
        508..511:
            sgsize ← 1
    endcase
    l ← b_{11}
    m ← b_{12}
    n ← b_{13}
    signed ← b_{14}
    if c_{3..0} ≠ 0 then
        wsize ← (c and (0-c)) || 0^4
        t ← c and (c-1)
    else
        wsize ← 128
        t ← c
    endif
    if sgsize < 8 then
        gsize ← 8
    elseif sgsize > wsize/2 then
        gsize ← wsize/2
    else
```

```
    gsize ← sgsize
endif
lgsize ← log(gsize
lwsize ← log(wsize)
if t_{lwsize+6-n-lgsize..lwsize-3} ≠ 0 then
    msize ← (t and (0-t)) || 0^4
    VirtAddr ← t and (t-1)
else
    msize ← 64*(2-n)*wsize/gsize
    VirtAddr ← t
endif
vsize ← (1+n)*msize*gsize/wsize
mm ← LoadMemory(c,VirtAddr,msize,order)
lmsize ← log(msize)
if (VirtAddr_{lmsize-4..0} ≠ 0 then
    raise AccessDisallowedByVirtualAddress
endif
case op of
    W.MUL.MAT.X.B:
        order ← B
    W.MUL.MAT.X.L:
        order ← L
endcase
ms ← signed
ds ← signed ^ m
as ← signed or m
spos ← (b_{8..0}) and (2*gsize-1)
dpos ← (0|| b_{23..16}) and (gsize-1)
r ← spos
sfsize ← (0|| b_{31..24}) and (gsize-1)
tfsize ← (sfsize = 0) or ((sfsize+dpos) > gsize) ? gsize-dpos : sfsize
fsize ← (tfsize + spos > h) ? h - spos : tfsize
if (b_{10..9} = Z) & ~signed then
    rnd ← F
else
    rnd ← b_{10..9}
endif
```

```
for i ← 0 to wsize-gsize by gsize
    q[0] ← 0^(2*gsize+7-lgsize)
    for j ← 0 to vsize-gsize by gsize
        if n then
            if (~) & j & gsize = 0 then
                k ← i-(j&gsize)+wsize*j_(8..lgsize+1)
                q[i+gsize] ← q[i] + mul(gsize,h,ms,mm,k,ds,d,j)
            else
                k ← i+gsize+wsize*j_(8..lgsize+1)
                q[i+gsize] ← q[i] - mul(gsize,h,ms,mm,k,ds,d,j)
            endif
        else
            q[i+gsize] ← q[i] = mul(gsize,h,ms,mm,i+j*wsize/gsize,ds,d,j)
        endif
    endfor
    p ← q[128]
    case rnd of
        none, N:
            s ← 0^(h-r) || ~p_r || p_r^(r-1)
        Z:
            s ← 0^(h-r) || p_(h-1)^r
        F:
            s ← 0^h
        C:
            s ← 0^(h-r) || 1^r
    endcase
    v ← ((ds & p_(h-1)) || p) + (0 || s)

        if (v_(h..r+fsize) = (as & v_(r+fsize-1))^(h+1-r-fsize)) or not I then
            w ← (as & v_(r+fsize-1))^(gsize-fsize-dpos) || v_(fsize-1+r..r) || 0^dpos
        else
            w ← (s ? (v_h || ~v_h^(gsize-dpos-1)) : 1^(gsize-dpos)) || 0^dpos
        endif
        a_(size-1+i..i) ← w
    endfor
    a_(127..wsize) ← 0
    RegWrite(ra, 128, a)
enddef
```

Exceptions

Operand Boundary
Access disallowed by tag
Access disallowed by global TB
Access disallowed by local TB
Access detail required by tag
Access detail required by local TB
Access detail required by global TB
Local TB miss
Global TB miss

FIG. 15F

Wide operand specifier for wide multiply matrix extract

Definition

```
def mul(size,h,vs,v,i,ws,w,j) as
    mul ← ((vs&v_{size-1+i})^{h-size} || v_{size-1+i..i}) * ((ws&w_{size-1+j})^{h-size} || w_{size-1+j..j})
enddef

def WideMultiplyMatrixExtract(op,ra,rb,rc,rd)
    d ← RegRead(rd, 128)
    c ← RegRead(rc, 64)
    b ← RegRead(rb, 128)
    wsize ← (c and (0-c)) || 0^4
    if wsize>128 then
        raise OperandBoundary
    endif
    lwsize ← log(wsize)
    t ← c and (c-1)
    msize ← (t and (0-t)) || 0^4
    if msize>(16*wsize) then
        raise OperandBoundary
    endif
    lmsize ← log(msize)
    ca ← t and (t-1)
    vsize ← msize/wsize
    case b_{8..0} of
        0..255:
            sgsize ← 128
        256..383:
            sgsize ← 64
        384..447:
            sgsize ← 32
        448..479:
            sgsize ← 16
        480..495:
            sgsize ← 8
        496..503:
            sgsize ← 4
        504..507:
            sgsize ← 2
        508..511:
            sgsize ← 1
    endcase
    l ← b_11
    m ← b_12
    n ← b_13
```

FIG. 15H-1

```
        signed ← b14
        x ← b15 and (wsize≤64)
        if (sgsize < 8) or (sgsize > min(128/(n+1)/vsize, wsize/(n+1))) then
            raise ReservedInstruction
        endif
        gsize ← sgsize
        lgsize ← log(gsize)
        h ← (2*gsize) + 7 - lgsize
OperandBoundary    case op of
            W.MUL.MAT.X.B:
                order ← B
            W.MUL.MAT.X.L:
                order ← L
        endcase
        cm ← LoadMemory(c,ca,msize,order)
        cs ← signed
        ds ← signed ^ m
        zs ← signed or m or n
        zsize ← gsize*(x+1)
        spos ← (b8..0) and (2*gsize-1)
        dpos ← (0 || b23..16) and (gsize-1)
        r ← spos
        sfsize ← (0 || b31..24) and (gsize-1)
        tfsize ← (sfsize = 0) or ((sfsize+dpos) > gsize) ? gsize-dpos : sfsize
        fsize ← (tfsize + spos > h+1) ? h+1 - spos : tfsize
        if (b10..9 = Z) & ~zs then
            rnd ← F
        else
            rnd ← b10..9
        endif
        for i ← 0 to wsize-gsize by gsize
            k ← i*zsize/gsize
            q[0] ← 0^h
            for j ← 0 to (vsize-1)*gsize by gsize
                if n then
                    if (~i) & j & gsize = 0 then
                        k ← i-(j&gsize)+wsize*j8..lgsize+1
                        q[j+gsize] ← q[j] + mul(gsize,h,cs,cm,k,ds,d,j)
                    else
                        k ← i+gsize+wsize*j8..lgsize+1
                        q[j+gsize] ← q[j] - mul(gsize,h,cs,cm,k,ds,d,j)
                    endif
                else
                    q[j+gsize] ← q[j] + mul(gsize,h,cs,cm,i+j*wsize/gsize,ds,d,j)
                endif
            endfor
            p ← q[128]
            case rnd of
```

FIG. 15H-2

```
                none, N:
                        s ← 0^(h-r) || p_r || ~p_r^(r-1)
                Z:
                        s ← 0^(h-r) || p^r_(h-1)
                F:
                        s ← 0^h
                C:
                        s ← 0^(h-r) || 1^r
        endcase
        v ← ((ds & p_(h-1))||p) + (0||s)
        if (v_(h..r+fsize) = (zs & v_(r+fsize-1))^(h+1-r-fsize)) or not I then
                w ← (zs & v_(r+fsize-1))^(zsize-fsize-dpos) || v_(fsize-1+r..r) || 0^dpos
        else
                w ← (zs ? (v_h^(zsize-fsize-dpos+1)||~v_h^(fsize-1)) : 0^(zsize-fsize-dpos)||1^fsize) || 0^dpos
        endif
        z_(zsize-1+k..k) ← w
    endfor
    z_(127..wsize*(1+x)) ← 0
    RegWrite(ra, 128, z)
enddef
```

Operation codes

| | |
|---|---|
| W.MUL.MAT.X.I.8.B | Wide multiply matrix extract immediate signed byte big-endian |
| W.MUL.MAT.X.I.8.L | Wide multiply matrix extract immediate signed byte little-endian |
| W.MUL.MAT.X.I.16.B | Wide multiply matrix extract immediate signed doublet big-endian |
| W.MUL.MAT.X.I.16.L | Wide multiply matrix extract immediate signed doublet little-endian |
| W.MUL.MAT.X.I.32.B | Wide multiply matrix extract immediate signed quadlet big-endian |
| W.MUL.MAT.X.I.32.L | Wide multiply matrix extract immediate signed quadlet little-endian |
| W.MUL.MAT.X.I.64.B | Wide multiply matrix extract immediate signed octlets big-endian |
| W.MUL.MAT.X.I.64.L | Wide multiply matrix extract immediate signed octlets little-endian |
| W.MUL.MAT.X.I.C.8.B | Wide multiply matrix extract immediate complex bytes big-endian |
| W.MUL.MAT.X.I.C.8.L | Wide multiply matrix extract immediate complex bytes little-endian |
| W.MUL.MAT.X.I.C.16.B | Wide multiply matrix extract immediate complex doublets big-endian |
| W.MUL.MAT.X.I.C.16.L | Wide multiply matrix extract immediate complex doublets little-endian |
| W.MUL.MAT.X.I.C.32.B | Wide multiply matrix extract immediate complex quadlets big-endian |
| W.MUL.MAT.X.I.C.32.L | Wide multiply matrix extract immediate complex quadlets little-endian |

Selection

| class | op | type | size | order |
|---|---|---|---|---|
| wide multiply extract immediate | W.MUL.MAT.X.I | NONE | 8 16 32 64 | L B |
| | | C | 8 16 32 | L B |

Format

W.op.tsize.order rd=rc,rb, i rd=woptsizeorder(rc,rb,i)

| 31 … 24 | 23 … 18 | 17 … 12 | 11 … 6 | 5 | 4 … 3 | 2 … 0 |
|---|---|---|---|---|---|---|
| W.op.order | rd | rc | rb | t | sz | sh |
| 8 | 6 | 6 | 6 | 1 | 2 | 3 |

sz ← log(size) - 3
assert size+3 ≥ i ≥ size-4
sh ← i - size

FIG. 16A

Wide multiply matrix extract immediate doublets

1680

```
Definition
def mul(size,h,vs,v,i,ws,w,j) as
    mul ←((vs&v_{size-1+i})^{h-size} || v_{size-1+i..i}) * ((ws&w_{size-1+j})^{h-size} || w_{size-1+j..j})
enddef

def WideMultiplyMatrixExtractImmediate(op,type,gsize,rd,rc,rb,sh)
    c ← RegRead(rc, 64)
    b ← RegRead(rb, 128)
    lgsize ← log(gsize)
    case type of
        NONE:
            if c_{lgsize-4..0} ≠ 0 then
                raise AccessDisallowedByVirtualAddress
            endif
            if c_{3..lgsize-3} ≠ 0 then
                wsize ← (c and (0-c)) || 0^4
                t ← c and (c-1)
            else
                wsize ← 128
                t ← c
            endif
            lwsize ← log(wsize)
            if t_{lwsize+6-lgsize..lwsize-3} ≠ 0 then
                msize ← (t and (0-t)) || 0^4
                VirtAddr ← t and (t-1)
            else
                msize ← 128*wsize/gsize
                VirtAddr ← t
        C:
            if c_{lgsize-4..0} ≠ 0 then
                raise AccessDisallowedByVirtualAddress
            endif
            if c_{3..lgsize-3} ≠ 0 then
                wsize ← (c and (0-c)) || 0^4
                t ← c and (c-1)
            else
                wsize ← 128
                t ← c
            endif
            lwsize ← log(wsize)
            if t_{lwsize+5-lgsize..lwsize-3} ≠ 0 then
                msize ← (t and (0-t)) || 0^4
```

```
                VirtAddr ← t and (t-1)
            else
                msize ← 64*wsize/gsize
                VirtAddr ← t
            endif
            vsize ← 2*msize*gsize/wsize
    endcase
    case of of
        W.MUL.MAT.X.I.B:
            order ← B
        W.MUL.MAT.X.I.L:
            order ← L
    endcase
    as ← ms ← bs ← 1
    m ← LoadMemory(c,VirtAddr,msize,order)
    h ← (2*gsize) + 7 - lgsize-(ms and bs)
    r ← gsize + (sh^5_2||sh)
    for ← 0 to wsize-gsize by gsize
        q[0] ← 0^(2*gsize+7-lgsize)
        for j ← 0 to vsize-gsize by gsize
            case type of
                NONE:
                    q[j+gsize] ← q[i] + mul(gsize,h,ms,m,i+wsize*
                    j_8..lgsize,bs,b,j)
                C:
                    if (~i) & j & gsize = 0 then
                        k ← i-(j&gsize)+wsize*j_8..lgsize+1
                        q[j+gsize] ← q[i] + mul(gsize,h,ms,m,k,bs,b,j)
                    else
                        k ← i+gsize+wsize*j_8..lgsize+1
                        q[j+gsize] ← q[j] - mul(gsize,h,ms,m,k,bs,b,j)
                    endif
            endcase
        endfor
        p ← q[vsize]
        s ← 0^(h-r) || ~p_r || p^(r-1)_r
        v ← ((as & p_(h-1))||p) + (0||s)
        if (v_h..r+gsize = (as & v_r+gsize-1)^(h+1-r-gsize) then
            a_gsize-1+i..i ← v_gsize-1+r..r
        else
            a_gsize-1+i..i ← as ? (v_h||~v^(gsize-1)_h ) : 1gsize
        endif
    endfor
    a_127..wsize ← 0
    RegWrite(rd, 128, a)
enddef
```

Exceptions

Operand Boundary
Access disallowed by tag
Access disallowed by global TB
Access disallowed by local TB
Access detail required by tag
Access detail required by local TB
Access detail required by global TB
Local TB miss
Global TB miss

FIG. 16E msize = wsize * vsize spec = base + msize/16 + wsize/8

Wide operand specifier for wide multiply matrix extract immediate

Definition

```
def mul(size,h,vs,v,i,ws,w,j) as
      mul ← ((vs&v_{size-1+i})^{h-size} || v_{size-1+i..i}) * ((ws&w_{size-1+j})^{h-size} || w_{size-1+j..j})
enddef

def WideMultiplyMatrixExtractImmediate(op,type,gsize,rd,rc,rb,sh)
      c ← RegRead(rc, 64)
      b ← RegRead(rb, 128)
      lgsize ← log(gsize)
      case type of
            NONE:
                  if c_{lgsize-4..0} ≠ 0 then
                        raise OperandBoundary
                  endif
                  if c_{3..lgsize-3} ≠ 0 then
                        wsize ← (c and (0-c)) || 0^4
                        t ← c and (c-1)
                  else
                        raise OperandBoundary
                  endif
                  lwsize ← log(wsize)
                  if t_{lwsize+3-lgsize..lwsize-3} ≠ 0 then
                        msize ← (t and (0-t)) || 0^4
                        VirtAddr ← t and (t-1)
                  else
                        raise OperandBoundary
                  endif
                  vsize ← msize*gsize/wsize
            C:
                  if c_{lgsize-4..0} ≠ 0 then
                        raise OperandBoundary
                  endif
                  if c_{3..lgsize-3} ≠ 0 then
                        wsize ← (c and (0-c)) || 0^4
                        t ← c and (c-1)
                  else
                        wsize ← 128
                        t ← c
                  endif
                  lwsize ← log(wsize)
                  if t_{lwsize+2-lgsize..lwsize-3} ≠ 0 then
```

FIG. 16G-1

```
                msize ← (t and (0-t)) || 0^4
                VirtAddr ← t and (t-1)
            else

                raise OperandBoundary
            endif
            vsize ← 2*msize*gsize/wsize
    endcase
    case op of
        W.MUL.MAT.X.I.B:
            order ← B
        W.MUL.MAT.X.I.L:
            order ← L
    endcase
    zs ← ms ← bs ← 1
    m ← LoadMemory(c,VirtAddr,msize,order)
    h ← (2*gsize) + 7 - lgsize - (ms and bs)
    r ← gsize + (sh_2^5 ||sh)
    for i ← 0 to wsize-gsize by gsize
        q[0] ← 0^h
        for j ← 0 to vsize-gsize by gsize
            case type of
                NONE:
                    q[j+gsize] ← q[j] + mul(gsize,h,ms,m,i+wsize*j_8..lgsize,bs,b,j)
                C:
                    if (~i) & j & gsize = 0 then
                        k ← i-(j&gsize)+wsize*j_8..lgsize+1
                        q[j+gsize] ← q[j] + mul(gsize,h,ms,m,k,bs,b,j)
                    else
                        k ← i+gsize+wsize*j_8..lgsize+1
                        q[j+gsize] ← q[j] - mul(gsize,h,ms,m,k,bs,b,j)
                    endif
            endcase
        endfor
        p ← q[vsize]
        s ← 0^(h-r) || p_r || ~p_r^(r-1)
        v ← ((zs & p_(h-1))||p) + (0||s)
        if (v_h..r+gsize = (zs & v_(r+gsize-1))^(h+1-r-gsize) then
            z_(gsize-1+i..i) ← v_(gsize-1+r..r)
        else
            z_(gsize-1+i..i) ← zs ? (v_h || ~v_h^(gsize-1)) : 1^gsize
        endif
    endfor
    z_127..wsize ← 0
    RegWrite(rd, 128, z)
enddef
```

Operation codes

| | |
|---|---|
| W.MUL.MAT.C.F.16.B | Wide multiply matrix complex floating-point half big-endian |
| W.MUL.MAT.C.F.16.L | Wide multiply matrix complex floating-point little-endian |
| W.MUL.MAT.C.F.32.B | Wide multiply matrix complex floating-point single big-endian |
| W.MUL.MAT.C.F.32.L | Wide multiply matrix complex floating-point single little-endian |
| W.MUL.MAT.F.16.B | Wide multiply matrix floating-point half big-endian |
| W.MUL.MAT.F.16.L | Wide multiply matrix floating-point half little-endian |
| W.MUL.MAT.F.32.B | Wide multiply matrix floating-point single big-endian |
| W.MUL.MAT.F.32.L | Wide multiply matrix floating-point single little-endian |
| W.MUL.MAT.F.64.B | Wide multiply matrix floating-point double big-endian |
| W.MUL.MAT.F.64.L | Wide multiply matrix floating-point double little-endian |

Selection

| class | op | type | prec | order |
|---|---|---|---|---|
| wide multiply matrix | W.MUL.MAT | F | 16 32 64 | L B |
| | | C.F | 16 32 | L B |

Format

W.op.prec.order rd=rc,rb rd=wopprecorder(rc,rb)

| 31 24 | 23 18 | 17 12 | 11 6 | 5 2 | 1 0 |
|---|---|---|---|---|---|
| W.MINOR.order | rd | rc | rb | W.op | pr |
| 8 | 6 | 6 | 6 | 4 | 2 |

Pr ← log(prec) - 3

FIG. 17A

Wide multiply matrix floating-point half

Wide multiply matrix complex floating-point half

1780

Definition

```
def mul(size,v,i,w,j) as
    mul ← fmul(F(size,v_{size-1+i..i}),F(size,w_{size-1+j..j} ))
enddef

def WideMultiplyMatrixFloatingPoint(major,op,gsize,rd,rc,rb)
    c ← RegRead(rc, 64)
    b ← RegRead(rb, 128)
    lgsize ← log(gsize)
    switch op of
        W.MUL.MAT.F.16, W.MUL.MAT.F.32, W.MUL.MAT.F.64:
            if c_{lgsize-4..0} ≠ 0 then
                raise AccessDisallowedByVirtualAddress
            endif
            if c_{3..lgsize-3} ≠ 0 then
                wsize ← (c and (0-c)) || 0^4
                t ← c and (c-1)
            else
                wsize ← 128
                t ← c
            endif
            lwsize ← log(wsize)
            if t_{lwsize+6-lgsize..lwsize-3} ≠ 0 then
                msize ← (t and (0-t)) || 0^4
                VirtAddr ← t and (t-1)
            else
                msize ← 128*wsize/gsize
                VirtAddr ← t
            endif
            vsize ← msize*gsize/wsize
        W.MUL.MAT.C.F.16, W.MUL.MAT.C.F.32, W.MUL.MAT.C.F.64:
            if c_{lgsize-4..0} ≠ 0 then
                raise AccessDisallowedByVirtualAddress
            endif
            if c_{3..lgsize-3} ≠ 0 then
                wsize ← (c and (0-c)) || 0^4
                t ← c and (c-1)
            else
                wsize ← 128
                t ← c
            endif
            lwsize ← log(wsize)
            if t_{lwsize+5-lgsize..lwsize-3} ≠ 0 then
```

```
                msize ← (t and (0-t)) || 0^4
                VirtAddr ← t and (t-1)
            else
                msize ← 64*wsize/gsize
                VirtAddr ← t
            endif
            vsize ← 2*msize*gsize/wsize
    endcase
    case major of
        M.MINOR.B:
            order ← B
        M.MINOR.L:
            order ← L
    endcase
    m ← LoadMemory(c,VirtAddr,msize,order)
    for i ← 0 to wsize-gsize by gsize
        q[0].t ← NULL
        for j ← 0 to vsize-gsize by gsize
            case op of
                W.MUL.MAT.F.16, W.MUL.MAT.F.32, W.MUL.MAT.F.64:
                    q[j+gsize] ← faddq[j], mul(gsize,m,i+wsize*
                    j_8..lgsize+1 ,b,j))
                W.MUL.MAT.C.F.16, W.MUL.MAT.C.F.32,
                W.MUL.MAT.C.F.64:
                    if (~i) & j & gsize = 0 then
                        k ← i-(j&gsize)+wsize*j_8..lgsize+1
                        q[j+gsize] ← faqq[j], mul(gsize,m,k,b,j))
                    else
                        k ← i+gsize+wsize*j_8..lgsize+1
                        q[j+gsize] ← fsubq[j], mul(gsize,m,k,b,j))
                    endif
            endcase
        endfor
        a_gsize-1+i..i ← q[vsize]
    endfor
    a_127..wsize ← 0
    RegWrite(rd, 128, a)
enddef
```

Exceptions

Floating-point arithmetic
Operand Boundary
Access disallowed by tag
Access disallowed by global TB
Access disallowed by local TB
Access detail required by tag
Access detail required by local TB
Access detail required by global TB
Local TB miss
Global TB miss

FIG. 17E msize = wsize * vsize spec = base + msize/16 + wsize/16

Wide operand specifier for wide multiply matrix floating-point

Definition

```
def mul(size,v,i,w,j) as
      mul ← fmul(F(size,v_{size-1+i..i}),F(size,w_{size-1+j..j}))
enddef

def WideMultiplyMatrixFloatingPoint(major,op,gsize,rd,rc,rb)
      c ← RegRead(rc, 64)
      b ← RegRead(rb, 128)
      lgsize ← log(gsize)
      switch op of
            W.MUL.MAT.F.16, W.MUL.MAT.F.32, W.MUL.MAT.F.64:
                  if c_{lgsize-4..0} ≠ 0 then
                        raise OperandBoundary
                  endif
                  if c_{3..lgsize-3} ≠ 0 then
                        wsize ← (c and (0-c)) || 0^4
                        t ← c and (c-1)
                  else
                        raise OperandBoundary
                  endif
                  lwsize ← log(wsize)
                  if t_{lwsize+3-lgsize..lwsize-3} ≠ 0 then
                        msize ← (t and (0-t)) || 0^4
                        VirtAddr ← t and (t-1)
                  else

                        raise OperandBoundary
                  endif
                  vsize ← msize*gsize/wsize
            W.MUL.MAT.C.F.16, W.MUL.MAT.C.F.32, W.MUL.MAT.C.F.64:
                  if c_{lgsize-4..0} ≠ 0 then
                        raise OperandBoundary
                  endif
                  if c_{3..lgsize-3} ≠ 0 then
                        wsize ← (c and (0-c)) || 0^4
                        t ← c and (c-1)
                  else
                        raise OperandBoundary
                  endif
```

FIG. 17G-1

```
                lwsize ← log(wsize)
                if t_{lwsize+2-lgsize..lwsize-3} ≠ 0 then
                        msize ← (t and (0-t)) || 0^4
                        VirtAddr ← t and (t-1)
                else
                        raise OperandBoundary
                endif
                vsize ← 2*msize*gsize/wsize
        endcase
        case major of
                M.MINOR.B:
                        order ← B
                M.MINOR.L:
                        order ← L
        endcase
        m ← LoadMemory(c,VirtAddr,msize,order)
        for i ← 0 to wsize-gsize by gsize
                q[0].t ← NULL
                for j ← 0 to vsize-gsize by gsize
                        case op of
                                W.MUL.MAT.F.16, W.MUL.MAT.F.32, W.MUL.MAT.F.64:
                                        q[j+gsize] ← fadd(q[j], mul(gsize,m,i+wsize*j_{8..lgsize},b,j))
                                W.MUL.MAT.C.F.16, W.MUL.MAT.C.F.32, M.MUL.MAT.C.F.64:
                                        if (~i) & j & gsize = 0 then
                                                k ← i-(j&gsize)+wsize*j_{8..lgsize+1}
                                                q[j+gsize] ← fadd (q[j], mul(gsize,m,k,b,j))
                                        else
                                                k ← i+gsize+wsize*j_{8..lgsize+1}
                                                q[j+gsize] ← fsub(q[j], mul(gsize,m,k,b,j))
                                        endif
                        endcase
                endfor
                z_{gsize-1+i..i} ← q[vsize]
        endfor
        z_{127..wsize} ← 0
        RegWrite(rd, 128, z)
enddef
```

Operation codes

| | |
|---|---|
| W.MUL.MAT.G.8.B | Wide multiply matrix Galois bytes big-endian |
| W.MUL.MAT.G.8.L | Wide multiply matrix Galois bytes little-endian |

Selection

| class | op | size | order |
|---|---|---|---|
| Multiply matrix Galois | W.MUL.MAT.G | 8 | B L |

Format

W.op.order ra=rc,rd,rb ra=woporder(rc,rd,rb)

| 31 24 | 23 18 | 17 12 | 11 6 | 5 0 |
|---|---|---|---|---|
| W.op.order | rd | rc | rb | ra |
| 8 | 6 | 6 | 6 | 6 |

FIG. 18A

Wide multiply matrix Galois byte

1860

Definition

```
def c ← PolyMultiply(size,a,b) as
    p[0] ← 0^(2*size)
    for k ← 0 to size-1
        p[k+1] ← p[k] ^ a_k ? (0^(size-k) || b || 0^k) : 0^(2*size)
    endfor
    c ← p[size]
enddef

def c ← PolyResidue(size,a,b) as
    p[0] ← a
    for k ← size-1 to 0 by-1
        p[k-1] ← p[k] ^ p[0]_(size+k) ?(0^(size-k) || 1^1 || b || 0^k) : 0^(2*size)
    endfor
    c ← p[size]_(size-1..0)
enddef
def WideMultiplyMatrixGalois(op,gsize,rd,rc,rb,ra)
    d ← RegRead(rd, 128)
    c ← RegRead(rc, 64)
    b ← RegRead(rb,128)
    lgsize ← log(gsize)
    if c_(lgsize-4..0) ≠ 0 then
        raise AccessDisallowedByVirtualAddress
    endif
    if c_(3..lgsize-3) ≠ 0 then
        wsize ← (c and (0-c)) || 0^4
        t ← c and (c-1)
    else
        wsize ← 128
        t ← c
    endif
    lwsize ← log(wsize)
    if t_(lwsize+6-lgsize..lwsize-3) ≠ 0 then
        msize ← (t and (0-t)) || 0^4
        VirtAddr ← t and (t-1)
    else
        msize ← 128*wsize/gsize
        VirtAddr ← t
    endif
    case op of
        W.MUL.MAT.G.8.B:
            order ← B
        W.MUL.MAT.G.8.L:
            order ← L
    endcase
```

```
m ← LoadMemory(c, VirtAddr,msize,order)
for i ← 0 wsize-gsize by gsize
    q[0] ← 0^(2*gsize)
    for j ← 0 to vsize-gsize by gsize
        k ← i+wsize*j_(8..lgsize)
        q[j+gsize] ← q[j] ^ PolyMultiply(gsize,m_(k+gsize-1..k) ,d_(j+gsize-1..j) )
    endfor a_(gsize-1+i..i) ← PolyResidue(gsize,q[vsize],b_(gsize-1..0) )
endfor
a_(127..wsize) ← 0
RegWrite(ra,128, a)
enddef
```

Exceptions

Operand Boundary
Access disallowed by tag
Access disallowed by global TB
Access disallowed by local TB
Access detail required by tag
Access detail required by local TB
Access detail required by global TB
Local TB miss
Global TB miss

FIG. 18D msize = wsize * vsize spec = base + msize/16 + wsize/16

Wide operand specifier for wide multiply matrix Galois

Definition

```
def c ← PolyMultiply(size,a,b) as
      p[0] ← 0^(2*size)
      for k ← 0 to size-1
            p[k+1] ← p[k] ^ a_k ? (0^(size-k) || b || 0^k) : 0^(2*size)
      endfor
      c ← p[size]
enddef

def c ← PolyResidue(size,a,b) as
      p[size] ← a
      for k ← size-1 to 0 by -1
            p[k] ← p[k+1] ^ p[k+1]_(size+k) ? (0^(size-k-1) || 1^1 || b || 0^k) : 0^(2*size)
      endfor
      c ← p[0]_(size-1..0)
enddef

def WideMultiplyMatrixGalois(op,gsize,rd,rc,rb,ra)
      d ← RegRead(rd, 128)
      c ← RegRead(rc, 64)
      b ← RegRead(rb, 128)
      lgsize ← log(gsize)
      if c_(lgsize-4..0) ≠ 0 then
            raise OperandBoundary
      endif
      if c_(3..lgsize-3) ≠ 0 then
            wsize ← (c and (0-c)) || 0^4
            t ← c and (c-1)
      else
            raise OperandBoundary
      endif
      lwsize ← log(wsize)
      if t_(lwsize+3-lgsize..lwsize-3) ≠ 0 then
            msize ← (t and (0-t)) || 0^4
            VirtAddr ← t and (t-1)
      else
            raise OperandBoundary
      endif
```

FIG. 18F-1

```
    case op of
        W.MUL.MAT.G.8.B:
            order ← B
        W.MUL.MAT:G.8.L:
            order ← L
    endcase
    m ← LoadMemory(c,VirtAddr,msize,order)
    for i ← 0 to wsize-gsize by gsize
        q[0] ← 0^(2*gsize)
        for j ← 0 to vsize-gsize by gsize
            k ← i+wsize*j_(8..lgsize)
            q[j+gsize] ← q[j] ^ PolyMultiply(gsize,m_(k+gsize-1..k),d_(j+gsize-1..j))
        endfor
        z_(gsize-1+i..i) ← PolyResidue(gsize,q[vsize],b_(gsize-1..0))
    endfor
    z_(127..wsize) ← 0
    RegWrite(ra, 128, z)
enddef
```

Operation codes

| | |
|---|---|
| E.MUL.ADD.X | Ensemble multiply add extract |
| E.CON.X | Ensemble convolve extract |

Format

E.op rd@rc,rb,ra rd=gop(rd,rc,rb,ra)

| 31 24 | 23 18 | 17 12 | 11 6 | 5 0 |
|---|---|---|---|---|
| E.op | rd | rc | rb | ra |
| 8 | 6 | 6 | 6 | 6 |

FIG. 19A

Ensemble complex multiply add extract doublets

This ensemble-multiply-add-extract instructions (E.MUL.ADD.X), when the x bit is set, multiply the low-order 64 bits of each of the rc and rb registers and produce extended (double-size) results.

1990

Definition def mul(size,h,vs,v,i,ws,w,j) as
    mul ← $((vs\&v_{size-1+i})^{h-size} \,||\, v_{size-1+i..i}) * ((ws\&w_{size-1+j})^{h-size} \,||\, w_{size-1+j..j})$
enddef def EnsembleExtractInplace(op,ra,rb,rc,rd) as
    d ← RegRead(rd, 128)
    c ← RegRead(rc, 128)
    b ← RegRead(rb, 128)
    a ← RegRead(ra, 32)
    case $a_{8..0}$ of
        0..255:
            sgsize ← 128
        256..383:
            sgsize ← 64
        384..447:
            sgsize ← 32
        448..479:
            sgsize ← 16
        480..495:
            sgsize ← 8
        496..503:
            sgsize ← 4
        504..507:
            sgsize ← 2
        508..511:
            sgsize ← 1
    endcase
    l ← $a_{11}$
    m ← $a_{12}$
    n ← $a_{13}$
    signed ← $a_{14}$
    x ← $a_{15}$
    case op of
        E.CON.X:
            if (sgsize < 8) or (sgsize*(n+1)*(x+1) > 128) then
                raise ReservedInstruction
            endif
            gsize ← sgsize
            lgsize ← log(gsize)
            wsize ← 128/(x+1)
            vsize ← 128

```
            e ← c || d
            es ← signed
            bs ← signed ^ m
            zs ← signed or m or n
            zsize ← gsize*(x+1)
            h ← (2*gsize) + log(vsize) - lgsize
            spos ← (a8..0) and (2*gsize-1)
        E.MUL.ADD.X:
            if (sgsize < 8) or (sgsize*(n+1)*(x+1) > 128) then
                raise ReservedInstruction
            endif
            gsize ← sgsize
            wsize ← 128/(x+1)
            ds ← signed
            cs ← signed ^ m
            zs ← signed or m or n
            zsize ← gsize*(x+1)
            h ← ((3+x)*gsize) + n
            spos ← (a8..0) and (2*gsize-1)
    endcase
    dpos ← (0 || a23..16) and (zsize-1)
    r ← spos
    sfsize ← (0 || a31..24) and (zsize-1)
    tfsize ← (sfsize = 0) or ((sfsize+dpos) > zsize) ? zsize-dpos : sfsize
    fsize ← (tfsize + spos > h+1) ? h+1 - spos : tfsize
    if (b10..9 = Z) and not zs then
        rnd ← F
    else
        rnd ← b10..9
    endif
    for k ← 0 to wsize-zsize by zsize
        i ← k*gsize/zsize
        case op of
            E.CON.X:
                q[0] ← 0^h
                for j ← 0 to vsize-gsize by gsize
                    if n then
                        if (~i) & j & gsize = 0 then
                            q[j+gsize] ← q[j] + mul(gsize,h,es,e,i+128-j,bs,b,j)
                        else
                            q[j+gsize] ← q[j] - mul(gsize,h,es,e,i+128-j+2*gsize,bs,b,j)
                        endif
                    else
                        q[j+gsize] ← q[j] + mul(gsize,h,es,e,i+128-j,bs,b,j)
                    endif
                endfor
                p ← q[vsize]
```

```
            E.MUL.ADD.X:
                di ← ((ds and d_{k+dpos+fsize-1})^{h-fsize-r}||(d_{k+dpos+fsize-1..k+dpos})||0^r)
                if n then
                    if (i and gsize) = 0 then
                        p←mul(gsize,h,ds,d,i,cs,c,i)-mul(gsize,h,ds,d,i+gsize,cs,c,i+gsize)+di
                    else
                        p←mul(gsize,h,ds,d,i-gsize,cs,c,i)+mul(gsize,h,ds,d,i,cs,c,i-gsize)+di
                    endif
                else
                    p ← mul(gsize,h,ds,d,i,cs,c,i) + di
                endif
        endcase
        case rnd of
            N:
                s ← 0^{h-r} || p_r || ~p_r^{r-1}
            Z:
                s ← 0^{h-r} || p_{h-1}^r
            F:
                s ← 0^h
            C:
                s ← 0^{h-r} || 1^r
        endcase
        v ← ((zs & p_{h-1})||p) + (0||s)
        if (v_{h..r+fsize} = (zs & v_{r+fsize-1})^{h+1-r-fsize}) or not I then
            w ← (zs & v_{r+fsize-1})^{zsize-fsize-dpos} || v_{fsize-1+r..r} || 0^{dpos}
        else
            w ← (zs ? (v_h^{zsize-fsize-dpos+1}||~v_h^{fsize-1}) : 0^{zsize-fsize-dpos}||1^{fsize}) || 0^{dpos}
        endif
        z_{zsize-1+k..k} ← w
    endfor
    RegWrite(rd, 128, z)
enddef
```

FIG. 19G-3

Exceptions

Reserved Instruction

Operation codes

| | |
|---|---|
| E.MUL.X | Ensemble multiply extract |
| E.EXTRACT | Ensemble extract |
| E.SCAL.ADD.X | Ensemble scale and extract |

Format

E.op ra=rd,rc,rb ra=eop(rd,rc,rb)

| 31 24 | 23 18 | 17 12 | 11 6 | 5 0 |
|---|---|---|---|---|
| E.op | rd | rc | rb | ra |
| 8 | 6 | 6 | 6 | 6 |

*FIG. 20A*

Ensemble complex multiply extract doublets

This ensemble-multiply-extract instructions (E.MUL.X), when the x bit is set, multiply the low-order 64 bits of each of the rc and rb registers and produce extended (double-size) results.

2040

Ensemble scale add extract doublets

2050

Ensemble complex scale add extract doublets

The ensemble-scale-add-extract instructions (E.SCLADD.X), when the x bit is set, multiply the low-order 64 bits of each of the rd and re registers by the rb register fields and produce extended (double-size) results.

Ensemble merge extract

Ensemble expand extract

2090

Definition

```
def mul(size,h,vs,v,i,ws,w,j) as
    mul ← ((vs&v_{size-1+i})^{h-size} || v_{size-1+i..i}) * ((ws&w_{size-1+j})^{h-size} || w_{size-1+j..j})
enddef

def EnsembleExtract(op,ra,rb,rc,rd) as
    d ← RegRead(rd, 128)
    c ← RegRead(rc, 128)
    b ← RegRead(rb, 128)
    case b_{8..0} of
        0..255:
            sgsize ← 128
        256..383:
            sgsize ← 64
        384..447:
            sgsize ← 32
        448..479:
            sgsize ← 16
        480..495:
            sgsize ← 8
        496..503:
            sgsize ← 4
        504..507:
            sgsize ← 2
        508..511:
            sgsize ← 1
    endcase
    l ← b_{11}
    m ← b_{12}
    n ← b_{13}
    signed ← b_{14}
    x ← b_{15}
    case op of
        E.EXTRACT:
            gsize ← sgsize*2(2-(m or x))
            zsize ← sgsize
            h ← gsize
            as ← signed
            spos ← (b_{8..0}) and (gsize-1)
```

```
    E.SCAL.ADD.X:
        if (sgsize < 8) then
            gsize ← 8
        elseif (sgsize*(n+1) > 32) then
            gsize ← 32/(n+1)
        else
            gsize ← sgsize
        endif
        ds ← cs ← signed
        bs ← signed ^ m
        as ← signed or m or n
        zsize ← gsize*(x+1)
        h ← (2*gsize) + 1 + n
        spos ← (b8..0) and (2*gsize-1)
    E.MUL.X:
        if (sgsize < 8) then
            gsize ← 8
        elseif (sgsize*(n+1)*(x+1) > 128) then
            gsize ← 128/(n+1)/(x+1)
        else
            gsize ← sgsize
        endif
        ds ← signed
        cs ← signed ^ m
        as ← signed or m or n
        zsize ← gsize*(x+1)
        h ← (2*gsize) + n
        spos ← (b8..0) and (2*gsize-1)
endcase
dpos ← (0|| b23..16) and (zsize-1)
r ← spos
sfsize ← (0|| b31..24) and (zsize-1)
tfsize ← (sfsize =0) or ((sfsize+dpos) > zsize) ? zsize-dpos : sfsize
fsize ← (tfsize + spos > h) ? h - spos : tfsize
if (b10..9=Z) and not as then
    rnd ← F
else
    rnd ← b
endif
```

```
for j ← 0 to 128-zsize by zsize
    i ← j*gsize/zsize
    case op of
        E.EXTRACT:
            if m or x then
                p ← dgsize+i-1..i
            else
                p ← (d || c)gsize+i-1..i
            endif
        E.MUL.X:
            if n then
                if (i and gsize) = 0 then
                    p ← mul(gsize,h,ds,d,i,cs,c,i)-
mul(gsize,h,ds,d,i+gsize,cs,c,i+gsize)
                else
                    p ←
mul(gsize,h,ds,d,i,cs,c,i+gsize)+mul(gsize,h,ds,d,i,cs,c,i+gsize)
                endif
            else
                p ← mul(gsize,h,ds,d,i,cs,c,i)
            endif
        E.SCAL.ADD.X:
            if n then
                if (i and gsize) = 0 then
                    p ← mul(gsize,h,ds,d,i,bs,b,64+2*gsize)
                        + mul(gsize,h,cs,c,i,bs,b,64)
                        - mul(gsize,h,ds,d,i+gsize,bs,b,64+3*gsize)
                        - mul(gsize,h,cs,c,i+gsize,bs,b,64+gsize)
                else
                    p ← mul(gsize,h,ds,d,i,bs,b,64+3*gsize)
                        + mul(gsize,h,cs,c,i,bs,b,64+gsize)
                        + mul(gsize,h,ds,d,i+gsize,bs,b,64+2*gsize)
                        + mul(gsize,h,cs,c,i+gsize,bs,b,64)
                endif
            else
                p ← mul(gsize,h,ds,d,i,bs,b,64+gsize) + mul(gsize
                    .,h,cs,c,i,bs,b,64)
            endif
    endcase
```

```
case rnd of
    N:
        s ← 0^(h-r) || ~p_r || p_r^(r-1)
    Z:
        s ← 0^(h-r) || p_(h-1)^r
    F:
        s ← 0^h
    C:
        s ← 0^(h-r) || 1^r
endcase
v ← ((as & p_(h-1)) || p) + (0 || s)
if (v_(h..r+fsize) = (as & v_(r+fsize-1))^(h+1-r-fsize)) or not (l and (op =
            E.EXTRACT)) then
    w ← (as & v_(r+fsize-1))^(zsize-fsize-dpos) || v_(fsize-1+r..r) || 0^dpos
else
    w ← (s ? (v_h || ~v_h^(zsize-dpos-1)) : 1^(zsize-dpos)) || 0^dpos
endif
if m and (op = E.EXTRACT) then
    z_(zsize-1+j..j) ← c_(asize-1+j..dpos+fsize+j) || w_(dpos+fsize-1..dpos) ||
                c_(dpos-1+j..j)
else
    z_(zsize-1+j..j) ← w
endif
endfor
RegWrite(ra, 128, z)
enddef
```

*FIG. 20J-4*

Exceptions

Reserved Instruction

FIG. 20K

Definition

```
def mul(size,h,vs,v,i,ws,w,j) as
    mul ← ((vs&v_{size-1+i})^{h-size} || v_{size-1+i..i}) * ((ws&w_{size-1+j})^{h-size} || w_{size-1+j..j})
enddef

def EnsembleExtract(op,ra,rb,rc,rd) as
    d ← RegRead(rd, 128)
    c ← RegRead(rc, 128)
    b ← RegRead(rb, 128)
    case b_{8..0} of
        0..255:
            sgsize ← 128
        256..383:
            sgsize ← 64
        384..447:
            sgsize ← 32
        448..479:
            sgsize ← 16
        480..495:
            sgsize ← 8
        496..503:
            sgsize ← 4
        504..507:
            sgsize ← 2
        508..511:
            sgsize ← 1
    endcase
    l ← b_11
    m ← b_12
    n ← b_13
    signed ← b_14
    x ← b_15
    case op of
        E.EXTRACT:
            gsize ← sgsize*(2-(m or x))
            zsize ← sgsize
            h ← gsize
            zs ← signed
            spos ← (b_{8..0}) and (gsize-1)
        E.SCAL.ADD.X:
            if (sgsize < 8) or (sgsize*(n+1) > 32) then
                raise ReservedInstruction
            endif
            gsize ← sgsize
```

FIG. 20L-1

```
            ds ← cs ← signed
            bs ← signed ^ m
            zs ← signed or m or n
            zsize ← gsize*(x+1)
            h ← (2*gsize) + 1 + n
            spos ← (b8..0) and (2*gsize-1)
        E.MUL.X:
            if (sgsize < 8) or (sgsize*(n+1)*(x+1) > 128) then
                raise ReservedInstruction
            endif
            gsize ← sgsize
            ds ← signed
            cs ← signed ^ m
            zs ← signed or m or n
            zsize ← gsize*(x+1)
            h ← (2*gsize) + n
            spos ← (b8..0) and ((2*gsize)-1)
endcase
dpos ← (0 || b23..16) and (zsize-1)
r ← spos
sfsize ← (0 || b31..24) and (zsize-1)
tfsize ← (sfsize = 0) or ((sfsize+dpos) > zsize) ? (zsize - dpos) : sfsize
fsize ← ((tfsize + spos) > (h+1)) ? (h + 1 - spos) : tfsize
if (b10..9 = Z) and not zs then
    rnd ← F
else
    rnd ← b10..9
endif
for j ← 0 to 128-zsize by zsize
    i ← j*gsize/zsize
    case op of
        E.EXTRACT:
            if m or x then
                p ← cgsize+i-1..i
            else
                p ← (c || d)gsize+i-1..i
            endif
        E.MUL.X:
            if n then
                if (i and gsize) = 0 then
                    p ← mul(gsize,h,ds,d,i,cs,c,i)-mul(gsize,h,ds,d,i+gsize,cs,c,i+gsize)
                else
                    p ← mul(gsize,h,ds,d,i-gsize,cs,c,i)+mul(gsize,h,ds,d,i,cs,c,i-gsize)
                endif
            else
                p ← mul(gsize,h,ds,d,i,cs,c,i)
            endif
        E.SCAL.ADD.X:
            if n then
```

FIG. 20L-2 if (i and gsize) = 0 then
p ← mul(gsize,h,cs,c,i,bs,b,64+2*gsize)
+ mul(gsize,h,ds,d,i,bs,b,64)
- mul(gsize,h,cs,c,i+gsize,bs,b,64+3*gsize)
- mul(gsize,h,ds,d,i+gsize,bs,b,64+gsize)
else
p ← mul(gsize,h,cs,c,i,bs,b,64+3*gsize)
+ mul(gsize,h,ds,d,i,bs,b,64+gsize)
+ mul(gsize,h,cs,c,i-gsize,bs,b,64+2*gsize)
+ mul(gsize,h,ds,d,i-gsize,bs,b,64)
endif
else
p ← mul(gsize,h,cs,c,i,bs,b,64+gsize) + mul(gsize,h,ds,d,i,bs,b,64)
endif
endcase
case rnd of
N:
$s \leftarrow 0^{h-r} \| p_r \| \sim p_r^{r-1}$
Z:
$s \leftarrow 0^{h-r} \| p_{h-1}^r$
F:
$s \leftarrow 0^h$
C:
$s \leftarrow 0^{h-r} \| 1^r$
endcase
$v \leftarrow ((zs \;\&\; p_{h-1}) \| p) + (0 \| s)$
if $(v_{h..r+fsize} = (zs \;\&\; v_{r+fsize-1})^{h+1-r-fsize})$ or not l then
$w \leftarrow (zs \;\&\; v_{r+fsize-1})^{zsize-fsize-dpos} \| v_{fsize-1+r..r} \| 0^{dpos}$
else
$w \leftarrow (zs\ ?\ (v_h^{zsize-fsize-dpos+1} \| \sim v_h^{fsize-1}) : 0^{zsize-fsize-dpos} \| 1^{fsize}) \| 0^{dpos}$
endif
if m and (op = E.EXTRACT) then
$z_{zsize-1+j..j} \leftarrow d_{zsize-1+j..dpos+fsize+j} \| w_{dpos+fsize-1..dpos} \| d_{dpos-1+j..j}$
else
$z_{zsize-1+j..j} \leftarrow w$
endif
endfor
RegWrite(ra, 128, z)
enddef

Typical dynamic-linked, inter-gateway calling sequence:
caller:

```
caller   AA.DDI          sp@-size     // allocate caller stack frame
         S.I.64.A        lp,sp,off
         S.I.64.A        dp,sp,off
         ...
         L.I.64.A        lp=dp,off    // load lp
         L.I.64.A        dp=dp,off    // load dp
         B.GATE
         L.I.64.A        dp,sp,off
         ...(code using dp)
         L.I.64.A        lp=sp,off    // restore original lp register
         A.ADDI          sp=size      // deallocate caller stack frame
         B               lp           // return
```

callee (non-leaf):

```
calee:   L.I.64.A        dp=dp,off    // load dp with data pointer
         S.I.64.A        sp,dp,off
         L.I.64.A        sp=dp,off    // new stack pointer
         S.I.64.A        lp,sp,off
         S.I.64.A        dp,sp,off
         ...(using dp)
         L.I.64.A        dp,sp,off
         ...(code using dp)
         L.I.64.A        lp=sp,off    // restore original lp register
         L.I.64.A        sp=sp,off    // restore original sp register
         B.DOWN          lp
```

callee (leak, no stack):

```
callee:  ...(using dp)
         B.DOWN          lp
```

Operation codes

| | |
|---|---|
| B.GATE | Branch gateway |

Equivalencies

| | | |
|---|---|---|
| B.GATE | ← | B.GATE 0 |

Format

B.GATE rb bgate(rb)

| 31 24 | 23 18 | 17 12 | 11 6 | 5 0 |
|---|---|---|---|---|
| B.MINOR | 0 | 1 | rb | B.GATE |
| 8 | 6 | 6 | 6 | 6 |

Definition

```
def BranchGateway(rd,rc,rb) as
    c ← RegRead(rc, 64)
    b ← RegRead(rb, 64)
    if (rd ≠ 0) or (rc ≠ 1) then
        raise ReservedInstruction
    endif
    if c2..0 ≠ 0 then
        raise AccessDisallowedByVirtualAddress
    endif
    d ← ProgramCounter63..2+1 || PrivilegeLevel
    if PrivilegeLevel < b1..0 then
        m ← LoadMemoryG(c,c,64,L)
        if b ≠ m then
            raise GatewayDisallowed
        endif
        PrivilegeLevel ← b1..0
    endif
    ProgramCounter ← b63..2 || 0^2
    RegWrite(rd, 64, d)
    raise TakenBranch
enddef
```

Exceptions

Reserved Instruction
Gateway disallowed
Access disallowed by virtual address
Access disallowed by tag
Access disallowed by global TB
Access disallowed by local TB
Access detail required by tag
Access detail required by local TB
Access detail required by global TB
Local TB miss
Global TB miss

FIG. 21F

Definition

```
def BranchGateway(rd,rc,rb) as
        c ← RegRead(rc, 64)
        b ← RegRead(rb, 64)
        if (rd ≠ 0) or (rc ≠ 1) then
                raise ReservedInstruction
        endif
        if c2..0 ≠ 0 then
                raise OperandBoundary
        endif
        z ← ProgramCounter63..2+1 || PrivilegeLevel
        if PrivilegeLevel < b1..0 then
                m ← LoadMemoryG(c,c,64,L)
                if b ≠ m then
                        raise GatewayDisallowed
                endif
                PrivilegeLevel ← b1..0
        endif
        ProgramCounter ← b63..2 || 0^2
        RegWrite(rd, 64, z)
        raise TakenBranch
enddef
```

FIG. 21G

Exceptions

Reserved Instruction
Gateway disallowed
Operand Boundary
Access disallowed by tag
Access disallowed by global TB
Access disallowed by local TB
Access detail required by tag
Access detail required by local TB
Access detail required by global TB
Local TB miss
Global TB miss

Operation codes

| | |
|---|---|
| E.SCAL.ADD.F.16 | Ensemble scale add floating-point half |
| E.SCAL.ADD.F.32 | Ensemble scale add floating-point single |
| E.SCAL.ADD.F.64 | Ensemble scale add floating-point double |

Selection

| class | op | prec |
|---|---|---|
| scale add | E.SCAL.ADD.F | 16 32 64 |

Format

E.op.prec ra=rd,rc,rb ra=eopprec(rd,rc,rb)

| 31 24 | 23 18 | 17 12 | 11 6 | 5 0 |
|---|---|---|---|---|
| E.op.prec | rd | rc | rb | ra |
| 8 | 6 | 6 | 6 | 6 |

Definition

```
def EnsembleFloatingPointTernary(op,prec,rd,rc,rb,ra) as
	d ← RegRead(rd, 128)
	c ← RegRead(rc, 128)
	b ← RegRead(rb, 128)
	for i ← 0 to 128-prec by prec
		di ← F(prec,d[i+prec-1..i])
		ci ← F(prec,c[i+prec-1..i])
		zi ← fadd(fmul(di, F(prec,b[prec-1..0])), fmul(ci, F(prec,b[2*prec-1..prec])))
		z[i+prec-1..i] ← PackF(prec, zi, none)
	endfor
	RegWrite(ra, 128, z)
enddef
```

FIG. 22B

Exceptions none

Figure 23A:
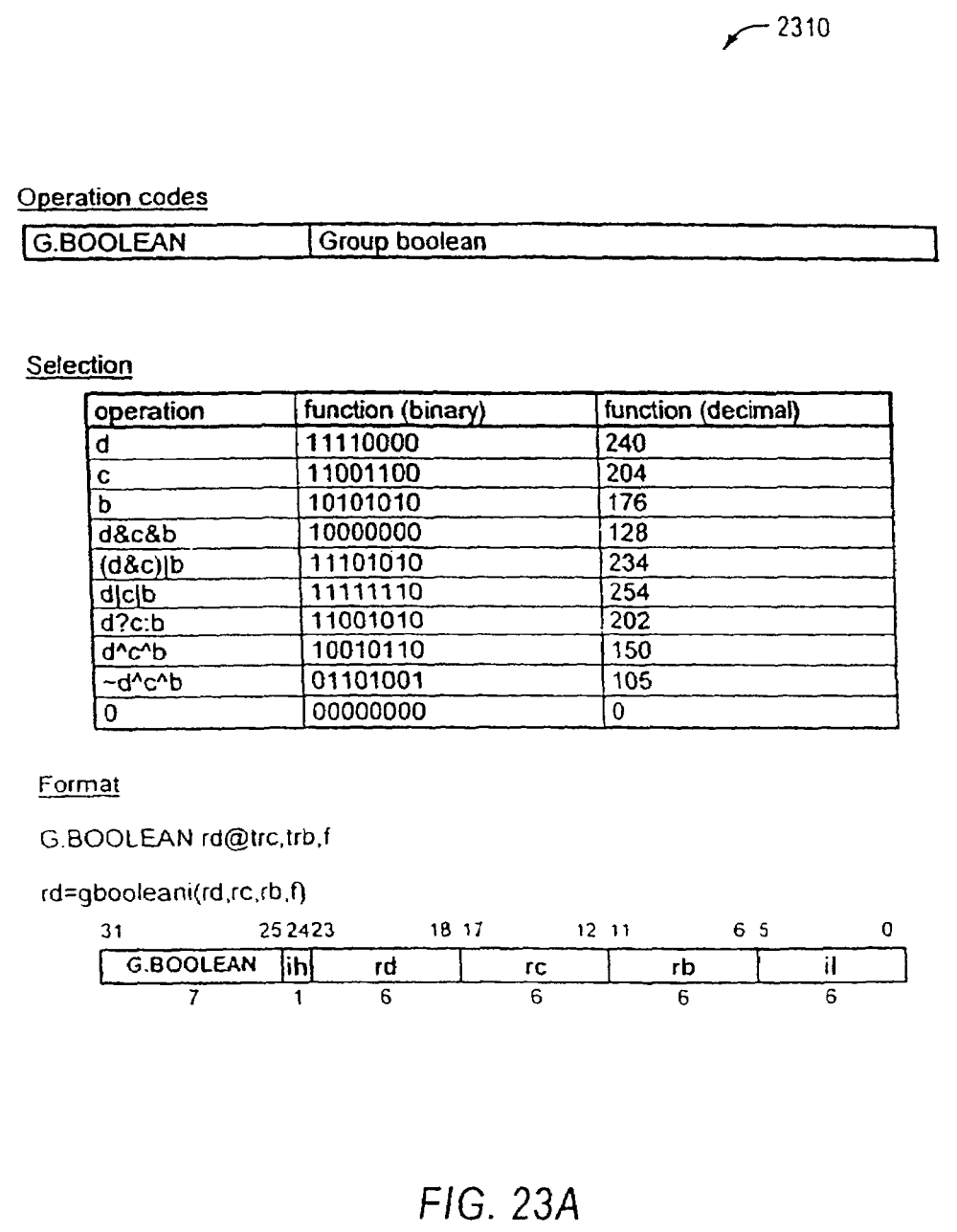

Operation codes

| | |
|---|---|
| G.BOOLEAN | Group boolean |

Selection

| operation | function (binary) | function (decimal) |
|---|---|---|
| d | 11110000 | 240 |
| c | 11001100 | 204 |
| b | 10101010 | 176 |
| d&c&b | 10000000 | 128 |
| (d&c)\|b | 11101010 | 234 |
| d\|c\|b | 11111110 | 254 |
| d?c:b | 11001010 | 202 |
| d^c^b | 10010110 | 150 |
| ~d^c^b | 01101001 | 105 |
| 0 | 00000000 | 0 |

Format

G.BOOLEAN rd@trc,trb,f rd=gbooleani(rd,rc,rb,f)

| 31 25 | 24 | 23 18 | 17 12 | 11 6 | 5 0 |
|---|---|---|---|---|---|
| G.BOOLEAN | ih | rd | rc | rb | il |
| 7 | 1 | 6 | 6 | 6 | 6 |

Operation codes

| | |
|---|---|
| G.BOOLEAN | Group boolean |

Equivalencies

| | |
|---|---|
| *G.AAAND* | Group three-way and bits |
| *G.AAA.01* | Group add add add bits |
| *G.AAS.001* | Group add add subtract bits |
| *G.ADD.01* | Group add bits |
| *G.AND* | Group and |
| *G.ANDN* | Group and not |
| *G.COPY* | Group copy |
| *G.NAAAND* | Group three-way nand |
| *G.NAND* | Group nand |
| *G.NOOOR* | Group three-way nor |
| *G.NOR* | Group nor |
| *G.NOT* | Group not |
| *G.NXXXOR* | Group three-way exclusive-nor |
| *G.OOOR* | Group three-way or |
| *G.OR* | Group or |
| *G.ORN* | Group or not |
| *G.SAA.001* | Group subtract add add bits |
| *G.SAS.001* | Group subtract add subtract bits |
| *G.SET* | Group set |
| *G.SET.AND.E.001* | Group set and equal zero bits |
| *G.SET.AND.NE.001* | Group set and not equal zero bits |
| *G.SET.E.001* | Group set equal bits |
| *G.SET.G.01* | Group set greater signed bits |
| *G.SET.G.U.01* | Group set greater unsigned bits |
| *G.SET.G.Z.01* | Group set greater zero signed bits |
| *G.SET.GE.01* | Group set greater equal signed bits |
| *G.SET.GE.Z.01* | Group set greater equal zero signed bits |
| *G.SET.L.01* | Group set less signed bits |
| *G.SET.L.Z.01* | Group set less zero signed bits |
| *G.SET.LE.01* | Group set less equal signed bits |
| *G.SET.LE.U.01* | Group set less equal unsigned bits |

| | |
|---|---|
| *G.SET.LE.Z.01* | Group set less equal zero signed bits |
| *G.SET.NE.001* | Group set not equal bits |
| *G.SET.GE.U.01* | Group set greater equal unsigned bits |
| *G.SET.L.U.01* | Group set less unsigned bits |
| *G.SSA.001* | Group subtract subtract add bits |
| *G.SSS.001* | Group subtract subtract subtract bits |
| *G.SUB.01* | Group subtract bits |
| *G.XNOR* | Group exclusive-nor |
| *G.XOR* | Group exclusive-or |
| *G.XXXOR* | Group three-way exclusive-or |
| *G.ZERO* | Group zero |

| | | |
|---|---|---|
| *G.AAAND rd@rc,rb* | ← | G.BOOLEAN rd@rc,rb,0b10000000 |
| *G.AAA.1 rd@rc,rb* | → | G.XXXOR rd@rc,rb |
| *G.AAS.1 rd@rc,rb* | → | G.XXXOR rd@rc,rb |
| *G.ADD.01 rd=rc,rb* | → | G.XOR rd=rc,rb |
| *G.AND rd=rc,rb* | ← | G.BOOLEAN rd@rc,rb,0b10001000 |
| *G.ANDN rd=rc,rb* | ← | G.BOOLEAN rd@rc,rb,0b01000100 |
| *G.BOOLEAN rd@rb,rc,i* | → | G.BOOLEAN rd@rc,rb,$i_7i_5i_6i_4i_3i_1i_2i_0$ |
| *G.COPY rd=rc* | ← | G.BOOLEAN rd@rc,rc,0b10001000 |
| *G.NAAAND. rd@rc,rb* | ← | G.BOOLEAN rd@rc,rb,0b01111111 |
| *G.NAND rd=rc,rb* | ← | G.BOOLEAN rd@rc,rb,0b01110111 |
| *G.NOOOR rd@rc,rb* | ← | G.BOOLEAN rd@rc,rb,0b00000001 |
| *G.NOR rd=rc,rb* | ← | G.BOOLEAN rd@rc,rb,0b00010001 |
| *G.NOT rd=rc* | ← | G.BOOLEAN rd@rc,rc,0b00010001 |
| *G.NXXX rd@rc,rb* | ← | G.BOOLEAN rd@rc,rb,0b01101001 |
| *G.OOOR rd@rc,rb* | ← | G.BOOLEAN rd@rc,rb,0b11111110 |
| *G.OR rd=rc,rb* | ← | G.BOOLEAN rd@rc,rb,0b11101110 |
| *G.ORN rd=rc,rb* | ← | G.BOOLEAN rd@rc,rb,0b11011101 |
| *G.SAA.1 rd@rc,rb* | → | G.XXXOR rd@rc,rb |
| *G.SAS.1 rd@rc,rb* | → | G.XXXOR rd@rc,rb |
| *G.SET rd* | ← | G.BOOLEAN rd@rd,rd,0b10000001 |
| *G.SET.AND.E.001 rd=rb,rc* | → | G.NAND rd=rc,rb |
| *G.SET.AND.NE.001 rd=rb,rc* | → | G.AND rd=rc,rb |
| *G.SET.E.001 rd=rb,rc* | → | G.XNOR rd=rc,rb |
| *G.SET.G.01 rd=rb,rc* | → | G.ANDN rd=rc,rb |
| *G.SET.G.U.01 rd=rb,rc* | → | G.ANDN rd=rb,rc |

| | | |
|---|---|---|
| *G.SET.G.Z.01 rd=rc* | → | G.ZERO rd |
| *G.SET.GE.01 rd=rb,rc* | → | G.ORN rd=rc,rb |
| *G.SET.GE.Z.01 rd=rc* | → | G.NOT rd=rc |
| *G.SET.L.01 rd=rb,rc* | → | G.ANDN rd=rb,rc |
| *G.SET.L.Z.01 rd=rc* | → | G.COPY rd=rc |
| *G.SET.LE.01 rd=rb,rc* | → | G.ORN rd=rb,rc |
| *G.SET.LE.U.01 rd=rb,rc* | → | G.ORN rd=rc,rb |
| *G.SET.LE.Z.01 rd=rc* | → | G.SET rd |
| *G.SET.NE.001 rd=rb,rc* | → | G.XOR rd=rc,rb |
| *G.SET.GE.U.01 rd=rb,rc* | → | G.ORN rd=rb,rc |
| *G.SET.L.U.01 rd=rb,rc* | → | G.ANDN rd=rc,rb |
| *G.SSA.1 rd@rc,rb* | → | G.XXXOR rd@rc,rb |
| *G.SSS.1 rd@rc,rb* | → | G.XXXOR rd@rc,rb |
| *G.SUB.01 rd=rc,rb* | → | G.XOR rd=rc,rb |
| *G.XNOR rd=rc,rb* | ← | G.BOOLEAN rd@rc,rb,0b10011001 |
| *G.XOR rd=rc,rb* | ← | G.BOOLEAN rd@rc,rb,0b01100110 |
| *G.XXXOR rd@rc,rb* | ← | G.BOOLEAN rd@rc,rb,0b10010110 |
| *G.ZERO rd* | ← | G.BOOLEAN rd@rd,rd,0b00000000 |

Selection

| operation | function (binary) | function (decimal) |
|---|---|---|
| d | 11110000 | 240 |
| c | 11001100 | 204 |
| b | 10101010 | 176 |
| d&c&b | 10000000 | 128 |
| (d&c)\|b | 11101010 | 234 |
| d\|c\|b | 11111110 | 254 |
| d?c:b | 11001010 | 202 |
| d^c^b | 10010110 | 150 |
| ~d^c^b | 01101001 | 105 |
| 0 | 00000000 | 0 |

Format

G.BOOLEAN rd@trc,trb,f rd=gbooleani(rd,rc,rb,f)

| 31 ... 25 | 24 | 23 ... 18 | 17 ... 12 | 11 ... 6 | 5 ... 0 |
|---|---|---|---|---|---|
| G.BOOLEAN | ih | rd | rc | rb | il |
| 7 | 1 | 6 | 6 | 6 | 6 |

```
if f6=f5 then
    if f2=f1 then
        if f2 then
            rc ← max(trc,trb)
            rb ← min(trc,trb)
        else
            rc ← min(trc,trb)
            rb ← max(trc,trb)
        endif
        ih ← 0
        il ← 0 || f6 || f7 || f4 || f3 || f0
    else
        if f2 then
            rc ← trb
            rb ← trc
        else
            rc ← trc
            rb ← trb
        endif
        ih ← 0
        il ← 1 || f6 || f7 || f4 || f3 || f0
    endif
else
    ih ← 1
    if f6 then
        rc ← trb
        rb ← trc
        il ← f1 || f2 || f7 || f4 || f3 || f0
    else
        rc ← trc
        rb ← trb
        il ← f2 || f1 || f7 || f4 || f3 || f0
    endif
endif
```

Definition

```
def GroupBoolean (ih,rd,rc,rb,il)
    d ← RegRead(rd, 128)
    c ← RegRead(rc, 128)
    b ← RegRead(rb, 128)
    if ih=0 then
        if il5=0 then
            f ← il3 || il4 || il4 || il2 || il1 || (rc>rb)^2 || il0
        else
            f ← il3 || il4 || il4 || il2 || il1 || 0 || 1 || il0
        endif
    else
        f ← il3 || 0 || 1 || il2 || il1 || il5 || il4 || il0
    endif
    for i ← 0 to 127 by size
        ai ← f(di||ci||bi)
    endfor
    RegWrite(rd, 128, a)
enddef
```

FIG. 23C

Definition

```
def GroupBoolean (ih,rd,rc,rb,il)
    d ← RegRead(rd, 128)
    c ← RegRead(rc, 128)
    b ← RegRead(rb, 128)
    if ih=0 then
        if il5=0 then
            f ← il3 || il4 || il4 || il2 || il1 || (rc>rb)^2 || il0
        else
            f ← il3 || il4 || il4 || il2 || il1 || 0 || 1 || il0
        endif
    else
        f ← il3 || 0 || 1 || il2 || il1 || il5 || il4 || il0
    endif
    for i ← 0 to 127 by size
        zi ← f(di||ci||bi)
    endfor
    RegWrite(rd, 128, z)
enddef
```

FIG. 23D

Exceptions none

Operation codes

| | |
|---|---|
| B.HINT | Branch Hint |

Format

B.HINT badd,count,rd bhint(badd,count,rd)

| 31 24 | 23 18 | 17 12 | 11 6 | 5 0 |
|---|---|---|---|---|
| B.MINOR | rd | count | simm | B.HINT |
| 8 | 6 | 6 | 6 | 6 | simm ← badd-pc-4

Definition

```
def BranchHint(rd,count,simm) as
    d ← RegRead(rd, 64)
    if (d1..0) ≠ 0 then
        raise OperandBoundary
    endif
    FetchHint(ProgramCounter +4 + (0 || simm || 0^2), d63..2 || 0^2, count)
enddef
```

Exceptions

Operand Boundary

Operation codes

| | |
|---|---|
| E.SINK.F.16 | Ensemble convert floating-point doublets from half nearest default |
| E.SINK.F.16C | Ensemble convert floating-point doublets from half ceiling |
| E.SINK.F.16.C.D | Ensemble convert floating-point doublets from half ceiling default |
| E.SINK.F.16.F | Ensemble convert floating-point doublets from half floor |
| E.SINK.F.16.F.D | Ensemble convert floating-point doublets from half floor default |
| E.SINK.F.16.N | Ensemble convert floating-point doublets from half nearest |
| E.SINK.F.16.X | Ensemble convert floating-point doublets from half exact |
| E.SINK.F.16.Z | Ensemble convert floating-point doublets from half zero |
| E.SINK.F.16.Z.D | Ensemble convert floating-point doublets from half zero default |
| E.SINK.F.32 | Ensemble convert floating-point quadlets from single nearest default |
| E.SINK.F.32.C | Ensemble convert floating-point quadlets from single ceiling |
| E.SINK.F.32.C.D | Ensemble convert floating-point quadlets from single ceiling default |
| E.SINK.F.32.F | Ensemble convert floating-point quadlets from single floor |
| E.SINK.F.32.F.D | Ensemble convert floating-point quadlets from single floor default |
| E.SINK.F.32.N | Ensemble convert floating-point quadlets from single nearest |
| E.SINK.F.32.X | Ensemble convert floating-point quadlets from single exact |
| E.SINK.F.32.Z | Ensemble convert floating-point quadlets from single zero |
| E.SINK.F.32.Z.D | Ensemble convert floating-point quadlets from single zero default |
| E.SINK.F.64 | Ensemble convert floating-point octlets from double nearest default |
| E.SINK.F.64.C | Ensemble convert floating-point octlets from double ceiling |
| E.SINK.F.64.C.D | Ensemble convert floating-point octlets from double ceiling default |
| E.SINK.F.64.F | Ensemble convert floating-point octlets from double floor |
| E.SINK.F.64.F.D | Ensemble convert floating-point octlets from double floor default |
| E.SINK.F.64.N | Ensemble convert floating-point octlets from double nearest |
| E.SINK.F.64.X | Ensemble convert floating-point octlets from double exact |
| E.SINK.F.64.Z | Ensemble convert floating-point octlets from double zero |
| E.SINK.F.64.Z.D | Ensemble convert floating-point octlets from double zero default |
| E.SINK.F.128 | Ensemble convert floating-point hexlet from quad nearest default |
| E.SINK.F.128.C | Ensemble convert floating-point hexlet from quad ceiling |
| E.SINK.F.128.C.D | Ensemble convert floating-point hexlet from quad ceiling default |
| E.SINK.F.128.F | Ensemble convert floating-point hexlet from quad floor |
| E.SINK.F.128.F.D | Ensemble convert floating-point hexlet from quad floor default |
| E.SINK.F.128.N | Ensemble convert floating-point hexlet from quad nearest |
| E.SINK.F.128.X | Ensemble convert floating-point hexlet from quad exact |
| E.SINK.F.128.Z | Ensemble convert floating-point hexlet from quad zero |
| E.SINK.F.128.Z.D | Ensemble convert floating-point hexlet from quad zero default |

Figure 25A-2:
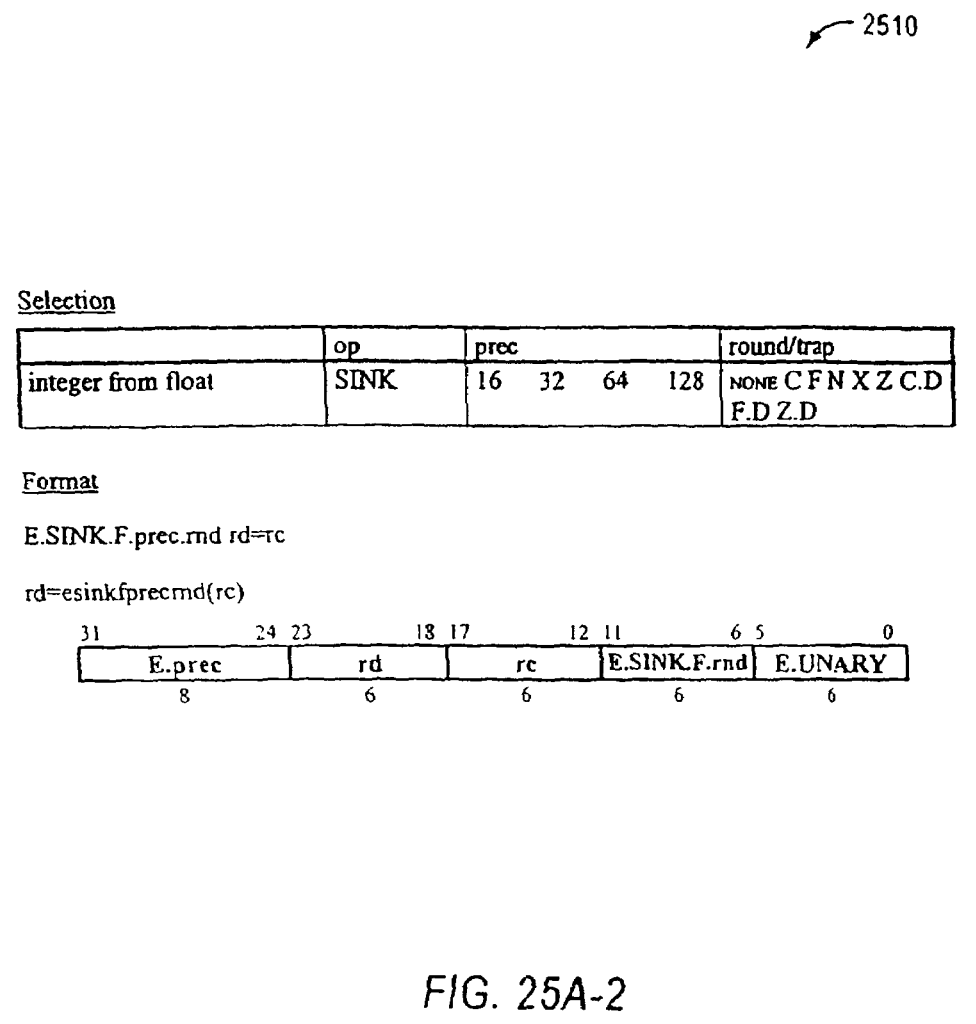

Selection

| | op | prec | round/trap |
|---|---|---|---|
| integer from float | SINK | 16 32 64 128 | NONE C F N X Z C.D F.D Z.D |

Format

E.SINK.F.prec.rnd rd=rc rd=esinkfprecrnd(rc)

| 31 24 | 23 18 | 17 12 | 11 6 | 5 0 |
|---|---|---|---|---|
| E.prec | rd | rc | E.SINK.F.rnd | E.UNARY |
| 8 | 6 | 6 | 6 | 6 |

Definition

```
def EnsemleSinkFloatingPoint(prec,round,rd,rc) as
    c ← RegRead(rc, 128)
    for i ← 0 to 128-prec by prec
        ci ← F(prec,c_{i+prec-1..i})
        a_{i+prec-1..i} ← fsinkr(prec, ci, round)
    endfor
    RegWrite[rd, 128, a]
enddef
```

Exceptions

Floating-point arithmetic

```
Definition
def eb ← ebits(prec) as
    case pref of
        16:
            eb ← 5
        32:
            eb ← 8
        64:
            eb ← 11
        128:
            eb ← 15
    endcase
enddef

def eb ← ebias(prec)as
    eb ← 0|| 1^(ebits(prec)-1)
enddef

def fb ← fbits(prec) as
    fb ← prec - 1 - eb
enddef

def a ← F(prec, ai) as
    a.s ← ai_(prec-1)
    ae ← ai_(prec-2..fbits(prec))
    af ← ai_(fbits(prec)-1..0)
    if ae = 1^(ebits(prec)) then
        if af = 0 then
            a.t ← INFINITY
        elseif af_(fbits(prec)-1) then
            a.t ← SNaN
            a.e ← -fbits(prec)
            a.f ← 1 || af_(fbits(prec)-1..0)
        else
            a.t ← QNaN
            a.e ← -fbits(prec)
            a.f ← af
        endif
    elseif ae = 0 then
        if af = 0 then
            a.t ← ZERO
```

```
        else
              a.t ← NORM
              a.e ← 1-ebias(pec)-fbits(prec)
              a.f ← 0|| af
        endif
    else
        a.t ← NORM
        a.e ← ae-ebias(prec)-fbits(prec)
        a.f ← 1|| af
    endif
enddef def a ← DEFAULTQNAN as
    a.s ← 0
    a.t ← QNAN
    a.e ← -1
    a.f ← 1
endder def a ← DEFAULTSNAN as
    a.s ← 0
    a.t ← SNAN
    a.e ← -1
    a.f ← 1
enddef
```

```
def fadd(a,b) as faddr(a,b,N) endder

def c ← faddr(a,b,round) as
    if a.t=NORM and b.t=NORM then
        // d,e are a,b with exponent aligned and fraction adjusted
        if a.e > b.e then
            d ← a
            e.t ← b.t
            e.s ← b.s
            e.e ← a.e
            e.f ← b.f || 0^(a.e-b.e)
        else if a.e < b.e then
            d.t ← a.t
            d.s ← a.s
            d.e ← b.e
            d.f ← a.f || 0^(b.e-a.e)
            e ← b
        endif
        c.t ← d.t
        c.e ← d.e
        if d.s = e.s then
            c.s ← d.s
            c.f ← d.f + e.f
        elseif d.f > e.f then
            c.s ← d.s
            c.f ← d.f - e.f
        elseif d.f < e.f then
            c.s ← e.s
            c.f ← e.f - d.f
        else
            c.s ← r=F
            c.t ← ZERO
        endif
```

```
    // priority is given to be operand for NaN propagation
    elseif (b.t=SNAN) or (b.t=QNAN) then
        c ← b
    elseif (a.t=SNAN) or (a.t=QNAN) then
        c ← a
    elseif a.t=ZERO and b.t=ZERO then
        c.t ← ZERO
        c.s ← (a.s and b.s) or (round=F and (a.s or b.s))
    // NULL values are like zero, but do not combine with ZERO to alter sign
    elseif a.t=ZERO or a.t=NULL then
        c ← b
    elseif b.t=ZERO or b.t=NULL then
        c ← a
    elseif a.t=INFINITY and b.t=INFINITY then
        if a.s ≠ b.s then
            c ← DEFAULTSNAN // Invalid
        else
            c ← a
        endif
    elseif a.t=INFINITY then
        c ← a
    elseif b.t=INFINITY then
        c ← b
    else
        assert FALSE // should have covered all the cases above
    endif
enddef

def b ← fneg(a) as
    b.s ← ~a.s
    b.t ← a.t
    b.e ← a.e
    b.f ← a.f
enddef

def fsub(a,b) as fsubr(a,b,N) enddef

def fsubr(a,b,round) as faddr(a,fneg(b),round) enddef

def frsub(a,b) as frsubr(a,b,N) enddef

def frsubr(a,b,round) as faddr(fneg(a),b,round) enddef
```

```
def c ← fcom(a,b) as
    if (a.t-SNAN) or (a.t=QNAN) or (b.t=SNAN) or (b.t=QNAN) then
        c ← U
    elseif a.t=INFINITY and b.t=INFINITY then
        if a.s ≠ b.s then
            c ← (a.s=0) ? G: L
        else
            c ← E
        endif
    elseif a.t=INFINITY then
        c ← (a.s=0) ? G: L
    elseif b.t=INFINITY then
        c ← (b.s=0) ? L
    elseif a.t=NORM and b.t=NORM then
        if a.s ≠ b.s then
            c ← (a.s=0) ? G: L
        else
            if a.e > b.e then
                af ← a.f
                bf ← b.f||0^(a.e-b.e)
            else
                af ← a.f||0^(b.e-a.e)
                bf ← b.f
            endif
            if af = bf then
                c ← E
            else
                c ← ((a.s=0) ^ (af > bf)) ? G : L
            endif
        endif
    elseif a.t=NORM then
        c ← (a.s=0) ? G: L
    elseif b.t=NORM then
        c ← (b.s=0) ? G: L
    elseif a.t=ZERO and b.t=ZERO then
        c ← E
    else
        assert FALSE // should have covered at the cases above
    endif
enddef
```

```
def c ← fmul(a,b) as
    if a.t=NORM and b.t=NORM then
        c.s ← a.s ^ b.s
        c.t ← NORM
        c.e ← a.e + b.e
        c.f ← a.f * b.f
    // priority is given to b operand for NaN propagation
    elseif (b.t=SNAN) or (b.t=QNAN) then
        c.s ← a.s ^ b.s
        c.t ← b.t
        c.e ← b.e
        c.f ← b.f
    elseif (a.t=SNAN) or (a.t=QNAN) then
        c.s ← a.s ^ b.s
        c.t ← a.t
        c.e ← a.e
        c.f ← a.f
    elseif a.t=ZERO and b.t=INFINITY then
        c ← DEFAULTSNAN // Invalid
    elseif a.t=INFINITY and b.t=ZERO then
        c ← DEFAULTSNAN // Invalid
    elseif a.t=ZERO or b.t=ZERO then
        c.s ← a.s ^ b.s
        c.t ← ZERO
    else
        assert FALSE // should have covered al the cases above
    endif
enddef
```

```
def c    fdivr(a,b) as
    if a.t=NORM and b.t=NORM then
        c.s ← a.s ^ b.s
        c.t ← NORM
        c.e ← a.e - b.e + 256
        c.f ← (a.f    0    ) / b.f
    // priority is given to b operand for NaN propagation
    elseif (b.t=SNAN) or (b.t=QNAN) then
        c.s ← a.s ^ b.s
        c.t ← b.t
        c.e ← b.e
        c.f ← b.f
    elseif (a.t=SNAN) or (a.t=QNAN) then
        c.s ← a.s ^ b.s
        c.t ← a.t
        c.e ← a.e
        c.f ← a.f
    elseif a.t=ZERO and b.t=INFINITY then
        c ← DEFAULTSNAN // Invalid
    elseif a.t=INFINITY and b.t=INFINITY then
        c ← DEFAULTSNAN // Invalid
    elseif a.t=ZERO then
        c.s ← a.s ^ b.s
        c.t ← ZERO
    elseif a.t=INFINITY then
        c.s ← a.s ^ b.s
        c.t ← INFINITY
    else
        assert FALSE // should have covered al the cases above
    endif
enddef

def msb ← findmsb(a) as
    MAXF ← 2^18 // Largest possible f value after matrix multiply
    for j ← 0 to MAXF
        if a_{MAXF-1..j} = (0^{MAXF-1-j} || 1) then
            msb ← j
        endif
    endfor
enddef
```

```
Def ai ← PackF(prec,a,round) as
    case a.t of
        NORM:
            msb ← findmsb(a.f)
            m ← msb-1-fbits(prec) //1sb for normal
            rdn ← -ebias(prec)-a.e-1-fbits(prec) // 1sb if a denormal
            rb ← (m > rdn) ? rn : rdn
            if rb < 0 then
                aifr ← a.f_{msb-1..0} || 0^{-rb}
                eadj ← 0
            else
                case round of
                    C:
                        s ← 0^{msb-rb} || (~a.s)^{rb}
                    F:
                        s ← 0^{msb-rb} || (a.s)^{rb}
                    N, NONE:
                        s ← 0^{msb-rb} || ~a.f_{rb} || a.f_{rb}^{rb-1}
                    X:
                        if a.f_{rb-1..0} ≠ 0 then
                            raise FloatingPointArithmetic // Inexact
                        endif
                        s ← 0
                    Z:
                        s ← 0
                endcase
                v ← (0 || a.f_{msb..0}) + (0 || s)
                if v_{msb}=1 then
                    aifr ← v_{msb-1..rb}
                    eadj ← 0
                else
                    aifr ← 0^{fbits(prec)}
                    eadj ← 1
                endif
            endif
            aien ← a.e + msb - 1 + eadj + ebias(prec)
            if aien ≤ 0 then
                if round = NONE then
                    ai ← a.s || 0^{ebits(prec)} || aifr
                else
                    raise FloatingPointArithmetic //Underflow
```

```
            endif
        elseif aien ≥ 1^ebits(prec) then
            if round = NONE then
                //default: round-to-nearest overflow handling
                ai ← a.s || 1^ebits(prec) || 0^fbits(prec)
            else
                raise FloatingPointArithmetic // Overflow
            endif
        else
            ai ← a.s || aien_ebits(prec)-1..0 || aifr
        endif

        SNAN:
            if round ≠ NONE then
                raise FloatingPointArithmetic //Invalid
            endif
            if -a.e < fbits(prec) then
                ai ← a.s || 1^ebits(prec) || a.f_-a.e-1..0 || 0^fbits(prec)+a.e
            else
                lsb ← a.f_-a.e-1-fbits(prec)+1..0 ≠ 0
                ai ← a.s || 1^ebits(prec) || a.f_-a.e-1..-a.e-1-fbits(prec)+2 || lsb
            endif
        QNAN:
            if -a.e < fbits(prec) then
                ai ← a.s || 1^ebits(prec) || a.f_-a.e-1..0 || 0^fbits(prec)+a.e
            else
                lsb ← a.f_-a.e-1-fbits(prec)+1..0 ≠ 0
                ai ← a.s || 1^ebits(prec) || a.f_-a.e-1..-a.e-1-fbits(prec)+2 || lsb
            endif
        ZERO:
            ai ← a.s || 0^ebits(prec) || 0^fbits(prec)
        INFINITY:
            ai ← a.s || 1^ebits(prec) || 0^fbits(prec)
    endcase
defdef
```

```
Def ai ← fsinkr(prec, a, round) as
    case a.t of
        NORM:
            msb ← findmsb(a.f)
            rb ← -a.e
            if rb ≤ 0 then
                aifr ← a.f_msb..0 || 0^-rb
                aims ← msb - rb
            else
                case round of
                    C,C.D:
                        s ← 0^msb-rb || (~ai.s)^rb
                    F,F.D:
                        s ← 0^msb-rb || (ai.s)^rb
                    N, NONE:
                        s ← 0^msb-rb || ~ai.f_rb || ai.f_rb^rb-1
                    X:
                        if ai.f_rb-1..0 ≠ 0 then
                            raise FloatingPointArithmetic // Inexact
                        endif
                        s ← 0
                    Z, Z.D:
                        s ← 0
                endcase
                v ← (0 || a.f_msb..0) + (0 || s)
                if v_msb=1 then
                    aims ← msb + 1 - rb
                else
                    aims ← msb - rb
                endif
                aifr ← v_aims..rb
            endif
            if aims > prec then
                case round of
                    C.D, F.D, NONE, Z.D:
                        ai ← a.s || (~as)^prec-1
                    C,F,N,X,Z:
                        raise FloatingPointArithmetic // Overflow
                endcase
```

```
                elseif a.s = 0 then
                        ai ← aifr
                else
                        ai ← -aifr
                endif
        ZERO:
                ai ← 0^prec
        SNAN, QNAN:
                case round of
                        C.D, F.D, NONE, Z.D:
                                ai ← 0^prec
                        C, F, N, X, Z:
                                raise FloatingPoint Arithmetic // Invalid

                endcase
        INFINITY:
                case round of
                        C.D, F.D, NONE, Z.D:
                                ai ← a.s || (~as)^prec-1
                        C, F, N, X, Z:
                                raise FloatingPointArithmetic // Invalid
                endcase
    endcase
enddef


def c     frecrest(a) as
    b.s ← 0
    b.t ← NORM
    b.e ← 0
    b.f ← 1
    c ← fest(fdiv(b,a))
enddef

def c ← frsqrest(a) as
    b.s ← 0
    b.t ← NORM
    b.e ← 0
    b.f ← 1
    c ← fest(fsqr(fdiv(b,a)))
enddef
```

```
def c ← fest(a) as
    if (a.t=NORM) then
        msb ← findmsb(a.f)
        a.e ← a.e + msb - 13
        a.f ← a.f_msb..msb-12 || 1
    else
        c ← a
    endif
enddef

def ← fsqr(a) as
    if (a.t=NORM) and (a.s=0) then
        c.s ← 0
        c.t ← NORM
        if (a.e_0 =1) then
            c.e ← (a.e-127) / 2
            c.f ← sqr(a.f || 0^127 )
        else
            c.e ← (a.e-128) / 2
            c.f ← sqr(a.f || 0^128 )
        endif
    elseif (a.t=SNAN) or (a.t-QNAN) or a.t=ZERO or ((a.t=INFINITY) and
            (a.s=0)) then
        c ← a
    elseir ((a.t=NORM) or (a.t=INFINITY)) and (a.s=1) then
        c ← DEFAULTSNAN // Invalid
    else
        assert FALSE // should have covered a1 the cases above
    endif
enddef
```

*FIG. 25D-12*

Operation codes

| | |
|---|---|
| G.ADD.8 | Group add bytes |
| G.ADD.16 | Group add doublets |
| G.ADD.32 | Group add quadlets |
| G.ADD.64 | Group add octlets |
| G.ADD.128 | Group add hexlet |
| G.ADD.L.8 | Group add limit signed bytes |
| G.ADD.L.16 | Group add limit signed doublets |
| G.ADD.L.32 | Group add limit signed quadlets |
| G.ADD.L.64 | Group add limit signed octlets |
| G.ADD.L.128 | Group add limit signed hexlet |
| G.ADD.L.U.8 | Group add limit unsigned bytes |
| G.ADD.L.U.16 | Group add limit unsigned doublets |
| G.ADD.L.U.32 | Group add limit unsigned quadlets |
| G.ADD.L.U.64 | Group add limit unsigned octlets |
| G.ADD.L.U.128 | Group add limit unsigned hexlet |
| G.ADD.8.O | Group add signed bytes check overflow |
| G.ADD.16.O | Group add signed doublets check overflow |
| G.ADD.32.O | Group add signed quadlets check overflow |
| G.ADD.64.O | Group add signed octlets check overflow |
| G.ADD.128.O | Group add signed hexlet check overflow |
| G.ADD.U.8.O | Group add unsigned bytes check overflow |
| G.ADD.U.16.O | Group add unsigned doublets check overflow |
| G.ADD.U.32.O | Group add unsigned quadlets check overflow |
| G.ADD.U.64.O | Group add unsigned octlets check overflow |
| G.ADD.U.128.O | Group add unsigned hexlet check overflow |

*FIG. 26A*

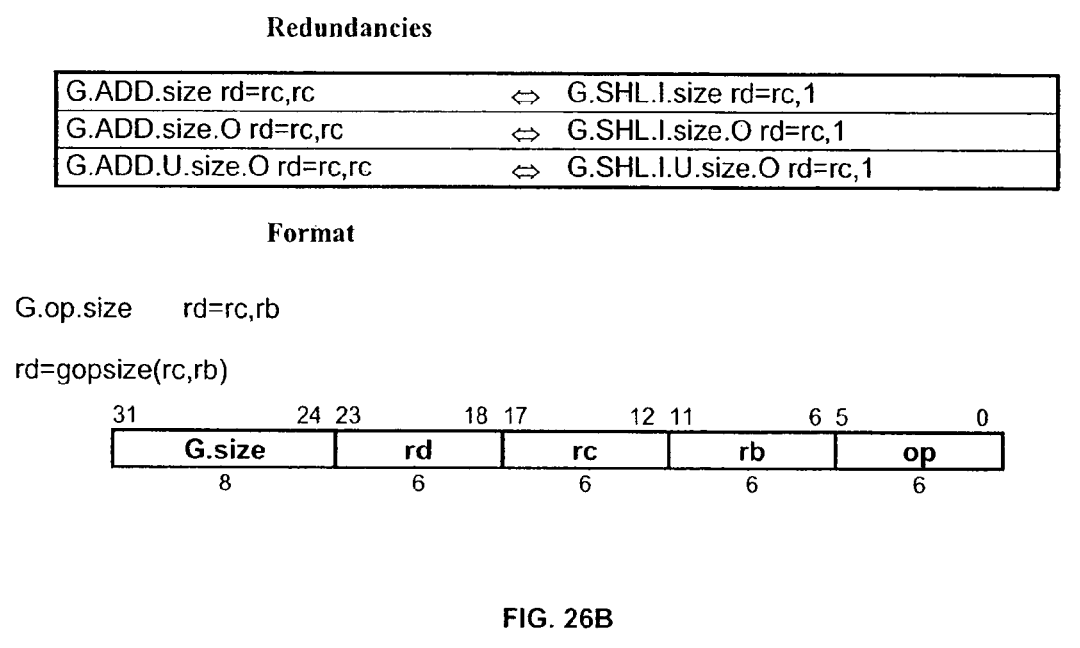

Redundancies

| | | |
|---|---|---|
| G.ADD.size rd=rc,rc | ⇔ | G.SHL.I.size rd=rc,1 |
| G.ADD.size.O rd=rc,rc | ⇔ | G.SHL.I.size.O rd=rc,1 |
| G.ADD.U.size.O rd=rc,rc | ⇔ | G.SHL.I.U.size.O rd=rc,1 |

Format

G.op.size rd=rc,rb rd=gopsize(rc,rb)

| 31 24 | 23 18 | 17 12 | 11 6 | 5 0 |
|---|---|---|---|---|
| G.size | rd | rc | rb | op |
| 8 | 6 | 6 | 6 | 6 |

FIG. 26B

Definition

```
def Group(op,size,rd,rc,rb)
    c ← RegRead(rc, 128)
    b ← RegRead(rb, 128)
    case op of
        G.ADD:
            for i ← 0 to 128-size by size
                ai+size-1..i ← ci+size-1..i + bi+size-1..i
            endfor
        G.ADD.L:
            for i ← 0 to 128-size by size
                t ← (ci+size-1 || ci+size-1..i) + (bi+size-1 || bi+size-1..i)
                ai+size-1..i ← (tsize ≠ tsize-1) ? (tsize || tsize^size-1) : tsize-1..0
            endfor
        G.ADD.L.U:
            for i ← 0 to 128-size by size
                t ← (0^1 || ci+size-1..i) + (0^1 || bi+size-1..i)
                ai+size-1..i ← (tsize ≠ 0) ? (1^size) : tsize-1..0
            endfor
        G.ADD.O:
            for i ← 0 to 128-size by size
                t ← (ci+size-1 || ci+size-1..i) + (bi+size-1 || bi+size-1..i)
                if tsize ≠ tsize-1 then
                    raise FixedPointArithmetic
                endif
                ai+size-1..i ← tsize-1..0
            endfor
        G.ADD.U.O:
            for i ← 0 to 128-size by size
                t ← (0^1 || ci+size-1..i) + (0^1 || bi+size-1..i)
                if tsize ≠ 0 then
                    raise FixedPointArithmetic
                endif
                ai+size-1..i ← tsize-1..0
            endfor
    endcase
    RegWrite(rd, 128, a)
enddef
```

*FIG. 26C*

Definition

```
def Group(op,size,rd,rc,rb)
    c ← RegRead(rc, 128)
    b ← RegRead(rb, 128)
    case op of
        G.ADD:
            for i ← 0 to 128-size by size
                z_{i+size-1..i} ← c_{i+size-1..i} + b_{i+size-1..i}
            endfor
        G.ADD.L:
            for i ← 0 to 128-size by size
                t ← (c_{i+size-1} || c_{i+size-1..i}) + (b_{i+size-1} || b_{i+size-1..i})
                z_{i+size-1..i} ← (t_{size} ≠ t_{size-1}) ? (t_{size} || t_{size-1}^{size-1}) : t_{size-1..0}
            endfor
        G.ADD.L.U:
            for i ← 0 to 128-size by size
                t ← (0^1 || c_{i+size-1..i}) + (0^1 || b_{i+size-1..i})
                z_{i+size-1..i} ← (t_{size} ≠ 0) ? (1^{size}) : t_{size-1..0}
            endfor
        G.ADD.O:
            for i ← 0 to 128-size by size
                t ← (c_{i+size-1} || c_{i+size-1..i}) + (b_{i+size-1} || b_{i+size-1..i})
                if t_{size} ≠ t_{size-1} then
                    raise FixedPointArithmetic
                endif
                z_{i+size-1..i} ← t_{size-1..0}
            endfor
        G.ADD.U.O:
            for i ← 0 to 128-size by size
                t ← (0^1 || c_{i+size-1..i}) + (0^1 || b_{i+size-1..i})
                if t_{size} ≠ 0 then
                    raise FixedPointArithmetic
                endif
                z_{i+size-1..i} ← t_{size-1..0}
            endfor
    endcase
    RegWrite(rd, 128, z)
enddef
```

FIG. 26D

Exceptions

Fixed-point arithmetic

FIG. 26E

Operation codes

| | |
|---|---|
| G.SET.AND.E.008 | Group set and equal zero bytes |
| G.SET.AND.E.016 | Group set and equal zero doublets |
| G.SET.AND.E.032 | Group set and equal zero quadlets |
| G.SET.AND.E.064 | Group set and equal zero octlets |
| G.SET.AND.E.128 | Group set and equal zero hexlet |
| G.SET.AND.NE.008 | Group set and not equal zero bytes |
| G.SET.AND.NE.016 | Group set and not equal zero doublets |
| G.SET.AND.NE.032 | Group set and not equal zero quadlets |
| G.SET.AND.NE.064 | Group set and not equal zero octlets |
| G.SET.AND.NE.128 | Group set and not equal zero hexlet |
| G.SET.E.008 | Group set equal bytes |
| G.SET.E.016 | Group set equal doublets |
| G.SET.E.032 | Group set equal quadlets |
| G.SET.E.064 | Group set equal octlets |
| G.SET.E.128 | Group set equal hexlet |
| G.SET.GE.008 | Group set greater equal signed bytes |
| G.SET.GE.016 | Group set greater equal signed doublets |
| G.SET.GE.032 | Group set greater equal signed quadlets |
| G.SET.GE.064 | Group set greater equal signed octlets |
| G.SET.GE.128 | Group set greater equal signed hexlet |
| G.SET.GE.U.008 | Group set greater equal unsigned bytes |
| G.SET.GE.U.016 | Group set greater equal unsigned doublets |
| G.SET.GE.U.032 | Group set greater equal unsigned quadlets |
| G.SET.GE.U.064 | Group set greater equal unsigned octlets |
| G.SET.GE.U.128 | Group set greater equal unsigned hexlet |
| G.SET.L.008 | Group set signed less bytes |
| G.SET.L.016 | Group set signed less doublets |
| G.SET.L.032 | Group set signed less quadlets |
| G.SET.L.064 | Group set signed less octlets |
| G.SET.L.128 | Group set signed less hexlet |
| G.SET.L.U.008 | Group set less unsigned bytes |
| G.SET.L.U.016 | Group set less unsigned doublets |
| G.SET.L.U.032 | Group set less unsigned quadlets |
| G.SET.L.U.064 | Group set less unsigned octlets |
| G.SET.L.U.128 | Group set less unsigned hexlet |
| G.SET.NE.008 | Group set not equal bytes |
| G.SET.NE.016 | Group set not equal doublets |

FIG. 27A-1

| | |
|---|---|
| G.SET.NE.032 | Group set not equal quadlets |
| G.SET.NE.064 | Group set not equal octlets |
| G.SET.NE.128 | Group set not equal hexlet |
| G.SUB.008 | Group subtract bytes |
| G.SUB.008.O | Group subtract signed bytes check overflow |
| G.SUB.016 | Group subtract doublets |
| G.SUB.016.O | Group subtract signed doublets check overflow |
| G.SUB.032 | Group subtract quadlets |
| G.SUB.032.O | Group subtract signed quadlets check overflow |
| G.SUB.064 | Group subtract octlets |
| G.SUB.064.O | Group subtract signed octlets check overflow |
| G.SUB.128 | Group subtract hexlet |
| G.SUB.128.O | Group subtract signed hexlet check overflow |
| G.SUB.L.008 | Group subtract limit signed bytes |
| G.SUB.L.016 | Group subtract limit signed doublets |
| G.SUB.L.032 | Group subtract limit signed quadlets |
| G.SUB.L.064 | Group subtract limit signed octlets |
| G.SUB.L.128 | Group subtract limit signed hexlet |
| G.SUB.L.U.008 | Group subtract limit unsigned bytes |
| G.SUB.L.U.016 | Group subtract limit unsigned doublets |
| G.SUB.L.U.032 | Group subtract limit unsigned quadlets |
| G.SUB.L.U.064 | Group subtract limit unsigned octlets |
| G.SUB.L.U.128 | Group subtract limit unsigned hexlet |
| G.SUB.U.008.O | Group subtract unsigned bytes check overflow |
| G.SUB.U.016.O | Group subtract unsigned doublets check overflow |
| G.SUB.U.032.O | Group subtract unsigned quadlets check overflow |
| G.SUB.U.064.O | Group subtract unsigned octlets check overflow |
| G.SUB.U.128.O | Group subtract unsigned hexlet check overflow |

FIG. 27A-2

Equivalencies

| | |
|---|---|
| *G.NEG.016* | Group negate doublet |
| *G.NEG.016.O* | Group negate signed doublet check overflow |
| *G.NEG.032* | Group negate quadlet |
| *G.NEG.032.O* | Group negate signed quadlet check overflow |
| *G.NEG.064* | Group negate octlet |
| *G.NEG.064.O* | Group negate signed octlet check overflow |
| *G.NEG.128* | Group negate hexlet |
| *G.NEG.128.O* | Group negate signed hexlet check overflow |
| *G.SET.LE.I.016* | Group set less equal immediate signed doublets |
| *G.SET.LE.I.032* | Group set less equal immediate signed quadlets |
| *G.SET.LE.I.064* | Group set less equal immediate signed octlets |
| *G.SET.LE.I.128* | Group set less equal immediate signed hexlet |
| *G.SET.LE.I.U.016* | Group set less equal immediate unsigned doublets |
| *G.SET.LE.I.U.032* | Group set less equal immediate unsigned quadlets |
| *G.SET.LE.I.U.064* | Group set less equal immediate unsigned octlets |
| *G.SET.LE.I.U.128* | Group set less equal immediate unsigned hexlet |
| *G.SET.G.I.016* | Group set immediate signed greater doublets |
| *G.SET.G.I.032* | Group set immediate signed greater quadlets |
| *G.SET.G.I.064* | Group set immediate signed greater octlets |
| *G.SET.G.I.128* | Group set immediate signed greater hexlet |
| *G.SET.G.I.U.016* | Group set greater immediate unsigned doublets |
| *G.SET.G.I.U.032* | Group set greater immediate unsigned quadlets |
| *G.SET.G.I.U.064* | Group set greater immediate unsigned octlets |
| *G.SET.G.I.U.128* | Group set greater immediate unsigned hexlet |

| | | |
|---|---|---|
| *G.NEG.size rd=rc* | → | G.SUB.I.size rd=0,rc |
| *G.NEG.size.O rd=rc* | → | G.SUB.I.size.O rd=0,rc |
| *G.SET.G.I.size rd=imm,rc* | → | G.SET.GE.I.size rd=imm-1,rc |
| *G.SET.G.I.U.size rd=imm,rc* | → | G.SET.GE.I.U.size rd=imm-1,rc |
| *G.SET.LE.I.size rd=imm,rc* | → | G.SET.L.I.size rd=imm-1,rc |
| *G.SET.LE.I.U.size rd=imm,rc* | → | G.SET.L.I.U.size rd=imm-1,rc |

FIG. 27A-3

Redundancies

| | | |
|---|---|---|
| G.SET.AND.E.I.size rd=0,rc | ⇔ | *G.SET.size rd* |
| G.SET.AND.NE.I.size rd=0,rc | ⇔ | *G.ZERO rd* |
| G.SET.AND.E.I.size rd=-1,rc, | ⇔ | *G.SET.E.Z.size rd=rc* |
| G.SET.AND.NE.I.size rd=-1,rc | ⇔ | *G.SET.NE.Z.size rd=rc* |
| G.SET.E.I.size rd=0;rc | ⇔ | *G.SET.E.Z.size rd=rc* |
| G.SET.L.I.size rd=-1,rc | ⇔ | *G.SET.GE.Z.size rd=rc* |
| G.SET.GE.I.size rd=-1,rc | ⇔ | *G.SET.L.Z.size rd=rc* |
| G.SET.NE.I.size rd=0,rc | ⇔ | *G.SET.NE.Z.size rd=rc* |
| G.SET.GE.I.U.size rd=0,rc | ⇔ | *G.SET.E.Z.size rd=rc* |
| G.SET.L.I.U.size rd=0,rc | ⇔ | *G.SET.NE.Z.size rd=rc* |

Selection

| class | operation | cond | form | operand | size | check |
|---|---|---|---|---|---|---|
| arithmetic | SUB | | I | | 16 32 64 128 | |
| | | | | NONE U | 16 32 64 128 | O |
| boolean | SET.AND<br>SET | E<br>NE | I | | 16 32 64 128 | |
| | SET | L GE<br>*G LE* | I | NONE U | 16 32 64 128 | |

Format

G.op.size rd=rb,rc rd=gopsize(rb,rc)

| 31..24 | 23..18 | 17..12 | 11..6 | 5..0 |
|---|---|---|---|---|
| **G.size** | **rd** | **rc** | **rb** | **op** |
| 8 | 6 | 6 | 6 | 6 |

FIG. 27B

Definition def GroupReversed(op,size,rd,rc,rb)
    c ← RegRead(rc, 128)
    b ← RegRead(rb, 128)
    case op of
        G.SUB:
            for i ← 0 to 128-size by size
                $a_{i+size-1..i} \leftarrow b_{i+size-1..i} - c_{i+size-1..i}$
            endfor
        G.SUB.L:
            for i ← 0 to 128-size by size
                $t \leftarrow (b_{i+size-1} \| b_{i+size-1..i}) - (c_{i+size-1} \| c_{i+size-1..i})$
                $a_{i+size-1..i} \leftarrow (t_{size} \neq t_{size-1})\ ?\ (t_{size} \| t_{size}^{size-1}) : t_{size-1..0}$
            endfor
        G.SUB.LU:
            for i ← 0 to 128-size by size
                $t \leftarrow (0^1 \| b_{i+size-1..i}) - (0^1 \| c_{i+size-1..i})$
                $a_{i+size-1..i} \leftarrow (t_{size} \neq 0)\ ?\ 0^{size} : t_{size-1..0}$
            endfor
        G.SUB.O:
            for i ← 0 to 128-size by size
                $t \leftarrow (b_{i+size-1} \| b_{i+size-1..i}) - (c_{i+size-1} \| c_{i+size-1..i})$
                if $(t_{size} \neq t_{size-1})$ then
                    raise FixedPointArithmetic
                endif
                $a_{i+size-1..i} \leftarrow t_{size-1..0}$
            endfor
        G.SUB.U.O:
            for i ← 0 to 128-size by size
                $t \leftarrow (0^1 \| b_{i+size-1..i}) - (0^1 \| c_{i+size-1..i})$
                if $(t_{size} \neq 0)$ then
                    raise FixedPointArithmetic
                endif
                $a_{i+size-1..i} \leftarrow t_{size-1..0}$
            endfor
        G.SET.E:
            for i ← 0 to 128-size by size
                $a_{i+size-1..i} \leftarrow (b_{i+size-1..i} = c_{i+size-1..i})^{size}$
            endfor
        G.SET.NE:
            for i ← 0 to 128-size by size
                $a_{i+size-1..i} \leftarrow (b_{i+size-1..i} \neq c_{i+size-1..i})^{size}$
            endfor
        G.SET.AND.E:
            for i ← 0 to 128-size by size
                $a_{i+size-1..i} \leftarrow ((b_{i+size-1..i} \text{ and } c_{i+size-1..i}) = 0)^{size}$
            endfor

FIG. 27C-1

```
        G.SET.AND.NE:
            for i ← 0 to 128-size by size
                a_{i+size-1..i} ← ((b_{i+size-1..i} and c_{i+size-1..i}) ≠ 0)^size
            endfor
        G.SET.L:
            for i ← 0 to 128-size by size
                a_{i+size-1..i} ← ((rc = rb) ? (b_{i+size-1..i} < 0) : (b_{i+size-1..i} < c_{i+size-1..i}))^size
            endfor
        G.SET.GE:
            for i ← 0 to 128-size by size
                a_{i+size-1..i} ← ((rc = rb) ? (b_{i+size-1..i} ≥ 0) : (b_{i+size-1..i} ≥ c_{i+size-1..i}))^size
            endfor
        G.SET.L.U:
            for i ← 0 to 128-size by size
                a_{i+size-1..i} ← ((rc = rb) ? (b_{i+size-1..i} > 0) :
                        ((0 || b_{i+size-1..i}) < (0 || c_{i+size-1..i})))^size
            endfor
        G.SET.GE.U:
            for i ← 0 to 128-size by size
                a_{i+size-1..i} ← ((rc = rb) ? (b_{i+size-1..i} ≤ 0) :
                        ((0 || b_{i+size-1..i}) ≥ (0 || c_{i+size-1..i})))^size
            endfor
    endcase
    RegWrite(rd, 128, a)
enddef
```

*FIG. 27C-2*

Definition

```
def GroupImmediateReversed(op,size,ra,imm) as
    c ← RegRead(rc, 128)
    s ← imm9
    case size of
        16:
            i16 ← s^7 || imm
            b ← i16 || i16 || i16 || i16 || i16 || i16 || i16 || i16
        32:
            b ← s^22 || imm || s^22 || imm || s^22 || imm || s^22 || imm
        64:
            b ← s^54 || imm || s^54 || imm
        128:
            b ← s^118 || imm
    endcase
    for i ← 0 to 128-size by size
        case op of
            G.SUB.I:
                z_{i+size-1..i} ← b_{i+size-1..i} - c_{i+size-1..i}
            G.SUB.I.O:
                t ← (b_{i+size-1} || b_{i+size-1..i}) - (c_{i+size-1} || c_{i+size-1..i})
                if (t_size ≠ t_{size-1} then
                    raise FixedPointArithmetic
                endif
                z_{i+size-1..i} ← t_{size-1..0}
            G.SUB.I.U.O:
                t ← (0^1 || b_{i+size-1..i}) - (0^1 || c_{i+size-1..i})
                if (t_size ≠ 0 then
                    raise FixedPointArithmetic
                endif
                z_{i+size-1..i} ← t_{size-1..0}
            G.SET.E.I:
                z_{i+size-1..i} ← (b_{i+size-1..i} = c_{i+size-1..i})^size
            G.SET.NE.I:
                z_{i+size-1..i} ← (b_{i+size-1..i} ≠ c_{i+size-1..i})^size
            G.SET.AND.E.I:
                z_{i+size-1..i} ← ((b_{i+size-1..i} and c_{i+size-1..i}) = 0)^size
            G.SET.AND.NE.I:
                z_{i+size-1..i} ← ((b_{i+size-1..i} and c_{i+size-1..i}) ≠ 0)^size
            G.SET.L.I:
                z_{i+size-1..i} ← (b_{i+size-1..i} < c_{i+size-1..i})^size
            G.SET.GE.I:
```

FIG. 27D-1

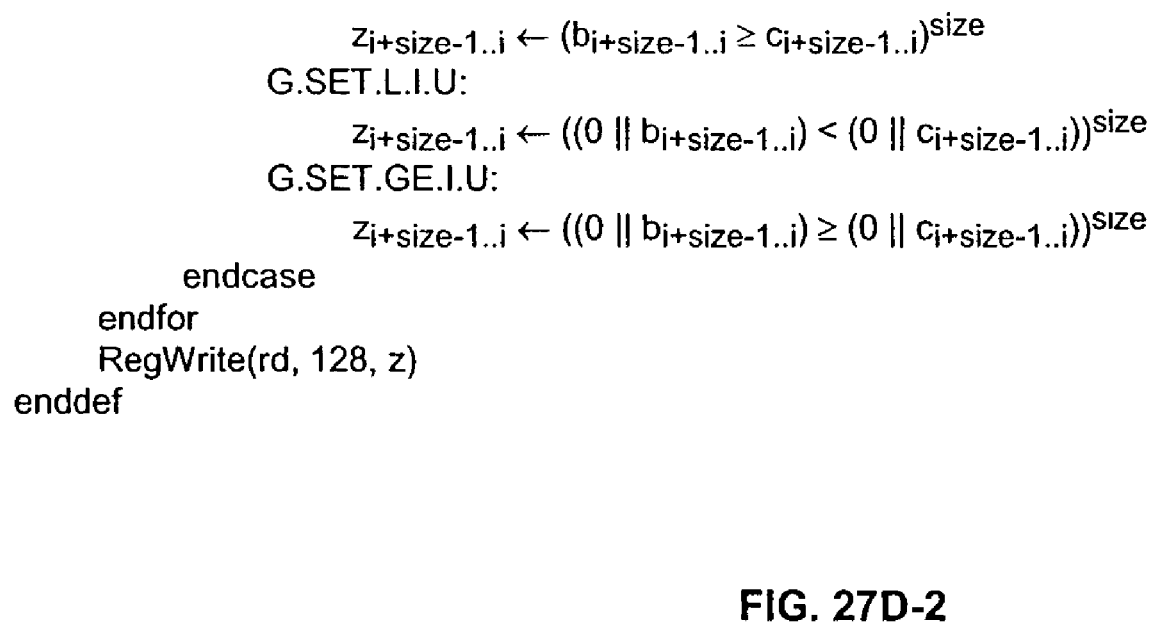

```
                $z_{i+size-1..i} \leftarrow (b_{i+size-1..i} \geq c_{i+size-1..i})^{size}$
            G.SET.L.I.U:
                $z_{i+size-1..i} \leftarrow ((0 \| b_{i+size-1..i}) < (0 \| c_{i+size-1..i}))^{size}$
            G.SET.GE.I.U:
                $z_{i+size-1..i} \leftarrow ((0 \| b_{i+size-1..i}) \geq (0 \| c_{i+size-1..i}))^{size}$
        endcase
    endfor
    RegWrite(rd, 128, z)
enddef
```

FIG. 27D-2

Exceptions

Fixed-point arithmetic

FIG. 27E

Operation codes

| | |
|---|---|
| E.CON.8 | Ensemble convolve signed bytes |
| E.CON.16 | Ensemble convolve signed doublets |
| E.CON.32 | Ensemble convolve signed quadlets |
| E.CON.64 | Ensemble convolve signed octlets |
| E.CON.C.8 | Ensemble convolve complex bytes |
| E.CON.C.16 | Ensemble convolve complex doublets |
| E.CON.C.32 | Ensemble convolve complex quadlets |
| E.CON.M.8 | Ensemble convolve mixed-signed bytes |
| E.CON.M.16 | Ensemble convolve mixed-signed doublets |
| E.CON.M.32 | Ensemble convolve mixed-signed quadlets |
| E.CON.M.64 | Ensemble convolve mixed-signed octlets |
| E.CON.U.8 | Ensemble convolve unsigned bytes |
| E.CON.U.16 | Ensemble convolve unsigned doublets |
| E.CON.U.32 | Ensemble convolve unsigned quadlets |
| E.CON.U.64 | Ensemble convolve unsigned octlets |
| E.DIV.64 | Ensemble divide signed octlets |
| E.DIV.U.64 | Ensemble divide unsigned octlets |
| E.MUL.8 | Ensemble multiply signed bytes |
| E.MUL.16 | Ensemble multiply signed doublets |
| E.MUL.32 | Ensemble multiply signed quadlets |
| E.MUL.64 | Ensemble multiply signed octlets |
| E.MUL.SUM.8 | Ensemble multiply sum signed bytes |
| E.MUL.SUM.16 | Ensemble multiply sum signed doublets |
| E.MUL.SUM.32 | Ensemble multiply sum signed quadlets |
| E.MUL.SUM.64 | Ensemble multiply sum signed octlets |
| E.MUL.C.8 | Ensemble complex multiply bytes |
| E.MUL.C.16 | Ensemble complex multiply doublets |
| E.MUL.C.32 | Ensemble complex multiply quadlets |
| E.MUL.M.8 | Ensemble multiply mixed-signed bytes |
| E.MUL.M.16 | Ensemble multiply mixed-signed doublets |
| E.MUL.M.32 | Ensemble multiply mixed-signed quadlets |
| E.MUL.M.64 | Ensemble multiply mixed-signed octlets |
| E.MUL.P.8 | Ensemble multiply polynomial bytes |
| E.MUL.P.16 | Ensemble multiply polynomial doublets |
| E.MUL.P.32 | Ensemble multiply polynomial quadlets |
| E.MUL.P.64 | Ensemble multiply polynomial octlets |
| E.MUL.SUM.C.8 | Ensemble multiply sum complex bytes |
| E.MUL.SUM.C.16 | Ensemble multiply sum complex doublets |
| E.MUL.SUM.C.32 | Ensemble multiply sum complex quadlets |
| E.MUL.SUM.M.8 | Ensemble multiply sum mixed-signed bytes |
| E.MUL.SUM.M.16 | Ensemble multiply sum mixed-signed doublets |
| E.MUL.SUM.M.32 | Ensemble multiply sum mixed-signed quadlets |
| E.MUL.SUM.M.64 | Ensemble multiply sum mixed-signed octlets |

FIG. 28A-1

| | |
|---|---|
| E.MUL.SUM.U.8 | Ensemble multiply sum unsigned bytes |
| E.MUL.SUM.U.16 | Ensemble multiply sum unsigned doublets |
| E.MUL.SUM.U.32 | Ensemble multiply sum unsigned quadlets |
| E.MUL.SUM.U.64 | Ensemble multiply sum unsigned octlets |
| E.MUL.U.8 | Ensemble multiply unsigned bytes |
| E.MUL.U.16 | Ensemble multiply unsigned doublets |
| E.MUL.U.32 | Ensemble multiply unsigned quadlets |
| E.MUL.U.64 | Ensemble multiply unsigned octlets |

*FIG. 28A-2*

Selection

| class | op | type | size |
|---|---|---|---|
| multiply | E.MUL | NONE M U P | 8 16 32 64 |
| | | C | 8 16 32 |
| multiply sum | E.MUL.SUM | NONE M U | 8 16 32 64 |
| | | C | 8 16 32 |
| convolve | E.CON | NONE M U | 8 16 32 64 |
| | | C | 8 16 32 |
| divide | E.DIV | NONE U | 64 |

Format

E.op.size rd=rc,rb rd=eopsize(rc,rb)

| 31 24 | 23 18 | 17 12 | 11 6 | 5 0 |
|---|---|---|---|---|
| E.size | rd | rc | rb | op |
| 8 | 6 | 6 | 6 | 6 |

FIG. 28B

Definition

```
def mul(size,h,vs,v,i,ws,w,j) as
      mul ← ((vs&v_{size-1+i})^{h-size} || v_{size-1+i..i}) * ((ws&w_{size-1+j})^{h-size} || w_{size-1+j..j})
enddef

def c ← PolyMultiply(size,a,b) as
      p[0] ← 0^{2*size}
      for k ← 0 to size-1
            p[k+1] ← p[k] ^ a_k ? (0^{size-k} || b || 0^k) : 0^{2*size}
      endfor
      c ← p[size]
enddef

def Ensemble(op,size,rd,rc,rb)
      c ← RegRead(rc, 128)
      b ← RegRead(rb, 128)
      case op of
            E.MUL:, E.MUL.C:, EMUL.SUM, E.MUL.SUM.C, E.CON, E.CON.C, E.DIV:
                  cs ← bs ← 1
            E.MUL.M:, EMUL.SUM.M, E.CON.M:
                  cs ← 0
                  bs ← 1
            E.MUL.U:, EMUL.SUM.U, E.CON.U, E.DIV.U, E.MUL.P:
                  cs ← bs ← 0
      endcase
      case op of
            E.MUL, E.MUL.U, E.MUL.M:
                  for i ← 0 to 64-size by size
                        d_{2*(i+size)-1..2*i} ← mul(size,2*size,cs,c,i,bs,b,i)
                  endfor
            E.MUL.P:
                  for i ← 0 to 64-size by size
                        d_{2*(i+size)-1..2*i} ← PolyMultiply(size,c_{size-1+i..i},b_{size-1+i..i})
                  endfor
            E.MUL.C:
                  for i ← 0 to 64-size by size
                        if (i and size) = 0 then
                              p ← mul(size,2*size,1,c,i,1,b,i) - mul(size,2*size,1,c,i+size,1,b,i+size)
                        else
                              p ← mul(size,2*size,1,c,i,1,b,i+size) + mul(size,2*size,1,c,i,1,b,i+size)
                        endif
                        d_{2*(i+size)-1..2*i} ← p
                  endfor
            E.MUL.SUM, E.MUL.SUM.U, E.MUL.SUM.M:
                  p[0] ← 0^{128}
                  for i ← 0 to 128-size by size
                        p[i+size] ← p[i] + mul(size,128,cs,c,i,bs,b,i)
                  endfor
```

FIG. 28C-1

```
a ← p[128]
E.MUL.SUM.C:
    p[0] ← 0^64
    p[size] ← 0^64
    for i ← 0 to 128-size by size
        if (i and size) = 0 then
            p[i+2*size] ← p[i] + mul(size,64,1,c,i,1,b,i)
                        - mul(size,64,1,c,i+size,1,b,i+size)
        else
            p[i+2*size] ← p[i] + mul(size,64,1,c,i,1,b,i+size)
                        + mul(size,64,1,c,i+size,1,b,i)
        endif
    endfor
    a ← p[128+size] || p[128]

E.CON, E.CON.U, E.CON.M:
    p[0] ← 0^128
    for j ← 0 to 64-size by size
        for i ← 0 to 64-size by size
            p[j+size]2*(i+size)-1..2*i ← p[j]2*(i+size)-1..2*i +
                mul(size,2*size,cs,c,i+64-j,bs,b,j)
        endfor
    endfor
    a ← p[64]
E.CON.C:
    p[0] ← 0^128
    for j ← 0 to 64-size by size
        for i ← 0 to 64-size by size
            if ((~i) and j and size) = 0 then
                p[j+size]2*(i+size)-1..2*i ← p[j]2*(i+size)-1..2*i +
                    mul(size,2*size,1,c,i+64-j,1,b,j)
            else
                p[j+size]2*(i+size)-1..2*i ← p[j]2*(i+size)-1..2*i -
                    mul(size,2*size,1,c,i+64-j+2*size,1,b,j)
            endif
        endfor
    endfor
    a ← p[64]
E.DIV:
    if (b = 0) or ( (c = (1||0^63)) and (b = 1^64) ) then
        a ← undefined
```

*FIG. 28C-2*

```
else
            q ← c / b
            r ← c - q*b
            a ← r63..0 || q63..0
        endif
    E.DIV.U:
        if b = 0 then
            a ← undefined
        else
            q ← (0 || c) / (0 || b)
            r ← c - (0 || q)*(0 || b)
            a ← r63..0 || q63..0
        endif
    endcase
    RegWrite(rd, 128, a)
enddef
```

FIG. 28C-3

Ensemble multiply doublets

Ensemble multiply complex doublets

Ensemble multiply sum doublets

Ensemble multiply sum complex doublets

Definition

```
def mul(size,h,vs,v,i,ws,w,j) as
    mul ← ((vs&v_{size-1+i})^{h-size} || v_{size-1+i..i}) * ((ws&w_{size-1+j})^{h-size} || w_{size-1+j..j})
enddef

def c ← PolyMultiply(size,a,b) as
    p[0] ← 0^{2*size}
    for k ← 0 to size-1
        p[k+1] ← p[k] ^ (a_k ? (0^{size-k} || b || 0^k) : 0^{2*size})
    endfor
    c ← p[size]
enddef

def Ensemble(op,size,rd,rc,rb)
    c ← RegRead(rc, 128)
    b ← RegRead(rb, 128)
    case op of
        E.MUL:, E.MUL.C:, EMUL.SUM, E.MUL.SUM.C, E.CON, E.CON.C, E.DIV:
            cs ← bs ← 1
        E.MUL.M:, EMUL.SUM.M, E.CON.M:
            cs ← 0
            bs ← 1
        E.MUL.U:, EMUL.SUM.U, E.CON.U, E.DIV.U, E.MUL.P:
            cs ← bs ← 0
    endcase
    case op of
        E.MUL, E.MUL.U, E.MUL.M:
            for i ← 0 to 64-size by size
                z_{2*(i+size)-1..2*i} ← mul(size,2*size,cs,c,i,bs,b,i)
            endfor
        E.MUL.P:
            for i ← 0 to 64-size by size
                z_{2*(i+size)-1..2*i} ← PolyMultiply(size,c_{size-1+i..i},b_{size-1+i..i})
            endfor
        E.MUL.C:
            for i ← 0 to 64-size by size
                if (i and size) = 0 then
                    p ← mul(size,2*size,1,c,i,1,b,i) - mul(size,2*size,1,c,i+size,1,b,i+size)
                else
                    p ← mul(size,2*size,1,c,i,1,b,i-size) + mul(size,2*size,1,c,i-size,1,b,i)
                endif
                z_{2*(i+size)-1..2*i} ← p
            endfor
        E.MUL.SUM, E.MUL.SUM.U, E.MUL.SUM.M:
```

FIG. 28J-1

```
    p[0] ← 0^128
    for i ← 0 to 128-size by size
        p[i+size] ← p[i] + mul(size,128,cs,c,i,bs,b,i)
    endfor
    z ← p[128]
E.MUL.SUM.C:
    p[0] ← 0^64
    p[size] ← 0^64
    for i ← 0 to 128-size by size
        if (i and size) = 0 then
            p[i+2*size] ← p[i] + mul(size,64,1,c,i,1,b,i)
                              - mul(size,64,1,c,i+size,1,b,i+size)
        else
            p[i+2*size] ← p[i] + mul(size,64,1,c,i,1,b,i-size)
                              + mul(size,64,1,c,i-size,1,b,i)
        endif
    endfor
    z ← p[128+size] || p[128]
E.CON, E.CON.U, E.CON.M:
    p[0] ← 0^128
    for j ← 0 to 64-size by size
        for i ← 0 to 64-size by size
            p[j+size]_2*(i+size)-1..2*i ← p[j]_2*(i+size)-1..2*i +
                mul(size,2*size,cs,c,i+64-j,bs,b,j)
        endfor
    endfor
    z ← p[64]
E.CON.C:
    p[0] ← 0^128
    for j ← 0 to 64-size by size
        for i ← 0 to 64-size by size
            if ((~i) and j and size) = 0 then
                p[j+size]_2*(i+size)-1..2*i ← p[j]_2*(i+size)-1..2*i +
                    mul(size,2*size,1,c,i+64-j,1,b,j)
            else
                p[j+size]_2*(i+size)-1..2*i ← p[j]_2*(i+size)-1..2*i -
                    mul(size,2*size,1,c,i+64-j+2*size,1,b,j)
            endif
        endfor
    endfor
    z ← p[64]
E.DIV:
    if (b = 0) or ( (c = (1||0^63)) and (b = 1^64) ) then
        z ← undefined
    else
        q ← c / b
        r ← c - q*b
        z ← r_63..0 || q_63..0
    endif
```

FIG. 28J-2

```
            E.DIV.U:
                  if b = 0 then
                        z ← undefined
                  else
                        q ← (0 || c) / (0 || b)
                        r ← c - (0 || q)*(0 || b)
                        z ← r63..0 || q63..0
                  endif
      endcase
      RegWrite(rd, 128, z)
enddef
```

FIG. 28J-3

Exceptions none

FIG. 28K

Floating-point function Definitions

```
def eb ← ebits(prec) as
      case pref of
            16:
                  eb ← 5
            32:
                  eb ← 8
            64:
                  eb ← 11
            128:
                  eb ← 15
      endcase
enddef

def eb ← ebias(prec) as
      eb ← 0 || 1^(ebits(prec)-1)
enddef

def fb ← fbits(prec) as
      fb ← prec - 1 - eb
enddef

def a ← F(prec, ai) as
      a.s ← ai_(prec-1)
      ae ← ai_(prec-2..fbits(prec))
      af ← ai_(fbits(prec)-1..0)
      if ae = 1^(ebits(prec)) then
            if af = 0 then
                  a.t ← INFINITY
            elseif af_(fbits(prec)-1) then
                  a.t ← SNaN
                  a.e ← -fbits(prec)
                  a.f ← 1 || af_(fbits(prec)-2..0)
            else
                  a.t ← QNaN
                  a.e ← -fbits(prec)
                  a.f ← af
            endif
```

*FIG. 29-1*

```
    elseif ae = 0 then
        if af = 0 then
            a.t ← ZERO
        else
            a.t ← NORM
            a.e ← 1-ebias(prec)-fbits(prec)
            a.f ← 0 || af
        endif
    else
        a.t ← NORM
        a.e ← ae-ebias(prec)-fbits(prec)
        a.f ← 1 || af
    endif
enddef

def a ← DEFAULTQNAN as
    a.s ← 0
    a.t ← QNAN
    a.e ← -1
    a.f ← 1
enddef

def a ← DEFAULTSNAN as
    a.s ← 0
    a.t ← SNAN
    a.e ← -1
    a.f ← 1
enddef

def fadd(a,b) as faddr(a,b,N) enddef

def c ← faddr(a,b,round) as
    if a.t=NORM and b.t=NORM then
        // d,e are a,b with exponent aligned and fraction adjusted
        if a.e > b.e then
            d ← a
            e.t ← b.t
            e.s ← b.s
            e.e ← a.e
            e.f ← b.f || 0^(a.e-b.e)
        else if a.e < b.e then
            d.t ← a.t
            d.s ← a.s
            d.e ← b.e
            d.f ← a.f || 0^(b.e-a.e)
            e ← b
```

FIG. 29-2

```
            endif
            c.t ← d.t
            c.e ← d.e
            if d.s = e.s then
                c.s ← d.s
                c.f ← d.f + e.f
            elseif d.f > e.f then
                c.s ← d.s
                c.f ← d.f – e.f
            elseif d.f < e.f then
                c.s ← e.s
                c.f ← e.f – d.f
            else
                c.s ← r=F
                c.t ← ZERO
            endif
        // priority is given to b operand for NaN propagation
        elseif (b.t=SNAN) or (b.t=QNAN) then
            c ← b
        elseif (a.t=SNAN) or (a.t=QNAN) then
            c ← a
        elseif a.t=ZERO and b.t=ZERO then
            c.t ← ZERO
            c.s ← (a.s and b.s) or (round=F and (a.s or b.s))
        // NULL values are like zero, but do not combine with ZERO to alter sign
        elseif a.t=ZERO or a.t=NULL then
            c ← b
        elseif b.t=ZERO or b.t=NULL then
            c ← a
        elseif a.t=INFINITY and b.t=INFINITY then
            if a.s ≠ b.s then
                c ← DEFAULTSNAN // Invalid
            else
                c ← a
            endif
        elseif a.t=INFINITY then
            c ← a
        elseif b.t=INFINITY then
            c ← b
        else
            assert FALSE // should have covered al the cases above
        endif
    enddef

    def b ← fneg(a) as
        b.s ← ~a.s
        b.t ← a.t
        b.e ← a.e
        b.f ← a.f
    enddef
```

FIG. 29-3

```
def fsubr(a,b,round) as faddr(a,fneg(b),round) enddef

def frsub(a,b) as frsubr(a,b,N) enddef

def frsubr(a,b,round) as faddr(fneg(a),b,round) enddef

def c ← fcom(a,b) as
    if (a.t=SNAN) or (a.t=QNAN) or (b.t=SNAN) or (b.t=QNAN) then
        c ← U
    elseif a.t=INFINITY and b.t=INFINITY then
        if a.s ≠ b.s then
            c ← (a.s=0) ? G: L

        else
            c ← E
        endif
    elseif a.t=INFINITY then
        c ← (a.s=0) ? G: L
    elseif b.t=INFINITY then
        c ← (b.s=0) ? G: L
    elseif a.t=NORM and b.t=NORM then
        if a.s ≠ b.s then
            c ← (a.s=0) ? G: L
        else
            if a.e > b.e then
                af ← a.f
                bf ← b.f || 0^(a.e-b.e)
            else
                af ← a.f || 0^(b.e-a.e)
                bf ← b.f
            endif
            if af = bf then
                c ← E
            else
                c ← ((a.s=0) ^ (af > bf)) ? G : L
            endif
        endif
    elseif a.t=NORM then
        c ← (a.s=0) ? G: L
    elseif b.t=NORM then
        c ← (b.s=0) ? G: L
    elseif a.t=ZERO and b.t=ZERO then
        c ← E
    else
        assert FALSE // should have covered al the cases above
    endif
enddef
```

FIG. 29-4

```
def c ← fmul(a,b) as
    if a.t=NORM and b.t=NORM then
        c.s ← a.s ^ b.s
        c.t ← NORM
        c.e ← a.e + b.e
        c.f ← a.f * b.f
    // priority is given to b operand for NaN propagation
    elseif (b.t=SNAN) or (b.t=QNAN) then
        c.s ← a.s ^ b.s
        c.t ← b.t
        c.e ← b.e
        c.f ← b.f
    elseif (a.t=SNAN) or (a.t=QNAN) then
        c.s ← a.s ^ b.s
        c.t ← a.t
        c.e ← a.e
        c.f ← a.f
    elseif a.t=ZERO and b.t=INFINITY then
        c ← DEFAULTSNAN // Invalid
    elseif a.t=INFINITY and b.t=ZERO then
        c ← DEFAULTSNAN // Invalid
    elseif a.t=ZERO or b.t=ZERO then
        c.s ← a.s ^ b.s
        c.t ← ZERO
    else
        assert FALSE // should have covered al the cases above
    endif
enddef

def c ← fdivr(a,b) as
    if a.t=NORM and b.t=NORM then
        c.s ← a.s ^ b.s
        c.t ← NORM
        c.e ← a.e - b.e + 256
        c.f ← (a.f || 0^256) / b.f
    // priority is given to b operand for NaN propagation
    elseif (b.t=SNAN) or (b.t=QNAN) then
        c.s ← a.s ^ b.s
        c.t ← b.t
        c.e ← b.e
        c.f ← b.f
    elseif (a.t=SNAN) or (a.t=QNAN) then
        c.s ← a.s ^ b.s
        c.t ← a.t
        c.e ← a.e
        c.f ← a.f
```

FIG. 29-5

```
    elseif a.t=ZERO and b.t=ZERO then
        c ← DEFAULTSNAN // Invalid
    elseif a.t=INFINITY and b.t=INFINITY then
        c ← DEFAULTSNAN // Invalid
    elseif a.t=ZERO then
        c.s ← a.s ^ b.s
        c.t ← ZERO
    elseif a.t=INFINITY then
        c.s ← a.s ^ b.s
        c.t ← INFINITY
    else
        assert FALSE // should have covered al the cases above
    endif
enddef

def msb ← findmsb(a) as
    MAXF ← 2^18 // Largest possible f value after matrix multiply
    for j ← 0 to MAXF
        if a_{MAXF-1..j} = (0^{MAXF-1-j} || 1) then
            msb ← j
        endif
    endfor
enddef

def ai ← PackF(prec,a,round) as
    case a.t of
        NORM:
            msb ← findmsb(a.f)
            m ← msb-1-fbits(prec) // lsb for normal
            rdn ← -ebias(prec)-a.e-1-fbits(prec) // lsb if a denormal
            rb ← (m > rdn) ? m : rdn
```

FIG. 29-6

```
if rb ≤ 0 then
    aifr ← a.f_{msb-1..0} || 0^{-rb}
    eadj ← 0
else
    case round of
        C:
            s ← 0^{msb-rb} || (~a.s)^{rb}
        F:
            s ← 0^{msb-rb} || (a.s)^{rb}
        N, NONE:
            s ← 0^{msb-rb} || ~a.f_{rb} || a.f_{rb}^{rb-1}
        X:
            if a.f_{rb-1..0} ≠ 0 then
                raise FloatingPointArithmetic // Inexact
            endif
            s ← 0
        Z:
            s ← 0
    endcase
    v ← (0||a.f_{msb..0}) + (0||s)
    if v_{msb} = 1 then
        aifr ← v_{msb-1..rb}
        eadj ← 0
    else
        aifr ← 0^{fbits(prec)}
        eadj ← 1
    endif
endif
aien ← a.e + msb - 1 + eadj + ebias(prec)
if aien ≤ 0 then
    if round = NONE then
        ai ← a.s || 0^{ebits(prec)} || aifr
    else
        raise FloatingPointArithmetic //Underflow
    endif
elseif aien ≥ 1^{ebits(prec)} then
    if round = NONE then
        //default: round-to-nearest overflow handling
        ai ← a.s || 1^{ebits(prec)} || 0^{fbits(prec)}
    else
        raise FloatingPointArithmetic //Underflow
    endif
else
    ai ← a.s || aien_{ebits(prec)-1..0} || aifr
endif
```

FIG. 29-7

```
            SNAN:
                if round ≠ NONE then
                    raise FloatingPointArithmetic //Invalid
                endif
                if -a.e < fbits(prec) then
                    ai ← a.s || 1^{ebits(prec)} || a.f_{-a.e-1..0} || 0^{fbits(prec)+a.e}
                else
                    lsb ← a.f_{-a.e-1-fbits(prec)+1..0} ≠ 0
                    ai ← a.s || 1^{ebits(prec)} || a.f_{-a.e-1..-a.e-1-fbits(prec)+2} || lsb
                endif
            QNAN:
                if -a.e < fbits(prec) then
                    ai ← a.s || 1^{ebits(prec)} || a.f_{-a.e-1..0} || 0^{fbits(prec)+a.e}
                else
                    lsb ← a.f_{-a.e-1-fbits(prec)+1..0} ≠ 0
                    ai ← a.s || 1^{ebits(prec)} || a.f_{-a.e-1..-a.e-1-fbits(prec)+2} || lsb
                endif
            ZERO:
                ai ← a.s || 0^{ebits(prec)} || 0^{fbits(prec)}
            INFINITY:
                ai ← a.s || 1^{ebits(prec)} || 0^{fbits(prec)}
        endcase
    enddef

    def ai ← fsinkr(prec, a, round) as
        case a.t of
            NORM:
                msb ← findmsb(a.f)
                rb ← -a.e
                if rb ≤ 0 then
                    aifr ← a.f_{msb..0} || 0^{-rb}
                    aims ← msb - rb
                else
                    case round of
                        C, C.D:
                            s ← 0^{msb-rb} || (~ai.s)^{rb}
                        F, F.D:
                            s ← 0^{msb-rb} || (ai.s)^{rb}
                        N, NONE:
                            s ← 0^{msb-rb} || ~ai.f_{rb} || ai.f_{rb}^{rb-1}
                        X:
                            if ai.f_{rb-1..0} ≠ 0 then
                                raise FloatingPointArithmetic // Inexact
                            endif
                            s ← 0
                        Z, Z.D:
                            s ← 0
```

FIG. 29-8

```
                    endcase
                    v ← (0||a.f_msb..0) + (0||s)
                    if v_msb = 1 then
                        aims ← msb + 1 - rb
                    else
                        aims ← msb - rb
                    endif
                    aifr ← v_aims..rb
                endif
                if aims > prec then
                    case round of
                        C.D, F.D, NONE, Z.D:
                            ai ← a.s || (~as)^(prec-1)

                        C, F, N, X, Z:
                            raise FloatingPointArithmetic // Overflow
                    endcase
                elseif a.s = 0 then
                    ai ← aifr
                else
                    ai ← -aifr
                endif
            ZERO:
                ai ← 0^prec
            SNAN, QNAN:
                case round of
                    C.D, F.D, NONE, Z.D:
                        ai ← 0^prec
                    C, F, N, X, Z:
                        raise FloatingPointArithmetic // Invalid
                endcase
            INFINITY:
                case round of
                    C.D, F.D, NONE, Z.D:
                        ai ← a.s || (~as)^(prec-1)
                    C, F, N, X, Z:
                        raise FloatingPointArithmetic // Invalid
                endcase
        endcase
enddef

def c ← frecrest(a) as
    b.s ← 0
    b.t ← NORM
    b.e ← 0
    b.f ← 1
    c ← fest(fdiv(b,a))
enddef
```

FIG. 29-9

```
def c ← frsqrest(a) as
    b.s ← 0
    b.t ← NORM
    b.e ← 0
    b.f ← 1
    c ← fest(fsqr(fdiv(b,a)))
enddef

def c ← fest(a) as
    if (a.t=NORM) then
        msb ← findmsb(a.f)
        a.e ← a.e + msb - 13
        a.f ← a.f_msb..msb-12 || 1
    else
        c ← a
    endif
enddef

def c ← fsqr(a) as
    if (a.t=NORM) and (a.s=0) then
        c.s ← 0
        c.t ← NORM
        if (a.e_0 = 1) then
            c.e ← (a.e-127) / 2
            c.f ← sqr(a.f || 0^127)
        else
            c.e ← (a.e-128) / 2
            c.f ← sqr(a.f || 0^128)
        endif
    elseif (a.t=SNAN) or (a.t=QNAN) or a.t=ZERO or ((a.t=INFINITY) and (a.s=0)) then
        c ← a
    elseif ((a.t=NORM) or (a.t=INFINITY)) and (a.s=1) then
        c ← DEFAULTSNAN // Invalid
    else
        assert FALSE // should have covered al the cases above
    endif
enddef
```

*FIG. 29-10*

Operation codes

| | |
|---|---|
| E.ADD.F.16 | Ensemble add floating-point half |
| E.ADD.F.16.C | Ensemble add floating-point half ceiling |
| E.ADD.F.16.F | Ensemble add floating-point half floor |
| E.ADD.F.16.N | Ensemble add floating-point half nearest |
| E.ADD.F.16.X | Ensemble add floating-point half exact |
| E.ADD.F.16.Z | Ensemble add floating-point half zero |
| E.ADD.F.32 | Ensemble add floating-point single |
| E.ADD.F.32.C | Ensemble add floating-point single ceiling |
| E.ADD.F.32.F | Ensemble add floating-point single floor |
| E.ADD.F.32.N | Ensemble add floating-point single nearest |
| E.ADD.F.32.X | Ensemble add floating-point single exact |
| E.ADD.F.32.Z | Ensemble add floating-point single zero |
| E.ADD.F.64 | Ensemble add floating-point double |
| E.ADD.F.64.C | Ensemble add floating-point double ceiling |
| E.ADD.F.64.F | Ensemble add floating-point double floor |
| E.ADD.F.64.N | Ensemble add floating-point double nearest |
| E.ADD.F.64.X | Ensemble add floating-point double exact |
| E.ADD.F.64.Z | Ensemble add floating-point double zero |
| E.ADD.F.128 | Ensemble add floating-point quad |
| E.ADD.F.128.C | Ensemble add floating-point quad ceiling |
| E.ADD.F.128.F | Ensemble add floating-point quad floor |
| E.ADD.F.128.N | Ensemble add floating-point quad nearest |
| E.ADD.F.128.X | Ensemble add floating-point quad exact |
| E.ADD.F.128.Z | Ensemble add floating-point quad zero |
| E.DIV.F.16 | Ensemble divide floating-point half |
| E.DIV.F.16.C | Ensemble divide floating-point half ceiling |
| E.DIV.F.16.F | Ensemble divide floating-point half floor |
| E.DIV.F.16.N | Ensemble divide floating-point half nearest |
| E.DIV.F.16.X | Ensemble divide floating-point half exact |
| E.DIV.F.16.Z | Ensemble divide floating-point half zero |
| E.DIV.F.32 | Ensemble divide floating-point single |
| E.DIV.F.32.C | Ensemble divide floating-point single ceiling |
| E.DIV.F.32.F | Ensemble divide floating-point single floor |
| E.DIV.F.32.N | Ensemble divide floating-point single nearest |
| E.DIV.F.32.X | Ensemble divide floating-point single exact |
| E.DIV.F.32.Z | Ensemble divide floating-point single zero |
| E.DIV.F.64 | Ensemble divide floating-point double |

FIG. 30A-1

| | |
|---|---|
| E.DIV.F.064.C | Ensemble divide floating-point double ceiling |
| E.DIV.F.064.F | Ensemble divide floating-point double floor |
| E.DIV.F.064.N | Ensemble divide floating-point double nearest |
| E.DIV.F.064.X | Ensemble divide floating-point double exact |
| E.DIV.F.064.Z | Ensemble divide floating-point double zero |
| E.DIV.F.128 | Ensemble divide floating-point quad |
| E.DIV.F.128.C | Ensemble divide floating-point quad ceiling |
| E.DIV.F.128.F | Ensemble divide floating-point quad floor |
| E.DIV.F.128.N | Ensemble divide floating-point quad nearest |
| E.DIV.F.128.X | Ensemble divide floating-point quad exact |
| E.DIV.F.128.Z | Ensemble divide floating-point quad zero |
| E.MUL.C.F.016 | Ensemble multiply complex floating-point half |
| E.MUL.C.F.032 | Ensemble multiply complex floating-point single |
| E.MUL.C.F.064 | Ensemble multiply complex floating-point double |
| E.MUL.F.016 | Ensemble multiply floating-point half |
| E.MUL.F.016.C | Ensemble multiply floating-point half ceiling |
| E.MUL.F.016.F | Ensemble multiply floating-point half floor |
| E.MUL.F.016.N | Ensemble multiply floating-point half nearest |
| E.MUL.F.016.X | Ensemble multiply floating-point half exact |
| E.MUL.F.016.Z | Ensemble multiply floating-point half zero |
| E.MUL.F.032 | Ensemble multiply floating-point single |
| E.MUL.F.032.C | Ensemble multiply floating-point single ceiling |
| E.MUL.F.032.F | Ensemble multiply floating-point single floor |
| E.MUL.F.032.N | Ensemble multiply floating-point single nearest |
| E.MUL.F.032.X | Ensemble multiply floating-point single exact |
| E.MUL.F.032.Z | Ensemble multiply floating-point single zero |
| E.MUL.F.064 | Ensemble multiply floating-point double |
| E.MUL.F.064.C | Ensemble multiply floating-point double ceiling |
| E.MUL.F.064.F | Ensemble multiply floating-point double floor |
| E.MUL.F.064.N | Ensemble multiply floating-point double nearest |
| E.MUL.F.064.X | Ensemble multiply floating-point double exact |
| E.MUL.F.064.Z | Ensemble multiply floating-point double zero |
| E.MUL.F.128 | Ensemble multiply floating-point quad |
| E.MUL.F.128.C | Ensemble multiply floating-point quad ceiling |
| E.MUL.F.128.F | Ensemble multiply floating-point quad floor |
| E.MUL.F.128.N | Ensemble multiply floating-point quad nearest |
| E.MUL.F.128.X | Ensemble multiply floating-point quad exact |
| E.MUL.F.128.Z | Ensemble multiply floating-point quad zero |

FIG. 30A-2

| | |
|---|---|
| E.MUL.SUM.C.F.016 | Ensemble multiply sum complex floating-point half |
| E.MUL.SUM.C.F.032 | Ensemble multiply sum complex floating-point single |
| E.MUL.SUM.F.016 | Ensemble multiply sum floating-point half |
| E.MUL.SUM.F.032 | Ensemble multiply sum floating-point single |
| E.MUL.SUM.F.064 | Ensemble multiply sum floating-point double |

FIG. 30A-3

Selection

| class | op | prec | round/trap |
|---|---|---|---|
| add | E.ADD.F | 16 32 64 128 | NONE C F N X Z |
| divide | E.DIV.F | 16 32 64 128 | NONE C F N X Z |
| multiply | E.MUL.F | 16 32 64 128 | NONE C F N X Z |
| complex multiply | E.MUL.CF | 16 32 64 | NONE |
| multiply sum | E.MUL.SUM.F | 16 32 64 | NONE |
| complex multiply sum | E.MUL.SUM.CF | 16 32 | NONE |

Format

E.op.prec.rnd rd=rc,rb rd=eopprecrnd(rc,rb)

| 31 24 | 23 18 | 17 12 | 11 6 | 5 0 |
|---|---|---|---|---|
| E.prec | rd | rc | rb | op.rnd |
| 8 | 6 | 6 | 6 | 6 |

FIG. 30B

Definition

```
def mul(size,v,i,w,j) as
    mul ← fmul(F(size,v_{size-1+i..i}),F(size,w_{size-1+j..j}))
enddef

def EnsembleFloatingPoint(op,prec,round,ra,rb,rc) as
    c ← RegRead(rc, 128)
    b ← RegRead(rb, 128)
    for i ← 0 to 128-prec by prec
        ci ← F(prec,c_{i+prec-1..i})
        bi ← F(prec,b_{i+prec-1..i})
        case op of
            E.ADD.F:
                ai ← faddr(ci,bi,round)
            E.MUL.F:
                ai ← fmul(ci,bi)
            E.MUL.C.F:
                if (i and prec) then
                    ai ← fadd(mul(prec,c,i,b,i-prec), mul(prec,c,i-prec,b,i))
                else
                    ai ← fsub(mul(prec,c,I,b,I), mul(prec,c,i+prec,b,i+prec))
                endif
            E.DIV.F..
                ai ← fdiv(ci,bi)
        endcase
        a_{i+prec-1..i} ← PackF(prec, ai, round)
    endfor
    RegWrite(rd, 128, a)
enddef
```

*FIG. 30C*

Definition

```
def mul(size,v,i,w,j) as
    mul ← fmul(F(size,v_size-1+i..i),F(size,w_size-1+j..j))
enddef

def EnsembleFloatingPoint(op,prec,round,rd,rc,rb) as
    c ← RegRead(rc, 128)
    b ← RegRead(rb, 128)
    case op of
        E.ADD.F:
            for i ← 0 to 128-prec by prec
                ci ← F(prec,c_i+prec-1..i)
                bi ← F(prec,b_i+prec-1..i)
                zi ← faddr(ci,bi,round)
                z_i+prec-1..i ← PackF(prec, zi, round)
            endfor
        E.MUL.F:
            for i ← 0 to 128-prec by prec
                ci ← F(prec,c_i+prec-1..i)
                bi ← F(prec,b_i+prec-1..i)
                zi ← fmul(ci,bi)
                z_i+prec-1..i ← PackF(prec, zi, round)
            endfor
        E.MUL.SUM.F:
            p[0].t ← NULL
            for i ← 0 to 128-prec by prec
                ci ← F(prec,c_i+prec-1..i)
                bi ← F(prec,b_i+prec-1..i)
                p[i+prec] ← fadd(p[i], fmul(ci,bi))
            endfor
            z ← PackF(prec, p[128], round)
        E.MUL.C.F:
            for i ← 0 to 128-prec by prec
                if (i and prec) then
                    zi ← fadd(mul(prec,c,i,b,i-prec), mul(prec,c,i-prec,b,i))
                else
                    zi ← fsub(mul(prec,c,i,b,i), mul(prec,c,i+prec,b,i+prec))
                endif
                z_i+prec-1..i ← PackF(prec, zi, round)
            endfor
        E.MUL.SUM.C.F:
            p[0].t ← NULL
            p[prec].t ← NULL
            for i ← 0 to 128-prec by prec
```

FIG. 30D-1

```
                if (i and prec) then
                    zi ← fadd(mul(prec,c,i,b,i-prec), mul(prec,c,i-prec,b,i))
                else
                    zi ← fsub(mul(prec,c,i,b,i), mul(prec,c,i+prec,b,i+prec))
                endif
                p[i+prec+prec] ← fadd(p(i), zi)
            endfor
            z ← PackF(prec, p[128+prec], round) || PackF(prec, p[128], round)
        E.DIV.F.:
            for i ← 0 to 128-prec by prec
                ci ← F(prec,c_{i+prec-1..i})
                bi ← F(prec,b_{i+prec-1..i})
                zi ← fdiv(ci,bi)
                z_{i+prec-1..i} ← PackF(prec, zi, round)
            endfor
    endcase
    RegWrite(rd, 128, z)
enddef
```

FIG. 30D-2

Exceptions

Floating-point arithmetic

FIG. 30E

Operation codes

| | |
|---|---|
| E.SUB.F.16 | Ensemble subtract floating-point half |
| E.SUB.F.16.C | Ensemble subtract floating-point half ceiling |
| E.SUB.F.16.F | Ensemble subtract floating-point half floor |
| E.SUB.F.16.N | Ensemble subtract floating-point half nearest |
| E.SUB.F.16.Z | Ensemble subtract floating-point half zero |
| E.SUB.F.16.X | Ensemble subtract floating-point half exact |
| E.SUB.F.32 | Ensemble subtract floating-point single |
| E.SUB.F.32.C | Ensemble subtract floating-point single ceiling |
| E.SUB.F.32.F | Ensemble subtract floating-point single floor |
| E.SUB.F.32.N | Ensemble subtract floating-point single nearest |
| E.SUB.F.32.Z | Ensemble subtract floating-point single zero |
| E.SUB.F.32.X | Ensemble subtract floating-point single exact |
| E.SUB.F.64 | Ensemble subtract floating-point double |
| E.SUB.F.64.C | Ensemble subtract floating-point double ceiling |
| E.SUB.F.64.F | Ensemble subtract floating-point double floor |
| E.SUB.F.64.N | Ensemble subtract floating-point double nearest |
| E.SUB.F.64.Z | Ensemble subtract floating-point double zero |
| E.SUB.F.64.X | Ensemble subtract floating-point double exact |
| E.SUB.F.128 | Ensemble subtract floating-point quad |
| E.SUB.F.128.C | Ensemble subtract floating-point quad ceiling |
| E.SUB.F.128.F | Ensemble subtract floating-point quad floor |
| E.SUB.F.128.N | Ensemble subtract floating-point quad nearest |
| E.SUB.F.128.Z | Ensemble subtract floating-point quad zero |
| E.SUB.F.128.X | Ensemble subtract floating-point quad exact |

*FIG. 31A*

Selection

| class | op | prec | round/trap |
|---|---|---|---|
| set | SET<br>E LG<br>L GE | 16 32 64 128 | NONE X |
| subtract | SUB | 16 32 64 128 | NONE C F N X Z |

Format

E.op.prec.round rd=rb,rc rd=eopprecround(rb,rc)

| 31 24 | 23 18 | 17 12 | 11 6 | 5 0 |
|---|---|---|---|---|
| E.prec | rd | rc | rb | op.round |
| 8 | 6 | 6 | 6 | 6 |

*FIG. 31B*

```
def EnsembleReversedFloatingPoint(op,prec,round,rd,rc,rb) as
    c ← RegRead(rc, 128)
    b ← RegRead(rb, 128)
    for i ← 0 to 128-prec by prec
        ci ← F(prec,c_{i+prec-1..i})
        bi ← F(prec,b_{i+prec-1..i})
        zi ← frsubr(ci,-bi, round)
        z_{i+prec-1..i} ← PackF(prec, zi, round)
    endfor
    RegWrite(rd, 128, z)
enddef
```

FIG. 31C

Operation codes

| | |
|---|---|
| X.COMPRESS.2 | Crossbar compress signed pecks |
| X.COMPRESS.4 | Crossbar compress signed nibbles |
| X.COMPRESS.8 | Crossbar compress signed bytes |
| X.COMPRESS.16 | Crossbar compress signed doublets |
| X.COMPRESS.32 | Crossbar compress signed quadlets |
| X.COMPRESS.64 | Crossbar compress signed octlets |
| X.COMPRESS.128 | Crossbar compress signed hexlet |
| X.COMPRESS.U.2 | Crossbar compress unsigned pecks |
| X.COMPRESS.U.4 | Crossbar compress unsigned nibbles |
| X.COMPRESS.U.8 | Crossbar compress unsigned bytes |
| X.COMPRESS.U.16 | Crossbar compress unsigned doublets |
| X.COMPRESS.U.32 | Crossbar compress unsigned quadlets |
| X.COMPRESS.U.64 | Crossbar compress unsigned octlets |
| X.COMPRESS.U.128 | Crossbar compress unsigned hexlet |
| X.EXPAND.2 | Crossbar expand signed pecks |
| X.EXPAND.4 | Crossbar expand signed nibbles |
| X.EXPAND.8 | Crossbar expand signed bytes |
| X.EXPAND.16 | Crossbar expand signed doublets |
| X.EXPAND.32 | Crossbar expand signed quadlets |
| X.EXPAND.64 | Crossbar expand signed octlets |
| X.EXPAND.128 | Crossbar expand signed hexlet |
| X.EXPAND.U.2 | Crossbar expand unsigned pecks |
| X.EXPAND.U.4 | Crossbar expand unsigned nibbles |
| X.EXPAND.U.8 | Crossbar expand unsigned bytes |
| X.EXPAND.U.16 | Crossbar expand unsigned doublets |
| X.EXPAND.U.32 | Crossbar expand unsigned quadlets |
| X.EXPAND.U.64 | Crossbar expand unsigned octlets |
| X.EXPAND.U.128 | Crossbar expand unsigned hexlet |
| X.ROTL.2 | Crossbar rotate left pecks |
| X.ROTL.4 | Crossbar rotate left nibbles |
| X.ROTL.8 | Crossbar rotate left bytes |
| X.ROTL.16 | Crossbar rotate left doublets |
| X.ROTL.32 | Crossbar rotate left quadlets |
| X.ROTL.64 | Crossbar rotate left octlets |
| X.ROTL.128 | Crossbar rotate left hexlet |
| X.ROTR.2 | Crossbar rotate right pecks |
| X.ROTR.4 | Crossbar rotate right nibbles |
| X.ROTR.8 | Crossbar rotate right bytes |
| X.ROTR.16 | Crossbar rotate right doublets |

*FIG. 32A-1*

| | |
|---|---|
| X.ROTR.32 | Crossbar rotate right quadlets |
| X.ROTR.64 | Crossbar rotate right octlets |
| X.ROTR.128 | Crossbar rotate right hexlet |
| X.SHL.2 | Crossbar shift left pecks |
| X.SHL.2.O | Crossbar shift left signed pecks check overflow |
| X.SHL.4 | Crossbar shift left nibbles |
| X.SHL.4.O | Crossbar shift left signed nibbles check overflow |
| X.SHL.8 | Crossbar shift left bytes |
| X.SHL.8.O | Crossbar shift left signed bytes check overflow |
| X.SHL.16 | Crossbar shift left doublets |
| X.SHL.16.O | Crossbar shift left signed doublets check overflow |
| X.SHL.32 | Crossbar shift left quadlets |
| X.SHL.32.O | Crossbar shift left signed quadlets check overflow |
| X.SHL.64 | Crossbar shift left octlets |
| X.SHL.64.O | Crossbar shift left signed octlets check overflow |
| X.SHL.128 | Crossbar shift left hexlet |
| X.SHL.128.O | Crossbar shift left signed hexlet check overflow |
| X.SHL.U.2.O | Crossbar shift left unsigned pecks check overflow |
| X.SHL.U.4.O | Crossbar shift left unsigned nibbles check overflow |
| X.SHL.U.8.O | Crossbar shift left unsigned bytes check overflow |
| X.SHL.U.16.O | Crossbar shift left unsigned doublets check overflow |
| X.SHL.U.32.O | Crossbar shift left unsigned quadlets check overflow |
| X.SHL.U.64.O | Crossbar shift left unsigned octlets check overflow |
| X.SHL.U.128.O | Crossbar shift left unsigned hexlet check overflow |
| X.SHR.2 | Crossbar signed shift right pecks |
| X.SHR.4 | Crossbar signed shift right nibbles |
| X.SHR.8 | Crossbar signed shift right bytes |
| X.SHR.16 | Crossbar signed shift right doublets |
| X.SHR.32 | Crossbar signed shift right quadlets |
| X.SHR.64 | Crossbar signed shift right octlets |
| X.SHR.128 | Crossbar signed shift right hexlet |
| X.SHR.U.2 | Crossbar shift right unsigned pecks |
| X.SHR.U.4 | Crossbar shift right unsigned nibbles |
| X.SHR.U.8 | Crossbar shift right unsigned bytes |
| X.SHR.U.16 | Crossbar shift right unsigned doublets |
| X.SHR.U.32 | Crossbar shift right unsigned quadlets |
| X.SHR.U.64 | Crossbar shift right unsigned octlets |
| X.SHR.U.128 | Crossbar shift right unsigned hexlet |

*FIG. 32A-2*

Redundancies

| | | |
|---|---|---|
| *X.ROTR.size rd=rd,rb* | ⇔ | X.SHR.M.size rd@rd,rb |

Selection

| class | op | size |
|---|---|---|
| precision | EXPAND EXPAND.U COMPRESS COMPRESS.U | 2 4 8 16 32 64 128 |
| shift | ROTR ROTL SHR SHL SHL.O SHL.U.O SHR.U | 2 4 8 16 32 64 128 |

Format

X.op.size rd=rc,rb rd=xopsize(rc,rb)

| 31 25 | 24 | 23 18 | 17 12 | 11 6 | 5 2 | 1 0 |
|---|---|---|---|---|---|---|
| XSHIFT | s | rd | rc | rb | op | sz |
| 7 | 1 | 6 | 6 | 6 | 4 | 2 | lsize ← log(size)

s ← $lsize_2$ sz ← $lsize_{1..0}$

FIG. 32B

Definition

```
def Crossbar(op,size,rd,rc,rb)
    c ← RegRead(rc, 128)
    b ← RegRead(rb, 128)
    shift ← b and (size-1)
    case op5..2 || 0^2 of
        X.COMPRESS:
            hsize ← size/2
            for i ← 0 to 64-hsize by hsize
                if shift ≤ hsize then
                    z[i+hsize-1..i] ← c[i+i+shift+hsize-1..i+i+shift]
                else
                    z[i+hsize-1..i] ← c[i+i+size-1]^(shift-hsize) || c[i+i+size-1..i+i+shift]
                endif
            endfor
            z[127..64] ← 0
        X.COMPRESS.U:
            hsize ← size/2
            for i ← 0 to 64-hsize by hsize
                if shift ≤ hsize then
                    z[i+hsize-1..i] ← c[i+i+shift+hsize-1..i+i+shift]
                else
                    z[i+hsize-1..i] ← 0^(shift-hsize) || c[i+i+size-1..i+i+shift]
                endif
            endfor
            z[127..64] ← 0
        X.EXPAND:
            hsize ← size/2
            for i ← 0 to 64-hsize by hsize
                if shift ≤ hsize then
                    z[i+i+size-1..i+i] ← c[i+hsize-1]^(hsize-shift) || c[i+hsize-1..i] || 0^shift
                else
                    z[i+i+size-1..i+i] ← c[i+size-shift-1..i] || 0^shift
                endif
            endfor
        X.EXPAND.U:
            hsize ← size/2
            for i ← 0 to 64-hsize by hsize
                if shift ≤ hsize then
                    z[i+i+size-1..i+i] ← 0^(hsize-shift) || c[i+hsize-1..i] || 0^shift
                else
                    z[i+i+size-1..i+i] ← c[i+size-shift-1..i] || 0^shift
```

FIG. 32C-1

```
                endif
            endfor
        X.ROTL:
            for i ← 0 to 128-size by size
                z_{i+size-1..i} ← c_{i+size-1-shift..i} || c_{i+size-1..i+size-1-shift}
            endfor
        X.ROTR:
            for i ← 0 to 128-size by size
                z_{i+size-1..i} ← c_{i+shift-1..i} || c_{i+size-1..i+shift}
            endfor
        X.SHL:
            for i ← 0 to 128-size by size
                z_{i+size-1..i} ← c_{i+size-1-shift..i} || 0^{shift}
            endfor
        X.SHL.O:
            for i ← 0 to 128-size by size
                if c_{i+size-1..i+size-1-shift} ≠ c^{shift+1}_{i+size-1-shift} then
                    raise FixedPointArithmetic
                endif
                z_{i+size-1..i} ← c_{i+size-1-shift..i} || 0^{shift}
            endfor
        X.SHL.U.O:
            for i ← 0 to 128-size by size
                if c_{i+size-1..i+size-shift} ≠ 0^{shift} then
                    raise FixedPointArithmetic
                endif
                z_{i+size-1..i} ← c_{i+size-1-shift..i} || 0^{shift}
            endfor
        X.SHR:
            for i ← 0 to 128-size by size
                z_{i+size-1..i} ← c^{shift}_{i+size-1} || c_{i+size-1..i+shift}
            endfor
        X.SHR.U:
            for i ← 0 to 128-size by size
                z_{i+size-1..i} ← 0^{shift} || c_{i+size-1..i+shift}
            endfor
    endcase
    RegWrite(rd, 128, z)
enddef
```

FIG. 32C-2

Compress 32 bits to 16, with 4-bit right shift

Exceptions

Fixed-point arithmetic

FIG. 32E

Operation codes

| | |
|---|---|
| X.EXTRACT | Crossbar extract |

Format

X.EXTRACT ra=rd,rc,rb ra=xextract(rd,rc,rb)

| 31 24 | 23 18 | 17 12 | 11 6 | 5 0 |
|---|---|---|---|---|
| X.EXTRACT | rd | rc | rb | ra |
| 8 | 6 | 6 | 6 | 6 |

FIG. 33A

Definition

```
def CrossbarExtract(op,ra,rb,rc,rd) as
    d ← RegRead(rd, 128)
    c ← RegRead(rc, 128)
    b ← RegRead(rb, 128)
    case b8..0 of
        0..255:
            gsize ← 128
        256..383:
            gsize ← 64
        384..447:
            gsize ← 32
        448..479:
            gsize ← 16
        480..495:
            gsize ← 8
        496..503:
            gsize ← 4
        504..507:
            gsize ← 2
        508..511:
            gsize ← 1
    endcase
    m ← b12
    as ← signed ← b14
    h ← (2-m)*gsize
    spos ← (b8..0) and ((2-m)*gsize-1)
    dpos ← (0 || b23..16) and (gsize-1)
    sfsize ← (0 || b31..24) and (gsize-1)
    tfsize ← (sfsize = 0) or ((sfsize+dpos) > gsize) ? gsize-dpos : sfsize
    fsize ← (tfsize + spos > h) ? h - spos : tfsize
    for i ← 0 to 128-gsize by gsize
        case op of
            X.EXTRACT:
                if m then
                    p ← dgsize+i-1..i
                else
                    p ← (d || c)2*(gsize+i)-1..2*i
                endif
        endcase
        v ← (as & ph-1)||p
        w ← (as & vspos+fsize-1)^(gsize-fsize-dpos) || vfsize-1+spos..spos || 0^dpos
        if m then
            asize-1+i..i ← cgsize-1+i..dpos+fsize+i || wdpos+fsize-1..dpos || cdpos-1+i..i
        else
            asize-1+i..i ← w
        endif
    endfor
    RegWrite(ra, 128, a)
enddef
```

*FIG. 33B*

Crossbar extract

Crossbar merge extract

Crossbar expand extract

Definition

```
def CrossbarExtract(op,ra,rb,rc,rd) as
    d ← RegRead(rd, 128)
    c ← RegRead(rc, 128)
    b ← RegRead(rb, 32)
    case b8..0 of
        0..255:
            gsize ← 128
        256..383:
            gsize ← 64
        384..447:
            gsize ← 32
        448..479:
            gsize ← 16
        480..495:
            gsize ← 8
        496..503:
            gsize ← 4
        504..507:
            gsize ← 2
        508..511:
            gsize ← 1
    endcase
    m ← b12
    zs ← signed ← b14
    x ← b15
    h ← (2-(m or x))*gsize
    spos ← (b8..0) and ((2-m)*gsize-1)
    dpos ← (0 || b23..16) and (gsize-1)
    sfsize ← (0 || b31..24) and (gsize-1)
    tfsize ← (sfsize = 0) or ((sfsize+dpos) > gsize) ? gsize-dpos : sfsize
    fsize ← (tfsize + spos > h) ? h - spos : tfsize
    for i ← 0 to 128-gsize by gsize
        case op of
            X.EXTRACT:
                if m or x then
                    p ← c(gsize+i-1..i)
                else
                    p ← (c || d)(2*(gsize+i)-1..2*i)
                endif
        endcase
        v ← p
        w ← (zs & v(spos+fsize-1))^(gsize-fsize-dpos) || v(fsize-1+spos..spos) || 0^(dpos)
        if m then
```

FIG. 33F-1

```
            z_{gsize-1+i..i} ← d_{gsize-1+i..dpos+fsize+i} || w_{dpos+fsize-1..dpos} || d_{dpos-1+1..i}
        else
            z_{gsize-1+i..i} ← w
        endif
    endfor
    RegWrite(ra, 128, z)
enddef
```

FIG. 33F-2

Exceptions none

FIG. 33G

| | |
|---|---|
| X.SHUFFLE.4 | Crossbar shuffle within pecks |
| X.SHUFFLE.8 | Crossbar shuffle within bytes |
| X.SHUFFLE.16 | Crossbar shuffle within doublets |
| X.SHUFFLE.32 | Crossbar shuffle within quadlets |
| X.SHUFFLE.64 | Crossbar shuffle within octlets |
| X.SHUFFLE.128 | Crossbar shuffle within hexlet |
| X.SHUFFLE.256 | Crossbar shuffle within triclet |

FIG. 34A

Format

X.SHUFFLE.256 rd=rc,rb,v,w,h
X.SHUFFLE.size rd=rcb,v,w rd=xshuffle256(rc,rb,v,w,h)
rd=xshufflesize(rcb,v,w)

| 31 24 | 23 18 | 17 12 | 11 6 | 5 0 |
|---|---|---|---|---|
| X.SHUFFLE | rd | rc | rb | op |
| 8 | 6 | 6 | 6 | 6 | rc ← rb ← rcb
x←$\log_2$(size)
y←$\log_2$(v)
z←$\log_2$(w)
op ← ((x*x*x-3*x*x-4*x)/6-(z*z-z)/2+x*z+y) + (size=256)*(h*32-56)

*FIG. 34B*

Definition

```
def CrossbarShuffle(major,rd,rc,rb,op)
    c ← RegRead(rc, 128)
    b ← RegRead(rb, 128)
    if rc=rb then
        case op of
            0..55:
                for x ← 2 to 7; for y ← 0 to x-2; for z ← 1 to x-y-1
                    if op = ((x*x*x-3*x*x-4*x)/6-(z*z-z)/2+x*z+y) then
                        for i ← 0 to 127
                            ai ← c(i6..x || iy+z-1..y || ix-1..y+z || iy-1..0)
                        end
                    endif
                endfor; endfor; endfor
            56..63:
                raise ReservedInstruction
        endcase
    elseif
        case op4..0 of
            0..27:
                cb ← c || b
                x ← 8
                h ← op5
                for y ← 0 to x-2; for z ← 1 to x-y-1
                    if op4..0 = ((17*z-z*z)/2-8+y) then
                        for i ← h*128 to 127+h*128
                            ai-h*128 ← cb(iy+z-1..y || ix-1..y+z || iy-1..0)
                        end
                    endif
                endfor; endfor
            28..31:
                raise ReservedInstruction
        endcase
    endif
    RegWrite(rd, 128, a)
enddef
```

FIG. 34C 4-way shuffle bytes within hexlet 4-way shuffle bytes within triclet

Operation codes

| | |
|---|---|
| X.SHUFFLE | Crossbar shuffle within hexlet |
| X.SHUFFLE.PAIR | Crossbar shuffle within triclet |

Format

X.SHUFFLE.PAIR rd=rc,rb,v,w,h
X.SHUFFLE rd=rcb,size,v,w rd=xshufflepair (rc,rb,v,w,h)
rd=xshuffle(rcb,size,v,w)

| 31 … 24 | 23 … 18 | 17 … 12 | 11 … 6 | 5 … 0 |
|---|---|---|---|---|
| **X.SHUFFLE** | **rd** | **rc** | **rb** | **op** |
| 8 | 6 | 6 | 6 | 6 |

For xshufflepair: size ← 256
For xshuffle: rc ← rb ← rcb $x \leftarrow \log_2(\text{size})$
$y \leftarrow \log_2(v)$
$z \leftarrow \log_2(w)$
$op \leftarrow ((x*x*x-3*x*x-4*x)/6-(z*z-z)/2+x*z+y) + (rc \neq rb)*(h*32-56)$

FIG. 34F

Definition

```
def CrossbarShuffle(major,rd,rc,rb,op)
    c ← RegRead(rc, 128)
    b ← RegRead(rb, 128)
    if rc=rb then
        case op of
            0..55:
                for x ← 2 to 7; for y ← 0 to x-2; for z ← 1 to x-y-1
                    if op = ((x*x*x-3*x*x-4*x)/6-(z*z-z)/2+x*z+y) then
                        for i ← 0 to 127
                            a_i ← c_(i_6..x || i_y+z-1..y || i_x-1..y+z || i_y-1..0)
                        end
                    endif
                endfor; endfor; endfor
            56..63:
                raise ReservedInstruction
        endcase
    elseif
        case op_4..0 of
            0..27:
                bc ← b || c
                x ← 8
                h ← op_5
                for y ← 0 to x-2; for z ← 1 to x-y-1
                    if op_4..0 = ((17*z-z*z)/2-8+y) then
                        for i ← h*128 to 127+h*128
                            a_i-h*128 ← bc_(i_y+z-1..y || i_x-1..y+z || i_y-1..0)
                        end
                    endif
                endfor; endfor
            28..31:
                raise ReservedInstruction
        endcase
    endif
    RegWrite(rd, 128, a)
enddef
```

FIG. 34G

Exceptions

Reserved Instruction

FIG. 34H

Wide Solve Galois

```
static      v8_t      wsolveg(v8_thh, v8_t syndrome, v8_t *omega)

for (r=0; r < N_PARITY; r++)                                                    /*: A + 16* (B+A):*/
  {
    delta = _xcopyi8(delta0, 0);                                                  /*: 16*X :*/
    delta0s = _castv8(_xshrm128(_castv128(delta0),_castv128(delta1),8));          /*: 16*X :*/
    delta1s = _reindex8(delta1, -1);                                              /*: 16*X :*/
    delta0 = _gxor8(_emulg8(gamma, delta0s, hh),_emulg8(delta,theta0, hh));       /*: 16*(2*E+G) :*/
    delta1 = _gxor8(_emulg8(gamma, delta1s, hh),_emulg8(delta,theta1, hh));       /*: 16*(2*E+G) :*/
    s = _gsetandne8(delta, _gsetge8(k,_gzero8));                                  /*: 16*2*G) :*/
    theta0 = _gmux8(s, delta0s,theta0);                                           /*: 16*G) :*/
    theta1 = _gmux8(s, delta1s,theta1);                                           /*: 16*G) :*/
    gamma = _gmux8(s, delta,gamma);                                               /*: 16*G) :*/
    k = _gmux8(s,_gnot8(k),_gadd8(k,_gone8));                                     /*: 16*3*G) :*/
  }
    lamba = _xselect8(delta1,delta0,USE_VCONST(lambdai));                         /*: X :*/
    omega = _castv8((_xwithdrawu128(_castv128(delta0), 64, 0));                   /*: X :*/
```

Figure 35B

```
/*****************************************************************/
/*  DSP library module:  Inverse FFT, selectable length,          */
/*                                    16-bit complex integers,    */
/*                                    split-radix algorithm         */
/*                                                                  */
/*****************************************************************/

/* includes files */
#include <stdio.h>
#include "broadmx.h"
#include "affirm.h"
#include "dspFFTud.h"
#include <math.h>

#define SHOW        0

/* typed version of _gboolean: should be part of gops */
static INLINE v16_t   _gboolean16(v16_t src1, v16_t src2, v16_t src3, int imm)
{
  return _gboolean(src1.rr, src2.rr, src3.rr, imm).v16;
}

/*-------------------------------------------------------------
 * I * (a – b) / 2
 */
static     inline     vc16_t     _sub_mul_by_i_c16(vc16_taa, vc16_t bb)
{
    v16_t muxmask             =_castv16(_goopyi32(0xFFFF));
    v16_t xx;

    /* xx = _gsubh16n(_gmux16(muxmask,aa,bb),_gmux16(muxmask,bb,aa));*/
    xx = _gsubh16n(_gxor16(muxmask,bb),_gxor16(muxmask,aa));
    xx = _xswizzle16(xx, 7, 1);
    return xx;
```

Fig. 36B

```
/*---------------------------------------------------------------------------
 * Perform 4 independent 4-point fft's
 *
 * x0..x3 holds the input to the transform, 4 sets of 4 complex numbers.
 * Each set is inverse-fourier transformed independently of the others.
 * The results appear in x0..x3.  The original values of y0..y3 are corrupted.
 */
#define QUAD_IFFT_4PT_c16(_y0,_y1,_y2,_y3, _x0,_x1,_x2,_x3)    { \
  _y0 = _gaddh16n(_x0,_x2);                                  \
  _y1 = _gaddh16n(_x1,_x3);                                  \
  _y2 = _gsubh16n(_x0,_x2);                                  \
  _y3 = _sub_mul_by_i_c16(_x1,_3);                           \
  _x0 = _gaddh16n(_y0,_y1);                                  \
  _x2 = _gsubh16n(_y0,_y1);                                  \
  _x1 = _gaddh16n(_y2,_y3);                                  \
  _x3 = _gsubh16n(_y2,_y3);                                  \
}

/*---------------------------------------------------------------------------
 * Perform 4 independent 24-point fft's
 *
 * x0..x13 holds the input to the transform, 4 sets of 24 complex numbers.
 * Each set is inverse-fourier transformed independently of the others.
 * The results appear in y0..y1.
 */
#define QUAD_IFFT_2PT_c16(_y0,_y1, _x0,_x1)    { \
  _y0 = _gaddh16n(_x0,_x2);                  \
  _y1 = _gaddh16n(_x1,_x3);                  \
}
```

Fig. 36B (cont)

```
static int_wffslicec16(vc16_t *dp, vc16_t *tp, int dn, int ds, int tn, int radix, int reorder, int extract)
{
  int i,j,ii, logmost;
  vc16_t *dwp, *twp;
  vc16_t t0,t1,t2,t3, d0,d1,d2,d3, p0,p1,p2,p3, z0,z1,z2,z3, m, n;

  if(SHOW) printf
  9"extract = %d\n",extract&0xf);
  n = m = gcopyi16(0);
  if (radix==4) {
    if (ds==1) {
      for (twp=tp,i=0; i<tn; dp++,twp++,i+=NELEMC16) {
        t0 = twp[0];
        d0 = dp[0];
        p0 = emulx16(t0,d0,extract);
        z0 = _xshri16(p0,1);
        n = _gboolean16(n,p0,z0,0xf6);
        d0 = vput16(d0,0,(_vget16(p0,0)+_vget16(p0,2)+_vget16(p0,4)+_vget16(p0,6)+2)>>2);
        d0 = vput16(d0,1,(_vget16(p0,1)+_vget16(p0,3)+_vget16(p0,5)+_vget16(p0,7)+2)>>2);
        d0 = vput16(d0,4,(_vget16(p0,0)-_vget16(p0,2)+_vget16(p0,4)+_vget16(p0,6)+2)>>2);
        d0 = vput16(d0,5,(_vget16(p0,1)-_vget16(p0,3)+_vget16(p0,5)+_vget16(p0,7)+2)>>2);
        d0 = vput16(d0,2,(_vget16(p0,0)-_vget16(p0,3)-_vget16(p0,4)+_vget16(p0,7)+2)>>2);
        d0 = vput16(d0,3,(_vget16(p0,1)+_vget16(p0,2)-_vget16(p0,5)+_vget16(p0,6)+2)>>2);
        d0 = vput16(d0,6,(_vget16(p0,0)+_vget16(p0,3)-_vget16(p0,4)+_vget16(p0,7)+2)>>2);
        d0 = vput16(d0,7,(_vget16(p0,1)-_vget16(p0,2)-_vget16(p0,5)+_vget16(p0,6)+2)>>2);
        z0 = _xshri16(d0,1);
        m = _gboolean16(m,d0,z0,0xf6);
        dp[0] = d0;
      }
    } else {
      ii = ds / NELEMC16;
      for (twp=tp,i=0; 1<tn; dp++,twp++,it=4*NELEMC16) {
        t0 = twp[0*ii];
        t1 = twp[1*ii];
        t2 = twp[2*ii];
        t3 = twp[3*ii];
        for (dwp=dpj=0; j<dn; dwp+=4*iij+=4*ds) {
          d0 = dwp[0*ii];
          d1 = dwp[1*ii];
          d2 = dwp[2*ii];
          d3 = dwp[3*ii];
          d0 = _emulx16(t0,d0, extract); // can be eextract
          d1 = _emulx16(t1,d1, extract);
          d2 = _emulx16(t2,d2, extract);
          d3 = _emulx16(t3,d3, extract);
          z0 = _xshri16(d0,1);
          z1 = _xshri16(d1,1);
          z2 = _xshri16(d2,1);
          z3 = _xshri16(d3,1);
          n = _gboolean16(n,d0,z0,0xf6);
          n = _gboolean16(n,d1,z1,0xf6);
          n = _gboolcan16(n,d2,z2,0xf6);
          n = _gboolean16(n,d3,z3,0xf6);
```

Fig. 36B (cont)

```
          QUAD_1FFT_4PT_c16(p0,p1,p2,p3, d0,d1,d2,d3);
          z0 = _xshri16(d0,1);
          z1 = _xshri16(d1,1);
          z2 = _xshri16(d2,1);
          z3 = _xshri16(d3,1);
          m = _gboolean16(m,d0,z0,0xf6);
          m = _gboolean16(m,d1,z1,0xf6);
          m = _gboolean16(m,d2,z2,0xf6);
          m = _gboolean16(m,d3,z3,0xf6);
          dwp[0*ii] = d0;
          dwp[1*ii] = d1;
          dwp[2*ii] = d2;
          dwp[3*ii] = d3;
          }
        }
      }
    } else if (radix==2) {
      ii = ds / NELEMC16;
      for (twp=tp,i=0; i<tn; dp++,twp++,i+=2*NELEMC16) {
        t0 = twp[0*ii];
        t1 = twp[1*ii];
        for (dwp=dpj=0; j<dn; dwp+=2*iij+=2*ds) {
          d0 = dwp[0*ii];
          d1 = dwp[1*ii];
          p0 = _emulx16(t0,d0, extract); // can be eextract
          p1 = _emulx16(t1,d1, extract);
          z0 = _xshri16(p0,1);
          z1 = _xshri16(p1,1);
          n = _gboolean16(n,p0,z0,0xf6);
          n = _gboolean16(n,p1,z1,0xf6);
          QUAD_1FFT_2PT_c16(d0,d1, p0,p1);
          z0 = _xshri16(d0,1);
          z1 = _xshri16(d1,1);
          m = _gboolean16(m,d0,z0,0xf6);
          m = _gboolean16(m,d1,z1,0xf6);
          dwp[0*ii] = d0;
          dwp[1*ii] = d1;
        }
      }
    } else {
      for (j=0; j<dn; dp++,tp++j+=NELEMC16) {
        *dp = d0 = *tp;
        z0 = _xshri16(d0,1);
        m = _gboolean16(m,d0,z0,0xf6);
      }
      n = m;
    }
```

Fig. 36B (cont)

```
n = _gor16(n,_castv16(_xshriu128(_castv128(n),64)));
n = _gor16(n,_castv16(_xshriu128(_castv128(n),32)));
n = _gor16(n,_castv16(_xshriu128(_castv128(n),16)));
logmost = _vget16(_elogmost16(n),0);
if(SHOW) printf("logmost = %d (after mulx)\n",logmost);
m = _gor16(m,_castv16(_xshriu128(_castv128(m),64)));
m = _gor16(m,_castv16(_xshriu128(_castv128(m),32)));
m = _gor16(m,_castv16(_xshriu128(_castv128(m),16)));
logmost = _vget16(_elogmost16(m),0);
if(SHOW) printf("logmost = %d (after addh)\n",logmost);
return logmost;
}

static      cplx16     const       exptab[][4] =
#define 1FFT_COEFS_16
#include "dsp1FFT-coefs.h"
#undef 1FFT_COEFS_16
;

static      void       make_twiddle(cplxi16 *tw, int ni, int nj, int len, int show)
{
  int                  ii, jj;

  for(ii = 0; ii < ni; ++ii) {
    for(jj = 0; jj < nj; ++jj) {
      tw->re = rint(-32768*cos(2*M_P1/len*ii*jj));
      tw->im = rint(-32768*sin(2*M_P1/len*ii*jj));
      if(show) printf("twiddle[%d][%d] = (%7d,%7d)\n", ii, jj, tw->re, tw->im);
      ++tw;
    }
  }
}

int dspInverseFourier_slice_c16(cplxi16 *out, cplxi16 const *in, int len)
{
  int logmost, extract, scale;
  static eplxi16 twidtab[12][1024];
  int i, j, k, l;
  int ds, tn;

  for(i = 0; i < len; ++i) {
      twidtab[0][i],re = -32768;
      twidtab[0][i].im = 0;
  }
  make_twiddle(&twidtab[1][0], 4, 4, 16, 0);
  make_twiddle(&twidtab[2][0], 4, 16, 64, 0);
  make_twiddle(&twidtab[3][0], 4, 64, 256, 0);
  make_twiddle(&twidtab[4][0], 2, 256, 512, 0);
```

Fig. 36B (cont)

```
scale = 0
logmost = 0
  if(len == 4) {
          logmost = _wffslicec16(vc16_t*)out, (vc16_t *)in, len, 0, 0, 1, 0, 0);
          scale = 16 – logmost;
          extract = (1<<14) + (1<<13) + (2<<9) + (512-4*16+logmost+1);
          logmost = _wffslicec16(vc16_t*)out, (vc16_t *)twidtab[0], len, 1, len, 4, 0, extract);
} else if(len == 16) {
          logmost = _wffslicec16(vc16_t*)out, (vc16_t *)in, len, 0, 0, 1, 0, 0);
          scale = 16 – logmost;
          extract = (1<<14) + (1<<13) + (2<<9) + (512-4*16+logmost+1);
          logmost = _wffslicec16(vc16_t*)out, (vc16_t *)twidtab[0], len, 1, len 4, 0, extract);
          scale += 16 – logmost;
          extract = (1<<14) + (1<<13) + (2<<9) + (512-4*16+logmost+1);
          logmost = _wffslicec16(vc16_t*)out, (vc16_t *)twidtab[1], len, 4, 16, 4, 0, extract);
} else if(len == 64) {
          logmost = _wffslicec16(vc16_t*)out, (vc16_t *)in, len, 0, 0, 1, 0, 0);
          scale = 16 – logmost;
          extract = (1<<14) + (1<<13) + (2<<9) + (512-4*16+logmost+1);
          logmost = _wffslicec16(vc16_t*)out, (vc16_t *)twidtab[0], len, 1, len, 4, 0, extract);
          scale += 16 – logmost;
          extract = (1<<14) + (1<<13) + (2<<9) + (512-4*16+logmost+1);
          logmost = _wffslicec16(vc16_t*)out, (vc16_t *)twidtab[1], len, 4, 16, 4, 0, extract);
          scale += 16 – logmost;
          extract = (1<<14) + (1<<13) + (2<<9) + (512-4*16+logmost+1);
          logmost = _wffslicec16(vc16_t*)out, (vc16_t *)twidtab[2], len, 16, 64, 4, 0, extract);
          scale -= 2;
} else if(len == 256) {
          logmost = _wffslicec16(vc16_t*)out, (vc16_t *)in, len, 0, 0, 1, 0, 0);
          scale = 16 – logmost;
          extract = (1<<14) + (1<<13) + (2<<9) + (512-4*16+logmost+1);
          logmost = _wffslicec16(vc16_t*)out, (vc16_t *)twidtab[0], len, 1, len, 4, 0, extract);
          scale += 16 – logmost;
          extract = (1<<14) + (1<<13) + (2<<9) + (512-4*16+logmost+1);
          logmost = _wffslicec16(vc16_t*)out, (vc16_t *)twidtab[1], len, 4, 16, 4, 0, extract);
          scale += 16 – logmost;
          extract = (1<<14) + (1<<13) + (2<<9) + (512-4*16+logmost+1);
          logmost = _wffslicec16(vc16_t*)out, (vc16_t *)twidtab[2], len, 16, 64, 4, 0, extract);
          scale += 16 – logmost;
          extract = (1<<14) + (1<<13) + (2<<9) + (512-4*16+logmost+1);
          logmost = _wffslicec16(vc16_t*)out, (vc16_t *)twidtab[3], len, 64, 256, 4, 0, extract);
          scale -= 4;
```

Fig. 36B (cont)

```
} else if(len == 512) {
        logmost = _wffslicec16(vc16_t*)out, (vc16_t *)in, len, 0, 0, 1, 0, 0);
        scale = 16 -  logmost;
        extract = (1<<14) + (1<<13) + (2<<9) + (512-4*16+logmost+1);
        logmost = _wffslicec16(vc16_t*)out, (vc16_t *)twidtab[0], len, 1, len, 4, 0, extract);
        scale += 16 - logmost;
        extract = (1<<14) + (1<<13) + (2<<9) + (512-4*16+logmost+1);
        logmost = _wffslicec16(vc16_t*)out, (vc16_t *)twidtab[1], len, 4, 16, 4, 0, extract);
        scale += 16 - logmost;
        extract = (1<<14) + (1<<13) + (2<<9) + (512-4*16+logmost+1);
        logmost = _wffslicec16(vc16_t*)out, (vc16_t *)twidtab[2], len, 16, 64, 4, 0, extract);
        scale += 16 - logmost;
        extract = (1<<14) + (1<<13) + (2<<9) + (512-4*16+logmost+1);
        logmost = _wffslicec16(vc16_t*)out, (vc16_t *)twidtab[3], len, 64, 256, 4, 0, extract);
        scale += 16 - logmost;
        extract = (1<<14) + (1<<13) + (2<<9) + (512-4*16+logmost+1);
        logmost = _wffslicec16(vc16_t*)out, (vc16_t *)twidtab[4], len, 256, 512, 2, 0, extract);
        scale -= 7;
  }
  if(SHOW) printf("scale = %d\n",scale);
  return scale;
```

Fig. 36B (cont)

Format

W.CONVOLVE.X.order ra=rc,rd,rb ra=wop(rc,rd,rb)

| 31 24 | 23 18 | 17 12 | 11 6 | 5 0 |
|---|---|---|---|---|
| W.op | rd | rc | rb | ra |
| 8 | 6 | 6 | 6 | 6 |

Fig. 37A

Definition

```
def mul(size,h,vs,v,i,ws,w,j) as
    mul ← ((vs&v_{size-1+i})^{h-size} || v_{size-1+i..i}) * ((ws&w_{size-1+j})^{h-size} || w_{size-1+j..j})
enddef

def WideConvolveExtract(op,ra,rb,rc,rd)
    d ← RegRead(rd, 64)
    c ← RegRead(rc, 64)
    b ← RegRead(rb, 128)
    case b_{8..0} of
        0..255:
            sgsize ← 128
        256..383:
            sgsize ← 64
        384..447:
            sgsize ← 32
        448..479:
            sgsize ← 16
        480..495:
            sgsize ← 8
        496..503:
            sgsize ← 4
        504..507:
            sgsize ← 2
        508..511:
            sgsize ← 1
    endcase
    l ← b_{11}
    m ← b_{12}
    n ← b_{13}
    signed ← b_{14}
    x ← b_{15}
    if (c_{2..0} ≠ 0) or (d_{2..0} ≠ 0) then
        raise ReservedInstruction
    endif
    cwsize ← (c and (0-c)) || 0^5
    ct ← c and (c-1)
    cmsize ← (ct and (0-ct)) || 0^4
    ca ← ct and (ct-1)
    lcmsize ← log(cmsize)
    lcwsize ← log(cwsize)
    cm ← LoadMemory(c,ca,cmsize,order)
    dwsize ← (d and (0-d)) || 0^5
    dt ← d and (d-1)
    dmsize ← (dt and (0-dt)) || 0^4
    da ← dt and (dt-1)
    ldmsize ← log(dmsize)
    ldwsize ← log(dwsize)
    dm ← LoadMemory(d,da,dmsize,order)
    if (sgsize < 8) or (sgsize > wsize/2) then
        raise ReservedInstruction
```

Fig. 37B

```
endif
gsize ← sgsize
lgsize ← log(gsize)
case op of
      W.CONVOLVE.X.B:
            order ← B
      W.CONVOLVE.X.L:
            order ← L
endcase
cs ← signed
ds ← signed ^ m
zs ← signed or m or n
zsize ← gsize*(x+1)
h ← (2*gsize) + ldmsize - lgsize
spos ← (b8..0) and (2*gsize-1)
dpos ← (0 || b23..16) and (zsize-1)
r ← spos
sfsize ← (0 || b31..24) and (zsize-1)
tfsize ← (sfsize = 0) or ((sfsize+dpos) > zsize) ? zsize-dpos : sfsize
fsize ← (tfsize + spos > h+1) ? h+1 - spos : tfsize
if (b10..9 = Z) and not zs then
      rnd ← F
else
      rnd ← b10..9
endif
mzero ← b95..64
mpos ← b63..32
oo ← mpos || 0^3
ox ← oo_lcwsize-1..lgsize
oy ← oo_lcmsize-1..lcwsize
zz ← (~mzero) || 1^3
zx ← zz_ldwsize-1..lgsize
zy ← zz_ldmsize-1..ldwsize
```

Fig. 37B (cont)

```
        for k ← 0 to 128-zsize by zsize
                i ← k*gsize/zsize
                ix ← i_{lcwsize-1..lgsize}
                iy ← i_{lcmsize-1..lcwsize}
                q[0] ← 0^h
                for j ← 0 to dmsize-gsize by gsize
                        jj ← n and j_{lgsize} and not i_{lgsize}
                        jx ← j_{ldwsize-1..lgsize}
                        jy ← j_{ldmsize-1..ldwsize}
                        u ← (oy+iy-jy)_{lcmsize-lcwsize-1..0} || (ox+ix-jx-2*jj)_{lcmsize-lcwsize-1..0} || 0^{lgsize}
                        if (jx>zx) or (jy>zy) and (dm_{lgsize-1+j..j}0 ) and undefined then
                                q[j+gsize] ← q[j]
                        else
                                if jj then
                                        q[j+gsize] ← q[j] - mul(gsize,h,cs,cm,u,ds,dm,j)
                                else
                                        q[j+gsize] ← q[j] + mul(gsize,h,cs,cm,u,ds,dm,j)
                                endif
                        endif
                endfor
                p ← q[dmsize]
                case rnd of
                        none, N:
                                s ← 0^{h-r} || ~p_r || ~p_r^{r-1}
                        Z:
                                s ← 0^{h-r} || p^r_{h-1}
                        F:
                                s ← 0^h
                        C:
                                s ← 0^{h-r} || 1^r
                endcase
                v ← ((zs & p_{h-1})||p) + (0||s)
                if (v_{h..r+fsize} = (zs & v_{r+fsize-1})^{h+1-r-fsize}) or not l then
                        w ← (zs & v_{r+fsize-1})^{zsize-fsize-dpos} || v_{fsize-1+r..r} || 0^{dpos}
                else
                        w ← (zs ? (v_h^{zsize-fsize-dpos+1} || ~v_h^{fsize-1}) : 0^{zsize-fsize-dpos} || 1^{fsize}) || 0^{dpos}
                endif
                z_{zsize-1+k..k} ← w
        endfor
        RegWrite(ra, 128, z)
enddef
```

Fig. 37B (cont)

msize = wsize * vsize spec = base + msize/16 + wsize/32

Wide operand specifier for wide convolve extract

Wide convolve extract doublets

Wide convolve extract doublets

Wide convolve extract doublets

Wide convolve extract doublets two-dimensional

Wide convolve extract doublets two-dimensional

Wide convolve extract complex doublets

Wide convolve extract complex doublets

Operation codes

| | |
|---|---|
| W.CONVOLVE.X.B | Wide convolve extract big-endian |
| W.CONVOLVE.X.L | Wide convolve extract little-endian |

Selection

| class | op | order |
|---|---|---|
| Convolve extract | W.CONVOLVE.X | B L |

Format

W.CONVOLVE.X.order ra=rc,rd,rb ra= wcolvolvexorder(rc,rd,rb)

| 31 24 | 23 18 | 17 12 | 11 6 | 5 0 |
|---|---|---|---|---|
| W.op.order | rd | rc | rb | ra |
| 8 | 6 | 6 | 6 | 6 |

FIG. 37L

Exceptions

Reserved Instruction
Operand Boundary
Access disallowed by tag
Access disallowed by global TB
Access disallowed by local TB
Access detail required by tag
Access detail required by local TB
Access detail required by global TB
Local TB miss

FIG. 37M

Figure 38 Wide Embedded Cache Coherency
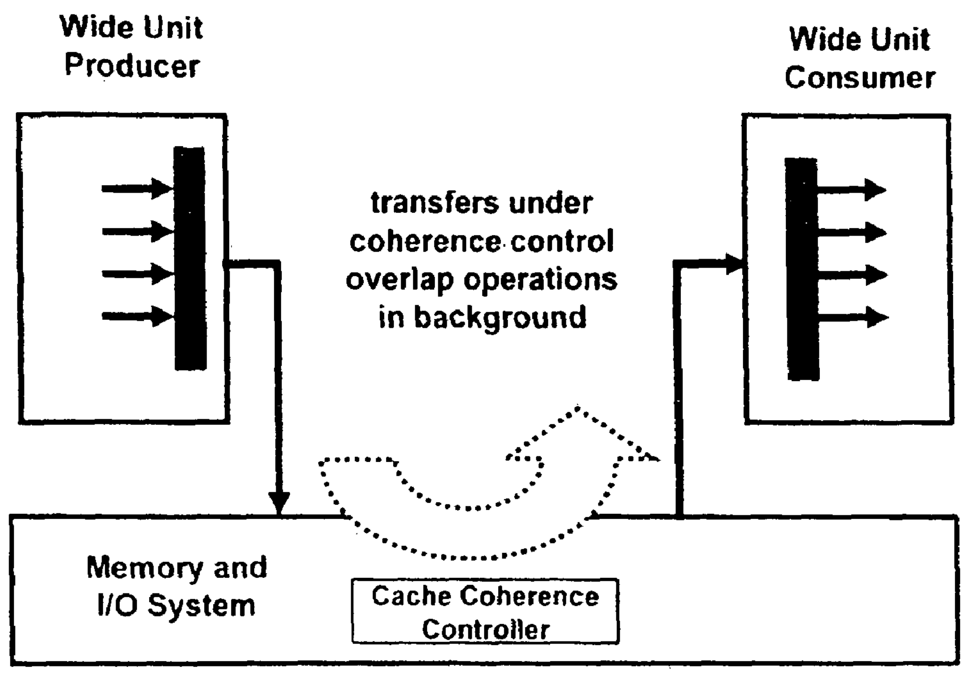

Definition

```
def eb ← ebits(prec) as
    case pref of
        16:
            eb ← 5
        32:
            eb ← 8
        64:
            eb ← 11
        128:
            eb ← 15
    endcase
enddef

def eb ← ebias(prec) as
    eb ← 0 || 1^(ebits(prec)-1)
enddef

def fb ← fbits(prec) as
    fb ← prec – 1 – eb
enddef

def a ← F(prec, ai) as
    a.s ← ai_(prec-1)
    ae ← ai_(prec-2..fbits(prec))
    af ← ai_(fbits(prec)-1..0)
    if ae = 1^(ebits(prec)) then
        if af = 0 then
            a.t ← INFINITY
        elseif af_(fbits(prec)-1) then
            a.t ← SNaN
            a.e ← -fbits(prec)
            a.f ← 1 || af_(fbits(prec)-2..0)
        else
            a.t ← QNaN
            a.e ← -fbits(prec)
            a.f ← af
        endif
    elseif ae = 0 then
        if af = 0 then
            a.t ← ZERO
        else
            a.t ← NORM
            a.e ← 1-ebias(prec)-fbits(prec)
```

FIG. 39A-1

```
            a.f ← 0 || af
        endif
    else
        a.t ← NORM
        a.e ← ae-ebias(prec)-fbits(prec)
        a.f ← 1 || af
    endif
enddef

def a ← DEFAULTQNAN as
    a.s ← 0
    a.t ← QNAN
    a.e ← -1
    a.f ← 1
enddef

def a ← DEFAULTSNAN as
    a.s ← 0
    a.t ← SNAN
    a.e ← -1
    a.f ← 1
enddef

def fadd(a,b) as faddr(a,b,N) enddef

def c ← faddr(a,b,round) as
    if a.t=NORM and b.t=NORM then
        // d,e are a,b with exponent aligned and fraction adjusted
        if a.e > b.e then
            d ← a
            e.t ← b.t
            e.s ← b.s
            e.e ← a.e
            e.f ← b.f || 0^(a.e-b.e)
        else if a.e < b.e then
            d.t ← a.t
            d.s ← a.s
            d.e ← b.e
            d.f ← a.f || 0^(b.e-a.e)
            e ← b
        endif
        c.t ← d.t
        c.e ← d.e
        if d.s = e.s then
            c.s ← d.s
            c.f ← d.f + e.f
        elseif d.f > e.f then
            c.s ← d.s
            c.f ← d.f – e.f
```

FIG. 39A-2

```
        elseif d.f < e.f then
            c.s ← e.s
            c.f ← e.f – d.f
        else
            c.s ← r=F
            c.t ← ZERO
        endif
    // priority is given to b operand for NaN propagation
    elseif (b.t=SNAN) or (b.t=QNAN) then
        c ← b
    elseif (a.t=SNAN) or (a.t=QNAN) then
        c ← a
    elseif a.t=ZERO and b.t=ZERO then
        c.t ← ZERO
        c.s ← (a.s and b.s) or (round=F and (a.s or b.s))
    // NULL values are like zero, but do not combine with ZERO to alter sign
    elseif a.t=ZERO or a.t=NULL then
        c ← b
    elseif b.t=ZERO or b.t=NULL then
        c ← a
    elseif a.t=INFINITY and b.t=INFINITY then
        if a.s ≠ b.s then
            c ← DEFAULTSNAN // Invalid
        else
            c ← a
        endif
    elseif a.t=INFINITY then
        c ← a
    elseif b.t=INFINITY then
        c ← b
    else
        assert FALSE // should have covered al the cases above
    endif
enddef

def b ← fneg(a) as
    b.s ← ~a.s
    b.t ← a.t
    b.e ← a.e
    b.f ← a.f
enddef

def fsub(a,b) as fsubr(a,b,N) enddef

def fsubr(a,b,round) as faddr(a,fneg(b),round) enddef

def frsub(a,b) as frsubr(a,b,N) enddef

def frsubr(a,b;round) as faddr(fneg(a),b,round) enddef
```

FIG. 39A-3

```
def c ← fcom(a,b) as
    if (a.t=SNAN) or (a.t=QNAN) or (b.t=SNAN) or (b.t=QNAN) then
        c ← U
    elseif a.t=INFINITY and b.t=INFINITY then
        if a.s ≠ b.s then
            c ← (a.s=0) ? G: L
        else
            c ← E
        endif
    elseif a.t=INFINITY then
        c ← (a.s=0) ? G: L
    elseif b.t=INFINITY then
        c ← (b.s=0) ? G: L
    elseif a.t=NORM and b.t=NORM then
        if a.s ≠ b.s then
            c ← (a.s=0) ? G: L
        else
            if a.e > b.e then
                af ← a.f
                bf ← b.f || 0^(a.e-b.e)
            else
                af ← a.f || 0^(b.e-a.e)
                bf ← b.f
            endif
            if af = bf then
                c ← E
            else
                c ← ((a.s=0) ^ (af > bf)) ? G : L
            endif
        endif
    elseif a.t=NORM then
        c ← (a.s=0) ? G: L
    elseif b.t=NORM then
        c ← (b.s=0) ? G: L
    elseif a.t=ZERO and b.t=ZERO then
        c ← E
    else
        assert FALSE // should have covered al the cases above
    endif
enddef

def c ← fmul(a,b) as
    if a.t=NORM and b.t=NORM then
        c.s ← a.s ^ b.s
        c.t ← NORM
        c.e ← a.e + b.e
        c.f ← a.f * b.f
    // priority is given to b operand for NaN propagation
    elseif (b.t=SNAN) or (b.t=QNAN) then
        c.s ← a.s ^ b.s
```

FIG. 39A-4

```
            c.t ← b.t
            c.e ← b.e
            c.f ← b.f
      elseif (a.t=SNAN) or (a.t=QNAN) then
            c.s ← a.s ^ b.s
            c.t ← a.t
            c.e ← a.e
            c.f ← a.f
      elseif a.t=ZERO and b.t=INFINITY then
            c ← DEFAULTSNAN // Invalid
      elseif a.t=INFINITY and b.t=ZERO then
            c ← DEFAULTSNAN // Invalid
      elseif a.t=ZERO or b.t=ZERO then
            c.s ← a.s ^ b.s
            c.t ← ZERO
      else
            assert FALSE // should have covered al the cases above
      endif
enddef

def c ← fdivr(a,b) as
      if a.t=NORM and b.t=NORM then
            c.s ← a.s ^ b.s
            c.t ← NORM
            c.e ← a.e - b.e + 256
            c.f ← (a.f || 0^256) / b.f
      // priority is given to b operand for NaN propagation
      elseif (b.t=SNAN) or (b.t=QNAN) then
            c.s ← a.s ^ b.s
            c.t ← b.t
            c.e ← b.e
            c.f ← b.f
      elseif (a.t=SNAN) or (a.t=QNAN) then
            c.s ← a.s ^ b.s
            c.t ← a.t
            c.e ← a.e
            c.f ← a.f
      elseif a.t=ZERO and b.t=ZERO then
            c ← DEFAULTSNAN // Invalid
      elseif a.t=INFINITY and b.t=INFINITY then
            c ← DEFAULTSNAN // Invalid
      elseif a.t=ZERO then
            c.s ← a.s ^ b.s
            c.t ← ZERO
      elseif a.t=INFINITY then
            c.s ← a.s ^ b.s
            c.t ← INFINITY
      else
            assert FALSE // should have covered al the cases above
      endif
```

FIG. 39A-5

```
enddef

def msb ← findmsb(a) as
    MAXF ← 2^18 // Largest possible f value after matrix multiply
    for j ← 0 to MAXF
        if a_{MAXF-1..j} = (0^{MAXF-1-j} || 1) then
            msb ← j
        endif
    endfor
enddef

def ai ← PackF(prec,a,round) as
    case a.t of
        NORM:
            msb ← findmsb(a.f)
            rn ← msb-1-fbits(prec) // lsb for normal
            rdn ← -ebias(prec)-a.e-1-fbits(prec) // lsb if a denormal
            rb ← (rn > rdn) ? rn : rdn
            if rb ≤ 0 then
                aifr ← a.f_{msb-1..0} || 0^{-rb}
                eadj ← 0
            else
                case round of
                    C:
                        s ← 0^{msb-rb} || (~a.s)^{rb}
                    F:
                        s ← 0^{msb-rb} || (a.s)^{rb}
                    N, NONE:
                        s ← 0^{msb-rb} || a.f_{rb} || ~a.f_{rb}^{rb-1}
                    X:
                        if a.f_{rb-1..0} ≠ 0 then
                            raise FloatingPointArithmetic // Inexact
                        endif
                        s ← 0
                    Z:
                        s ← 0
                endcase
                v ← (0||a.f_{msb..0}) + (0||s)
                if v_{msb} = 1 then
                    aifr ← v_{msb-1..rb}
                    eadj ← 0
                else
                    aifr ← 0^{fbits(prec)}
                    eadj ← 1
                endif
            endif
            aien ← a.e + msb – 1 + eadj + ebias(prec)
            if aien ≤ 0 then
```

FIG. 39A-6

```
                if round = NONE then
                    ai ← a.s || 0^ebits(prec) || aifr
                else
                    raise FloatingPointArithmetic //Underflow
                endif
            elseif aien ≥ 1^ebits(prec) then
                if round = NONE then
                    //default: round-to-nearest overflow handling
                    ai ← a.s || 1^ebits(prec) || 0^fbits(prec)
                else
                    raise FloatingPointArithmetic //Overflow
                endif
            else
                ai ← a.s || aien_ebits(prec)-1..0 || aifr
            endif
        SNAN:
            if round ≠ NONE then
                raise FloatingPointArithmetic //Invalid
            endif
            if -a.e < fbits(prec) then
                ai ← a.s || 1^ebits(prec) || a.f_-a.e-1..0 || 0^fbits(prec)+a.e
            else
                lsb ← a.f_-a.e-1-fbits(prec)+1..0 ≠ 0
                ai ← a.s || 1^ebits(prec) || a.f_-a.e-1..-a.e-1-fbits(prec)+2 || lsb
            endif
        QNAN:
            if -a.e < fbits(prec) then
                ai ← a.s || 1^ebits(prec) || a.f_-a.e-1..0 || 0^fbits(prec)+a.e
            else
                lsb ← a.f_-a.e-1-fbits(prec)+1..0 ≠ 0
                ai ← a.s || 1^ebits(prec) || a.f_-a.e-1..-a.e-1-fbits(prec)+2 || lsb
            endif
        ZERO:
            ai ← a.s || 0^ebits(prec) || 0^fbits(prec)
        INFINITY:
            ai ← a.s || 1^ebits(prec) || 0^fbits(prec)
    endcase
defdef

def ai ← fsinkr(prec, a, round) as
    case a.t of
        NORM:
            msb ← findmsb(a.f)
            rb ← -a.e
            if rb ≤ 0 then
                aifr ← a.f_msb..0 || 0^-rb
                aims ← msb - rb
            else
```

FIG. 39A-7

```
            case round of
                C, C.D:
                    s ← 0^(msb-rb) || (~ai.s)^rb
                F, F.D:
                    s ← 0^(msb-rb) || (ai.s)^rb
                N, NONE:
                    s ← 0^(msb-rb) || ai.f_rb || ~ai.f_rb^(rb-1)
                X:
                    if ai.f_(rb-1..0) ≠ 0 then
                        raise FloatingPointArithmetic // Inexact
                    endif
                    s ← 0
                Z, Z.D:
                    s ← 0
            endcase
            v ← (0||a.f_(msb..0)) + (0||s)
            if v_msb = 1 then
                aims ← msb + 1 - rb
            else
                aims ← msb - rb
            endif
            aifr ← v_(aims..rb)
        endif
        if aims > prec then
            case round of
                C.D, F.D, NONE, Z.D:
                    ai ← a.s || (~as)^(prec-1)
                C, F, N, X, Z:
                    raise FloatingPointArithmetic // Overflow
            endcase
        elseif a.s = 0 then
            ai ← aifr
        else
            ai ← -aifr
        endif
    ZERO:
        ai ← 0^prec
    SNAN, QNAN:
        case round of
            C.D, F.D, NONE, Z.D:
                ai ← 0^prec
            C, F, N, X, Z:
                raise FloatingPointArithmetic // Invalid
        endcase
    INFINITY:
        case round of
            C.D, F.D, NONE, Z.D:
                ai ← a.s || (~as)^(prec-1)
            C, F, N, X, Z:
```

FIG. 39A-8

```
                        raise FloatingPointArithmetic // Invalid
                endcase
        endcase
enddef

def c ← frecrest(a) as
        b.s ← 0
        b.t ← NORM
        b.e ← 0
        b.f ← 1
        c ← fest(fdiv(b,a))
enddef

def c ← frsqrest(a) as
        b.s ← 0
        b.t ← NORM
        b.e ← 0
        b.f ← 1
        c ← fest(fsqr(fdiv(b,a)))
enddef

def c ← fest(a) as
        if (a.t=NORM) then
                msb ← findmsb(a.f)
                a.e ← a.e + msb - 13
                a.f ← a.f_{msb..msb-12} || 1
        else
                c ← a
        endif
enddef

def c ← fsqr(a) as
        if (a.t=NORM) and (a.s=0) then
                c.s ← 0
                c.t ← NORM
                if (a.e_0 = 1) then
                        c.e ← (a.e-127) / 2
                        c.f ← sqr(a.f || 0^127)
                else
                        c.e ← (a.e-128) / 2
                        c.f ← sqr(a.f || 0^128)
                endif
        elseif (a.t=SNAN) or (a.t=QNAN) or a.t=ZERO or ((a.t=INFINITY) and (a.s=0)) then
                c ← a
        elseif ((a.t=NORM) or (a.t=INFINITY)) and (a.s=1) then
                c ← DEFAULTSNAN // Invalid
        else
                assert FALSE // should have covered al the cases above
        endif
enddef
```

FIG. 39A-9

32-bit 2-way deal 16-bit 4-way deal 16-bit 2-way shuffle 16-bit 4-way shuffle 16-bit reverse Compress 32 bits to 16, with 4-bit right shift Expand 16 bits to 32, with 4-bit left shift Alignment within dp region Gateway with pointers to code and data spaces

Definition

```
def Thread(th) as
    forever do
        catch exception
            if (EventRegister & EventMask[th]) ≠ 0 then
                if ExceptionState=0 then
                    raise EventInterrupt
                endif
            endif
            inst ← LoadMemoryX(ProgramCounter,ProgramCounter,32,L)
            Instruction(inst)
        endcatch
        case exception of
            EventInterrupt,
            ReservedInstruction,
            OperandBoundary,
            AccessDisallowedByTag,
            AccessDisallowedByGlobalTB,
            AccessDisallowedByLocalTB,
            AccessDetailRequiredByTag,
            AccessDetailRequiredByGlobalTB,
            AccessDetailRequiredByLocalTB,
            MissInGlobalTB,
            MissInLocalTB,
            FixedPointArithmetic,
            FloatingPointArithmetic,
            GatewayDisallowed:
                case ExceptionState of
                    0:
                        PerformException(exception)
                    1:
                        PerformException(SecondException)
                    2:
                        PerformMachineCheck(ThirdException)
                endcase
            TakenBranch:
                ContinuationState ← (ExceptionState=0) ? 0 : ContinuationState
            TakenBranchContinue:
```

FIG. 40A-1

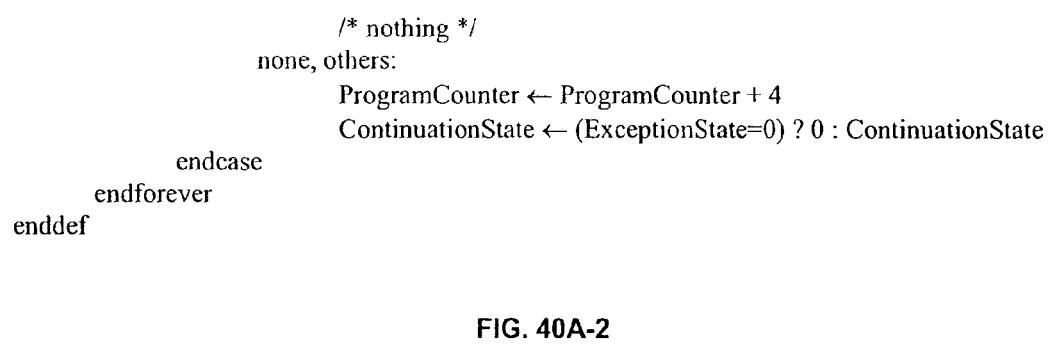

```
                /* nothing */
            none, others:
                ProgramCounter ← ProgramCounter + 4
                ContinuationState ← (ExceptionState=0) ? 0 : ContinuationState
        endcase
    endforever
enddef
```

FIG. 40A-2

Definition

```
def PerformException(exception) as
    v ← (exception > 7) ? 7 : exception
    t ← LoadMemory(ExceptionBase,ExceptionBase+Thread*128+64+8*v,64,L)
    if ExceptionState = 0 then
        u ← RegRead(3,128) || RegRead(2,128) || RegRead(1,128) || RegRead(0,128)
        StoreMemory(ExceptionBase,ExceptionBase+Thread*128,512,L,u)
        RegWrite(0,64,ProgramCounter63..2 || PrivilegeLevel
        RegWrite(1,64,ExceptionBase+Thread*128)
        RegWrite(2,64,exception)
        RegWrite(3,64,FailingAddress)
    endif
    PrivilegeLevel ← t1..0
    ProgramCounter ← t63..2 || 0^2
    case exception of
        AccessDetailRequiredByTag,
        AccessDetailRequiredByGlobalTB,
        AccessDetailRequiredByLocalTB:
            ContinuationState ← ContinuationState + 1
        others:
            /* nothing */
    endcase
    ExceptionState ← ExceptionState + 1
enddef
```

FIG. 40B

Definition

```
def Instruction(inst) as
    major ← inst31..24
    rd ← inst23..18
    rc ← inst17..12
    simm ← rb ← inst11..6
    minor ← ra ← inst5..0
    case major of
        A.RES:
            AlwaysReserved
        A.MINOR:
            minor ← inst5..0
            case minor of
                A.ADD, A.ADD.O, A.ADD.OU, A.AND, A.ANDN, A.NAND, A.NOR,
                A.OR, A.ORN, A.XNOR, A.XOR:
                    Address(minor,rd,rc,rb)
                A.COM:
                    compare ← inst11..6
                    case compare of
                        A.COM.E, A.COM.NE, A.COM.AND.E, A.COM.AND.NE,
                        A.COM.L, A.COM.GE, A.COM.L.U, A.COM.GE.U:
                            AddressCompare(compare,rd,rc)
                        others:
                            raise ReservedInstruction
                    endcase
                A.SUB, A.SUB.O, A.SUB.U.O:
                    AddressReversed(minor,rd,rc,rb)
                A.SET.AND.E, A.SET.AND.NE, A.SET.E, A.SET.NE,
                A.SET.L, A.SET.GE, A.SET.L.U, A.SET.GE.U::
                    AddressSet(minor,size,ra,rb,rc)
                A.SET.E.F.16, A.SET.LG.F.16, A.SET.GE.F.16, A.SET.L.F.16,
                A.SET.E.F.32, A.SET.LG.F.32, A.SET.GE.F.32, A.SET.L.F.32,
                A.SET.E.F.64, A.SET.LG.F.64, A.SET.GE.F.64, A.SET.L.F.64:
                    AddressSetFloatingPoint(minor.op,.size,
                        minor.round, rd, rc, rb)
                A.SHL.I.ADD..A.SHL.I.ADD+3:
                    AddressShiftLeftImmediateAdd(inst1..0,rd,rc,rb)
                A.SHL.I.SUB..A.SHL.I.SUB+3:
                    AddressShiftLeftImmediateSubtract(inst1..0,rd,rc,rb)
                A.SHL.I, A.SHL.I.O, A.SHL.I.U.O, A.SHR.I, A.SHR.I.U, A.ROTR.I:
                    AddressShiftImmediate(minor,rd,rc,simm)
                others:
                    raise ReservedInstruction
            endcase
        A.COPY.I
```

FIG. 40C-1

```
    AddressCopyImmediate(major,rd,inst17..0)
A.ADD.I, A.ADD.I.O, A.ADD.I.U.O, A.AND.I, A.OR.I, A.NAND.I, A.NOR.I, A.XOR.I:
    AddressImmediate(major,rd,rc,inst11..0)
A.SUB.I, A.SUB.I.O, A.SUB.I.U.O:
    AddressImmediateReversed(major,rd,rc,inst11..0)
A.SET.AND.E.I, A.SET.AND.NE.I, A.SET.E.I, A.SET.NE.I,
A.SET.L.I, E.SET.GE.I, A.SET.LU.I, A.SET.GE.U.I:
    AddressImmediateSet(major,rd,rc,inst11..0)
A.MUX:
    AddressTernary(major,rd,rc,rb,ra)
B.MINOR:
    case minor of
        B:
            Branch(rd,rc,rb)
        B.BACK:
            BranchBack(rd,rc,rb)
        B.BARRIER:
            BranchBarrier(rd,rc,rb)
        B.DOWN:
            BranchDown(rd,rc,rb)
        B.GATE:
            BranchGateway(rd,rc,rb)
        B.HALT:
            BranchHalt(rd,rc,rb)
        B.HINT:
            BranchHint(rd,inst17..12,simm)
        B.LINK:
            BranchLink(rd,rc,rb)
        others:
            raise ReservedInstruction
    endcase
BE, BNE, BL, BGE, BLU, BGE.U, BAND.E, BAND.NE:
    BranchConditional(major,rd,rc,inst11..0)
BHINTI:
    BranchHintImmediate(inst23..18,inst17..12,inst11..0)
BI:
    BranchImmediate(inst23..0)
BLINKI:
    BranchImmediateLink(inst23..0)
BEF16, BLGF16, BLF16, BGEF16,
BEF32, BLGF32, BLF32, BGEF32,
BEF64, BLGF64, BLF64, BGEF64,
BEF128, BLGF128, BLF128, BGEF128:
    BranchConditionalFloatingPoint(major,rd,rc,inst11..0)
BIF32, BNIF32, BNVF32, BVF32:
    BranchConditionalVisibilityFloatingPoint(major,rd,rc,inst11..0)
L.MINOR
    case minor and 31 of
        L16L, LU16L, L32L, LU32L, L64L, LU64L, L128L, L8, LU8,
        L16AL, LU16AL, L32AL, LU32AL, L64AL, LU64AL, L128AL,
```

FIG. 40C-2

```
            L16B, LU16B, L32B, LU32B, L64B, LU64B, L128B,
            L16AB, LU16AB, L32AB, LU32AB, L64AB, LU64AB, L128AB:
                Load(minor,rd,rc,rb,inst5)
            others:
                raise ReservedInstruction
        endcase
    LI16L LIU16L, LI32L, LIU32L, LI64L, LIU64L, LI128L, LI8, LIU8,
    LI16AL, LIU16AL, LI32AL, LIU32AL, LI64AL, LIU64AL, LI128AL,
    LI16B, LIU16B, LI32B, LIU32B, LI64B, LIU64B, LI128B,
    LI16AB, LIU16AB, LI32AB, LIU32AB, LI64AB, LIU64AB, LI128AB:
        LoadImmediate(major,rd,rc,inst11..0)
    S.MINOR
        case minor and 31 of
            S16L, S32L, S64L, S128L, S8,
            S16AL, S32AL, S64AL, S128AL,
            SAS64AL, SCS64AL, SMS64AL, SM64AL,
            S16B, S32B, S64B, S128B,
            S16AB, S32AB, S64AB, S128AB,
            SAS64AB, SCS64AB, SMS64AB, SM64AB:
                Store(minor,rd,rc,rb,inst5)
            SDCS64AB, SDCS64AL:
                if inst5 then
                    raise ReservedInstruction
                endif
                StoreDoubleCompareSwap(minor,rd,rc,rb)
            others:
                raise ReservedInstruction
        endcase
    SI16L, SI32L, SI64L, SI128L, SI8,
    SI16AL, SI32AL, SI64AL, SI128AL,
    SASI64AL, SCSI64AL, SMSI64AL, SMUXI64AL,
    SI16B, SI32B, SI64B, SI128B,
    SI16AB, SI32AB, SI64AB, SI128AB
    SASI64AB, SCSI64AB, SMSI64AB, SMUXI64AB:
        StoreImmediate(major,rd,rc,inst11..0)
    G.8, G.16, G.32, G.64, G.128:
        minor ← inst5..0
        size ← 0 || 1 || 0^(3+major-G.8)
        case minor of
            G.ADD, G.ADD.L, G.ADD.LU, G.ADD.O, G.ADD.OU:
                Group(minor,size,rd,rc,rb)
            G.ADDHC, G.ADDHF, G.ADDHN, G.ADDHZ,
            G.ADDHUC, G.ADDHUF, G.ADDHUN, G.ADDHUZ:
                GroupAddHalve(minor,inst1..0,size,rd,rc,rb)
            G.AAA, G.ASA:
                GroupInplace(minor,size,rd,rc,rb)
            G.SET.AND.E, G.SET.AND.NE, G.SET.E, G.SET.NE,
            G.SET.L, G.SET.GE, G.SET.L.U, G.SET.GE.U:
            G.SUB, G.SUB.L, G.SUB.LU, G.SUB.O, G.SUB.U.O:
                GroupReversed(minor,size,ra,rb,rc)
            G.SET.E.F, G.SET.LG.F, G.SET.GE.F, G.SET.L.F,
```

FIG. 40C-3

```
            G.SET.E.F.X, G.SET.LG.F.X, G.SET.GE.F.X, G.SET.L.F.X:
                GroupReversedFloatingPoint(minor.op,.size,
                    minor.round, rd, rc, rb)
            G.SHL.I.ADD..G.SHL.I.ADD+3,
                GroupShiftLeftImmediateAdd(inst1..0,size,rd,rc,rb)
            G.SHL.I.SUB..G.SHL.I.SUB+3,
                GroupShiftLeftImmediateSubtract(inst1..0,size,rd,rc,rb)
            G.SUBHC, G.SUBHF, G.SUBHN, G.SUBHZ,
            G.SUBHUC, G.SUBHUF, G.SUBHUN, G.SUBHUZ:
                GroupSubtractHalve(minor,inst1..0,size,rd,rc,rb)
            G.COM,
                compare ← inst11..6
                case compare of
                    G.COM.E, G.COM.NE, G.COM.AND.E, G.COM.AND.NE,
                    G.COM.L, G.COM.GE, G.COM.L.U, G.COM.GE.U:
                        GroupCompare(compare,size,ra,rb)
                    others:
                        raise ReservedInstruction
                endcase
            others:
                raise ReservedInstruction
        endcase
    G.BOOLEAN..G.BOOLEAN+1:
        GroupBoolean(major,rd,rc,rb,minor)
    G.COPY.I...G.COPY.I+1:
        size ← 0 || 1 || 0^(4+inst17..16)
        GroupCopyImmediate(major,size,rd,inst15..0)
    G.AND.I, G.NAND.I, G.NOR.I, G.OR.I, G.XOR.I,
    G.ADD.I, G.ADD.I.O, G.ADD.I.U.O:
        size ← 0 || 1 || 0^(4+inst11..10)
        GroupImmediate(major,size,rd,rc,inst9..0)
    G.SET.AND.E.I, G.SET.AND.NE.I, G.SET.E.I, G.SET.GE.I, G.SET.L.I,
    G.SET.NE.I, G.SET.GE.I.U, G.SET.L.I.U, G.SUB.I, G.SUB.I.O, G.SUB.I.U.O:
        size ← 0 || 1 || 0^(4+inst11..10)
        GroupImmediateReversed(major,size,rd,rc,inst9..0)
    G.MUX:
        GroupTernary(major,rd,rc,rb,ra)
    X.SHIFT:
        minor ← inst5..2 || 0^2
        size ← 0 || 1 || 0^(inst24 || inst1..0)
        case minor of
            X.EXPAND, X.UEXPAND, X.SHL, X.SHL.O, X.SHL.U.O,
            X.ROTR, X.SHR, X.SHR.U,
                Crossbar(minor,size,rd,rc,rb)
            X.SHL.M, X.SHR.M:
                CrossbarInplace(minor,size,rd,rc,rb)
            others:
                raise ReservedInstruction
        endcase
```

FIG. 40C-4

```
X.EXTRACT:
    CrossbarExtract(major,rd,rc,rb,ra)
X.DEPOSIT, X.DEPOSIT.U X.WITHDRAW X.WITHDRAW.U
    CrossbarField(major,rd,rc,inst11..6,inst5..0)
X.DEPOSIT.M:
    CrossbarFieldInplace(major,rd,rc,inst11..6,inst5..0)
X.SHIFT.I:
    minor ← inst5..0
    case minor5..2 || 0^2 of
        X.COMPRESS.I, X.EXPAND.I, X.ROTR.I, X.SHL.I, X.SHL.I.O, X.SHL.I.U.O,
        X.SHR.I, X.COMPRESS.I.U, X.EXPAND.I.U, X.SHR.UI:
            CrossbarShortImmediate(minor,rd,rc,simm)
        X.SHL.M.I, X.SHR.M.I:
            CrossbarShortImmediateInplace(minor,rd,rc,simm)
        others:
            raise ReservedInstruction
    endcase
X.SHUFFLE..X.SHUFFLE+1:
    CrossbarShuffle(major,rd,rc,rb,simm)
X.SWIZZLE..X.SWIZZLE+3:
    CrossbarSwizzle(major,rd,rc, inst11..6,inst5..0)
X.SELECT.8, XTRANSPOSE:
    CrossbarTernary(major,rd,rc,rb,ra)
E.8, E.16, E.32, E.64, E.128:
    minor ← inst5..0
    size ← 0 || 1 || 0^(3+major-E.8)
    case minor of
        E.CON., E.CON.U, E.CON.M, E.CON.C,
        E.MUL., E.MUL.U, E.MUL.M, E.MUL.C,
        E.MUL.SUM, E.MUL.SUM.U, E.MUL.SUM.M, E.MUL.SUM.C,
        E.DIV, E.DIV.U, E.MUL.P:
            Ensemble(minor,size,ra,rb,rc)
        E.CON.F, E.CON.C.F:
            EnsembleConvolveFloatingPoint(minor.size,rd,rc,rb)
        E.ADD.F.N, E.MUL.C.F.N, E.MUL.F.N, E.DIV.F.N,
        E.ADD.F.Z, E.MUL.C.F.Z, E.MUL.F.Z, E.DIV.F.Z,
        E.ADD.F.F, E.MUL.C.F.F, E.MUL.F.F, E.DIV.F.F,
        E.ADD.F.C, E.MUL.C.F.C, E.MUL.F.C, E.DIV.F.C,
        E.ADD.F, E.MUL.C.F, E.MUL.F, E.DIV.F,
        E.ADD.F.X, E.MUL.C.F.X, E.MUL.F.X, E.DIV.F.X,
        E.MUL.SUM.F, E.MUL.SUM.C.F:
            EnsembleFloatingPoint(minor.op, size, minor.round, rd, rc, rb)
        E.MUL.ADD, E.MUL.ADD.U, E.MUL.ADD.M, E.MUL.ADD.C:
            EnsembleInplace(minor,size,rd,rc,rb)
        E.CON.F, E.CON.C.F,
        E.MUL.ADD.F, E.MUL.ADD.C.F
        E.MULSUB.F, E.MULSUB.C.F:
            EnsembleInplaceFloatingPoint(major,size,rd,rc,rb,ra)
        E.MUL.SUB, E.MUL.SUB.U, E.MUL.SUB.M, E.MUL.SUB.C:
            EnsembleInplaceReversed(minor,size,rd,rc,rb)
```

FIG. 40C-5

```
            E.SUB.F.N, E.SUB.F.Z, E.SUB.F.F, E.SUB.F.C, E.SUB.F, E.SUB.F.X:
                EnsembleReversedFloatingPoint(minor.op, major.size,
                    minor.round, rd, rc, rb)
            E.UNARY:
                case unary of
                    E.SUM, E.SUMU, E.LOG.MOST, E. LOG.MOST.U,
                    E.SUM.C, E.SUM.P:
                        EnsembleUnary(unary,rd,rc)
                    E.ABS.F, E.ABS.F.X, E.COPY.F, E.COPY.F.X,
                    E.DEFLATE.F, E.DEFLATE.F.N, E.DEFLATE.F.Z,
                    E.DEFLATE.F.F, E.DEFLATE.F.C, E.DEFLATE.F.X:
                    E.FLOAT.F, E.FLOAT.F.N, E.FLOAT.F.Z,
                    E.FLOAT.F.F, E.FLOAT.F.C, E.FLOAT.F.X:
                    E.INFLATE.F, E.INFLATE.F.X, E.NEG.F, E.NEG.F.X,
                    E.RECEST.F, E.RECEST.F.X, E.RSQREST.F, E.RSQREST.F.X,
                    E.SQR.F, E.SQR.F.N, E.SQR.F.Z, E.SQR.F.F, E.SQR.F.C, E.SQR.F.X:
                    E.SUM.F, E.SUM.F.N, E.SUM.F.Z,
                    E.SUM.F.F, E.SUM.F.C, E.SUM.F.X:
                    E.SUM.CF,
                    E.SINK.F, E.SINK.F.Z.D, E.SINK.F.F.D, E.SINK.F.C.D, E.SINK.F.X.D,
                    E.SINK.F.N, E.SINK.F.Z, E.SINK.F.F, E.SINK.F.C, E.SINK.F.X:
                        EnsembleUnaryFloatingPoint(unary.op, size,
                                unary.round, rd, rc)
                    others:
                        raise ReservedInstruction
                endcase
            others:
                raise ReservedInstruction
        endcase
    E.MUL.X, E.EXTRACT, E.SCAL.ADD.X:
        EnsembleExtract(major,rd,rc,rb,ra)
    E.CON.X, E.MUL.ADD.X:
        EnsembleExtractInplace(major,rd,rc,rb,ra)
    E.EXTRACT.I, E.MUL.X.I:
        size ← 1 || 0^(3+inst4..3)
        type ← inst5
        EnsembleExtractImmediate(major,type,size,rd,rc,rb,inst2..0)
    E.CON.X.I, E.MUL.ADD.X.I:
        size ← 1 || 0^(3+inst4..3)
        type ← inst5
        EnsembleExtractImmediateInplace(major,type,size,rd,rc,rb,inst2..0)
    E.MUL.G.8, E.MUL.SUM.G.8:
        size ← 8
        EnsembleTernary(major,size,rd,rc,rb,ra)
    E.SCAL.ADD.F16, E.SCAL.ADD.F32, E.SCAL.ADD.F64:
        EnsembleTernaryFloatingPoint(major,prec,rd,rc,rb,ra)
    W.MINOR.B, W.MINOR.L:
        case minor of
            W.TRANSLATE.8, W.TRANSLATE.16, W.TRANSLATE.32, W.TRANSLATE.64:
                size ← 1 || 0^(3+inst5..4)
```

FIG. 40C-6

```
                WideTranslate(major,size,rd,rc,rb)
            W.MUL.MAT.8, W.MUL.MAT.16, W.MUL.MAT.32,
            W.MUL.MAT.U.8, W.MUL.MAT.U.16, W.MUL.MAT.U.32,
            W.MUL.MAT.M.8, W.MUL.MAT.M.16, W.MUL.MAT.M.32,
            W.MUL.MAT.C.8, W.MUL.MAT.C.16,
            W.MUL.MAT.P.8, W.MUL.MAT.P.16, W.MUL.MAT.P.32:
                size ← 1 || 0^(3+inst5..4)
                WideMultiplyMatrix(major,minor,size,rd,rc,rb)
            W.MUL.MAT.F16, W.MUL.MAT.F.32, W.MUL.MAT.F64,
            W.MUL.MAT.C.F16, W.MUL.MAT.C.F32:
                size ← 1 || 0^(3+inst5..4)
                WideMultiplyMatrixFloatingPoint(major,minor,size,rd,rc,rb)
            others:
                raise ReservedInstruction
        endcase
    W.MUL.MAT.X.B, W.MUL.MAT.X.L:
        WideMultiplyMatrixExtract(major,ra,rb,rc,rd)
    W.MUL.MAT.X.I.B, W.MUL.MAT.X.I.L, W.MUL.MAT.X.I.C.B, W.MUL.MAT.X.I.C.L:
        size ← 1 || 0^(3+inst4..3)
        type ← inst5
        WideMultiplyMatrixExtractImmediate(major,type,size,ra,rb,rc,inst2..0)
    W.MUL.MAT.G.8.B, W.MUL.MAT.G.8.L:
        size ← 8
        WideMultiplyMatrixGalois(major,size,rd,rc,rb,ra)
    W.SWITCH.B, W.SWITCH.L:
        WideSwitch(major,rd,rc,rb,ra)
    others:
        raise ReservedInstruction
  endcase
enddef
```

FIG. 40C-7

Operation code

| | |
|---|---|
| A.RES | Always reserved |

Format

A.RES imm ares(imm)

| 31 … 24 | 23 … 0 |
|---|---|
| A.RES | imm |
| 8 | 24 |

FIG. 41A

Definition

```
def AlwaysReserved as
        raise ReservedInstruction
enddef
```

FIG. 41B

Exceptions

Reserved Instruction

FIG. 41C

Operation codes

| | |
|---|---|
| A.ADD | Address add |
| A.ADD.O | Address add signed check overflow |
| A.ADD.U.O | Address add unsigned check overflow |
| A.AND | Address and |
| A.ANDN | Address and not |
| A.NAND | Address not and |
| A.NOR | Address not or |
| A.OR | Address or |
| A.ORN | Address or not |
| A.XNOR | Address exclusive nor |
| A.XOR | Address xor |

Redundancies

| | | |
|---|---|---|
| A.OR rd=rc,rc | ⇔ | *A.COPY rd=rc* |
| A.AND rd=rc,rc | ⇔ | *A.COPY rd=rc* |
| A.NAND rd=rc,rc | ⇔ | *A.NOT rd=rc* |
| A.NOR rd=rc,rc | ⇔ | *A.NOT rd=rc* |
| A.XNOR rd=rc,rc | ⇔ | *A.SET rd* |
| A.XOR rd=rc,rc | ⇔ | *A.ZERO rd* |
| A.ADD rd=rc,rc | ⇔ | A.SHL.I rd=rc,1 |
| A.ADD.O rd=rc,rc | ⇔ | A.SHL.I.O rd=rc,1 |
| A.ADD.U.O rd=rc,rc | ⇔ | A.SHL.I.U.O rd=rc,1 |

Selection

| class | operation | check |
|---|---|---|
| arithmetic | ADD | NONE O U.O |
| bitwise | OR AND XOR ANDN<br>NOR NAND XNOR ORN | |

Format op rd=rc,rb rd=op(rc,rb)

| 31 24 | 23 18 | 17 12 | 11 6 | 5 0 |
|---|---|---|---|---|
| **A.MINOR** | **rd** | **rc** | **rb** | **op** |
| 8 | 6 | 6 | 6 | 6 |

FIG. 42A

Definition

```
def AddressCompare(op,rd,rc) as
    d ← RegRead(rd, 128)
    c ← RegRead(rc, 128)
    case op of
        A.COM.E:
            z ← d = c
        A.COM.NE:
            z ← d ≠ c
        A.COM.AND.E:
            z ← (d and c) = 0
        A.COM.AND.NE:
            z ← (d and c) ≠ 0
        A.COM.L:
            z ← (rd = rc) ? (c < 0) : (d < c)
        A.COM.GE:
            z ← (rd = rc) ? (c ≥ 0) : (d ≥ c)
        A.COM.L.U:
            z ← (rd = rc) ? (c > 0) : ((0 || d) < (0 || c))
        A.COM.GE.U:
            z ← (rd = rc) ? (c ≤ 0) : ((0 || d) ≥ (0 || c))
    endcase
    if z then
        raise FixedPointArithmetic
    endif
enddef
```

FIG. 42B

Exceptions

Fixed-point arithmetic

FIG. 42C

Operation codes

| | |
|---|---|
| A.COM.AND.E | Address compare and equal zero |
| A.COM.AND.NE | Address compare and not equal zero |
| A.COM.E | Address compare equal |
| A.COM.GE | Address compare greater equal signed |
| A.COM.GE.U | Address compare greater equal unsigned |
| A.COM.L | Address compare less signed |
| A.COM.L.U | Address compare less unsigned |
| A.COM.NE | Address compare not equal |

Equivalencies

| | |
|---|---|
| *A.COM.E.Z* | Address compare equal zero |
| *A.COM.G.Z* | Address compare greater zero signed |
| *A.COM.GE.Z* | Address compare greater equal zero signed |
| *A.COM.L.Z* | Address compare less zero signed |
| *A.COM.LE.Z* | Address compare less equal zero signed |
| *A.COM.NE.Z* | Address compare not equal zero |
| *A.COM.G* | Address compare greater signed |
| *A.COM.G.U* | Address compare greater unsigned |
| *A.COM.LE* | Address compare less equal signed |
| *A.COM.LE.U* | Address compare less equal unsigned |
| *A.FIX* | Address fixed point arithmetic exception |
| *A.NOP* | Address no operation |

| | | |
|---|---|---|
| *A.COM.E.Z rc* | ← | A.COM.AND.E rc,rc |
| *A.COM.G.Z rc* | ⇐ | A.COM.L.U rc,rc |
| *A.COM.GE.Z rc* | ⇐ | A.COM.GE rc,rc |
| *A.COM.L.Z rc* | ⇐ | A.COM.L rc,rc |
| *A.COM.LE.Z rc* | ⇐ | A.COM.GE.U rc,rc |
| *A.COM.NE.Z rc* | ← | A.COM.AND.NE rc,rc |
| *A.COM.G rc,rd* | → | A.COM.L rd,rc |
| *A.COM.G.U rc,rd* | → | A.COM.L.U rd,rc |
| *A.COM.LE rc,rd* | → | A.COM.GE rd,rc |
| *A.COM.LE.U rc,rd* | → | A.COM.GE.U rd,rc |
| *A.FIX* | ← | A.COM.E 0,0 |
| *A.NOP* | ← | A.COM.NE 0,0 |

FIG. 43A-1

Redundancies

| | | |
|---|---|---|
| A.COM.E rd,rd | ⇔ | *A.FIX* |
| A.COM.NE rd,rd | ⇔ | *A.NOP* |

Selection

| class | operation | cond | operand |
|---|---|---|---|
| boolean | COM.AND COM | E NE | |
| arithmetic | COM | L GE *G LE* | NONE U |
| | *COM* | *L GE G LE E NE* | *Z* |

Format

A.COM.op rd,rc acomop(rd,rc)
acomopz(rcd)

| 31 24 | 23 18 | 17 12 | 11 6 | 5 0 |
|---|---|---|---|---|
| A.MINOR | rd | rc | op | ACOM |
| 8 | 6 | 6 | 6 | 6 |

FIG. 43A-2

Definition

```
def AddressCompare(op,rd,rc) as
    d ← RegRead(rd, 128)
    c ← RegRead(rc, 128)
    case op of
        A.COM.E:
            z ← d = c
        A.COM.NE:
            z ← d ≠ c
        A.COM.AND.E:
            z ← (d and c) = 0
        A.COM.AND.NE:
            z ← (d and c) ≠ 0
        A.COM.L:
            z ← (rd = rc) ? (c < 0) : (d < c)
        A.COM.GE:
            z ← (rd = rc) ? (c ≥ 0) : (d ≥ c)
        A.COM.L.U:
            z ← (rd = rc) ? (c > 0) : ((0 || d) < (0 || c))
        A.COM.GE.U:
            z ← (rd = rc) ? (c ≤ 0) : ((0 || d) ≥ (0 || c))
    endcase
    if z then
        raise FixedPointArithmetic
    endif
enddef
```

FIG. 43B

Exceptions

Fixed-point arithmetic

FIG. 43C

Operation codes

| | |
|---|---|
| A.COM.E.F.016 | Address compare equal floating-point half |
| A.COM.E.F.032 | Address compare equal floating-point single |
| A.COM.E.F.064 | Address compare equal floating-point double |
| A.COM.LG.F.016 | Address compare less greater floating-point half |
| A.COM.LG.F.032 | Address compare less greater floating-point single |
| A.COM.LG.F.064 | Address compare less greater floating-point double |
| A.COM.L.F.016 | Address compare less floating-point half |
| A.COM.L.F.032 | Address compare less floating-point single |
| A.COM.L.F.064 | Address compare less floating-point double |
| A.COM.GE.F.016 | Address compare greater equal floating-point half |
| A.COM.GE.F.032 | Address compare greater equal floating-point single |
| A.COM.GE.F.064 | Address compare greater equal floating-point double |

Equivalencies

| | |
|---|---|
| *A.COM.G.F.016* | Address compare greater floating-point half |
| *A.COM.G.F.032* | Address compare greater floating-point single |
| *A.COM.G.F.064* | Address compare greater floating-point double |
| *A.COM.LE.F.016* | Address compare less equal floating-point half |
| *A.COM.LE.F.032* | Address compare less equal floating-point single |
| *A.COM.LE.F.064* | Address compare less equal floating-point double |

| | | |
|---|---|---|
| *A.COM.G.F.prec rd=rb,rc* | → | A.COM.L.F.prec rd=rc,rb |
| *A.COM.LE.F.prec rd=rb,rc* | → | A.COM.GE.F.prec rd=rc,rb |

Selection

| class | op | prec | round/trap |
|---|---|---|---|
| set | SET.<br>E LG<br>L GE<br>*G* *LE* | 16 32 64 | NONE |

FIG. 44A-1

Format

A.COM.op.prec rd,rc acomopprec (rd,rc)

| 31 24 | 23 18 | 17 12 | 11 6 | 5 0 |
|---|---|---|---|---|
| A.MINOR | rd | rc | op.prec | A.COM |
| 8 | 6 | 6 | 6 | 6 |

FIG. 44A-2

Definition

```
def AddressCompareFloatingPoint(op,prec,rd,rc) as
    d ← F(prec,RegRead(rd, 64)prec-1..0),
    c ← F(prec,RegRead(rc, 64)prec-1..0),
    v ← fcom(d, c)
    case op of
        A.COM.L.F:
            z ← v=L
        A.COM.GE.F:
            z ← v=G or v=E
        A.COM.E.F:
            z ← v=E
        A.COM.LG.F:
            z ← v=L or v=G
    endcase
    if z then
        raise FloatingPointArithmetic
    endif
enddef
```

FIG. 44B

Exceptions

Floating-point arithmetic

FIG. 44C

Operation codes

| | |
|---|---|
| A.COPY.I | Address copy immediate |

Equivalencies

| | |
|---|---|
| *A.SET* | Address set |
| *A.ZERO* | Address zero |

| | | |
|---|---|---|
| *A.SET rd* | ← | A.COPY.I rd=-1 |
| *A.ZERO rd* | ← | A.COPY.I rd=0 |

Format

A.COPY.I rd=imm rd=acopyi(imm)

| 31..24 | 23..18 | 17..0 |
|---|---|---|
| A.COPY.I | rd | imm |
| 8 | 6 | 18 |

FIG. 45A

Definition

```
def AddressCopyImmediate(op,rd,imm) as
        z ← (imm[17]^110 || imm)
        RegWrite(rd, 128, z)
enddef
```

$z \leftarrow (imm_{17}^{110} \,\|\, imm)$

FIG. 45B

Exceptions none

FIG. 45C

Operation codes

| | |
|---|---|
| A.ADD.I | Address add immediate |
| A.ADD.I.O | Address add immediate signed check overflow |
| A.ADD.I.U.O | Address add immediate unsigned check overflow |
| A.AND.I | Address and immediate |
| A.NAND.I | Address not and immediate |
| A.NOR.I | Address not or immediate |
| A.OR.I | Address or immediate |
| A.XOR.I | Address xor immediate |

Equivalencies

| | |
|---|---|
| *A.ANDN.I* | Address and not immediate |
| *A.COPY* | Address copy |
| *A.NOT* | Address not |
| *A.ORN.I* | Address or not immediate |
| *A.XNOR.I* | Address xnor immediate |

| | | |
|---|---|---|
| *A.ANDN.I rd=rc.imm* | → | A.AND.I rd=rc,~imm |
| *A.COPY rd=rc* | ← | A:OR.I rd=rc,0 |
| *A.NOT rd=rc* | ← | A.NOR.I rd=rc,0 |
| *A.ORN.I rd=rc.imm* | → | A.OR.I rd=rc,~imm |
| *A.XNOR.I rd=rc.imm* | → | A.XOR.I rd=rc,~imm |

Redundancies

| | | |
|---|---|---|
| A.ADD.I rd=rc,0 | ⇔ | *A.COPY rd=rc* |
| A.ADD.I.O rd=rc,0 | ⇔ | *A.COPY rd=rc* |
| A.ADD.I.U.O rd=rc,0 | ⇔ | *A.COPY rd=rc* |
| A.AND.I rd=rc,0 | ⇔ | *A.ZERO rd* |
| A.AND.I rd=rc,-1 | ⇔ | *A.COPY rd=rc* |
| A.NAND.I rd=rc,0 | ⇔ | *A.SET rd* |
| A.NAND.I rd=rc,-1 | ⇔ | *A.NOT rd=rc* |
| A.OR.I rd=rc,-1 | ⇔ | *A.SET rd* |
| A.NOR.I rd=rc,-1 | ⇔ | *A.ZERO rd* |
| A.XOR.I rd=rc,0 | ⇔ | *A.COPY rd=rc* |
| A.XOR.I rd=rc,-1 | ⇔ | *A.NOT rd=rc* |

FIG. 46A-1

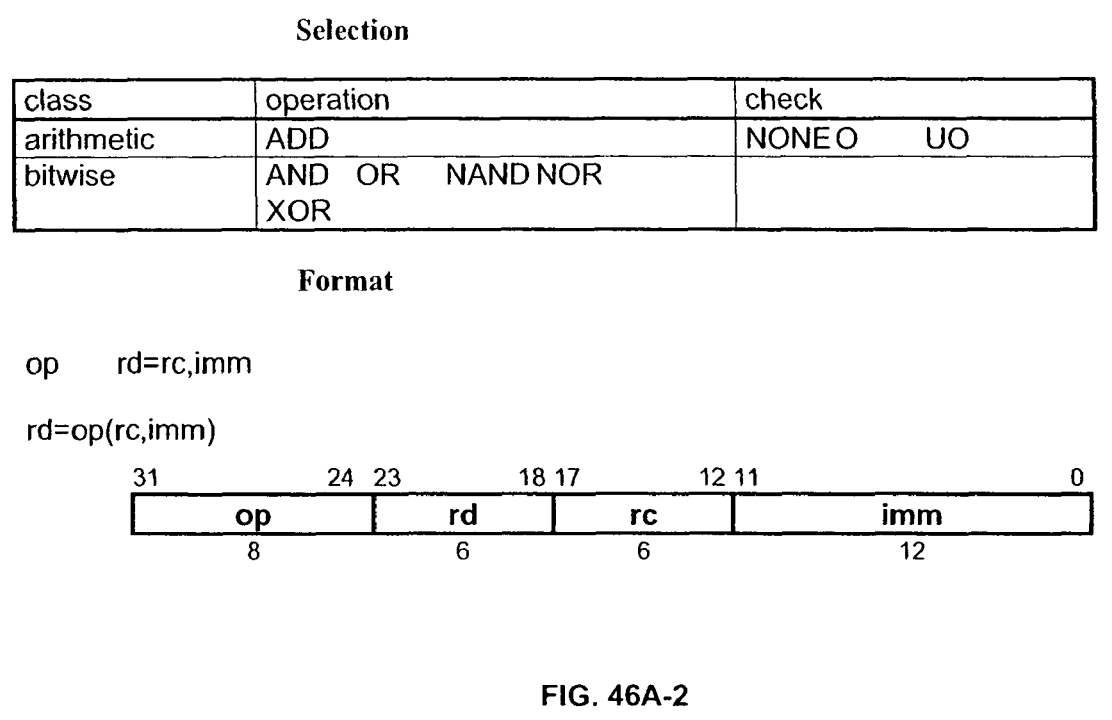

Selection

| class | operation | check |
|---|---|---|
| arithmetic | ADD | NONE O UO |
| bitwise | AND OR NAND NOR XOR | |

Format op rd=rc,imm rd=op(rc,imm)

| 31 24 | 23 18 | 17 12 | 11 0 |
|---|---|---|---|
| op | rd | rc | imm |
| 8 | 6 | 6 | 12 |

FIG. 46A-2

Definition

```
def AddressImmediate(op,rd,rc,imm) as
    i ← imm_11^52 || imm
    c ← RegRead(rc, 64)
    case op of
        A.AND.I:
            z ← c and i
        A.OR.I:
            z ← c or i
        A.NAND.I:
            z ← c nand i
        A.NOR.I:
            z ← c nor i
        A.XOR.I:
            z ← c xor i:
        A.ADD.I:
            z ← c + i
        A.ADD.I.O:
            t ← (c_63 || c) + (i_63 || i)
            if t_64 ≠ t_63 then
                raise FixedPointArithmetic
            endif
            z ← t_63..0
        A.ADD.I.U.O:
            t ← (c_63 || c) + (i_63 || i)
            if t_64 ≠ 0 then
                raise FixedPointArithmetic
            endif
            z ← t_63..0
    endcase
    RegWrite(rd, 64, z)
enddef
```

FIG. 46B

Exceptions

Fixed-point arithmetic

FIG. 46C

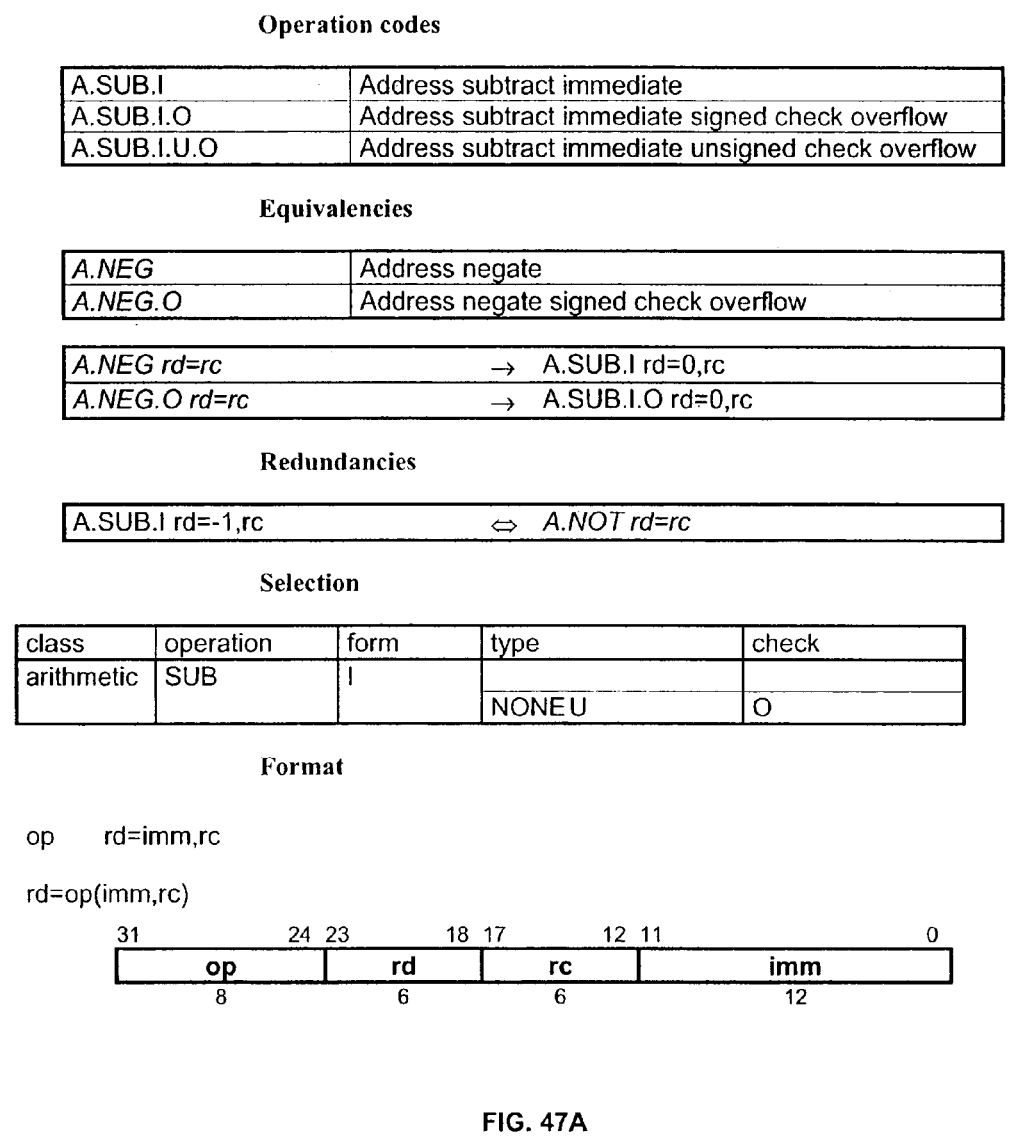

Operation codes

| | |
|---|---|
| A.SUB.I | Address subtract immediate |
| A.SUB.I.O | Address subtract immediate signed check overflow |
| A.SUB.I.U.O | Address subtract immediate unsigned check overflow |

Equivalencies

| | |
|---|---|
| *A.NEG* | Address negate |
| *A.NEG.O* | Address negate signed check overflow |

| | | |
|---|---|---|
| *A.NEG rd=rc* | → | A.SUB.I rd=0,rc |
| *A.NEG.O rd=rc* | → | A.SUB.I.O rd=0,rc |

Redundancies

| | | |
|---|---|---|
| A.SUB.I rd=-1,rc | ⇔ | *A.NOT rd=rc* |

Selection

| class | operation | form | type | check |
|---|---|---|---|---|
| arithmetic | SUB | I | | |
| | | | NONE U | O |

Format op rd=imm,rc rd=op(imm,rc)

| 31 ... 24 | 23 ... 18 | 17 ... 12 | 11 ... 0 |
|---|---|---|---|
| **op** | **rd** | **rc** | **imm** |
| 8 | 6 | 6 | 12 |

FIG. 47A

Definition

```
def AddressImmediate(op,rd,rc,imm) as
    i ← imm_11^52 || imm
    c ← RegRead(rc, 64)
    case op of
        A.SUB.I:
            z ← i - c
        A.SUB.I.O:
            t ← (i_63 || i) - (c_63 || c)
            if t_64 ≠ t_63 then
                raise FixedPointArithmetic
            endif
            z ← t_63..0
        A.SUB.I.U.O:
            t ← (i_63 || i) - (c_63 || c)
            if t_64 ≠ 0 then
                raise FixedPointArithmetic
            endif
            z ← t_63..0
    endcase
    RegWrite(rd, 64, z)
enddef
```

FIG. 47B

Exceptions

Fixed-point arithmetic

FIG. 47C

Operation codes

| | |
|---|---|
| A.SET.AND.E.I | Address set and equal immediate |
| A.SET.AND.NE.I | Address set and not equal immediate |
| A.SET.E.I | Address set equal immediate |
| A.SET.GE.I | Address set greater equal immediate signed |
| A.SET.L.I | Address set less immediate signed |
| A.SET.NE.I | Address set not equal immediate |
| A.SET.GE.I.U | Address set greater equal immediate unsigned |
| A.SET.L.I.U | Address set less immediate unsigned |

Equivalencies

| | |
|---|---|
| *A.SET.G.I.U* | Address set greater immediate unsigned |
| *A.SET.LE.I* | Address set less equal immediate signed |
| *A.SET.LE.I.U* | Address set less equal immediate unsigned |

| | | |
|---|---|---|
| *A.SET.G.I rd=imm,rc* | → | A.SET.GE.I rd=imm+1,rc |
| *A.SET.G.I.U rd=imm,rc* | → | A.SET.GE.I.U rd=imm+1,rc |
| *A.SET.LE.I rd=imm,rc* | → | A.SET.L.I rd=imm-1,rc |
| *A.SET.LE.I.U rd=imm,rc* | → | A.SET.L.I.U rd=imm-1,rc |

Redundancies

| | | |
|---|---|---|
| A.SET.AND.E.I rd=rc,0 | ⇔ | *A.SET rd* |
| A.SET.AND.NE.I rd=rc,0 | ⇔ | *A.ZERO rd* |
| A.SET.AND.E.I rd=rc,-1 | ⇔ | *A.SET.E.Z rd=rc* |
| A.SET.AND.NE.I rd=rc,-1 | ⇔ | *A.SET.NE.Z rd=rc* |
| A.SET.E.I rd=rc,0 | ⇔ | *A.SET.E.Z rd=rc* |
| A.SET.GE.I rd=rc,0 | ⇔ | *A.SET.GE.Z rd=rc* |
| A.SET.L.I rd=rc,0 | ⇔ | *A.SET.L.Z rd=rc* |
| A.SET.NE.I rd=rc,0 | ⇔ | *A.SET.NE.Z rd=rc* |
| A.SET.GE.I.U rd=rc,0 | ⇔ | *A.SET.GE.U.Z rd=rc* |
| A.SET.L.I.U rd=rc,0 | ⇔ | *A.SET.L.U.Z rd=rc* |

FIG. 48A-1

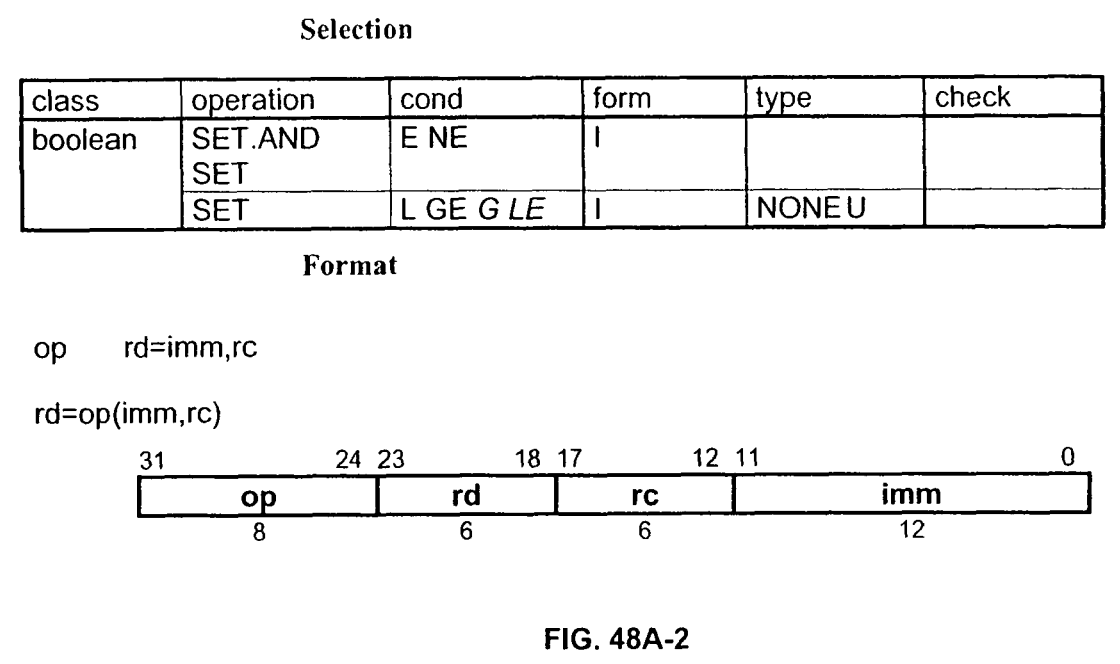

Selection

| class | operation | cond | form | type | check |
|---|---|---|---|---|---|
| boolean | SET.AND<br>SET | E NE | I | | |
| | SET | L GE *G LE* | I | NONE U | |

Format op rd=imm,rc rd=op(imm,rc)

| 31 … 24 | 23 … 18 | 17 … 12 | 11 … 0 |
|---|---|---|---|
| op | rd | rc | imm |
| 8 | 6 | 6 | 12 |

FIG. 48A-2

Definition

```
def AddressImmediate(op,rd,rc,imm) as
    i ← imm11^6 || imm
    c ← RegRead(rc, 128)
    case op of
        A.SET.AND.E.I:
            z ← ((i and c) = 0)^64
        A.SET.AND.NE.I:
            z ← ((i and c) ≠ 0)^64
        A.SET.E.I:
            z ← (i = c)^64
        A.SET.NE.I:
            z ← (i ≠ c)^64
        A.SET.L.I:
            z ← (i < c)^64
        A.SET.GE.I:
            z ← (i ≥ c)^64
        A.SET.L.I.U:
            z ← ((0 || i) < (0 || c))^64
        A.SET.GE.I.U:
            z ← ((0 || i) ≥ (0 || c))^64
    endcase
    RegWrite(rd, 64, z)
enddef
```

FIG. 48B

Exceptions

Fixed-point arithmetic

FIG. 48C

Operation codes

| | |
|---|---|
| A.SUB | Address subtract |
| A.SUB.O | Address subtract signed check overflow |
| A.SUB.U.O | Address subtract unsigned check overflow |

Selection

| class | operation | operand | check |
|---|---|---|---|
| arithmetic | SUB | | |
| | | NONE U | O |

Format op rd=rb,rc rd=op(rb,rc)

| 31 24 | 23 18 | 17 12 | 11 6 | 5 0 |
|---|---|---|---|---|
| A.MINOR | rd | rc | rb | op |
| 8 | 6 | 6 | 6 | 6 |

FIG. 49A

Definition

```
def AddressReversed(op,rd,rc,rb) as
    c ← RegRead(rc, 64)
    b ← RegRead(rb, 64)
    case op of
        A.SUB:
            z ← b - c
        A.SUB.O:
            t ← (b63 || b) - (c63 || c)
            if t64 ≠ t63 then
                raise FixedPointArithmetic
            endif
            z ← t63..0
        A.SUB.U.O:
            t ← (0^1 || b) - (0^1 || c)
            if t64 ≠ 0 then
                raise FixedPointArithmetic
            endif
            z ← t63..0
    endcase
    RegWrite(rd, 64, z)
enddef
```

FIG. 49B

Exceptions

Fixed-point arithmetic

FIG. 49C

Operation codes

| | |
|---|---|
| A.SET.AND.E | Address set and equal zero |
| A.SET.AND.NE | Address set and not equal zero |
| A.SET.E | Address set equal |
| A.SET.GE | Address set greater equal signed |
| A.SET.GE.U | Address set greater equal unsigned |
| A.SET.L | Address set less signed |
| A.SET.L.U | Address set less unsigned |
| A.SET.NE | Address set not equal |

Equivalencies

| | |
|---|---|
| *A.SET.E.Z* | Address set equal zero |
| *A.SET.G.Z* | Address set greater zero signed |
| *A.SET.GE.Z* | Address set greater equal zero signed |
| *A.SET.L.Z* | Address set less zero signed |
| *A.SET.LE.Z* | Address set less equal zero signed |
| *A.SET.NE.Z* | Address set not equal zero |
| *A.SET.G* | Address set greater signed |
| *A.SET.G.U* | Address set greater unsigned |
| *A.SET.LE* | Address set less equal signed |
| *A.SET.LE.U* | Address set less equal unsigned |

| | | |
|---|---|---|
| *A.SET.E.Z rd=rc* | ← | A.SET.AND.E rd=rc,rc |
| *A.SET.G.Z rd=rc* | ⇐ | A.SET.L.U rd=rc,rc |
| *A.SET.GE.Z rd=rc* | ⇐ | A.SET.GE rd=rc,rc |
| *A.SET.L.Z rd=rc* | ⇐ | A.SET.L rd=rc,rc |
| *A.SET.LE.Z rd=rc* | ⇐ | A.SET.GE.U rd=rc,rc |
| *A.SET.NE.Z rd=rc* | ← | A.SET.AND.NE rd=rc,rc |
| *A.SET.G rd=rb,rc* | → | A.SET.L rd=rc,rb |
| *A.SET.G.U rd=rb,rc* | → | A.SET.L.U rd=rc,rb |
| *A.SET.LE rd=rb,rc* | → | A.SET.GE rd=rc,rb |
| *A.SET.LE.U rd=rb,rc* | → | A.SET.GE.U rd=rc,rb |

FIG. 50A-1

Redundancies

| | | |
|---|---|---|
| A.SET.E rd=rc,rc | ⇔ | *A.SET rd* |
| A.SET.NE rd=rc,rc | ⇔ | *A.ZERO rd* |

Selection

| class | operation | cond | operand | check |
|---|---|---|---|---|
| boolean | SET.AND<br>SET | E NE | | |
| | SET | L GE *G LE* | NONE U | |
| | SET | *L GE G LE E NE* | Z | |

Format op rd=rb,rc rd=op(rb,rc)
rd=opz(rcb)

| 31–24 | 23–18 | 17–12 | 11–6 | 5–0 |
|---|---|---|---|---|
| A.MINOR | rd | rc | rb | op |
| 8 | 6 | 6 | 6 | 6 | rc ← rb ← rcb

FIG. 50A-2

Address Set: pseudo code

Definition

```
def AddressSet(op,rd,rc,rb) as
    c ← RegRead(rc, 128)
    b ← RegRead(rb, 128)
    case op of
        A.SET.E:
            z ← (b = c)^64
        A.SET.NE:
            z ← (b ≠ c)^64
        A.SET.AND.E:
            z ← ((b and c) = 0)^64
        A.SET.AND.NE:
            z ← ((b and c) ≠ 0)^64
        A.SET.L:
            z ← ((rc = rb) ? (b < 0) : (b < c))^64
        A.SET.GE:
            z ← ((rc = rb) ? (b ≥ 0) : (b ≥ c))^64
        A.SET.L.U:
            z ← ((rc = rb) ? (b > 0) : ((0 || b) < (0 || c))^64
        A.SET.GE.U:
            z ← ((rc = rb) ? (b ≤ 0) : ((0 || b) ≥ (0 || c))^64
    endcase
    RegWrite(rd, 64, z)
enddef
```

FIG. 50B

Exceptions

Fixed-point arithmetic

FIG. 50C

Operation codes

| | |
|---|---|
| A.SET.E.F.016 | Address set equal floating-point half |
| A.SET.E.F.032 | Address set equal floating-point single |
| A.SET.E.F.064 | Address set equal floating-point double |
| A.SET.LG.F.016 | Address set less greater floating-point half |
| A.SET.LG.F.032 | Address set less greater floating-point single |
| A.SET.LG.F.064 | Address set less greater floating-point double |
| A.SET.L.F.016 | Address set less floating-point half |
| A.SET.L.F.032 | Address set less floating-point single |
| A.SET.L.F.064 | Address set less floating-point double |
| A.SET.GE.F.016 | Address set greater equal floating-point half |
| A.SET.GE.F.032 | Address set greater equal floating-point single |
| A.SET.GE.F.064 | Address set greater equal floating-point double |

Equivalencies

| | |
|---|---|
| *G.SET.G.F.016* | Group set greater floating-point half |
| *G.SET.G.F.032* | Group set greater floating-point single |
| *G.SET.G.F.064* | Group set greater floating-point double |
| *G.SET.LE.F.016* | Group set less equal floating-point half |
| *G.SET.LE.F.032* | Group set less equal floating-point single |
| *G.SET.LE.F.064* | Group set less equal floating-point double |

| | | |
|---|---|---|
| *G.SET.G.F.prec rd=rb,rc* | → | G.SET.L.F.prec rd=rc,rb |
| *G.SET.LE.F.prec rd=rb,rc* | → | G.SET.GE.F.prec rd=rc,rb |

FIG. 51A-1

Selection

| class | op | prec | round/trap |
|---|---|---|---|
| set | SET.<br>E LG<br>L GE<br>G *LE* | 16 32 64 | NONE |

Format

A.op.prec rd=rb,rc rd=aopprec (rb,rc)

| 31 24 | 23 18 | 17 12 | 11 6 | 5 0 |
|---|---|---|---|---|
| A.MINOR | rd | rc | rb | op.prec |
| 8 | 6 | 6 | 6 | 6 |

FIG. 51A-2

Address Set Floating Point: pseudo code

Definition

```
def GroupFloatingPointReversed(op,prec,,rd,rc,rb) as
    c ← F(prec,RegRead(rc, 128)prec-1..0)
    b ← F(prec,RegRead(rb, 128)prec-1..0)
    v ← fcom(b, c)
    case op of
        G.SET.L.F:
            z ← (v=L)^64
        G.SET.GE.F:
            z ← (v=G or v=E)^64
        G.SET.E.F:
            z ← (v=E)^64
        G.SET.LG.F:
            z ← (v=L or v=G)^64
    endcase
    RegWrite(rd, 64, z)
enddef
```

FIG. 51B

Address Set Floating Point: exceptions

Exceptions none

FIG. 51C

Address Shift Left Immediate Add

Operation codes

| | |
|---|---|
| A.SHL.I.ADD | Address shift left immediate add |

Format

A.SHL.I.ADD rd=rc,rb,i rc=op(ra,rb,i)

| 31 24 | 23 18 | 17 12 | 11 6 | 5 2 | 1 0 |
|---|---|---|---|---|---|
| A.MINOR | rd | rc | rb | ASHL.I.ADD | sh |
| 8 | 6 | 6 | 6 | 6 | 2 | assert $1 \le i \le 4$
sh $\leftarrow$ i-1

FIG. 52A

Address Shift Left Immediate Add: pseudo code

Definition

```
def AddressShiftLeftImmediateAdd(sh,rd,rc,rb) as
        c ← RegRead(rc, 64)
        b ← RegRead(rb, 64)
        z ← c + (b62-sh..0 || 0^(1+sh))
        RegWrite(rd, 64, z)
```

$z \leftarrow c + (b_{62-sh..0} \,||\, 0^{1+sh})$

FIG. 52B

Address Shift Left Immediate Add: exceptions

Exceptions none

FIG. 52C

Operation codes

| | |
|---|---|
| A.SHL.I.SUB | Address shift left immediate subtract |

Format

ASHL.I.SUB rd=rb,i,rc rd=op(rb,i,rc)

| 31 24 | 23 18 | 17 12 | 11 6 | 5 2 | 1 0 |
|---|---|---|---|---|---|
| A.MINOR | rd | rc | rb | ASHL.I.SUB | sh |
| 8 | 6 | 6 | 6 | 6 | 2 | assert $1 \le i \le 4$
sh ← i-1

FIG. 53A

Definition

```
def AddressShiftLeftImmediateSubtract(op,rd,rc,rb) as
    c ← RegRead(rc, 128)
    b ← RegRead(rb, 128)
    z ← (b62-sh..0 || 0^(1+sh)) - c
    RegWrite(rd, 64, z)
enddef
```

$z \leftarrow (b_{62-sh..0} \| 0^{1+sh}) - c$

FIG. 53B

Exceptions none

FIG. 53C

Operation codes

| | |
|---|---|
| A.SHL.I | Address shift left immediate |
| A.SHL.I.O | Address shift left immediate signed check overflow |
| A.SHL.I.U.O | Address shift left immediate unsigned check overflow |
| A.SHR.I | Address signed shift right immediate |
| A.SHR.I.U | Address shift right immediate unsigned |

Redundancies

| | | |
|---|---|---|
| A.SHL.I rd=rc,1 | ⇔ | A.ADD rd=rc,rc |
| A.SHL.I.O rd=rc,1 | ⇔ | A.ADD.O rd=rc,rc |
| A.SHL.I.U.O rd=rc,1 | ⇔ | A.ADD.U.O rd=rc,rc |
| A.SHL.I rd=rc,0 | ⇔ | *A.COPY rd=rc* |
| A.SHL.I.O rd=rc,0 | ⇔ | *A.COPY rd=rc* |
| A.SHL.I.U.O rd=rc,0 | ⇔ | *A.COPY rd=rc* |
| A.SHR.I rd=rc,0 | ⇔ | *A.COPY rd=rc* |
| A.SHR.I.U rd=rc,0 | ⇔ | *A.COPY rd=rc* |

Selection

| class | operation | form | operand | check |
|---|---|---|---|---|
| shift | SHL | I | . | |
| | | | NONE U | O |
| | SHR | I | NONE U | |

Format op rd=rc,simm rd=op(rc,simm)

| 31 … 24 | 23 … 18 | 17 … 12 | 11 … 6 | 5 … 0 |
|---|---|---|---|---|
| **A.MINOR** | **rd** | **rc** | **simm** | **op** |
| 8 | 6 | 6 | 6 | 6 |

FIG. 54A

Definition

```
def AddressShiftImmediate(op,rd,rc,simm) as
    c ← RegRead(rc, 64)
    case op of
        A.SHL.I:
            z ← c63-simm..0 || 0^simm
        A.SHL.I.O:
            if c63..63-simm ≠ c63^(simm+1) then
                raise FixedPointArithmetic
            endif
            z ← c63-simm..0 || 0^simm
        A.SHL.I.U.O:
            if c63..64-simm ≠ 0 then
                raise FixedPointArithmetic
            endif
            z ← c63-simm..0 || 0^simm
        A.SHR.I:
            z ← z63^simm || c63..simm
        A.SHR.I.U:
            z ← 0^simm || c63..simm
    endcase
    RegWrite(rd, 64, z)
enddef
```

FIG. 54B

Exceptions

Fixed-point arithmetic

FIG. 54C

Operation codes

| | |
|---|---|
| A.MUX | Address multiplex |

Format

A.MUX ra=rd,rc,rb ra=amux(rd,rc,rb)

| 31..24 | 23..18 | 17..12 | 11..6 | 5..0 |
|---|---|---|---|---|
| A.MUX | rd | rc | rb | ra |
| 8 | 6 | 6 | 6 | 6 |

FIG. 55A

Definition

```
def AddressTernary(op,rd,rc,rb,ra) as
    d ← RegRead(rd, 64)
    c ← RegRead(rc, 64)
    b ← RegRead(rb, 64)
    endcase
    case op of
        A.MUX:
            z ← (c and d) or (b and not d)
    endcase
    RegWrite(ra, 64, z)
enddef
```

FIG. 55B

Exceptions none

FIG. 55C

Operation codes

| | |
|---|---|
| B | Branch |

Format

B rd

| 31 24 | 23 18 | 17 12 | 11 6 | 5 0 |
|---|---|---|---|---|
| B.MINOR | rd | 0 | 0 | B |
| 8 | 6 | 6 | 6 | 6 |

FIG. 56A

Definition

```
def Branch(rd,rc,rb) as
    if (rc ≠ 0) or (rb ≠ 0) then
        raise ReservedInstruction
    endif
    d ← RegRead(rd, 64)
    if (d1..0) ≠ 0 then
        raise OperandBoundary
    endif
    ProgramCounter ← d63..2 || 0^2
    raise TakenBranch
enddef
```

FIG. 56B

Exceptions

Reserved Instruction
Operand Boundary

FIG. 56C

Operation codes

| | |
|---|---|
| B.BACK | Branch back |

Format

B.BACK bback()

| 31 24 | 23 18 | 17 12 | 11 6 | 5 0 |
|---|---|---|---|---|
| B.MINOR | 0 | 0 | 0 | B.BACK |
| 8 | 6 | 6 | 6 | 6 |

FIG. 57A

Definition

```
def BranchBack(rd,rc,rb) as
    c ← RegRead(rc, 128)
    if (rd ≠ 0) or(rc ≠ 0) or (rb ≠ 0) then
        raise ReservedInstruction
    endif
    z ← LoadMemory(ExceptionBase,ExceptionBase+Thread*128,128,L)
    if PrivilegeLevel > c1..0 then
        PrivilegeLevel ← c1..0
    endif
    ProgramCounter ← c63..2 || 0^2
    ExceptionState ← 0
    RegWrite(rd, 128, z)
    raise TakenBranchContinue
enddef
```

FIG. 57B

Exceptions

Reserved Instruction
Operand Boundary
Access disallowed by tag
Access disallowed by global TB
Access disallowed by local TB
Access detail required by tag
Access detail required by local TB
Access detail required by global TB
Local TB miss
Global TB miss

FIG. 57C

Operation codes

| | |
|---|---|
| B.BARRIER | Branch barrier |

Format

B.BARRIER rd bbarrier(rd)

| 31 24 | 23 18 | 17 12 | 11 6 | 5 0 |
|---|---|---|---|---|
| B.MINOR | rd | 0 | 0 | B.BARRIER |
| 8 | 6 | 6 | 6 | 6 |

FIG. 58A

Definition

```
def BranchBarrier(rd,rc,rb) as
    if (rc ≠ 0) or (rb ≠ 0) then
        raise ReservedInstruction
    endif
    d ← RegRead(rd, 64)
    if (d1..0) ≠ 0 then
        raise OperandBoundary
    endif
    ProgramCounter ← d63..2 || 0^2
    FetchBarrier()
    raise TakenBranch
enddef
```

FIG. 58B

Exceptions

Reserved Instruction

FIG. 58C

Operation codes

| | |
|---|---|
| B.AND.E | Branch and equal zero |
| B.AND.NE | Branch and not equal zero |
| B.E | Branch equal |
| B.GE | Branch greater equal signed |
| B.L | Branch signed less |
| B.NE | Branch not equal |
| B.GE.U | Branch greater equal unsigned |
| B.L.U | Branch less unsigned |

Equivalencies

| | |
|---|---|
| *B.E.Z* | Branch equal zero |
| *B.G.Z*[1] | Branch greater zero signed |
| *B.GE.Z*[2] | Branch greater equal zero signed |
| *B.L.Z*[3] | Branch less zero signed |
| *B.LE.Z*[4] | Branch less equal zero signed |
| *B.NE.Z* | Branch not equal zero |
| *B.LE* | Branch less equal signed |
| *B.G* | Branch greater signed |
| *B.LE.U* | Branch less equal unsigned |
| *B.G.U* | Branch greater unsigned |
| *B.NOP* | Branch no operation |

| | | |
|---|---|---|
| *B.E.Z rc,target* | ← | B.AND.E rc,rc,target |
| *B.G.Z rc,target* | ⇐ | B.L.U rc,rc,target |
| *B.GE.Z rc,target* | ⇐ | B.GE rc,rc,target |
| *B.L.Z rc,target* | ⇐ | B.L rc,rc,target |
| *B.LE.Z rc,target* | ⇐ | B.GE.U rc,rc,target |
| *B.NE.Z rc,target* | ← | B.AND.NE rc,rc,target |
| *B.LE rc,rd,target* | → | B.GE rd,rc,target |
| *B.G rc,rd,target* | → | B.L rd,rc,target |
| *B.LE.U rc,rd,target* | → | B.GE.U rd,rc,target |
| *B.G.U rc,rd,target* | → | B.L.U rd,rc,target |
| *B.NOP* | ← | B.NE r0,r0,$ |

FIG. 59A-1

Redundancies

| | | |
|---|---|---|
| B.E rc,rc,target | ⇔ | B.I target |
| B.NE rc,rc,target | ⇔ | *B.NOP* |

Selection

| class | op | compare | type |
|---|---|---|---|
| arithmetic | | L GE *G* *LE* | NONE U |
| *vs.* zero | | *L* *GE* *G* *LE* *E* *NE* | *Z* |
| bitwise | none AND | E NE | |

Format op rd,rc,target if (op(rd,rc)) goto target;

| 31 24 | 23 18 | 17 12 | 11 0 |
|---|---|---|---|
| op | rd | rc | offset |
| 8 | 6 | 6 | 12 |

FIG. 59A-2

Definition

```
def BranchConditionally(op,rd,rc,offset) as
    d ← RegRead(rd, 128)
    c ← RegRead(rc, 128)
    case op of
        B.E:
            z ← d = c
        B.NE:
            z ← d ≠ c
        B.AND.E:
            z ← (d and c) = 0
        BAND.NE:
            z ← (d and c) ≠ 0
        B.L:
            z ← (rd = rc) ? (c < 0): (d < c)
        B.GE:
            z ← (rd = rc) ? (c ≥ 0): (d ≥ c)
        B.L.U:
            z ← (rd = rc) ? (c > 0): ((0 || d) < (0 || c))
        B.GE.U:
            z ← (rd = rc) ? (c ≤ 0): ((0 || d) ≥ (0 || c))
    endcase
    if z then
        ProgramCounter ← ProgramCounter + (offset^50_{9} || offset || 0^2)
        raise TakenBranch
    endif
enddef
```

FIG. 59B

Exceptions none

FIG. 59C

Operation codes

| | |
|---|---|
| B.E.F.016 | Branch equal floating-point half |
| B.E.F.032 | Branch equal floating-point single |
| B.E.F.064 | Branch equal floating-point double |
| B.E.F.128 | Branch equal floating-point quad |
| B.GE.F.016 | Branch greater equal floating-point half |
| B.GE.F.032 | Branch greater equal floating-point single |
| B.GE.F.064 | Branch greater equal floating-point double |
| B.GE.F.128 | Branch greater equal floating-point quad |
| B.L.F.016 | Branch less floating-point half |
| B.L.F.032 | Branch less floating-point single |
| B.L.F.064 | Branch less floating-point double |
| B.L.F.128 | Branch less floating-point quad |
| B.LG.F.016 | Branch less greater floating-point half |
| B.LG.F.032 | Branch less greater floating-point single |
| B.LG.F.064 | Branch less greater floating-point double |
| B.LG.F.128 | Branch less greater floating-point quad |

Equivalencies

| | |
|---|---|
| *B.LE.F.016* | Branch less equal floating-point half |
| *B.LE.F.032* | Branch less equal floating-point single |
| *B.LE.F.064* | Branch less equal floating-point double |
| *B.LE.F.128* | Branch less equal floating-point quad |
| *B.G.F.016* | Branch greater floating-point half |
| *B.G.F.032* | Branch greater floating-point single |
| *B.G.F.064* | Branch greater floating-point double |
| *B.G.F.128* | Branch greater floating-point quad |

| | | |
|---|---|---|
| *B.LE.F.size rc,rd,target* | → | B.GE.F.size rd,rc,target |
| *B.G.F.size rc,rd,target* | → | B.L.F.size rd,rc,target |

FIG. 60A-1

Selection

| number format | type | compare | size |
|---|---|---|---|
| floating-point | F | E LG L GE G<br>*LE* | 16 32<br>64<br>128 |

Format op rd,rc,target if (op(rd,rc)) goto target;

| 31 24 | 23 18 | 17 12 | 11 0 |
|---|---|---|---|
| op | rd | rc | offset |
| 8 | 6 | 6 | 12 |

FIG. 60A-2

Definition

```
def BranchConditional(FloatingPointop,rd,rc,offset) as
    case op of
        B.E.F.16, B.LG.F.16, B.L.F.16, B.GE.F.16:
            size ← 16
        B.E.F.32, B.LG.F.32, B.L.F.32, B.GE.F.32:
            size ← 32
        B.E.F.64, B.LG.F.64, B.L.F.64, B.GE.F.64:
            size ← 64
        B.E.F.128, B.LG.F.128, B.L.F.128, B.GE.F.128:
            size ← 128
    endcase
    d ← F(size,RegRead(rd, 128))
    c ← F(size,RegRead(rc, 128))
    v ← fcom(d, c)
    case op of
        BEF16, BEF32, BEF64, BEF128:
            z ← (v = E)
        BLGF16, BLGF32, BLGF64, BLGF128:
            z ← (v = L) or (v = G)
        BLF16, BLF32, BLF64, BLF128:
            z ← (v = L)
        BGEF16, BGEF32, BGEF64, BGEF128:
            z ← (v = G) or (v = E)
    endcase
    if z then
        ProgramCounter ← ProgramCounter + (offset_11^50 || offset || 0^2)
        raise TakenBranch
    endif
enddef
```

FIG. 60B

Exceptions none

FIG. 60C

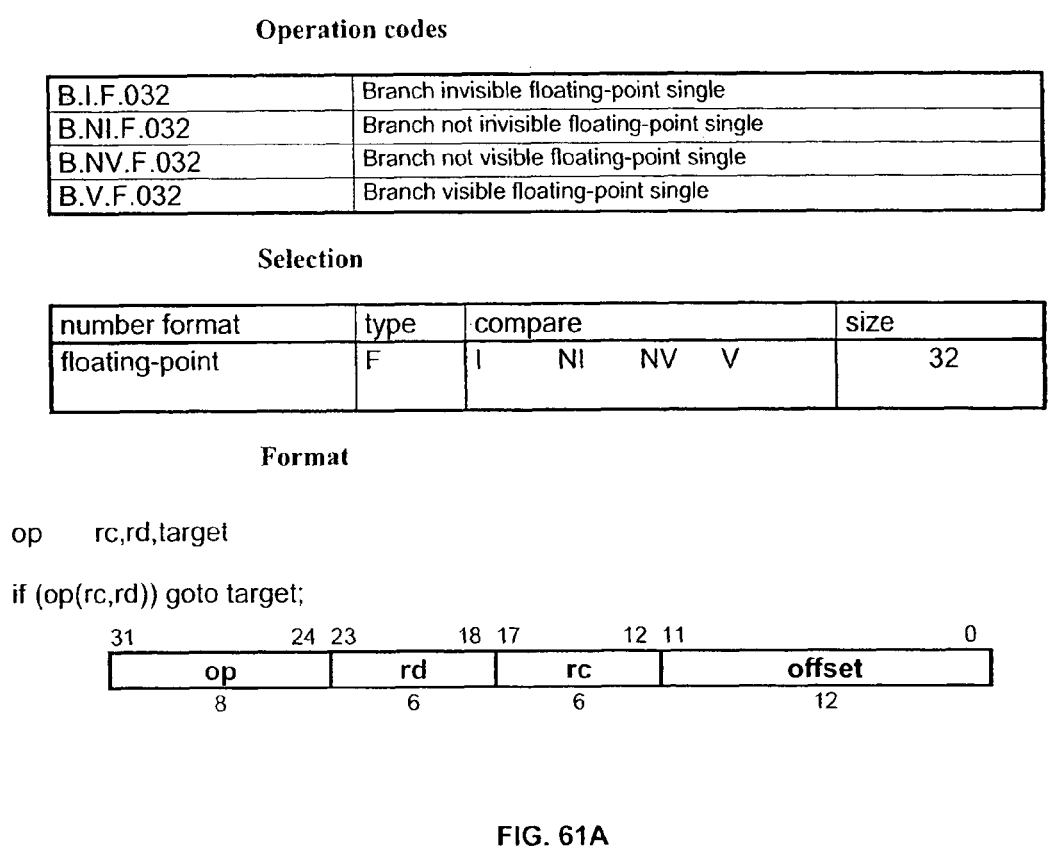

Operation codes

| | |
|---|---|
| B.I.F.032 | Branch invisible floating-point single |
| B.NI.F.032 | Branch not invisible floating-point single |
| B.NV.F.032 | Branch not visible floating-point single |
| B.V.F.032 | Branch visible floating-point single |

Selection

| number format | type | compare | size |
|---|---|---|---|
| floating-point | F | I NI NV V | 32 |

Format op rc,rd,target if (op(rc,rd)) goto target;

| 31 24 | 23 18 | 17 12 | 11 0 |
|---|---|---|---|
| op | rd | rc | offset |
| 8 | 6 | 6 | 12 |

FIG. 61A

Definition

```
def n(z) as (z.t=QNAN) or (z.t=SNAN) enddef

def less(z,b) as fcom(z,b)=L enddef

def trxya,b,c,d) as (fcom(fabs(z),b)=G) and (fcom(fabs(c),d)=G) and (z.s=c.s) enddef


def BranchConditionalVisibilityFloatingPoint(op,rd,rc,offset) as
      d ← RegRead(rd, 128)
      c ← RegRead(rc, 128)
      dx ← F(32,d31..0)
      cx ← F(32,c31..0)
      dy ← F(32,d63..32)
      cy ← F(32,c63..32)
      dz ← F(32,d95..64)
      cz ← F(32,c95..64)
      dw ← F(32,d127..96)
      cw ← F(32,c127..96)
      f1 ← F(32,0x7f000000) // floating-point 1.0
      if (n(dx) or n(dy) or n(dz) or n(dw) or n(cx) or n(cy) or n(cz) or n(cw)) then
            z ← false
      else
            dv ← less(fabs(dx),dz) and less(fabs(dy),dz) and less(dz,f1) and (dz.s=0)
            cv ← less(fabs(cx),cz) and less(fabs(cy),cz) and less(cz,f1) and (cz.s=0)
            trz ← (less(f1,dz) and less(f1,cz)) or ((dz.s=1 and cz.s=1))
            tr ← trxy(dx,dz,cx,cz) or trxy(dy,dz,cy,cz) or trz
            case op of
                  B.I.F.32:
                        z ← tr
                  B.NI.F.32:
                        z ← not tr
                  B.NV.F.32:
                        z ← not (dv and cv)
                  B.V.F.32:
                        z ← dv and cv
            endcase
      endif
      if z then
            ProgramCounter ← ProgramCounter + (offset^59 || offset || 0^2)
            raise TakenBranch
      endif
enddef
```

FIG. 61B

Exceptions none

FIG. 61C

Operation codes

| | |
|---|---|
| B.DOWN | Branch down |

Format

B.DOWN rd bdown(rd)

| 31 24 | 23 18 | 17 12 | 11 6 | 5 0 |
|---|---|---|---|---|
| B.MINOR | rd | 0 | 0 | B.DOWN |
| 8 | 6 | 6 | 6 | 6 |

FIG. 62A

Definition

```
def BranchDown(rd,rc,rb) as
    if (rc ≠ 0) or (rb ≠ 0) then
        raise ReservedInstruction
    endif
    d ← RegRead(rd, 64)
    if PrivilegeLevel > d1..0 then
        PrivilegeLevel ← d1..0
    endif
    ProgramCounter ← d63..2 || 0^2
    raise TakenBranch
enddef
```

FIG. 62B

Exceptions

Reserved Instruction

FIG. 62C

Operation codes

| | |
|---|---|
| B.HALT | Branch halt |

Format

B.HALT bhalt()

| 31 24 | 23 18 | 17 12 | 11 6 | 5 0 |
|---|---|---|---|---|
| B.MINOR | 0 | 0 | 0 | B.HALT |
| 8 | 6 | 6 | 6 | 6 |

FIG. 63A

Definition

```
def BranchHalt(rd,rc,rb) as
    if (rd ≠ 0) or (rc ≠ 0) or (rb ≠ 0) then
            raise ReservedInstruction
    endif
    FetchHalt
```

FIG. 63B

Exceptions

Reserved Instruction

FIG. 63C

Operation codes

| | |
|---|---|
| B.HINT.I | Branch Hint Immediate |

Format

B.HINT.I badd,count,target bhinti(badd,count,target)

| 31 ... 24 | 23 ... 18 | 17 ... 12 | 11 ... 0 |
|---|---|---|---|
| B.HINT.I | simm | count | offset |
| 8 | 6 | 6 | 12 | simm ← badd-pc-4

FIG. 64A

Definition

```
def BranchHintImmediate(simm,count,offset) as
        BranchHint(ProgramCounter + 4 + (0 || simm || 0^2), count,
                ProgramCounter + (offset_17^44 || offset || 0^2))
enddef
```

FIG. 64B

Exceptions none

FIG. 64C

Operation codes

| | |
|---|---|
| B.I | Branch immediate |

Redundancies

| | | |
|---|---|---|
| B.I target | ⇔ | B.E rc,rc,target |

Format

B.I target bi(target)

| 31 24 | 23 0 |
|---|---|
| B.I | offset |
| 8 | 24 |

FIG. 65A

Definition

```
def BranchImmediate(offset) as
    ProgramCounter ← ProgramCounter + (offset_23^38 || offset || 0^2)
    raise TakenBranch
enddef
```

FIG. 65B

Exceptions none

FIG. 65C

Operation codes

| | |
|---|---|
| B.LINK.I | Branch immediate link |

Format

B.LINK.I target blinki(target)

| 31      24 | 23      0 |
|---|---|
| B.LINK.I | offset |
| 8 | 24 |

FIG. 66A

Definition

```
def BranchImmediateLink(offset) as
    RegWrite(0, 64, ProgramCounter + 4)
    ProgramCounter ← ProgramCounter + (offset_23^38 || offset || 0^2)
    raise TakenBranch
enddef
```

FIG. 66B

Exceptions none

FIG. 66C

Operation codes

| | |
|---|---|
| B.LINK | Branch link |

Equivalencies

| | | |
|---|---|---|
| B.LINK | ← | B.LINK 0=0 |
| B.LINK rc | ← | B.LINK 0=rc |

Format

B.LINK rd=rc

| 31 24 | 23 18 | 17 12 | 11 6 | 5 0 |
|---|---|---|---|---|
| B.MINOR | rd | rc | 0 | B.LINK |
| 8 | 6 | 6 | 6 | 6 | rb ← 0

FIG. 67A

Definition

```
def BranchLink(rd,rc,rb) as
    if rb ≠ 0 then
        raise ReservedInstruction
    endif
    c ← RegRead(rc, 64)
    if (c and 3) ≠ 0 then
        raise OperandBoundary
    endif
    z ← ProgramCounter + 4
    RegWrite(rd, 64, z)
    ProgramCounter ← c63..2 || 0^2
    raise TakenBranch
enddef
```

FIG. 67B

Exceptions

Reserved Instruction
Operand Boundary

FIG. 67C

Operation codes

| | |
|---|---|
| L.008[5] | Load signed byte |
| L.016.B | Load signed doublet big-endian |
| L.016.A.B | Load signed doublet aligned big-endian |
| L.016.L | Load signed doublet little-endian |
| L.016.A.L | Load signed doublet aligned little-endian |
| L.032.B | Load signed quadlet big-endian |
| L.032.A.B | Load signed quadlet aligned big-endian |
| L.032.L | Load signed quadlet little-endian |
| L.032.A.L | Load signed quadlet aligned little-endian |
| L.064.B | Load signed octlet big-endian |
| L.064.A.B | Load signed octlet aligned big-endian |
| L.064.L | Load signed octlet little-endian |
| L.064.A.L | Load signed octlet aligned little-endian |
| L.128.B[6] | Load hexlet big-endian |
| L.128.A.B[7] | Load hexlet aligned big-endian |
| L.128.L[8] | Load hexlet little-endian |
| L.128.A.L[9] | Load hexlet aligned little-endian |
| L.U.008[10] | Load unsigned byte |
| L.U.016.B | Load unsigned doublet big-endian |
| L.U.016.A.B | Load unsigned doublet aligned big-endian |
| L.U.016.L | Load unsigned doublet little-endian |
| L.U.016.A.L | Load unsigned doublet aligned little-endian |
| L.U.032.B | Load unsigned quadlet big-endian |
| L.U.032.A.B | Load unsigned quadlet aligned big-endian |
| L.U.032.L | Load unsigned quadlet little-endian |
| L.U.032.A.L | Load unsigned quadlet aligned little-endian |
| L.U.064.B | Load unsigned octlet big-endian |
| L.U.064.A.B | Load unsigned octlet aligned big-endian |
| L.U.064.L | Load unsigned octlet little-endian |
| L.U.064.A.L | Load unsigned octlet aligned little-endian |

FIG. 68A-1

Equivalencies

| | | |
|---|---|---|
| op rd=rc,rb | ← | op rd=rc,rb,0 |

Selection

| number format | type | size | alignment | ordering |
|---|---|---|---|---|
| signed byte | | 8 | | |
| unsigned byte | U | 8 | | |
| signed integer | | 16 32 64 | | L B |
| signed integer aligned | | 16 32 64 | A | L B |
| unsigned integer | U | 16 32 64 | | L B |
| unsigned integer aligned | U | 16 32 64 | A | L B |
| general register | | 128 | | L B |
| general register aligned | | 128 | A | L B |

Format op rd=rc,rb,i rd=op(rc,rb,i)

| 31 24 | 23 18 | 17 12 | 11 6 | 5 | 4 0 |
|---|---|---|---|---|---|
| L.MINOR | rd | rc | rb | i | op |
| 8 | 6 | 6 | 6 | 1 | 5 |

FIG. 68A-2

Definition

```
def Load(op,rd,rc,rb,i) as
    case op of
        L16L, L32L, L8, L16AL, L32AL, L16B, L32B, L16AB, L32AB,
        L64L, L64AL, L64B, L64AB:
            signed ← true
        LU16L, LU32L, LU8, LU16AL, LU32AL, LU16B, LU32B, LU16AB, LU32AB,
        LU64L, LU64AL, LU64B, LU64AB:
            signed ← false
        L128L, L128AL, L128B, L128AB:
            signed ← undefined
    endcase
    case op of
        L8, LU8:
            size ← 8
        L16L, LU16L, L16AL, LU16AL, L16B, LU16B, L16AB, LU16AB:
            size ← 16
        L32L, LU32L, L32AL, LU32AL, L32B, LU32B, L32AB, LU32AB:
            size ← 32
        L64L, LU64L, L64AL, LU64AL, L64B, LU64B, L64AB, LU64AB:
            size ← 64
        L128L, L128AL, L128B, L128AB:
            size ← 128
    endcase
    lsize ← log(size)
    case op of
        L16L, LU16L, L32L, LU32L, L64L, LU64L, L128L,
        L16AL, LU16AL, L32AL, LU32AL, L64AL, LU64AL, L128AL:
            order ← L
        L16B, LU16B, L32B, LU32B, L64B, LU64B, L128B,
        L16AB, LU16AB, L32AB, LU32AB, L64AB, LU64AB, L128AB:
            order ← B
        L8, LU8:
            order ← undefined
    endcase
    c ← RegRead(rc, 64)
    b ← RegRead(rb, 64)
    VirtAddr ← c + ((i + b66-lsize..0) || 0^(lsize-3))
```

FIG. 68B-1

```
        case op of
            L16AL, LU16AL, L32AL, LU32AL, L64AL, LU64AL, L128AL,
            L16AB, LU16AB, L32AB, LU32AB, L64AB, LU64AB, L128AB:
                if (c|size-4..0 ≠ 0 then
                    raise OperandBoundary
                endif
            L16L, LU16L, L32L, LU32L, L64L, LU64L, L128L,
            L16B, LU16B, L32B, LU32B, L64B, LU64B, L128B:
            L8, LU8:
        endcase
        m ← LoadMemory(c,VirtAddr,size,order)
        z ← (m_size-1 and signed)^(128-size) || m
        RegWrite(rd, 128, z)
    enddef
```

FIG. 68B-2

Exceptions

Operand Boundary
Access disallowed by tag
Access disallowed by global TB
Access disallowed by local TB
Access detail required by tag
Access detail required by local TB
Access detail required by global TB
Local TB miss
Global TB miss

FIG. 68C

Operation codes

| | |
|---|---|
| L.I.008[11] | Load immediate signed byte |
| L.I.016.A.B | Load immediate signed doublet aligned big-endian |
| L.I.016.B | Load immediate signed doublet big-endian |
| L.I.016.A.L | Load immediate signed doublet aligned little-endian |
| L.I.016.L | Load immediate signed doublet little-endian |
| L.I.032.A.B | Load immediate signed quadlet aligned big-endian |
| L.I.032.B | Load immediate signed quadlet big-endian |
| L.I.032.A.L | Load immediate signed quadlet aligned little-endian |
| L.I.032.L | Load immediate signed quadlet little-endian |
| L.I.064.A.B | Load immediate signed octlet aligned big-endian |
| L.I.064.B | Load immediate signed octlet big-endian |
| L.I.064.A.L | Load immediate signed octlet aligned little-endian |
| L.I.064.L | Load immediate signed octlet little-endian |
| L.I.128.A.B[12] | Load immediate hexlet aligned big-endian |
| L.I.128.B[13] | Load immediate hexlet big-endian |
| L.I.128.A.L[14] | Load immediate hexlet aligned little-endian |
| L.I.128.L[15] | Load immediate hexlet little-endian |
| L.I.U.008[16] | Load immediate unsigned byte |
| L.I.U.016.A.B | Load immediate unsigned doublet aligned big-endian |
| L.I.U.016.B | Load immediate unsigned doublet big-endian |
| L.I.U.016.A.L | Load immediate unsigned doublet aligned little-endian |
| L.I.U.016.L | Load immediate unsigned doublet little-endian |
| L.I.U.032.A.B | Load immediate unsigned quadlet aligned big-endian |
| L.I.U.032.B | Load immediate unsigned quadlet big-endian |
| L.I.U.032.A.L | Load immediate unsigned quadlet aligned little-endian |
| L.I.U.032.L | Load immediate unsigned quadlet little-endian |
| L.I.U.064.A.B | Load immediate unsigned octlet aligned big-endian |
| L.I.U.064.B | Load immediate unsigned octlet big-endian |
| L.I.U.064.A.L | Load immediate unsigned octlet aligned little-endian |
| L.I.U.064.L | Load immediate unsigned octlet little-endian |

FIG. 69A-1

Selection

| number format | type | size | alignment | ordering |
|---|---|---|---|---|
| signed byte | | 8 | | |
| unsigned byte | U | 8 | | |
| signed integer | | 16 32 64 | | L B |
| signed integer aligned | | 16 32 64 | A | L B |
| unsigned integer | U | 16 32 64 | | L B |
| unsigned integer aligned | U | 16 32 64 | A | L B |
| general register | | 128 | | L B |
| general register aligned | | 128 | A | L B |

Format op rd=rc,offset rd=op(rc,offset)

| 31 24 | 23 18 | 17 12 | 11 0 |
|---|---|---|---|
| op | rd | rc | offset |
| 8 | 6 | 6 | 12 |

FIG. 69A-2

Definition

```
def LoadImmediate(op,rd,rc,offset) as
    case op of
        LI16L, LI32L, LI8, LI16AL, LI32AL, LI16B, LI32B, LI16AB, LI32AB:
        LI64L, LI64AL, LI64B, LI64AB:
            signed ← true
        LIU16L, LIU32L, LIU8, LIU16AL, LIU32AL,
        LIU16B, LIU32B, LIU16AB, LIU32AB:
        LIU64L, LIU64AL, LIU64B, LIU64AB:
            signed ← false
        LI128L, LI128AL, LI128B, LI128AB:
            signed ← undefined
    endcase
    case op of
        LI8, LIU8:
            size ← 8
        LI16L, LIU16L, LI16AL, LIU16AL, LI16B, LIU16B, LI16AB, LIU16AB:
            size ← 16
        LI32L, LIU32L, LI32AL, LIU32AL, LI32B, LIU32B, LI32AB, LIU32AB:
            size ← 32
        LI64L, LIU64L, LI64AL, LIU64AL, LI64B, LIU64B, LI64AB, LIU64AB:
            size ← 64
        LI128L, LI128AL, LI128B, LI128AB:
            size ← 128
    endcase
    lsize ← log(size)
    case op of
        LI16L, LIU16L, LI32L, LIU32L, LI64L, LIU64L, LI128L,
        LI16AL, LIU16AL, LI32AL, LIU32AL, LI64AL, LIU64AL, LI128AL:
            order ← L
        LI16B, LIU16B, LI32B, LIU32B, LI64B, LIU64B, LI128B,
        LI16AB, LIU16AB, LI32AB, LIU32AB, LI64AB, LIU64AB, LI128AB:
            order ← B
        LI8, LIU8:
            order ← undefined
    endcase
    c ← RegRead(rc, 64)
    VirtAddr ← c + (offset_11^(55-lsize) || offset || 0^(lsize-3))
    case op of
        LI16AL, LIU16AL, LI32AL, LIU32AL, LI64AL, LIU64AL, LI128AL,
        LI16AB, LIU16AB, LI32AB, LIU32AB, LI64AB, LIU64AB, LI128AB:
            if (c_(lsize-4..0) ≠ 0 then
                raise OperandBoundary
            endif
        LI16L, LIU16L, LI32L, LIU32L, LI64L, LIU64L, LI128L,
```

FIG. 69B-1

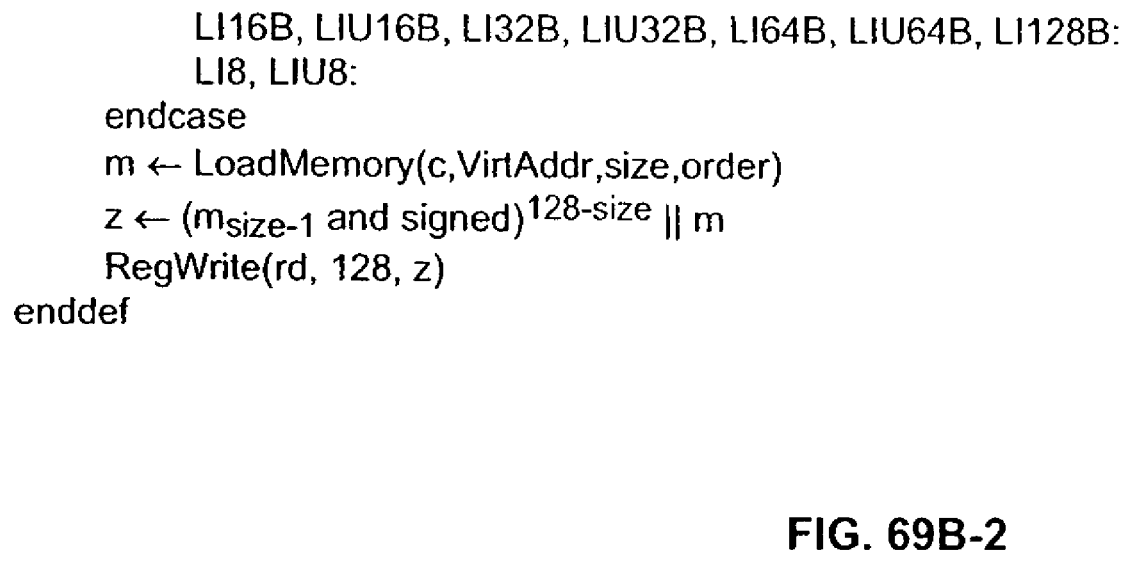

```
            LI16B, LIU16B, LI32B, LIU32B, LI64B, LIU64B, LI128B:
            LI8, LIU8:
      endcase
      m ← LoadMemory(c,VirtAddr,size,order)
      z ← (m_{size-1} and signed)^{128-size} || m
      RegWrite(rd, 128, z)
enddef
```

FIG. 69B-2

Exceptions

Operand Boundary
Access disallowed by tag
Access disallowed by global TB
Access disallowed by local TB
Access detail required by tag
Access detail required by local TB
Access detail required by global TB
Local TB miss
Global TB miss

FIG. 69C

Operation codes

| | |
|---|---|
| S.8[17] | Store byte |
| S.16.B | Store double big-endian |
| S.16.A.B | Store double aligned big-endian |
| S.16.L | Store double little-endian |
| S.16.A.L | Store double aligned little-endian |
| S.32.B | Store quadlet big-endian |
| S.32.A.B | Store quadlet aligned big-endian |
| S.32.L | Store quadlet little-endian |
| S.32.A.L | Store quadlet aligned little-endian |
| S.64.B | Store octlet big-endian |
| S.64.A.B | Store octlet aligned big-endian |
| S.64.L | Store octlet little-endian |
| S.64.A.L | Store octlet aligned little-endian |
| S.128.B | Store hexlet big-endian |
| S.128.A.B | Store hexlet aligned big-endian |
| S.128.L | Store hexlet little-endian |
| S.128.A.L | Store hexlet aligned little-endian |
| S.MUX.64.A.B | Store multiplex octlet aligned big-endian |
| S.MUX.64.A.L | Store multiplex octlet aligned little-endian |

Equivalencies

| | | |
|---|---|---|
| op rd,rc,rb | ← | op rd,rc,rb,0 |

Selection

| number format | op | size | alignment | ordering |
|---|---|---|---|---|
| byte | | 8 | | |
| integer | | 16 32 64 128 | | L B |
| integer aligned | | 16 32 64 128 | A | L B |
| multiplex | MUX | 64 | A | L B |

Format op rd,rc,rb,i op(rd,rc,rb,i)

| 31 24 | 23 18 | 17 12 | 11 6 | 5 | 4 0 |
|---|---|---|---|---|---|
| S.MINOR | rd | rc | rb | i | op |
| 8 | 6 | 6 | 6 | 1 | 5 |

FIG. 70A

Definition

```
def Store(op,rd,rc,rb,i) as
      case op of
            S8:
                  size ← 8
            S16L, S16AL, S16B, S16AB:
                  size ← 16
            S32L, S32AL, S32B, S32AB:
                  size ← 32
            S64L, S64AL, S64B, S64AB,
            SMUX64AB, SMUX64AL:
                  size ← 64
            S128L, S128AL, S128B, S128AB:
                  size ← 128
      endcase
      lsize ← log(size)
      case op of
            S8:
                  order ← undefined
            S16L, S32L, S64L, S128L,
            S16AL, S32AL, S64AL, S128AL, SMUX64ALI:
                  order ← L
            S16B, S32B, S64B, S128B,
            S16AB, S32AB, S64AB, S128AB, SMUX64ABI:
                  order ← B
      endcase
      c ← RegRead(rc, 64)
      b ← RegRead(rb, 64)
      VirtAddr ← c + ((i + b_{66-lsize..0}) || 0^{lsize-3})
      case op of
            S16AL, S32AL, S64AL, S128AL,
            S16AB, S32AB, S64AB, S128AB,
            SMUX64AB, SMUX64AL:
                  if (c_{lsize-4..0} ≠ 0 then
                        raise OperandBoundary
                  endif
            S16L, S32L, S64L, S128L,
            S16B, S32B, S64B, S128B:
            S8:
      endcase
      d ← RegRead(rd, 128)
      case op of
            S8,
            S16L, S16AL, S16B, S16AB,
            S32L, S32AL, S32B, S32AB,
            S64L, S64AL, S64B, S64AB,
            S128L, S128AL, S128B, S128AB:
                  StoreMemory(c,VirtAddr,size,order,d_{size-1..0})
```

FIG. 70B-1

```
        SMUX64AB, SMUX64AL:
            lock
                cm ← LoadMemoryW(c,VirtAddr,size,order)
                m ← (d127..64 & d63..0) | (cm & ~d63..0)
                StoreMemory(c,VirtAddr,size,order,m)
            endlock
    endcase
enddef
```

FIG. 70B-2

Exceptions

Operand Boundary
Access disallowed by tag
Access disallowed by global TB
Access disallowed by local TB
Access detail required by tag
Access detail required by local TB
Access detail required by global TB
Local TB miss
Global TB miss

FIG. 70C

Operation codes

| | |
|---|---|
| S.D.C.S.64.A.B | Store double compare swap octlet aligned big-endian |
| S.D.C.S.64.A.L | Store double compare swap octlet aligned little-endian |

Format op rd@rc,rb rd=op(rd,rc,rb)

| 31 24 | 23 18 | 17 12 | 11 6 | 5 | 4 0 |
|---|---|---|---|---|---|
| S.MINOR | rd | rc | rb | 0 | op |
| 8 | 6 | 6 | 6 | 1 | 5 |

FIG. 71A

Definition

```
def StoreDoubleCompareSwap(op,rd,rc,rb) as
    size ← 64
    lsize ← log(size)
    case op of
        SDCS64AL:
            order ← L
        SDCS64AB:
            order ← B
    endcase
    c ← RegRead(rc, 128)
    b ← RegRead(rb, 128)
    d ← RegRead(rd, 128)
    if (c2..0 ≠ 0) or (b2..0 ≠ 0) then
        raise OperandBoundary
    endif
    lock
        cbm ← LoadMemoryW(c63..0,c63..0,64,order)||LoadMemoryW(b63..0,b63..0,64,order)
        if ((c127..64 || b127..64·) = cbm) then
            StoreMemory((c63..0,c63..0,64,order,d127..64)
            StoreMemory(b63..0,b63..0,64,order,d63..0)
        endif
    endlock
    RegWrite(rd, 128, a)
enddef
```

FIG. 71B

Exceptions

Operand Boundary
Access disallowed by tag
Access disallowed by global TB
Access disallowed by local TB
Access detail required by tag
Access detail required by local TB
Access detail required by global TB
Local TB miss
Global TB miss

FIG. 71C

Operation codes

| | |
|---|---|
| S.I.008[18] | Store immediate byte |
| S.I.016.A.B | Store immediate double aligned big-endian |
| S.I.016.B | Store immediate double big-endian |
| S.I.016.A.L | Store immediate double aligned little-endian |
| S.I.016.L | Store immediate double little-endian |
| S.I.032.A.B | Store immediate quadlet aligned big-endian |
| S.I.032.B | Store immediate quadlet big-endian |
| S.I.032.A.L | Store immediate quadlet aligned little-endian |
| S.I.032.L | Store immediate quadlet little-endian |
| S.I.064.A.B | Store immediate octlet aligned big-endian |
| S.I.064.B | Store immediate octlet big-endian |
| S.I.064.A.L | Store immediate octlet aligned little-endian |
| S.I.064.L | Store immediate octlet little-endian |
| S.I.128.A.B | Store immediate hexlet aligned big-endian |
| S.I.128.B | Store immediate hexlet big-endian |
| S.I.128.A.L | Store immediate hexlet aligned little-endian |
| S.I.128.L | Store immediate hexlet little-endian |
| S.MUXI.64.A.B | Store multiplex immediate octlet aligned big-endian |
| S.MUXI.64.A.L | Store multiplex immediate octlet aligned little-endian |

Selection

| number format | op | size | alignment | ordering |
|---|---|---|---|---|
| byte | | 8 | | |
| integer | | 16 32 64 128 | | L B |
| integer aligned | | 16 32 64 128 | A | L B |
| multiplex | MUX | 64 | A | L B |

Format

S.op.I.size.align.order rd,rc,offset sopisizealignorder(rd,rc,offset)

| 31 24 | 23 18 | 17 12 | 11 0 |
|---|---|---|---|
| **op** | **rd** | **rc** | **offset** |
| 8 | 6 | 6 | 12 |

FIG. 72A

Definition

```
def StoreImmediate(op,rd,rc,offset) as
    case op of
        SI8:
            size ← 8
        SI16L, SI16AL, SI16B, SI16AB:
            size ← 16
        SI32L, SI32AL, SI32B, SI32AB:
            size ← 32
        SI64L, SI64AL, SI64B, SI64AB, SMUXI64AB, SMUXI64AL:
            size ← 64
        SI128L, SI128AL, SI128B, SI128AB
            size ← 128
    endcase
    lsize ← log(size)
    case op of
        SI8:
            order ← undefined
        SI16L, SI32L, SI64L, SI128L,
        SI16AL, SI32AL, SI64AL, SI128AL, SMUXI64AL:
            order ← L
        SI16B, SI32B, SI64B, SI128B,
        SI16AB, SI32AB, SI64AB, SI128AB, SMUXI64AB:
            order ← B
    endcase
    c ← RegRead(rc, 64)
    VirtAddr ← c + (offset_11^(55-lsize) || offset || 0^(lsize-3))
    case op of
        SI16AL, SI32AL, SI64AL, SI128AL,
        SI16AB, SI32AB, SI64AB, SI128AB,
        SMUXI64AB, SMUXI64AL:
            if (c_(lsize-4..0) ≠ 0 then
                raise OperandBoundary
            endif
        SI16L, SI32L, SI64L, SI128L,
        SI16B, SI32B, SI64B, SI128B:
        SI8:
    endcase
    d ← RegRead(rd, 128)
    case op of
        SI8,
        SI16L, SI16AL, SI16B, SI16AB,
        SI32L, SI32AL, SI32B, SI32AB,
        SI64L, SI64AL, SI64B, SI64AB,
        SI128L, SI128AL, SI128B, SI128AB:
```

FIG. 72B-1

```
        StoreMemory(c,VirtAddr,size,order,d_size-1..0)
    SMUXI64AB, SMUXI64AL:
        lock
            cm ← LoadMemoryW(c,VirtAddr,size,order)
            m ← (d_127..64 & d_63..0) | (cm & ~d_63..0)
            StoreMemory(c,VirtAddr,size,order,m)
        endlock
    endcase
enddef
```

FIG. 72B-2

Exceptions

Operand Boundary
Access disallowed by tag
Access disallowed by global TB
Access disallowed by local TB
Access detail required by tag
Access detail required by local TB
Access detail required by global TB
Local TB miss
Global TB miss

FIG. 72C

Operation codes

| | |
|---|---|
| S.A.S.I.64.A.B | Store add swap immediate octlet aligned big-endian |
| S.A.S.I.64.A.L | Store add swap immediate octlet aligned little-endian |
| S.C.S.I.64.A.B | Store compare swap immediate octlet aligned big-endian |
| S.C.S.I.64.A.L | Store compare swap immediate octlet aligned little-endian |
| S.M.S.I.64.A.B | Store multiplex swap immediate octlet aligned big-endian |
| S.M.S.I.64.A.L | Store multiplex swap immediate octlet aligned little-endian |

Selection

| number format | op | size | alignment | ordering |
|---|---|---|---|---|
| add-swap | AS | 64 | A | L B |
| compare-swap | CS | 64 | A | L B |
| multiplex-swap | MS | 64 | A | L B |

Format

S.op.I.64.align.order rd@rc,offset rd=sopi64alignorder(rd,rc,offset)

| 31 24 | 23 18 | 17 12 | 11 0 |
|---|---|---|---|
| **op** | **rd** | **rc** | **offset** |
| 8 | 6 | 6 | 12 |

FIG. 73A

Definition

```
def StoreImmediateInplace(op,rd,rc,offset) as
    size ← 64
    lsize ← log(size)
    case op of
        SASI64AL, SCSI64AL, SMSI64AL:
            order ← L
        SASI64AB, SCSI64AB, SMSI64AB:
            order ← B
    endcase
    c ← RegRead(rc, 64)
    VirtAddr ← c + (offset_9^(55-lsize) || offset || 0^(lsize-3))
    if (c_(lsize-4..0) ≠ 0 then
        raise OperandBoundary
    endif
    d ← RegRead(rd, 128)
    case op of
        SASI64AB, SASI64AL:
            lock
                z ← LoadMemoryW(c,VirtAddr,size,order)
                StoreMemory(c,VirtAddr,size,order,d_(63..0)+z)
            endlock
        SCSI64AB, SCSI64AL:
            lock
                z ← LoadMemoryW(c,VirtAddr,size,order)
                if (z = d_(63..0)) then
                    StoreMemory(c,VirtAddr,size,order,d_(127..64))
                endif
            endlock
        SMSI64AB, SMSI64AL:
            lock
                z ← LoadMemoryW(c,VirtAddr,size,order)
                m ← (d_(127..64) & d_(63..0)) | (z & ~d_(63..0))
                StoreMemory(c,VirtAddr,size,order,m)
            endlock
    endcase
    RegWrite(rd, 64, z)
enddef
```

FIG. 73B

Exceptions

Operand Boundary
Access disallowed by tag
Access disallowed by global TB
Access disallowed by local TB
Access detail required by tag
Access detail required by local TB
Access detail required by global TB
Local TB miss
Global TB miss

FIG. 73C

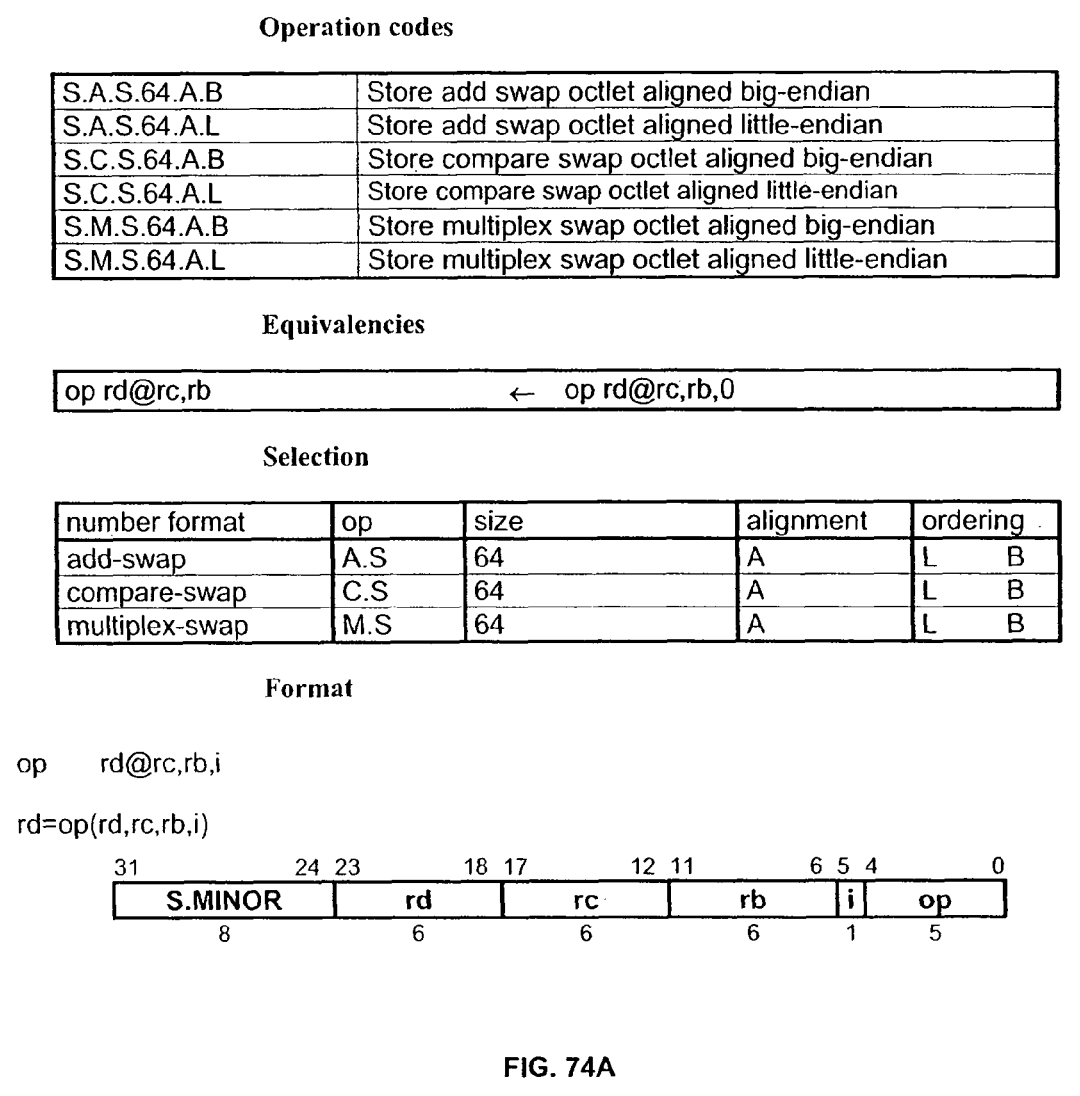

Operation codes

| | |
|---|---|
| S.A.S.64.A.B | Store add swap octlet aligned big-endian |
| S.A.S.64.A.L | Store add swap octlet aligned little-endian |
| S.C.S.64.A.B | Store compare swap octlet aligned big-endian |
| S.C.S.64.A.L | Store compare swap octlet aligned little-endian |
| S.M.S.64.A.B | Store multiplex swap octlet aligned big-endian |
| S.M.S.64.A.L | Store multiplex swap octlet aligned little-endian |

Equivalencies

| | | |
|---|---|---|
| op rd@rc,rb | ← | op rd@rc,rb,0 |

Selection

| number format | op | size | alignment | ordering |
|---|---|---|---|---|
| add-swap | A.S | 64 | A | L B |
| compare-swap | C.S | 64 | A | L B |
| multiplex-swap | M.S | 64 | A | L B |

Format op rd@rc,rb,i rd=op(rd,rc,rb,i)

| 31 24 | 23 18 | 17 12 | 11 6 | 5 | 4 0 |
|---|---|---|---|---|---|
| S.MINOR | rd | rc | rb | i | op |
| 8 | 6 | 6 | 6 | 1 | 5 |

FIG. 74A

Definition

```
def StoreInplace(op,rd,rc,rb,i) as
    size ← 64
    lsize ← log(size)
    case op of
        SAS64AL, SCS64AL, SMS64AL:
            order ← L
        SAS64AB, SCS64AB, SMS64AB:
            order ← B
    endcase
    c ← RegRead(rc, 64)
    b ← RegRead(rb, 64)
    VirtAddr ← c + ((i + b66-lsize..0) || 0^(lsize-3))
    if (clsize-4..0 ≠ 0 then
        raise OperandBoundary
    endif
    d ← RegRead(rd, 128)
    case op of
        SAS64AB, SAS64AL:
            lock
                z ← LoadMemoryW(c,VirtAddr,size,order)
                StoreMemory(c,VirtAddr,size,order,d63..0+z)
            endlock
        SCS64AB, SCS64AL:
            lock
                z ← LoadMemoryW(c,VirtAddr,size,order)
                if (z = d63..0) then
                    StoreMemory(c,VirtAddr,size,order,d127..64)
                endif
            endlock
        SMS64AB, SMS64AL:
            lock
                z ← LoadMemoryW(c,VirtAddr,size,order)
                m ← (d127..64 & d63..0) | (z & ~d63..0)
                StoreMemory(c,VirtAddr,size,order,m)
            endlock
    endcase
    RegWrite(rd, 64, z)
enddef
```

FIG. 74B

Operand Boundary
Access disallowed by tag
Access disallowed by global TB
Access disallowed by local TB
Access detail required by tag
Access detail required by local TB
Access detail required by global TB
Local TB miss
Global TB miss

FIG. 74C

Operation codes

| | |
|---|---|
| G.ADD.H.008.C | Group add halve signed bytes ceiling |
| G.ADD.H.008.F | Group add halve signed bytes floor |
| G.ADD.H.008.N | Group add halve signed bytes nearest |
| G.ADD.H.008.Z | Group add halve signed bytes zero |
| G.ADD.H.016.C | Group add halve signed doublets ceiling |
| G.ADD.H.016.F | Group add halve signed doublets floor |
| G.ADD.H.016.N | Group add halve signed doublets nearest |
| G.ADD.H.016.Z | Group add halve signed doublets zero |
| G.ADD.H.032.C | Group add halve signed quadlets ceiling |
| G.ADD.H.032.F | Group add halve signed quadlets floor |
| G.ADD.H.032.N | Group add halve signed quadlets nearest |
| G.ADD.H.032.Z | Group add halve signed quadlets zero |
| G.ADD.H.064.C | Group add halve signed octlets ceiling |
| G.ADD.H.064.F | Group add halve signed octlets floor |
| G.ADD.H.064.N | Group add halve signed octlets nearest |
| G.ADD.H.064.Z | Group add halve signed octlets zero |
| G.ADD.H.128.C | Group add halve signed hexlet ceiling |
| G.ADD.H.128.F | Group add halve signed hexlet floor |
| G.ADD.H.128.N | Group add halve signed hexlet nearest |
| G.ADD.H.128.Z | Group add halve signed hexlet zero |
| G.ADD.H.U.008.C | Group add halve unsigned bytes ceiling |
| G.ADD.H.U.008.F | Group add halve unsigned bytes floor |
| G.ADD.H.U.008.N | Group add halve unsigned bytes nearest |
| G.ADD.H.U.016.C | Group add halve unsigned doublets ceiling |
| G.ADD.H.U.016.F | Group add halve unsigned doublets floor |
| G.ADD.H.U.016.N | Group add halve unsigned doublets nearest |
| G.ADD.H.U.032.C | Group add halve unsigned quadlets ceiling |
| G.ADD.H.U.032.F | Group add halve unsigned quadlets floor |
| G.ADD.H.U.032.N | Group add halve unsigned quadlets nearest |
| G.ADD.H.U.064.C | Group add halve unsigned octlets ceiling |
| G.ADD.H.U.064.F | Group add halve unsigned octlets floor |
| G.ADD.H.U.064.N | Group add halve unsigned octlets nearest |
| G.ADD.H.U.128.C | Group add halve unsigned hexlet ceiling |
| G.ADD.H.U.128.F | Group add halve unsigned hexlet floor |
| G.ADD.H.U.128.N | Group add halve unsigned hexlet nearest |

FIG. 75A-1

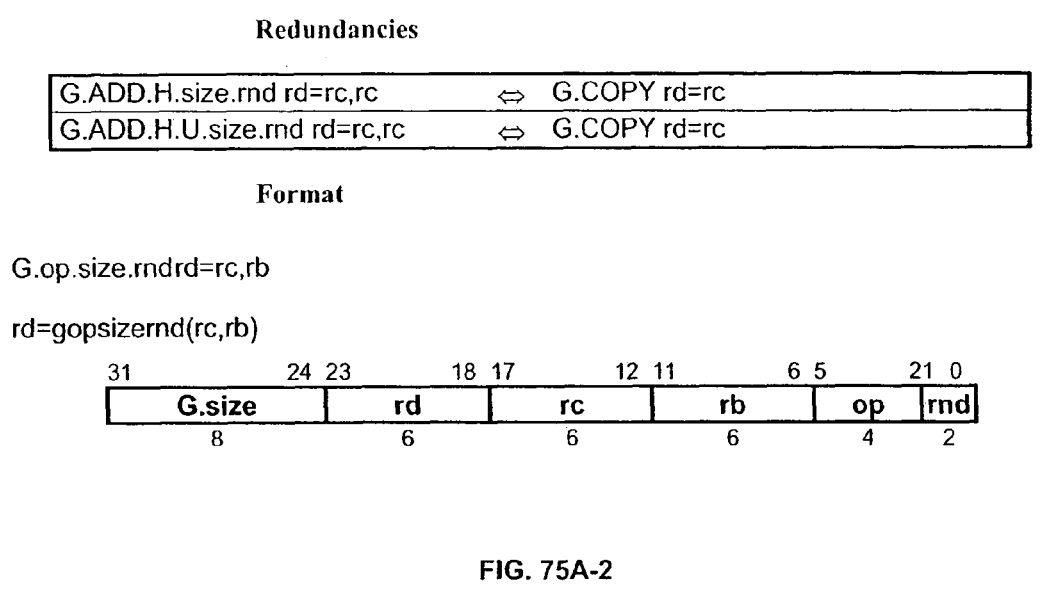

Redundancies

| | | |
|---|---|---|
| G.ADD.H.size.rnd rd=rc,rc | ⇔ | G.COPY rd=rc |
| G.ADD.H.U.size.rnd rd=rc,rc | ⇔ | G.COPY rd=rc |

Format

G.op.size.rndrd=rc,rb rd=gopsizernd(rc,rb)

| 31 24 | 23 18 | 17 12 | 11 6 | 5 2 | 1 0 |
|---|---|---|---|---|---|
| G.size | rd | rc | rb | op | rnd |
| 8 | 6 | 6 | 6 | 4 | 2 |

FIG. 75A-2

Definition

```
def GroupAddHalve(op,rnd,size,rd,rc,rb)
    c ← RegRead(rc, 128)
    b ← RegRead(rb, 128)
    case op of
        G.ADDHC, G.ADDHF, G.ADDHN, G.ADDHZ:
            as ← cs ← bs ← 1
        G.ADDHUC, G.ADDHUF, G.ADDHUN, G.ADDHUZ
            as ← cs ← bs ← 0
            if rnd = Z then
                raise ReservedInstruction
            endif
    endcase
    h ← size+1
    r ← 1
    for i ← 0 to 128-size by size
        p ← ((cs and c_{size-1}) || c_{size-1+i..i}) + ((bs and b_{size-1}) || b_{size-1+i..i})
        case rnd of
            none, N:
                s ← 0^{size} || p_1
            Z:
                s ← 0^{size} || p_{size}
            F:
                s ← 0^{size+1}
            C:
                s ← 0^{size} || 1^1
        endcase
        v ← ((as & p_{size})||p) + (0||s)
        z_{size-1+i..i} ← v_{size..1}
    endfor
    RegWrite(rd, 128, z)
enddef
```

FIG. 75B

Exceptions

ReservedInstruction

FIG. 75C

Operation codes

| | |
|---|---|
| G.COM.AND.E.008 | Group compare and equal zero bytes |
| G.COM.AND.E.016 | Group compare and equal zero doublets |
| G.COM.AND.E.032 | Group compare and equal zero quadlets |
| G.COM.AND.E.064 | Group compare and equal zero octlets |
| G.COM.AND.E.128 | Group compare and equal zero hexlet |
| G.COM.AND.NE.008 | Group compare and not equal zero bytes |
| G.COM.AND.NE.016 | Group compare and not equal zero doublets |
| G.COM.AND.NE.032 | Group compare and not equal zero quadlets |
| G.COM.AND.NE.064 | Group compare and not equal zero octlets |
| G.COM.AND.NE.128 | Group compare and not equal zero hexlet |
| G.COM.E.008 | Group compare equal bytes |
| G.COM.E.016 | Group compare equal doublets |
| G.COM.E.032 | Group compare equal quadlets |
| G.COM.E.064 | Group compare equal octlets |
| G.COM.E.128 | Group compare equal hexlet |
| G.COM.GE.008 | Group compare greater equal signed bytes |
| G.COM.GE.016 | Group compare greater equal signed doublets |
| G.COM.GE.032 | Group compare greater equal signed quadlets |
| G.COM.GE.064 | Group compare greater equal signed octlets |
| G.COM.GE.128 | Group compare greater equal signed hexlet |
| G.COM.GE.U.008 | Group compare greater equal unsigned bytes |
| G.COM.GE.U.016 | Group compare greater equal unsigned doublets |
| G.COM.GE.U.032 | Group compare greater equal unsigned quadlets |
| G.COM.GE.U.064 | Group compare greater equal unsigned octlets |
| G.COM.GE.U.128 | Group compare greater equal unsigned hexlet |
| G.COM.L.008 | Group compare signed less bytes |
| G.COM.L.016 | Group compare signed less doublets |
| G.COM.L.032 | Group compare signed less quadlets |
| G.COM.L.064 | Group compare signed less octlets |
| G.COM.L.128 | Group compare signed less hexlet |
| G.COM.L.U.008 | Group compare less unsigned bytes |
| G.COM.L.U.016 | Group compare less unsigned doublets |
| G.COM.L.U.032 | Group compare less unsigned quadlets |
| G.COM.L.U.064 | Group compare less unsigned octlets |
| G.COM.L.U.128 | Group compare less unsigned hexlet |
| G.COM.NE.008 | Group compare not equal bytes |
| G.COM.NE.016 | Group compare not equal doublets |

FIG. 76A-1

| | |
|---|---|
| G.COM.NE.032 | Group compare not equal quadlets |
| G.COM.NE.064 | Group compare not equal octlets |
| G.COM.NE.128 | Group compare not equal hexlet |

Equivalencies

| | |
|---|---|
| *G.COM.E.Z.008* | Group compare equal zero signed bytes |
| *G.COM.E.Z.016* | Group compare equal zero signed doublets |
| *G.COM.E.Z.032* | Group compare equal zero signed quadlets |
| *G.COM.E.Z.064* | Group compare equal zero signed octlets |
| *G.COM.E.Z.128* | Group compare equal zero signed hexlet |
| *G.COM.G.008* | Group compare signed greater bytes |
| *G.COM.G.016* | Group compare signed greater doublets |
| *G.COM.G.032* | Group compare signed greater quadlets |
| *G.COM.G.064* | Group compare signed greater octlets |
| *G.COM.G.128* | Group compare signed greater hexlet |
| *G.COM.G.U.008* | Group compare greater unsigned bytes |
| *G.COM.G.U.016* | Group compare greater unsigned doublets |
| *G.COM.G.U.032* | Group compare greater unsigned quadlets |
| *G.COM.G.U.064* | Group compare greater unsigned octlets |
| *G.COM.G.U.128* | Group compare greater unsigned hexlet |
| *G.COM.G.Z.008* | Group compare greater zero signed bytes |
| *G.COM.G.Z.016* | Group compare greater zero signed doublets |
| *G.COM.G.Z.032* | Group compare greater zero signed quadlets |
| *G.COM.G.Z.064* | Group compare greater zero signed octlets |
| *G.COM.G.Z.128* | Group compare greater zero signed hexlet |
| *G.COM.GE.Z.008* | Group compare greater equal zero signed bytes |
| *G.COM.GE.Z.016* | Group compare greater equal zero signed doublets |
| *G.COM.GE.Z.032* | Group compare greater equal zero signed quadlets |
| *G.COM.GE.Z.064* | Group compare greater equal zero signed octlets |
| *G.COM.GE.Z.128* | Group compare greater equal zero signed hexlet |
| *G.COM.L.Z.008* | Group compare less zero signed bytes |
| *G.COM.L.Z.016* | Group compare less zero signed doublets |
| *G.COM.L.Z.032* | Group compare less zero signed quadlets |
| *G.COM.L.Z.064* | Group compare less zero signed octlets |
| *G.COM.L.Z.128* | Group compare less zero signed hexlet |
| *G.COM.LE.008* | Group compare less equal signed bytes |
| *G.COM.LE.016* | Group compare less equal signed doublets |
| *G.COM.LE.032* | Group compare less equal signed quadlets |

FIG. 76A-2

| | |
|---|---|
| *G.COM.LE.064* | Group compare less equal signed octlets |
| *G.COM.LE.128* | Group compare less equal signed hexlet |
| *G.COM.LE.U.008* | Group compare less equal unsigned bytes |
| *G.COM.LE.U.016* | Group compare less equal unsigned doublets |
| *G.COM.LE.U.032* | Group compare less equal unsigned quadlets |
| *G.COM.LE.U.064* | Group compare less equal unsigned octlets |
| *G.COM.LE.U.128* | Group compare less equal unsigned hexlet |
| *G.COM.LE.Z.008* | Group compare less equal zero signed bytes |
| *G.COM.LE.Z.016* | Group compare less equal zero signed doublets |
| *G.COM.LE.Z.032* | Group compare less equal zero signed quadlets |
| *G.COM.LE.Z.064* | Group compare less equal zero signed octlets |
| *G.COM.LE.Z.128* | Group compare less equal zero signed hexlet |
| *G.COM.NE.Z.008* | Group compare not equal zero signed bytes |
| *G.COM.NE.Z.016* | Group compare not equal zero signed doublets |
| *G.COM.NE.Z.032* | Group compare not equal zero signed quadlets |
| *G.COM.NE.Z.064* | Group compare not equal zero signed octlets |
| *G.COM.NE.Z.128* | Group compare not equal zero signed hexlet |
| *G.FIX* | Group fixed point arithmetic exception |
| *G.NOP* | Group no operation |

| | | |
|---|---|---|
| *G.COM.E.Z.size rc* | ← | G.COM.AND.E.size rc,rc |
| *G.COM.G.size rd,rc* | → | G.COM.L.size rc,rd |
| *G.COM.G.U.size rd,rc* | → | G.COM.L.U.size rc,rd |
| *G.COM.G.Z.size rc* | ⇐ | G.COM.L.U.size rc,rc |
| *G.COM.GE.Z.size rc* | ⇐ | G.COM.GE.size rc,rc |
| *G.COM.L.Z.size rc* | ⇐ | G.COM.L.size rc,rc |
| *G.COM.LE.size rd,rc* | → | G.COM.GE.size rc,rd |
| *G.COM.LE.U.size rd,rc* | → | G.COM.GE.U.size rc,rd |
| *G.COM.LE.Z.size rc* | ⇐ | G.COM.GE.U.size rc,rc |
| *G.COM.NE.Z.size rc* | ← | G.COM.AND.NE.size rc,rc |
| *G.FIX* | ← | G.COM.E.128 r0,r0 |
| *G.NOP* | ← | G.COM.NE.128 r0,r0 |

Redundancies

| | | |
|---|---|---|
| G.COM.E.size rd,rd | ⇔ | *G.FIX* |
| G.COM.NE.size rd,rd | ⇔ | *G.NOP* |

FIG. 76A-3

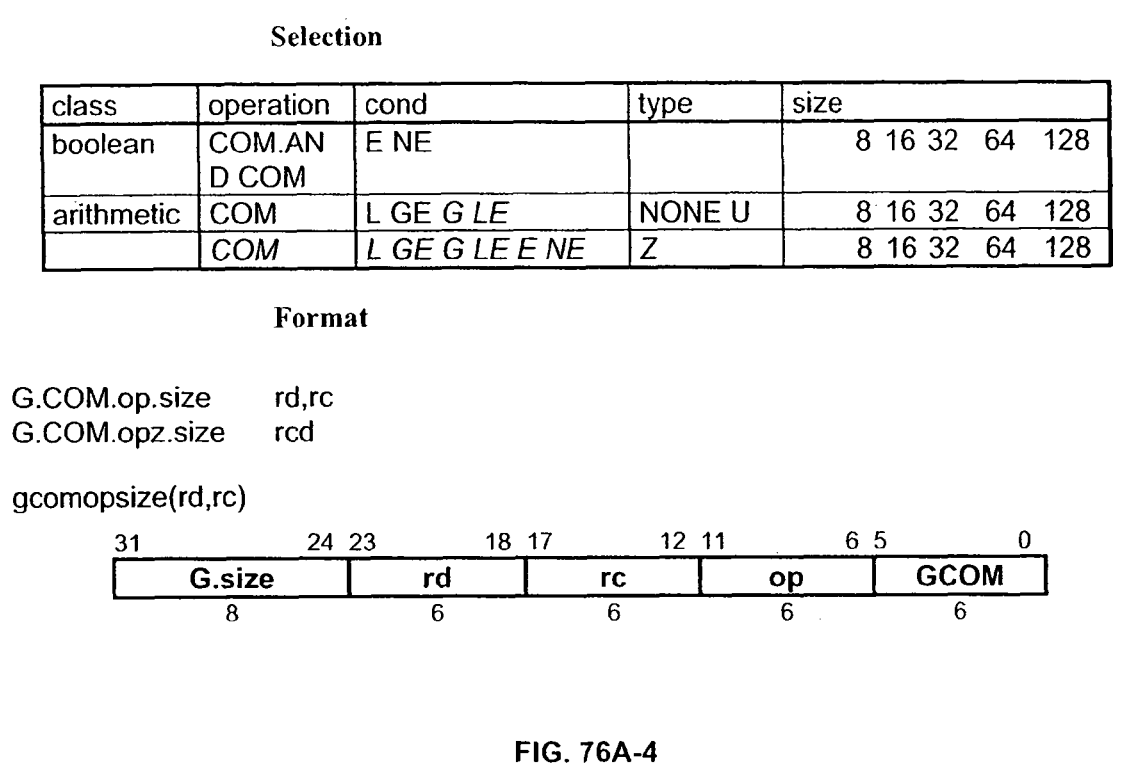

Selection

| class | operation | cond | type | size |
|---|---|---|---|---|
| boolean | COM.AND COM | E NE | | 8 16 32 64 128 |
| arithmetic | COM | L GE *G LE* | NONE U | 8 16 32 64 128 |
| | *COM* | *L GE G LE E NE* | *Z* | 8 16 32 64 128 |

Format

G.COM.op.size rd,rc
G.COM.opz.size rcd gcomopsize(rd,rc)

| 31 24 | 23 18 | 17 12 | 11 6 | 5 0 |
|---|---|---|---|---|
| G.size | rd | rc | op | GCOM |
| 8 | 6 | 6 | 6 | 6 |

FIG. 76A-4

Definition

```
def GroupCompare(op,size,rd,rc)
    d ← RegRead(rd, 128)
    c ← RegRead(rc, 128)
    for i ← 0 to 128-size by size
        case op of
            G.COM.E:
                z_{i+size-1..i} ← (d_{i+size-1..i} = c_{i+size-1..i})^size
            G.COM.NE:
                z_{i+size-1..i} ← (d_{i+size-1..i} ≠ c_{i+size-1..i})^size
            G.COM.AND.E:
                z_{i+size-1..i} ← ((c_{i+size-1..i} and d_{i+size-1..i}) = 0)^size
            G.COM.AND.NE:
                z_{i+size-1..i} ← ((c_{i+size-1..i} and d_{i+size-1..i}) ≠ 0)^size
            G.COM.L:
                z_{i+size-1..i} ← ((rd = rc) ? (c_{i+size-1..i} < 0) : (d_{i+size-1..i} < c_{i+size-1..i}))^size
            G.COM.GE:
                z_{i+size-1..i} ← ((rd = rc) ? (c_{i+size-1..i} ≥ 0) : (d_{i+size-1..i} ≥ c_{i+size-1..i}))^size
            G.COM.L.U:
                z_{i+size-1..i} ← ((rd = rc) ? (c_{i+size-1..i} > 0) :
                    ((0 || d_{+size-1..i}) < (0 || c_{i+size-1..i})))^size
            G.COM.GE.U:
                z_{i+size-1..i} ← ((rd = rc) ? (c_{i+size-1..i} ≤ 0) :
                    ((0 || d_{i+size-1..i}) ≥ (0 || c_{i+size-1..i})))^size
        endcase
    endfor
    if (z ≠ 0) then
        raise FixedPointArithmetic
    endif
enddef
```

FIG. 76B

Exceptions

Fixed-point arithmetic

FIG. 76C

Operation codes

| | |
|---|---|
| G.COM.E.F.016 | Group compare equal floating-point half |
| G.COM.E.F.016.X | Group compare equal floating-point half exact |
| G.COM.E.F.032 | Group compare equal floating-point single |
| G.COM.E.F.032.X | Group compare equal floating-point single exact |
| G.COM.E.F.064 | Group compare equal floating-point double |
| G.COM.E.F.064.X | Group compare equal floating-point double exact |
| G.COM.E.F.128 | Group compare equal floating-point quad |
| G.COM.E.F.128.X | Group compare equal floating-point quad exact |
| G.COM.GE.F.016 | Group compare greater or equal floating-point half |
| G.COM.GE.F.016.X | Group compare greater or equal floating-point half exact |
| G.COM.GE.F.032 | Group compare greater or equal floating-point single |
| G.COM.GE.F.032.X | Group compare greater or equal floating-point single exact |
| G.COM.GE.F.064 | Group compare greater or equal floating-point double |
| G.COM.GE.F.064.X | Group compare greater or equal floating-point double exact |
| G.COM.GE.F.128 | Group compare greater or equal floating-point quad |
| G.COM.GE.F.128.X | Group compare greater or equal floating-point quad exact |
| G.COM.L.F.016 | Group compare less floating-point half |
| G.COM.L.F.016.X | Group compare less floating-point half exact |
| G.COM.L.F.032 | Group compare less floating-point single |
| G.COM.L.F.032.X | Group compare less floating-point single exact |
| G.COM.L.F.064 | Group compare less floating-point double |
| G.COM.L.F.064.X | Group compare less floating-point double exact |
| G.COM.L.F.128 | Group compare less floating-point quad |
| G.COM.L.F.128.X | Group compare less floating-point quad exact |
| G.COM.LG.F.016 | Group compare less or greater floating-point half |
| G.COM.LG.F.016.X | Group compare less or greater floating-point half exact |
| G.COM.LG.F.032 | Group compare less or greater floating-point single |
| G.COM.LG.F.032.X | Group compare less or greater floating-point single exact |
| G.COM.LG.F.064 | Group compare less or greater floating-point double |
| G.COM.LG.F.064.X | Group compare less or greater floating-point double exact |
| G.COM.LG.F.128 | Group compare less or greater floating-point quad |
| G.COM.LG.F.128.X | Group compare less or greater floating-point quad exact |

FIG. 77A-1

Equivalencies

| | |
|---|---|
| *G.COM.G.F.016* | Group compare greater floating-point half |
| *G.COM.G.F.016.X* | Group compare greater floating-point half exact |
| *G.COM.G.F.032* | Group compare greater floating-point single |
| *G.COM.G.F.032.X* | Group compare greater floating-point single exact |
| *G.COM.G.F.064* | Group compare greater floating-point double |
| *G.COM.G.F.064.X* | Group compare greater floating-point double exact |
| *G.COM.G.F.128* | Group compare greater floating-point quad |
| *G.COM.G.F.128.X* | Group compare greater floating-point quad exact |
| *G.COM.LE.F.016* | Group compare less equal floating-point half |
| *G.COM.LE.F.016.X* | Group compare less equal floating-point half exact |
| *G.COM.LE.F.032* | Group compare less equal floating-point single |
| *G.COM.LE.F.032.X* | Group compare less equal floating-point single exact |
| *G.COM.LE.F.064* | Group compare less equal floating-point double |
| *G.COM.LE.F.064.X* | Group compare less equal floating-point double exact |
| *G.COM.LE.F.128* | Group compare less equal floating-point quad |
| *G.COM.LE.F.128.X* | Group compare less equal floating-point quad exact |

| | | |
|---|---|---|
| *G.COM.G.F.prec rd,rc* | → | G.COM.L.F.prec rc,rd |
| *G.COM.G.F.prec.X rd,rc* | → | G.COM.L.F.prec.X rc,rd |
| *G.COM.LE.F.prec rd,rc* | → | G.COM.GE.F.prec rc,rd |
| *G.COM.LE.F.prec.X rd,rc* | → | G.COM.GE.F.prec.X rc,rd |

Selection

| class | op | cond | type | prec | round/trap |
|---|---|---|---|---|---|
| set | COM | E LG L GE *G LE* | F | 16 32 64 128 | NONE X |

Format

G.COM.op.prec.rnd rd,rc rc=gcomopprecrnd(rd,rc)

| 31 ... 24 | 23 ... 18 | 17 ... 12 | 11 ... 6 | 5 ... 0 |
|---|---|---|---|---|
| **G.prec** | **rd** | **rc** | **op.rnd** | **GCOM** |
| 8 | 6 | 6 | 6 | 6 |

FIG. 77A-2

Definition

```
def GroupCompareFloatingPoint(op,prec,round,rd,rc) as
    d ← RegRead(rd, 128)
    c ← RegRead(rc, 128)
    for i ← 0 to 128-prec by prec
        di ← F(prec,d_{i+prec-1..i})
        ci ← F(prec,c_{i+prec-1..i})
        if round≠NONE then
            if (di.t = SNAN) or (ci.t = SNAN) then
                raise FloatingPointArithmetic
            endif
            case op of
                G.COM.L.F, G.COM.GE.F:
                    if (di.t = QNAN) or (ci.t = QNAN) then
                        raise FloatingPointArithmetic
                    endif
                others: //nothing
            endcase
        endif
        case op of
            G.COM.L.F:
                zi ← di?≥ci
            G.COM.GE.F:
                zi ← di!?<ci
            G.COM.E.F:
                zi ← di=ci
            G.COM.LG.F:
                zi ← di≠ci
        endcase
        z_{i+prec-1..i} ← zi
    endfor
    if (z ≠ 0) then
        raise FloatingPointArithmetic
    endif
enddef
```

FIG. 77B

Exceptions

Floating-point arithmetic

FIG. 77C

Operation codes

| | |
|---|---|
| G.COPY.I.16 | Group copy immediate doublet |
| G.COPY.I.32 | Group signed copy immediate quadlet |
| G.COPY.I.64 | Group signed copy immediate octlet |
| G.COPY.I.128 | Group signed copy immediate hexlet |

Equivalencies

| | |
|---|---|
| *G.COPY.I.8* | Group copy immediate byte |
| *G.SET* | Group set |
| *G.ZERO* | Group zero |

| | | |
|---|---|---|
| *G.COPY.I.8 rd=*$(i_7^8 \parallel i_{7..0})$ | ← | G.COPY.I.16 rd=$(0 \parallel i_{7..0} \parallel i_{7..0})$ |
| *G.SET rd* | ← | G.COPY.I.128 rd=-1 |
| *G.ZERO rd* | ← | G.COPY.I.128 rd=0 |

Redundancies

| | | |
|---|---|---|
| G.COPY.I.size rd=-1 | ⇔ | *G.SET rd* |
| G.COPY.I.size rd=0 | ⇔ | *G.ZERO rd* |

Format

G.COPY.I.size rd=i rd=gcopyisize(i)

| 31..25 | 24 | 23..18 | 17..16 | 15..0 |
|---|---|---|---|---|
| G.COPY.I | s | rd | sz | imm |
| 7 | 1 | 6 | 2 | 16 |

$s \leftarrow i_{16}$
$imm \leftarrow i_{15..0}$
$sz \leftarrow \log(size)-4$

FIG. 78A

Definition

```
def GroupCopyImmediate(op,size,rd,imm) as
    s ← op0
    case size of
        16:
            If s then
                ReservedInstruction
            endif
            z ← imm || imm || imm || imm || imm || imm || imm || imm
        32:
            z ← s^16 || imm || s^16 || imm || s^16 || imm || s^16 || imm
        64:
            z ← s^48 || imm || s^48 || imm
        128:
            z ← s^112 || imm
    endcase
    RegWrite(rd, 128, z)
enddef
```

FIG. 78B

Exceptions

Reserved Instruction

FIG. 78C

Operation codes

| | |
|---|---|
| G.ADD.I.016 | Group add immediate doublet |
| G.ADD.I.016.O | Group add immediate signed doublet check overflow |
| G.ADD.I.032 | Group add immediate quadlet |
| G.ADD.I.032.O | Group add immediate signed quadlet check overflow |
| G.ADD.I.064 | Group add immediate octlet |
| G.ADD.I.064.O | Group add immediate signed octlet check overflow |
| G.ADD.I.128 | Group add immediate hexlet |
| G.ADD.I.128.O | Group add immediate signed hexlet check overflow |
| G.ADD.I.U.016.O | Group add immediate unsigned doublet check overflow |
| G.ADD.I.U.032.O | Group add immediate unsigned quadlet check overflow |
| G.ADD.I.U.064.O | Group add immediate unsigned octlet check overflow |
| G.ADD.I.U.128.O | Group add immediate unsigned hexlet check overflow |
| G.AND.I.016 | Group and immediate doublet |
| G.AND.I.032 | Group and immediate quadlet |
| G.AND.I.064 | Group and immediate octlet |
| G.AND.I.128 | Group and immediate hexlet |
| G.NAND.I.016 | Group not and immediate doublet |
| G.NAND.I.032 | Group not and immediate quadlet |
| G.NAND.I.064 | Group not and immediate octlet |
| G.NAND.I.128 | Group not and immediate hexlet |
| G.NOR.I.016 | Group not or immediate doublet |
| G.NOR.I.032 | Group not or immediate quadlet |
| G.NOR.I.064 | Group not or immediate octlet |
| G.NOR.I.128 | Group not or immediate hexlet |
| G.OR.I.016 | Group or immediate doublet |
| G.OR.I.032 | Group or immediate quadlet |
| G.OR.I.064 | Group or immediate octlet |
| G.OR.I.128 | Group or immediate hexlet |
| G.XOR.I.016 | Group exclusive-or immediate doublet |
| G.XOR.I.032 | Group exclusive-or immediate quadlet |
| G.XOR.I.064 | Group exclusive-or immediate octlet |
| G.XOR.I.128 | Group exclusive-or immediate hexlet |

FIG. 79A-1

Equivalencies

| | |
|---|---|
| G.ANDN.I.016 | Group and not immediate doublet |
| G.ANDN.I.032 | Group and not immediate quadlet |
| G.ANDN.I.064 | Group and not immediate octlet |
| G.ANDN.I.128 | Group and not immediate hexlet |
| *G.COPY* | Group copy |
| *G.NOT* | Group not |
| G.ORN.I.016 | Group or not immediate doublet |
| G.ORN.I.032 | Group or not immediate quadlet |
| G.ORN.I.064 | Group or not immediate octlet |
| G.ORN.I.128 | Group or not immediate hexlet |
| G.XNOR.I.016 | Group exclusive-nor immediate doublet |
| G.XNOR.I.032 | Group exclusive-nor immediate quadlet |
| G.XNOR.I.064 | Group exclusive-nor immediate octlet |
| G.XNOR.I.128 | Group exclusive-nor immediate hexlet |

| | | |
|---|---|---|
| *G.ANDN.I.size rd=rc.imm* | → | G.AND.I.size rd=rc,~imm |
| *G.COPY rd=rc* | ← | G.OR.I.128 rd=rc,0 |
| *G.NOT rd=rc* | ← | G.NOR.I.128 rd=rc,0 |
| *G.ORN.I.size rd=rc.imm* | → | G.OR.I.size rd=rc,~imm |
| *G.XNOR.I.size rd=rc.imm* | → | G.XOR.I.size rd=rc,~imm |

Redundancies

| | | |
|---|---|---|
| G.ADD.I.size rd=rc,0 | ⇔ | *G.COPY rd=rc* |
| G.ADD.I.size.O rd=rc,0 | ⇔ | *G.COPY rd=rc* |
| G.ADD.I.U.size.O rd=rc,0 | ⇔ | *G.COPY rd=rc* |
| G.AND.I.size rd=rc,0 | ⇔ | *G.ZERO rd* |
| G.AND.I.size rd=rc,-1 | ⇔ | *G.COPY rd=rc* |
| G.NAND.I.size rd=rc,0 | ⇔ | *G.SET rd* |
| G.NAND.I.size rd=rc,-1 | ⇔ | *G.NOT rd=rc* |
| G.OR.I.size rd=rc,-1 | ⇔ | *G.SET rd* |
| G.NOR.I.size rd=rc,-1 | ⇔ | *G.ZERO rd* |
| G.XOR.I.size rd=rc,0 | ⇔ | *G.COPY rd=rc* |
| G.XOR.I.size rd=rc,-1 | ⇔ | *G.NOT rd=rc* |

FIG. 79A-2

Format

G.op.size rd=rc,imm rd=gopsize(rc,imm)

| 31 … 24 | 23 … 18 | 17 … 12 | 11 10 | 9 … 0 |
|---|---|---|---|---|
| G.op | rd | rc | sz | imm |
| 8 | 6 | 6 | 2 | 10 | sz ← log(size)-4

FIG. 79A-3

Definition

```
def GroupImmediate(op,size,rd,rc,imm) as
    c ← RegRead(rc, 128)
    s ← imm9
    case size of
        16:
            i16 ← s^7 || imm
            b ← i16 || i16 || i16 || i16 || i16 || i16 || i16 || i16
        32:
            b ← s^22 || imm || s^22 || imm || s^22 || imm || s^22 || imm
        64:
            b ← s^54 || imm || s^54 || imm
        128:
            b ← s^118 || imm
    endcase
    case op of
        G.AND.I:
            z ← c and b
        G.OR.I:
            z ← c or b
        G.NAND.I:
            z ← c nand b
        G.NOR.I:
            z ← c nor b
        G.XOR.I:
            z ← c xor b
        G.ADD.I:
            for i ← 0 to 128-size by size
                z_{i+size-1..i} ← c_{i+size-1..i} + b_{i+size-1..i}
            endfor
        G.ADD.I.O:
            for i ← 0 to 128-size by size
                t ← (c_{i+size-1} || c_{i+size-1..i}) + (b_{i+size-1} || b_{i+size-1..i})
                if t_size ≠ t_{size-1} then
                    raise FixedPointArithmetic
                endif
                z_{i+size-1..i} ← t_{size-1..0}
            endfor
        G.ADD.I.U.O:
            for i ← 0 to 128-size by size
                t ← (0^1 || c_{i+size-1..i}) + (0^1 || b_{i+size-1..i})
                if t_size ≠ 0 then
                    raise FixedPointArithmetic
```

FIG. 79B-1

```
                endif
                z_{i+size-1..i} ← t_{size-1..0}
            endfor
    endcase
    RegWrite(rd, 128, z)
enddef
```

FIG. 79B-2

Exceptions

Fixed-point arithmetic

FIG. 79C

Operation codes

| | |
|---|---|
| G.SET.AND.E.I.016 | Group set and equal zero immediate doublets |
| G.SET.AND.E.I.032 | Group set and equal zero immediate quadlets |
| G.SET.AND.E.I.064 | Group set and equal zero immediate octlets |
| G.SET.AND.E.I.128 | Group set and equal zero immediate hexlet |
| G.SET.AND.NE.I.016 | Group set and not equal zero immediate doublets |
| G.SET.AND.NE.I.032 | Group set and not equal zero immediate quadlets |
| G.SET.AND.NE.I.064 | Group set and not equal zero immediate octlets |
| G.SET.AND.NE.I.128 | Group set and not equal zero immediate hexlet |
| G.SET.E.I.016 | Group set equal immediate doublets |
| G.SET.E.I.032 | Group set equal immediate quadlets |
| G.SET.E.I.064 | Group set equal immediate octlets |
| G.SET.E.I.128 | Group set equal immediate hexlet |
| G.SET.GE.I.016 | Group set greater equal immediate signed doublets |
| G.SET.GE.I.032 | Group set greater equal immediate signed quadlets |
| G.SET.GE.I.064 | Group set greater equal immediate signed octlets |
| G.SET.GE.I.128 | Group set greater equal immediate signed hexlet |
| G.SET.GE.I.U.016 | Group set greater equal immediate unsigned doublets |
| G.SET.GE.I.U.032 | Group set greater equal immediate unsigned quadlets |
| G.SET.GE.I.U.064 | Group set greater equal immediate unsigned octlets |
| G.SET.GE.I.U.128 | Group set greater equal immediate unsigned hexlet |
| G.SET.L.I.016 | Group set signed less immediate doublets |
| G.SET.L.I.032 | Group set signed less immediate quadlets |
| G.SET.L.I.064 | Group set signed less immediate octlets |
| G.SET.L.I.128 | Group set signed less immediate hexlet |
| G.SET.L.I.U.016 | Group set less immediate signed doublets |
| G.SET.L.I.U.032 | Group set less immediate signed quadlets |
| G.SET.L.I.U.064 | Group set less immediate signed octlets |
| G.SET.L.I.U.128 | Group set less immediate signed hexlet |
| G.SET.NE.I.016 | Group set not equal immediate doublets |
| G.SET.NE.I.032 | Group set not equal immediate quadlets |
| G.SET.NE.I.064 | Group set not equal immediate octlets |
| G.SET.NE.I.128 | Group set not equal immediate hexlet |
| G.SUB.I.016 | Group subtract immediate doublet |
| G.SUB.I.016.O | Group subtract immediate signed doublet check overflow |
| G.SUB.I.032 | Group subtract immediate quadlet |
| G.SUB.I.032.O | Group subtract immediate signed quadlet check overflow |
| G.SUB.I.064 | Group subtract immediate octlet |
| G.SUB.I.064.O | Group subtract immediate signed octlet check overflow |

FIG. 80A-1

| | |
|---|---|
| G.SUB.I.128 | Group subtract immediate hexlet |
| G.SUB.I.128.O | Group subtract immediate signed hexlet check overflow |
| G.SUB.I.U.016.O | Group subtract immediate unsigned doublet check overflow |
| G.SUB.I.U.032.O | Group subtract immediate unsigned quadlet check overflow |
| G.SUB.I.U.064.O | Group subtract immediate unsigned octlet check overflow |
| G.SUB.I.U.128.O | Group subtract immediate unsigned hexlet check overflow |

Equivalencies

| | |
|---|---|
| *G.NEG.016* | Group negate doublet |
| *G.NEG.016.O* | Group negate signed doublet check overflow |
| *G.NEG.032* | Group negate quadlet |
| *G.NEG.032.O* | Group negate signed quadlet check overflow |
| *G.NEG.064* | Group negate octlet |
| *G.NEG.064.O* | Group negate signed octlet check overflow |
| *G.NEG.128* | Group negate hexlet |
| *G.NEG.128.O* | Group negate signed hexlet check overflow |
| *G.SET.LE.I.016* | Group set less equal immediate signed doublets |
| *G.SET.LE.I.032* | Group set less equal immediate signed quadlets |
| *G.SET.LE.I.064* | Group set less equal immediate signed octlets |
| *G.SET.LE.I.128* | Group set less equal immediate signed hexlet |
| *G.SET.LE.I.U.016* | Group set less equal immediate unsigned doublets |
| *G.SET.LE.I.U.032* | Group set less equal immediate unsigned quadlets |
| *G.SET.LE.I.U.064* | Group set less equal immediate unsigned octlets |
| *G.SET.LE.I.U.128* | Group set less equal immediate unsigned hexlet |
| *G.SET.G.I.016* | Group set immediate signed greater doublets |
| *G.SET.G.I.032* | Group set immediate signed greater quadlets |
| *G.SET.G.I.064* | Group set immediate signed greater octlets |
| *G.SET.G.I.128* | Group set immediate signed greater hexlet |
| *G.SET.G.I.U.016* | Group set greater immediate unsigned doublets |
| *G.SET.G.I.U.032* | Group set greater immediate unsigned quadlets |
| *G.SET.G.I.U.064* | Group set greater immediate unsigned octlets |
| *G.SET.G.I.U.128* | Group set greater immediate unsigned hexlet |

| | | |
|---|---|---|
| *G.NEG.size rd=rc* | → | G.SUB.I.size rd=0,rc |
| *G.NEG.size.O rd=rc* | → | G.SUB.I.size.O rd=0,rc |
| *G.SET.G.I.size rd=imm,rc* | → | G.SET.GE.I.size rd=imm-1,rc |
| *G.SET.G.I.U.size rd=imm,rc* | → | G.SET.GE.I.U.size rd=imm-1,rc |
| *G.SET.LE.I.size rd=imm,rc* | → | G.SET.L.I.size rd=imm-1,rc |
| *G.SET.LE.I.U.size rd=imm,rc* | → | G.SET.L.I.U.size rd=imm-1,rc |

FIG. 80A-2

Redundancies

| | | |
|---|---|---|
| G.SET.AND.E.I.size rd=0,rc | ⇔ | *G.SET.size rd* |
| G.SET.AND.NE.I.size rd=0,rc | ⇔ | *G.ZERO rd* |
| G.SET.AND.E.I.size rd=-1,rc, | ⇔ | *G.SET.E.Z.size rd=rc* |
| G.SET.AND.NE.I.size rd=-1,rc | ⇔ | *G.SET.NE.Z.size rd=rc* |
| G.SET.E.I.size rd=0,rc | ⇔ | *G.SET.E.Z.size rd=rc* |
| G.SET.L.I.size rd=-1,rc | ⇔ | *G.SET.GE.Z.size rd=rc* |
| G.SET.GE.I.size rd=-1,rc | ⇔ | *G.SET.L.Z.size rd=rc* |
| G.SET.NE.I.size rd=0,rc | ⇔ | *G.SET.NE.Z.size rd=rc* |
| G.SET.GE.I.U.size rd=0,rc | ⇔ | *G.SET.E.Z.size rd=rc* |
| G.SET.L.I.U.size rd=0,rc | ⇔ | *G.SET.NE.Z.size rd=rc* |

Selection

| class | operation | cond | form | operand | size | check |
|---|---|---|---|---|---|---|
| arithmetic | SUB | | I | | 16 32 64 128 | |
| | | | | NONE U | 16 32 64 128 | O |
| boolean | SET.AN<br>D<br>SET | E<br>NE | I | | 16 32 64 128 | |
| | SET | L GE<br>*G LE* | I | NONE U | 16 32 64 128 | |

Format

G.op.size rd=imm,rc rd=gopsize(imm,rc)

| 31–24 | 23–18 | 17–12 | 11–10 | 9–0 |
|---|---|---|---|---|
| **G.op** | **rd** | **rc** | **sz** | **imm** |
| 8 | 6 | 6 | 2 | 10 |

sz ← log(size)-4

FIG. 80A-3

Definition

```
def GroupImmediateReversed(op,size,ra,imm) as
    c ← RegRead(rc, 128)
    s ← imm9
    case size of
        16:
            i16 ← s^7 || imm
            b ← i16 || i16 || i16 || i16 || i16 || i16 || i16 || i16
        32:
            b ← s^22 || imm || s^22 || imm || s^22 || imm || s^22 || imm
        64:
            b ← s^54 || imm || s^54 || imm
        128:
            b ← s^118 || imm
    endcase
    for i ← 0 to 128-size by size
        case op of
            G.SUB.I:
                z_(i+size-1..i) ← b_(i+size-1..i) - c_(i+size-1..i)
            G.SUB.I.O:
                t ← (b_(i+size-1) || b_(i+size-1..i)) - (c_(i+size-1) || c_(i+size-1..i))
                if (t_size ≠ t_(size-1) then
                    raise FixedPointArithmetic
                endif
                z_(i+size-1..i) ← t_(size-1..0)
            G.SUB.I.U.O:
                t ← (0^1 || b_(i+size-1..i)) - (0^1 || c_(i+size-1..i))
                if (t_size ≠ 0 then
                    raise FixedPointArithmetic
                endif
                z_(i+size-1..i) ← t_(size-1..0)
            G.SET.E.I:
                z_(i+size-1..i) ← (b_(i+size-1..i) = c_(i+size-1..i))^size
            G.SET.NE.I:
                z_(i+size-1..i) ← (b_(i+size-1..i) ≠ c_(i+size-1..i))^size
            G.SET.AND.E.I:
                z_(i+size-1..i) ← ((b_(i+size-1..i) and c_(i+size-1..i)) = 0)^size
            G.SET.AND.NE.I:
                z_(i+size-1..i) ← ((b_(i+size-1..i) and c_(i+size-1..i)) ≠ 0)^size
            G.SET.L.I:
                z_(i+size-1..i) ← (b_(i+size-1..i) < c_(i+size-1..i))^size
            G.SET.GE.I:
```

FIG. 80B-1

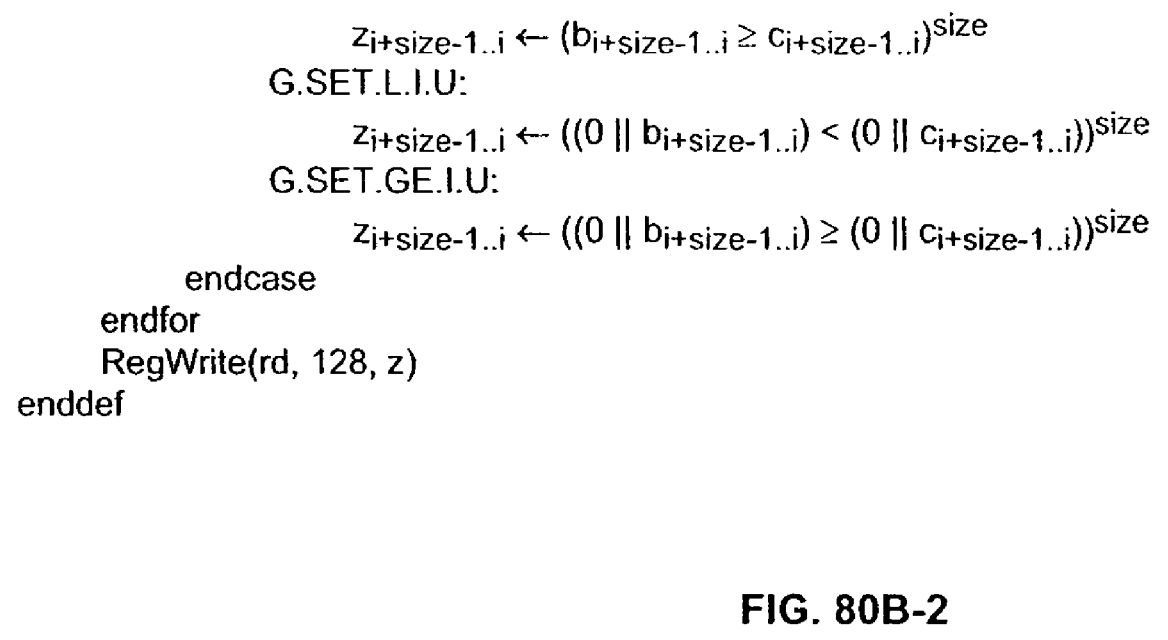

```
            z_{i+size-1..i} ← (b_{i+size-1..i} ≥ c_{i+size-1..i})^size
        G.SET.L.I.U:
            z_{i+size-1..i} ← ((0 || b_{i+size-1..i}) < (0 || c_{i+size-1..i}))^size
        G.SET.GE.I.U:
            z_{i+size-1..i} ← ((0 || b_{i+size-1..i}) ≥ (0 || c_{i+size-1..i}))^size
    endcase
  endfor
  RegWrite(rd, 128, z)
enddef
```

FIG. 80B-2

Exceptions

Fixed-point arithmetic

FIG. 80C

Operation codes

| | |
|---|---|
| G.AAA.008 | Group add add add bytes |
| G.AAA.016 | Group add add add doublets |
| G.AAA.032 | Group add add add quadlets |
| G.AAA.064 | Group add add add octlets |
| G.AAA.128 | Group add add add hexlet |
| G.ASA.008 | Group add subtract add bytes |
| G.ASA.016 | Group add subtract add doublets |
| G.ASA.032 | Group add subtract add quadlets |
| G.ASA.064 | Group add subtract add octlets |
| G.ASA.128 | Group add subtract add hexlet |

Equivalencies

| | |
|---|---|
| *G.AAS.008* | Group add add subtract bytes |
| *G.AAS.016* | Group add add subtract doublets |
| *G.AAS.032* | Group add add subtract quadlets |
| *G.AAS.064* | Group add add subtract octlets |
| *G.AAS.128* | Group add add subtract hexlet |

| | | |
|---|---|---|
| *G.AAS.size rd@rc,rb* | → | G.ASA.size rd@rb,rc |

Redundancies

| | | |
|---|---|---|
| G.AAA.size rd@rc,rc | ⇔ | G.SHL.I.ADD.size rd=rd,rc,1 |
| G.ASA.size rd@rc,rc | ⇔ | *G.NOP* |

Format

G.op.size rd@rc,rb rd=gopsize(rd,rc,rb)

| 31 24 | 23 18 | 17 12 | 11 6 | 5 0 |
|---|---|---|---|---|
| **G.size** | **rd** | **rc** | **rb** | **op** |
| 8 | 6 | 6 | 6 | 6 |

FIG. 81A

Definition

```
def GroupInplace(op,size,rd,rc,rb) as
    d ← RegRead(rd, 128)
    c ← RegRead(rc, 128)
    b ← RegRead(rb, 128)
    for i ← 0 to 128-size by size
        case op of
            G.AAA:
                z_{i+size-1..i} ← + d_{i+size-1..i} + c_{i+size-1..i} + b_{i+size-1..i}
            G.ASA:
                z_{i+size-1..i} ← + d_{i+size-1..i} - c_{i+size-1..i} + b_{i+size-1..i}
        endcase
    endfor
    RegWrite(rd, 128, z)
enddef
```

FIG. 81B

Exceptions none

FIG. 81C

Operation codes

| | |
|---|---|
| G.SET.E.F.016 | Group set equal floating-point half |
| G.SET.E.F.016.X | Group set equal floating-point half exact |
| G.SET.E.F.032 | Group set equal floating-point single |
| G.SET.E.F.032.X | Group set equal floating-point single exact |
| G.SET.E.F.064 | Group set equal floating-point double |
| G.SET.E.F.064.X | Group set equal floating-point double exact |
| G.SET.E.F.128 | Group set equal floating-point quad |
| G.SET.E.F.128.X | Group set equal floating-point quad exact |
| G.SET.GE.F.016.X | Group set greater equal floating-point half exact |
| G.SET.GE.F.032.X | Group set greater equal floating-point single exact |
| G.SET.GE.F.064.X | Group set greater equal floating-point double exact |
| G.SET.GE.F.128.X | Group set greater equal floating-point quad exact |
| G.SET.LG.F.016 | Group set less greater floating-point half |
| G.SET.LG.F.016.X | Group set less greater floating-point half exact |
| G.SET.LG.F.032 | Group set less greater floating-point single |
| G.SET.LG.F.032.X | Group set less greater floating-point single exact |
| G.SET.LG.F.064 | Group set less greater floating-point double |
| G.SET.LG.F.064.X | Group set less greater floating-point double exact |
| G.SET.LG.F.128 | Group set less greater floating-point quad |
| G.SET.LG.F.128.X | Group set less greater floating-point quad exact |
| G.SET.L.F.016 | Group set less floating-point half |
| G.SET.L.F.016.X | Group set less floating-point half exact |
| G.SET.L.F.032 | Group set less floating-point single |
| G.SET.L.F.032.X | Group set less floating-point single exact |
| G.SET.L.F.064 | Group set less floating-point double |
| G.SET.L.F.064.X | Group set less floating-point double exact |
| G.SET.L.F.128 | Group set less floating-point quad |
| G.SET.L.F.128.X | Group set less floating-point quad exact |
| G.SET.GE.F.016 | Group set greater equal floating-point half |
| G.SET.GE.F.032 | Group set greater equal floating-point single |
| G.SET.GE.F.064 | Group set greater equal floating-point double |
| G.SET.GE.F.128 | Group set greater equal floating-point quad |

FIG. 82A-1

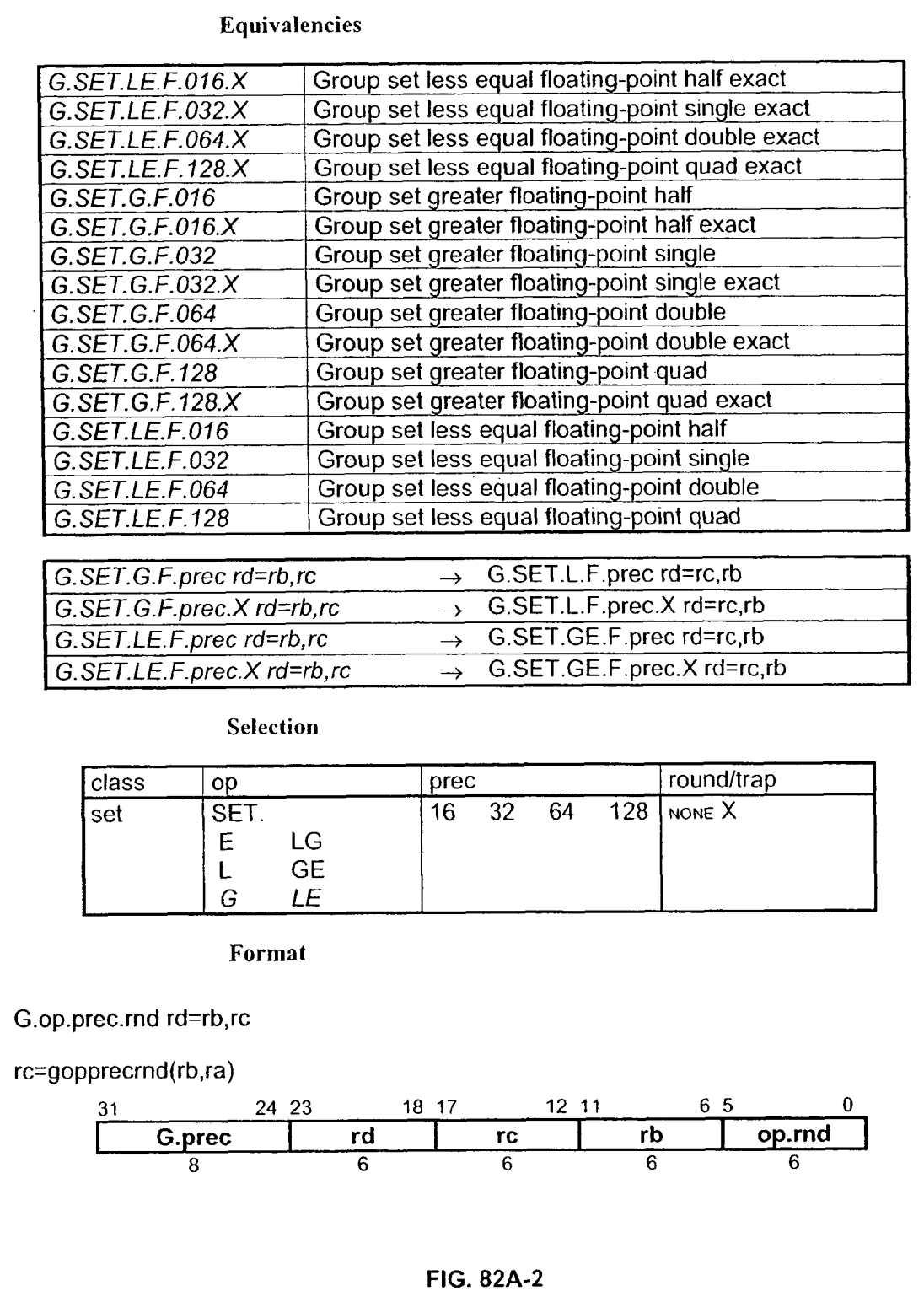

Equivalencies

| | |
|---|---|
| *G.SET.LE.F.016.X* | Group set less equal floating-point half exact |
| *G.SET.LE.F.032.X* | Group set less equal floating-point single exact |
| *G.SET.LE.F.064.X* | Group set less equal floating-point double exact |
| *G.SET.LE.F.128.X* | Group set less equal floating-point quad exact |
| *G.SET.G.F.016* | Group set greater floating-point half |
| *G.SET.G.F.016.X* | Group set greater floating-point half exact |
| *G.SET.G.F.032* | Group set greater floating-point single |
| *G.SET.G.F.032.X* | Group set greater floating-point single exact |
| *G.SET.G.F.064* | Group set greater floating-point double |
| *G.SET.G.F.064.X* | Group set greater floating-point double exact |
| *G.SET.G.F.128* | Group set greater floating-point quad |
| *G.SET.G.F.128.X* | Group set greater floating-point quad exact |
| *G.SET.LE.F.016* | Group set less equal floating-point half |
| *G.SET.LE.F.032* | Group set less equal floating-point single |
| *G.SET.LE.F.064* | Group set less equal floating-point double |
| *G.SET.LE.F.128* | Group set less equal floating-point quad |

| | | |
|---|---|---|
| *G.SET.G.F.prec rd=rb,rc* | → | G.SET.L.F.prec rd=rc,rb |
| *G.SET.G.F.prec.X rd=rb,rc* | → | G.SET.L.F.prec.X rd=rc,rb |
| *G.SET.LE.F.prec rd=rb,rc* | → | G.SET.GE.F.prec rd=rc,rb |
| *G.SET.LE.F.prec.X rd=rb,rc* | → | G.SET.GE.F.prec.X rd=rc,rb |

Selection

| class | op | prec | round/trap |
|---|---|---|---|
| set | SET.<br>E LG<br>L GE<br>*G* *LE* | 16 32 64 128 | NONE X |

Format

G.op.prec.rnd rd=rb,rc rc=gopprecrnd(rb,ra)

| 31 24 | 23 18 | 17 12 | 11 6 | 5 0 |
|---|---|---|---|---|
| G.prec | rd | rc | rb | op.rnd |
| 8 | 6 | 6 | 6 | 6 |

FIG. 82A-2

Definition

```
def GroupFloatingPointReversed(op,prec,round,rd,rc,rb) as
    c ← RegRead(rc, 128)
    b ← RegRead(rb, 128)
    for i ← 0 to 128-prec by prec
        ci ← F(prec,c_{i+prec-1..i})
        bi ← F(prec,b_{i+prec-1..i})
        if round≠NONE then
            if (bi.t = SNAN) or (ci.t = SNAN) then
                raise FloatingPointArithmetic
            endif
            case op of
                G.SET.L.F, G.SET.GE.F:
                    if (bi.t = QNAN) or (ci.t = QNAN) then
                        raise FloatingPointArithmetic
                    endif
                others: //nothing
            endcase
        endif
        case op of
            G.SET.L.F:
                zi ← bi?≥ci
            G.SET.GE.F:
                zi ← bi!?<ci
            G.SET.E.F:
                zi ← bi=ci
            G.SET.LG.F:
                zi ← bi≠ci
        endcase
        z_{i+prec-1..i} ← zi
    endfor
    RegWrite(rd, 128, z)
enddef
```

FIG. 82B

Exceptions

Floating-point arithmetic

FIG. 82C

Operation codes

| | |
|---|---|
| G.SHL.I.ADD.008 | Group shift left immediate add bytes |
| G.SHL.I.ADD.016 | Group shift left immediate add doublets |
| G.SHL.I.ADD.032 | Group shift left immediate add quadlets |
| G.SHL.I.ADD.064 | Group shift left immediate add octlets |
| G.SHL.I.ADD.128 | Group shift left immediate add hexlet |

Redundancies

| | | |
|---|---|---|
| *G.SHL.I.ADD.size rd=rd,rc,1* | ⇔ | G.AAA.size rd@rc,rc |

Format

G.op.size rd=rc,rb,i rd=gopsize(rc,rb,i)

| 31 24 | 23 18 | 17 12 | 11 6 | 5 2 | 1 0 |
|---|---|---|---|---|---|
| G.size | rd | rc | rb | GSHLIADD | sh |
| 8 | 6 | 6 | 6 | 6 | 2 |

assert 1≤i≤4
sh ← i-1

FIG. 83A

Definition

```
def GroupShiftLeftImmediateAdd(sh,size,ra,rb,rc)
        c ← RegRead(rc, 128)
        b ← RegRead(rb, 128)
        for i ← 0 to 128-size by size
                z_{i+size-1..i} ← c_{i+size-1..i} + (b_{i+size-1-sh..i} || 0^{1+sh})
        endfor
        RegWrite(rd, 128, z)
enddef
```

FIG. 83B

Exceptions none

FIG. 83C

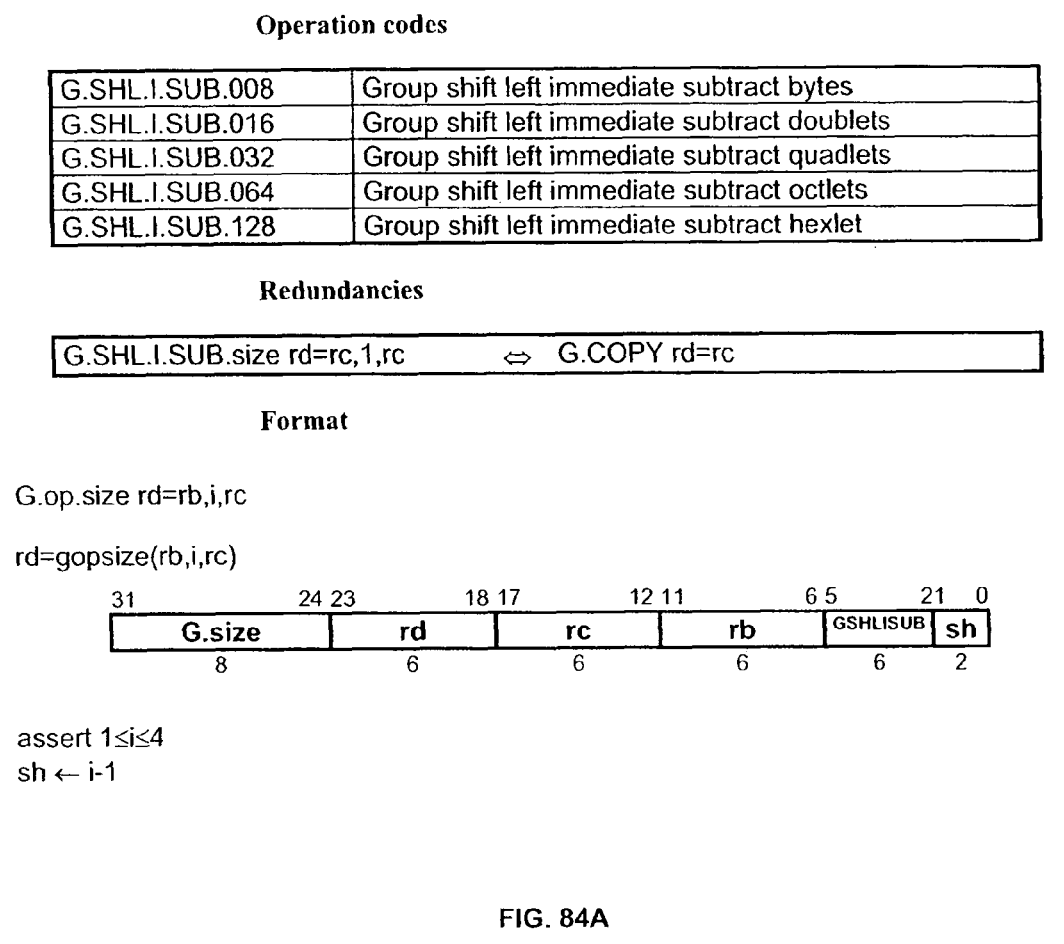

Operation codes

| | |
|---|---|
| G.SHL.I.SUB.008 | Group shift left immediate subtract bytes |
| G.SHL.I.SUB.016 | Group shift left immediate subtract doublets |
| G.SHL.I.SUB.032 | Group shift left immediate subtract quadlets |
| G.SHL.I.SUB.064 | Group shift left immediate subtract octlets |
| G.SHL.I.SUB.128 | Group shift left immediate subtract hexlet |

Redundancies

| | | |
|---|---|---|
| G.SHL.I.SUB.size rd=rc,1,rc | ⇔ | G.COPY rd=rc |

Format

G.op.size rd=rb,i,rc rd=gopsize(rb,i,rc)

| 31 24 | 23 18 | 17 12 | 11 6 | 5 2 | 1 0 |
|---|---|---|---|---|---|
| G.size | rd | rc | rb | GSHLISUB | sh |
| 8 | 6 | 6 | 6 | 6 | 2 |

assert 1≤i≤4
sh ← i-1

FIG. 84A

Definition

```
def GroupShiftLeftImmediateSubtract(sh,size,ra,rb,rc)
    c ← RegRead(rc, 128)
    b ← RegRead(rb, 128)
    for i ← 0 to 128-size by size
        z_{i+size-1..i} ← (b_{i+size-1-sh..i} || 0^{1+sh}) - c_{i+size-1..i}
    endfor
    RegWrite(rd, 128, z)
enddef
```

FIG. 84B

Exceptions none

FIG. 84C

Operation codes

| | |
|---|---|
| G.SUB.H.008.C | Group subtract halve signed bytes ceiling |
| G.SUB.H.008.F | Group subtract halve signed bytes floor |
| G.SUB.H.008.N | Group subtract halve signed bytes nearest |
| G.SUB.H.008.Z | Group subtract halve signed bytes zero |
| G.SUB.H.016.C | Group subtract halve signed doublets ceiling |
| G.SUB.H.016.F | Group subtract halve signed doublets floor |
| G.SUB.H.016.N | Group subtract halve signed doublets nearest |
| G.SUB.H.016.Z | Group subtract halve signed doublets zero |
| G.SUB.H.032.C | Group subtract halve signed quadlets ceiling |
| G.SUB.H.032.F | Group subtract halve signed quadlets floor |
| G.SUB.H.032.N | Group subtract halve signed quadlets nearest |
| G.SUB.H.032.Z | Group subtract halve signed quadlets zero |
| G.SUB.H.064.C | Group subtract halve signed octlets ceiling |
| G.SUB.H.064.F | Group subtract halve signed octlets floor |
| G.SUB.H.064.N | Group subtract halve signed octlets nearest |
| G.SUB.H.064.Z | Group subtract halve signed octlets zero |
| G.SUB.H.128.C | Group subtract halve signed hexlet ceiling |
| G.SUB.H.128.F | Group subtract halve signed hexlet floor |
| G.SUB.H.128.N | Group subtract halve signed hexlet nearest |
| G.SUB.H.128.Z | Group subtract halve signed hexlet zero |
| G.SUB.H.U.008.C | Group subtract halve unsigned bytes ceiling |
| G.SUB.H.U.008.F | Group subtract halve unsigned bytes floor |
| G.SUB.H.U.008.N | Group subtract halve unsigned bytes nearest |
| G.SUB.H.U.008.Z | Group subtract halve unsigned bytes zero |
| G.SUB.H.U.016.C | Group subtract halve unsigned doublets ceiling |
| G.SUB.H.U.016.F | Group subtract halve unsigned doublets floor |
| G.SUB.H.U.016.N | Group subtract halve unsigned doublets nearest |
| G.SUB.H.U.016.Z | Group subtract halve unsigned doublets zero |
| G.SUB.H.U.032.C | Group subtract halve unsigned quadlets ceiling |
| G.SUB.H.U.032.F | Group subtract halve unsigned quadlets floor |
| G.SUB.H.U.032.N | Group subtract halve unsigned quadlets nearest |
| G.SUB.H.U.032.Z | Group subtract halve unsigned quadlets zero |
| G.SUB.H.U.064.C | Group subtract halve unsigned octlets ceiling |
| G.SUB.H.U.064.F | Group subtract halve unsigned octlets floor |
| G.SUB.H.U.064.N | Group subtract halve unsigned octlets nearest |
| G.SUB.H.U.064.Z | Group subtract halve unsigned octlets zero |
| G.SUB.H.U.128.C | Group subtract halve unsigned hexlet ceiling |
| G.SUB.H.U.128.F | Group subtract halve unsigned hexlet floor |
| G.SUB.H.U.128.N | Group subtract halve unsigned hexlet nearest |
| G.SUB.H.U.128.Z | Group subtract halve unsigned hexlet zero |

FIG. 85A-1

Redundancies

| | | |
|---|---|---|
| G.SUB.H.size.rnd rd=rc,rc | ⇔ | G.ZERO rd |
| G.SUB.H.U.size.rnd rd=rc,rc | ⇔ | G.ZERO rd |

Format

G.op.size.rndrd=rb,rc rd=gopsizernd(rb,rc)

| 31 … 24 | 23 … 18 | 17 … 12 | 11 … 6 | 5 … 2 | 1 0 |
|---|---|---|---|---|---|
| G.size | rd | rc | rb | op | rnd |
| 8 | 6 | 6 | 6 | 4 | 2 |

FIG. 85A-2

Definition

```
def GroupSubtractHalve(op,rnd,size,rd,rc,rb)
    c ← RegRead(rc, 128)
    b ← RegRead(rb, 128)
    case op of
        G.SUB.H.C, G.SUB.H.F, G.SUB.H.N, G.SUB.H.Z:
            zs ← cs ← bs ← 1
        G.SUB.H.U.C, G.SUB.H.U.F, G.SUB.H.U.N, G.SUB.H.U.Z
            zs ← 1
            cs ← bs ← 0
    endcase
    for i ← 0 to 128-size by size
        p ← ((bs and b_{size-1}) || b_{size-1+i..i}) - ((cs and c_{size-1}) || c_{size-1+i..i})
        case rnd of
            none, N:
                s ← 0^{size} || p_1
            Z:
                s ← 0^{size} || p_size
            F:
                s ← 0^{size+1}
            C:
                s ← 0^{size} || 1^1
        endcase
        v ← ((zs & p_size)||p) + (0||s)
        if v_{size+1} = (zs & v_size) then
            z_{size-1+i..i} ← v_{size..1}
        else
            z_{size-1+i..i} ← zs ? (v_{size+1} || ~v^{size-1}_{size+1}) : 1^{size}
        endif
    endfor
    RegWrite(rd, 128, z)
enddef
```

FIG. 85B

Exceptions none

FIG. 85C

Operation codes

| | |
|---|---|
| G.MUX | Group multiplex |

Redundancies

| | | |
|---|---|---|
| G.MUX ra=rd,rc,rc | ⇔ | *G.COPY ra=rc* |
| G.MUX ra=ra,rc,rb | ⇔ | G.BOOLEAN ra@rc,rb,0x11001010 |
| G.MUX ra=rd,ra,rb | ⇔ | G.BOOLEAN ra@rd,rb,0x11100010 |
| G.MUX ra=rd,rc,ra | ⇔ | G.BOOLEAN ra@rd,rc,0x11011000 |
| G.MUX ra=rd,rd,rb | ⇔ | G.OR ra=rd,rb |
| G.MUX ra=rd,rc,rd | ⇔ | G.AND ra=rd,rc |

Format

G.MUX ra=rd,rc,rb ra=gmux(rd,rc,rb)

| 31 24 | 23 18 | 17 12 | 11 6 | 5 0 |
|---|---|---|---|---|
| G.MUX | rd | rc | rb | ra |
| 8 | 6 | 6 | 6 | 6 |

FIG. 86A

Definition

```
def GroupTernary(op,size,rd,rc,rb,ra) as
    d ← RegRead(rd, 128)
    c ← RegRead(rc, 128)
    b ← RegRead(rb, 128)
    case op of
        G.MUX:
            z ← (c and d) or (b and not d)
    endcase
    RegWrite(ra, 128, z)
enddef
```

FIG. 86B

Exceptions none

FIG. 86C

Operation codes

| | |
|---|---|
| X.DEPOSIT.002 | Crossbar deposit signed pecks |
| X.DEPOSIT.004 | Crossbar deposit signed nibbles |
| X.DEPOSIT.008 | Crossbar deposit signed bytes |
| X.DEPOSIT.016 | Crossbar deposit signed doublets |
| X.DEPOSIT.032 | Crossbar deposit signed quadlets |
| X.DEPOSIT.064 | Crossbar deposit signed octlets |
| X.DEPOSIT.128 | Crossbar deposit signed hexlet |
| X.DEPOSIT.U.002 | Crossbar deposit unsigned pecks |
| X.DEPOSIT.U.004 | Crossbar deposit unsigned nibbles |
| X.DEPOSIT.U.008 | Crossbar deposit unsigned bytes |
| X.DEPOSIT.U.016 | Crossbar deposit unsigned doublets |
| X.DEPOSIT.U.032 | Crossbar deposit unsigned quadlets |
| X.DEPOSIT.U.064 | Crossbar deposit unsigned octlets |
| X.DEPOSIT.U.128 | Crossbar deposit unsigned hexlet |
| X.WITHDRAW.U.002 | Crossbar withdraw unsigned pecks |
| X.WITHDRAW.U.004 | Crossbar withdraw unsigned nibbles |
| X.WITHDRAW.U.008 | Crossbar withdraw unsigned bytes |
| X.WITHDRAW.U.016 | Crossbar withdraw unsigned doublets |
| X.WITHDRAW.U.032 | Crossbar withdraw unsigned quadlets |
| X.WITHDRAW.U.064 | Crossbar withdraw unsigned octlets |
| X.WITHDRAW.U.128 | Crossbar withdraw unsigned hexlet |
| X.WITHDRAW.002 | Crossbar withdraw pecks |
| X.WITHDRAW.004 | Crossbar withdraw nibbles |
| X.WITHDRAW.008 | Crossbar withdraw bytes |
| X.WITHDRAW.016 | Crossbar withdraw doublets |
| X.WITHDRAW.032 | Crossbar withdraw quadlets |
| X.WITHDRAW.064 | Crossbar withdraw octlets |
| X.WITHDRAW.128 | Crossbar withdraw hexlet |

FIG. 87A-1

Figure 87A-2:
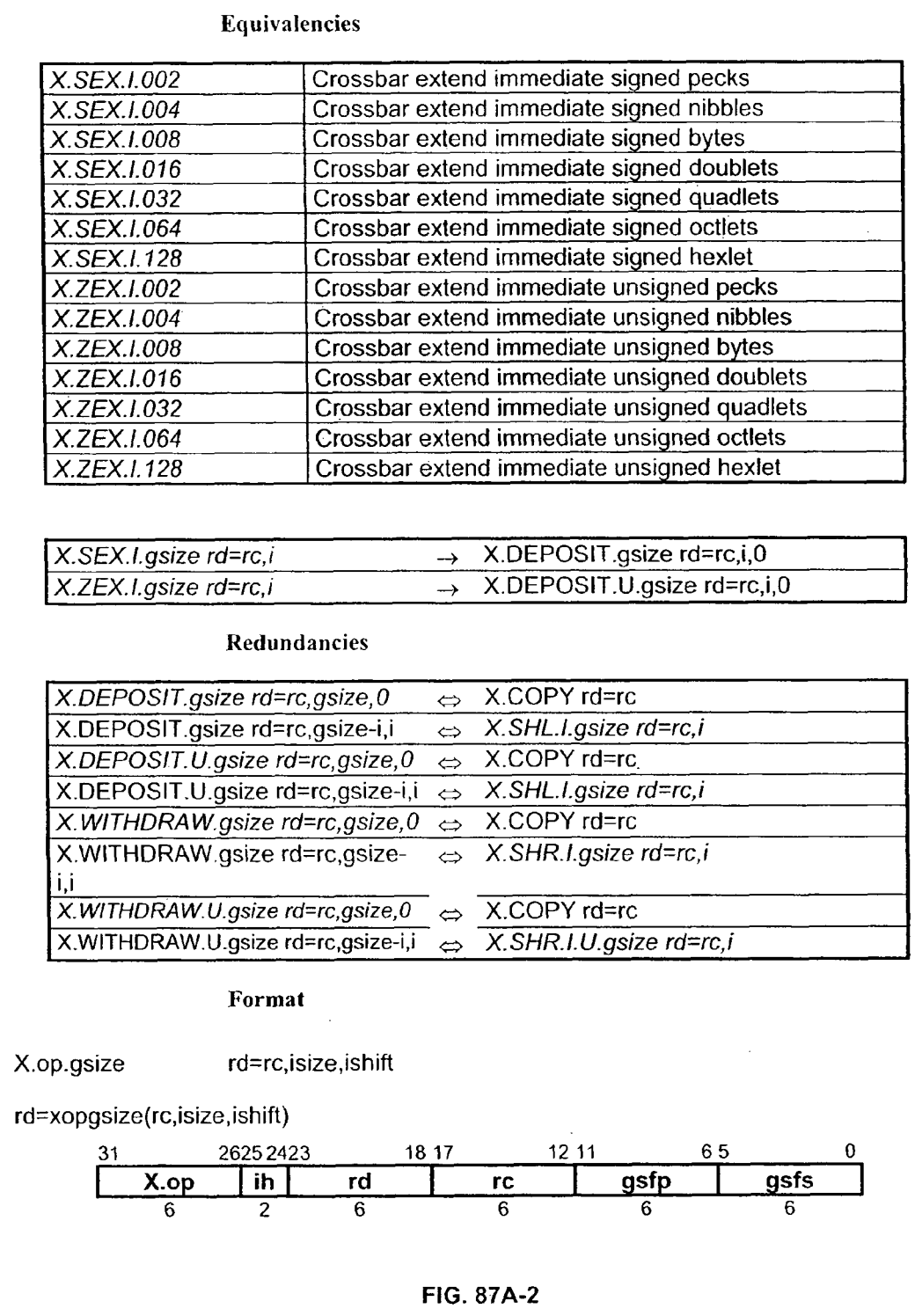

Equivalencies

| | |
|---|---|
| *X.SEX.I.002* | Crossbar extend immediate signed pecks |
| *X.SEX.I.004* | Crossbar extend immediate signed nibbles |
| *X.SEX.I.008* | Crossbar extend immediate signed bytes |
| *X.SEX.I.016* | Crossbar extend immediate signed doublets |
| *X.SEX.I.032* | Crossbar extend immediate signed quadlets |
| *X.SEX.I.064* | Crossbar extend immediate signed octlets |
| *X.SEX.I.128* | Crossbar extend immediate signed hexlet |
| *X.ZEX.I.002* | Crossbar extend immediate unsigned pecks |
| *X.ZEX.I.004* | Crossbar extend immediate unsigned nibbles |
| *X.ZEX.I.008* | Crossbar extend immediate unsigned bytes |
| *X.ZEX.I.016* | Crossbar extend immediate unsigned doublets |
| *X.ZEX.I.032* | Crossbar extend immediate unsigned quadlets |
| *X.ZEX.I.064* | Crossbar extend immediate unsigned octlets |
| *X.ZEX.I.128* | Crossbar extend immediate unsigned hexlet |

| | | |
|---|---|---|
| *X.SEX.I.gsize rd=rc,i* | → | X.DEPOSIT.gsize rd=rc,i,0 |
| *X.ZEX.I.gsize rd=rc,i* | → | X.DEPOSIT.U.gsize rd=rc,i,0 |

Redundancies

| | | |
|---|---|---|
| *X.DEPOSIT.gsize rd=rc,gsize,0* | ⇔ | X.COPY rd=rc |
| X.DEPOSIT.gsize rd=rc,gsize-i,i | ⇔ | *X.SHL.I.gsize rd=rc,i* |
| *X.DEPOSIT.U.gsize rd=rc,gsize,0* | ⇔ | X.COPY rd=rc |
| X.DEPOSIT.U.gsize rd=rc,gsize-i,i | ⇔ | *X.SHL.I.gsize rd=rc,i* |
| *X.WITHDRAW.gsize rd=rc,gsize,0* | ⇔ | X.COPY rd=rc |
| X.WITHDRAW.gsize rd=rc,gsize-i,i | ⇔ | *X.SHR.I.gsize rd=rc,i* |
| *X.WITHDRAW.U.gsize rd=rc,gsize,0* | ⇔ | X.COPY rd=rc |
| X.WITHDRAW.U.gsize rd=rc,gsize-i,i | ⇔ | *X.SHR.I.U.gsize rd=rc,i* |

Format

X.op.gsize rd=rc,isize,ishift rd=xopgsize(rc,isize,ishift)

| 31 26 | 25 24 | 23 18 | 17 12 | 11 6 | 5 0 |
|---|---|---|---|---|---|
| X.op | ih | rd | rc | gsfp | gsfs |
| 6 | 2 | 6 | 6 | 6 | 6 |

FIG. 87A-2 assert isize+ishift $\leq$ gsize
assert isize$\geq$1
$ih_0$ || gsfs $\leftarrow$ 128-gsize+isize-1
$ih_1$ || gsfp $\leftarrow$ 128-gsize+ishift

FIG. 87A-3 encoding for crossbar field crossbar deposit crossbar withdraw

Definition def CrossbarField(op,rd,rc,gsfp,gsfs) as
    c ← RegRead(rc, 128)
    case (($op_1$ || gsfp) and ($op_0$ || gsfs)) of
        0..63:
            gsize ← 128
        64..95:
            gsize ← 64
        96..111:
            gsize ← 32
        112..119:
            gsize ← 16
        120..123:
            gsize ← 8
        124..125:
            gsize ← 4
        126:
            gsize ← 2
        127:
            raise ReservedInstruction gsize ← 1
    endcase
    ishift ← ($op_1$ || gsfp) and (gsize-1)
    isize ← (($op_0$ || gsfs) and (gsize-1))+1
    if (ishift+isize>gsize)
        raise ReservedInstruction
    endif
    for i ← 0 to 128-gsize by gsize
        case op of
            X.DEPOSIT:
                $z_{i+gsize-1..i} \leftarrow c_{i+isize-1}^{gsize-isize-ishift} \| c_{i+isize-1..i} \| 0^{ishift}$
            X.DEPOSIT.U:
                $z_{i+gsize-1..i} \leftarrow 0^{gsize-isize-ishift} \| c_{i+isize-1..i} \| 0^{ishift}$
            X.WITHDRAW:
                $z_{i+gsize-1..i} \leftarrow c_{i+isize+ishift-1}^{size-isize} \| c_{i+isize+ishift-1..i+ishift}$
            X.WITHDRAW.U:
                $z_{i+gsize-1..i} \leftarrow 0^{gsize-isize} \| c_{i+isize+ishift-1..i+ishift}$
        endcase
    endfor
    RegWrite(rd, 128, z)
enddef

FIG. 87E

Exceptions

Reserved instruction

FIG. 87F

Operation codes

| | |
|---|---|
| X.DEPOSIT.M.002 | Crossbar deposit merge pecks |
| X.DEPOSIT.M.004 | Crossbar deposit merge nibbles |
| X.DEPOSIT.M.008 | Crossbar deposit merge bytes |
| X.DEPOSIT.M.016 | Crossbar deposit merge doublets |
| X.DEPOSIT.M.032 | Crossbar deposit merge quadlets |
| X.DEPOSIT.M.064 | Crossbar deposit merge octlets |
| X.DEPOSIT.M.128 | Crossbar deposit merge hexlet |

Equivalencies

| | |
|---|---|
| X.DEPOSIT.M.001 | Crossbar deposit merge bits |

| | | |
|---|---|---|
| X.DEPOSIT.M.1 rd@rc,1,0 | → | X.COPY rd=rc |

Redundancies

| | | |
|---|---|---|
| *X.DEPOSIT.M.gsize rd@rc,gsize,0* | ⇔ | X.COPY rd=rc |

Format

X.op.gsize rd@rc,isize,ishift rd=xopgsize(rd,rc,isize,ishift)

| 31 … 26 | 25 … 24 | 23 … 18 | 17 … 12 | 11 … 6 | 5 … 0 |
|---|---|---|---|---|---|
| **X.op** | **ih** | **rd** | **rc** | **gsfp** | **gsfs** |
| 6 | 2 | 6 | 6 | 6 | 6 |

assert isize+ishift ≤ gsize
assert isize≥1
$ih_0$ || gsfs ← 128-gsize+isize-1
$ih_1$ || gsfp ← 128-gsize+ishift

FIG. 88A encoding for crossbar field

Definition

```
def CrossbarFieldInplace(op,rd,rc,gsfp,gsfs) as
    c ← RegRead(rc, 128)
    d ← RegRead(rd, 128)
    case ((op1 || gsfp) and (op0 || gsfs)) of
        0..63:
            gsize ← 128
        64..95:
            gsize ← 64
        96..111:
            gsize ← 32
        112..119:
            gsize ← 16
        120..123:
            gsize ← 8
        124..125:
            gsize ← 4
        126:
            gsize ← 2
        127:
            raise ReservedInstruction gsize ← 1
    endcase
    ishift ← (op1 || gsfp) and (gsize-1)
    isize ← ((op0 || gsfs) and (gsize-1))+1
    if (ishift+isize>gsize)
        raise ReservedInstruction
    endif
    for i ← 0 to 128-gsize by gsize
        z[i+gsize-1..i] ← d[i+gsize-1..i+isize+ishift] || c[i+isize-1..i] || d[i+ishift-1..i]
    endfor
    RegWrite(rd, 128, z)
enddef
```

FIG. 88D

Exceptions

Reserved instruction

FIG. 88E

Operation codes

| | |
|---|---|
| X.SHL.M.002 | Crossbar shift left merge pecks |
| X.SHL.M.004 | Crossbar shift left merge nibbles |
| X.SHL.M.008 | Crossbar shift left merge bytes |
| X.SHL.M.016 | Crossbar shift left merge doublets |
| X.SHL.M.032 | Crossbar shift left merge quadlets |
| X.SHL.M.064 | Crossbar shift left merge octlets |
| X.SHL.M.128 | Crossbar shift left merge hexlet |
| X.SHR.M.002 | Crossbar shift right merge pecks |
| X.SHR.M.004 | Crossbar shift right merge nibbles |
| X.SHR.M.008 | Crossbar shift right merge bytes |
| X.SHR.M.016 | Crossbar shift right merge doublets |
| X.SHR.M.032 | Crossbar shift right merge quadlets |
| X.SHR.M.064 | Crossbar shift right merge octlets |
| X.SHR.M.128 | Crossbar shift right merge hexlet |

Redundancies

| | | |
|---|---|---|
| X.SHR.M.size rd@rd,rb | ⇔ | *X.ROTR.size rd=rd,rb* |

Format

X.op.size rd@rc,rb rd=xopsize(rd,rc,rb)

| 31 25 | 24 | 23 18 | 17 12 | 11 6 | 5 2 | 1 0 |
|---|---|---|---|---|---|---|
| XSHIFT | s | rd | rc | rb | op | sz |
| 7 | 1 | 6 | 6 | 6 | 4 | 2 |

lsize ← log(size)
s ← $lsize_2$
sz ← $lsize_{1..0}$

FIG. 89A

Definition

```
def CrossbarInplace(op,size,rd,rc,rb) as
    d ← RegRead(rd, 128)
    c ← RegRead(rc, 128)
    b ← RegRead(rb, 128)
    shift ← b and (size-1)
    for i ← 0 to 128-size by size
        case op of
            X.SHR.M:
                z_{i+size-1..i} ← c_{i+shift-1..i} || d_{i+size-1..i+shift}
            X.SHL.M:
                z_{i+size-1..i} ← d_{i+size-1-shift..i} || c_{i+shift-1..i}
    endfor
    RegWrite(rd, 128, z)
enddef
```

FIG. 89B

Exceptions none

FIG. 89C

Operation codes

| | |
|---|---|
| X.COMPRESS.I.002 | Crossbar compress immediate signed pecks |
| X.COMPRESS.I.004 | Crossbar compress immediate signed nibbles |
| X.COMPRESS.I.008 | Crossbar compress immediate signed bytes |
| X.COMPRESS.I.016 | Crossbar compress immediate signed doublets |
| X.COMPRESS.I.032 | Crossbar compress immediate signed quadlets |
| X.COMPRESS.I.064 | Crossbar compress immediate signed octlets |
| X.COMPRESS.I.128 | Crossbar compress immediate signed hexlet |
| X.COMPRESS.I.U.002 | Crossbar compress immediate unsigned pecks |
| X.COMPRESS.I.U.004 | Crossbar compress immediate unsigned nibbles |
| X.COMPRESS.I.U.008 | Crossbar compress immediate unsigned bytes |
| X.COMPRESS.I.U.016 | Crossbar compress immediate unsigned doublets |
| X.COMPRESS.I.U.032 | Crossbar compress immediate unsigned quadlets |
| X.COMPRESS.I.U.064 | Crossbar compress immediate unsigned octlets |
| X.COMPRESS.I.U.128 | Crossbar compress immediate unsigned hexlet |
| X.EXPAND.I.002 | Crossbar expand immediate signed pecks |
| X.EXPAND.I.004 | Crossbar expand immediate signed nibbles |
| X.EXPAND.I.008 | Crossbar expand immediate signed bytes |
| X.EXPAND.I.016 | Crossbar expand immediate signed doublets |
| X.EXPAND.I.032 | Crossbar expand immediate signed quadlets |
| X.EXPAND.I.064 | Crossbar expand immediate signed octlets |
| X.EXPAND.I.128 | Crossbar expand immediate signed hexlet |
| X.EXPAND.I.U.002 | Crossbar expand immediate unsigned pecks |
| X.EXPAND.I.U.004 | Crossbar expand immediate unsigned nibbles |
| X.EXPAND.I.U.008 | Crossbar expand immediate unsigned bytes |
| X.EXPAND.I.U.016 | Crossbar expand immediate unsigned doublets |
| X.EXPAND.I.U.032 | Crossbar expand immediate unsigned quadlets |
| X.EXPAND.I.U.064 | Crossbar expand immediate unsigned octlets |
| X.EXPAND.I.U.128 | Crossbar expand immediate unsigned hexlet |
| X.ROTL.I.002 | Crossbar rotate left immediate pecks |
| X.ROTL.I.004 | Crossbar rotate left immediate nibbles |
| X.ROTL.I.008 | Crossbar rotate left immediate bytes |
| X.ROTL.I.016 | Crossbar rotate left immediate doublets |
| X.ROTL.I.032 | Crossbar rotate left immediate quadlets |
| X.ROTL.I.064 | Crossbar rotate left immediate octlets |
| X.ROTL.I.128 | Crossbar rotate left immediate hexlet |
| X.ROTR.I.002 | Crossbar rotate right immediate pecks |
| X.ROTR.I.004 | Crossbar rotate right immediate nibbles |
| X.ROTR.I.008 | Crossbar rotate right immediate bytes |
| X.ROTR.I.016 | Crossbar rotate right immediate doublets |
| X.ROTR.I.032 | Crossbar rotate right immediate quadlets |

FIG. 90A-1

| | |
|---|---|
| X.ROTR.I.064 | Crossbar rotate right immediate octlets |
| X.ROTR.I.128 | Crossbar rotate right immediate hexlet |
| X.SHL.I.002 | Crossbar shift left immediate pecks |
| X.SHL.I.002.O | Crossbar shift left immediate signed pecks check overflow |
| X.SHL.I.004 | Crossbar shift left immediate nibbles |
| X.SHL.I.004.O | Crossbar shift left immediate signed nibbles check overflow |
| X.SHL.I.008 | Crossbar shift left immediate bytes |
| X.SHL.I.008.O | Crossbar shift left immediate signed bytes check overflow |
| X.SHL.I.016 | Crossbar shift left immediate doublets |
| X.SHL.I.016.O | Crossbar shift left immediate signed doublets check overflow |
| X.SHL.I.032 | Crossbar shift left immediate quadlets |
| X.SHL.I.032.O | Crossbar shift left immediate signed quadlets check overflow |
| X.SHL.I.064 | Crossbar shift left immediate octlets |
| X.SHL.I.064.O | Crossbar shift left immediate signed octlets check overflow |
| X.SHL.I.128 | Crossbar shift left immediate hexlet |
| X.SHL.I.128.O | Crossbar shift left immediate signed hexlet check overflow |
| X.SHL.I.U.002.O | Crossbar shift left immediate unsigned pecks check overflow |
| X.SHL.I.U.004.O | Crossbar shift left immediate unsigned nibbles check overflow |
| X.SHL.I.U.008.O | Crossbar shift left immediate unsigned bytes check overflow |
| X.SHL.I.U.016.O | Crossbar shift left immediate unsigned doublets check overflow |
| X.SHL.I.U.032.O | Crossbar shift left immediate unsigned quadlets check overflow |
| X.SHL.I.U.064.O | Crossbar shift left immediate unsigned octlets check overflow |
| X.SHL.I.U.128.O | Crossbar shift left immediate unsigned hexlet check overflow |
| X.SHR.I.002 | Crossbar signed shift right immediate pecks |
| X.SHR.I.004 | Crossbar signed shift right immediate nibbles |
| X.SHR.I.008 | Crossbar signed shift right immediate bytes |
| X.SHR.I.016 | Crossbar signed shift right immediate doublets |
| X.SHR.I.032 | Crossbar signed shift right immediate quadlets |
| X.SHR.I.064 | Crossbar signed shift right immediate octlets |
| X.SHR.I.128 | Crossbar signed shift right immediate hexlet |
| X.SHR.I.U.002 | Crossbar shift right immediate unsigned pecks |
| X.SHR.I.U.004 | Crossbar shift right immediate unsigned nibbles |
| X.SHR.I.U.008 | Crossbar shift right immediate unsigned bytes |
| X.SHR.I.U.016 | Crossbar shift right immediate unsigned doublets |
| X.SHR.I.U.032 | Crossbar shift right immediate unsigned quadlets |
| X.SHR.I.U.064 | Crossbar shift right immediate unsigned octlets |
| X.SHR.I.U.128 | Crossbar shift right immediate unsigned hexlet |

FIG. 90A-2

Equivalencies

| | |
|---|---|
| *X.COPY* | Crossbar copy |
| *X.NOP* | Crossbar no operation |

| | | |
|---|---|---|
| *X.COPY rd=rc* | ← | X.ROTL.I.128 rd=rc,0 |
| *X.NOP* | ← | X.COPY r0=r0 |

Redundancies

| | | |
|---|---|---|
| *X.ROTL.I.gsize rd=rc,0* | ⇔ | *X.COPY rd=rc* |
| *X.ROTR.I.gsize rd=rc,0* | ⇔ | *X.COPY rd=rc* |
| *X.ROTR.I.gsize rd=rc,shift* | ⇔ | *X.ROTL.I.gsize rd=rc,gsize-shift* |
| *X.SHL.I.gsize rd=rc,0* | ⇔ | *X.COPY rd=rc* |
| *X.SHL.I.gsize.O rd=rc,0* | ⇔ | *X.COPY rd=rc* |
| *X.SHL.I.U.gsize.O rd=rc,0* | ⇔ | *X.COPY rd=rc* |
| *X.SHR.I.gsize rd=rc,0* | ⇔ | *X.COPY rd=rc* |
| *X.SHR.I.U.gsize rd=rc,0* | ⇔ | *X.COPY rd=rc* |

Selection

| class | op | size |
|---|---|---|
| precision | COMPRESS.I COMPRESS.I.U EXPAND.I EXPAND.I.U | 2 4 8 16 32 64 128 |
| shift | ROTL.I ROTR.I SHL.I SHL.I.O SHL.I.U.O SHR.I SHR.I.U | 2 4 8 16 32 64 128 |
| copy | *COPY* | |

FIG. 90A-3

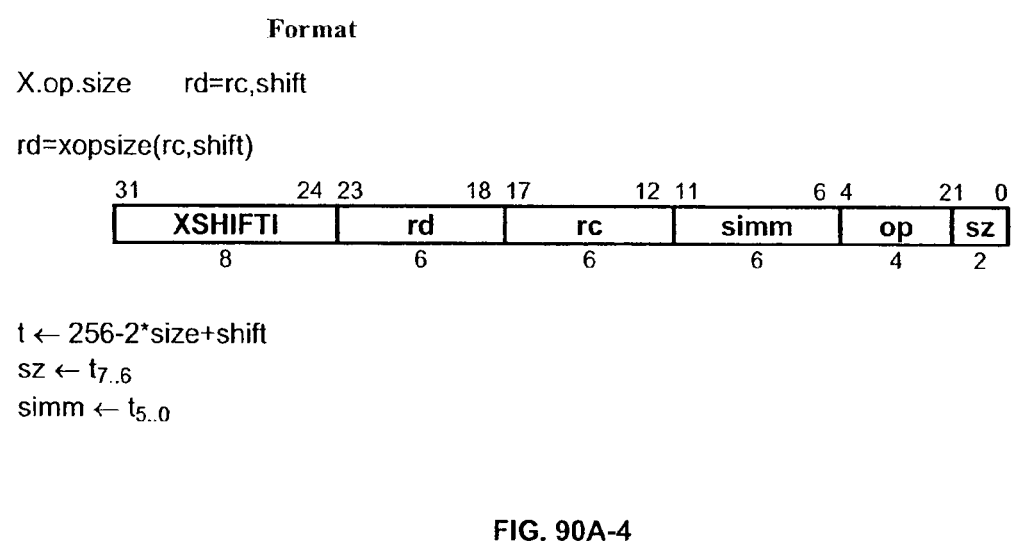

Format

X.op.size      rd=rc,shift rd=xopsize(rc,shift)

| 31 24 | 23 18 | 17 12 | 11 6 | 4 2 | 1 0 |
|---|---|---|---|---|---|
| XSHIFTI | rd | rc | simm | op | sz |
| 8 | 6 | 6 | 6 | 4 | 2 | t ← 256-2*size+shift
sz ← $t_{7..6}$
simm ← $t_{5..0}$

FIG. 90A-4

Definition def CrossbarShortImmediate(op,rd,rc,simm)
    case ($op_{1..0}$ || simm) of
        0..127:
            size ← 128
        128..191:
            size ← 64
        192..223:
            size ← 32
        224..239:
            size ← 16
        240..247:
            size ← 8
        248..251:
            size ← 4
        252..253:
            size ← 2
        254..255:
            raise ReservedInstruction
    endcase
    shift ← ($op_0$ || simm) and (size-1)
    c ← RegRead(rc, 128)
    case ($op_{5..2}$ || $0^2$) of
        X.COMPRESS.I:
            hsize ← size/2
            for i ← 0 to 64-hsize by hsize
                if shift ≤ hsize then
                    $z_{i+hsize-1..i} \leftarrow c_{i+i+shift+hsize-1..i+i+shift}$
                else
                    $z_{i+hsize-1..i} \leftarrow c_{i+i+size-1}^{shift-hsize} \| c_{i+i+size-1..i+i+shift}$
                endif
            endfor
            $z_{127..64} \leftarrow 0$
        X.COMPRESS.I.U:
            hsize ← size/2
            for i ← 0 to 64-hsize by hsize
                if shift ≤ hsize then
                    $z_{i+hsize-1..i} \leftarrow c_{i+i+shift+hsize-1..i+i+shift}$
                else
                    $z_{i+hsize-1..i} \leftarrow 0^{shift-hsize} \| c_{i+i+size-1..i+i+shift}$
                endif
            endfor
            $z_{127..64} \leftarrow 0$
        X.EXPAND.I:

FIG. 90B-1

```
    hsize ← size/2
    for i ← 0 to 64-hsize by hsize
        if shift ≤ hsize then
            z_{i+i+size-1..i+i} ← c_{i+hsize-1}^{hsize-shift} || c_{i+hsize-1..i} || 0^{shift}
        else
            z_{i+i+size-1..i+i} ← c_{i+size-shift-1..i} || 0^{shift}
        endif
    endfor
X.EXPAND.I.U:
    hsize ← size/2
    for i ← 0 to 64-hsize by hsize
        if shift ≤ hsize then
            z_{i+i+size-1..i+i} ← 0^{hsize-shift} || c_{i+hsize-1..i} || 0^{shift}
        else
            z_{i+i+size-1..i+i} ← c_{i+size-shift-1..i} || 0^{shift}
        endif
    endfor
X.SHL.I:
    for i ← 0 to 128-size by size
        z_{i+size-1..i} ← c_{i+size-1-shift..i} || 0^{shift}
    endfor
X.SHL.I.O:
    for i ← 0 to 128-size by size
        if c_{i+size-1..i+size-1-shift} ≠ c_{i+size-1-shift}^{shift+1} then
            raise FixedPointArithmetic
        endif
        z_{i+size-1..i} ← c_{i+size-1-shift..i} || 0^{shift}
    endfor
X.SHL.I.U.O:
    for i ← 0 to 128-size by size
        if c_{i+size-1..i+size-shift} ≠ 0^{shift} then
            raise FixedPointArithmetic
        endif
        z_{i+size-1..i} ← c_{i+size-1-shift..i} || 0^{shift}
    endfor
X.ROTR.I:
    for i ← 0 to 128-size by size
        z_{i+size-1..i} ← c_{i+shift-1..i} || c_{i+size-1..i+shift}
    endfor
X.SHR.I:
    for i ← 0 to 128-size by size
        z_{i+size-1..i} ← c_{i+size-1}^{shift} || c_{i+size-1..i+shift}
    endfor
X.SHR.I.U:
    for i ← 0 to 128-size by size
        z_{i+size-1..i} ← 0^{shift} || c_{i+size-1..i+shift}
    endfor
```

FIG. 90B-2

```
        endcase
        RegWrite(rd, 128, z)
enddef
```

FIG. 90B-3

Exceptions

Fixed-point arithmetic
Reserved Instruction

FIG. 90C

Operation codes

| | |
|---|---|
| X.SHL.M.I.002 | Crossbar shift left merge immediate pecks |
| X.SHL.M.I.004 | Crossbar shift left merge immediate nibbles |
| X.SHL.M.I.008 | Crossbar shift left merge immediate bytes |
| X.SHL.M.I.016 | Crossbar shift left merge immediate doublets |
| X.SHL.M.I.032 | Crossbar shift left merge immediate quadlets |
| X.SHL.M.I.064 | Crossbar shift left merge immediate octlets |
| X.SHL.M.I.128 | Crossbar shift left merge immediate hexlet |
| X.SHR.M.I.002 | Crossbar shift right merge immediate pecks |
| X.SHR.M.I.004 | Crossbar shift right merge immediate nibbles |
| X.SHR.M.I.008 | Crossbar shift right merge immediate bytes |
| X.SHR.M.I.016 | Crossbar shift right merge immediate doublets |
| X.SHR.M.I.032 | Crossbar shift right merge immediate quadlets |
| X.SHR.M.I.064 | Crossbar shift right merge immediate octlets |
| X.SHR.M.I.128 | Crossbar shift right merge immediate hexlet |

Format

X.op.size rd@rc,shift rd=xopsize(rd,rc,shift)

| 31 … 24 | 23 … 18 | 17 … 12 | 11 … 6 | 4 … 2 | 1 … 0 |
|---|---|---|---|---|---|
| XSHIFTI | rd | rc | simm | op | sz |
| 8 | 6 | 6 | 6 | 4 | 2 |

$t \leftarrow 256\text{-}2^{*}size+shift$
$sz \leftarrow t_{7..0}$
$simm \leftarrow t_{5..0}$

FIG. 91A

Definition

```
def CrossbarShortImmediateInplace(op,rd,rc,simm)
    case (op1..0 || simm) of
        0..127:
            size ← 128
        128..191:
            size ← 64
        192..223:
            size ← 32
        224..239:
            size ← 16
        240..247:
            size ← 8
        248..251:
            size ← 4
        252..253:
            size ← 2
        254..255:
            raise ReservedInstruction
    endcase
    shift ← (op0 || simm) and (size-1)
    c ← RegRead(rc, 128)
    d ← RegRead(rd, 128)
    for i ← 0 to 128-size by size
        case (op5..2 || 0^2) of
            X.SHR.M.I:
                z[i+size-1..i] ← c[i+shift-1..i] || d[i+size-1..i+shift]
            X.SHL.M.I:
                z[i+size-1..i] ← d[i+size-1-shift..i] || c[i+shift-1..i]
        endcase
    endfor
    RegWrite(rd, 128, z)
enddef
```

FIG. 91B

Exceptions

Reserved Instruction

FIG. 91C

Operation codes

| | |
|---|---|
| X.SWIZZLE | Crossbar swizzle |

Format

X.SWIZZLE rd=rc,icopy,iswap rd=xswizzle(rc,icopy,iswap)

| 31 26 | 25 24 | 23 18 | 17 12 | 11 6 | 5 0 |
|---|---|---|---|---|---|
| X.SWIZZLE | ih | rd | rc | icopya | iswapa |
| 6 | 2 | 6 | 6 | 6 | 6 |

$icopya \leftarrow icopy_{5..0}$
$iswapa \leftarrow iswap_{5..0}$
$ih \leftarrow icopy_{6} \,\|\, iswap_{6}$

FIG. 92A

Definition

```
def GroupSwizzleImmediate(ih,rd,rc,icopya,iswapa) as
        icopy ← ih_1 || icopya
        iswap ← ih_0 || iswapa
        c ← RegRead(rc, 128)
        for i ← 0 to 127
                z_i ← c_(i & icopy) ^ iswap
        endfor
        RegWrite(rd, 128, z)
enddef
```

FIG. 92B

Exceptions none

FIG. 92C

Operation codes

| | |
|---|---|
| X.SELECT.8 | Crossbar select bytes |

Format

X.SELECT.8 ra=rd,rc,rb ra=xselect8(rd,rc,rb)

| 31 ... 24 | 23 ... 18 | 17 ... 12 | 11 ... 6 | 5 ... 0 |
|---|---|---|---|---|
| op | rd | rc | rb | ra |
| 8 | 6 | 6 | 6 | 6 |

FIG. 93A

Crossbar select bytes

Definition

```
def CrossbarTernary(op,rd,rc,rb,ra) as
    d ← RegRead(rd, 128)
    c ← RegRead(rc, 128)
    b ← RegRead(rb, 128)
    cdcase op of
        X.SELECT:
            cd ← c || d
            for i ← 0 to 15
                j ← b_{8*i+4..8*i}
                z_{8*i+7..8*i} ← cd_{8*j+7..8*j}
            endfor
        X.TRANSPOSE:
            dc ← d || c
            for i ← 0 to 127
                for j ← 0 to 7
                    k_j ← i_{b_{j*4+2..j*4}}
                endfor
                a_i ← dc_k
            endfor
    endcase
    RegWrite(ra, 128, z)
enddef
```

FIG. 93C

Exceptions none

FIG. 93D

Operation codes

| | |
|---|---|
| E.EXTRACT.I.08 | Ensemble extract immediate signed bytes |
| E.EXTRACT.I.16 | Ensemble extract immediate signed doublets |
| E.EXTRACT.I.32 | Ensemble extract immediate signed quadlets |
| E.EXTRACT.I.64 | Ensemble extract immediate signed octlets |
| E.EXTRACT.I.U.08 | Ensemble extract immediate unsigned bytes |
| E.EXTRACT.I.U.16 | Ensemble extract immediate unsigned doublets |
| E.EXTRACT.I.U.32 | Ensemble extract immediate unsigned quadlets |
| E.EXTRACT.I.U.64 | Ensemble extract immediate unsigned octlets |
| E.MUL.X.I.08 | Ensemble multiply extract immediate signed bytes |
| E.MUL.X.I.16 | Ensemble multiply extract immediate signed doublets |
| E.MUL.X.I.32 | Ensemble multiply extract immediate signed quadlets |
| E.MUL.X.I.64 | Ensemble multiply extract immediate signed octlets |
| E.MUL.X.I.C.08 | Ensemble multiply extract immediate complex bytes |
| E.MUL.X.I.C.16 | Ensemble multiply extract immediate complex doublets |
| E.MUL.X.I.C.32 | Ensemble multiply extract immediate complex quadlets |
| E.MUL.X.I.C.64 | Ensemble multiply extract immediate complex octlets |

Selection

| class | op | type | size |
|---|---|---|---|
| extract immediate | E.EXTRACT.I | NONE U | 8 16 32 64 |
| multiply extract immediate | E.MUL.XI | NONE | 8 16 32 64 |
| | | C | 8 16 32 64 |

Format

E.op.tsize rd=rc,rb,i rd=eoptsize (rc,rb,i)

| 31 24 | 23 18 | 17 12 | 11 6 | 5 | 4 3 | 2 0 |
|---|---|---|---|---|---|---|
| E.op | rd | rc | rb | t | sz | sh |
| 8 | 6 | 6 | 6 | 1 | 2 | 3 |

sz ← log(size) - 3
assert size+3 ≥ i ≥ size-4
sh ← i - size

FIG. 94A

Ensemble multiply extract immediate doublets

Ensemble multiply extract immediate doublets

Ensemble multiply extract immediate complex doublets

Ensemble multiply extract immediate complex doublets

Definition

```
def mul(size,h,vs,v,i,ws,w,j) as
      mul ← ((vs&v_{size-1+i})^{h-size} || v_{size-1+i..i}) * ((ws&w_{size-1+j})^{h-size} || w_{size-1+j..j})
enddef

def EnsembleExtractImmediate(op,type,gsize,ra,rb,rc,sh)
      c ← RegRead(rc, 128)
      b ← RegRead(rb, 128)
      case op || type of
            E.EXTRACT.I, E.MUL.X.I, E.MUL.X.I.C:
                  zs ← cs ← bs ← 1
            E.EXTRACT.I.U:
                  zs ← cs ← bs ← 0
      endcase
      case op || type of
            E.EXTRACT.I, E.EXTRACT.I.U, E.MUL.X.I:
                  h ← 2*gsize
            E.MUL.X.I.C:
                  h ← (2*gsize) + 1
      endcase
      r ← gsize + (sh_2^5 ||sh)
      for i ← 0 to 128-gsize by gsize
            case op || type of
                  E.EXTRACT.I, E.EXTRACT.I.U:
                        p ← (b || c)_{2*(gsize+i)-1..2*i}
                  E.MUL.X.I:
                        p ← mul(gsize,h,cs,c,i,bs,b,i)
                  E.MUL.X.I.C:
                        if i & gsize = 0 then
                              p ← mul(gsize,h,cs,c,i,bs,b,i) - mul(gsize,h,cs,c,i+gsize,bs,b,i+gsize)
                        else
                              p ← mul(gsize,h,cs,c,i-gsize,bs,b,i) + mul(gsize,h,cs,c,i,bs,b,i-gsize)
                        endif
            endcase
            s ← 0^{h-r} || p_r || ~p_r^{r-1}
            v ← ((zs & p_{h-1})||p) + (0||s)
            if (v_{h..r+gsize} = (zs & v_{r+gsize-1})^{h+1-r-gsize} then
                  z_{gsize-1+i..i} ← v_{gsize-1+r..r}
            else
                  z_{gsize-1+i..i} ← zs ? (v_h || ~v_h^{gsize-1}) : 1^{gsize}
            endif
      endfor
      RegWrite(rd, 128, z)
enddef
```

FIG. 94F

Exceptions none

FIG. 94G

Operation codes

| | |
|---|---|
| E.CON.X.I.08 | Ensemble convolve extract immediate signed bytes |
| E.CON.X.I.16 | Ensemble convolve extract immediate signed doublets |
| E.CON.X.I.32 | Ensemble convolve extract immediate signed quadlets |
| E.CON.X.I.64 | Ensemble convolve extract immediate signed octlets |
| E.CON.X.I.C.08 | Ensemble convolve extract immediate signed complex bytes |
| E.CON.X.I.C.16 | Ensemble convolve extract immediate signed complex doublets |
| E.CON.X.I.C.32 | Ensemble convolve extract immediate signed complex quadlets |
| E.MUL.ADD.X.I.08 | Ensemble multiply add extract immediate signed bytes |
| E.MUL.ADD.X.I.16 | Ensemble multiply add extract immediate signed doublets |
| E.MUL.ADD.X.I.32 | Ensemble multiply add extract immediate signed quadlets |
| E.MUL.ADD.X.I.64 | Ensemble multiply add extract immediate signed octlets |
| E.MUL.ADD.X.I.C.08 | Ensemble multiply add extract immediate signed complex bytes |
| E.MUL.ADD.X.I.C.16 | Ensemble multiply add extract immediate signed complex doublets |
| E.MUL.ADD.X.I.C.32 | Ensemble multiply add extract immediate signed complex quadlets |
| E.MUL.ADD.X.I.C.64 | Ensemble multiply add extract immediate signed complex octlets |

Selection

| class | op | type | size |
|---|---|---|---|
| convolve extract immediate | E.CON.X.I | NONE | 8 16 32 64 |
| | | C | 8 16 32 |
| multiply add extract immediate | E.MUL.ADD.X .I | NONE | 8 16 32 64 |
| | | C | 8 16 32 64 |

Format

E.op.tsize rd@rc,rb,i rd=eoptsize(rd,rc,rb,i)

| 31 24 | 23 18 | 17 12 | 11 6 | 5 | 4 3 | 2 0 |
|---|---|---|---|---|---|---|
| E.op | rd | rc | rb | t | sz | sh |
| 8 | 6 | 6 | 6 | 1 | 2 | 3 |

sz ← log(size) - 3
assert size+3 ≥ i ≥ size-4
sh ← i - size

FIG. 95A

Ensemble convolve extract immediate doublets

Ensemble convolve extract immediate complex doublets

Ensemble multiply add extract immediate doublets

Ensemble multiply add extract immediate doublets

Ensemble multiply add extract immediate complex doublets

Ensemble multiply add extract immediate complex doublets

Definition

```
def mul(size,h,vs,v,i,ws,w,j) as
    mul ← ((vs&v_(size-1+i))^(h-size) || v_(size-1+i..i)) * ((ws&w_(size-1+j))^(h-size) || w_(size-1+j..j))
enddef

def EnsembleExtractImmediateInplace(op,type,gsize,rd,rc,rb,sh)
    d ← RegRead(rd, 128)
    c ← RegRead(rc, 128)
    b ← RegRead(rb, 128)
    lgsize ← log(gsize)
    wsize ← 128
    vsize ← 128
    case op || type of
        E.CON.X.I, E.CON.X.I.C:
            e ← c || d
            zs ← es ← bs ← 1
        E.MUL.ADD.X.I, E.MUL.ADD.X.I.C:
            ds ← cs ← bs ← zs ← 1
    endcase
    case op || type of
        E.CON.X.I, E.CON.X.I.C:
            h ← (2*gsize) + log(vsize) - lgsize
        E.MUL.ADD.X.I:
            h ← 2*gsize + 1
        E.MUL.ADD.X.I.C:
            h ← (2*gsize) + 2
    endcase
    r ← gsize + (sh^5_2 || sh)
    for i ← 0 to wsize-gsize by gsize
        case op || type of
            E.CON.X.I:
                q[0] ← 0^(2*gsize+7-lgsize)
                for j ← 0 to vsize-gsize by gsize
                    q[j+gsize] ← q[j] + mul(gsize,h,es,e,i+128-j,bs,b,j)
                endfor
                p ← q(vsize)
            E.CON.X.I.C:
                q[0] ← 0^(2*gsize+7-lgsize)
                for j ← 0 to vsize-gsize by gsize
                    if (~i) & j & gsize = 0 then
                        q[j+gsize] ← q[j] + mul(gsize,h,es,e,i+128-j,bs,b,j)
                    else
                        q[j+gsize] ← q[j] - mul(gsize,h,es,e,i+128-j+2*gsize,bs,b,j)
                    endif
```

FIG. 95H-1

```
                endfor
                p ← q(vsize)
            E.MUL.ADD.X.I:
                di ← ((ds and d_{i+gsize-1})^{h-gsize-r}||(d_{i+gsize-1..i})||0^r)
                p ← mul(size,h,cs,c,i,bs,b,i) + di
            E.MUL.ADD.X.I.C:
                di ← ((ds and d_{i+gsize-1})^{h-gsize-r}||(d_{i+gsize-1..i})||0^r)
                if i & gsize = 0 then
                    p ← mul(gsize,h,cs,c,i,bs,b,i) - mul(gsize,h,cs,c,i+gsize,bs,b,i+gsize) + di
                else
                    p ← mul(gsize,h,cs,c,i-gsize,bs,b,i) + mul(gsize,h,cs,c,i,bs,b,i-gsize) + di
                endif
        endcase
        s ← 0^{h-r} || p_r || ~p_r^{r-1}
        v ← ((zs & p_{h-1})||p) + (0||s)
        if (v_{h..r+gsize} = (zs & v_{r+gsize-1})^{h+1-r-gsize} then
            z_{gsize-1+i..i} ← v_{gsize-1+r..r}
        else
            z_{gsize-1+i..i} ← zs ? (v_h || ~v_h^{gsize-1}) : 1^{gsize}
        endif
    endfor
    RegWrite(rd, 128, z)
enddef
```

FIG. 95H-2

Exceptions none

FIG. 95I

Operation codes

| | |
|---|---|
| E.CON.C.F.16 | Ensemble convolve complex floating-point half |
| E.CON.C.F.32 | Ensemble convolve complex floating-point single |
| E.CON.F.16 | Ensemble convolve floating-point half |
| E.CON.F.32 | Ensemble convolve floating-point single |
| E.CON.F.64 | Ensemble convolve floating-point double |
| E.MUL.ADD.C.F.016 | Ensemble multiply add complex floating-point half |
| E.MUL.ADD.C.F.032 | Ensemble multiply add complex floating-point single |
| E.MUL.ADD.C.F.064 | Ensemble multiply add complex floating-point double |
| E.MUL.ADD.F.016 | Ensemble multiply add floating-point half |
| E.MUL.ADD.F.016.C | Ensemble multiply add floating-point half ceiling |
| E.MUL.ADD.F.016.F | Ensemble multiply add floating-point half floor |
| E.MUL.ADD.F.016.N | Ensemble multiply add floating-point half nearest |
| E.MUL.ADD.F.016.X | Ensemble multiply add floating-point half exact |
| E.MUL.ADD.F.016.Z | Ensemble multiply add floating-point half zero |
| E.MUL.ADD.F.032 | Ensemble multiply add floating-point single |
| E.MUL.ADD.F.032.C | Ensemble multiply add floating-point single ceiling |
| E.MUL.ADD.F.032.F | Ensemble multiply add floating-point single floor |
| E.MUL.ADD.F.032.N | Ensemble multiply add floating-point single nearest |
| E.MUL.ADD.F.032.X | Ensemble multiply add floating-point single exact |
| E.MUL.ADD.F.032.Z | Ensemble multiply add floating-point single zero |
| E.MUL.ADD.F.064 | Ensemble multiply add floating-point double |
| E.MUL.ADD.F.064.C | Ensemble multiply add floating-point double ceiling |
| E.MUL.ADD.F.064.F | Ensemble multiply add floating-point double floor |
| E.MUL.ADD.F.064.N | Ensemble multiply add floating-point double nearest |
| E.MUL.ADD.F.064.X | Ensemble multiply add floating-point double exact |
| E.MUL.ADD.F.064.Z | Ensemble multiply add floating-point double zero |
| E.MUL.ADD.F.128 | Ensemble multiply add floating-point quad |
| E.MUL.ADD.F.128.C | Ensemble multiply add floating-point quad ceiling |
| E.MUL.ADD.F.128.F | Ensemble multiply add floating-point quad floor |
| E.MUL.ADD.F.128.N | Ensemble multiply add floating-point quad nearest |
| E.MUL.ADD.F.128.X | Ensemble multiply add floating-point quad exact |
| E.MUL.ADD.F.128.Z | Ensemble multiply add floating-point quad zero |
| E.MUL.SUB.C.F.016 | Ensemble multiply subtract complex floating-point half |
| E.MUL.SUB.C.F.032 | Ensemble multiply subtract complex floating-point single |
| E.MUL.SUB.C.F.064 | Ensemble multiply subtract complex floating-point double |
| E.MUL.SUB.F.016 | Ensemble multiply subtract floating-point half |
| E.MUL.SUB.F.032 | Ensemble multiply subtract floating-point single |
| E.MUL.SUB.F.064 | Ensemble multiply subtract floating-point double |
| E.MUL.SUB.F.128 | Ensemble multiply subtract floating-point quad |

FIG. 96A-1

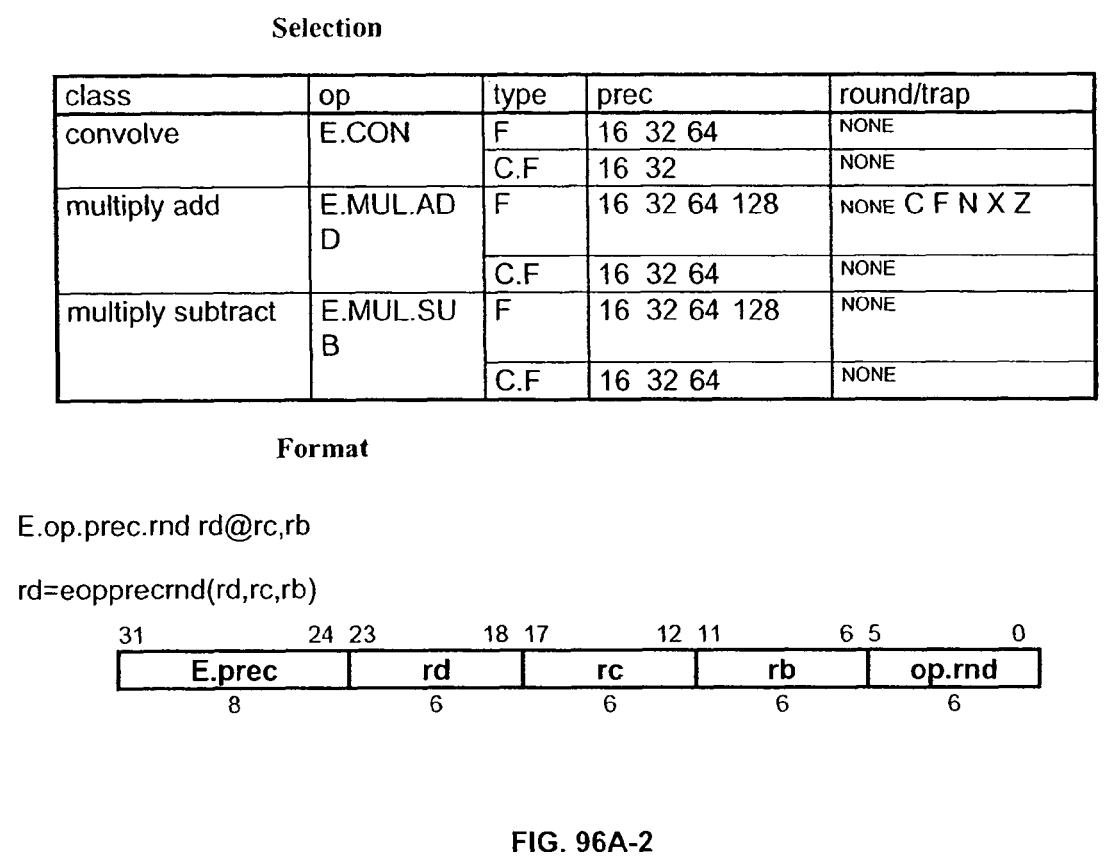

Selection

| class | op | type | prec | round/trap |
|---|---|---|---|---|
| convolve | E.CON | F | 16 32 64 | NONE |
| | | C.F | 16 32 | NONE |
| multiply add | E.MUL.ADD | F | 16 32 64 128 | NONE C F N X Z |
| | | C.F | 16 32 64 | NONE |
| multiply subtract | E.MUL.SUB | F | 16 32 64 128 | NONE |
| | | C.F | 16 32 64 | NONE |

Format

E.op.prec.rnd rd@rc,rb rd=eopprecrnd(rd,rc,rb)

| 31..24 | 23..18 | 17..12 | 11..6 | 5..0 |
|---|---|---|---|---|
| E.prec | rd | rc | rb | op.rnd |
| 8 | 6 | 6 | 6 | 6 |

FIG. 96A-2

Ensemble convolve floating-point half

Ensemble convolve complex floating-point half

Definition

```
def mul(size,v,i,w,j) as
    mul ← fmul(F(size,v_size-1+i..i),F(size,w_size-1+j..j))
enddef

def EnsembleInplaceFloatingPoint(op,prec,rd,rc,rb) as
    d ← RegRead(rd, 128)
    c ← RegRead(rc, 128)
    b ← RegRead(rb, 128)
    wsize ← 128
    vsize ← 128
    m ← c || d
    for i ← 0 to wsize-prec by prec
        case op of
            E.CONF:
                //NULL value doesn't combine with zero to alter sign bit
                q[0].t ← NULL
                for j ← 0 to vsize-prec by prec
                    q[j+prec] ← fadd(q[j], mul(prec,m,i+128-j,b,j))
                endfor
                zi ← q[vsize]
            E.CONCF:
                //NULL value doesn't combine with zero to alter sign bit
                q[0].t ← NULL
                for j ← 0 to vsize-prec by prec
                    if (~i) & j & prec = 0 then
                        q[j+prec] ← fadd(q[j], mul(prec,m,i+128-j,b,j))
                    else
                        q[j+prec] ← fsub(q[j], mul(prec,m,i+128-j+2*prec,b,j))
                    endif
                endfor
                zi ←q[vsize]
            E.MUL.ADD.F:
                di ← F(prec,d_i+prec-1..i)
                zi ← fadd(di, mul(prec,c,i,b,i))
            E.MUL.ADD.C.F:
                di ← F(prec,d_i+prec-1..i)
                if (i and prec) then
                    zi ← fadd(di, fadd(mul(prec,c,i,b,i-prec), mul(c,i-prec,b,i)))
                else
                    zi ← fadd(di, fsub(mul(prec,c,i,b,i), mul(prec,c,i+prec,b,i+prec)))
                endif
            E.MUL.SUB.F:
                di ← F(prec,d_i+prec-1..i)
                zi ← frsub(di, mul(prec,c,i,b,i))
```

FIG. 96D-1

```
            E.MUL.SUB.C.F:
                  di ← F(prec,d[i+prec-1..i])
                  if (i and prec) then
                        zi ← frsub(di, fadd(mul(prec,c,i,b,i-prec), mul(c,i-prec,b,i)))
                  else
                        zi ← frsub(di, fsub(mul(prec,c,i,b,i), mul(prec,c,i+prec,b,i+prec)))
                  endif
      endcase
      z[i+prec-1..i] ← PackF(prec, zi, round)
   endfor
   RegWrite(rd, 128, z)
enddef
```

FIG. 96D-2

Exceptions

Floating-point arithmetic

FIG. 96E

Operation codes

| | |
|---|---|
| E.MUL.G.08 | Ensemble multiply Galois field byte |
| E.MUL.SUM.G.08 | Ensemble multiply sum Galois field byte |

Selection

| class | op | size |
|---|---|---|
| Multiply Galois field | E.MUL.G | 8 |
| Multiply sum Galois field | E.MUL.SUM.G | 8 |

Format

E.op.G8 ra=rd,rc,rb ra=emulgsize(rd,rc,rb)

| 31 24 | 23 18 | 17 12 | 11 6 | 5 0 |
|---|---|---|---|---|
| E.op.G8 | rd | rc | rb | ra |
| 8 | 6 | 6 | 6 | 6 |

FIG. 97A

Ensemble multiply Galois field bytes

Definition

```
def c ← PolyMultiply(size,a,b) as
    p[0] ← 0^(2*size)
    for k ← 0 to size-1
        p[k+1] ← p[k] ^ (a_k ? (0^(size-k) || b || 0^k) : 0^(2*size))
    endfor
    c ← p[size]
enddef

def c ← PolyResidue(size,a,b) as
    p[size] ← a
    for k ← size-1 to 0 by -1
        p[k] ← p[k+1] ^ (p[k+1]_(size+k) ? (0^(size-k-1) || 1^1 || b || 0^k) : 0^(2*size))
    endfor
    c ← p[0]_(size-1..0)
enddef

def EnsembleTernary(op,size,rd,rc,rb,ra) as
    d ← RegRead(rd, 128)
    c ← RegRead(rc, 128)
    b ← RegRead(rb, 128)
    case op of
        E.MUL.G:
            for i ← 0 to 128-size by size
                z_(size-1+i..i) ← PolyResidue(size,PolyMul(size,c_(size-1+i..i),d_(size-1+i..i)),b_(size-1+i..i))
            endfor
        E.MUL.SUM.G:
            p[0] ← 0^128
            for i ← 0 to 128-size by size
                p[i+size] ← p[i] ^ PolyMul(size,c_(size-1+i..i),d_(size-1+i..i)),
            endfor
            z ← 0^(128-size) || PolyResidue(size,p[128],b_(size-1..0))
    endcase
    RegWrite(ra, 128, z)
enddef
```

FIG. 97C

Exceptions none

FIG. 97D

Operation codes

| | |
|---|---|
| E.LOG.MOST.008 | Ensemble log of most significant bit signed bytes |
| E.LOG.MOST.016 | Ensemble log of most significant bit signed doublets |
| E.LOG.MOST.032 | Ensemble log of most significant bit signed quadlets |
| E.LOG.MOST.064 | Ensemble log of most significant bit signed octlets |
| E.LOG.MOST.128 | Ensemble log of most significant bit signed hexlet |
| E.LOG.MOST.U.008 | Ensemble log of most significant bit unsigned bytes |
| E.LOG.MOST.U.016 | Ensemble log of most significant bit unsigned doublets |
| E.LOG.MOST.U.032 | Ensemble log of most significant bit unsigned quadlets |
| E.LOG.MOST.U.064 | Ensemble log of most significant bit unsigned octlets |
| E.LOG.MOST.U.128 | Ensemble log of most significant bit unsigned hexlet |
| E.SUM.08 | Ensemble sum signed bytes |
| E.SUM.16 | Ensemble sum signed doublets |
| E.SUM.32 | Ensemble sum signed quadlets |
| E.SUM.64 | Ensemble sum signed octlets |
| E.SUM.C.08 | Ensemble sum complex bytes |
| E.SUM.C.16 | Ensemble sum complex doublets |
| E.SUM.C.32 | Ensemble sum complex quadlets |
| E.SUM.P.01[18] | Ensemble sum polynomial bits |
| E.SUM.P.08 | Ensemble sum polynomial bytes |
| E.SUM.P.16 | Ensemble sum polynomial doublets |
| E.SUM.P.32 | Ensemble sum polynomial quadlets |
| E.SUM.P.64 | Ensemble sum polynomial octlets |
| E.SUM.U.01[19] | Ensemble sum unsigned bits |
| E.SUM.U.08 | Ensemble sum unsigned bytes |
| E.SUM.U.16 | Ensemble sum unsigned doublets |
| E.SUM.U.32 | Ensemble sum unsigned quadlets |
| E.SUM.U.64 | Ensemble sum unsigned octlets |

Selection

| class | op | size |
|---|---|---|
| sum | SUM | 8 16 32 64 |
| | SUM.C | 8 16 32 |
| | SUM.P | 1 8 16 32 64 |
| | SUM.U | 1 8 16 32 64 |
| log most significant bit | LOG.MOST LOG.MOST.U | 8 16 32 64 128 |

FIG. 98A-1

Format

E.op.size rd=rc rd=eopsize(rc)

| 31 24 | 23 18 | 17 12 | 11 6 | 5 0 |
|---|---|---|---|---|
| E.size | rd | rc | op | E.UNARY |
| 8 | 6 | 6 | 6 | 6 |

FIG. 98A-2

Definition def EnsembleUnary(op,size,rd,rc)
c ← RegRead(rc, 128)
case op of
E.LOG.MOST:
for i ← 0 to 128-size by size
if ($c_{i+size-1..i} = c^{size}_{size-1+i}$) then
$z_{i+size-1..i} \leftarrow -1$
else
for j ← 0 to size-2
if $c_{size-1+i..j+i} = (c^{size-1-j}_{size-1+i} \| \text{not } c_{size-1+i})$ then
$z_{i+size-1..i} \leftarrow j$
endif
endfor
endif
endfor
E.LOG.MOSTU:
for i ← 0 to 128-size by size
if ($c_{i+size-1..i} = 0$) then
$z_{i+size-1..i} \leftarrow -1$
else
for j ← 0 to size-1
if $c_{size-1+i..j+i} = (0^{size-1-j} \| 1)$ then
$z_{i+size-1..i} \leftarrow j$
endif
endfor
endif
endfor
E.SUM:
$p[0] \leftarrow 0^{128}$
for i ← 0 to 128-size by size
$p[i+size] \leftarrow p[i] + (c^{128-size}_{size-1+i} \| c_{size-1+i..i})$
endfor
$z \leftarrow p[128]$
E.SUM.C:
$p[0] \leftarrow 0^{64}$
$p[size] \leftarrow 0^{64}$
for i ← 0 to 128-size by size
$p[i+2*size] \leftarrow p[i] + (c^{64-size}_{size-1+i} \| c_{size-1+i..i})$
endfor
$z \leftarrow p[128+size] \| p[128]$
E.SUM.P:

FIG. 98B-1

```
                p[0] ← 0^128
                for i ← 0 to 128-size by size
                        p[i+size] ← p[i] ^ (0^(128-size) || c_(size-1+i..i))
                endfor
                z ← p[128]
        E.SUMU:
                p[0] ← 0^128
                for i ← 0 to 128-size by size
                        p[i+size] ← p[i] + (0^(128-size) || c_(size-1+i..i))
                endfor
                z ← p[128]
    endcase
    RegWrite(rd, 128, z)
enddef
```

FIG. 98B-2

Exceptions none

FIG. 98C

Operation codes

| | |
|---|---|
| E.ABS.F.016 | Ensemble absolute value floating-point half |
| E.ABS.F.016.X | Ensemble absolute value floating-point half exception |
| E.ABS.F.032 | Ensemble absolute value floating-point single |
| E.ABS.F.032.X | Ensemble absolute value floating-point single exception |
| E.ABS.F.064 | Ensemble absolute value floating-point double |
| E.ABS:F.064.X | Ensemble absolute value floating-point double exception |
| E.ABS.F.128 | Ensemble absolute value floating-point quad |
| E.ABS.F.128.X | Ensemble absolute value floating-point quad exception |
| E.COPY.F.016 | Ensemble copy floating-point half |
| E.COPY.F.016.X | Ensemble copy floating-point half exception |
| E.COPY.F.032 | Ensemble copy floating-point single |
| E.COPY.F.032.X | Ensemble copy floating-point single exception |
| E.COPY.F.064 | Ensemble copy floating-point double |
| E.COPY.F.064.X | Ensemble copy floating-point double exception |
| E.COPY.F.128 | Ensemble copy floating-point quad |
| E.COPY.F.128.X | Ensemble copy floating-point quad exception |
| E.DEFLATE.F.032 | Ensemble convert floating-point half from single |
| E.DEFLATE.F.032.C | Ensemble convert floating-point half from single ceiling |
| E.DEFLATE.F.032.F | Ensemble convert floating-point half from single floor |
| E.DEFLATE.F.032.N | Ensemble convert floating-point half from single nearest |
| E.DEFLATE.F.032.X | Ensemble convert floating-point half from single exact |
| E.DEFLATE.F.032.Z | Ensemble convert floating-point half from single zero |
| E.DEFLATE.F.064 | Ensemble convert floating-point single from double |
| E.DEFLATE.F.064.C | Ensemble convert floating-point single from double ceiling |
| E.DEFLATE.F.064.F | Ensemble convert floating-point single from double floor |
| E.DEFLATE.F.064.N | Ensemble convert floating-point single from double nearest |
| E.DEFLATE.F.064.X | Ensemble convert floating-point single from double exact |
| E.DEFLATE.F.064.Z | Ensemble convert floating-point single from double zero |
| E.DEFLATE.F.128 | Ensemble convert floating-point double from quad |
| E.DEFLATE.F.128.C | Ensemble convert floating-point double from quad ceiling |
| E.DEFLATE.F.128.F | Ensemble convert floating-point double from quad floor |
| E.DEFLATE.F.128.N | Ensemble convert floating-point double from quad nearest |
| E.DEFLATE.F.128.X | Ensemble convert floating-point double from quad exact |
| E.DEFLATE.F.128.Z | Ensemble convert floating-point double from quad zero |
| E.FLOAT.F.016 | Ensemble convert floating-point half from doublets |
| E.FLOAT.F.016.C | Ensemble convert floating-point half from doublets ceiling |
| E.FLOAT.F.016.F | Ensemble convert floating-point half from doublets floor |

FIG. 99A-1

| | |
|---|---|
| E.FLOAT.F.016.N | Ensemble convert floating-point half from doublets nearest |
| E.FLOAT.F.016.X | Ensemble convert floating-point half from doublets exact |
| E.FLOAT.F.016.Z | Ensemble convert floating-point half from doublets zero |
| E.FLOAT.F.032 | Ensemble convert floating-point single from quadlets |
| E.FLOAT.F.032.C | Ensemble convert floating-point single from quadlets ceiling |
| E.FLOAT.F.032.F | Ensemble convert floating-point single from quadlets floor |
| E.FLOAT.F.032.N | Ensemble convert floating-point single from quadlets nearest |
| E.FLOAT.F.032.X | Ensemble convert floating-point single from quadlets exact |
| E.FLOAT.F.032.Z | Ensemble convert floating-point single from quadlets zero |
| E.FLOAT.F.064 | Ensemble convert floating-point double from octlets |
| E.FLOAT.F.064.C | Ensemble convert floating-point double from octlets ceiling |
| E.FLOAT.F.064.F | Ensemble convert floating-point double from octlets floor |
| E.FLOAT.F.064.N | Ensemble convert floating-point double from octlets nearest |
| E.FLOAT.F.064.X | Ensemble convert floating-point double from octlets exact |
| E.FLOAT.F.064.Z | Ensemble convert floating-point double from octlets zero |
| E.FLOAT.F.128 | Ensemble convert floating-point quad from hexlet |
| E.FLOAT.F.128.C | Ensemble convert floating-point quad from hexlet ceiling |
| E.FLOAT.F.128.F | Ensemble convert floating-point quad from hexlet floor |
| E.FLOAT.F.128.N | Ensemble convert floating-point quad from hexlet nearest |
| E.FLOAT.F.128.X | Ensemble convert floating-point quad from hexlet exact |
| E.FLOAT.F.128.Z | Ensemble convert floating-point quad from hexlet zero |
| E.INFLATE.F.016 | Ensemble convert floating-point single from half |
| E.INFLATE.F.016.X | Ensemble convert floating-point single from half exception |
| E.INFLATE.F.032 | Ensemble convert floating-point double from single |
| E.INFLATE.F.032.X | Ensemble convert floating-point double from single exception |
| E.INFLATE.F.064 | Ensemble convert floating-point quad from double |
| E.INFLATE.F.064.X | Ensemble convert floating-point quad from double exception |
| E.NEG.F.016 | Ensemble negate floating-point half |
| E.NEG.F.016.X | Ensemble negate floating-point half exception |
| E.NEG.F.032 | Ensemble negate floating-point single |
| E.NEG.F.032.X | Ensemble negate floating-point single exception |
| E.NEG.F.064 | Ensemble negate floating-point double |
| E.NEG.F.064.X | Ensemble negate floating-point double exception |
| E.NEG.F.128 | Ensemble negate floating-point quad |
| E.NEG.F.128.X | Ensemble negate floating-point quad exception |
| E.RECEST.F.016 | Ensemble reciprocal estimate floating-point half |
| E.RECEST.F.016.X | Ensemble reciprocal estimate floating-point half exception |
| E.RECEST.F.032 | Ensemble reciprocal estimate floating-point single |

FIG. 99A-2

| | |
|---|---|
| E.RECEST.F.032.X | Ensemble reciprocal estimate floating-point single exception |
| E.RECEST.F.064 | Ensemble reciprocal estimate floating-point double |
| E.RECEST.F.064.X | Ensemble reciprocal estimate floating-point double exception |
| E.RECEST.F.128 | Ensemble reciprocal estimate floating-point quad |
| E.RECEST.F.128.X | Ensemble reciprocal estimate floating-point quad exception |
| E.RSQREST.F.016 | Ensemble floating-point reciprocal square root estimate half |
| E.RSQREST.F.016.X | Ensemble floating-point reciprocal square root estimate half exact |
| E.RSQREST.F.032 | Ensemble floating-point reciprocal square root estimate single |
| E.RSQREST.F.032.X | Ensemble floating-point reciprocal square root estimate single exact |
| E.RSQREST.F.064 | Ensemble floating-point reciprocal square root estimate double |
| E.RSQREST.F.064.X | Ensemble floating-point reciprocal square root estimate double exact |
| E.RSQREST.F.128 | Ensemble floating-point reciprocal square root estimate quad |
| E.RSQREST.F.128.X | Ensemble floating-point reciprocal square root estimate quad exact |
| E.SINK.F.016 | Ensemble convert floating-point doublets from half nearest default |
| E.SINK.F.016.C | Ensemble convert floating-point doublets from half ceiling |
| E.SINK.F.016.C.D | Ensemble convert floating-point doublets from half ceiling default |
| E.SINK.F.016.F | Ensemble convert floating-point doublets from half floor |
| E.SINK.F.016.F.D | Ensemble convert floating-point doublets from half floor default |
| E.SINK.F.016.N | Ensemble convert floating-point doublets from half nearest |
| E.SINK.F.016.X | Ensemble convert floating-point doublets from half exact |
| E.SINK.F.016.Z | Ensemble convert floating-point doublets from half zero |
| E.SINK.F.016.Z.D | Ensemble convert floating-point doublets from half zero default |
| E.SINK.F.032 | Ensemble convert floating-point quadlets from single nearest default |
| E.SINK.F.032.C | Ensemble convert floating-point quadlets from single ceiling |
| E.SINK.F.032.C.D | Ensemble convert floating-point quadlets from single ceiling default |
| E.SINK.F.032.F | Ensemble convert floating-point quadlets from single floor |
| E.SINK.F.032.F.D | Ensemble convert floating-point quadlets from single floor default |
| E.SINK.F.032.N | Ensemble convert floating-point quadlets from single nearest |
| E.SINK.F.032.X | Ensemble convert floating-point quadlets from single exact |
| E.SINK.F.032.Z | Ensemble convert floating-point quadlets from single zero |
| E.SINK.F.032.Z.D | Ensemble convert floating-point quadlets from single zero default |
| E.SINK.F.064 | Ensemble convert floating-point octlets from double nearest default |
| E.SINK.F.064.C | Ensemble convert floating-point octlets from double ceiling |
| E.SINK.F.064.C.D | Ensemble convert floating-point octlets from double ceiling default |
| E.SINK.F.064.F | Ensemble convert floating-point octlets from double floor |
| E.SINK.F.064.F.D | Ensemble convert floating-point octlets from double floor default |
| E.SINK.F.064.N | Ensemble convert floating-point octlets from double nearest |
| E.SINK.F.064.X | Ensemble convert floating-point octlets from double exact |

FIG. 99A-3

| | |
|---|---|
| E.SINK.F.064.Z | Ensemble convert floating-point octlets from double zero |
| E.SINK.F.064.Z.D | Ensemble convert floating-point octlets from double zero default |
| E.SINK.F.128 | Ensemble convert floating-point hexlet from quad nearest default |
| E.SINK.F.128.C | Ensemble convert floating-point hexlet from quad ceiling |
| E.SINK.F.128.C.D | Ensemble convert floating-point hexlet from quad ceiling default |
| E.SINK.F.128.F | Ensemble convert floating-point hexlet from quad floor |
| E.SINK.F.128.F.D | Ensemble convert floating-point hexlet from quad floor default |
| E.SINK.F.128.N | Ensemble convert floating-point hexlet from quad nearest |
| E.SINK.F.128.X | Ensemble convert floating-point hexlet from quad exact |
| E.SINK.F.128.Z | Ensemble convert floating-point hexlet from quad zero |
| E.SINK.F.128.Z.D | Ensemble convert floating-point hexlet from quad zero default |
| E.SQR.F.016 | Ensemble square root floating-point half |
| E.SQR.F.016.C | Ensemble square root floating-point half ceiling |
| E.SQR.F.016.F | Ensemble square root floating-point half floor |
| E.SQR.F.016.N | Ensemble square root floating-point half nearest |
| E.SQR.F.016.X | Ensemble square root floating-point half exact |
| E.SQR.F.016.Z | Ensemble square root floating-point half zero |
| E.SQR.F.032 | Ensemble square root floating-point single |
| E.SQR.F.032.C | Ensemble square root floating-point single ceiling |
| E.SQR.F.032.F | Ensemble square root floating-point single floor |
| E.SQR.F.032.N | Ensemble square root floating-point single nearest |
| E.SQR.F.032.X | Ensemble square root floating-point single exact |
| E.SQR.F.032.Z | Ensemble square root floating-point single zero |
| E.SQR.F.064 | Ensemble square root floating-point double |
| E.SQR.F.064.C | Ensemble square root floating-point double ceiling |
| E.SQR.F.064.F | Ensemble square root floating-point double floor |
| E.SQR.F.064.N | Ensemble square root floating-point double nearest |
| E.SQR.F.064.X | Ensemble square root floating-point double exact |
| E.SQR.F.064.Z | Ensemble square root floating-point double zero |
| E.SQR.F.128 | Ensemble square root floating-point quad |
| E.SQR.F.128.C | Ensemble square root floating-point quad ceiling |
| E.SQR.F.128.F | Ensemble square root floating-point quad floor |
| E.SQR.F.128.N | Ensemble square root floating-point quad nearest |
| E.SQR.F.128.X | Ensemble square root floating-point quad exact |
| E.SQR.F.128.Z | Ensemble square root floating-point quad zero |
| E.SUM.C.F.016 | Ensemble sum complex floating-point half |
| E.SUM.C.F.032 | Ensemble sum complex floating-point single |
| E.SUM.C.F.064 | Ensemble sum complex floating-point double |

FIG. 99A-4

| | |
|---|---|
| E.SUM.F.016 | Ensemble sum floating-point half |
| E.SUM.F.016.C | Ensemble sum floating-point half ceiling |
| E.SUM.F.016.F | Ensemble sum floating-point half floor |
| E.SUM.F.016.N | Ensemble sum floating-point half nearest |
| E.SUM.F.016.X | Ensemble sum floating-point half exact |
| E.SUM.F.016.Z | Ensemble sum floating-point half zero |
| E.SUM.F.032 | Ensemble sum floating-point single |
| E.SUM.F.032.C | Ensemble sum floating-point single ceiling |
| E.SUM.F.032.F | Ensemble sum floating-point single floor |
| E.SUM.F.032.N | Ensemble sum floating-point single nearest |
| E.SUM.F.032.X | Ensemble sum floating-point single exact |
| E.SUM.F.032.Z | Ensemble sum floating-point single zero |
| E.SUM.F.064 | Ensemble sum floating-point double |
| E.SUM.F.064.C | Ensemble sum floating-point double ceiling |
| E.SUM.F.064.F | Ensemble sum floating-point double floor |
| E.SUM.F.064.N | Ensemble sum floating-point double nearest |
| E.SUM.F.064.X | Ensemble sum floating-point double exact |
| E.SUM.F.064.Z | Ensemble sum floating-point double zero |
| E.SUM.F.128 | Ensemble sum floating-point quad |
| E.SUM.F.128.C | Ensemble sum floating-point quad ceiling |
| E.SUM.F.128.F | Ensemble sum floating-point quad floor |
| E.SUM.F.128.N | Ensemble sum floating-point quad nearest |
| E.SUM.F.128.X | Ensemble sum floating-point quad exact |
| E.SUM.F.128.Z | Ensemble sum floating-point quad zero |

FIG. 99A-5

Selection

| | op | prec | | | | round/trap |
|---|---|---|---|---|---|---|
| copy | COPY | 16 | 32 | 64 | 128 | NONE X |
| absolute value | ABS | 16 | 32 | 64 | 128 | NONE X |
| float from integer | FLOAT | 16 | 32 | 64 | 128 | NONE C F N X Z |
| integer from float | SINK | 16 | 32 | 64 | 128 | NONE C F N X Z C.D F.D Z.D |
| increase format precision | INFLATE | 16 | 32 | 64 | | NONE X |
| decrease format precision | DEFLATE | | 32 | 64 | 128 | NONE C F N X Z |
| negate | NEG | 16 | 32 | 64 | 128 | NONE X |
| reciprocal estimate | RECEST | 16 | 32 | 64 | 128 | NONE X |
| reciprocal square root estimate | RSQREST | 16 | 32 | 64 | 128 | NONE X |
| square root | SQR | 16 | 32 | 64 | 128 | NONE C F N X Z |
| sum | SUM | 16 | 32 | 64 | 128 | NONE C F N X Z |
| complex sum | SUM.C | 16 | 32 | 64 | | NONE |

Format

E.op.prec.rnd rd=rc rd=eopprecrnd(rc)

| 31 24 | 23 18 | 17 12 | 11 6 | 5 0 |
|---|---|---|---|---|
| E.prec | rd | rc | op.rnd | E.UNARY |
| 8 | 6 | 6 | 6 | 6 |

FIG. 99A-6

Definition

```
def EnsembleUnaryFloatingPoint(op,prec,round,rd,rc) as
    c ← RegRead(rc, 128)
    case op of
        E.ABS.F, E.NEG.F, E.SQR.F:
            for i ← 0 to 128-prec by prec
                ci ← F(prec,ci+prec-1..i)
                case op of
                    E.ABS.F:
                        zi.t ← ci.t
                        zi.s ← 0
                        zi.e ← ci.e
                        zi.f ← ci.f
                    E.COPY.F:
                        zi ← ci
                    E.NEG.F:
                        zi.t ← ci.t
                        zi.s ← ~ci.s
                        zi.e ← ci.e
                        zi.f ← ci.f
                    E.RECEST.F:
                        zi ← frecest(ci)
                    E.RSQREST.F:
                        zi ← frsqrest(ci)
                    E.SQR.F:
                        zi ← fsqr(ci)
                endcase
                zi+prec-1..i ← PackF(prec, zi, round)
            endfor
        E.SUM.F:
            p[0].t ← NULL
            for i ← 0 to 128-prec by prec
                p[i+prec] ← fadd(p[i], F(prec,ci+prec-1..i))
            endfor
            z ← PackF(prec, p[128], round)
        E.SUM.CF:
            p[0].t ← NULL
            p[prec].t ← NULL
            for i ← 0 to 128-prec by prec
                p[i+2*size] ← fadd(p[i], F(prec,ci+prec-1..i))
            endfor
            z ← 0 || PackF(prec, p[128+prec], round) || PackF(prec, p[128], round)
        E.SINK.F:
            for i ← 0 to 128-prec by prec
```

FIG. 99B-1

```
                ci ← F(prec,c_{i+prec-1..i})
                z_{i+prec-1..i} ← fsinkr(prec, ci, round)
            endfor
        E.FLOAT.F:
            for i ← 0 to 128-prec by prec
                ci.t ← NORM
                ci.e ← 0
                ci.s ← c_{i+prec-1}
                ci.f ← ci.s ? 1+~c_{i+prec-2..i} : c_{i+prec-2..i}
                z_{i+prec-1..i} ← PackF(prec, ci, round)
            endfor
        E.INFLATE.F:
            for i ← 0 to 64-prec by prec
                ci ← F(prec,c_{i+prec-1..i})
                z_{i+i+prec+prec-1..i+i} ← PackF(prec+prec, ci, round)
            endfor
        E.DEFLATE.F:
            for i ← 0 to 128-prec by prec
                ci ← F(prec,c_{i+prec-1..i})
                z_{i/2+prec/2-1..i/2} ← PackF(prec/2, ci, round)
            endfor
            z_{127..64} ← 0
    endcase
    RegWrite[rd, 128, z]
enddef
```

FIG. 99B-2

Exceptions

Floating-point arithmetic

FIG. 99C

Memory management organization

Superspring pipeline

COMPUTER SYSTEM FOR EXECUTING SWITCH AND TABLE TRANSLATE INSTRUCTIONS REQUIRING WIDE OPERANDS

RELATED APPLICATIONS

This application is a continuation of U.S. patent application Ser. No. 11/346,213 filed Feb. 3, 2006, which is a continuation of U.S. patent application Ser. No. 10/616,303 filed Jul. 10, 2003, now U.S. Pat. No. 7,301,541, which is a continuation-in-part of U.S. patent application Ser. No. 09/922,319, filed Aug. 2, 2001, now U.S. Pat. No. 6,725,356 which is a continuation of U.S. patent application Ser. No. 09/382,402, filed Aug. 24, 1999, now U.S. Pat. No. 6,295,599, which claims the benefit of priority to Provisional Application No. 60/097,635 filed on Aug. 24, 1998. Each of the above applications and/or patents are herein incorporated by reference in their entirety.

FIELD OF THE INVENTION

The present invention relates to general purpose processor architectures, and particularly relates to wide operand architectures.

BACKGROUND OF THE INVENTION

Communications products require increased computational performance to process digital signals in software on a real time basis. Increases in performance have come through improvements in process technology and by improvements in microprocessor design. Increased parallelism, higher clock rates, increased densities, coupled with improved design tools and compilers have made this more practical. However, many of these improvements cost additional overhead in memory and latency due to a lack of the necessary bandwidth that is closely coupled to the computational units.

The performance level of a processor, and particularly a general purpose processor, can be estimated from the multiple of a plurality of interdependent factors: clock rate, gates per clock, number of operands, operand and data path width, and operand and data path partitioning. Clock rate is largely influenced by the choice of circuit and logic technology, but is also influenced by the number of gates per clock. Gates per clock is how many gates in a pipeline may change state in a single clock cycle. This can be reduced by inserting latches into the data path: when the number of gates between latches is reduced, a higher clock is possible. However, the additional latches produce a longer pipeline length, and thus come at a cost of increased instruction latency. The number of operands is straightforward; for example, by adding with carry-save techniques, three values may be added together with little more delay than is required for adding two values. Operand and data path width defines how much data can be processed at once; wider data paths can perform more complex functions, but generally this comes at a higher implementation cost. Operand and data path partitioning refers to the efficient use of the data path as width is increased, with the objective of maintaining substantially peak usage.

The last factor, operand and data path partitioning, is treated extensively in commonly-assigned U.S. Pat. Nos. 5,742,840, 5,794,060, 5,794,061, 5,809,321, and 5,822,603, herein incorporated by reference in their entirety, which describe systems and methods for enhancing the utilization of a general purpose processor by adding classes of instructions. These classes of instructions use the contents of general purpose registers as data path sources, partition the operands into symbols of a specified size, perform operations in parallel, catenate the results and place the catenated results into a general-purpose register. These patents, all of which are assigned to the same assignee as the present invention, teach a general purpose microprocessor which has been optimized for processing and transmitting media data streams through significant parallelism.

While the foregoing patents offered significant improvements in utilization and performance of a general purpose microprocessor, particularly for handling broadband communications such as media data streams, other improvements are possible.

Many general purpose processors have general registers to store operands for instructions, with the register width matched to the size of the data path. Processor designs generally limit the number of accessible registers per instruction because the hardware to access these registers is relatively expensive in power and area. While the number of accessible registers varies among processor designs, it is often limited to two, three or four registers per instruction when such instructions are designed to operate in a single processor clock cycle or a single pipeline flow. Some processors, such as the Motorola 68000 have instructions to save and restore an unlimited number of registers, but require multiple cycles to perform such an instruction.

The Motorola 68000 also attempts to overcome a narrow data path combined with a narrow register file by taking multiple cycles or pipeline flows to perform an instruction, and thus emulating a wider data path. However, such multiple precision techniques offer only marginal improvement in view of the additional clock cycles required. The width and accessible number of the general purpose registers thus fundamentally limits the amount of processing that can be performed by a single instruction in a register-based machine.

Existing processors may provide instructions that accept operands for which one or more operands are read from a general purpose processor's memory system. However, as these memory operands are generally specified by register operands, and the memory system data path is no wider than the processor data path, the width and accessible number of general purpose operands per instruction per cycle or pipeline flow is not enhanced.

The number of general purpose register operands accessible per instruction is generally limited by logical complexity and instruction size. For example, it might be possible to implement certain desirable but complex functions by specifying a large number of general purpose registers, but substantial additional logic would have to be added to a conventional design to permit simultaneous reading and bypassing of the register values. While dedicated registers have been used in some prior art designs to increase the number or size of source operands or results, explicit instructions load or store values into these dedicated registers, and additional instructions are required to save and restore these registers upon a change of processor context.

The size of an execution unit result may be constrained to that of a general register so that no dedicated or other special storage is required for the result. Specifying a large number of general purpose registers as a result would similarly require substantial additional logic to be added to a conventional design to permit simultaneous writing and bypassing of the register values.

When the size of an execution unit result is constrained, it can limit the amount of computation which can reasonably be handled by a single instruction. As a consequence, algorithms must be implemented in a series of single instruction steps in which all intermediate results can be represented within the constraints. By eliminating this constraint, instruction sets can be developed in which a larger component of an algorithm is implemented as a single instruction, and the representation of intermediate results are no longer limited in size. Further, some of these intermediate results are not required to be retained upon completion of the larger component of an algorithm, so a processor freed of these constraints can improve performance and reduce operating power by not storing and retrieving these results from the general register file. When the intermediate results are not retained in the general register file, processor instruction sets and implemented algorithms are also not constrained by the size of the general register file.

There has therefore been a need for a processor system capable of efficient handling of operands and results of greater width than either the memory system or any accessible general purpose register. There is also a need for a processor system capable of efficient handling of operands and results of greater overall size than the entire general register file.

SUMMARY OF THE INVENTION

Commonly-assigned and related U.S. Pat. No. 6,295,599, describes in detail a method and system for improving the performance of general-purpose processors by expanding at least one source operand to a width greater than the width of either the general purpose register or the data path width. Further improvements in performance may be achieved by allowing a plurality of source operands to be expanded to a greater width than either the memory system or any accessible general purpose register, and by allowing the at least one result operand to be expanded to a greater width than either the memory system or any accessible general purpose register.

The present invention provides a system and method for improving the performance of general purpose processors by expanding at least one source operand or at least one result operand to a width greater than the width of either the general purpose register or the data path width. In addition, several classes of instructions will be provided which cannot be performed efficiently if the source operands or the at least one result operand are limited to the width and accessible number of general purpose registers.

In the present invention, source and result operands are provided which are substantially larger than the data path width of the processor. This is achieved, in part, by using a general purpose register to specify at least one memory address from which at least more than one, but typically several data path widths of data can be read. To permit such a wide operand to be performed in a single cycle, a data path functional unit is augmented with dedicated storage to which the memory operand is copied on an initial execution of the instruction. Further execution of the instruction or other similar instructions that specify the same memory address can read the dedicated storage to obtain the operand value. However, such reads are subject to conditions to verify that the memory operand has not been altered by intervening instructions. If the memory operand remains current—that is, the conditions are met—the memory operand fetch can be combined with one or more register operands in the functional unit, producing a result. The size of the result may be constrained to that of a general register so that no dedicated or other special storage is required for the result. The size of the result for additional instructions may not be so constrained, and so utilize dedicated storage to which the result operand is placed on execution of the instruction. The dedicated storage may be implemented in a local memory tightly coupled to the logic circuits that comprise the functional unit.

The present invention extends the previous embodiments to include methods and apparatus for performing operations that both receive operands from wide embedded memories and also deposit results in wide embedded memories. The present invention includes operations that autonomously read and update the wide embedded memories in multiple successive cycles of access and computation. The present invention also describes operations that employ simultaneously two or more independently addressed wide embedded memories.

Exemplary instructions using wide operations include wide instructions that perform bit level switching (Wide Switch), byte or larger table-lookup (Wide Translate), Wide Multiply Matrix, Wide Multiply Matrix Extract, Wide Multiply Matrix Extract Immediate, Wide Multiply Matrix Floating point, and Wide Multiply Matrix Galois.

Additional exemplary instructions using wide operations include wide instructions that solve equations iteratively (Wide Solve Galois), perform fast transforms (Wide Transform Slice), compute digital filter or motion estimation (Wide Convolve Extract, Wide Convolve Floating-point), decode Viterbi or turbo codes (Wide Decode), general look-up tables and interconnection (Wide Boolean).

Another aspect of the present invention addresses efficient usage of a multiplier array that is fully used for high precision arithmetic, but is only partly used for other, lower precision operations. This can be accomplished by extracting the high-order portion of the multiplier product or sum of products, adjusted by a dynamic shift amount from a general register or an adjustment specified as part of the instruction, and rounded by a control value from a register or instruction portion. The rounding may be any of several types, including round-to-nearest/even, toward zero, floor, or ceiling. Overflows are typically handled by limiting the result to the largest and smallest values that can be accurately represented in the output result.

When an extract is controlled by a register, the size of the result can be specified, allowing rounding and limiting to a smaller number of bits than can fit in the result. This permits the result to be scaled for use in subsequent operations without concern of overflow or rounding. As a result, performance is enhanced. In those instances where the extract is controlled by a register, a single register value defines the size of the operands, the shift amount and size of the result, and the rounding control. By placing such control information in a single register, the size of the instruction is reduced over the number of bits that such an instruction would otherwise require, again improving performance and enhancing processor flexibility. Exemplary instructions are Ensemble Convolve Extract, Ensemble Multiply Extract, Ensemble Multiply Add Extract, and Ensemble Scale Add Extract. With particular regard to the Ensemble Scale Add Extract Instruction, the extract control information is combined in a register with two values used as scalar multipliers to the contents of two vector multiplicands. This combination reduces the number of registers otherwise required, thus reducing the number of bits required for the instruction.

A method of performing a computation in a programmable processor, the programmable processor having a first memory system having a first data path width, and a second memory system and a third memory system each of the second memory system and the third memory system having a data path width which is greater than the first data path width, may comprise the steps of: copying a first memory operand portion from the first memory system to the second memory system, the first memory operand portion having the first data path width; copying a second memory operand portion from the first memory system to the second memory system, the second memory operand portion having the first data path width and being catenated in the second memory system with the first memory operand portion, thereby forming first catenated data; copying a third memory operand portion from the first memory system to the third memory system, the third memory operand portion having the first data path width; copying a fourth memory operand portion from the first memory system to the third memory system, the fourth memory operand portion having the first data path width and being catenated in the third memory system with the third memory operand portion, thereby forming second catenated data; and performing a computation of a single instruction using the first catenated data and the second catenated data.

In the method of performing a computation in a programmable processor, the step of performing a computation may further comprise reading a portion of the first catenated data and a portion of the second catenated data each of which is greater in width than the first data path width and using the portion of the first catenated data and the portion of the second catenated data to perform the computation.

The method of performing a computation in a programmable processor may further comprise the step of specifying a memory address of each of the first catenated data and of the second catenated data within the first memory system.

The method of performing a computation in a programmable processor may further comprise the step of specifying a memory operand size and a memory operand shape of each of the first catenated data and the second catenated data.

The method of performing a computation in a programmable processor may further comprise the step of checking the validity of each of the first catenated data in the second memory system and the second catenated data in the third memory system, and, if valid, permitting a subsequent instruction to use the first and second catenated data without copying from the first memory system.

The method of performing a computation in a programmable processor may further comprise performing a transform of partitioned elements contained in the first catenated data using coefficients contained in the second catenated data, thereby forming a transform data, extracting a specified subfield of the transform data, thereby forming an extracted data and catenating the extracted data.

An alternative method of performing a computation in a programmable processor, the programmable processor having a first memory system having a first data path width, and a second and a third memory system having a data path width which is greater than the first data path width, may comprising the steps of: copying a first memory operand portion from the first memory system to the second memory system, the first memory operand portion having the first data path width; copying a second memory operand portion from the first memory system to the second memory system, the second memory operand portion having the first data path width and being catenated in the second memory system with the first memory operand portion, thereby forming first catenated data; performing a computation of a single instruction using the first catenated data and producing a second catenated data; copying a third memory operand portion from the third memory system to the first memory system, the third memory operand portion having the first data path width and containing a portion of the second catenated data; and copying a fourth memory operand portion from the third memory system to the first memory system, the fourth memory operand portion having the first data path width and containing a portion of the second catenated data, wherein the fourth memory operand portion is catenated in the third memory system with the third memory operand portion.

In the alternative method of performing a computation in a programmable processor the step of performing a computation may further comprise the step of reading a portion of the first catenated data which is greater in width than the first data path width and using the portion of the first catenated data to perform the computation.

The alternative method of performing a computation in a programmable processor may further comprise the step of specifying a memory address of each of the first catenated data and of the second catenated data within the first memory system.

The alternative method of performing a computation in a programmable processor may further comprise the step of specifying a memory operand size and a memory operand shape of each of the first catenated data and the second catenated data.

The alternative method of performing a computation in a programmable processor may further comprise the step of checking the validity of each of the first catenated data in the second memory system and the second catenated data in the third memory system, and, if valid, permitting a subsequent instruction to use the first catenated data without copying from the first memory system.

In the alternative method of performing a computation, the step of performing a computation may further comprise the step of performing a transform of partitioned elements contained in the first catenated data, thereby forming a transform data, extracting a specified subfield of the transform data, thereby forming an extracted data and catenating the extracted data, forming the second catenated data.

In the alternative method of performing a computation, the step of performing a computation may further comprise the step of combining using Boolean arithmetic a portion of the extracted data with an accumulated Boolean data, combining partitioned elements of the accumulated Boolean data using Boolean arithmetic, forming combined Boolean data, determining the most significant bit of the extracted data from the combined Boolean data, and returning a result comprising the position of the most significant bit to a register.

The alternative method of performing a computation in a programmable processor may further comprise manipulating a first and a second validity information corresponding to first and second catenated data, wherein after completion of an instruction specifying a memory address of first catenated data, the contents of second catenated data are provided to the first memory system in place of first catenated data.

A programmable processor according to the present invention may comprise: a first memory system having a first data path width; a second memory system and a third memory system, wherein each of the second memory system and the third memory system have a data path width which is greater than the first data path width; a first copying module configured to copy a first memory operand portion from the first memory system to the second memory system, the first memory operand portion having the first data path width, and configured to copy a second memory operand portion from the first memory system to the second memory system, the second memory operand portion having the first data path width and being catenated in the second memory system with the first memory operand portion, thereby forming first catenated data; a second copying module configured to copy a third memory operand portion from the first memory system to the third memory system, the third memory operand portion having the first data path width, and configured to copy a fourth memory operand portion from the first memory system to the third memory system, the fourth memory operand portion having the first data path width and being catenated in the third memory system with the third memory operand portion, thereby forming second catenated data; and a functional unit configured to perform computations using the first catenated data and the second catenated data.

In the programmable processor, the functional unit may be further configured to read a portion of each of the first catenated data and the second catenated data which is greater in width than the first data path width and use the portion of each of the first catenated data and the second catenated data to perform the computation.

In the programmable processor, the functional unit may be further configured to specify a memory address of each of the first catenated data and of the second catenated data within the first memory system.

In the programmable processor, the functional unit may be further configured to specify a memory operand size and a memory operand shape of each of the first catenated data and the second catenated data.

The programmable processor may further comprise a control unit configured to check the validity of each of the first catenated data in the second memory system and the second catenated data in the third memory system, and, if valid, permitting a subsequent instruction to use each of the first catenated data and the second catenated data without copying from the first memory system.

In the programmable processor, the functional unit may be further configured to convolve partitioned elements contained in the first catenated data with partitioned elements contained in the second catenated data, forming a convolution data, extract a specified subfield of the convolution data and catenate extracted data, forming a catenated result having a size equal to that of the functional unit data path width.

In the programmable processor, the functional unit may be further configured to perform a transform of partitioned elements contained in the first catenated data using coefficients contained in the second catenated data, thereby forming a transform data, extract a specified subfield of the transform data, thereby forming an extracted data and catenate the extracted data.

An alternative programmable processor according to the present invention may comprise: a first memory system having a first data path width; a second memory system and a third memory system each of the second memory system and the third memory system having a data path width which is greater than the first data path width; a first copying module configured to copy a first memory operand portion from the first memory system to the second memory system, the first memory operand portion having the first data path width, and configured to copy a second memory operand portion from the first memory system to the second memory system, the second memory operand portion having the first data path width and being catenated in the second memory system with the first memory operand portion, thereby forming first catenated data; a second copying module configured to copy a third memory operand portion from the third memory system to the first memory system, the third memory operand portion having the first data path width and containing a portion of a second catenated data, and copy a fourth memory operand portion from the third memory system to the first memory system, the fourth memory operand portion having the first data path width and containing a portion of the second catenated data, wherein the fourth memory operand portion is catenated in the third memory system with the third memory operand portion; and a functional unit configured to perform computations using the first catenated data and the second catenated data.

In the alternative programmable processor the functional unit may be further configured to read a portion of the first catenated data which is greater in width than the first data path width and use the portion of the first catenated data to perform the computation.

In the alternative programmable processor the functional unit may be further configured to specify a memory address of each of the first catenated data and of the second catenated data within the first memory system.

In the alternative programmable processor the functional unit may be further configured to specify a memory operand size and a memory operand shape of each of the first catenated data and the second catenated data.

The alternative programmable processor may further comprise a control unit configured to check the validity of the first catenated data in the second memory system, and, if valid, permitting a subsequent instruction to use the first catenated data without copying from the first memory system.

In the alternative programmable processor the functional unit may be further configured to transform partitioned elements contained in the first catenated data, thereby forming a transform data, extract a specified subfield of the transform data, thereby forming an extracted data and catenate the extracted data, forming the second catenated data.

In the alternative programmable processor the functional unit may be further configured to combine using Boolean arithmetic a portion of the extracted data with an accumulated Boolean data, combine partitioned elements of the accumulated Boolean data using Boolean arithmetic, forming combined Boolean data, determine the most significant bit of the extracted data from the combined Boolean data, and provide a result comprising the position of the most significant bit.

The alternative programmable processor may further comprise a control unit configured to manipulate a first and a second validity information corresponding to first and second catenated data, wherein after completion of an instruction specifying a memory address of first catenated data, the contents of second catenated data are provided to the first memory system in place of first catenated data.

BRIEF DESCRIPTION OF THE DRAWINGS

FIGS. 12A-12F illustrate a Wide Switch instruction in accordance with an exemplary embodiment of the present invention.

FIGS. 13A-13G illustrate a Wide Translate instruction in accordance with an exemplary embodiment of the present invention.

FIGS. 14A-14G illustrate a Wide Multiply Matrix instruction in accordance with an exemplary embodiment of the present invention.

FIGS. 15A-15H illustrate a Wide Multiply Matrix Extract instruction in accordance with an exemplary embodiment of the present invention.

FIGS. 16A-16G illustrate a Wide Multiply Matrix Extract Immediate instruction in accordance with an exemplary embodiment of the present invention.

FIGS. 17A-17G illustrate a Wide Multiply Matrix Floating point instruction in accordance with an exemplary embodiment of the present invention.

FIGS. 18A-18F illustrate a Wide Multiply Matrix Galois instruction in accordance with an exemplary embodiment of the present invention.

FIGS. 19A-19H illustrate an Ensemble Extract Inplace instruction in accordance with an exemplary embodiment of the present invention.

FIGS. 20A-20L illustrate an Ensemble Extract instruction in accordance with an exemplary embodiment of the present invention.

FIGS. 21A-21H illustrate a System and Privileged Library Calls in accordance with an exemplary embodiment of the present invention.

FIGS. 22A-22C illustrate an Ensemble Scale-Add Floating-point instruction in accordance with an exemplary embodiment of the present invention.

FIGS. 23A-23E illustrate a Group Boolean instruction in accordance with an exemplary embodiment of the present invention.

FIGS. 24A-24C illustrate a Branch Hint instruction in accordance with an exemplary embodiment of the present invention.

FIGS. 25A-25D illustrate an Ensemble Sink Floating-point instruction in accordance with an exemplary embodiment of the present invention.

FIGS. 26A-26E illustrate Group Add instructions in accordance with an exemplary embodiment of the present invention.

FIGS. 27A-27E illustrate Group Set instructions and Group Subtract instructions in accordance with an exemplary embodiment of the present invention.

FIGS. 28A-28K illustrate Ensemble Convolve, Ensemble Divide, Ensemble Multiply, and Ensemble Multiply Sum instructions in accordance with an exemplary embodiment of the present invention.

FIG. 29 illustrates exemplary functions that are defined for use within the detailed instruction definitions in other sections.

FIGS. 30A-30E illustrate Ensemble Floating-Point Add, Ensemble Floating-Point Divide, and Ensemble Floating-Point Multiply instructions in accordance with an exemplary embodiment of the present invention.

FIGS. 31A-31C illustrate Ensemble Floating-Point Subtract instructions in accordance with an exemplary embodiment of the present invention.

FIGS. 32A-32E illustrate Crossbar Compress, Expand, Rotate, and Shift instructions in accordance with an exemplary embodiment of the present invention.

FIGS. 33A-33G illustrate Extract instructions in accordance with an exemplary embodiment of the present invention.

FIGS. 34A-34H illustrate Shuffle instructions in accordance with an exemplary embodiment of the present invention.

FIGS. 35A-35B illustrate Wide Solve Galois instructions in accordance with an exemplary embodiment of the present invention.

FIGS. 36A-36B illustrate Wide Transform Slice instructions in accordance with an exemplary embodiment of the present invention.

FIGS. 37A-37M illustrate Wide Convolve Extract instructions in accordance with an exemplary embodiment of the present invention.

FIG. 38 illustrates Transfers Between Wide Operand Memories in accordance with an exemplary embodiment of the present invention.

FIGS. 39A-39J illustrate operations in accordance with an exemplary embodiment of the present invention.

FIGS. 40A-40C illustrate Instruction Fetch, Perform Exception, and Instruction Decode in accordance with an exemplary embodiment of the present invention.

FIGS. 41A-41C illustrate a Always Reserved instruction in accordance with an exemplary embodiment of the present invention.

FIGS. 42A-42C illustrate Address instructions in accordance with an exemplary embodiment of the present invention.

FIGS. 43A-43C illustrate Address Compare instructions in accordance with an exemplary embodiment of the present invention.

FIGS. 44A-44C illustrate Address Compare Floating Point instructions in accordance with an exemplary embodiment of the present invention.

FIGS. 45A-45C illustrate Address Copy Immediate instructions in accordance with an exemplary embodiment of the present invention.

FIGS. 46A-46C illustrate Address Immediate instructions in accordance with an exemplary embodiment of the present invention.

FIGS. 47A-47C illustrate Address Immediate Reversed instructions in accordance with an exemplary embodiment of the present invention.

FIGS. 48A-48C illustrate Address Immediate Set instructions in accordance with an exemplary embodiment of the present invention.

FIGS. 49A-49C illustrate Address Reversed instructions in accordance with an exemplary embodiment of the present invention.

FIGS. 50A-50C illustrate Address Set instructions in accordance with an exemplary embodiment of the present invention.

FIGS. 51A-51C illustrate Address Set Floating Point instructions in accordance with an exemplary embodiment of the present invention.

FIGS. 52A-52C illustrate an Address Shift Left Add instruction in accordance with an exemplary embodiment of the present invention.

FIGS. 53A-53C illustrate an Address Shift Left Immediate Add instruction in accordance with an exemplary embodiment of the present invention.

FIGS. 54A-54C illustrate Address Shift Immediate instructions in accordance with an exemplary embodiment of the present invention.

FIGS. 55A-55C illustrate an Address Ternary instruction in accordance with an exemplary embodiment of the present invention.

FIGS. 56A-56C illustrate a Branch instruction in accordance with an exemplary embodiment of the present invention.

FIGS. 57A-57C illustrate a Branch Back instruction in accordance with an exemplary embodiment of the present invention.

FIGS. 58A-58C illustrate a Branch Barrier instruction in accordance with an exemplary embodiment of the present invention.

FIGS. 59A-59C illustrate Branch Conditional instructions in accordance with an exemplary embodiment of the present invention.

FIGS. 60A-60C illustrate Branch Conditional Floating-Point instructions in accordance with an exemplary embodiment of the present invention.

FIGS. 61A-61C illustrate Branch Conditional Visibility Floating-Point instructions in accordance with an exemplary embodiment of the present invention.

FIGS. 62A-62C illustrate a Branch Down instruction in accordance with an exemplary embodiment of the present invention.

FIGS. 63A-63C illustrate a Branch Halt instruction in accordance with an exemplary embodiment of the present invention.

FIGS. 64A-64C illustrate a Branch Hint Immediate instruction in accordance with an exemplary embodiment of the present invention.

FIGS. 65A-65C illustrate a Branch Immediate instructions in accordance with an exemplary embodiment of the present invention.

FIGS. 66A-66C illustrate a Branch Immediate Link instruction in accordance with an exemplary embodiment of the present invention.

FIGS. 67A-67C illustrate a Branch Link instruction in accordance with an exemplary embodiment of the present invention.

FIGS. 68A-68C illustrate Link instructions in accordance with an exemplary embodiment of the present invention.

FIGS. 69A-69C illustrate Load Immediate instructions in accordance with an exemplary embodiment of the present invention.

FIGS. 70A-70C illustrate Store instructions in accordance with an exemplary embodiment of the present invention.

FIGS. 71A-71C illustrate Store Double Compare Swap instructions in accordance with an exemplary embodiment of the present invention.

FIGS. 72A-72C illustrate Store Immediate instructions in accordance with an exemplary embodiment of the present invention.

FIGS. 73A-73C illustrate Store Immediate Inplace instructions in accordance with an exemplary embodiment of the present invention.

FIGS. 74A-74C illustrate Store Inplace instructions in accordance with an exemplary embodiment of the present invention.

FIGS. 75A-75C illustrate Group Add Halve instructions in accordance with an exemplary embodiment of the present invention.

FIGS. 76A-76C illustrate Group Compare instructions in accordance with an exemplary embodiment of the present invention.

FIGS. 77A-77C illustrate Group Compare Floating-point instructions in accordance with an exemplary embodiment of the present invention.

FIGS. 78A-78C illustrate Group Copy Immediate instructions in accordance with an exemplary embodiment of the present invention.

FIGS. 79A-79C illustrate Group Immediate instructions in accordance with an exemplary embodiment of the present invention.

FIGS. 80A-80C illustrate Group Immediate Reversed instructions in accordance with an exemplary embodiment of the present invention.

FIGS. 81A-81C illustrate Group Inplace instructions in accordance with an exemplary embodiment of the present invention.

FIGS. 82A-82C illustrate Group Reversed Floating-point instructions in accordance with an exemplary embodiment of the present invention.

FIGS. 83A-83C illustrate Group Shift Left Immediate Add instructions in accordance with an exemplary embodiment of the present invention.

FIGS. 84A-84C illustrate Group Shift Left Immediate Subtract instructions in accordance with an exemplary embodiment of the present invention.

FIGS. 85A-85C illustrate Group Subtract Halve instructions in accordance with an exemplary embodiment of the present invention.

FIGS. 86A-86C illustrate a Group Ternary instruction in accordance with an exemplary embodiment of the present invention.

FIGS. 87A-87F illustrate Crossbar Field instructions in accordance with an exemplary embodiment of the present invention.

FIGS. 88A-88E illustrate Crossbar Field Inplace instructions in accordance with an exemplary embodiment of the present invention.

FIGS. 89A-89C illustrate Crossbar Inplace instructions in accordance with an exemplary embodiment of the present invention.

FIGS. 90A-90C illustrate Crossbar Short Immediate instructions in accordance with an exemplary embodiment of the present invention.

FIGS. 91A-91C illustrate Crossbar Short Immediate Inplace instructions in accordance with an exemplary embodiment of the present invention.

FIGS. 92A-92C illustrate a Crossbar Swizzle instruction in accordance with an exemplary embodiment of the present invention.

FIGS. 93A-93D illustrate a Crossbar Ternary instruction in accordance with an exemplary embodiment of the present invention.

FIGS. 94A-94G illustrate Ensemble Extract Immediate instructions in accordance with an exemplary embodiment of the present invention.

FIGS. 95A-95I illustrate Ensemble Extract Immediate Inplace instructions in accordance with an exemplary embodiment of the present invention.

FIGS. 96A-96E illustrate Ensemble Inplace Floating-point instructions in accordance with an exemplary embodiment of the present invention.

FIGS. 97A-97D illustrate Ensemble Ternary instructions in accordance with an exemplary embodiment of the present invention.

FIGS. 98A-98C illustrate Ensemble Unary instructions in accordance with an exemplary embodiment of the present invention.

FIGS. 99A-99C illustrate Ensemble Unary Floating-point instructions in accordance with an exemplary embodiment of the present invention.

DETAILED DESCRIPTION OF THE INVENTION

Introduction

Figure 1:
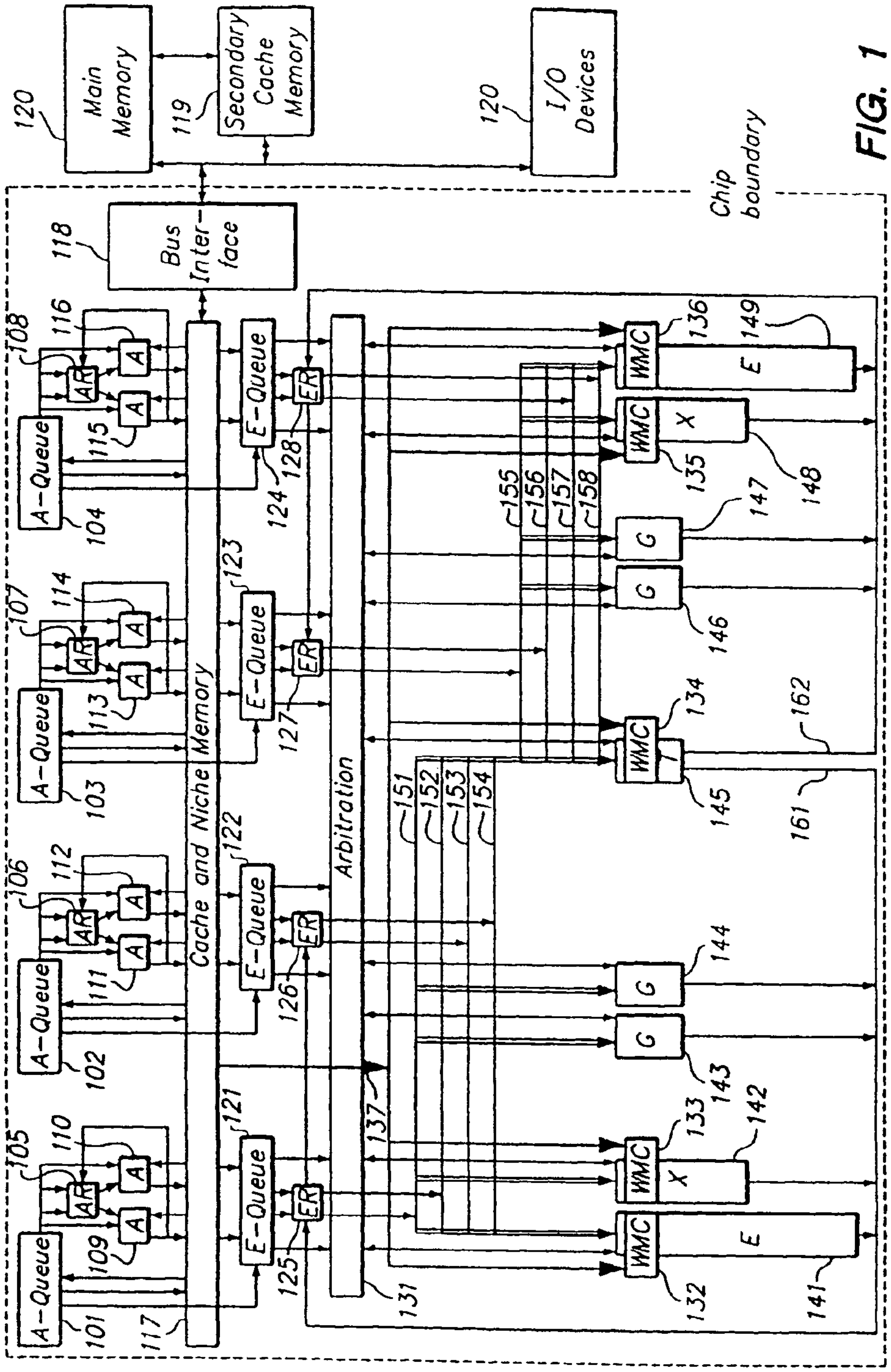
FIG. 1 is a system level diagram showing the functional blocks of a system in accordance with an exemplary embodiment of the present invention.

In various embodiments of the invention, a computer processor architecture, referred to here as Micro Unity's Zeus Architecture is presented. MicroUnity's Zeus Architecture describes general-purpose processor, memory, and interface subsystems, organized to operate at the enormously high bandwidth rates required for broadband applications.

The Zeus processor performs integer, floating point, signal processing and non-linear operations such as Galois field, table lookup and bit switching on data sizes from 1 bit to 128 bits. Group or SIMD (single instruction multiple data) operations sustain external operand bandwidth rates up to 512 bits (i.e., up to four 128-bit operand groups) per instruction even on data items of small size. The processor performs ensemble operations such as convolution that maintain full intermediate precision with aggregate internal operand bandwidth rates up to 20,000 bits per instruction. The processor performs wide operations such as crossbar switch, matrix multiply and table lookup that use caches embedded in the execution units themselves to extend operands to as much as 32768 bits. All instructions produce at most a single 128-bit general register result, source at most three 128-bit general registers and are free of side effects such as the setting of condition codes and flags. The instruction set design carries the concept of streamlining beyond Reduced Instruction Set Computer (RISC) architectures, to simplify implementations that issue several instructions per machine cycle.

The Zeus memory subsystem provides 64-bit virtual and physical addressing for UNIX, Mach, and other advanced OS environments. Separate address instructions enable the division of the processor into decoupled access and execution units, to reduce the effective latency of memory to the pipeline. The Zeus cache supplies the high data and instruction issue rates of the processor, and supports coherency primitives for scaleable multiprocessors. The memory subsystem includes mechanisms for sustaining high data rates not only in block transfer modes, but also in non-unit stride and scattered access patterns.

The Zeus interface subsystem is designed to match industry-standard protocols and pin-outs. In this way, Zeus can make use of existing infrastructure for building low-cost systems. The interface subsystem is modular, and can be replaced with appropriate protocols and pin-outs for lower-cost and higher-performance systems.

The goal of the Zeus architecture is to integrate these processor, memory, and interface capabilities with optimal simplicity and generality. From the software perspective, the entire machine state consists of a program counter, a single bank of 64 general-purpose 128-bit general registers, and a linear byte-addressed shared memory space with mapped interface registers. All interrupts and exceptions are precise, and occur with low overhead.

Examples discussed herein are intended for Zeus software and hardware developers alike, and defines the interface at which their designs must meet. Zeus pursues the most efficient tradeoffs between hardware and software complexity by making all processor, memory, and interface resources directly accessible to high-level language programs.

Common Elements

Notation

The descriptive notation used in this document is summarized in the table below:

| | |
|---|---|
| x + y | two's complement addition of x and y. Result is the same size as the operands, and operands must be of equal size. |
| x − y | two's complement subtraction of y from x. Result is the same size as the operands, and operands must be of equal size. |
| x * y | two's complement multiplication of x and y. Result is the same size as the operands, and operands must be of equal size. |
| x/y | two's complement division of x by y. Result is the same size as the operands, and operands must be of equal size. |
| x & y | bitwise and of x and y. Result is same size as the operands, and operands must be of equal size. |
| $x \mid y$ | bitwise or of x and y. Result is same size as the operands, and operands must be of equal size. |
| x ^ y | bitwise exclusive-OR of x and y. Result is same size as the operands, and operands must be of equal size. |
| ~x | bitwise inversion of x. Result is same size as the operand. |
| x = y | two's complement equality comparison between x and y. Result is a single bit, and operands must be of equal size. |
| x ≠ y | two's complement inequality comparison between x and y. Result is a single bit, and operands must be of equal size. |
| x < y | two's complement less than comparison between x and y. Result is a single bit, and operands must be of equal size. |
| x ≧ y | two's complement greater than or equal comparison between x and y. Result is a single bit, and operands must be of equal size. |
| $\sqrt{x}$ | floating-point square root of x |

-continued

| | |
|---|---|
| x \|\| y | concatenation of bit field x to left of bit field y |
| $x^y$ | binary digit x repeated, concatenated y times. Size of result is y. |
| $x_y$ | extraction of bit y (using little-endian bit numbering) from value x. Result is a single bit. |
| $x_{y\ldots z}$ | extraction of bit field formed from bits y through z of value x. Size of result is y − z + 1; if z > y, result is an empty string, |
| x?y:z | value of y, if x is true, otherwise value of z. Value of x is a single bit. |
| x □ y | bitwise assignment of x to value of y |
| Sn | signed, two's complement, binary data format of n bytes |
| Un | unsigned binary data format of n bytes |
| Fn | floating-point data format of n bytes |

Bit Ordering

The ordering of bits in this document is always little-endian, regardless of the ordering of bytes within larger data structures. Thus, the least-significant bit of a data structure is always labeled 0 (zero), and the most-significant bit is labeled as the data structure size (in bits) minus one.

Memory

Zeus memory is an array of $2^{64}$ bytes, without a specified byte ordering, which is physically distributed among various components.

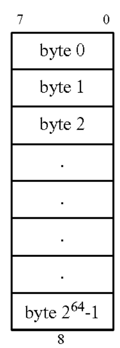

Byte

A byte is a single element of the memory array, consisting of 8 bits:

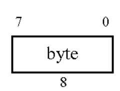

Byte Ordering

Larger data structures are constructed from the concatenation of bytes in either little-endian or big-endian byte ordering. A memory access of a data structure of size s at address i is formed from memory bytes at addresses i through i+s−1. Unless otherwise specified, there is no specific requirement of alignment: it is not generally required that i be a multiple of s. Aligned accesses are preferred whenever possible, however, as they will often require one fewer processor or memory clock cycle than unaligned accesses.

With little-endian byte ordering, the bytes are arranged as:

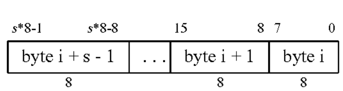

With big-endian byte ordering, the bytes are arranged as:

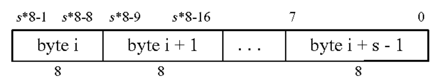

Zeus memory is byte-addressed, using either little-endian or big-endian byte ordering. For consistency with the bit ordering, and for compatibility with x86 processors, Zeus uses little-endian byte ordering when an ordering must be selected. Zeus load and store instructions are available for both little-endian and big-endian byte ordering. The selection of byte ordering is dynamic, so that little-endian and big-endian processes, and even data structures within a process, can be intermixed on the processor.

Memory Read/load Semantics

Zeus memory, including memory-mapped registers, must conform to the following requirements regarding side-effects of read or load operations:

A memory read must have no side-effects on the contents of the addressed memory nor on the contents of any other memory.

Memory Write/store Semantics

Zeus memory, including memory-mapped registers, must conform to the following requirements regarding side-effects of read or load operations:

A memory write must affect the contents of the addressed memory so that a memory read of the addressed memory returns the value written, and so that a memory read of a portion of the addressed memory returns the appropriate portion of the value written.

A memory write may affect or cause side-effects on the contents of memory not addressed by the write operation, however, a second memory write of the same value to the same address must have no side-effects on any memory; memory write operations must be idempotent.

Zeus store instructions that are weakly ordered may have side-effects on the contents of memory not addressed by the store itself; subsequent load instructions which are also weakly ordered may or may not return values which reflect the side-effects.

Data

Zeus provides eight-byte (64-bit) virtual and physical address sizes, and eight-byte (64-bit) and sixteen-byte (128-bit) data path sizes, and uses fixed-length four-byte (32-bit) instructions. Arithmetic is performed on two's-complement or unsigned binary and ANSI/IEEE standard 754-1985 conforming binary floating-point number representations.

Fixed-point Data

Bit

A bit is a primitive data element:

Peck

A peck is the catenation of two bits:

Nibble

A nibble is the catenation of four bits:

Byte

A byte is the catenation of eight bits, and is a single element of the memory array:

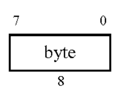

Doublet

A doublet is the catenation of 16 bits, and is the catenation of two bytes:

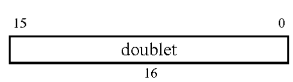

Quadlet

A quadlet is the catenation of 32 bits, and is the catenation of four bytes:

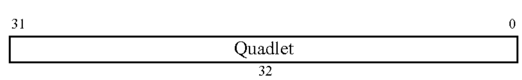

Octlet

An octlet is the catenation of 64 bits, and is the catenation of eight bytes:

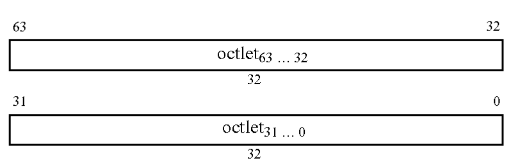

Hexlet

A hexlet is the catenation of 128 bits, and is the catenation of sixteen bytes:

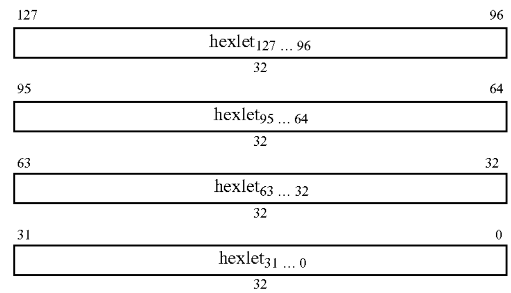

Triclet

A triclet is the catenation of 256 bits, and is the catenation of thirty-two bytes:

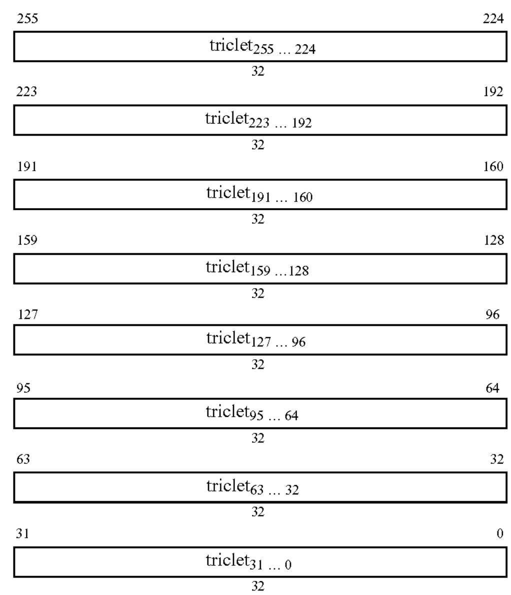

Address

Zeus addresses, both virtual addresses and physical addresses, are octlet quantities.

Floating-point Data

Zeus's floating-point formats are designed to satisfy ANSI/IEEE standard 754-1985: Binary Floating-point Arithmetic. Standard 754 leaves certain aspects to the discretion of implementers: additional precision formats, encoding of quiet and signaling NaN values, details of production and propagation of quiet NaN values. These aspects are detailed below.

Zeus adds additional half-precision and quad-precision formats to standard 754's single-precision and double-precision formats. Zeus's double-precision satisfies standard 754's precision requirements for a single-extended format, and Zeus's quad-precision satisfies standard 754's precision requirements for a double-extended format.

Each precision format employs fields labeled s (sign), e (exponent), and f (fraction) to encode values that are (1) NaN: quiet and signaling, (2) infinities: $(-1)^{\wedge s}\infty$, (3) normalized numbers: $(-1)^{\wedge s}2^{\wedge e-bias}(1.f)$, (4) denormalized numbers: $(-1)^{\wedge s}2^{\wedge 1-bias}(0.f)$, and (5) zero: $(-1)^{\wedge s}0$.

Quiet NaN values are denoted by any sign bit value, an exponent field of all one bits, and a non-zero fraction with the most significant bit set. Quiet NaN values generated by default exception handling of standard operations have a zero sign bit, an exponent field of all one bits, a fraction field with the most significant bit set, and all other bits cleared.

Signaling NaN values are denoted by any sign bit value, an exponent field of all one bits, and a non-zero fraction with the most significant bit cleared.

Infinite values are denoted by any sign bit value, an exponent field of all one bits, and a zero fraction field.

Normalized number values are denoted by any sign bit value, an exponent field that is not all one bits or all zero bits, and any fraction field value. The numeric value encoded is $(-1)^{\wedge s}2^{\wedge e\text{-}bias}(1.f)$. The bias is equal the value resulting from setting all but the most significant bit of the exponent field, half: 15, single: 127, double: 1023, and quad: 16383.

Denormalized number values are denoted by any sign bit value, an exponent field that is all zero bits, and a non-zero fraction field value. The numeric value encoded is $(-1)^{\wedge s}2^{\wedge 1\text{-}bias}(0.f)$.

Zero values are denoted by any sign bit value, and exponent field that is all zero bits, and a fraction field that is all zero bits. The numeric value encoded is $(-1)^{\wedge s}0$. The distinction between +0 and −0 is significant in some operations.

Half-precision Floating-point

Zeus half precision uses a format similar to standard 754's requirements, reduced to a 16-bit overall format. The format contains sufficient precision and exponent range to hold a 12-bit signed integer.

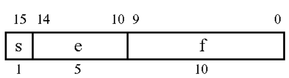

Single-precision Floating-point

Zeus single precision satisfies standard 754's requirements for "single."

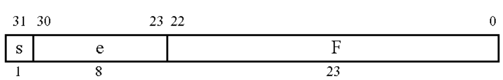

Double-precision Floating-point

Zeus double precision satisfies standard 754's requirements for "double."

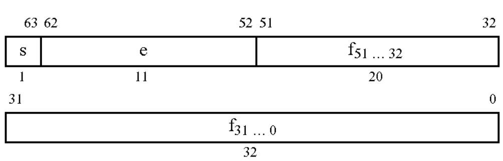

Quad-precision Floating-point

Zeus quad precision satisfies standard 754's requirements for "double extended," but has additional fraction precision to use 128 bits.

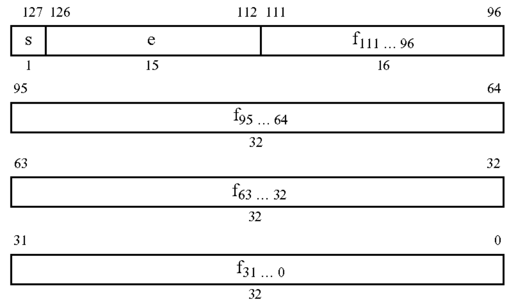

Complex Data

Zeus instructions include operations on pairs of data values that represent complex numerical values of the form (a+b i). When contained in general registers, the paired values are always arranged with the real part (a) in a less-significant location (to the right) and the imaginary part (b i) in a more-significant location (to the left).

When these paired values are contained in memory, a little-endian load or store transfers these values to memory in a form where the real part is at a lower address and the imaginary part is at a higher address. A big-endian load or store transfers these values to memory in a form where the real part is at a higher address and the imaginary part is at a lower address, which is different from the little-endian case and may be considered unusual.

The ordering of real and imaginary parts is usually of no consequence when performing addition or subtraction operations, and in fact, the Zeus instruction set has no special facilities for addition or subtraction of complex data. If the arrangement of real and imaginary parts does not match the desired format in memory, an X.SWIZZLE instruction can swap the positions of the real and imaginary values in a general register for the operands and the results.

A shortcut for a complex multiply operation can be observed: if the position of the real and imaginary parts are reversed in both operands, the result that is computed will have the imaginary part of the result to the left (more significant) and the negative of the real part to the right (less significant). A G.XOR can invert the sign bit (for complex floating-point), or the real part of the result (for complex integer). For the complex integer a G.ADD then transforms the ones-complement to a twos-complement. An X.SWIZZLE instruction can swap the result into the reversed order matching the operand order. The results transformed by the above is then in condition to be written back to memory in the reversed fashion.

Zeus instructions have no direct support for complex values in a polar (r, θ) representation.

Conformance

To ensure that Zeus systems may freely interchange data, user-level programs, system-level programs and interface devices, the Zeus system architecture reaches above the processor level architecture.

Optional Areas

Optional areas include:

Number of processor threads

Size of first-level cache memories

Existence of a second-level cache

Size of second-level cache memory

Size of system-level memory

Existence of certain optional interface device interfaces

Upward-compatible Modifications

Additional devices and interfaces, not covered by this standard may be added in specified regions of the physical memory space, provided that system reset places these devices and interfaces in an inactive state that does not interfere with the operation of software that runs in any conformant system. The software interface requirements of any such additional devices and interfaces must be made as widely available as this architecture specification.

Unrestricted Physical Implementation

Nothing in this specification should be construed to limit the implementation choices of the conforming system beyond the specific requirements stated herein. In particular, a computer system may conform to the Zeus System Architecture while employing any number of components, dissipate any amount of heat, require any special environmental facilities, or be of any physical size.

Zeus Processor

MicroUnity's Zeus processor provides the general-purpose, high-bandwidth computation capability of the Zeus system. Zeus includes high-bandwidth data paths, general register files, and a memory hierarchy. Zeus's memory hierarchy includes on-chip instruction and data memories, instruction and data caches, a virtual memory facility, and interfaces to external devices. Zeus's interfaces in the initial implementation are solely the "Super Socket 7" bus, but other implementations may have different or additional interfaces.

Architectural Framework

The Zeus architecture defines a compatible framework for a family of implementations with a range of capabilities. The following implementation-defined parameters are used in the rest of the document in boldface. The value indicated is for one implementation.

| Parameter | Interpretation | Value | Range of legal values |
|---|---|---|---|
| **T** | number of execution threads | 4 | 1 ≦ **T** ≦ 31 |
| **CE** | $\log_2$ cache blocks in first-level cache | 9 | 0 ≦ **CE** ≦ 31 |
| **CS** | $\log_2$ cache blocks in first-level cache set | 2 | 0 ≦ **CS** ≦ 4 |
| **CT** | existence of dedicated tags in first-level cache | 1 | 0 ≦ **CT** ≦ 1 |
| **LE** | $\log_2$ entries in local TB | 0 | 0 ≦ **LE** ≦ 3 |
| **LB** | Local TB based on base register | 1 | 0 ≦ **LB** ≦ 1 |
| **GE** | $\log_2$ entries in global TB | 7 | 0 ≦ **GE** ≦ 15 |
| **GT** | $\log_2$ threads which share a global TB | 1 | 0 ≦ **GT** ≦ 3 |

Interfaces and Block Diagram

The first implementation of Zeus uses "socket 7" protocols and pinouts.

Instruction

Assembler Syntax

Instructions are specified to Zeus assemblers and other code tools (assemblers) in the syntax of an instruction mnemonic (operation code), then optionally white space (blanks or tabs) followed by a list of operands.

The instruction mnemonics listed in this specification are in upper case (capital) letters, assemblers accept either upper case or lower case letters in the instruction mnemonics. In this specification, instruction mnemonics contain periods (".") to separate elements to make them easier to understand; assemblers ignore periods within instruction mnemonics. The instruction mnemonics are designed to be parsed uniquely without the separating periods.

If the instruction produces a general register result, this operand is listed first. Following this operand, if there are one or more source operands, is a separator which may be a comma (","), equal ("="), or at-sign ("@"). The equal separates the result operand from the source operands, and may optionally be expressed as a comma in assembler code. The at-sign indicates that the result operand is also a source operand, and may optionally be expressed as a comma in assembler code. If the instruction specification has an equal-sign, an at-sign in assembler code indicates that the result operand should be repeated as the first source operand (for example, "A.ADD.I r4@5" is equivalent to "A.ADD.I r4=r4,5"). Commas always separate the remaining source operands.

The result and source operands are case-sensitive; upper case and lower case letters are distinct. General register operands are specified by the names r0 (or r00) through r63 (a lower case "r" immediately followed by a one or two digit number from 0 to 63), or by the special designations of "lp" for "r0," "dp" for "r1," "fp" for "r62," and "sp" for "r63." Integer-valued operands are specified by an optional sign (−) or (+) followed by a number, and assemblers generally accept a variety of integer-valued expressions.

Instruction Structure

A Zeus instruction is specifically defined as a four-byte structure with the little-endian ordering shown below. It is different from the quadlet defined above because the placement of instructions into memory must be independent of the byte ordering used for data structures. Instructions must be aligned on four-byte boundaries; in the diagram below, i must be a multiple of 4.

| 31 … 24 | 23 … 16 | 15 … 8 | 7 … 0 |
|---|---|---|---|
| byte i+3 | byte i+2 | byte i+1 | byte i |
| 8 | 8 | 8 | 8 |

Gateway

A Zeus gateway is specifically defined as an 8-byte structure with the little-endian ordering shown below. A gateway contains a code address used to securely invoke a system call or procedure at a higher privilege level. Gateways are marked by protection information specified in the TB. Gateways must be aligned on 8-byte boundaries; in the diagram below, i must be a multiple of 8.

| 63 … 56 | 55 … 48 | 47 … 40 | 39 … 32 |
|---|---|---|---|
| byte i+7 | byte i+6 | byte i+5 | byte i+4 |
| 8 | 8 | 8 | 8 |

| 31 … 24 | 23 … 16 | 15 … 8 | 7 … 0 |
|---|---|---|---|
| byte i+3 | byte i+2 | byte i+1 | byte i |
| 8 | 8 | 8 | 8 |

The gateway contains two data items within its structure, a code address and a new privilege level:

| 63 … 2 | 1 … 0 |
|---|---|
| code address | pl |
| 62 | 2 |

The virtual memory system can be used to designate a region of memory as containing gateways. Other data may be placed within the gateway region, provided that if an attempt is made to use the additional data as a gateway, that security cannot be violated. For example, 64-bit data or stack pointers which are aligned to at least 4 bytes and are in little-endian byte order have pl=0, so that the privilege level cannot be raised by attempting to use the additional data as a gateway.

User State

The user state consists of hardware data structures that are accessible to all conventional compiled code. The Zeus user state is designed to be as regular as possible, and consists only of the general registers, the program counter, and virtual memory. There are no specialized registers for condition codes, operating modes, rounding modes, integer multiply/divide, or floating-point values.

General Registers

Zeus user state includes 64 general registers. All are identical; there is no dedicated zero-valued general register, and there are no dedicated floating-point general registers.

| 127 … 0 |
|---|
| REG[0] |
| REG[1] |
| REG[2] |
| • |
| • |
| • |
| REG[62] |
| REG[63] |
| 128 |

Some Zeus instructions have 32-bit or 64-bit general register operands. These operands are sign-extended to 128 bits when written to the general register file, and the low-order bits are chosen when read from the general register file.

Definition

```
def val ← RegRead(rn, size)
        val ← REG[rn]size−1..0
enddef
def RegWrite(rn, size, val)
        REG[rn] ← valsize-1128-size || valsize−1..0
enddef
```

Program Counter

The program counter contains the address of the currently executing instruction. This register is implicitly manipulated by branch instructions, and read by branch instructions that save a return address in a general register.

| 63 … 2 | 1 0 |
|---|---|
| ProgramCounter | 0 |
| 62 | 2 |

Privilege Level

The privilege level register contains the privilege level of the currently executing instruction. This register is implicitly manipulated by branch gateway and branch down instructions, and read by branch gateway instructions that save a return address in a general register.

| 1 0 |
|---|
| pl |
| 2 |

Program Counter and Privilege Level

The program counter and privilege level may be packed into a single octlet. This combined data structure is saved by the Branch Gateway instruction and restored by the Branch Down instruction.

| 63 … 2 | 1 0 |
|---|---|
| Program Counter | pl |
| 62 | 2 |

System State

The system state consists of the facilities not normally used by conventional compiled code. These facilities provide mechanisms to execute such code in a fully virtual environment. All system state is memory mapped, so that it can be manipulated by compiled code.

Fixed-point

Zeus provides load and store instructions to move data between memory and the general registers, branch instructions to compare the contents of general registers and to transfer control from one code address to another, and arithmetic operations to perform computation on the contents of general registers, returning the result to general registers.

Load and Store

The load and store instructions move data between memory and the general registers. When loading data from memory into a general register, values are zero-extended or sign-extended to fill the general register. When storing data from a general register into memory, values are truncated on the left to fit the specified memory region.

Load and store instructions that specify a memory region of more than one byte may use either little-endian or big-endian byte ordering: the size and ordering are explicitly specified in the instruction. Regions larger than one byte may be either aligned to addresses that are an even multiple of the size of the region or of unspecified alignment: alignment checking is also explicitly specified in the instruction.

Load and store instructions specify memory addresses as the sum of a base general register and the product of the size of the memory region and either an immediate value or another general register. Scaling maximizes the memory space which can be reached by immediate offsets from a single base general register, and assists in generating memory addresses within iterative loops. Alignment of the address can be reduced to checking the alignment of the first general register.

The load and store instructions are used for fixed-point data as well as floating-point and digital signal processing data; Zeus has a single bank of general registers for all data types.

Swap instructions provide multithread and multiprocessor synchronization, using indivisible operations: add-swap, compare-swap, multiplex-swap, and double-compare-swap. A store-multiplex operation provides the ability to indivisibly write to a portion of an octlet. These instructions always operate on aligned octlet data, using either little-endian or big-endian byte ordering.

Branch

The fixed-point compare-and-branch instructions provide all arithmetic tests for equality and inequality of signed and unsigned fixed-point values. Tests are performed either between two operands contained in general registers, or on the bitwise and of two operands. Depending on the result of the compare, either a branch is taken, or not taken. A taken branch causes an immediate transfer of the program counter to the target of the branch, specified by a 12-bit signed offset from the location of the branch instruction. A non-taken branch causes no transfer; execution continues with the following instruction.

Other branch instructions provide for unconditional transfer of control to addresses too distant to be reached by a 12-bit offset, and to transfer to a target while placing the location following the branch into a general register. The branch through gateway instruction provides a secure means to access code at a higher privilege level, in a form similar to a normal procedure call.

Addressing Operations

A subset of general fixed-point arithmetic operations is available as addressing operations. These include add, subtract, Boolean, and simple shift operations. These addressing operations may be performed at a point in the Zeus processor pipeline so that they may be completed prior to or in conjunction with the execution of load and store operations in a “superspring” pipeline in which other arithmetic operations are deferred until the completion of load and store operations.

Execution Operations

Many of the operations used for Digital Signal Processing (DSP), which are described in greater detail below, are also used for performing simple scalar operations. These operations perform arithmetic operations on values of 8-, 16-, 32-, 64-, or 128-bit sizes, which are right-aligned in general registers. These execution operations include the add, subtract, boolean and simple shift operations which are also available as addressing operations, but further extend the available set to include three-operand add/subtract, three-operand boolean, dynamic shifts, and bit-field operations.

Floating-point

Zeus provides all the facilities mandated and recommended by ANSI/IEEE standard 754-1985: Binary Floating-point Arithmetic, with the use of supporting software.

Branch Conditionally

The floating-point compare-and-branch instructions provide all the comparison types required and suggested by the IEEE floating-point standard. These floating-point comparisons augment the usual types of numeric value comparisons with special handling for NaN (not-a-number) values. A NaN value compares as “unordered” with respect to any other value, even that of an identical NaN value.

Zeus floating-point compare-branch instructions do not generate an exception on comparisons involving quiet or signaling NaN values. If such exceptions are desired, they can be obtained by combining the use of a floating-point compare-set instruction, with either a floating-point compare-branch instruction on the floating-point operands or a fixed-point compare-branch on the set result.

Because the less and greater relations are anti-commutative, one of each relation that differs from another only by the replacement of an L with a G in the code can be removed by reversing the order of the operands and using the other code. Thus, an L relation can be used in place of a G relation by swapping the operands to the compare-branch or compare-set instruction.

No instructions are provided that branch when the values are unordered. To accomplish such an operation, use the reverse condition to branch over an immediately following unconditional branch, or in the case of an if-then-else clause, reverse the clauses and use the reverse condition.

The E relation can be used to determine the unordered condition of a single operand by comparing the operand with itself.

The following floating-point compare-branch relations are provided as instructions:

| Mnemonic | | Branch taken if values compare as: | | | | Exception if | |
|---|---|---|---|---|---|---|---|
| code | C-like | Unordered | Greater | Less | Equal | unordered | invalid |
| E | == | F | F | F | T | no | no |
| LG | < > | F | T | T | F | no | no |
| L | < | F | F | T | F | no | no |
| GE | >= | F | T | F | T | no | no |

Compare-set

The compare-set floating-point instructions provide all the comparison types supported as branch instructions. Zeus compare-set floating-point instructions may optionally generate an exception on comparisons involving quiet or signaling NaNs.

The following floating-point compare-set relations are provided as instructions:

| Mnemonic | | Result if values compare as: | | | | Exception if | |
|---|---|---|---|---|---|---|---|
| code | C-like | Unordered | Greater | Less | Equal | unordered | invalid |
| E | == | F | F | F | T | no | no |
| LG | < > | F | T | T | F | no | no |
| L | < | F | F | T | F | no | no |
| GE | >= | F | T | F | T | no | no |
| E.X | == | F | F | F | T | no | yes |
| LG.X | < > | F | T | T | F | no | yes |
| L.X | < | F | F | T | F | yes | yes |
| GE.X | <= | F | T | F | T | yes | yes |

Arithmetic Operations

The basic operations supported in hardware are floating-point add, subtract, multiply, divide, square root and conversions among floating-point formats and between floating-point and binary integer formats.

Software libraries provide other operations required by the ANSI/IEEE floating-point standard.

The operations explicitly specify the precision of the operation, and round the result (or check that the result is exact) to the specified precision at the conclusion of each operation. Each of the basic operations splits operand general registers into symbols of the specified precision and performs the same operation on corresponding symbols.

In addition to the basic operations, Zeus performs a variety of operations in which one or more products are summed to each other and/or to an additional operand. The instructions include a fused multiply-add (E.MUL.ADD.F), convolve (E.CON.F), matrix multiply (E.MUL.MAT.F), and scale-add (E.SCAL.ADD.F).

The results of these operations are computed as if the multiplies are performed to infinite precision, added as if in infinite precision, then rounded only once. Consequently, these operations perform these operations with no rounding of intermediate results that would have limited the accuracy of the result.

Rounding and Exceptions

Rounding is specified within the instructions explicitly, to avoid explicit state registers for a rounding mode. Similarly, the instructions explicitly specify how standard exceptions (invalid operation, division by zero, overflow, underflow and inexact) are to be handled (U.S. Pat. No. 5,812,439 describes this “Technique of incorporating floating point information into processor instructions.”).

When no rounding is explicitly named by the instruction (default), round to nearest rounding is performed, and all floating-point exception signals cause the standard-specified default result, rather than a trap. When rounding is explicity named by the instruction (N: nearest, Z: zero, F: floor, C: ceiling), the specified rounding is performed, and floating-point exception signals other than inexact cause a floating-point exception trap. When X (exact, or exception) is specified, all floating-point exception signals cause a floating-point exception trap, including inexact.

This technique assists the Zeus processor in executing floating-point operations with greater parallelism. When default rounding and exception handling control is specified in floating-point instructions, Zeus may safely retire instructions following them, as they are guaranteed not to cause data-dependent exceptions. Similarly, floating-point instructions with N, Z, F, or C control can be guaranteed not to cause data-dependent exceptions once the operands have been examined to rule out invalid operations, division by zero, overflow or underflow exceptions. Only floating-point instructions with X control, or when exceptions cannot be ruled out with N, Z, F, or C control need to avoid retiring following instructions until the final result is generated.

ANSI/IEEE standard 754-1985 specifies information to be given to trap handlers for the five floating-point exceptions. The Zeus architecture produces a precise exception, (The program counter points to the instruction that caused the exception and all general register state is present) from which all the required information can be produced in software, as all source operand values and the specified operation are available.

ANSI/IEEE standard 754-1985 specifies a set of five "sticky-exception" bits, for recording the occurrence of exceptions that are handled by default. The Zeus architecture produces a precise exception for instructions with N, Z, F, or C control for invalid operation, division by zero, overflow or underflow exceptions and with X control for all floating-point exceptions, from which software may arrange that corresponding sticky-exception bits can be set. Execution of the same instruction with default control will compute the default result with round-to-nearest rounding. Most compound operations not specified by the standard are not available with rounding and exception controls. These compound operations provide round-to-nearest rounding and default exception handling.

NaN Handling

ANSI/IEEE standard 754-1985 specifies that operations involving a signaling NaN or invalid operation shall, if no trap occurs and if a floating-point result is to be delivered, deliver a quiet NaN as its result. However, it fails to specify what quiet NaN value to deliver.

Zeus operations that produce a floating-point result and do not trap on invalid operations propagate signaling NaN values from operands to results, changing the signaling NaN values to quiet NaN values by setting the most significant fraction bit and leaving the remaining bits unchanged. Other causes of invalid operations produce the default quiet NaN value, where the sign bit is zero, the exponent field is all one bits, the most significant fraction bit is set and the remaining fraction bits are zero bits. For Zeus operations that produce multiple results catenated together, signaling NaN propagation or quiet NaN production is handled separately and independently for each result symbol.

ANSI/IEEE standard 754-1985 specifies that quiet NaN values should be propagated from operand to result by the basic operations. However, it fails to specify which of several quiet NaN values to propagate when more than one operand is a quiet NaN. In addition, the standard does not clearly specify how quiet NaN should be propagated for the multiple-operation instructions provided in Zeus. The standard does not specify the quiet NaN produced as a result of an operand being a signaling NaN when invalid operation exceptions are handled by default. The standard leaves unspecified how quiet and signaling NaN values are propagated though format conversions and the absolute-value, negate and copy operations. This section specifies these aspects left unspecified by the standard.

First of all, for Zeus operations that produce multiple results catenated together, quiet and signaling NaN propagation is handled separately and independently for each result symbol. A quiet or signaling NaN value in a single symbol of an operand causes only those result symbols that are dependent on that operand symbol's value to be propagated as that quiet NaN. Multiple quiet or signaling NaN values in symbols of an operand which influence separate symbols of the result are propagated independently of each other. Any signaling NaN that is propagated has the high-order fraction bit set to convert it to a quiet NaN.

For Zeus operations in which multiple symbols among operands upon which a result symbol is dependent are quiet or signaling NaNs, a priority rule will determine which NaN is propagated. Priority shall be given to the operand that is specified by a general register definition at a lower-numbered (little-endian) bit position within the instruction (rb has priority over rc, which has priority over rd). In the case of operands which are catenated from two general registers, priority shall be assigned based on the general register which has highest priority (lower-numbered bit position within the instruction). In the case of tie (as when the E.SCAL.ADD scaling operand has two corresponding NaN values, or when a E.MUL.CF operand has NaN values for both real and imaginary components of a value), the value which is located at a lower-numbered (little-endian) bit position within the operand is to receive priority. The identification of a NaN as quiet or signaling shall not confer any priority for selection—only the operand position, though a signaling NaN will cause an invalid operand exception.

The sign bit of NaN values propagated shall be complemented if the instruction subtracts or negates the corresponding operand or (but not and) multiplies it by or divides it by or divides it into an operand which has the sign bit set, even if that operand is another NaN. If a NaN is both subtracted and multiplied by a negative value, the sign bit shall be propagated unchanged.

For Zeus operations that convert between two floating-point formats (INFLATE and DEFLATE), NaN values are propagated by preserving the sign and the most-significant fraction bits, except that the most-significant bit of a signalling NaN is set and (for DEFLATE) the least-significant fraction bit preserved is combined, via a logical-or of all fraction bits not preserved. All additional fraction bits (for INFLATE) are set to zero.

For Zeus operations that convert from a floating-point format to a fixed-point format (SINK), NaN values produce zero values (maximum-likelihood estimate). Infinity values produce the largest representable positive or negative fixed-point value that fits in the destination field. When exception traps are enabled, NaN or Infinity values produce a floating-point exception. Underflows do not occur in the SINK operation, they produce −1, 0 or +1, depending on rounding controls.

For absolute-value, negate, or copy operations, NaN values are propagated with the sign bit cleared, complemented, or copied, respectively. Signalling NaN values cause the Invalid operation exception, propagating a quieted NaN in corresponding symbol locations (default) or an exception, as specified by the instruction.

Invalid Operation

ANSI/IEEE standard 754-1985 specifies that invalid operation shall be signaled if an operand is invalid for the operation to be performed. Zeus operations that specify a rounding mode trap on invalid operation. Zeus operations that default the rounding mode (to round to nearest) do not trap on invalid operation and produce a quiet NaN result as described above.

Standard compliant software produces the required result to a trap handler by following the requirements of the standard. Software may simulate untrapped invalid operation for other specified rounding modes by following the requirements of the standard for the result.

Division by Zero

ANSI/IEEE standard 754-1985 specifies that division by zero shall be signaled the divisor is zero and the dividend is a finite non zero number. Zeus operations that specify a rounding mode trap on division by zero. Zeus operations that default the rounding mode (to round to nearest) do not trap on division by zero and produce a signed infinity result.

Standard compliant software produces the required result to a trap handler by following the requirements of the standard. Software may simulate untrapped division by zero for other specified rounding modes by following the requirements of the standard for the result.

Overflow

ANSI/IEEE standard 754-1985 specifies that overflow shall be signaled whenever the destination format's largest finite number is exceeded in magnitude by what would have been the rounded floating-point result were the exponent range unbounded. Zeus operations that specify a rounding mode trap on overflow. Zeus operations that default the rounding mode (to round to nearest) do not trap on overflow and produce a result that carries all overflows to infinity with the sign of the intermediate result.

Standard compliant software produces the required result to a trap handler by following the requirements of the standard. Software may simulate untrapped overflow for other specified rounding modes by following the requirements of the standard for the result. The standard specifies a value with the sign of the intermediate result and specifies the largest finite number when the overflow is in the direction away from rounding or infinity otherwise.

Underflow

ANSI/IEEE standard 754-1985 specifies that underflow is dependent on two correlated events: tininess and loss of accuracy, but allows some latitute in the definition of these conditions. For Zeus operations, tininess is detected "after rounding," that is when a non zero result computed as though the exponent range were unbounded would lie between the smallest normalized number for the format of the result. Zeus hardware does not produce sticky exception bits, so a notion of loss of accuracy does not apply.

Zeus operations that specify a rounding mode trap on underflow, which is to be signaled whenever tininess occurs. Zeus operations that default the rounding mode (to round to nearest) do not trap on underflow and produce a result that is zero or a denormalized number.

Standard compliant software produces the required result to a trap handler by following the requirements of the standard. Software may simulate untrapped underflow sticky exceptions by using the trapping operations and simulating a result, applying whatever definition of loss of accuracy is desired.

Inexact

ANSI/IEEE standard 754-1985 specifies that inexact shall be signaled whenever the rounded result of an operation is not exact or if it overflows without an overflow trap. Zeus operations that specify "exact" rounding trap on inexact. Zeus operations that default the rounding mode (to round to nearest) or specify a rounding mode do not trap on inexact and produce a rounded or overflowed result.

Standard compliant software produces the required result to a trap handler by following the requirements of the standard, delivering a rounded result.

Floating-point Functions

Figure 39B:
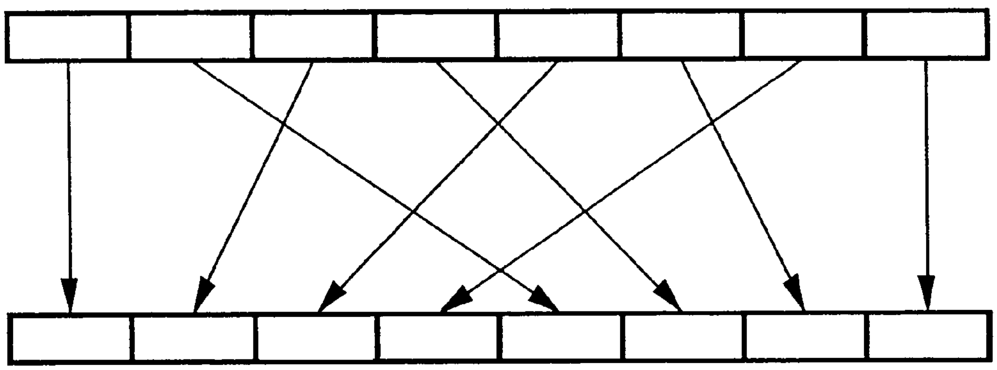

Referring to FIG. 39A, functions are defined for use within the detailed instruction definitions in the following section. In these functions an internal format represents infinite-precision floating-point values as a four-element structure consisting of (1) s (sign bit): 0 for positive, 1 for negative, (2) t (type): NORM, ZERO, SNAN, QNAN, INFINITY, (3) e (exponent), and (4) f: (fraction). The mathematical interpretation of a normal value places the binary point at the units of the fraction, adjusted by the exponent: $(-1)^{\wedge s}*(2^{\wedge e})*f$. The function F converts a packed IEEE floating-point value into internal format. The function PackF converts an internal format back into IEEE floating-point format, with rounding and exception control.

Digital Signal Processing

The Zeus processor provides a set of operations that maintain the fullest possible use of 128-bit data paths when operating on lower-precision fixed-point or floating-point vector values. These operations are useful for several application areas, including digital signal processing, image processing and synthetic graphics. The basic goal of these operations is to accelerate the performance of algorithms that exhibit the following characteristics:

Low-precision Arithmetic

The operands and intermediate results are fixed-point values represented in no greater than 64 bit precision. For floating-point arithmetic, operands and intermediate results are of 16, 32, or 64 bit precision.

The fixed-point arithmetic operations include add, subtract, multiply, divide, shifts, and set on compare.

The use of fixed-point arithmetic permits various forms of operation reordering that are not permitted in floating-point arithmetic. Specifically, commutativity and associativity, and distribution identities can be used to reorder operations. Compilers can evaluate operations to determine what intermediate precision is required to get the specified arithmetic result.

Zeus supports several levels of precision, as well as operations to convert between these different levels. These precision levels are always powers of two, and are explicitly specified in the operation code.

When specified, add, subtract, and shift operations may cause a fixed-point arithmetic exception to occur on resulting conditions such as signed or unsigned overflow. The fixed-point arithmetic exception may also be invoked upon a signed or unsigned comparison.

Sequential Access to Data

The algorithms are or can be expressed as operations on sequentially ordered items in memory. Scatter-gather memory access or sparse-matrix techniques are not required.

Where an index variable is used with a multiplier, such multipliers must be powers of two. When the index is of the form: nx+k, the value of n must be a power of two, and the values referenced should have k include the majority of values in the range 0 . . . n−1. A negative multiplier may also be used.

Vectorizable Operations

The operations performed on these sequentially ordered items are identical and independent. Conditional operations are either rewritten to use Boolean variables or masking, or the compiler is permitted to convert the code into such a form.

Data-handling Operations

The characteristics of these algorithms include sequential access to data, which permit the use of the normal load and store operations to reference the data. Octlet and hexlet loads and stores reference several sequential items of data, the number depending on the operand precision.

The discussion of these operations is independent of byte ordering, though the ordering of bit fields within octlets and hexlets must be consistent with the ordering used for bytes. Specifically, if big-endian byte ordering is used for the loads and stores, the figures below should assume that index values increase from left to right, and for little-endian byte ordering, the index values increase from right to left. For this reason, the figures indicate different index values with different shades, rather than numbering.

When an index of the nx+k form is used in array operands, where n is a power of 2, data memory sequentially loaded contains elements useful for separate operands. The "shuffle" instruction divides a triclet of data up into two hexlets, with alternate bit fields of the source triclet grouped together into the two results. An immediate field, h, in the instruction specifies which of the two regrouped hexlets to select for the result. For example, two X.SHUFFLE.PAIR rd=rc,rb,32, 128,h operations rearrange the source triclet (c,b) into two hexlets as in FIG. 39B.

In the shuffle operation, two hexlet general registers specify the source triclet, and one of the two result hexlets are specified as hexlet general register.

Figure 39C:
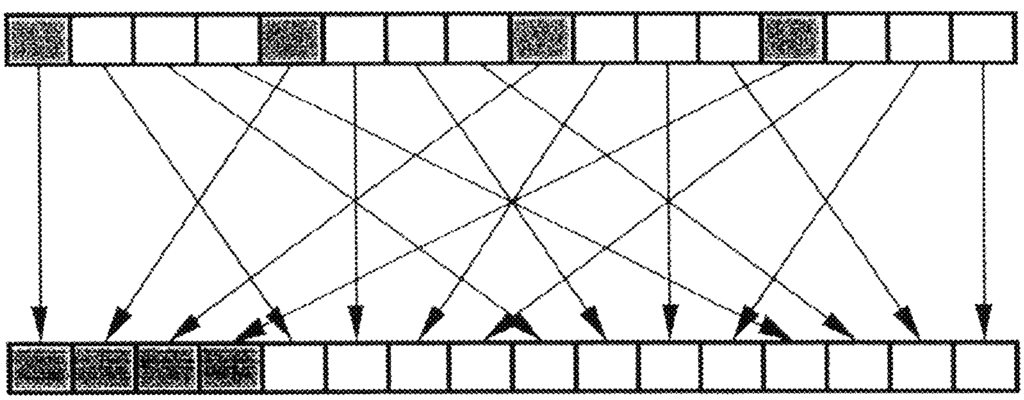

The example above directly applies to the case where n is 2. When n is larger, shuffle operations can be used to further subdivide the sequential stream. For example, when n is 4, we need to deal out 4 sets of doublet operands, as shown in FIG. 39C. (An example of the use of a four-way deal is a digital signal processing application such as conversion of color to monochrome.)

Figure 39D:
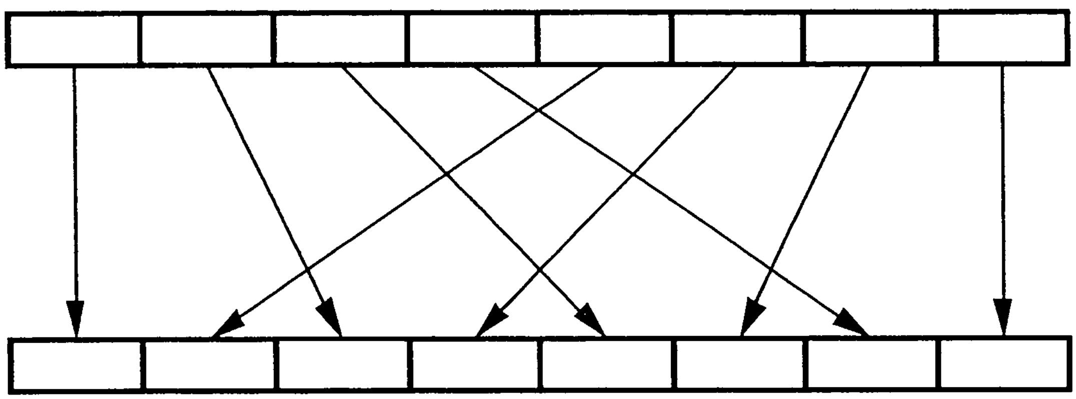

When an array result of computation is accessed with an index of the form nx+k, for n a power of 2, the reverse of the "deal" operation needs to be performed on vectors of results to interleave them for storage in sequential order. The "shuffle" operation interleaves the bit fields of two octlets of results into a single hexlet. For example a X.SHUFFLE.16 operation combines two octlets of doublet fields into a hexlet as in FIG. 39D.

Figure 39E:
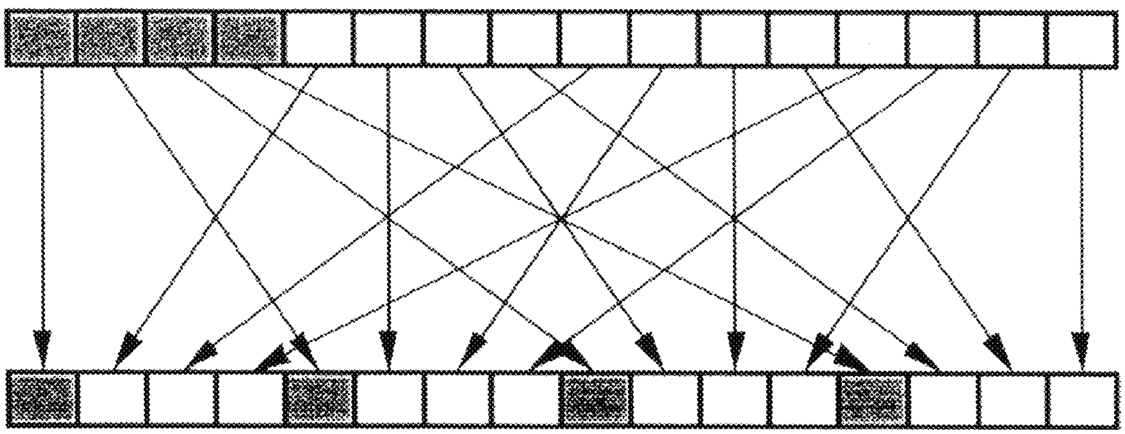

For larger values of n, a series of shuffle operations can be used to combine additional sets of fields, similarly to the mechanism used for the deal operations. For example, when n is 4, we need to shuffle up 4 sets of doublet operands, as shown in FIG. 39E. (An example of a four-way shuffle is a digital signal processing application such as conversion of monochrome to color.)

Figure 39F:
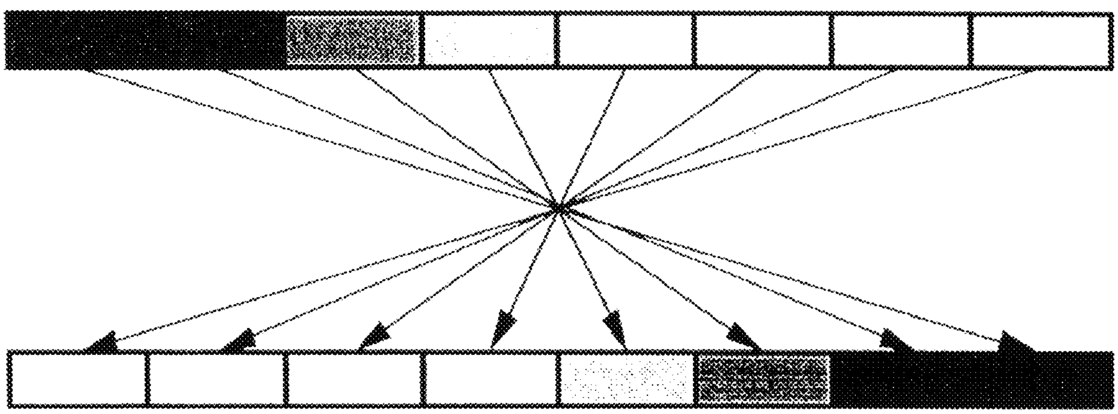

When the index of a source array operand or a destination array result is negated, or in other words, if of the form nx+k where n is negative, the elements of the array must be arranged in reverse order. The "swizzle" operation can reverse the order of the bit fields in a hexlet. For example, a X.SWIZZLE rd=rc,127,112 operation reverses the doublets within a hexlet as shown in FIG. 39F.

In some cases, it is desirable to use a group instruction in which one or more operands is a single value, not an array. The "swizzle" operation can also copy operands to multiple locations within a hexlet. For example, a X.SWIZZLE 15,0 operation copies the low-order 16 bits to each double within a hexlet.

Variations of the deal and shuffle operations are also useful for converting from one precision to another. This may be required if one operand is represented in a different precision than another operand or the result, or if computation must be performed with intermediate precision greater than that of the operands, such as when using an integer multiply.

Figure 39G:
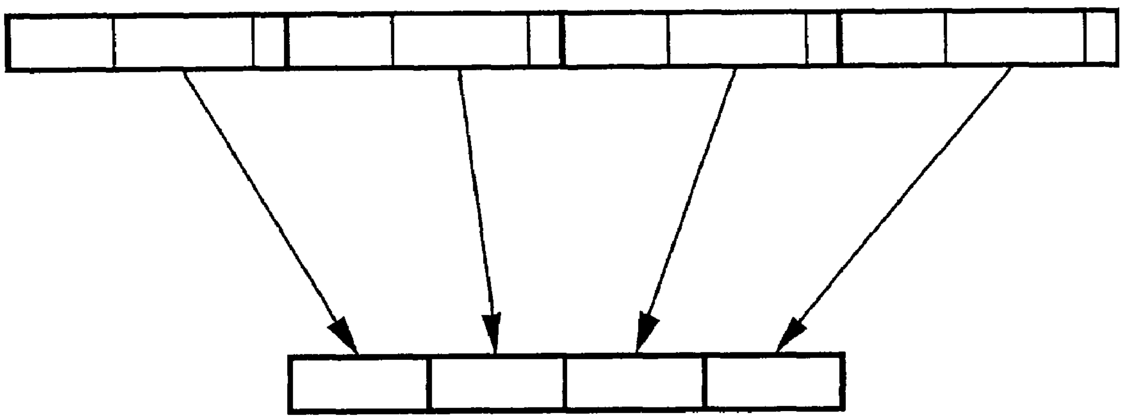

When converting from a higher precision to a lower precision, specifically when halving the precision of a hexlet of bit fields, half of the data must be discarded, and the bit fields packed together. The "compress" operation is a variant of the "deal" operation, in which the operand is a hexlet, and the result is an octlet. An arbitrary half-sized sub-field of each bit field can be selected to appear in the result. For example, a selection of bits 19 . . . 4 of each quadlet in a hexlet is performed by the X.COMPRESS rd=rc,16,4 operation as shown in FIG. 39G.

When converting from lower-precision to higher-precision, specifically when doubling the precision of an octlet of bit fields, one of several techniques can be used, either multiply, expand, or shuffle. Each has certain useful properties. In the discussion below, m is the precision of the source operand.

The multiply operation, described in detail below, automatically doubles the precision of the result, so multiplication by a constant vector will simultaneously double the precision of the operand and multiply by a constant that can be represented in m bits.

Figure 39H:
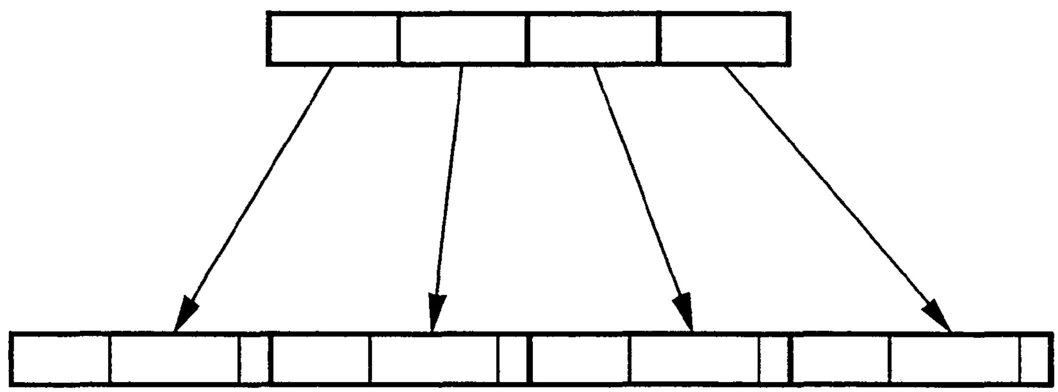

An operand can be doubled in precision and shifted left with the "expand" operation, which is essentially the reverse of the "compress" operation. For example the X.EXPAND rd=rc,16,4 expands from 16 bits to 32, and shifts 4 bits left as shown in FIG. 39H The "shuffle" operation can double the precision of an operand and multiply it by 1 (unsigned only), $2^m$ or $2^m+1$, by specifying the sources of the shuffle operation to be a zeroed general register and the source operand, the source operand and zero, or both to be the source operand. When multiplying by 2m, a constant can be freely added to the source operand by specifying the constant as the right operand to the shuffle.

Arithmetic Operations

The characteristics of the algorithms that affect the arithmetic operations most directly are low-precision arithmetic, and vectorizable operations. The fixed-point arithmetic operations provided are most of the functions provided in the standard integer unit, except for those that check conditions. These functions include add, subtract, bitwise Boolean operations, shift, set on condition, and multiply, in forms that take packed sets of bit fields of a specified size as operands. The floating-point arithmetic operations provided are as complete as the scalar floating-point arithmetic set. The result is generally a packed set of bit fields of the same size as the operands, except that the fixed-point multiply function intrinsically doubles the precision of the bit field.

Conditional operations are provided only in the sense that the set on condition operations can be used to construct bit masks that can select between alternate vector expressions, using the bitwise Boolean operations. All instructions operate over the entire octlet or hexlet operands, and produce a hexlet result. The sizes of the bit fields supported are always powers of two.

Galois Field Operations

Zeus provides a general software solution to the most common operations required for Galois Field arithmetic. The instructions provided include a polynomial multiply, with the polynomial specified as one general register operand. This instruction can be used to perform CRC generation and checking, Reed-Solomon code generation and checking, and spread-spectrum encoding and decoding.

Software Conventions

The following section describes software conventions that are to be employed at software module boundaries, in order to permit the combination of separately compiled code and to provide standard interfaces between application, library and system software. General register usage and procedure call conventions may be modified, simplified or optimized when a single compilation encloses procedures within a compilation unit so that the procedures have no external interfaces. For example, internal procedures may permit a greater number of general register-passed parameters, or have general registers allocated to avoid the need to save general registers at procedure boundaries, or may use a single stack or data pointer allocation to suffice for more than one level of procedure call.

General Register Usage

All Zeus general registers are identical and general-purpose; there is no dedicated zero-valued general register, and there are no dedicated floating-point general registers. However, some procedure-call-oriented instructions imply usage of general registers zero (0) and one (1) in a manner consistent with the conventions described below. By software convention, the non-specific general registers are used in more specific ways.

| general register number | assembler names | usage | how saved |
|---|---|---|---|
| 0 | lp, r0 | link pointer | caller |
| 1 | dp, r1 | data pointer | caller |
| 2-9 | r2-r9 | parameters | caller |
| 10-31 | r10-r31 | temporary | caller |
| 32-61 | r32-r61 | saved | callee |
| 62 | fp, r62 | frame pointer | callee |
| 63 | sp, r63 | stack pointer | callee |

At a procedure call boundary, general registers are saved either by the caller or callee procedure, which provides a mechanism for leaf procedures to avoid needing to save general registers. Compilers may choose to allocate variables into caller or callee saved general registers depending on how their lifetimes overlap with procedure calls.

Procedure Calling Conventions

Procedure parameters are normally allocated in general registers, starting from general register 2 up to general register 9. These general registers hold up to 8 parameters, which may each be of any size from one byte to sixteen bytes (hexlet), including floating-point and small structure parameters. Additional parameters are passed in memory, allocated on the stack. For C procedures which use varargs.h or stdarg.h and pass parameters to further procedures, the compilers must leave room in the stack memory allocation to save general registers 2 through 9 into memory contiguously with the additional stack memory parameters, so that procedures such as _doprnt can refer to the parameters as an array.

Procedure return values are also allocated in general registers, starting from general register 2 up to general register 9. Larger values are passed in memory, allocated on the stack.

There are several pointers maintained in general registers for the procedure calling conventions: lp, sp, dp, fp.

The lp general register contains the address to which the callee should return to at the conclusion of the procedure. If the procedure is also a caller, the lp general register will need to be saved on the stack, once, before any procedure call, and restored, once, after all procedure calls. The procedure returns with a branch instruction, specifying the lp general register.

The sp general register is used to form addresses to save parameter and other general registers, maintain local variables, i.e., data that is allocated as a LIFO stack. For procedures that require a stack, normally a single allocation is performed, which allocates space for input parameters, local variables, saved general registers, and output parameters all at once. The sp general register is always hexlet aligned.

The dp general register is used to address pointers, literals and static variables for the procedure. The dp general register points to a small (approximately 4096-entry) array of pointers, literals, and statically-allocated variables, which is used locally to the procedure. The uses of the dp general register are similar to the use of the gp general register on a Mips R-series processor, except that each procedure may have a different value, which expands the space addressable by small offsets from this pointer. This is an important distinction, as the offset field of Zeus load and store instructions are only 12 bits. The compiler may use additional general registers and/or indirect pointers to address larger regions for a single procedure. The compiler may also share a single dp general register value between procedures which are compiled as a single unit (including procedures which are externally callable), eliminating the need to save, modify and restore the dp general register for calls between procedures which share the same dp general register value.

Figure 39I:
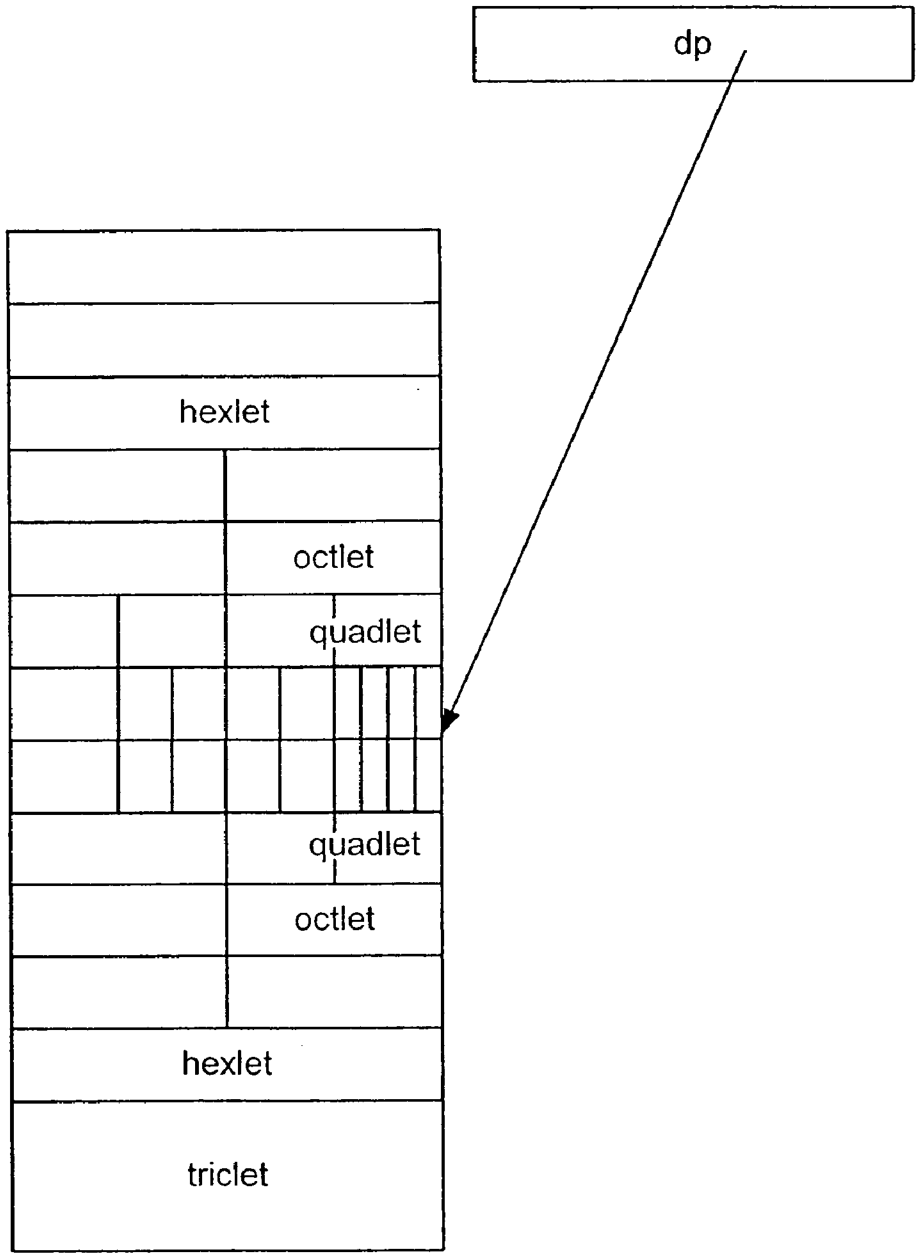

Load- and store-immediate-aligned instructions, specifying the dp general register as the base general register, are generally used to obtain values from the dp region. These instructions shift the immediate value by the logarithm of the size of the operand, so loads and stores of large operands may reach farther from the dp general register than of small operands. Referring to FIG. 39I, the size of the addressable region is maximized if the elements to be placed in the dp region are sorted according to size, with the smallest elements placed closest to the dp base. At points where the size changes, appropriate padding is added to keep elements aligned to memory boundaries matching the size of the elements. Using this technique, the maximum size of the dp region is always at least 4096 items, and may be larger when the dp area is composed of a mixture of data sizes.

The dp general register mechanism also permits code to be shared, with each static instance of the dp region assigned to a different address in memory. In conjunction with position-independent or pc-relative branches, this allows library code to be dynamically relocated and shared between processes.

To implement an inter-module (separately compiled) procedure call, the lp general register is loaded with the entry point of the procedure, and the dp general register is loaded with the value of the dp general register required for the procedure. These two values are located adjacent to each other as a pair of octlet quantities in the dp region for the calling procedure. For a statically-linked inter-module procedure call, the linker fills in the values at link time. However, this mechanism also provides for dynamic linking, by initially filling in the lp and dp fields in the data structure to invoke the dynamic linker. The dynamic linker can use the contents of the lp and/or dp general registers to determine the identity of the caller and callee, to find the location to fill in the pointers and resume execution. Specifically, the lp value is initially set to point to an entry point in the dynamic linker, and the dp value is set to point to itself: the location of the lp and dp values in the dp region of the calling procedure. The identity of the procedure can be discovered from a string following the dp pointer, or a separate table, indexed by the dp pointer.

The fp general register is used to address the stack frame when the stack size varies during execution of a procedure, such as when using the GNU C alloca function. When the stack size can be determined at compile time, the sp general register is used to address the stack frame and the fp general register may be used for any other general purpose as a callee-saved general register.

Typical Static-linked, Intra-module Calling Sequence:

```
caller (non-leaf):
caller:  A.ADDI    sp@-size    // allocate caller stack frame
         S.I.64.A  lp,sp,off   // save original lp general register
         . . . (callee using same dp as caller)
         B.LINK.I  callee
         . . .
         . . . (callee using same dp as caller)
         B.LINK.I  callee
         . . .
         L.I.64.A  lp=sp,off   // restore original lp general register
         A.ADDI    sp@size     // deallocate caller stack frame
         B         lp          // return
callee (leaf):
callee:  . . . (code using dp)
         B         lp          // return
```

Procedures that are compiled together may share a common data region, in which case there is no need to save, load, and restore the dp region in the callee, assuming that the callee does not modify the dp general register. The pc-relative addressing of the B.LINK.I instruction permits the code region to be position-independent.

Minimum Static-linked, Intra-module Calling Sequence:

```
caller (non-leaf):
caller:  A.COPY    r31=lp      // save original lp general register
         . . . (callee using same dp as caller)
         B.LINK.I  callee
         . . .
         . . . (callee using same dp as caller)
         B.LINK.I  callee
         . . .
         B         r31         // return
callee (leaf):
callee:  . . . (code using dp, r31 unused)
         B         lp          // return
```

When all the callee procedures are intra-module, the stack frame may also be eliminated from the caller procedure by using "temporary" caller save general registers not utilized by the callee leaf procedures. In addition to the lp value indicated above, this usage may include other values and variables that live in the caller procedure across callee procedure calls.

Typical Dynamic-linked, Inter-module Calling Sequence:

```
caller (non-leaf):
caller:  A.ADDI    sp@-size    // allocate caller stack frame
         S.I.64.A  lp,sp,off   // save original lp general
                               register
         S.I.64.A  dp,sp,off   // save original dp general
                               register
         . . . (code using dp)
         L.I.64.A  lp=dp.off   // load lp
         L.I.64.A  dp=dp,off   // load dp
         B.LINK    lp=lp       // invoke callee procedure
```

-continued

```
         L.I.64.A  dp=sp,off   // restore dp general register
                               from stack
         . . . (code using dp)
         L.I.64.A  lp=sp,off   // restore original lp general
                               register
         A.ADDI    sp=size     // deallocate caller stack
                               frame
         B         lp          // return
callee (leaf):
callee:  . . . (code using dp)
         B         lp          // return
```

The load instruction is required in the caller following the procedure call to restore the dp general register. A second load instruction also restores the lp general register, which may be located at any point between the last procedure call and the branch instruction which returns from the procedure.

System and Privileged Library Calls

It is an objective to make calls to system facilities and privileged libraries as similar as possible to normal procedure calls as described above. Rather than invoke system calls as an exception, which involves significant latency and complication, we prefer to use a modified procedure call in which the process privilege level is quietly raised to the required level. To provide this mechanism safely, interaction with the virtual memory system is required.

Such a procedure must not be entered from anywhere other than its legitimate entry point, to prohibit entering a procedure after the point at which security checks are performed or with invalid general register contents, otherwise the access to a higher privilege level can lead to a security violation. In addition, the procedure generally must have access to memory data, for which addresses must be produced by the privileged code. To facilitate generating these addresses, the branch-gateway instruction allows the privileged code procedure to rely the fact that a single general register has been verified to contain a pointer to a valid memory region.

The branch-gateway instruction ensures both that the procedure is invoked at a proper entry point, and that other general registers such as the data pointer and stack pointer can be properly set. To ensure this, the branch-gateway instruction retrieves a "gateway" directly from the protected virtual memory space. The gateway contains the virtual address of the entry point of the procedure and the target privilege level. A gateway can only exist in regions of the virtual address space designated to contain them, and can only be used to access privilege levels at or below the privilege level at which the memory region can be written to ensure that a gateway cannot be forged.

The branch-gateway instruction ensures that general register 1 (dp) contains a valid pointer to the gateway for this target code address by comparing the contents of general register 0 (lp) against the gateway retrieved from memory and causing an exception trap if they do not match. By ensuring that general register 1 points to the gateway, auxiliary information, such as the data pointer and stack pointer can be set by loading values located by the contents of general register 1. For example, the eight bytes following the gateway may be used as a pointer to a data region for the procedure.

Figure 39J:
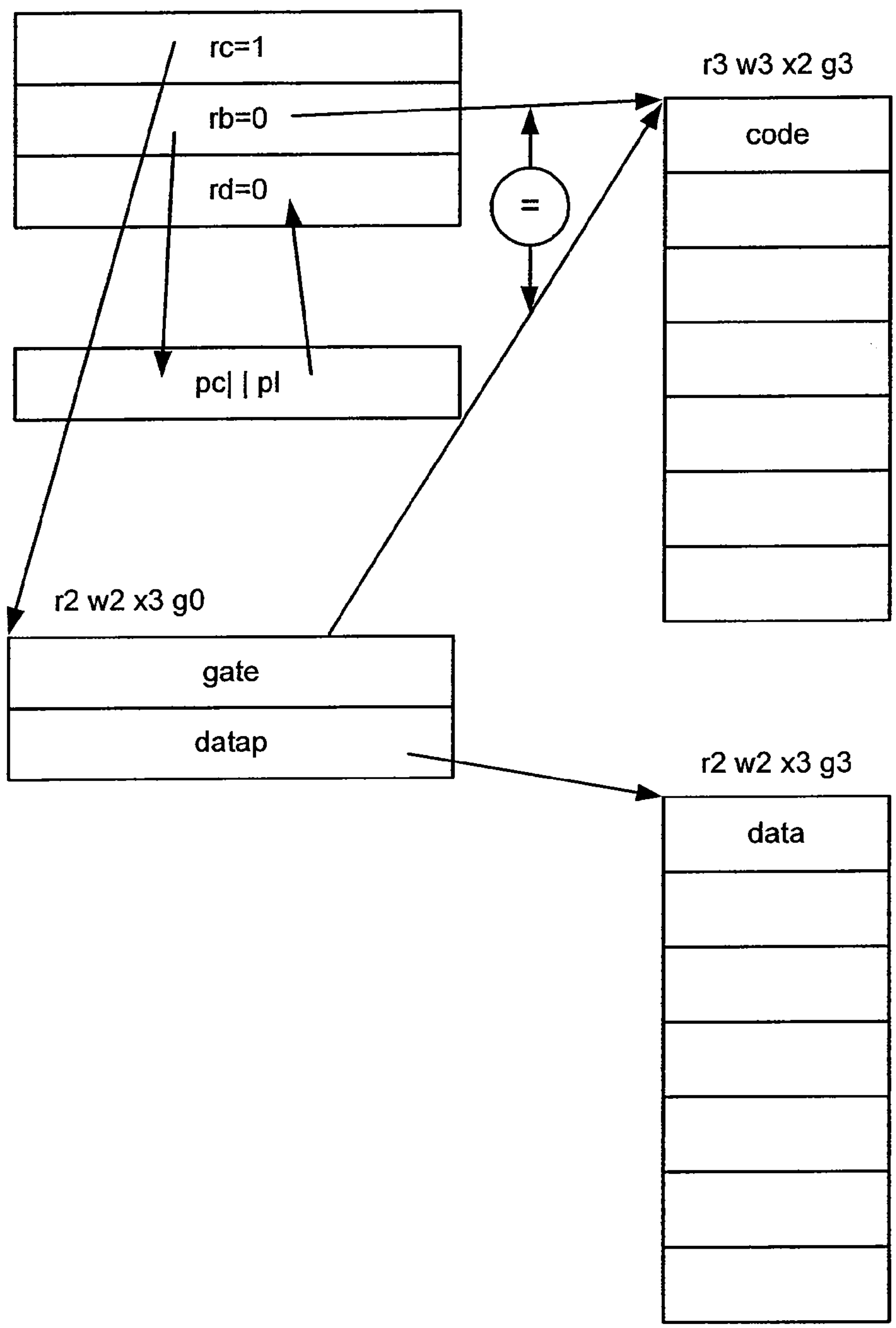

Referring to FIG. 39J before executing the branch-gateway instruction, general register 1 must be set to point at the gateway, and general register 0 must be set to the address of the target code address plus the desired privilege level. A "L.I.64.L.A r0=r1,0" instruction is one way to set general register 0, if general register 1 has already been set, but any means of getting the correct value into general register 0 is permissible.

Similarly, a return from a system or privileged routine involves a reduction of privilege. This need not be carefully controlled by architectural facilities, so a procedure may freely branch to a less-privileged code address. Normally, such a procedure restores the stack frame, then uses the branch-down instruction to return.

Typical Dynamic-linked, Inter-gateway Calling Sequence:

| | | | |
|---|---|---|---|
| caller: | | | |
| caller: | A.ADDI | sp@-size | // allocate caller stack frame |
| | S.I.64.A | lp,sp,off | |
| | S.I.64.A | dp,sp,off | |
| | . . . | | |
| | L.I.64.A | lp=dp.off | // load lp |
| | L.I.64.A | dp=dp,off | // load dp |
| | B.GATE | | |
| | L.I.64.A | dp,sp,off | |
| | . . . (code using dp) | | |
| | L.I.64.A | lp=sp,off | // restore original lp general register |
| | A.ADDI | sp=size | // deallocate caller stack frame |
| | B | lp | // return |
| callee (non-leaf): | | | |
| calee: | L.I.64.A | dp=dp,off | // load dp with data pointer |
| | S.I.64.A | sp,dp,off | |
| | L.I.64.A | sp=dp,off | // new stack pointer |
| | S.I.64.A | lp,sp,off | |
| | S.I.64.A | dp,sp,off | |
| | . . . (using dp) | | |
| | L.I.64.A | dp,sp,off | |
| | . . . (code using dp) | | |
| | L.I.64.A | lp=sp,off | // restore original lp general register |
| | L.I.64.A | sp=sp,off | // restore original sp general register |
| | B.DOWN | lp | |
| callee (leaf, no stack): | | | |
| callee: | . . . (using dp) | | |
| | B.DOWN | lp | |

It can be observed that the calling sequence is identical to that of the inter-module calling sequence shown above, except for the use of the B.GATE instruction instead of a B.LINK instruction. Indeed, if a B.GATE instruction is used when the privilege level in the lp general register is not higher than the current privilege level, the B.GATE instruction performs an identical function to a B.LINK.

The callee, if it uses a stack for local variable allocation, cannot necessarily trust the value of the sp passed to it, as it can be forged. Similarly, any pointers which the callee provides should not be used directly unless it they are verified to point to regions which the callee should be permitted to address. This can be avoided by defining application programming interfaces (APIs) in which all values are passed and returned in general registers, or by using a trusted, intermediate privilege wrapper routine to pass and return parameters. The method described below can also be used.

It can be useful to have highly privileged code call less-privileged routines. For example, a user may request that errors in a privileged routine be reported by invoking a user-supplied error-logging routine. To invoke the procedure, the privilege can be reduced via the branch-down instruction. The return from the procedure actually requires an increase in privilege, which must be carefully controlled. This is dealt with by placing the procedure call within a lower-privilege procedure wrapper, which uses the branch-gateway instruction to return to the higher privilege region after the call through a secure re-entry point. Special care must be taken to ensure that the less-privileged routine is not permitted to gain unauthorized access by corruption of the stack or saved general registers, such as by saving all general registers and setting up a new stack frame (or restoring the original lower-privilege stack) that may be manipulated by the less-privileged routine. Finally, such a technique is vulnerable to an unprivileged routine attempting to use the re-entry point directly, so it may be appropriate to keep a privileged state variable which controls permission to enter at the re-entry point.

Processor Layout

Referring first to FIG. 1, a general purpose processor is illustrated therein in block diagram form. The general purpose processor operates under control of a stored computer program. In FIG. 1, four copies of an access unit are shown, each with an access instruction fetch queue A-Queue 101-104. Each access instruction fetch queue A-Queue 101-104 is coupled to an access register file AR 105-08, which are each coupled to two access functional units A 109-116. In a typical embodiment, each thread of the processor may have on the order of sixty-four general purpose registers (e.g., the AR's 105-108 and ER's 125-128). The access units function independently for four simultaneous threads of execution, and each compute program control flow by performing arithmetic and branch instructions and access memory by performing load and store instructions. These access units also provide wide operand specifiers for wide operand instructions. These eight access functional units A 109-116 produce results for access register files AR 105-108 and memory addresses to a shared memory system 117-120.

In one embodiment, the memory hierarchy includes on-chip instruction and data memories, instruction and data caches, a virtual memory facility, and interfaces to external devices. In FIG. 1, the memory system is comprised of a combined cache and niche memory 117, an external bus interface 118, and, externally to the device, a secondary cache 119 and main memory system with I/O devices 120. The memory contents fetched from memory system 117-120 are combined with execute instructions not performed by the access unit, and entered into the four execute instruction queues E-Queue 121-124. For wide instructions, memory contents fetched from memory system 117-120 are also provided to wide operand microcaches 132-136 by bus 137. Instructions and memory data from E-queue 121-124 are presented to execution register files 125-128, which fetch execution register file source operands. The instructions are coupled to the execution unit arbitration unit Arbitration 131, that selects which instructions from the four threads are to be routed to the available execution functional units E 141 and 149, X 142 and 148, G 143-144 and 146-147, and T 145. The execution functional units E 141 and 149, the execution functional units X 142 and 148, and the execution functional unit T 145 each contain a wide operand microcache 132-136, which are each coupled to the memory system 117 by bus 137.

The execution functional units G 143-144 and 146-147 are group arithmetic and logical units that perform simple arithmetic and logical instructions, including group operations wherein the source and result operands represent a group of values of a specified symbol size, which are partitioned and operated on separately, with results catenated together. In a presently preferred embodiment the data path is 128 bits wide, although the present invention is not intended to be limited to any specific size of data path.

The execution functional units X 142 and 148 are crossbar switch units that perform crossbar switch instructions. The crossbar switch units 142 and 148 perform data handling operations on the data stream provided over the data path source operand buses 151-158, including deals, shuffles, shifts, expands, compresses, swizzles, permutes and reverses, plus the wide operations discussed hereinafter. In a key element of a first aspect of the invention, at least one such operation will be expanded to a width greater than the general register and data path width.

The execution functional units E 141 and 149 are ensemble units that perform ensemble instructions using a large array multiplier, including group or vector multiply and matrix multiply of operands partitioned from data path source operand buses 151-158 and treated as integer, floating point, polynomial or Galois field values. Matrix multiply instructions and other operations utilize a wide operand loaded into the wide operand microcache 132 and 136.

The execution functional unit T 145 is a translate unit that performs table-look-up operations on a group of operands partitioned from a register operand, and catenates the result. The Wide Translate instruction utilizes a wide operand loaded into the wide operand microcache 134.

The execution functional units E 141, 149, execution functional units X—142, 148, and execution functional unit T each contain dedicated storage to permit storage of source operands including wide operands as discussed hereinafter. The dedicated storage 132-136, which may be thought of as a wide microcache, typically has a width which is a multiple of the width of the data path operands related to the data path source operand buses 151-158. Thus, if the width of the data path 151-158 is 128 bits, the dedicated storage 132-136 may have a width of 256, 512, 1024 or 2048 bits. Operands which utilize the full width of the dedicated storage are referred to herein as wide operands, although it is not necessary in all instances that a wide operand use the entirety of the width of the dedicated storage; it is sufficient that the wide operand use a portion greater than the width of the memory data path of the output of the memory system 117-120 and the functional unit data path of the input of the execution functional units 141-149, though not necessarily greater than the width of the two combined. Because the width of the dedicated storage 132-136 is greater than the width of the memory operand bus 137, portions of wide operands are loaded sequentially into the dedicated storage 132-136. However, once loaded, the wide operands may then be used at substantially the same time. It can be seen that functional units 141-149 and associated execution registers 125-128 form a data functional unit, the exact elements of which may vary with implementation.

The execution register file ER 125-128 source operands are coupled to the execution units 141-145 using source operand buses 151-154 and to the execution units 145-149 using source operand buses 155-158. The function unit result operands from execution units 141-145 are coupled to the execution register file ER 125-128 using result bus 161 and the function units result operands from execution units 145-149 are coupled to the execution register file using result bus 162.

Wide Multiply Matrix

Figure 2:
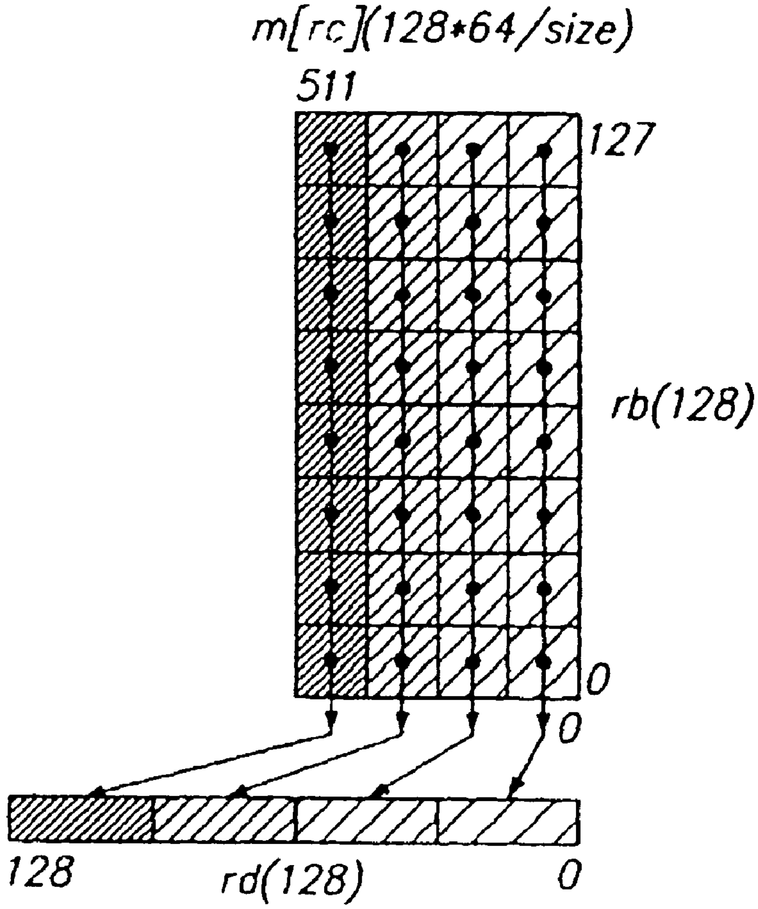
FIG. 2 is a matrix representation of a wide matrix multiply in accordance with an exemplary embodiment of the present invention.
Figure 3:
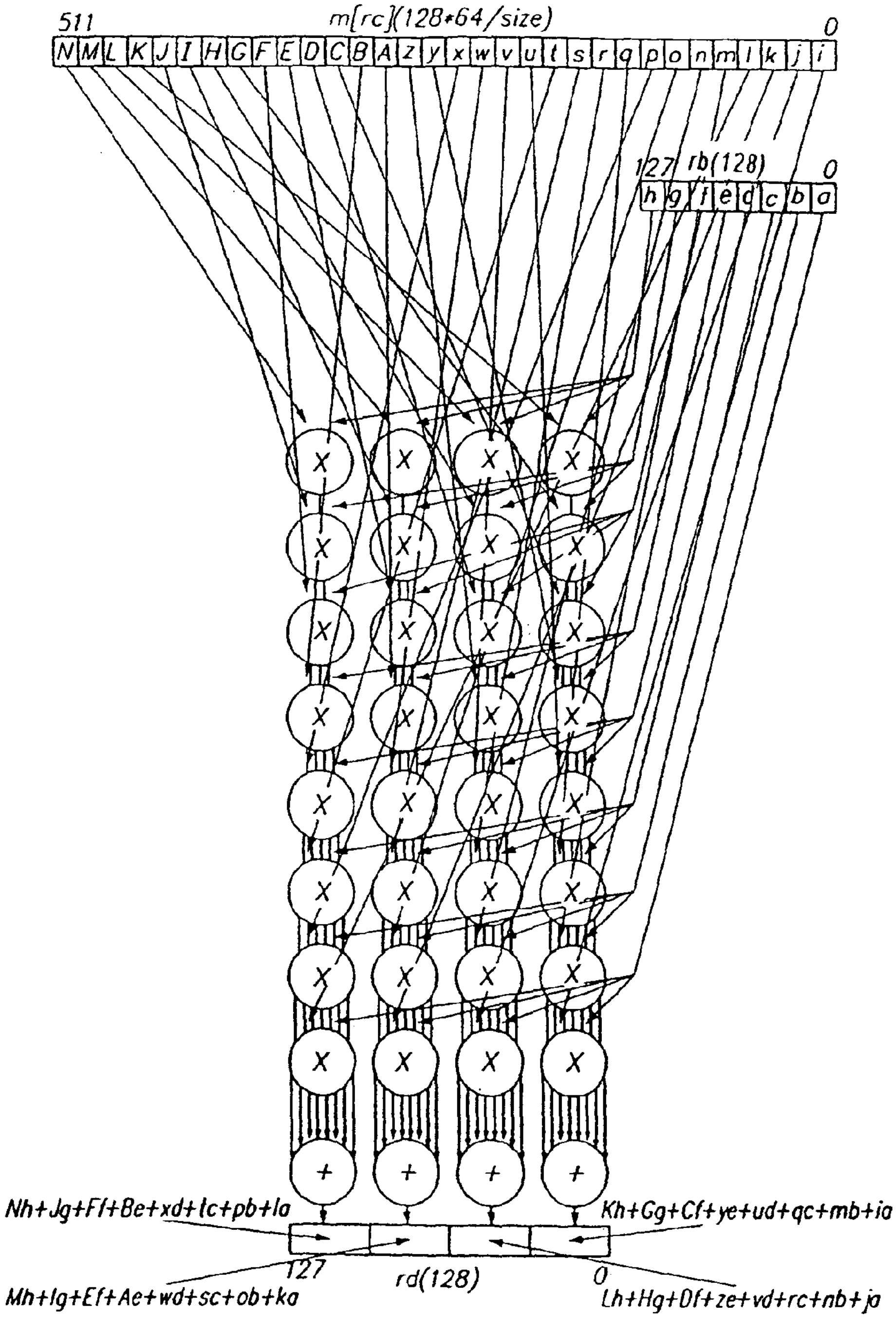
FIG. 3 is a further representation of a wide matrix multiple in accordance with an exemplary embodiment of the present invention.

The wide operands of the present invention provide the ability to execute complex instructions such as the wide multiply matrix instruction shown in FIG. 2, which can be appreciated in an alternative form, as well, from FIG. 3. As can be appreciated from FIGS. 2 and 3, a wide operand permits, for example, the matrix multiplication of various sizes and shapes which exceed the data path width. The example of FIG. 2 involves a matrix specified by register rc having 128*64/size bits (512 bits for this example) multiplied by a vector contained in register rb having 128 bits, to yield a result, placed in register rd, of 128 bits.

The notation used in FIG. 2 and following similar figures illustrates a multiplication as a shaded area at the intersection of two operands projected in the horizontal and vertical dimensions. A summing node is illustrated as a line segment connecting a darkened dots at the location of multiplier products that are summed. Products that are subtracted at the summing node are indicated with a minus symbol within the shaded area.

When the instruction operates on floating-point values, the multiplications and summations illustrated are floating point multiplications and summations. An exemplary embodiment may perform these operations without rounding the intermediate results, thus computing the final result as if computed to infinite precision and then rounded only once.

It can be appreciated that an exemplary embodiment of the multipliers may compute the product in carry-save form and may encode the multiplier rb using Booth encoding to minimize circuit area and delay. It can be appreciated that an exemplary embodiment of such summing nodes may perform the summation of the products in any order, with particular attention to minimizing computation delay, such as by performing the additions in a binary or higher-radix tree, and may use carry-save adders to perform the addition to minimize the summation delay. It can also be appreciated that an exemplary embodiment may perform the summation using sufficient intermediate precision that no fixed-point or floating-point overflows occur on intermediate results.

A comparison of FIGS. 2 and 3 can be used to clarify the relation between the notation used in FIG. 2 and the more conventional schematic notation in FIG. 3, as the same operation is illustrated in these two figures.

Wide Operand

Figure 5:
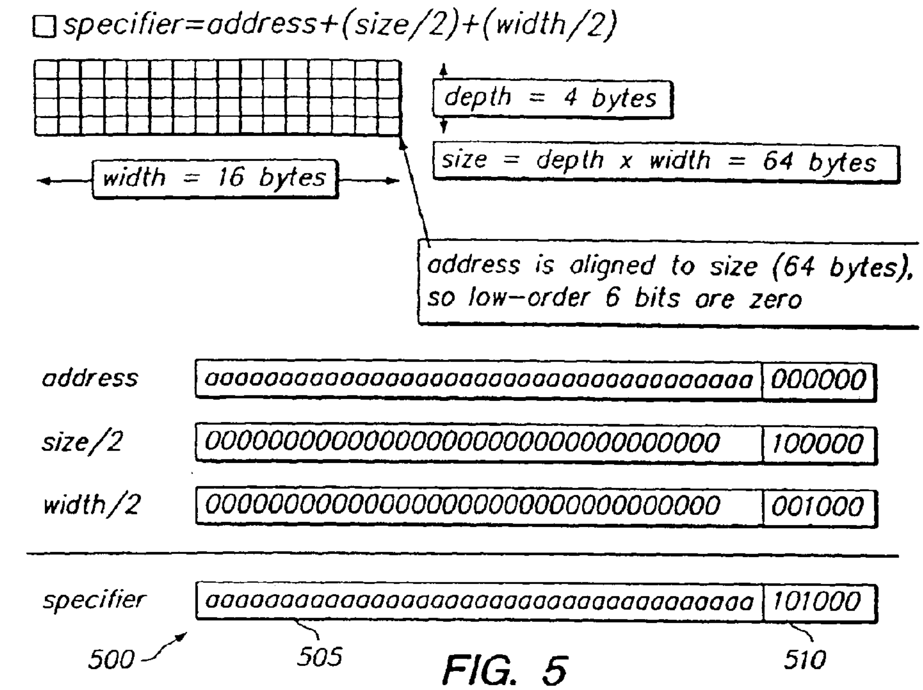
FIG. 5 illustrates a wide operand in accordance with an exemplary embodiment of the present invention.

The operands that are substantially larger than the data path width of the processor are provided by using a general-purpose register to specify a memory specifier from which more than one but in some embodiments several data path widths of data can be read into the dedicated storage. The memory specifier typically includes the memory address together with the size and shape of the matrix of data being operated on. The memory specifier or wide operand specifier can be better appreciated from FIG. 5, in which a specifier 500 is seen to be an address, plus a field representative of the size/2 and a further field representative of width/2, where size is the product of the depth and width of the data. The address is aligned to a specified size, for example sixty four bytes, so that a plurality of low order bits (for example, six bits) are zero. The specifier 500 can thus be seen to comprise a first field 505 for the address, plus two field indicia 510 within the low order six bits to indicate size and width.

Specifier Decoding

Figure 6:
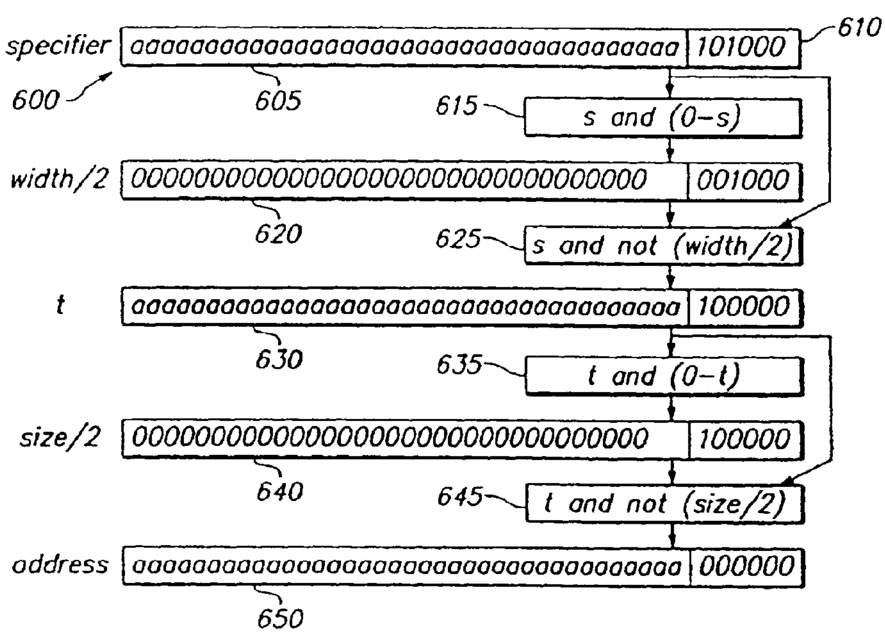
FIG. 6 illustrates an approach to specifier decoding in accordance with an exemplary embodiment of the present invention.

The decoding of the specifier 500 may be further appreciated from FIG. 6 where, for a given specifier 600 made up of an address field 605 together with a field 610 comprising plurality of low order bits. By a series of arithmetic operations shown at steps 615 and 620, the portion of the field 610 representative of width/2 is developed. In a similar series of steps shown at 625 and 630, the value of t is decoded, which can then be used to decode both size and address. The portion of the field 610 representative of size/2 is decoded as shown at steps 635 and 640, while the address is decoded in a similar way at steps 645 and 650.

Wide Function Unit

Figure 7:
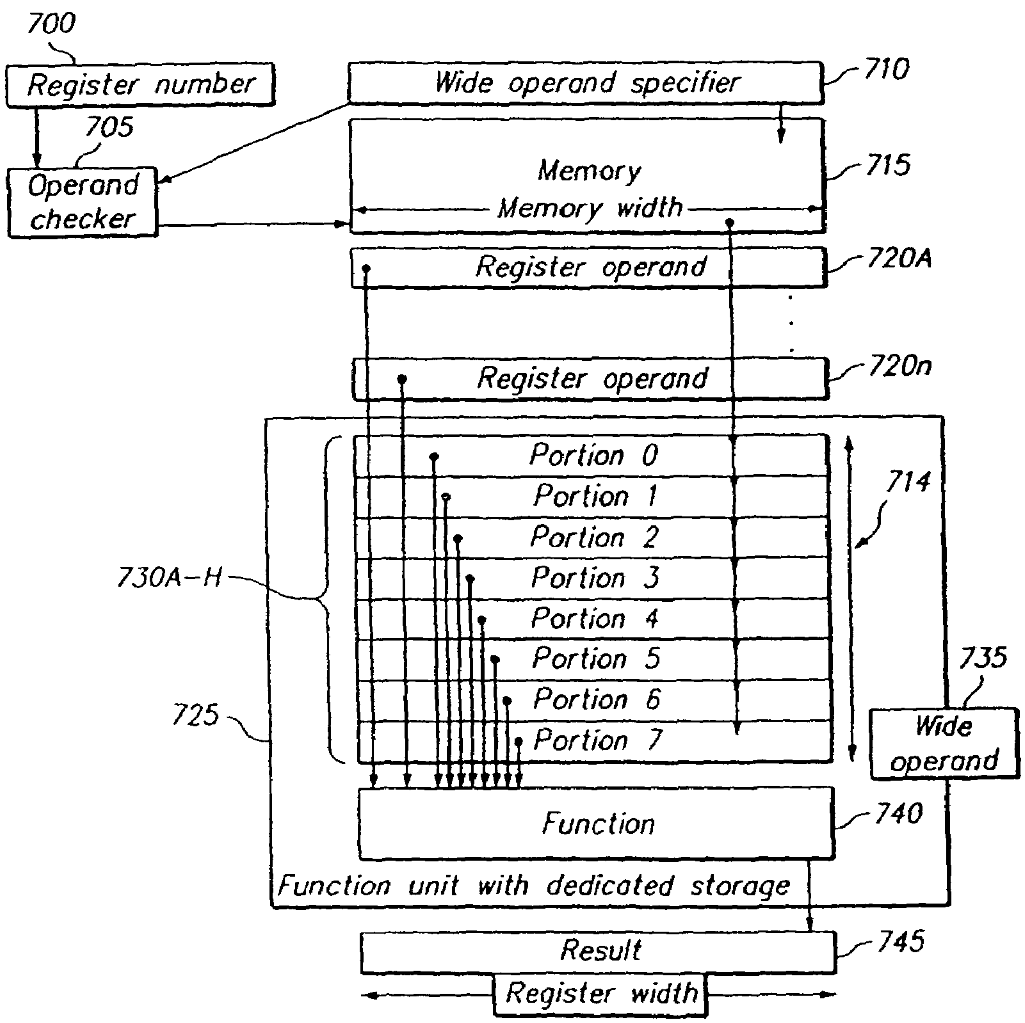
FIG. 7 illustrates in operational block form a Wide Function Unit in accordance with an exemplary embodiment of the present invention.

The wide function unit may be better appreciated from FIG. 7, in which a register number 700 is provided to an operand checker 705. Wide operand specifier 710 communicates with the operand checker 705 and also addresses memory 715 having a defined memory width. The memory address includes a plurality of register operands 720A n, which are accumulated in a dedicated storage portion 714 of a data functional unit 725. In the exemplary embodiment shown in FIG. 7, the dedicated storage 71.4 can be seen to have a width equal to eight data path widths, such that eight wide operand portions 730A-H are sequentially loaded into the dedicated storage to form the wide operand. Although eight portions are shown in FIG. 7, the present invention is not limited to eight or any other specific multiple of data path widths. Once the wide operand portions 730A-H are sequentially loaded, they may be used as a single wide operand 735 by the functional element 740, which may be any element(s) from FIG. 1 connected thereto. The result of the wide operand is then provided to a result register 745, which in a presently preferred embodiment is of the same width as the memory width.

Once the wide operand is successfully loaded into the dedicated storage 714, a second aspect of the present invention may be appreciated. Further execution of this instruction or other similar instructions that specify the same memory address can read the dedicated storage to obtain the operand value under specific conditions that determine whether the memory operand has been altered by intervening instructions. Assuming that these conditions are met, the memory operand fetch from the dedicated storage is combined with one or more register operands in the functional unit, producing a result. In some embodiments, the size of the result is limited to that of a general register, so that no similar dedicated storage is required for the result. However, in some different embodiments, the result may be a wide operand, to further enhance performance.

To permit the wide operand value to be addressed by subsequent instructions specifying the same memory address, various conditions must be checked and confirmed:

Those Conditions Include:

Each memory store instruction checks the memory address against the memory addresses recorded for the dedicated storage. Any match causes the storage to be marked invalid, since a memory store instruction directed to any of the memory addresses stored in dedicated storage 714 means that data has been overwritten.

The register number used to address the storage is recorded. If no intervening instructions have written to the register, and the same register is used on the subsequent instruction, the storage is valid (unless marked invalid by rule #1).

If the register has been modified or a different register number is used, the value of the register is read and compared against the address recorded for the dedicated storage. This uses more resources than #1 because of the need to fetch the register contents and because the width of the register is greater than that of the register number itself. If the address matches, the storage is valid. The new register number is recorded for the dedicated storage.

If conditions #2 or #3 are not met, the register contents are used to address the general-purpose processor's memory and load the dedicated storage. If dedicated storage is already fully loaded, a portion of the dedicated storage must be discarded (victimized) to make room for the new value. The instruction is then performed using the newly updated dedicated storage. The address and register number is recorded for the dedicated storage.

By checking the above conditions, the need for saving and restoring the dedicated storage is eliminated. In addition, if the context of the processor is changed and the new context does not employ Wide instructions that reference the same dedicated storage, when the original context is restored, the contents of the dedicated storage are allowed to be used without refreshing the value from memory, using checking rule #3. Because the values in the dedicated storage are read from memory and not modified directly by performing wide operations, the values can be discarded at any time without saving the results into general memory. This property simplifies the implementation of rule #4 above.

An alternate embodiment of the present invention can replace rule #1 above with the following rule:

1a. Each memory store instruction checks the memory address against the memory addresses recorded for the dedicated storage. Any match causes the dedicated storage to be updated, as well as the general memory.

By use of the above rule 1.a, memory store instructions can modify the dedicated storage, updating just the piece of the dedicated storage that has been changed, leaving the remainder intact. By continuing to update the general memory, it is still true that the contents of the dedicated memory can be discarded at any time without saving the results into general memory. Thus rule #4 is not made more complicated by this choice. The advantage of this alternate embodiment is that the dedicated storage need not be discarded (invalidated) by memory store operations.

Wide Microcache Data Structures

Figure 9:
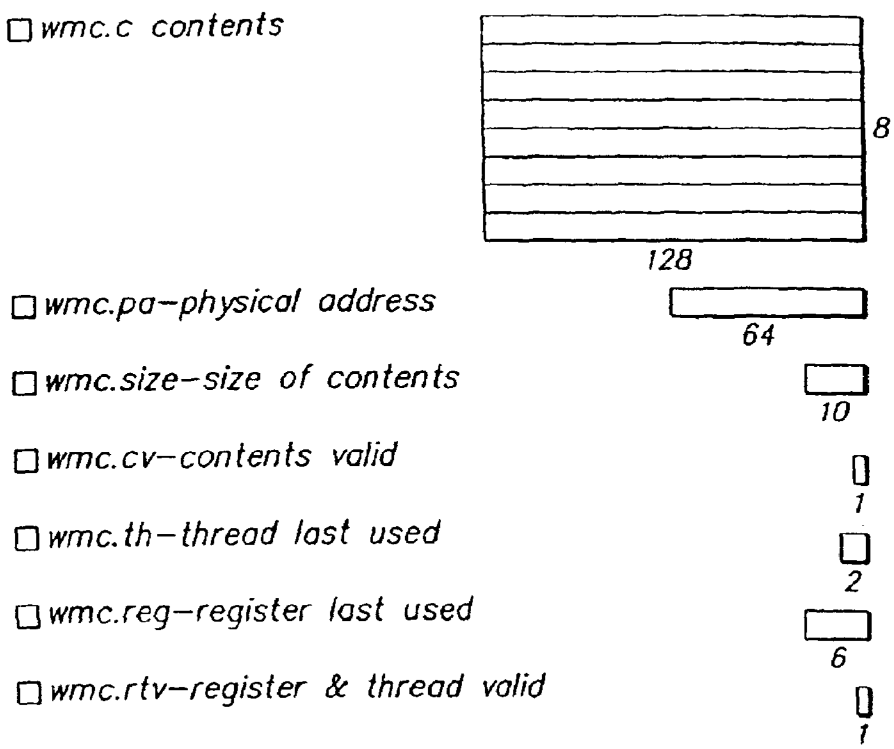
FIG. 9 illustrates Wide Microcache data structures in accordance with an exemplary embodiment of the present invention.

Referring next to FIG. 9, an exemplary arrangement of the data structures of the wide microcache or dedicated storage 114 may be better appreciated. The wide microcache contents, wmc.c, can be seen to form a plurality of data path widths 900A-n, although in the example shown the number is eight. The physical address, wmc.pa, is shown as 64 bits in the example shown, although the invention is not limited to a specific width. The size of the contents, wmc.size, is also provided in a field which is shown as 10 bits in an exemplary embodiment. A "contents valid" flag, wmc.cv, of one bit is also included in the data structure, together with a two bit field for thread last used, or wmc.th. In addition, a six bit field for register last used, wmc.reg, is provided in an exemplary embodiment. Further, a one bit flag for register and thread valid, or wmc.rtv, may be provided.

Wide Microcache Control—Software

Figure 8:
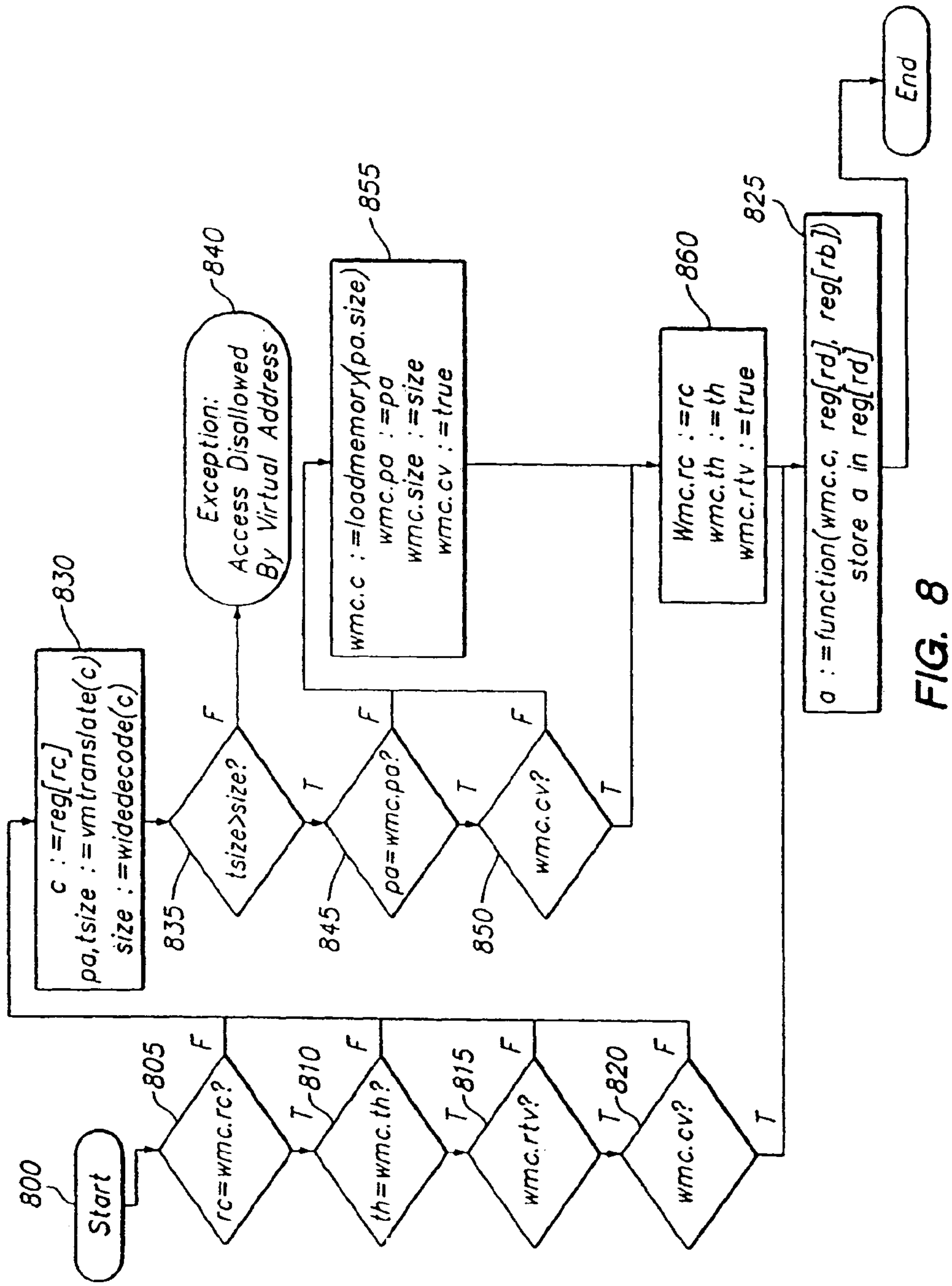
FIG. 8 illustrates in flow diagram form the Wide Microcache control function in accordance with an exemplary embodiment of the present invention.

The process by which the microcache is initially written with a wide operand, and thereafter verified as valid for fast subsequent operations, may be better appreciated from FIG. 8. The process begins at 800, and progresses to step 805 where a check of the register contents is made against the stored value wmc.rc. If true, a check is made at step 810 to verify the thread. If true, the process then advances to step 815 to verify whether the register and thread are valid. If step 815 reports as true, a check is made at step 820 to verify whether the contents are valid. If all of steps 805 through 820 return as true, the subsequent instruction is able to utilize the existing wide operand as shown at step 825, after which the process ends. However, if any of steps 805 through 820 return as false, the process branches to step 830, where content, physical address and size are set. Because steps 805 through 820 all lead to either step 825 or 830, steps 805 through 820 may be performed in any order or simultaneously without altering the process. The process then advances to step 835 where size is checked. This check basically ensures that the size of the translation unit is greater than or equal to the size of the wide operand, so that a physical address can directly replace the use of a virtual address. The concern is that, in some embodiments, the wide operands may be larger than the minimum region that the virtual memory system is capable of mapping. As a result, it would be possible for a single contiguous virtual address range to be mapped into multiple, disjoint physical address ranges, complicating the task of comparing physical addresses. By determining the size of the wide operand and comparing that size against the size of the virtual address mapping region which is referenced, the instruction is aborted with an exception trap if the wide operand is larger than the mapping region. This ensures secure operation of the processor. Software can then re-map the region using a larger size map to continue execution if desired. Thus, if size is reported as unacceptable at step 835, an exception is generated at step 840. If size is acceptable, the process advances to step 845 where physical address is checked. If the check reports as met, the process advances to step 850, where a check of the contents valid flag is made. If either check at step 845 or 850 reports as false, the process branches and new content is written into the dedicated storage 114, with the fields thereof being set accordingly. Whether the check at step 850 reported true, or whether new content was written at step 855, the process advances to step 860 where appropriate fields are set to indicate the validity of the data, after which the requested function can be performed at step 825. The process then ends.

Wide Microcache Control—Hardware

Figure 10:
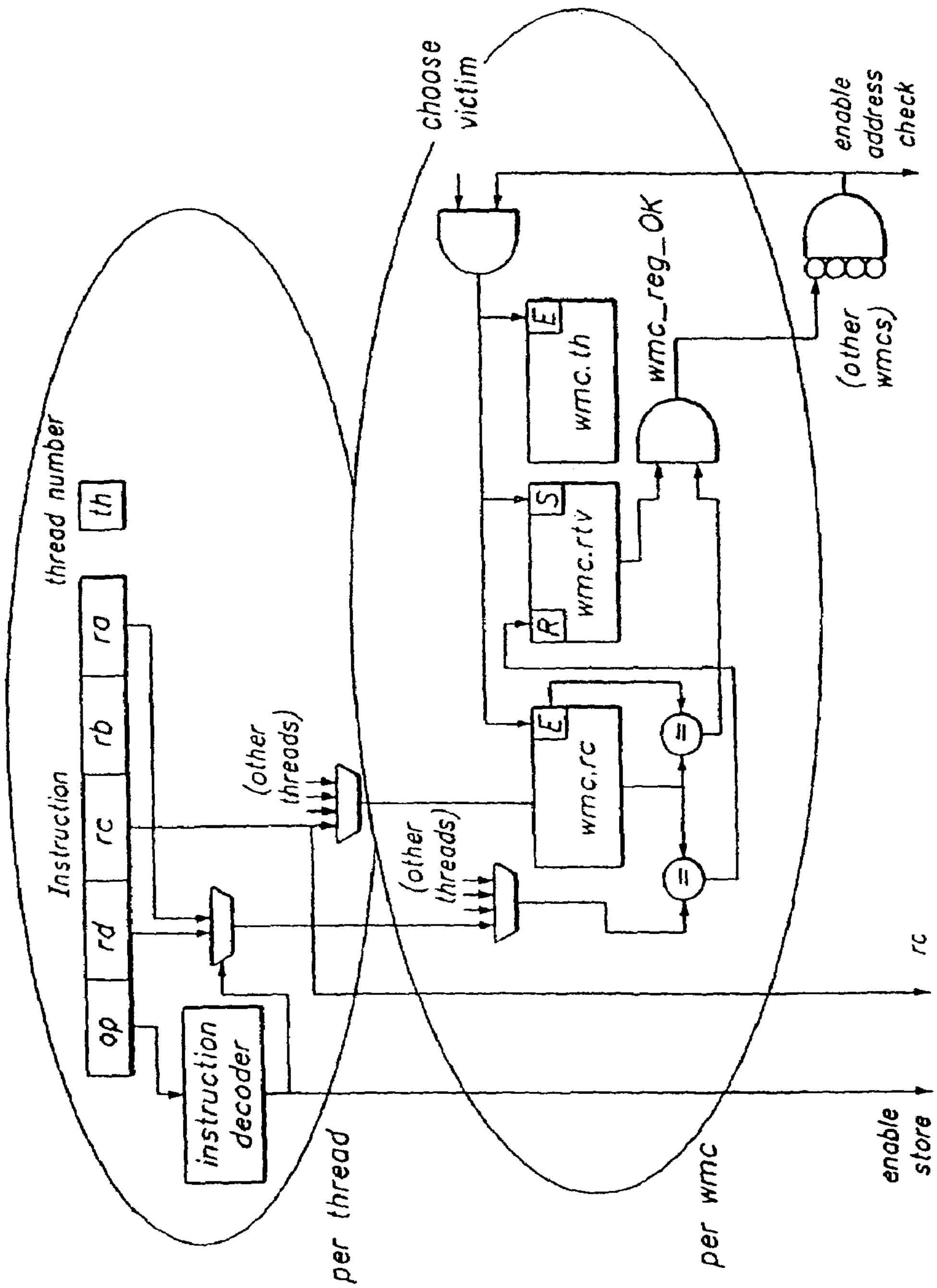
FIGS. 10 and 11 illustrate a Wide Microcache control in accordance with an exemplary embodiment of the present invention.
Figure 11:
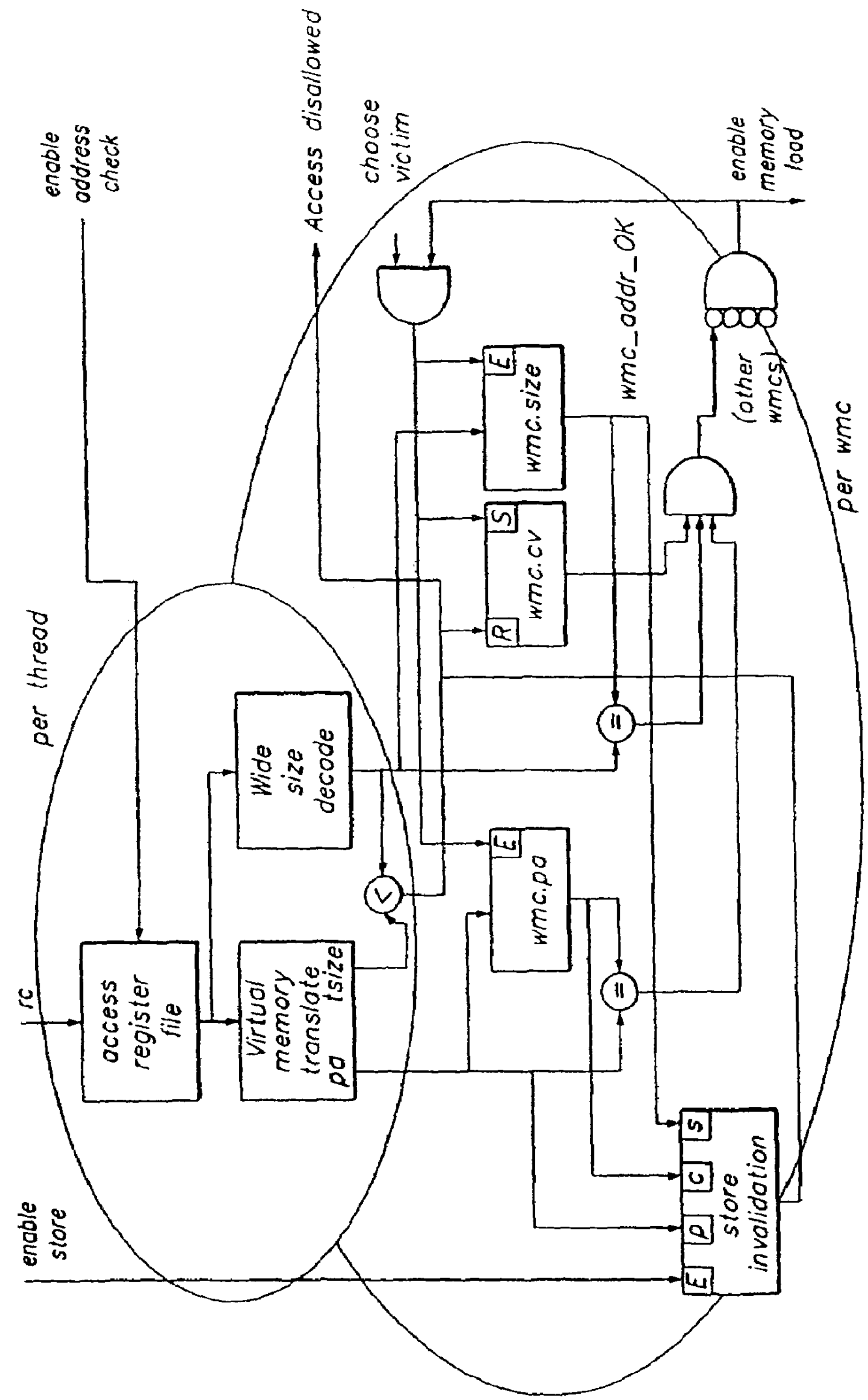

Referring next to FIGS. 10 and 11, which together show the operation of the microcache controller from a hardware standpoint, the operation of the microcache controller may be better understood. In the hardware implementation, it is clear that conditions which are indicated as sequential steps in FIGS. 8 and 9 above can be performed in parallel, reducing the delay for such wide operand checking. Further, a copy of the indicated hardware may be included for each wide microcache, and thereby all such microcaches as may be alternatively referenced by an instruction can be tested in parallel. It is believed that no further discussion of FIGS. 10 and 11 is required in view of the extensive discussion of FIGS. 8 and 9, above.

Various alternatives to the foregoing approach do exist for the use of wide operands, including an implementation in which a single instruction can accept two wide operands, partition the operands into symbols, multiply corresponding symbols together, and add the products to produce a single scalar value or a vector of partitioned values of width of the register file, possibly after extraction of a portion of the sums. Such an instruction can be valuable for detection of motion or estimation of motion in video compression. A further enhancement of such an instruction can incrementally update the dedicated storage if the address of one wide operand is within the range of previously specified wide operands in the dedicated storage, by loading only the portion not already within the range and shifting the in-range portion as required. Such an enhancement allows the operation to be performed over a "sliding window" of possible values. In such an instruction, one wide operand is aligned and supplies the size and shape information, while the second wide operand, updated incrementally, is not aligned.

The Wide Convolve Extract instruction and Wide Convolve Floating-point instruction described below is one alternative embodiment of an instruction that accepts two wide operands.

Another alternative embodiment of the present invention can define additional instructions where the result operand is a wide operand. Such an enhancement removes the limit that a result can be no larger than the size of a general register, further enhancing performance. These wide results can be cached locally to the functional unit that created them, but must be copied to the general memory system before the storage can be reused and before the virtual memory system alters the mapping of the address of the wide result. Data paths must be added so that load operations and other wide operations can read these wide results—forwarding of a wide result from the output of a functional unit back to its input is relatively easy, but additional data paths may have to be introduced if it is desired to forward wide results back to other functional units as wide operands.

As previously discussed, a specification of the size and shape of the memory operand is included with the low-order bits of the address. In a presently preferred implementation, such memory operands are typically a power of two in size and aligned to that size. Generally, one half the total size is added (or inclusively or'ed, or exclusively or'ed) to the memory address, and one half of the data width is added (or inclusively or'ed, or exclusively or'ed) to the memory address. These bits can be decoded and stripped from the memory address, so that the controller is made to step through all the required addresses. The number of distinct operands required for these instructions is hereby decreased, as the size, shape and address of the memory operand are combined into a single register operand value.

In an alternative exemplary embodiment described below in the Wide Switch instruction and others below, the wide operand specifier is described as containing optional size and shape specifiers. As such, the omission of the specifier value obtains a default size or shape defined from attributes of the specified instruction.

In an alternative exemplary embodiment described below in the Wide Convolve Extract instruction below, the wide operand specifier contains mandatory size and shape specifier. The omission of the specifier value obtains an exception which aborts the operation. Notably, the specification of a larger size or shape than an implementation may permit due to limited resources, such as the limited size of a wide operand memory, may result in a similar exception when the size or shape descriptor is searched for only in the limited bit range in which a valid specifier value may be located. This can be utilized to ensure that software that requires a larger specifier value than the implementation can provide results in a detected exception condition, when for example, a plurality of implementations of the same instruction set of a processor differ in capabilities. This also allows for an upward-compatible extension of wide operand sizes and shapes to larger values in extended implementations of the same instruction set.

In an alternative exemplary embodiment, the wide operand specifier contains size and shape specifiers in an alternative representation other than linearly related to the value of the size and shape parameters. For example, low-order bits of the specifier may contain a fixed-size binary value which is logarithmically related to the value, such as a two-bit field where 00 conveys a value of 128, 01 a value of 256, 10 a value of 512, and 11 a value of 1024. The use of a fixed-size field limits the maximum value which can be specified in, for example, a later upward-compatible implementation of a processor.

Instruction Set

This section describes the instruction set in complete architectural detail. Operation codes are numerically defined by their position in the following operation code tables, and are referred to symbolically in the detailed instruction definitions. Entries that span more than one location in the table define the operation code identifier as the smallest value of all the locations spanned. The value of the symbol can be calculated from the sum of the legend values to the left and above the identifier.

Instructions that have great similarity and identical formats are grouped together. Starting on a new page, each category of instructions is named and introduced.

The Operation codes section lists each instruction by mnemonic that is defined on that page. A textual interpretation of each instruction is shown beside each mnemonic.

The Equivalences section lists additional instructions known to assemblers that are equivalent or special cases of base instructions, again with a textual interpretation of each instruction beside each mnemonic. Below the list, each equivalent instruction is defined, either in terms of a base instruction or another equivalent instruction. The symbol between the instruction and the definition has a particular meaning. If it is an arrow (← or →), it connects two mathematicaly equivalent operations, and the arrow direction indicates which form is preferred and produced in a reverse assembly. If the symbol is a (⇐), the form on the left is assembled into the form on the right solely for encoding purposes, and the form on the right is otherwise illegal in the assembler. The parameters in these definitions are formal; the names are solely for pattern-matching purposes, even though they may be suggestive of a particular meaning.

The Redundancies section lists instructions and operand values that may also be performed by other instructions in the instruction set. The symbol connecting the two forms is a (⇔), which indicates that the two forms are mathematically equivalent, both are legal, but the assembler does not transform one into the other.

The Selection section lists instructions and equivalences together in a tabular form that highlights the structure of the instruction mnemonics.

The Format section lists (1) the assembler format, (2) the C intrinsics format, (3) the bit-level instruction format, and (4) a definition of bit-level instruction format fields that are not a one-for-one match with named fields in the assembler format.

The Definition section gives a precise definition of each basic instruction.

The Exceptions section lists exceptions that may be caused by the execution of the instructions in this category.

Cross Reference

| Instruction Class | Page | Add | Subtract | Multiply | Divide | Shift | Compare | Copy | Boolean | Signed | Unsigned | Mixed sign | Floating-point | Set | Multiplex |
|---|---|---|---|---|---|---|---|---|---|---|---|---|---|---|---|
| Always Reserved | 151 | | | | | | | | | | | | | | |
| Address | 151 | x | | | | | | | x | x | x | | | | |
| Address Compare | 152 | | | | | | x | | | x | x | | | | |
| Address Compare Floating-point | 152 | | | | | | x | | | x | x | | | | |
| Address Copy Immediate | 152 | | | | | | | x | | | | | | | |
| Address Immediate | 153 | x | | | | | | | | x | x | | | | |
| Address Immediate Reversed | 153 | | x | | | | | | | x | x | | | | |
| Address Immediate Set | 153 | | | | | | | | | x | x | | | x | |
| Address Reversed | 154 | | x | | | | | | | x | x | | | | |
| Address Set | 154 | | | | | | | | | x | x | | | x | |
| Address Set Floating-point | 154 | | | | | | | | | x | x | | | x | |
| Address Shift Left Immediate Add | 155 | x | | | | x | | | | | | | | | |
| Address Shift Left Immediate Subtract | 155 | | x | | | x | | | | | | | | | |
| Address Shift Immediate | 155 | | | | | x | | | | x | x | | | | |
| Address Ternary | 156 | | | | | | | | x | | | | | | x |
| Branch | 156 | | | | | | | | | | | | | | |
| Branch Back | 156 | | | | | | | | | | | | | | |
| Branch Barrier | 157 | | | | | | | | | | | | | | |
| Branch Conditional | 157 | | | | | | x | | | | | | | | |
| Branch Conditional Floating-Point | 158 | | | | | | x | | | | | | | | |
| Branch Conditional Visibility Floating-Point | 158 | | | | | | x | | | | | | | | |
| Branch Down | 158 | | | | | | | | | | | | | | |
| Branch Gateway | 122 | | | | | | | | | | | | | | |
| Branch Halt | 159 | | | | | | | | | | | | | | |
| Branch Hint | 133 | | | | | | | | | | | | | | |
| Branch Hint Immediate | 159 | | | | | | | | | | | | | | |
| Branch Immediate | 159 | | | | | | | | | | | | | | |
| Branch Immediate Link | 160 | | | | | | | | | | | | | | |
| Branch Link | 160 | | | | | | | | | | | | | | |
| Load | 160 | | | | | | | | | | | | | | |
| Load Immediate | 161 | | | | | | | | | | | | | | |
| Store | 162 | | | | | | | | | | | | | | |
| Store Double Compare Swap | 163 | | | | | | | | | | | | | | |
| Store Immediate | 164 | | | | | | | | | | | | | | |
| Store Immediate Inplace | 164 | | | | | | | | | | | | | | |
| Store Inplace | 166 | | | | | | | | | | | | | | |
| Group Add | 124 | x | | | | | | | | | | | | | |
| Group Add Halve | 168 | x | | | | | | | | | | | | | |
| Group Boolean | 130 | | | | | | | | x | | | | | | |

-continued

| Cross Reference | | | | | | | | | | | | | | | | |
|---|---|---|---|---|---|---|---|---|---|---|---|---|---|---|---|---|
| Group Compare | 168 | | | | | x | | | | x | x | | | | | |
| Group Compare Floating-point | 169 | | | | | x | | | | | | | | x | | |
| Group Copy Immediate | 169 | | | | | | | x | | | | | | | | |
| Group Immediate | 169 | x | | | | | | | | | | | | | | |
| Group Immediate Reversed | 170 | | x | | | | | | | | | | | | x | |
| Group Inplace | 170 | | | | | | | | | | | | | | | |
| Group Reversed | 125 | | x | | | | | | | | | | | | x | |
| Group Reversed Floating-point | 170 | | x | | | | | | | | | | | x | x | |
| Group Shift Left Immediate Add | 171 | x | | | | x | | | | | | | | | | |
| Group Shift Left Immediate Subtract | 171 | | x | | | x | | | | | | | | | | |
| Group Subtract Halve | 172 | | x | | | x | | | | | | | | | | |
| Group Ternary | 172 | | | | | | | | x | | | | | | | x |
| Crossbar | 135 | | | | | | | | | | | | | | | |
| Crossbar Extract | 136 | | | | | | | | | | | | | | | |
| Crossbar Field | 172 | | | | | | | | | | | | | | | |
| Crossbar Field Inplace | 173 | | | | | | | | | | | | | | | |
| Crossbar Inplace | 174 | | | | | | | | | | | | | | | |
| Crossbar Short Immediate | 174 | | | | | | | | | | | | | | | |
| Crossbar Short Immediate Inplace | 175 | | | | | | | | | | | | | | | |
| Crossbar Shuffle | 138 | | | | | | | | | | | | | | | |
| Crossbar Swizzle | 175 | | | | | | | | | | | | | | | |
| Crossbar Ternary | 175 | | | | | | | | | | | | | | | |
| Ensemble | 125 | | | x | | | | | | x | x | x | | | | |
| Ensemble Extract | 111 | | | x | | | | | | | | | | | | |
| Ensemble Extract Inplace | 107 | x | | | | | | | | | | | | | | |
| Ensemble Extract Immediate | 176 | | | x | | | | | | | | | | | | |
| Ensemble Extract Immediate Inplace | 177 | x | | x | | | | | | | | | | | | |
| Ensemble Floating-point | 127 | x | | x | x | | | | | | | | | x | | |
| Ensemble Inplace | 179 | x | x | x | | | | | | x | x | x | | | | |
| Ensemble Inplace Floating-point | 179 | x | x | x | | | | | | | | | | x | | |
| Ensemble Reversed Floating-point | 127 | | x | | | | | | | | | | | x | x | |
| Ensemble Ternary | 181 | | | x | | | | | | | | | | | | |
| Ensemble Ternary Floating-point | 129 | | | | | | | | | | | | | x | | |
| Ensemble Unary | 182 | x | | | | | | | | x | x | | | | | |
| Ensemble Unary Floating-point | 182 | | | | | | | | x | | | | | x | | |
| Wide Convolve Extract | 144 | | | x | | | | | | | | | | | | |
| Wide Multiply Matrix Extract | 94 | | | x | | | | | | | | | | | | |
| Wide Multiply Matrix Extract Immediate | 98 | | | x | | | | | | | | | | | | |
| Wide Multiply Matrix Floating-point | 101 | | | x | | | | | | | | | | x | | |
| Wide Multiply Matrix Galois | 103 | | | x | | | | | | | | | | | | |
| Wide Switch | 86 | | | | | | | | | | | | | | | |
| Wide Translate | 88 | | | | | | | | | | | | | | | |

| Instruction Class | Privilege | Synchronizati | Optimization | Link | Immediate | Rounding | Galois/Polyno | Convolve | Extract | Merge | Complex | Log Most | Convert | Overflow | Exception |
|---|---|---|---|---|---|---|---|---|---|---|---|---|---|---|---|
| Always Reserved | | | | | | | | | | | | | | | x |
| Address | | | | | | | | | | | | | | x | |
| Address Compare | | | | | | | | | | | | | | | x |
| Address Compare Floating-point | | | | | | | | | | | | | | | x |

-continued

| Cross Reference | | | | | | | | | |
|---|---|---|---|---|---|---|---|---|---|
| Address Copy Immediate | | | | x | | | | | |
| Address Immediate | | | | x | | | | x | |
| Address Immediate Reversed | | | | x | | | | | |
| Address Immediate Set | | | | x | | | | | |
| Address Reversed | | | | x | | | | | |
| Address Set | | | | x | | | | | |
| Address Set Floating-point | | | | | | | | x | |
| Address Shift Left Immediate Add | | | | x | | | | | |
| Address Shift Left Immediate Subtract | | | | x | | | | | |
| Address Shift Immediate | | | | x | | | | x | |
| Address Ternary | | | | | | | | | |
| Branch | | | | | | | | | |
| Branch Back | x | | | | | | | | x |
| Branch Barrier | | x | | | | | | | |
| Branch Conditional | | | | | | | | | |
| Branch Conditional Floating-Point | | | | | | | | | |
| Branch Conditional Visibility Floating-Point | | | | | | | | | |
| Branch Down | x | | | | | | | | |
| Branch Gateway | x | | | | | | | | |
| Branch Halt | | x | | | | | | | |
| Branch Hint | | | x | | | | | | |
| Branch Hint Immediate | | | x | | x | | | | |
| Branch Immediate | | | | | x | | | | |
| Branch Immediate Link | | | | x | x | | | | |
| Branch Link | | | | x | | | | | |
| Load | | | | | | | | | |
| Load Immediate | | | | | x | | | | |
| Store | | x | | | | | | | |
| Store Double Compare Swap | | | | x | | | | | |
| Store Immediate | | x | | x | | | | | |
| Store Immediate Inplace | | x | | | | | | | |
| Store Inplace | | | | | | | | | |
| Group Add | | | | | | | | | |
| Group Add Halve | | | | | x | | | | |
| Group Boolean | | | | | | | | | |
| Group Compare | | | | | | | | | x |
| Group Compare Floating-point | | | | | | | | | x |
| Group Copy Immediate | | | | x | | | | | |
| Group Immediate | | | | x | | | | | |
| Group Immediate Reversed | | | | x | | | | | |
| Group Inplace | | | | | | | | | |
| Group Reversed | | | | | | | | | |
| Group Reversed Floating-point | | | | | | | | | |
| Group Shift Left Immediate Add | | | | x | | | | | |
| Group Shift Left Immediate Subtract | | | | x | | | | | |
| Group Subtract Halve | | | | | x | | | | |
| Group Ternary | | | | | | x | | | |
| Crossbar | | | | | | | x | | |
| Crossbar Extract | | | | | | | | | |
| Crossbar Field | | | | | | | | | |
| Crossbar Field Inplace | | | | | | | | | |
| Crossbar Inplace | | | | | | | | | |
| Crossbar Short Immediate | | | | x | | | | | |
| Crossbar Short | | | | x | | | | | |

-continued

Cross Reference

| | | | | | | | | | |
|---|---|---|---|---|---|---|---|---|---|
| Immediate Inplace | | | | | | | | | |
| Crossbar Shuffle | | | | | | | | | |
| Crossbar Swizzle | | | | | | | | | |
| Crossbar Ternary | | | | | | | | | |
| Ensemble | | | x | x | | | x | | |
| Ensemble Extract | | x | | | x | | | | |
| Ensemble Extract Inplace | | x | | x | x | x | | | |
| Ensemble Extract Immediate | x | x | | | x | | | | |
| Ensemble Extract Immediate Inplace | x | x | | x | x | | | | |
| Ensemble Floating-point | | x | | | | | x | | |
| Ensemble Inplace | | | | | | | x | | |
| Ensemble Inplace Floating-point | | x | | | | | x | | |
| Ensemble Reversed Floating-point | | x | | | | | | | |
| Ensemble Ternary | | | x | | | | | | |
| Ensemble Ternary Floating-point | | x | | | | | | | |
| Ensemble Unary | | | | | | | | x | |
| Ensemble Unary Floating-point | | x | | | | | | | x |
| Wide Convolve Extract | | | | | | | | | |
| Wide Multiply Matrix Extract | | x | | | x | | | | |
| Wide Multiply Matrix Extract Immediate | x | x | | | x | | | | |
| Wide Multiply Matrix Floating-point | | x | | | | | | | |
| Wide Multiply Matrix Galois | | | x | | | | | | |
| Wide Switch | | | | | | | | | |
| Wide Translate | | | | | | | | | |

Format Reference

| Instruction Class | Page | Assembler Format | 31 | 30 | 29 | 28 | 27 | 26 | 25 | 24 | 23 | 22 | 21 | 20 | 19 | 18 |
|---|---|---|---|---|---|---|---|---|---|---|---|---|---|---|---|---|
| Always Reserved | 151 | A.RES imm | A.RES | | | | | | | | imm | | | | | |
| Address | 151 | op rd=rc,r | A.MINOR | | | | | | | | rd | | | | | |
| Address Compare | 152 | op rd,rc | A.MINOR | | | | | | | | rd | | | | | |
| Address Compare Floating-point | 152 | op rd,rc | A.MINOR | | | | | | | | rd | | | | | |
| Address Copy Immediate | 152 | A.COPY.I rd=imm | A.COPY.I | | | | | | | | rd | | | | | |
| Address Immediate | 153 | op rd=rc,imm | op | | | | | | | | rd | | | | | |
| Address Immediate Reversed | 153 | op rd=imm,rc | op | | | | | | | | rd | | | | | |
| Address Immediate Set | 153 | op rd=imm,rc | op | | | | | | | | rd | | | | | |
| Address Reversed | 154 | op rd=rb,rc | A.MINOR | | | | | | | | rd | | | | | |
| Address Set | 154 | op rd=rb,rc | A.MINOR | | | | | | | | rd | | | | | |
| Address Set Floating-point | 154 | op rd=rb,rc | A.MINOR | | | | | | | | rd | | | | | |
| Address Shift Left Immediate Add | 155 | op rd=rc,rb,i | A.MINOR | | | | | | | | rd | | | | | |
| Address Shift Left Immediate Subtract | 155 | op rd=rb,i,rc | A.MINOR | | | | | | | | rd | | | | | |
| Address Shift Immediate | 155 | op rd=rc,simm | A.MINOR | | | | | | | | rd | | | | | |
| Address Ternary | 156 | A.MUX ra=rd,rc,rb | A.MUX | | | | | | | | rd | | | | | |
| Branch | 156 | B rd | B.MINOR | | | | | | | | rd | | | | | |
| Branch Back | 156 | B.BACK | B.MINOR | | | | | | | | 0 | | | | | |
| Branch Barrier | 157 | B.BARRIER rd | B.MINOR | | | | | | | | rd | | | | | |
| Branch Conditional | 157 | op rd,rc,target | op | | | | | | | | rd | | | | | |
| Branch Conditional Floating-Point | 158 | op rd,rc,target | op | | | | | | | | rd | | | | | |
| Branch Conditional Visibility Floating-Point | 158 | op rc,rd,target | op | | | | | | | | rd | | | | | |
| Branch Down | 158 | B.DOWN rd | B.MINOR | | | | | | | | rd | | | | | |
| Branch Gateway | 122 | B.GATE rb | B.MINOR | | | | | | | | 0 | | | | | |
| Branch Halt | 159 | B.HALT | B.MINOR | | | | | | | | 0 | | | | | |
| Branch Hint | 133 | B.HINT badd,count,rd | B.MINOR | | | | | | | | rd | | | | | |
| Branch Hint Immediate | 159 | B.HINT.I badd,count,target | B.HINT.I | | | | | | | | simm | | | | | |
| Branch Immediate | 159 | B.I target | B.I | | | | | | | | offset | | | | | |
| Branch Immediate Link | 160 | B.LINK.I target | B.LINK.I | | | | | | | | offset | | | | | |

-continued

| Format Reference | | | | | |
| --- | --- | --- | --- | --- | --- |
| Branch Link | 160 | B.LINK rd=rc | B.MINOR | | rd |
| Load | 160 | op rd=rc,rb | L.MINOR | | rd |
| Load Immediate | 161 | op rd=rc,offset | op | | rd |
| Store | 162 | op rd,rc,rb | S.MINOR | | rd |
| Store Double Compare Swap | 163 | op rd@rc,rb | S.MINOR | | rd |
| Store Immediate | 164 | op rd,rc,offset | op | | rd |
| Store Immediate Inplace | 164 | op rd@rc,offset | op | | rd |
| Store Inplace | 166 | op rd@rc,rb | S.MINOR | | rd |
| Group Add | 124 | G.op.size rd=rc,rb | G.size | | rd |
| Group Add Halve | 168 | G.op.size.rnd rd=rc,rb | G.size | | rd |
| Group Boolean | 130 | G.BOOLEAN rd@trc,trb,f | G.BOOLEAN | ih | rd |
| Group Compare | 168 | G.COM.op.size rd,rc | G.size | | rd |
| Group Compare Floating-point | 169 | G.COM.op.prec.rnd rd,rc | G.prec | | rd |
| Group Copy Immediate | 169 | G.COPY.I.size rd=i | G.COPY.I | s | rd |
| Group Immediate | 169 | op.size rd=rc,imm | G.op | | rd |
| Group Immediate Reversed | 170 | op.size rd=imm,rc | G.op | | rd |
| Group Inplace | 170 | G.op.size rd@rc,rb | G.size | | rd |
| Group Reversed | 125 | G.op.size rd=rb,rc | G.size | | rd |
| Group Reversed Floating-point | 170 | G.op.prec.rnd rd=rb,rc | G.prec | | rd |
| Group Shift Left Immediate Add | 171 | G.op.size rd=rc,rb,i | G.size | | rd |
| Group Shift Left Immediate Subtract | 171 | G.op.size rd=rb,i,rc | G.size | | rd |
| Group Subtract Halve | 172 | G.op.size.rnd rd=rb,rc | G.size | | rd |
| Group Ternary | 172 | G.MUX ra=rd,rc,rb | G.MUX | | rd |
| Crossbar | 135 | X.op.size rd=rc,rb | X.SHIFT | s | rd |
| Crossbar Extract | 136 | X.EXTRACT ra=rd,rc,rb | X.EXTRACT | | rd |
| Crossbar Field | 172 | X.op.gsize rd=rc,isize,ishift | X.op | ih | rd |
| Crossbar Field Inplace | 173 | X.op.gsize rd@rc,isize,ishift | X.op | ih | rd |
| Crossbar Inplace | 174 | X.op.size rd@rc,rb | X.SHIFT | s | rd |
| Crossbar Short Immediate | 174 | X.op.size rd=rc,shift | X.SHIFTI | | rd |
| Crossbar Short Immediate Inplace | 175 | X.op.size rd@rc.shift | X.SHIFTI | | rd |
| Crossbar Shuffle | 138 | X.SHUFFLE.256 rd=rc,rb,v,w,h | X.SHUFFLE | | rd |
| Crossbar Swizzle | 175 | X.SWIZZLE rd=rc,icopy,iswap | X.SWIZZLE | ih | rd |
| Crossbar Ternary | 175 | X.SELECT.8 ra=rd,rc,rb | X.SELECT.8 | | rd |
| Ensemble | 125 | E.op.size rd=rc,rb | E.size | | rd |
| Ensemble Extract | 111 | E.op ra=rd,rc,rb | E.op | | rd |
| Ensemble Extract Inplace | 107 | E.op rd@rc,rb,ra | E.op | | rd |
| Ensemble Extract Immediate | 176 | E.op.size.rnd rd=rc,rb,i | E.op | | rd |
| Ensemble Extract Immediate Inplace | 177 | E.op.size.rnd rd@rc,rb,i | E.op | | Rd |
| Ensemble Floating-point | 127 | E.op.prec.rnd rd=rc,rb | E.prec | | rd |
| Ensemble Inplace | 179 | E.op.size rd@rc,rb | E.size | | rd |
| Ensemble Inplace Floating-point | 179 | E.op.prec rd@rc,rb | E.prec | | rd |
| Ensemble Reversed Floating-point | 127 | E.op.prec.rnd rd=rb,rc | E.prec | | rd |
| Ensemble Ternary | 181 | E.op.G8 ra=rd,rc,rb | E.op | | rd |
| Ensemble Ternary Floating-point | 129 | E.op.prec ra=rd,rc,rb | E.op.prec | | rd |
| Ensemble Unary | 182 | E.op.size rd=rc | E.size | | rd |
| Ensemble Unary Floating-point | 182 | E.op.prec.rnd rd=rc | E.prec | | rd |
| Wide Convolve Extract | 144 | W.op.size.order rd=rc,rb | W.MINOR.order | | rd |
| Wide Multiply Matrix Extract | 94 | W.op.order ra=rc,rd,rb | W.op.order | | rd |
| Wide Multiply Matrix Extract Immediate | 98 | W.op.tsize.order rd=rc,rb,i | W.op.order | | rd |
| Wide Multiply Matrix Floating-point | 101 | W.op.prec.order rd=rc,rb | W.MINOR.order | | rd |
| Wide Multiply Matrix Galois | 103 | W.op.order ra=rc,rd,rb | W.op.order | | rd |
| Wide Switch | 86 | W.op.order ra=rc,rd,rb | W.op.order | | rd |
| Wide Translate | 88 | W.op.size.order rd=rc,rb | W.op.order | | rd |

| Instruction Class | 17 | 16 | 15 | 14 | 13 | 12 | 11 | 10 | 9 | 8 | 7 | 6 | 5 | 4 | 3 | 2 | 1 | 0 |
| --- | --- | --- | --- | --- | --- | --- | --- | --- | --- | --- | --- | --- | --- | --- | --- | --- | --- | --- |
| Always Reserved | | | | | | | | | imm | | | | | | | | | |
| Address | | | rc | | | | | | rb | | | | | | op | | | |
| Address Compare | | | rc | | | | | | op | | | | | | A.COM | | | |
| Address Compare Floating-point | | | rc | | | | | | op | | | | | | A.COM | | | |
| Address Copy Immediate | | | | | | | | | imm | | | | | | | | | |
| Address Immediate | | | rc | | | | | | | | | imm | | | | | | |
| Address Immediate Reversed | | | rc | | | | | | | | | imm | | | | | | |
| Address Immediate Set | | | rc | | | | | | | | | imm | | | | | | |
| Address Reversed | | | rc | | | | | | rb | | | | | | op | | | |
| Address Set | | | rc | | | | | | rb | | | | | | op | | | |
| Address Set Floating-point | | | rc | | | | | | rb | | | | | | op | | | |
| Address Shift Left Immediate Add | | | rc | | | | | | rb | | | | | op | | | sh | |
| Address Shift Left Immediate Subtract | | | rc | | | | | | rb | | | | | op | | | sh | |
| Address Shift Immediate | | | rc | | | | | | simm | | | | | | op | | | |
| Address Ternary | | | rc | | | | | | rb | | | | | | ra | | | |
| Branch | | | 0 | | | | | | 0 | | | | | | B | | | |
| Branch Back | | | 0 | | | | | | 0 | | | | | | B.BACK | | | |
| Branch Barrier | | | 0 | | | | | | 0 | | | | | | B.BARRIER | | | |
| Branch Conditional | | | rc | | | | | | | | | offset | | | | | | |
| Branch Conditional Floating-Point | | | rc | | | | | | | | | offset | | | | | | |
| Branch Conditional Visibility Floating-Point | | | rc | | | | | | | | | offset | | | | | | |

-continued

Format Reference

| | | | | | | | | | |
|---|---|---|---|---|---|---|---|---|---|
| Branch Down | | 0 | | 0 | | | B.DOWN | | |
| Branch Gateway | | 1 | | rb | | | B.GATE | | |
| Branch Halt | | 0 | | 0 | | | B.BACK | | |
| Branch Hint | | count | | simm | | | B.HINT | | |
| Branch Hint Immediate | | count | | | offset | | | | |
| Branch Immediate | | | | offset | | | | | |
| Branch Immediate Link | | | | offset | | | | | |
| Branch Link | | rc | | 0 | | | B.LINK | | |
| Load | | rc | | rb | i | | op | | |
| Load Immediate | | rc | | | offset | | | | |
| Store | | rc | | rb | i | | op | | |
| Store Double Compare Swap | | rc | | rb | 0 | | op | | |
| Store Immediate | | rc | | | offset | | | | |
| Store Immediate Inplace | | rc | | | offset | | | | |
| Store Inplace | | rc | | rb | i | | op | | |
| Group Add | | rc | | rb | | | op | | |
| Group Add Halve | | rc | | rb | | op | | | rnd |
| Group Boolean | | rc | | rb | | | il | | |
| Group Compare | | rc | | op.rnd | | | GCOM | | |
| Group Compare Floating-point | | rc | | op.rnd | | | GCOM | | |
| Group Copy Immediate | sz | | | imm | | | | | |
| Group Immediate | | rc | sz | | imm | | | | |
| Group Immediate Reversed | | rc | sz | | imm | | | | |
| Group Inplace | | rc | | rb | | | op | | |
| Group Reversed | | rc | | rb | | | op | | |
| Group Reversed Floating-point | | rc | | rb | | | op.rnd | | |
| Group Shift Left Immediate Add | | rc | | rb | | op | | | sh |
| Group Shift Left Immediate Subtract | | rc | | rb | | op | | | sh |
| Group Subtract Halve | | rc | | rb | | op | | | rnd |
| Group Ternary | | rc | | rb | | | ra | | |
| Crossbar | | rc | | rb | | op | | | sz |
| Crossbar Extract | | rc | | rb | | | ra | | |
| Crossbar Field | | rc | | gsfp | | | gsfs | | |
| Crossbar Field Inplace | | rc | | gsfp | | | gsfs | | |
| Crossbar Inplace | | rc | | rb | | op | | | sz |
| Crossbar Short Immediate | | rc | | simm | | op | | | sz |
| Crossbar Short Immediate Inplace | | rc | | simm | | op | | | sz |
| Crossbar Shuffle | | rc | | rb | | | op | | |
| Crossbar Swizzle | | rc | | icopva | | | iswapa | | |
| Crossbar Ternary | | rc | | rb | | | ra | | |
| Ensemble | | rc | | rb | | | E.op | | |
| Ensemble Extract | | rc | | rb | | | ra | | |
| Ensemble Extract Inplace | | rc | | rb | | | ra | | |
| Ensemble Extract Immediate | | rc | | rb | t | sz | | sh | |
| Ensemble Extract Immediate Inplace | | Rc | | rb | t | sz | | sh | |
| Ensemble Floating-point | | rc | | rb | | | E.op.rnd | | |
| Ensemble Inplace | | rc | | rb | | | E.op | | |
| Ensemble Inplace Floating-point | | rc | | rb | | | E.op.rnd | | |
| Ensemble Reversed Floating-point | | rc | | rb | | | E.op.rnd | | |
| Ensemble Ternary | | rc | | rb | | | ra | | |
| Ensemble Ternary Floating-point | | rc | | rb | | | ra | | |
| Ensemble Unary | | rc | | op | | | E.UNARY | | |
| Ensemble Unary Floating-point | | rc | | op.rnd | | | E.UNARY | | |
| Wide Convolve Extract | | rc | | rb | | W.op | | | sz |
| Wide Multiply Matrix Extract | | rc | | rb | | | ra | | |
| Wide Multiply Matrix Extract Immediate | | rc | | rb | t | sz | | sh | |
| Wide Multiply Matrix Floating-point | | rc | | rb | | W.op | | | pr |
| Wide Multiply Matrix Galois | | rc | | rb | | | ra | | |
| Wide Switch | | rc | | rb | | | ra | | |
| Wide Translate | | rc | | rb | | 0 | | | sz |

Major Operation Codes

All instructions are 32 bits in size, and use the high order 8 bits to specify a major operation code.

| 31 ... 24 | 23 ... 0 |
|---|---|
| major | other |
| 8 | 24 |

The major field is filled with a value specified by the following table (Blank table entries cause the Reserved Instruction exception to occur.):

| major operation code field values | | | | | | | | |
|---|---|---|---|---|---|---|---|---|
| MAJOR | 0 | 32 | 64 | 96 | 128 | 160 | 192 | 224 |
| 0 | ARES | BEF16 | LI16L | SI16L | | XDEPOSIT | EMULXI | WMULMATXIL |
| 1 | AADDI | BEF32 | LI16B | SI16B | GADDI | | EMULADDXI | WMULMATXIB |
| 2 | AADDI.O | BEF64 | LI16AL | SI16AL | GADDI.O | | ECONXI | |
| 3 | AADDIU.O | BEF128 | LI16AB | SI16AB | GADDIU.O | | EEXTRACTI | |
| 4 | | BLGF16 | LI32L | SI32L | | XDEPOSITU | EMULX | WMULMATXL |
| 5 | ASUBI | BLGF32 | LI32B | SI32B | GSUBI | | EMULADDX | WMULMATXB |
| 6 | ASUBI.O | BLGF64 | LI32AL | SI32AL | GSUBI.O | | ECONX | WMULMATG8L |
| 7 | ASUBIU.O | BLGF128 | LI32AB | SI32AB | GSUBIU.O | | EEXTRACT | WMULMATG8B |
| 8 | ASETEI | BLF16 | LI64L | SI64L | GSETEI | XWITHDRAW | ESCALADDF16 | |
| 9 | ASETNEI | BLF32 | LI64B | SI64B | GSETNEI | | ESCALADDF32 | |
| 10 | ASETANDEI | BLF64 | LI64AL | SI64AL | GSETANDEI | | ESCALADDF64 | |
| 11 | ASETANDNEI | BLF128 | LI64AB | SI64AB | GSETANDNEI | | ESCALADDX | |
| 12 | ASETLI | BGEF16 | LI128L | SI128L | GSETLI | XWITHDRAWU | EMULG8 | |
| 13 | ASETGEI | BGEF32 | LI128B | SI128B | GSETGEI | | EMULSUMG8 | |
| 14 | ASETLIU | BGEF64 | LI128AL | SI128AL | GSETLIU | | | |
| 15 | ASETGEIU | BGEF128 | LI128AB | SI128AB | GSETGEIU | | | |
| 16 | AANDI | BE | LIU16L | SASI64AL | GANDI | XDEPOSITM | | |
| 17 | ANANDI | BNE | LIU16B | SASI64AB | GNANDI | | | |
| 18 | AORI | BANDE | LIU16AL | SCSI64AL | GORI | | | |
| 19 | ANORI | BANDNE | LIU16AB | SCSI64AB | GNORI | | | |
| 20 | AXORI | BL | LIU32L | SMSI64AL | GXORI | XSWIZZLE | | |
| 21 | AMUX | BGE | LIU32B | SMSI64AB | GMUX | | | |
| 22 | | BLU | LIU32AL | SMUXI64AL | GBOOLEAN | | | |
| 23 | | BGEU | LIU32AB | SMUXI64AB | | | | |
| 24 | ACOPYI | BVF32 | LIU64L | | GCOPYI | XEXTRACT | | |
| 25 | | BNVF32 | LIU64B | | | XSELECT8 | | |
| 26 | | BIF32 | LIU64AL | | | | | WTRANSLATEL |
| 27 | | BNIF32 | LIU64AB | | G8 | | E.8 | WTRANSLATEB |
| 28 | | BI | LI8 | SI8 | G16 | XSHUFFLE | E.16 | WSWITCHL |
| 29 | | BLINKI | LIU8 | | G32 | XSHIFTI | E.32 | WSWITCHB |
| 30 | | BHINTI | | | G64 | XSHIFT | E.64 | WMINORL |
| 31 | AMINOR | BMINOR | LMINOR | SMINOR | G128 | | E.128 | WMINORB |

Minor Operation Codes

For the major operation field values A.MINOR, B.MINOR, L.MINOR, S.MINOR, G.8, G.16, G.32, G.64, G.128, XSHIFTI, XSHIFT, E.8, E.16, E.32, E.64, E.128, W.MINOR.L and W.MINOR.B, the lowest-order six bits in the instruction specify a minor operation code:

| 31 ... 24 | 23 ... 6 | 5 ... 0 |
|---|---|---|
| major | other | minor |
| 8 | 18 | 6 |

The minor field is filled with a value from one of the following tables:

| minor operation code field values for A.MINOR | | | | | | | | |
|---|---|---|---|---|---|---|---|---|
| A.MINOR | 0 | 8 | 16 | 24 | 32 | 40 | 48 | 56 |
| 0 | | AAND | ASETE | ASETEF16 | | ASHLI | ASHLIADD | ASETEF64 |
| 1 | AADD | AXOR | ASETNE | ASETLGF16 | | | | ASETLGF64 |
| 2 | AADDO | AOR | ASETANDE | ASETLF16 | | ASHLIO | | ASETLF64 |
| 3 | AADDUO | AANDN | ASETANDNE | ASETGEF16 | | ASHLIUO | | ASETGEF64 |
| 4 | | AORN | ASETL/LZ | ASETEF32 | | | ASHLISUB | |
| 5 | ASUB | AXNOR | ASETGE/GEZ | ASETLGF32 | | | | |
| 6 | ASUBO | ANOR | ASETLU/GZ | ASETLF32 | | ASHRI | | |
| 7 | ASUBUO | ANAND | ASETGEU/LEZ | ASETGEF32 | | ASHRIU | | ACOM |

minor operation code field values for B.MINOR

| B.MINOR | 0 | 8 | 16 | 24 | 32 | 40 | 48 | 56 |
|---|---|---|---|---|---|---|---|---|
| 0 | B | | | | | | | |
| 1 | BLINK | | | | | | | |
| 2 | BHINT | | | | | | | |
| 3 | BDOWN | | | | | | | |
| 4 | BGATE | | | | | | | |
| 5 | BBACK | | | | | | | |
| 6 | BHALT | | | | | | | |
| 7 | BBARRIER | | | | | | | |

minor operation code field values for L.MINOR

| L.-MINOR | 0 | 8 | 16 | 24 | 32 | 40 | 48 | 56 |
|---|---|---|---|---|---|---|---|---|
| 0 | L16L | L64L | LU16L | LU64L | | | | |
| 1 | L16B | L64B | LU16B | LU64B | | | | |
| 2 | L16AL | L64AL | LU16AL | LU64AL | | | | |
| 3 | L16AB | L64AB | LU16AB | LU64AB | | | | |
| 4 | L32L | L128L | LU32L | L8 | | | | |
| 5 | L32B | L128B | LU32B | LU8 | | | | |
| 6 | L32AL | L128AL | LU32AL | | | | | |
| 7 | L32AB | L128AB | LU32AB | | | | | |

minor operation code field values for S.MINOR

| S.MINOR | 0 | 8 | 16 | 24 | 32 | 40 | 48 | 56 |
|---|---|---|---|---|---|---|---|---|
| 0 | S16L | S64L | SAS64AL | | | | | |
| 1 | S16B | S64B | SAS64AB | | | | | |
| 2 | S16AL | S64AL | SCS64AL | SDCS64AL | | | | |
| 3 | S16AB | S64AB | SCS64AB | SDCS64AB | | | | |
| 4 | S32L | S128L | SMS64AL | S8 | | | | |
| 5 | S32B | S128B | SMS64AB | | | | | |
| 6 | S32AL | S128AL | SMUX64AL | | | | | |
| 7 | S32AB | S128AB | SMUX64AB | | | | | |

minor operation code field values for G.size

| G.size | 0 | 8 | 16 | 24 | 32 | 40 | 48 | 56 |
|---|---|---|---|---|---|---|---|---|
| 0 | | | GSETE | GSETEF | GADDHN | GSUBHN | GSHLIADD | GADDL |
| 1 | GADD | | GSETNE | GSETLGF | GADDHZ | GSUBHZ | | GADDLU |
| 2 | GADDO | | GSETANDE | GSETLF | GADDHF | GSUBHF | | GAAA |
| 3 | GADDUO | | GSETANDNE | GSETGEF | GADDHC | GSUBHC | | |
| 4 | | | GSETL/LZ | GSETEF.X | GADDHUN | GSUBHUN | 0GSHLISUB | GSUBL |
| 5 | GSUB | | GSETGE/GEZ | GSETLGF.X | GADDHUZ | GSUBHUZ | | GSUBLU |
| 6 | GSUBO | | GSETLU/GZ | GSETLF.X | GADDHUF | GSUBHUF | | GASA |
| 7 | GSUBUO | | GSETGEU/LEZ | GSETGEF.X | GADDHUC | GSUBHUC | | GCOM |

minor operation code field values for XSHIFTI

| XSHIFTI | 0 | 8 | 16 | 24 | 32 | 40 | 48 | 56 |
|---|---|---|---|---|---|---|---|---|
| 0 | XSHLI | XSHLIO | | XSHRI | | XEXPANDI | | XCOMPRESSI |
| 1 | | | | | | | | |
| 2 | | | | | | | | |
| 3 | | | | | | | | |
| 4 | XSHLMI | XSHLIOU | XSHRMI | XSHRIU | XROTLI | XEXPANDIU | XROTRI | XCOMPRESSIU |
| 5 | | | | | | | | |
| 6 | | | | | | | | |
| 7 | | | | | | | | |

minor operation code field values for XSHIFT

| XSHIFT | 0 | 8 | 16 | 24 | 32 | 40 | 48 | 56 |
|---|---|---|---|---|---|---|---|---|
| 0 | XSHL | XSHLO | | XSHR | | XEXPAND | | XCOMPRESS |
| 1 | | | | | | | | |
| 2 | | | | | | | | |
| 3 | | | | | | | | |

-continued

| minor operation code field values for XSHIFT | | | | | | | | |
|---|---|---|---|---|---|---|---|---|
| XSHIFT | 0 | 8 | 16 | 24 | 32 | 40 | 48 | 56 |
| 4 | XSHLM | XSHLOU | XSHRM | XSHRU | XROTL | XEXPANDU | XROTR | XCOMPRESSU |
| 5 | | | | | | | | |
| 6 | | | | | | | | |
| 7 | | | | | | | | |

| minor operation code field values for E.size or E.prec | | | | | | | | |
|---|---|---|---|---|---|---|---|---|
| E.size | 0 | 8 | 16 | 24 | 32 | 40 | 48 | 56 |
| 0 | EMULFN | EMULADDFN | EADDFN | ESUBFN | EMUL | EMULADD | EDIVFN | ECON |
| 1 | EMULFZ | EMULADDFZ | EADDFZ | ESUBFZ | EMULU | EMULADDU | EDIVFZ | ECONU |
| 2 | EMULFF | EMULADDFF | EADDFF | ESUBFF | EMULM | EMULADDM | EDIVFF | ECONM |
| 3 | EMULFC | EMULADDFC | EADDFC | ESUBFC | EMULC | EMULADDC | EDIVFC | ECONC |
| 4 | EMULFX | EMULADDFX | EADDFX | ESUBFX | EMULSUM | EMULSUB | EDIVFX | EDIV |
| 5 | EMULF | EMULADDF | EADDF | ESUBF | EMULSUMU | EMULSUBU | EDIVF | EDIVU |
| 6 | EMULCF | EMULADDCF | ECONF | ECONCF | EMULSUMM | EMULSUBM | EMULSUMF | EMULP |
| 7 | EMULSUMCF | EMULSUBCF | | | EMULSUMC | EMULSUBC | EMULSUBF | EUNARY |

| minor operation code field values for W.MINOR.L or W.MINOR.B | | | | | | | | |
|---|---|---|---|---|---|---|---|---|
| W.MINOR.order | 0 | 8 | 16 | 24 | 32 | 40 | 48 | 56 |
| 0 | WMULMAT8 | WMULMATM8 | | | | | | |
| 1 | WMULMAT16 | WMULMATM16 | WMULMATF16 | | | | | |
| 2 | WMULMAT32 | WMULMATM32 | WMULMATF32 | | | | | |
| 3 | | | WMULMATF64 | | | | | |
| 4 | WMULMATU8 | WMULMATC8 | | WMULMATP8 | | | | |
| 5 | WMULMATU16 | WMULMATC16 | WMULMATCF16 | WMULMATP16 | | | | |
| 6 | WMULMATU32 | | WMULMATCF32 | WMULMATP32 | | | | |
| 7 | | | | | | | | |

For the major operation field values E.MUL.X.I, E.MUL.ADD.X.I, E.CON.X.I, E.EXTRACT.I, W.MUL. MAT.X.I.L, W.MUL.MAT.X.I.B, another six bits in the instruction specify a minor operation code, which indicates operand size, rounding, and shift amount:

| 31 24 | 23 6 | 5 0 |
|---|---|---|
| major | other | minor |
| 8 | 18 | 6 |

The minor field is filled with a value from the following table, where the values are a tuple of the operand format (S [default], U or C) and group (symbol) size (8, 16, 32, 64), and shift amount (0, 1, 2, 3, −4, −5, −6, −7 plus group size). The E.EXTRACT.I instruction provides for signed or unsigned formats, while the other instructions provide for signed or complex formats. The shift amount field value shown below is the "i" value, which is the immediate field in the assembler format.

| minor operation code field values for EMULXI, EMULADDXI, ECONXI, EEXTRACTI, WMULMATXIL, WMULMATXIB, | | | | | | | | |
|---|---|---|---|---|---|---|---|---|
| XI | 0 | 8 | 16 | 24 | 32 | 40 | 48 | 56 |
| 0 | 8, 8 | 16, 16 | 32, 32 | 64, 64 | U/C 8, 8 | U/C 16, 16 | U/C 32, 32 | U/C 64, 64 |
| 1 | 8, 9 | 16, 17 | 32, 33 | 64, 65 | U/C 8, 9 | U/C 16, 17 | U/C 32, 33 | U/C 64, 65 |
| 2 | 8, 10 | 16, 18 | 32, 34 | 64, 66 | U/C 8, 10 | U/C 16, 18 | U/C 32, 34 | U/C 64, 66 |
| 3 | 8, 11 | 16, 19 | 32, 35 | 64, 67 | U/C 8, 11 | U/C 16, 19 | U/C 32, 35 | U/C 64, 67 |

-continued

| minor operation code field values for EMULXI, EMULADDXI, ECONXI, EEXTRACTI, WMULMATXIL, WMULMATXIB, | | | | | | | | |
|---|---|---|---|---|---|---|---|---|
| XI | 0 | 8 | 16 | 24 | 32 | 40 | 48 | 56 |
| 4 | 8, 4 | 16, 12 | 32, 28 | 64, 60 | U/C 8, 4 | U/C 16, 12 | U/C 32, 28 | U/C 64, 60 |
| 5 | 8, 5 | 16, 13 | 32, 29 | 64, 61 | U/C 8, 5 | U/C 16, 13 | U/C 32, 29 | U/C 64, 61 |
| 6 | 8, 6 | 16, 14 | 32, 30 | 64, 62 | U/C 8, 6 | U/C 16, 14 | U/C 32, 30 | U/C 64, 62 |
| 7 | 8, 7 | 16, 15 | 32, 31 | 64, 63 | U/C 8, 7 | U/C 16, 15 | U/C 32, 31 | U/C 64, 63 |

For the major operation field values GCOPYI, two bits in the instruction specify an operand size:

| 31 24 | 23 18 | 17 16 | 15 |
|---|---|---|---|
| op | rd | sz | imm |
| 8 | 6 | 2 | 16 |

For the major operation field values G.AND.I, G.NAND.I, G.NOR.I, G.OR.I, G.XOR.I, G.ADD.I, G.ADD.I.O, G.ADD.I.UO, G.SET.AND.E.I, G.SET.AND.NE.I, G.SET.E.I, G.SET.GE.I, G.SET.L.I, G.SET.NE.I, G.SET. GE.I.U, G.SET.L.I.U, G.SUB.I, G.SUB.I.O, G.SUB.I.UO, two bits in the instruction specify an operand size:

| 31 24 | 23 18 | 17 12 | 11 10 | 9 |
|---|---|---|---|---|
| op | rd | rc | sz | imm |
| 8 | 6 | 6 | 2 | 10 |

The sz field is filled with a value from the following table:

| operand size field values for G.COPY.I, GAND.I, G.NAND.I, G.NOR.I, G.OR.I, G.XOR.I, G.ADD.I, G.ADD.I.O, G.ADD.I.UO, G.SET.AND.E.I, G.SET.AND.NE.I, G.SET.E.I, G.SET.GE.I, G.SET.L.I, G.SET.NE.I, G.SET.GE.I.U, G..SET.L.I.U, G.SUB.I, G.SUB.I.O, G.SUB.I.UO | |
|---|---|
| sz | size |
| 0 | 16 |
| 1 | 32 |

-continued

| operand size field values for G.COPY.I, GAND.I, G.NAND.I, G.NOR.I, G.OR.I, G.XOR.I, G.ADD.I, G.ADD.I.O, G.ADD.I.UO, G.SET.AND.E.I, G.SET.AND.NE.I, G.SET.E.I, G.SET.GE.I, G.SET.L.I, G.SET.NE.I, G.SET.GE.I.U, G..SET.L.I.U, G.SUB.I, G.SUB.I.O, G.SUB.I.UO | |
|---|---|
| sz | size |
| 2 | 64 |
| 3 | 128 |

For the major operation field values E.8, E.16, E.32, E.64, E.128, with minor operation field value E.UNARY, another six bits in the instruction specify a unary operation code:

| 31 24 | 23 18 | 17 12 | 11 6 | 5 0 |
|---|---|---|---|---|
| major | rd | rc | unary | minor |
| 8 | 6 | 6 | 6 | 6 |

The unary field is filled with a value from the following table:

| unary operation code field values for E.UNARY.size | | | | | | | | |
|---|---|---|---|---|---|---|---|---|
| E.UNARY | 0 | 8 | 16 | 24 | 32 | 40 | 48 | 56 |
| 0 | ESQRFN | ESUMFN | ESINKFN | EFLOATFN | EDEFLATEFN | ESUM | | |
| 1 | ESQRFZ | ESUMFZ | ESINKFZ | EFLOATFZ | EDEFLATEFZ | ESUMU | ESINKFZD | |
| 2 | ESQRFF | ESUMFF | ESINKFF | EFLOATFF | EDEFLATEFF | ELOGMOST | ESINKFFD | |
| 3 | ESQRFC | ESUMFC | ESINKFC | EFLOATFC | EDEFLATEFC | ELOGMOSTU | ESINKFCD | |
| 4 | ESQRFX | ESUMFX | ESINKFX | EFLOATFX | EDEFLATEFX | ESUMC | | |
| 5 | ESQRF | ESUMF | ESINKF | EFLOATF | EDEFLATEF | ESUMCF | | |
| 6 | ERSQRESTFX | ERECESTFX | EABSFX | ENEGFX | EINFLATEFX | ESUMP | ECOPYFX | |
| 7 | ERSQRESTF | ERECESTF | EABSF | ENEGF | EINFLATEF | | ECOPYF | |

For the major operation field values A.MINOR and G.MINOR, with minor operation field values A.COM and G.COM, another six bits in the instruction specify a comparison operation code:

| 31 24 | 23 18 | 17 12 | 11 6 | 5 0 |
|---|---|---|---|---|
| major | rd | rc | compare | minor |
| 8 | 6 | 6 | 6 | 6 |

The compare field for A.COM is filled with a value from the following table:

| compare operation code field values for A.COM.op.size | | | | | | | | |
|---|---|---|---|---|---|---|---|---|
| A.COM | 0 | 8 | 16 | 24 | 32 | 40 | 48 | 56 |
| 0 | ACOME | ACOMEF16 | | ACOMEF64 | | | | |
| 1 | ACOMNE | ACOMLGF16 | | ACOMLGF64 | | | | |
| 2 | ACOMANDE | ACOMLF16 | | ACOMLF64 | | | | |
| 3 | ACOMANDNE | ACOMGEF16 | | ACOMGEF64 | | | | |
| 4 | ACOML | ACOMEF32 | | | | | | |
| 5 | ACOMGE | ACOMLGF32 | | | | | | |
| 6 | ACOMLU | ACOMLF32 | | | | | | |
| 7 | AxCOMGEU | ACOMGEF32 | | | | | | |

The compare field for G.COM is filled with a value from the following table:

| compare operation code field values for G.COM.op.size | | | | | | | | |
|---|---|---|---|---|---|---|---|---|
| G.COM | 0 | 8 | 16 | 24 | 32 | 40 | 48 | 56 |
| 0 | GCOME | GCOMEF | | | | | | |
| 1 | GCOMNE | GCOMLGF | | | | | | |
| 2 | GCOMANDE | GCOMLF | | | | | | |
| 3 | GCOMANDNE | GCOMGEF | | | | | | |
| 4 | GCOML | GCOMEF.X | | | | | | |
| 5 | GCOMGE | GCOMLGF.X | | | | | | |
| 6 | GCOMLU | GCOMLF.X | | | | | | |
| 7 | GCOMGEU | GCOMGEF.X | | | | | | |

General Forms

The general forms of the instructions coded by a major operation code are one of the following:

| 31 24 | 23 0 |
|---|---|
| major | offset |
| 8 | 24 |

| 31 24 | 23 18 | 17 0 |
|---|---|---|
| major | rd | offset |
| 8 | 6 | 24 |

| 31 24 | 23 18 | 17 12 | 11 0 |
|---|---|---|---|
| major | rd | rc | offset |
| 8 | 6 | 6 | 12 |

| 31 24 | 23 18 | 17 12 | 11 6 | 5 0 |
|---|---|---|---|---|
| major | rd | rc | rb | ra |
| 8 | 6 | 6 | 6 | 6 |

The general forms of the instructions coded by major and minor operation codes are one of the following:

| 31 24 | 23 18 | 17 12 | 11 6 | 5 0 |
|---|---|---|---|---|
| major | rd | rc | rb | minor |
| 8 | 6 | 6 | 6 | 6 |

-continued

| 31 24 | 23 18 | 17 12 | 11 6 | 5 0 |
|---|---|---|---|---|
| major | rd | rc | simm | minor |
| 8 | 6 | 6 | 6 | 6 |

The general form of the instructions coded by major, minor, and unary operation codes is the following:

| 31 24 | 23 18 | 17 12 | 11 6 | 5 0 |
|---|---|---|---|---|
| major | rd | rc | unary | minor |
| 8 | 6 | 6 | 6 | 6 |

General register rd is either a source general register or destination general register, or both. General registers rc and rb are always source general registers. General register ra is either a source general register or a destination general register.

Instruction Fetch

An exemplary embodiment of Instruction Fetch is shown in FIG. 40A.

Perform Exception

An exemplary embodiment of Perform Exception is shown in FIG. 40B.

Instruction Decode

An exemplary embodiment of Instruction Decode is shown in FIG. 40C.

Wide Operations

Particular examples of wide operations which are defined by the present invention include the Wide Switch instruction that performs bit-level switching; the Wide Translate instruction which performs byte (or larger) table lookup; Wide Multiply Matrix; Wide Multiply Matrix Extract and Wide Multiply Matrix Extract Immediate (discussed below), Wide Multiply Matrix Floating-point, and Wide Multiply Matrix Galois (also discussed below). While the discussion below focuses on particular sizes for the exemplary instructions, it will be appreciated that the invention is not limited to a particular width.

Wide Switch

An exemplary embodiment of the Wide Switch instruction is shown in FIGS. 12A-12F. In an exemplary embodiment, the Wide Switch instruction rearranges the contents of up to two registers (256 bits) at the bit level, producing a full-width (128 bits) register result. To control the rearrangement, a wide operand specified by a single register, consisting of eight bits per bit position is used. For each result bit position, eight wide operand bits for each bit position select which of the 256 possible source register bits to place in the result. When a wide operand size smaller than 128 bytes is specified, the high order bits of the memory operand are replaced with values corresponding to the result bit position, so that the memory operand specifies a bit selection within symbols of the operand size, performing the same operation on each symbol.

In an exemplary embodiment, these instructions take an specifier from a general register to fetch a large operand from memory, a second operand from a general register, perform a group of operations on partitions of bits in the operands, and catenate the results together, placing the result in a general register. An exemplary embodiment of the format 1210 of the Wide Switch instruction is shown in FIG. 12A.

Figure 12B:
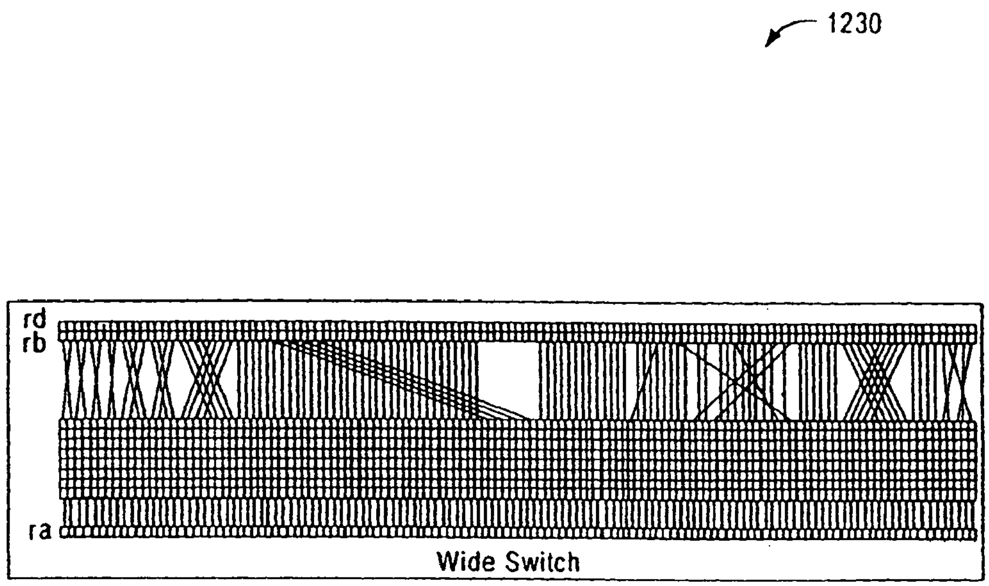

An exemplary embodiment of a schematic 1230 of the Wide Switch instruction is shown in FIG. 12B. In an exemplary embodiment, the contents of register rc specifies a virtual address apd optionally an operand size, and a value of specified size is loaded from memory.

The contents of general register rc are used as a wide operand specifier. This specifier determines the virtual address, wide operand size and shape for a wide operand. Using the virtual address and operand size, a value of specified size is loaded from memory.

A second value is the catenated contents of registers rd and rb. Eight corresponding bits from the memory value are used to select a single result bit from the second value, for each corresponding bit position. The group of results is catenated and placed in register ra.

In an exemplary embodiment, the virtual address must either be aligned to 128 bytes, or must be the sum of an aligned address and one-half of the size of the memory operand in bytes. An aligned address must be an exact multiple of the size expressed in bytes. The size of the memory operand must be 8, 16, 32, 64, or 128 bytes. If the address is not valid an "access disallowed by virtual address" exception occurs.

The wide-switch instructions (W.SWITCH.B, W.SWITCH.L) perform a crossbar switch selection of a maximum size limited by the extent of the memory operands, and by the size of the data path. The extent of the memory operands is always specified as powers of two.

Figure 12E:
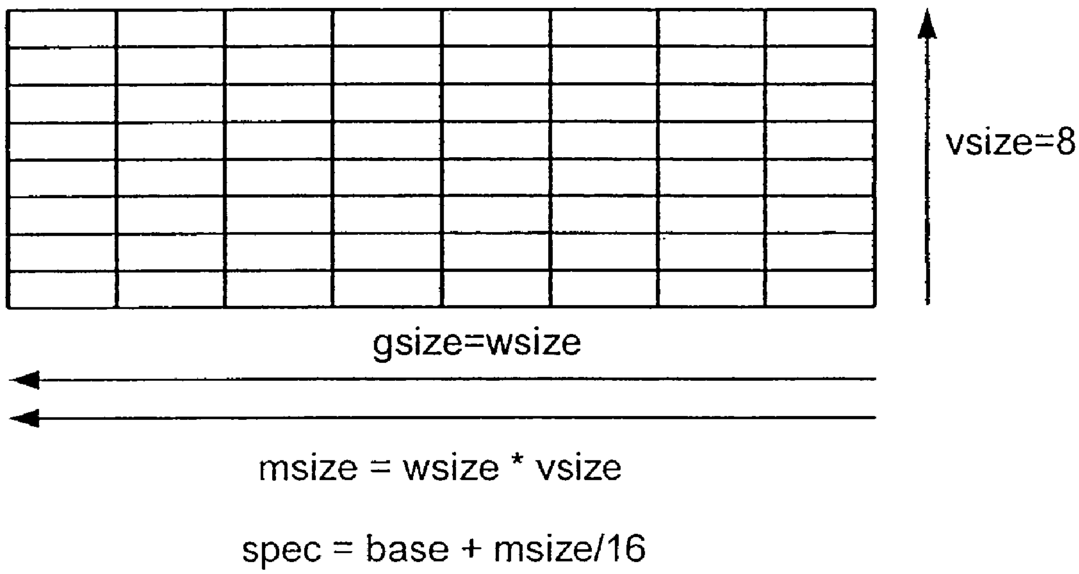

Referring to FIG. 12E, the wide operand specifier specifies a memory operand extent (msize) by adding one-half the desired memory operand extent in bytes to the specifier. Valid specifiers for these instructions must specify msize bounded by $64 \leqq msize \leqq 1024$. The vertical size for the wide-switch instruction is always 8, so wsize can be inferred to be wsize=msize/8, bounded by $8 \leqq wsize \leqq 128$. Exceeding these bounds raises the OperandBoundary exception.

The virtual addresses of the wide operands must be aligned, that is, the byte addresses must be an exact multiple of the operand extent expressed in bytes. If the addresses are not aligned the virtual address cannot be encoded into a valid specifier. Some invalid specifiers cause an "Operand Boundary" exception.

When a size smaller than 128 bits is specified, the high order bits of the memory operand are replaced with values corresponding to the bit position, so that the same memory operand specifies a bit selection within symbols of the operand size, and the same operation is performed on each symbol.

In an exemplary embodiment, a wide switch (W.SWITCH.L or W.SWITCH.B) instruction specifies an 8-bit location for each result bit from the memory operand, that selects one of the 256 bits represented by the catenated contents of registers rd and rb.

An exemplary embodiment of the pseudocode 1250 of the Wide Switch instruction is shown in FIG. 12C. An alternative embodiment of the pseudocode of the Wide Switch instruction is shown in FIG. 12F. An exemplary embodiment of the exceptions 1280 of the Wide Switch instruction is shown in FIG. 12D.

Wide Translate

An exemplary embodiment of the Wide Translate instruction is shown in FIGS. 13A-13G. In an exemplary embodiment, the Wide Translate instructions use a wide operand to specify a table of depth up to 256 entries and width of up to 128 bits. The contents of a register is partitioned into operands of one, two, four, or eight bytes, and the partitions are used to select values from the table in parallel. The depth and width of the table can be selected by specifying the size and shape of the wide operand as described above.

In an exemplary embodiment, these instructions take an specifier from a general register to fetch a large operand from memory, a second operand from a general register, perform a group of operations on partitions of bits in the operands, and catenate the results together, placing the result in a general register. An exemplary embodiment of the format 1310 of the Wide Translate instruction is shown in FIG. 13A.

Figure 13B:
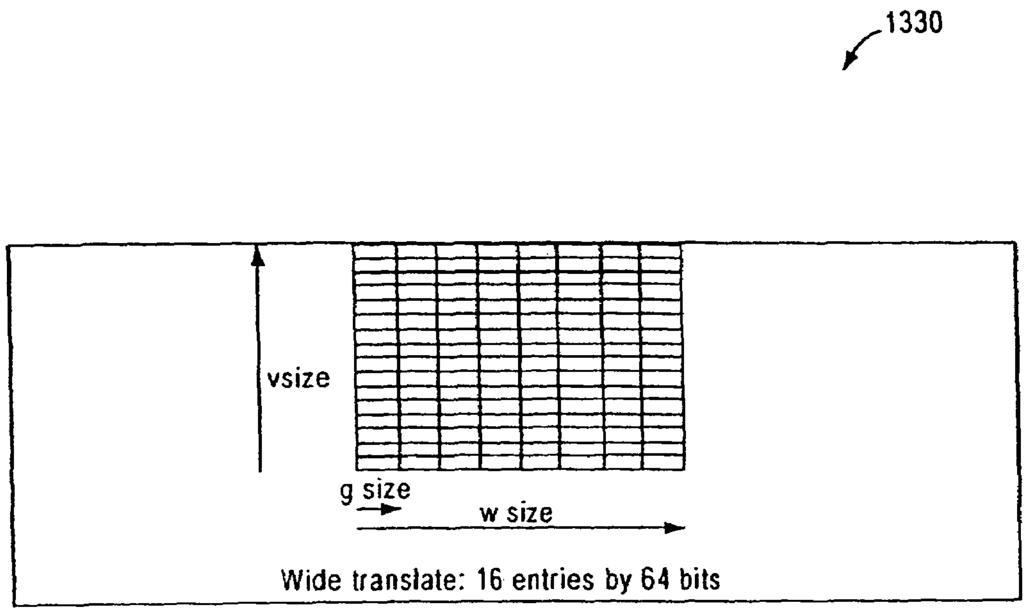

An exemplary embodiment of the schematic 1330 of the Wide Translate instruction is shown in FIG. 13B. In an exemplary embodiment, the contents of register rc is used as a virtual address, and a value of specified size is loaded from memory.

The contents of general register rc are used as a wide operand specifier. This specifier determines the virtual address, wide operand size and shape for a wide operand. Using the virtual address and operand size, a value of specified size is loaded from memory.

A second value is the contents of register rb. The values are partitioned into groups of operands of a size specified. The low-order bytes of the second group of values are used as addresses to choose entries from one or more tables constructed from the first value, producing a group of values. The group of results is catenated and placed in register rd.

In an exemplary embodiment, by default, the total width of tables is 128 bits, and a total table width of 128, 64, 32, 16 or 8 bits, but not less than the group size may be specified by adding the desired total table width in bytes to the specified address: 16, 8, 4, 2, or 1. When fewer than 128 bits are specified, the tables repeat to fill the 128 bit width.

In an exemplary embodiment, the default depth of each table is 256 entries, or in bytes is 32 times the group size in bits. An operation may specify 4, 8, 16, 32, 64, 128 or 256 entry tables, by adding one half of the memory operand size to the address.

The wide-translate instructions (W.TRANSLATE.L, W.TRANSLATE.B) perform a partitioned vector translation of a maximum size limited by the extent of the memory operands, and by the size of the data path. The extent, size and shape parameters of the memory operands are always specified as powers of two.

Figure 13E:
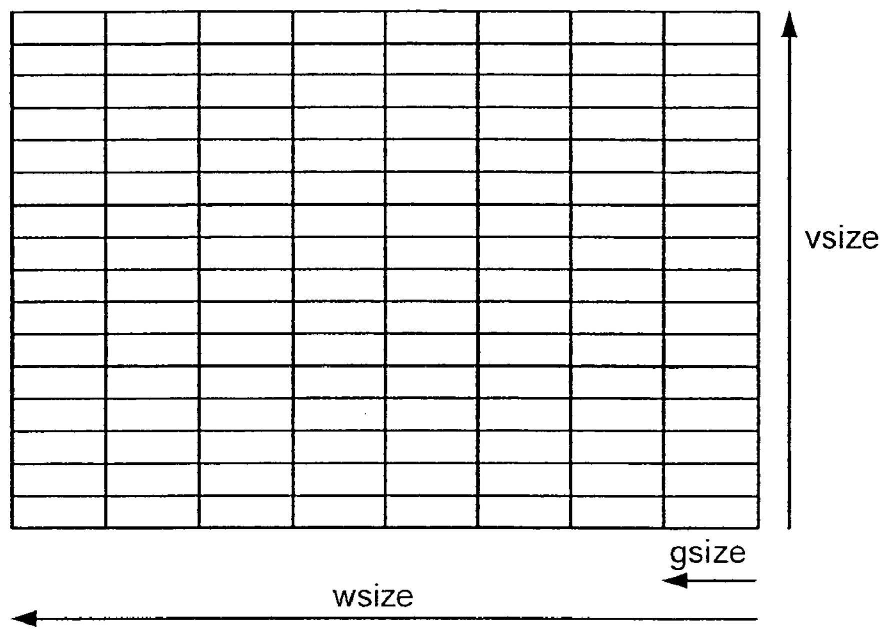

Referring to FIG. 13E, the wide operand specifier specifies a memory operand extent (msize) by adding one-half the desired memory operand extent in bytes to the specifier. The wide operand specifier specifies a memory operand shape by adding the desired width in bytes to the specifier. The height of the memory operand (vsize) can be inferred by dividing the operand extent (msize) by the operand width (wsize). Valid specifiers for these instructions must specify wsize bounded by $gsize \leqq wsize \leqq 128$, and vsize bounded by $4 \leqq vsize \leqq 2^{gsize}$, so msize=wsize*vsize is bounded by $4*wsize \leqq msize \leqq 2^{gsize}*wsize$. Exceeding these bounds raises the OperandBoundary exception.

The virtual addresses of the wide operands must be aligned, that is, the byte addresses must be an exact multiple of the operand extent expressed in bytes. If the addresses are not aligned the virtual address cannot be encoded into a valid specifier. Some invalid specifiers cause an "Operand Boundary" exception.

Table index values are masked to ensure that only the specified portion of the table is used. Tables with just 2 entries cannot be specified; if 2-entry tables are desired, it is recommended to load the entries into registers and use G.MUX to select the table entries.

In an exemplary embodiment, failing to initialize the entire table is a potential security hole, as an instruction in with a small-depth table could access table entries previously initialized by an instruction with a large-depth table. This security hole may be closed either by initializing the entire table, even if extra cycles are required, or by masking the index bits so that only the initialized portion of the table is used. An exemplary embodiment may initialize the entire table with no penalty in cycles by writing to as many as 128 table entries at once. Initializing the entire table with writes to only one entry at a time requires writing 256 cycles, even when the table is smaller. Masking the index bits is the preferred solution.

In an exemplary embodiment, masking the index bits suggests that this instruction, for tables larger than 256 entries, may be extended to a general-purpose memory translate function where the processor performs enough independent load operations to fill the 128 bits. Thus, the 16, 32, and 64 bit versions of this function perform equivalent of 8, 4, 2 withdraw, 8, 4, or 2 load-indexed and 7, 3, or 1 group-extract instructions. In other words, this instruction can be as powerful as 23, 11, or 5 previously existing instructions. The 8-bit version is a single cycle operation replacing 47 existing instructions, so these extensions are not as powerful, but nonetheless, this is at least a 50% improvement on a 2-issue processor, even with one cycle per load timing. To make this possible, the default table size becomes 65536, 2^32 and 2^64 for 16, 32 and 64-bit versions of the instruction.

In an exemplary embodiment, for the big-endian version of this instruction, in the definition below, the contents of register rb is complemented. This reflects a desire to organize the table so that the lowest addressed table entries are selected when the index is zero. In the logical implementation, complementing the index can be avoided by loading the table memory differently for big-endian and little-endian versions; specifically by loading the table into memory so that the highest-addressed table entries are selected when the index is zero for a big-endian version of the instruction. In an exemplary embodiment of the logical implementation, complementing the index can be avoided by loading the table memory differently for big endian and little endian versions. In order to avoid complementing the index, the table memory is loaded differently for big-endian versions of the instruction by complementing the addresses at which table entries are written into the table for a big-endian version of the instruction.

This instruction can perform translations for tables larger than 256 entries when the group size is greater than 8. For tables of this size, copying the wide operand into separate memories to allow simultaneous access at differing addresses is likely to be prohibitive. However, this operation can be performed by producing a stream of addresses in serial fashion to the main memory system, or with whatever degree of parallelism the memory system can provide, such as by interleaving, pipelining, or multiple-porting. To make this possible, the maximum table size becomes 65536, 232 and 264 for 16, 32 and 64-bit versions of the instruction.

An implementation may limit the extent, width or depth of operands due to limits on the operand memory or cache, and thereby cause a ReservedInstruction exception. For example, it may limit the depth of translation tables to 256.

In an exemplary embodiment, the virtual address must either be aligned to 4096 bytes, or must be the sum of an aligned address and one-half of the size of the memory operand in bytes and/or the desired total table width in bytes. An aligned address must be an exact multiple of the size expressed in bytes. The size of the memory operand must be a power of two from 4 to 4096 bytes, but must be at least 4 times the group size and 4 times the total table width. If the address is not valid an "access disallowed by virtual address" exception occurs.

Figure 13F:
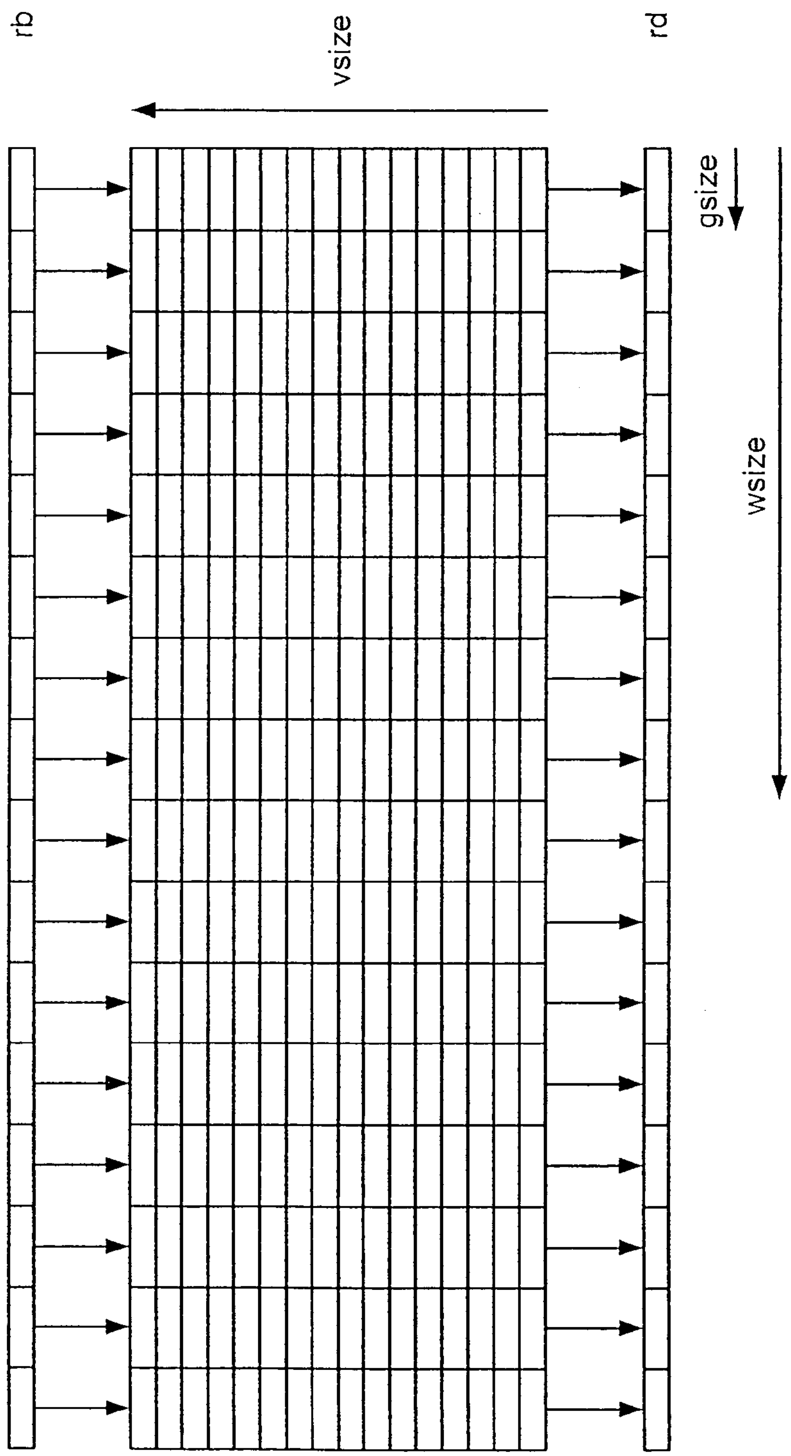

In an exemplary embodiment, a wide translate (W.TRANSLATE.8.L or W.TRANSLATE.8.B) instruction specifies a translation table of 16 entries (vsize=16) in depth, a group size of 1 byte (gsize=8 bits), and a width of 8 bytes (wsize=64 bits) as shown in FIG. 13F. The wide operand specifier specifies a total table size (msize=1024 bits=vsize*wsize) and a table width (wsize=64 bits) by adding one half of the size in bytes of the table (64) and adding the size in bytes of the table width (8) to the table address in the wide operand specifier The operation will create duplicates of this table in the upper and lower 64 bits of the data path, so that 128 bits of operand are processed at once, yielding a 128 bit result. The operation uses the low-order 4 bits of each byte of the contents of general register rb as an address into memory containing byte-wide slices of the wide operand, producing byte results, which are catenated and placed into register rd.

An exemplary embodiment of the pseudocode 1350 of the Wide Translate instruction is shown in FIG. 13C. An alternative embodiment of the pseudocode of the Wide Translate instruction is shown in FIG. 13G. An exemplary embodiment of the exceptions 1380 of the Wide Translate instruction is shown in FIG. 13D.

Wide Multiply Matrix

An exemplary embodiment of the Wide Multiply Matrix instruction is shown in FIGS. 14A-14G. In an exemplary embodiment, the Wide Multiply Matrix instructions use a wide operand to specify a matrix of values of width up to 64 bits (one half of register file and data path width) and depth of up to 128 bits/symbol size. The contents of a general register (128 bits) is used as a source operand, partitioned into a vector of symbols, and multiplied with the matrix, producing a vector of width up to 128 bits of symbols of twice the size of the source operand symbols. The width and depth of the matrix can be selected by specifying the size and shape of the wide operand as described above. Controls within the instruction allow specification of signed, mixed signed, unsigned, complex, or polynomial operands.

In an exemplary embodiment, these instructions take a specifier from a general register to fetch a large operand from memory, a second operand from a general register, perform a group of operations on partitions of bits in the operands, and catenate the results together, placing the result in a general register. An exemplary embodiment of the format 1410 of the Wide Multiply Matrix instruction is shown in FIG. 14A.

Figure 14B:
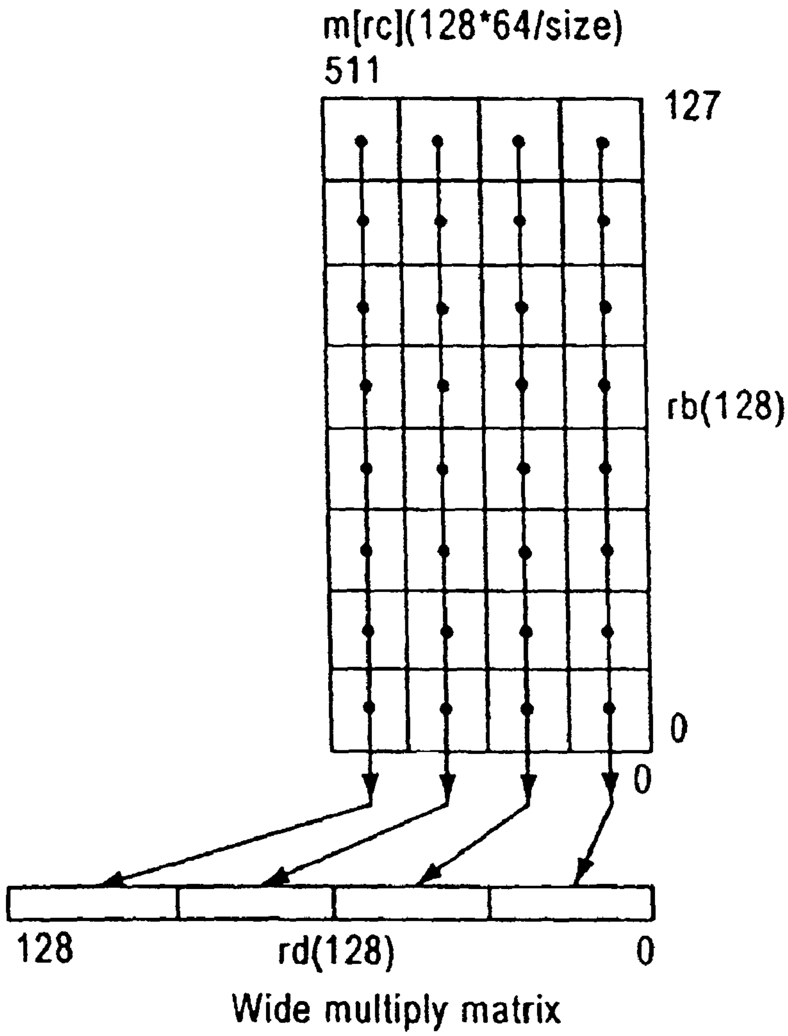
Figure 14C:
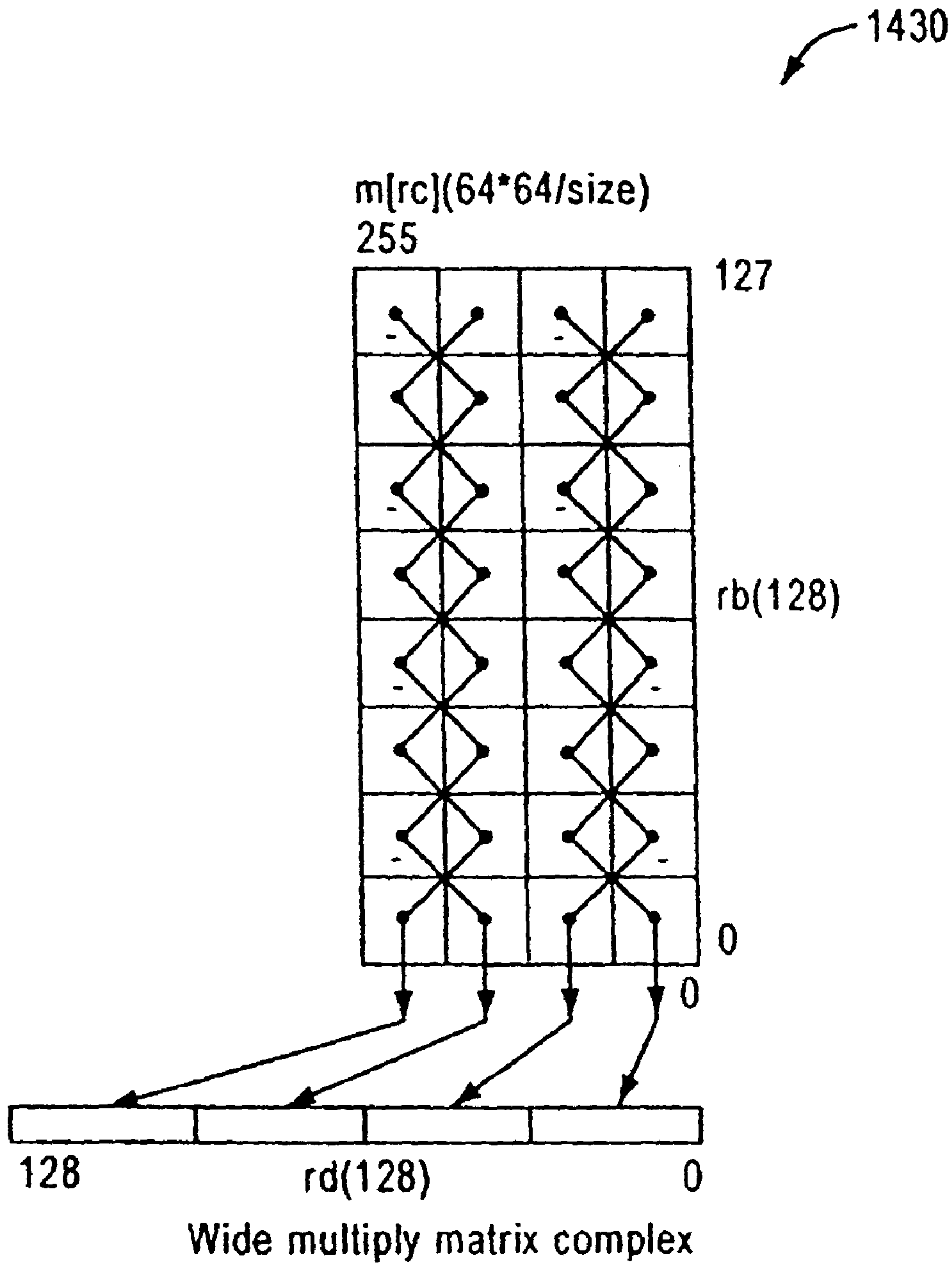

An exemplary embodiment of the schematics 1430 and 1460 of the Wide Multiply Matrix instruction is shown in FIGS. 14B and 14C. In an exemplary embodiment, the contents of register rc is used as a virtual address, and a value of specified size is loaded from memory.

The contents of general register rc are used as a wide operand specifier. This specifier determines the virtual address, wide operand size and shape for a wide operand. Using the virtual address and operand size a value of specified size is loaded from memory.

A second value is the contents of register rb. The values are partitioned into groups of operands of the size specified. The second values are multiplied with the first values, then summed in columns, producing a group of result values, each of which is twice the size specified. The group of result values is catenated and placed in register rd.

In an exemplary embodiment, the wide-multiply-matrix instructions (W.MUL.MAT, W.MUL.MAT.C, W.MUL.MAT.M, W.MUL.MAT.P, W.MUL.MAT.U) perform a partitioned array multiply of up to 8192 bits, that is 64×128 bits. The width of the array can be limited to 64, 32, or 16 bits, but not smaller than twice the group size, by adding one half the desired size in bytes to the virtual address operand: 4, 2, or 1. The array can be limited vertically to 128, 64, 32, or 16 bits, but not smaller than twice the group size, by adding one-half the desired memory operand size in bytes to the virtual address operand.

The wide-multiply-matrix instructions (W.MUL.MAT, W.MUL.MAT.C, W.MUL.MAT.M, W.MUL.MAT.P, W.MUL.MAT.U) perform a partitioned array multiply of a maximum size limited by the extent of the memory operands, and by the size of the data path. The extent, size and shape parameters of the memory operands are always specified as powers of two.

Figure 14F:
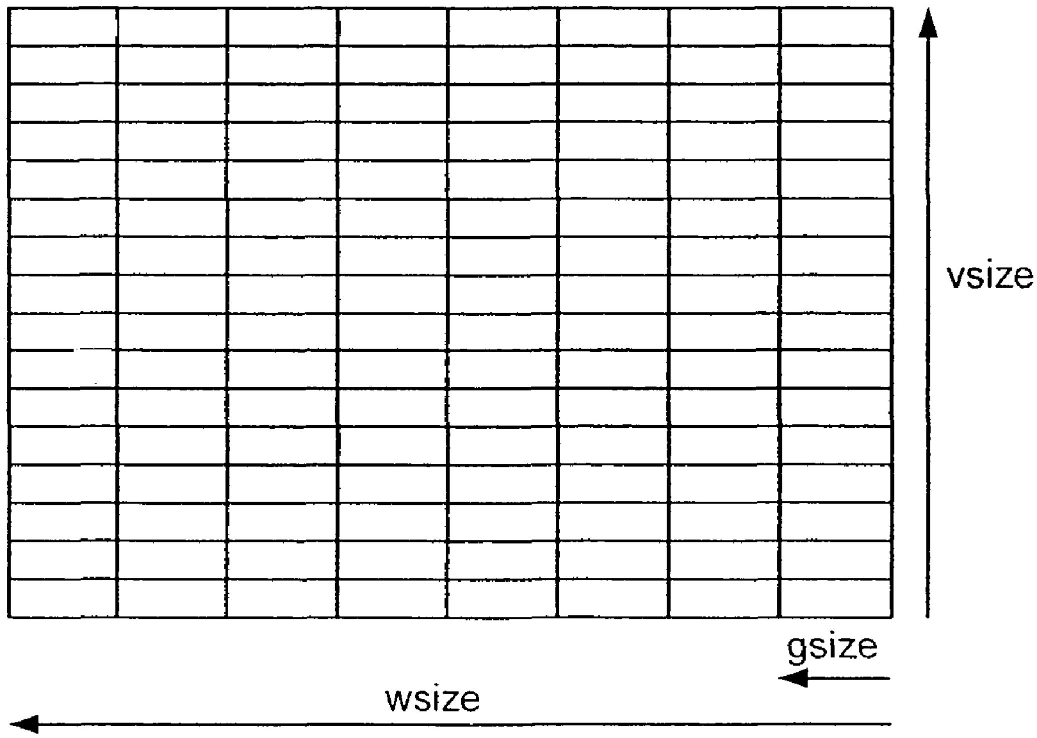

Referring to FIG. 14F, the wide operand specifier specifies a memory operand extent (msize) by adding one-half the desired memory operand extent in bytes to the specifier. The wide operand specifier specifies a memory operand shape by adding one-half the desired width in bytes to the specifier. The height of the memory operand (vsize) can be inferred by dividing the operand extent (msize) by the operand width (wsize). Valid specifiers for these instructions must specify wsize bounded by $\max(16, gsize*(1+n)) \leqq wsize \leqq 64$, and msize bounded by $2*wsize \leqq msize \leqq (128/(gsize*(1+n))*wsize$, where n=0 for real operands (W.MUL.MAT, W.MUL.MAT.M, W.MUL.MAT.P, W.MUL.MAT.U) and n=1 for complex operands (W.MUL.MAT.C). Exceeding these bounds raises the OperandBoundary exception.

In an exemplary embodiment, the virtual address must either be aligned to 1024/gsize bytes (or 512/gsize for W.MUL.MAT.C) (with gsize measured in bits), or must be the sum of an aligned address and one half of the size of the memory operand in bytes and/or one quarter of the size of the result in bytes. An aligned address must be an exact multiple of the size expressed in bytes. If the address is not valid an "access disallowed by virtual address" exception occurs.

The virtual addresses of the wide operands must be aligned, that is, the byte addresses must be an exact multiple of the operand extent expressed in bytes. If the addresses are not aligned the virtual address cannot be encoded into a valid specifier. Some invalid specifiers cause an "Operand Boundary" exception In an exemplary embodiment, a wide multiply octlets instruction (W.MUL.MAT.type.64, type=NONE M U P) is not implemented and causes a reserved instruction exception, as an ensemble-multiply-sum-octlets instruction (E.MUL.SUM.type.64) performs the same operation except that the multiplier is sourced from a 128-bit register rather than memory. Similarly, instead of wide-multiply-complex-quadlets instruction (W.MUL.MAT.C.32), one should use an ensemble-multiply-complex-quadlets instruction (E.MUL.SUM.C.32).

As shown in FIG. 14B, an exemplary embodiment of a wide-multiply-doublets instruction (W.MUL.MAT, W.MUL.MAT.M, W.MUL.MAT.P, W.MUL.MAT.U) multiplies memory [m31 m30 . . . m1 m0] with vector [h g f e d c b a], yielding products [hm31+gm27+ . . . +bm7+am3. . . hm28+gm24+ . . . +bm4+am0].

As shown in FIG. 14C, an exemplary embodiment of a wide-multiply-matrix-complex-doublets instruction (W.MUL.MAT.C) multiplies memory [m15 m14. . . m1 m0] with vector [h g f e d c b a], yielding products [hm14+gm15+ . . . +bm2+am3 . . . hm12+gm13+ . . . +bm0+am1hm13+gm12+ . . . bm1+am0]

An exemplary embodiment of the pseudocode 1480 of the Wide Multiply Matrix instruction is shown in FIG. 14D. An alternative embodiment of the pseudocode of the Wide Multiply Matrix instruction is shown in FIG. 14G. An exemplary embodiment of the exceptions 1490 of the Wide Multiply Matrix instruction is shown in FIG. 14E.

Wide Multiply Matrix Extract

An exemplary embodiment of the Wide Multiply Matrix Extract instruction is shown in FIGS. 15A-15H. In an exemplary embodiment, the Wide Multiply Matrix Extract instructions use a wide operand to specify a matrix of value of width up to 128 bits (full width of register file and data path) and depth of up to 128 bits/symbol size. The contents of a general register (128 bits) is used as a source operand, partitioned into a vector of symbols, and multiplied with the matrix, producing a vector of width up to 256 bits of symbols of twice the size of the source operand symbols plus additional bits to represent the sums of products without overflow. The results are then extracted in a manner described below (Enhanced Multiply Bandwidth by Result Extraction), as controlled by the contents of a general register specified by the instruction. The general register also specifies the format of the operands: signed, mixed-signed, unsigned, and complex as well as the size of the operands, byte (8 bit), doublet (16 bit), quadlet (32 bit), or hexlet (64 bit).

In an exemplary embodiment, these instructions take an specifier from a general register to fetch a large operand from memory, a second operand from a general register, perform a group of operations on partitions of bits in the operands, and catenate the results together, placing the result in a general register. An exemplary embodiment of the format 1510 of the Wide Multiply Matrix Extract instruction is shown in FIG. 15A.

Figure 15B:
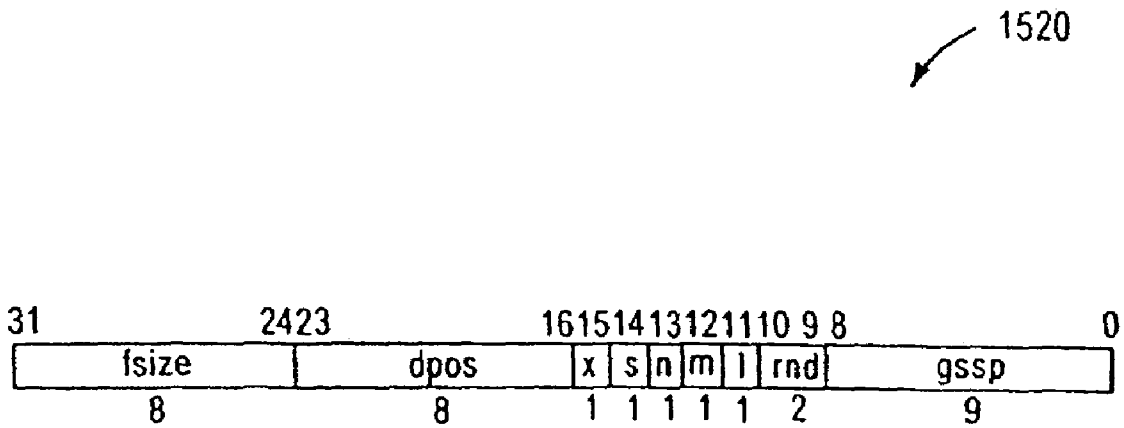
Figure 15C:
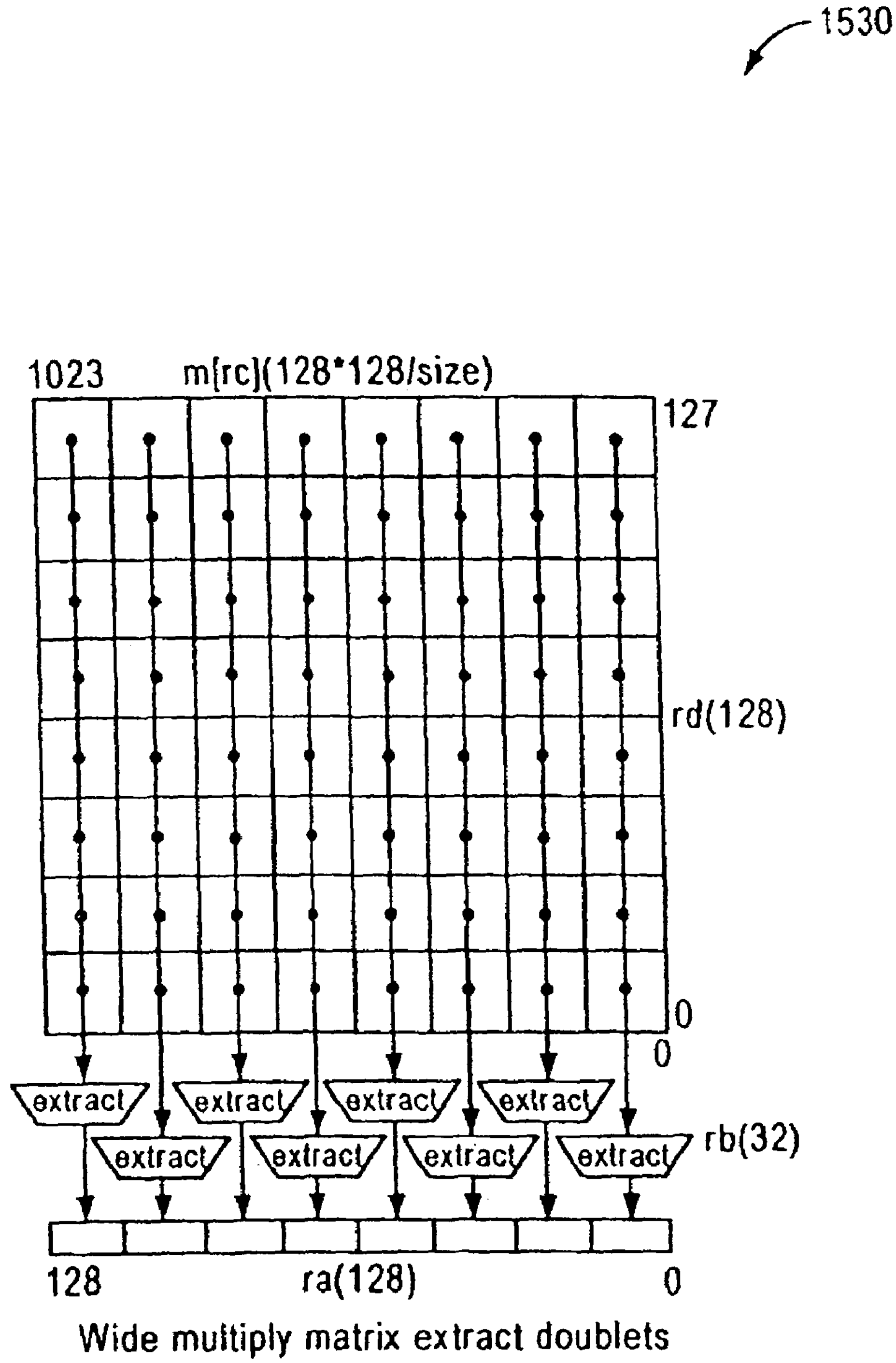

An exemplary embodiment of the schematics 1530 and 1560 of the Wide Multiply Matrix Extract instruction is shown in FIGS. 15C and 14D. In an exemplary embodiment, the contents of register rc is used as a virtual address, and a value of specified size is loaded from memory.

The contents of general register rc are used as a wide operand specifier. This specifier determines the virtual address, wide operand size and shape for a wide operands. Using the virtual address and operand size a value of specified size is loaded from memory.

A second value is the contents of register rd. The group size and other parameters are specified from the contents of register rb. The values are partitioned into groups of operands of the size specified and are multiplied and summed, producing a group of values. The group of values is rounded, and limited, and extracted as specified, yielding a group of results which is the size specified. The group of results is catenated and placed in register ra.

In an exemplary embodiment, the size of this operation is determined from the contents of register rb. The multiplier usage is constant, but the memory operand size is inversely related to the group size. Presumably this can be checked for cache validity.

In an exemplary embodiment, low order bits of re are used to designate a size, which must be consistent with the group size. Because the memory operand is cached, the size can also be cached, thus eliminating the time required to decode the size, whether from rb or from rc.

In an exemplary embodiment, the wide multiply matrix extract instructions (W.MUL.MAT.X.B, W.MUL .MAT.X.L) perform a partitioned array multiply of up to 16384 bits, that is 128×128 bits. The width of the array can be limited to 128, 64, 32, or 16 bits, but not smaller than twice the group size, by adding one half the desired size in bytes to the virtual address operand: 8, 4, 2, or 1. The array can be limited vertically to 128, 64, 32, or 16 bits, but not smaller than twice the group size, by adding one half the desired memory operand size in bytes to the virtual address operand.

The size of partitioned operands or group size (gsize) for this operation is determined from the contents of general register rb. We also use low order bits of rc to designate a memory operand width (wsize), which must be consistent with the group size. When the memory operand is cached, the group size and other parameters can also be cached, thus eliminating decode time in critical paths from rb or rc.

The wide-multiply-matrix-extract instructions (W.MUL. MAT.X.B, W.MUL.MAT.X.L) perform a partitioned array multiply of a maximum size limited by the extent of the memory operands, and by the size of the data path. The extent, size and shape parameters of the memory operands are always specified as powers of two.

Figure 15D:
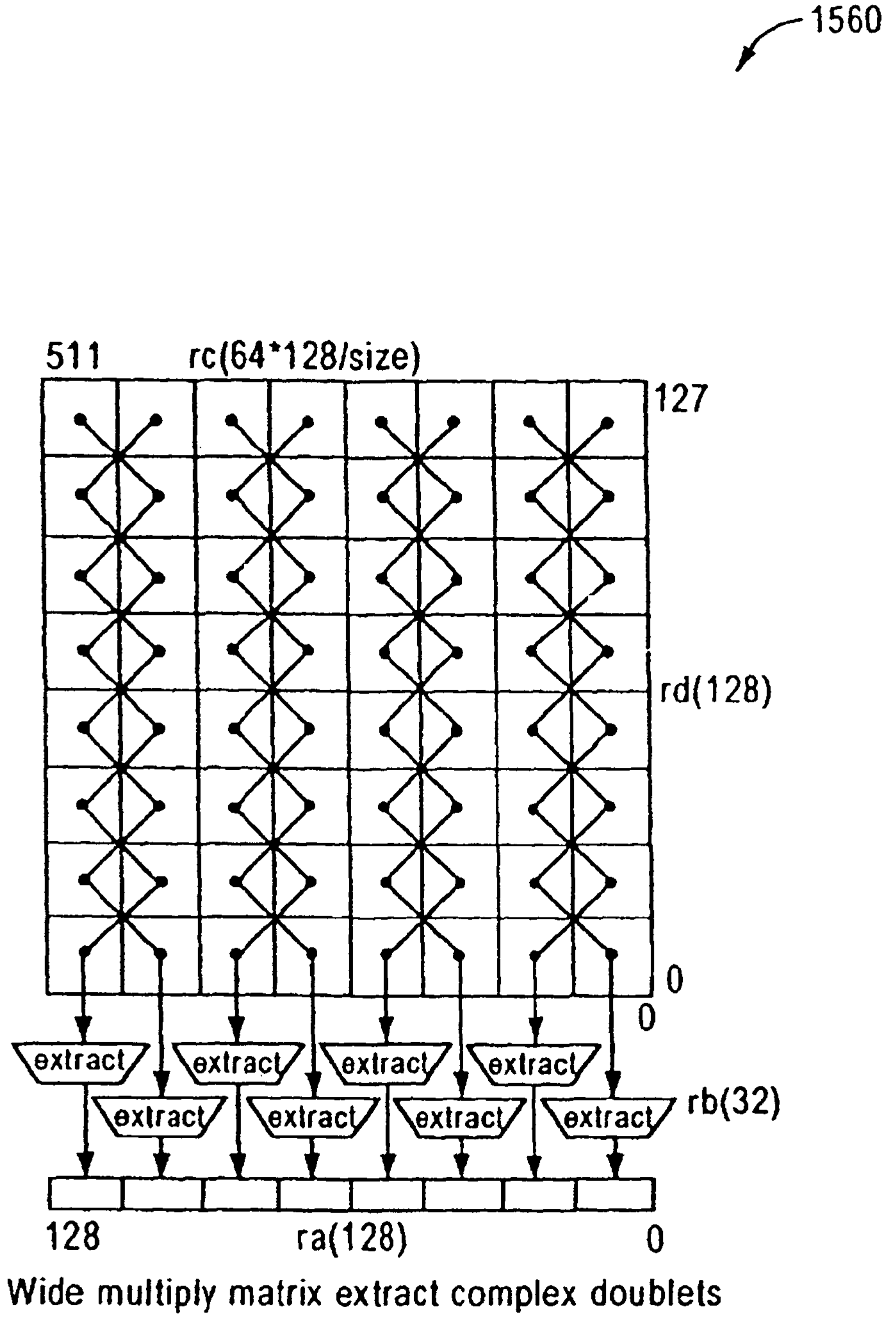
Figure 15G:
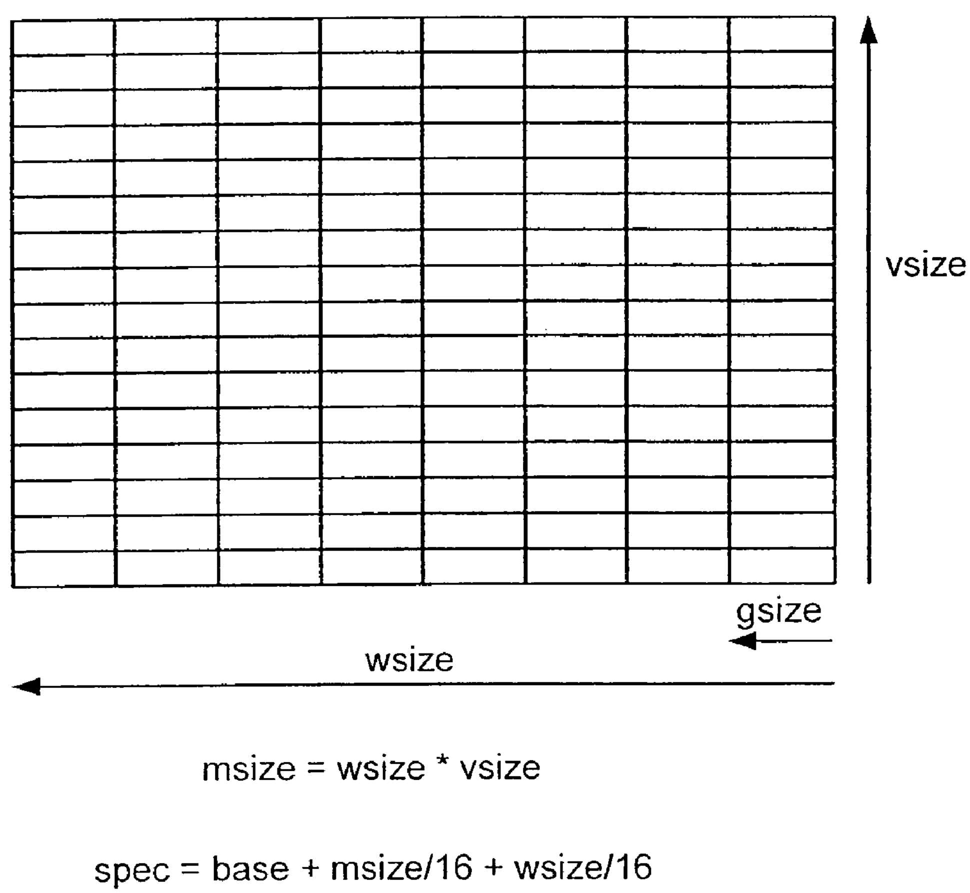

Referring to FIG. 15G, the wide operand specifier specifies a memory operand extent (msize) by adding one-half the desired memory operand extent in bytes to the specifier. The wide operand specifier specifies a memory operand shape by adding one-half the desired width in bytes to the specifier. The height of the memory operand (vsize) can be inferred by dividing the operand extent (msize) by the operand width. (wsize). Valid specifiers for these instructions must specify wsize bounded by 16≦wsize≦128, and msize bounded by 2*wsize≦msize≦16*wsize. Exceeding these bounds raises the OperandBoundary exception.

As shown in FIG. 15B, in an exemplary embodiment, bits 31 . . . 0 of the contents of register rb specifies several parameters which control the manner in which data is extracted. The position and default values of the control fields allows for the source position to be added to a fixed control value for dynamic computation, and allows for the lower 16 bits of the control field to be set for some of the simpler extract cases by a single GCOPYI instruction.

In an exemplary embodiment, the table below describes the meaning of each label:

| label | bits | meaning |
|---|---|---|
| fsize | 8 | field size |
| dpos | 8 | destination position |
| x | 1 | reserved |
| s | 1 | signed vs. unsigned |
| n | 1 | complex vs. real multiplication |
| m | 1 | mixed-sign vs. same-sign multiplication |
| l | 1 | saturation vs. truncation |
| rnd | 2 | rounding |
| gssp | 9 | group size and source position |

In an exemplary embodiment, the 9 bit gssp field encodes both the group size, gsize, and source position, spos, according to the formula gssp=512−4*gsize+spos. The group size, gsize, is a power of two in the range 1 . . . 128. The source position, spos, is in the range 0. . . (2*gsize)−1.

In an exemplary embodiment, the values in the s, n, m, t, and rnd fields have the following meaning:

| values | s | n | m | I | rnd |
|---|---|---|---|---|---|
| 0 | unsigned | real | same-sign | truncate | F |
| 1 | signed | complex | mixed-sign | saturate | Z |
| 2 | | | | | N |
| 3 | | | | | C |

The specified group size (gsize) and type (n: real versus complex) are limited to valid values, but invalid values are silently mapped to valid ones. The group size (gsize) is itself limited by 8≦gsize≦128/vsize and gsize≦wsize. The type specifier (n) is ignored and a real type is assumed if the wsize is not at least twice gsize, or if the vsize is greater than 64/gsize.

In an exemplary embodiment, the virtual address of the wide operands must be aligned, that is, the byte address must be an exact multiple of the operand extent expressed in bytes. If the addresses are not aligned the virtual address cannot be encoded into a valid specifier. Some invalid specifiers cause an “Operand Boundary” exception.

In an exemplary embodiment, Z (zero) rounding is not defined for unsigned extract operations, so F (floor) rounding is substituted, which will properly round unsigned results downward and a ReservedInstruction exception is raised if attempted.

As shown in FIG. 15C, an exemplary embodiment of a wide-multiply-matrix-extract-doublets instruction (W.MUL. MAT.X.B or W.MUL.MAT.X.L) multiplies memory [m63 m62 m61 . . . m2 m1 m0] with vector [h g f e d c b a], yielding the products [am7+bm15+cm23+dm31 +em39+fm47+gm55+hm63 . . . am2+bm10+cm18+dm26+em34+fm42+gm50+hm58am1+bm9+cm17+dm25+em33+fm41+gm49+hm57am0+bm8+cm16+dm24+em32+fm40+gm48+hm56], rounded and limited as specified.

As shown in FIG. 15D, an exemplary embodiment of a wide-multiply-matrix-extract-complex-doublets instruction (W.MUL.MAT.X with n set in rb) multiplies memory [m31 m30 m29 . . . m2 m1 m0] with vector [h g f e d c b a], yielding the products [am7+bm6+cm15+dm14+em23+fm22+gm31+hm30 . . . am2−bm3+cm10−dm11+em18−fm19+gm26−hm27 am1+bm0+cm9+dm8+em17+fm16+gm25+hm24 am0−bm1+cm8−dm9+em16-f17+gm24−hm25], rounded and limited as specified.

An exemplary embodiment of the pseudocode 1580 of the Wide Multiply Matrix Extract instruction is shown in FIG. 15E. An alternative embodiment of the pseudocode of the Wide Multiply Matrix Extract instruction is shown in FIG. 15H. An exemplary embodiment of the exceptions 1590 of the Wide Multiply Matrix Extract instruction is shown in FIG. 15F.

Wide Multiply Matrix Extract Immediate

An exemplary embodiment of the Wide Multiply Matrix Extract Immediate instruction is shown in FIGS. 16A-16G. In an exemplary embodiment, the Wide Multiply Matrix Extract Immediate instructions perform the same function as above, except that the extraction, operand format and size is controlled by fields in the instruction. This form encodes common forms of the above instruction without the need to initialize a register with the required control information. Controls within the instruction allow specification of signed, mixed signed, unsigned, and complex operands.

In an exemplary embodiment, these instructions take a-specifier from a general register to fetch a large operand from memory, a second operand from a general register, perform a group of operations on partitions of bits in the operands, and catenate the results together, placing the result in a general register. An exemplary embodiment of the format 1610 of the Wide Multiply Matrix Extract Immediate instruction is shown in FIG. 16A.

Figure 16B:
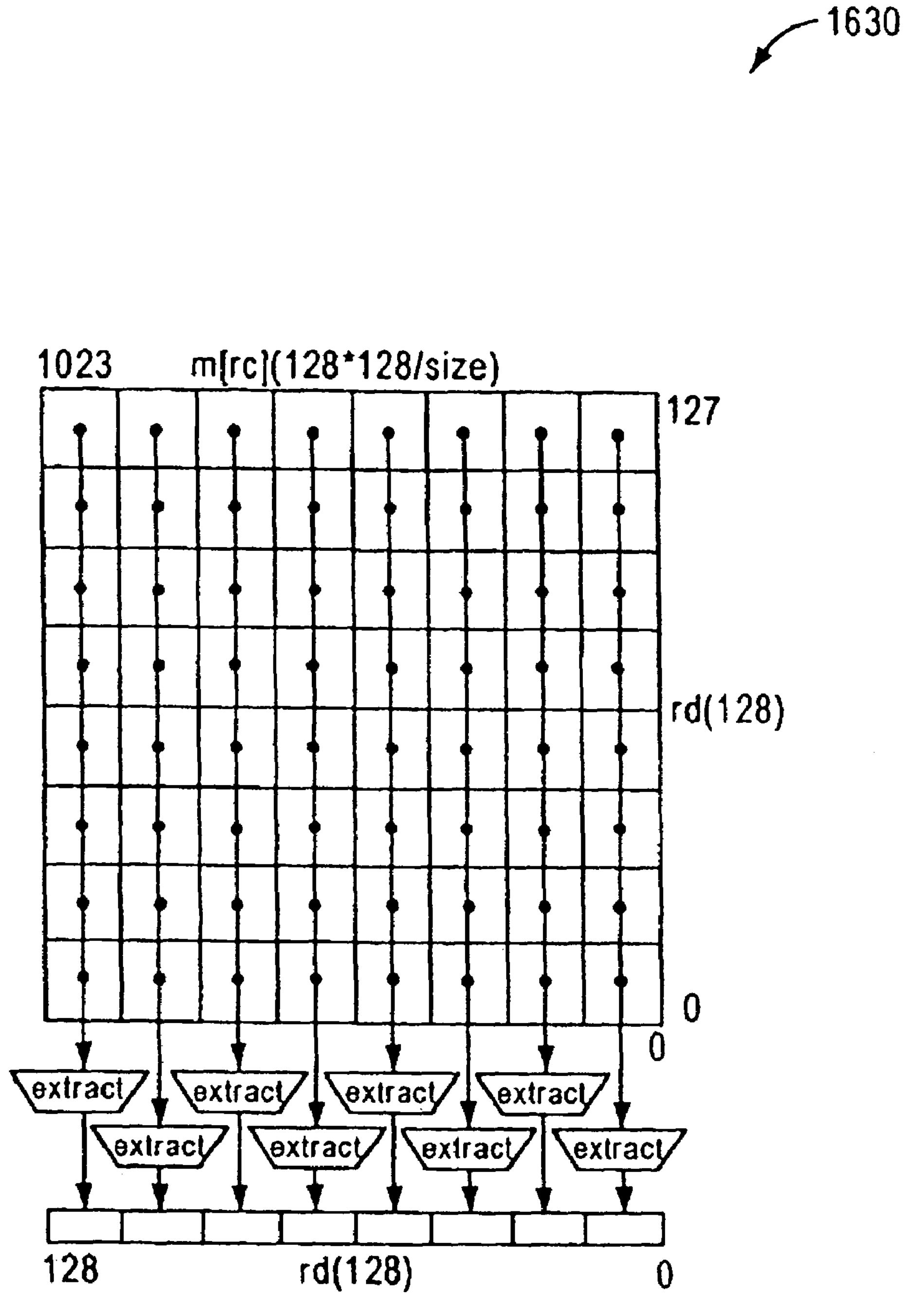
Figure 16C:
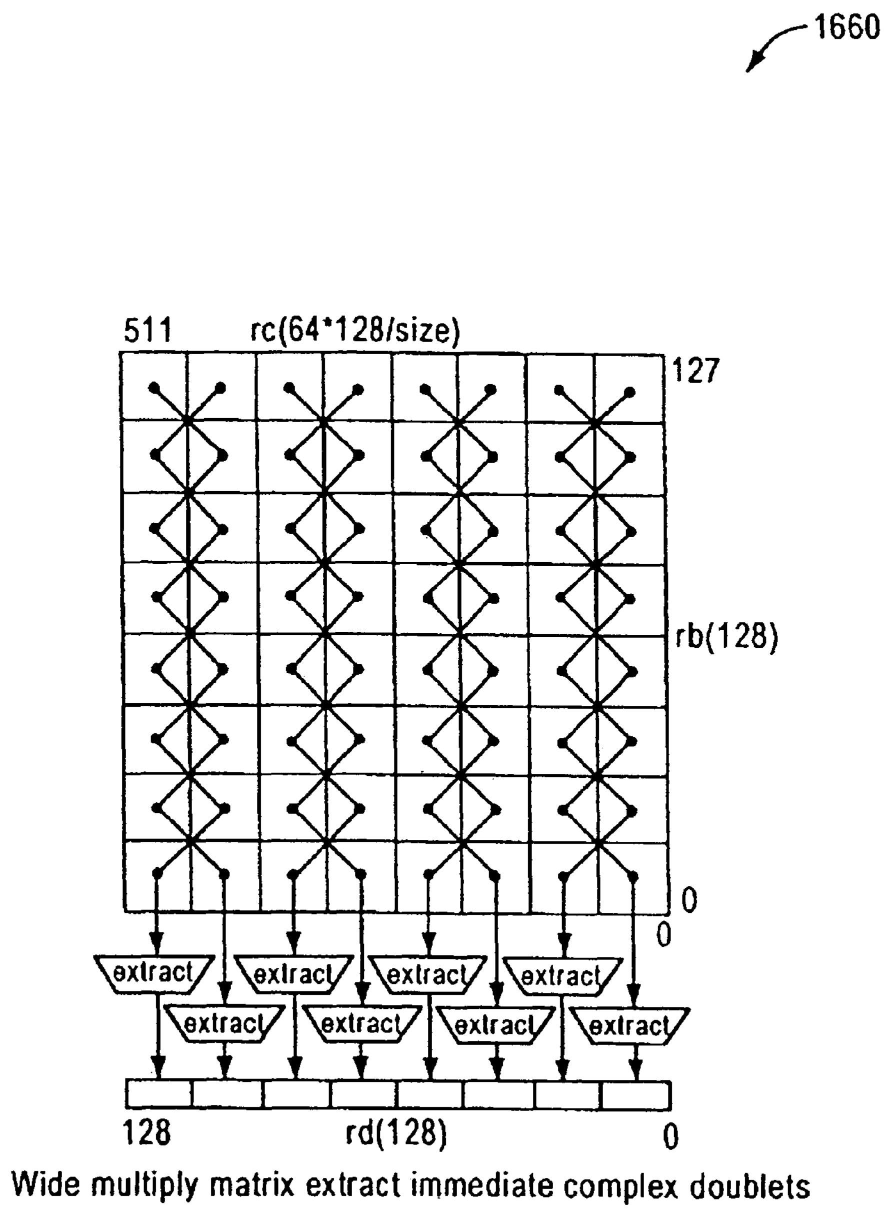

An exemplary embodiment of the schematics 1630 and 1660 of the Wide Multiply Matrix Extract Immediate instruction is shown in FIGS. 16B and 16C. In an exemplary embodiment, the contents of register rc is used as a virtual address, and a value of specified size is loaded from memory.

The contents of general register rc are used as a wide operand specifier. This specifier determines the virtual address, wide operand size and shape for a wide operand. Using the virtual address and operand size, a value of specified size is loaded from memory A second value is the contents of register rb. The values are partitioned into groups of operands of the size specified and are multiplied and summed in columns, producing a group of sums. The group of sums is rounded, limited, and extracted as specified, yielding a group of results, each of which is the size specified. The group of results is catenated and placed in register rd. All results are signed, N (nearest) rounding is used, and all results are limited to maximum representable signed values.

In an exemplary embodiment, the wide-multiply-extract-immediate-matrix instructions (W.MUL.MAT.X.I, W.MUL.MAT.X.I.C) perform a partitioned array multiply of up to 16384 bits, that is 128×128 bits. The width of the array can be limited to 128, 64, 32, or 16 bits, but not smaller than twice the group size, by adding one-half the desired size in bytes to the virtual address operand: 8, 4, 2, or 1. The array can be limited vertically to 128, 64, 32, or 16 bits, but not smaller than twice the group size, by adding one half the desired memory operand size in bytes to the virtual address operand.

The wide-multiply-matrix-extract-immediate instructions (W.MUL.MAT.X.I, W.MUL.MAT.X.I.C) perform a partitioned array multiply of a maximum size limited by the extent of the memory operands, and by the size of the data path. The extent, size and shape parameters of the memory operands are always specified as powers of two.

Figure 16F:
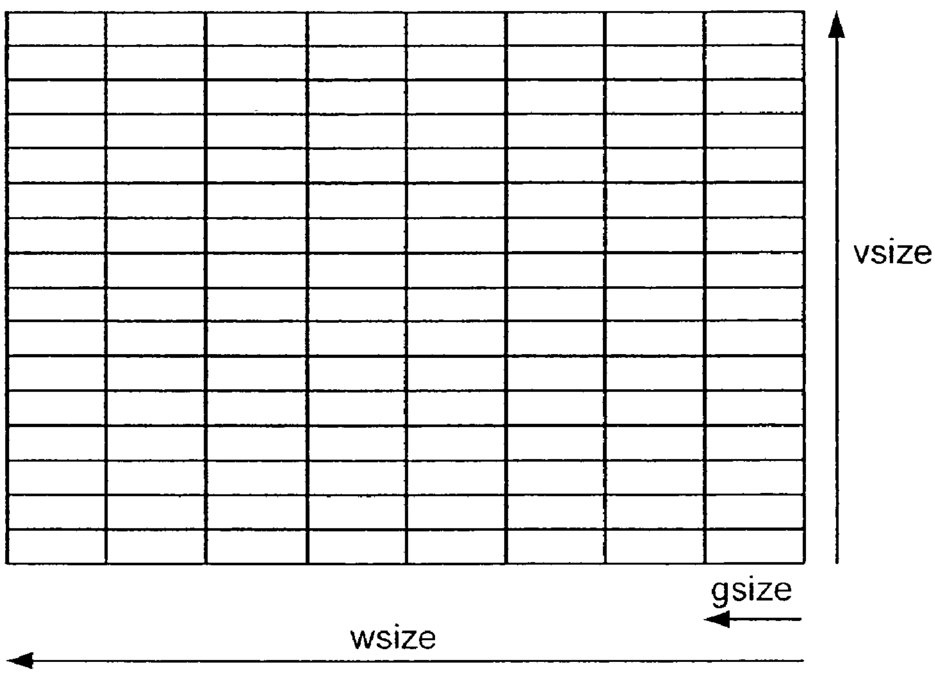

Referring to FIG. 16F, the wide operand specifier specifies a memory operand extent (msize) by adding one-half the desired memory operand extent in bytes to the specifier. The wide operand specifier specifies a memory operand shape by adding one-half the desired width in bytes to the specifier. The height of the memory operand (vsize) can be inferred by dividing the operand extent (msize) by the operand width (wsize). Valid specifiers for these instructions must specify wsize bounded by max(16,gsize*(1+n)≦wsize≦128, and msize bounded by 2*wsize≦msize≦(128/gsize*(1+n))*wsize, where n=0 for real operands (W.MUL.MAT.X.I) and n=1 for complex operands (W.MUL.MAT.X.I.C). Exceeding these bounds raises the OperandBoundary exception.

In an exemplary embodiment, the virtual address must either be aligned to 2048/gsize bytes (or 1024/gsize for W.MUL.MAT.X.I.C), or must be the sum of an aligned address and one-half of the size of the memory operand in bytes and/or one half of the size of the result in bytes. An aligned address must be an exact multiple of the size expressed in bytes. If the address is not valid an "access disallowed by virtual address" exception occurs.

The virtual addresses of the wide operands must be aligned, that is, the byte addresses must be an exact multiple of the operand extent expressed in bytes. If the addresses are not aligned the virtual address cannot be encoded into a valid specifier. Some invalid specifiers cause an "Operand Boundary" exception.

As shown in FIG. 16B, an exemplary embodiment of a wide-multiply-extract-immediate-matrix-doublets instruction (W.MUL.MAT.X.I.16) multiplies memory [m63 m62 m61 . . . m2 m1 m0] with vector [h g f e d c b a], yielding the products [am7+bm 15+cm23+dm31+em39+fm47+gm55+hm63 . . . am2+bm10+cm18+dm26+em34+fm42+gm50+hm58 am1+bm9+cm17+dm25+em33+fm41+gm49+hm57 am0+bm8+cm16+dm24+em32+fm40+gm48+hm56], rounded and limited as specified.

As shown in FIG. 16C, an exemplary embodiment of a wide-multiply-matrix-extract-immediate-complex-doublets instruction (W.MUL.MAT.X.I.C.16) multiplies memory [m31 m30 m29 . . . m2 m1 m0] with vector [h g f e d c b a], yielding the products [am7+bm6+cm15+dm14+em23+fm22+gm31+hm30 . . . am2−bm3+cm10−dm11+em18−fm19+gm26−hm27 am1+bm0+cm9+dm8+em17+fm16+gm25+hm24 am0−bm1+cm8−dm9+em16−f17+gm24−hm25], rounded and limited as specified.

An exemplary embodiment of the pseudocode 1680 of the Wide Multiply Matrix Extract Immediate instruction is shown in FIG. 16D. An exemplary embodiment of the exceptions 1590 of the Wide Multiply Matrix Extract Immediate instruction is shown in FIG. 16E.

Wide Multiply Matrix Floating-Point

An exemplary embodiment of the Wide Multiply Matrix Floating-point instruction is shown in FIGS. 17A-17G. In an exemplary embodiment, the Wide Multiply Matrix Floating-point instructions perform a matrix multiply in the same form as above, except that the multiplies and additions are performed in floating-point arithmetic. Sizes of half (16-bit), single (32-bit), double (64-bit), and complex sizes of half, single and double can be specified within the instruction.

In an exemplary embodiment, these instructions take an specifier from a general register to fetch a large operand from memory, a second operand from a general register, perform a group of operations on partitions of bits in the operands, and catenate the results together, placing the result in a general register. An exemplary embodiment of the format 1710 of the Wide Multiply Matrix Floating point instruction is shown in FIG. 17A.

Figure 17B:
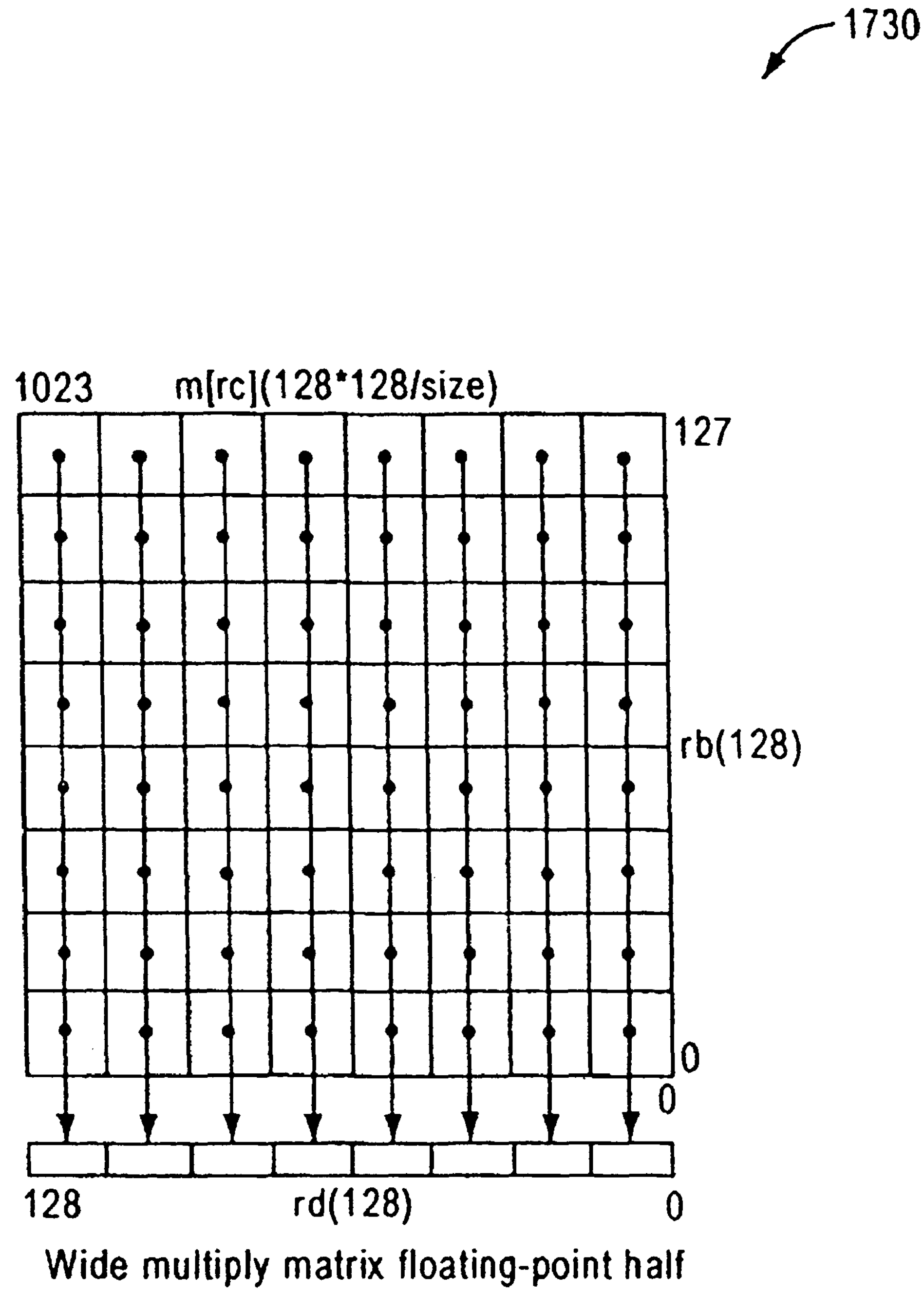
Figure 17C:
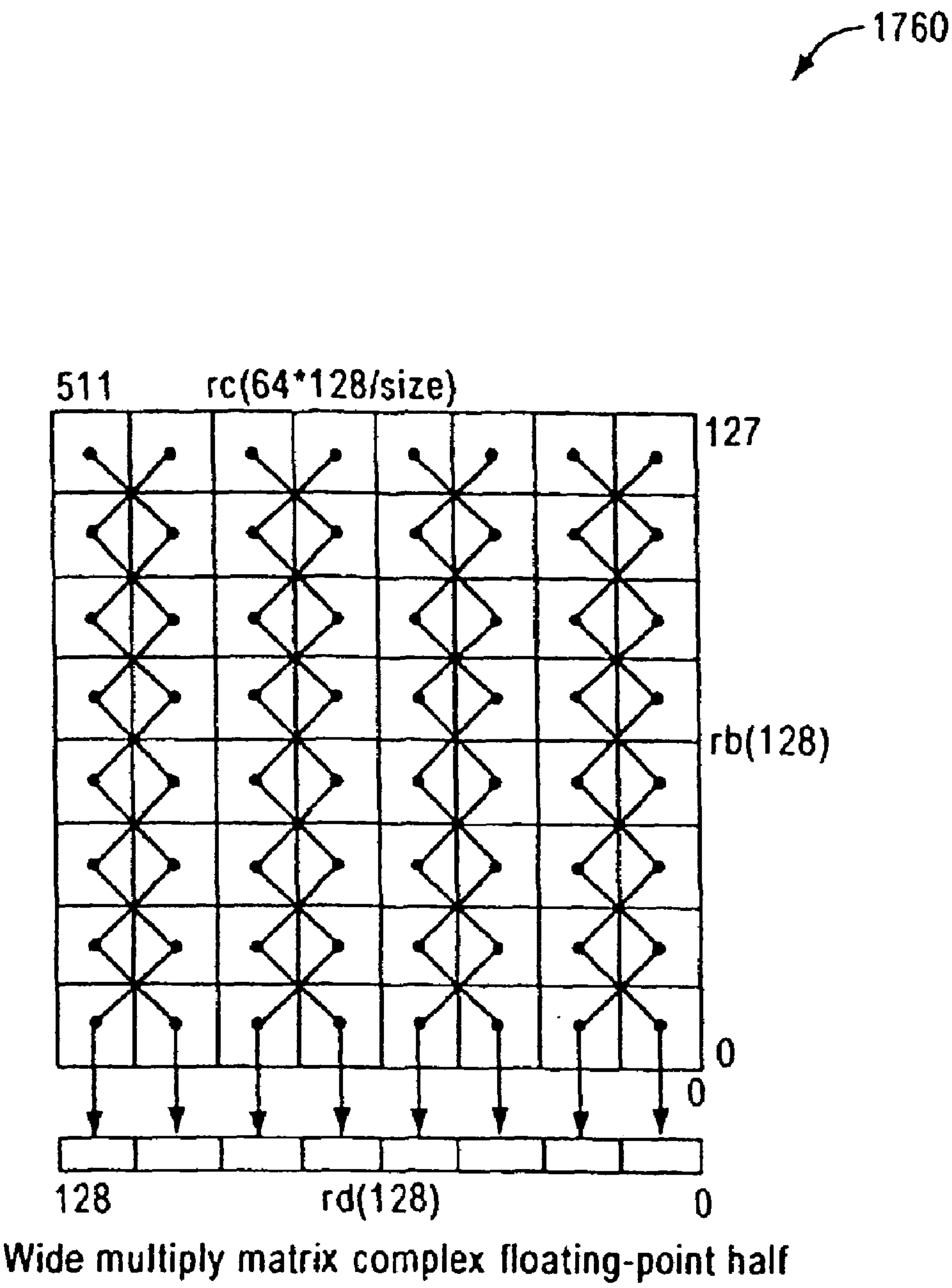

An exemplary embodiment of the schematics 1730 and 1760 of the Wide Multiply Matrix Floating-point instruction is shown in FIGS. 17B and 17C. In an exemplary embodiment, the contents of register rc is used as a virtual address, and a value of specified size is loaded from memory.

The contents of general register rc are used as a wide operand specifier. This specifier determines the virtual address, wide operand size and shape for a wide operand. Using the virtual address and operand size, a value of specified size is loaded from memory.

A second value is the contents of register rb. The values are partitioned into groups of operands of the size specified. The values are partitioned into groups of operands of the size specified and are multiplied and summed in columns, producing a group of results, each of which is the size specified. The group of result values is catenated and placed in register rd.

In an exemplary embodiment, the wide-multiply-matrix-floating-point instructions (W.MUL.MAT.F, W.MUL.MAT.C.F) perform a partitioned array multiply of up to 16384 bits, that is 128×128 bits. The width of the array can be limited to 128, 64, 32 bits, but not smaller than twice the group size, by adding one-half the desired size in bytes to the virtual address operand: 8, 4, or 2. The array can be limited vertically to 128, 64, 32, or 16 bits, but not smaller than twice the group size, by adding one-half the desired memory operand size in bytes to the virtual address operand.

The wide-multiply-matrix-floating-point instructions (W.MUL.MAT.F, W.MUL.MAT.C.F) perform a partitioned array multiply of a maximum size limited by the extent of the memory operands, and by the size of the data path. The extent, size and shape parameters of the memory operands are always specified as powers of two.

Figure 17F:
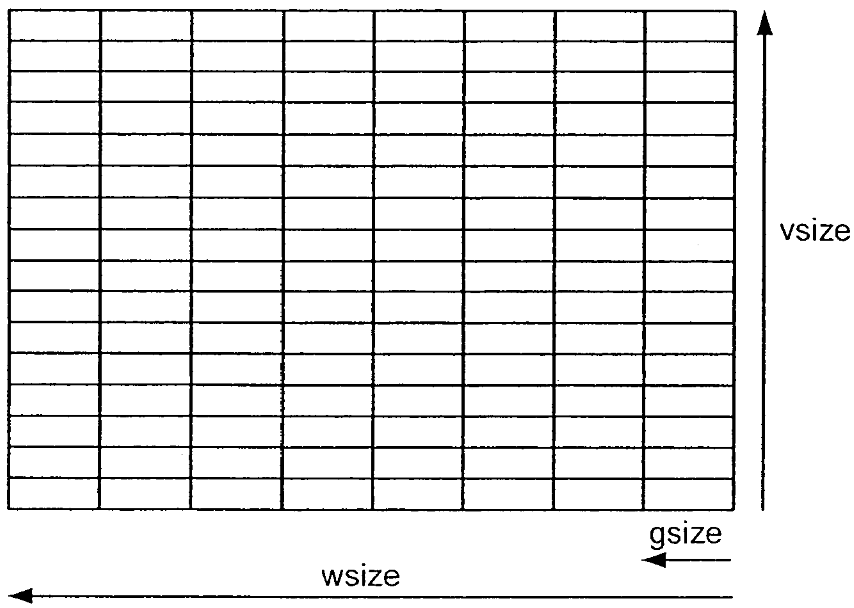

Referring to FIG. 17F, the wide operand specifier specifies a memory operand extent (msize) by adding one-half the desired memory operand extent in bytes to the specifier. The wide operand specifier specifies a memory operand shape by adding one-half the desired width in bytes to the specifier. The height of the memory operand (vsize) can be inferred by dividing the operand extent (msize) by the operand width (wsize). Valid specifiers for these instructions must specify wsize bounded by max(16,gsize*(1+n))≦wsize≦128, and msize bounded by 2*wsize≦msize≦(128/gsize*(1+n))*wsize, where n=0 for real operands (W.MUL.MAT.F) and n=1 for complex operands (W.MUL.MAT.C.F). Exceeding these bounds raises the OperandBoundary exception.

In an exemplary embodiment, the virtual address must either be aligned to 2048/gsize bytes (or 1024/gsize for W.MUL.MAT.C.F), or must be the sum of an aligned address and one half of the size of the memory operand in bytes and/or one-half of the size of the result in bytes. An aligned address must be an exact multiple of the size expressed in bytes. If the address is not valid an "access disallowed by virtual address" exception occurs.

The virtual addresses of the wide operands must be aligned, that is, the byte addresses must be an exact multiple of the operand extent expressed in bytes. If the addresses are not aligned the virtual address cannot be encoded into a valid specifier. Some invalid specifiers cause an "Operand Boundary" exception.

As shown in FIG. 17B, an exemplary embodiment of a wide-multiply-matrix-floating-point-half instruction (W.MUL.MAT.F) multiplies memory [m31 m30 . . . m1 m0] with vector [h g f e d c b a], yielding products [hm31+gm27+ . . . +bm7+am3 . . . hm28+gm24+ . . . +bm4+am0].

As shown in FIG. 17C, an exemplary embodiment of a wide-multiply-matrix-complex-floating-point-half instruction (W.MUL.MAT.F) multiplies memory [m15 m14 . . . m1 m0] with vector [h g f e d c b a], yielding products [hm14+gm15+ . . . +bm2+am3 . . . hm12+gm13+ . . . +bm0+am1−hm13+gm12+ . . . −bm1+am0].

An exemplary embodiment of the pseudocode 1780 of the Wide Multiply Matrix Floating-point instruction is shown in FIG. 17D. Additional pseudocode functions used by this and other floating point instructions is shown elsewhere in this specification. An alternative embodiment of the pseudocode of the Wide Multiply Matrix Floating-point instruction is shown in FIG. 17G. An exemplary embodiment of the exceptions 1790 of the Wide Multiply Matrix Floating-point instruction is shown in FIG. 17E.

Wide Multiply Matrix Galois

An exemplary embodiment of the Wide Multiply Matrix Galois instruction is shown in FIGS. 18A-18F. In an exemplary embodiment, the Wide Multiply Matrix Galois instructions perform a matrix multiply in the same form as above, except that the multiples and additions are performed in Galois field arithmetic. A size of 8 bits can be specified within the instruction. The contents of a general register specify the polynomial with which to perform the Galois field remainder operation. The nature of the matrix multiplication is novel and described in detail below.

In an exemplary embodiment, these instructions take an specifier from a general register to fetch a large operand from memory, second and third operands from general registers, perform a group of operations on partitions of bits in the operands, and catenate the results together, placing the result in a general register. An exemplary embodiment of the format 1810 of the Wide Multiply Matrix Galois instruction is shown in FIG. 18A.

Figure 18B:
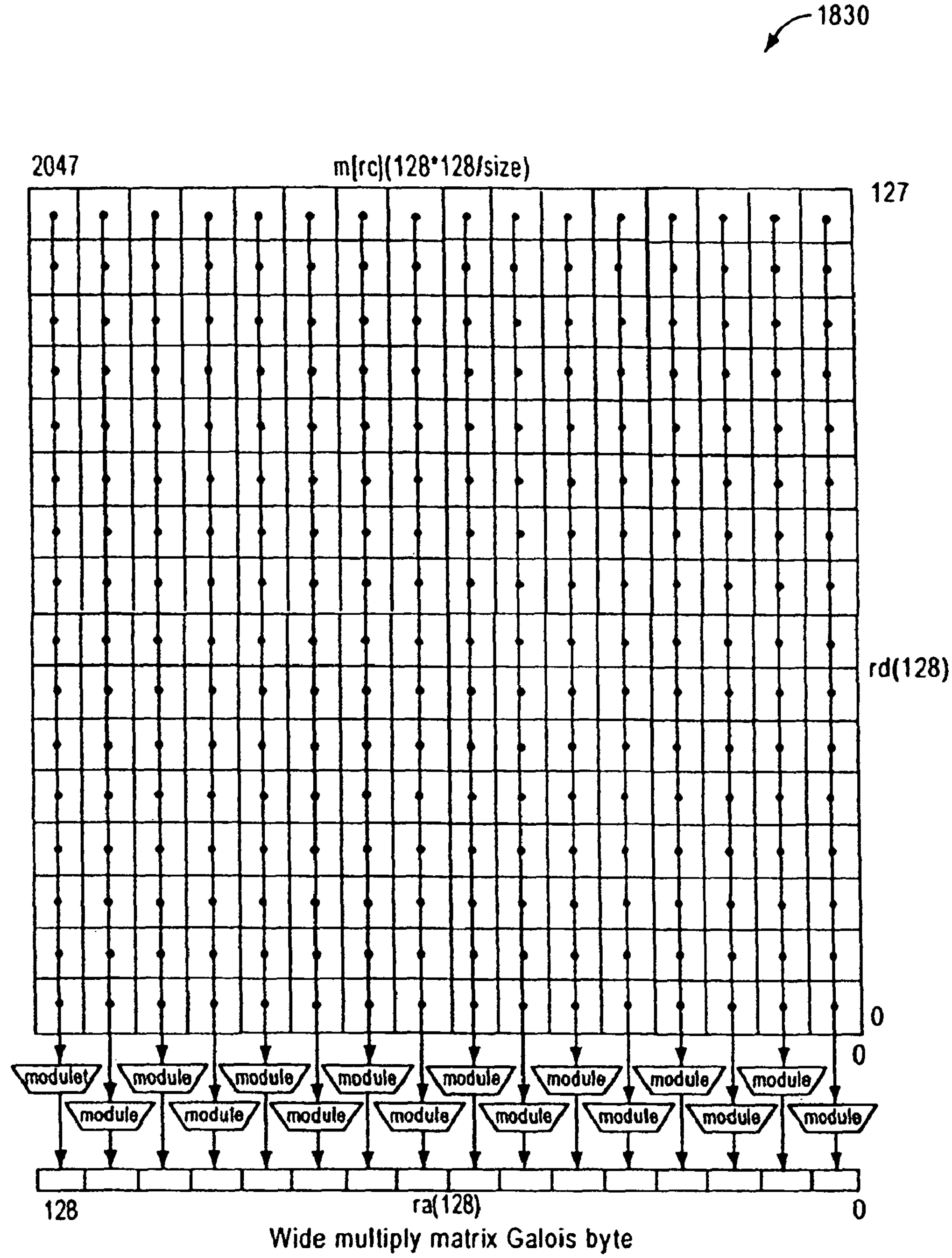

An exemplary embodiment of the schematic 1830 of the Wide Multiply Matrix Galois instruction is shown in FIG. 18B. In an exemplary embodiment, the contents of register re is used as a virtual address, and a value of specified size is loaded from memory.

The contents of general register rc are used as a wide operand specifier. This specifier determines the virtual address, wide operand size and shape for a wide operand. Using the virtual address and operand size, a value of specified size is loaded from memory.

Second and third values are the contents of registers rd and rb. The values are partitioned into groups of operands of the size specified. The second values are multiplied as polynomials with the first value, and summed in columns, producing a group of sums which are reduced to the Galois field specified by the third value, producing a group of result values. The group of result values is catenated and placed in register ra.

In an exemplary embodiment, the wide-multiply-matrix-Galois-bytes instruction (W.MUL.MAT.G.8) performs a partitioned array multiply of up to 16384 bits, that is 128×128 bits. The width of the array can be limited to 128, 64, 32, or 16 bits, but not smaller than twice the group size of 8 bits, by adding one-half the desired size in bytes to the virtual address operand: 8, 4, 2, or 1. The array can be limited vertically to 128, 64, 32, or 16 bits, but not smaller than twice the group size of 8 bits, by adding one-half the desired memory operand size in bytes to the virtual address operand.

The wide-multiply-matrix-Galois-bytes instructgrion (W.MUL.MAT.G.8) performs a partitioned array multiply of a maximum size limited by the extent of the memory operands, and by the size of the data path. The extent, size and shape parameters of the memory operands are always specified as powers of two.

Figure 18E:
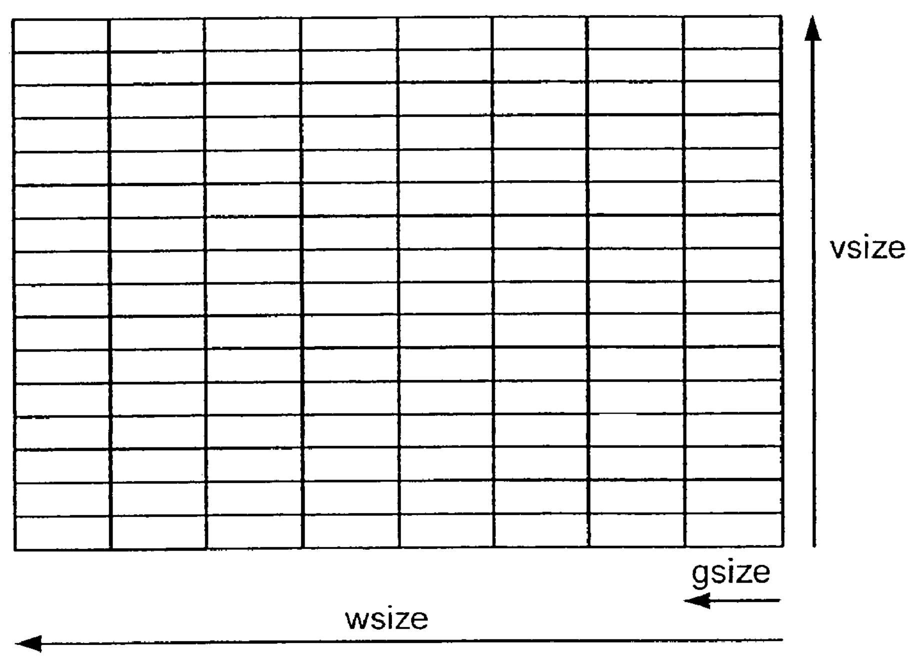

Referring to FIG. 18E, the wide operand specifier specifies a memory operand extent (msize) by adding one-half the desired memory operand extent in bytes to the specifier. The wide operand specifier specifies a memory operand shape by adding one-half the desired width in bytes to the specifier. The height of the memory operand (vsize) can be inferred by dividing the operand extent (msize) by the operand width (wsize). Valid specifiers for these instructions must specify wsize bounded by 16≦wsize≦128, and msize bounded by 2*wsize≦msize≦16*wsize. Exceeding these bounds raises the OperandBoundary exception.

In an exemplary embodiment, the virtual address must either be aligned to 256 bytes, or must be the sum of an aligned address and one-half of the size of the memory operand in bytes and/or one-half of the size of the result in bytes. An aligned address must be an exact multiple of the size expressed in bytes. If the address is not valid an "access disallowed by virtual address" exception occurs.

The virtual addresses of the wide operands must be aligned, that is, the byte addresses must be an exact multiple of the operand extent expressed in bytes. If the addresses are not aligned the virtual address cannot be encoded into a valid specifier. Some invalid specifiers cause an "Operand Boundary" exception As shown in FIG. 18B, an exemplary embodiment of a wide-multiply-matrix-Galois-byte instruction (W.MUL.

MAT.G.8) multiplies memory [m255 m254 . . . m1 m0] with vector [p o n m l k j i h g f e d c b a], reducing the result modulo polynomial [q], yielding products [(pm255+om247+ . . . +bm31+am15 mod q) (pm254+om246+ . . . +bm30+am14 mod q) . . . (pm248+om240+ . . . +bm16+am0 mod q)].

An exemplary embodiment of the pseudocode 1860 of the Wide Multiply Matrix Galois instruction is shown in FIG. 18C. An alternative embodiment of the pseudocode of the Wide Multiply Matrix Galois instruction is shown in FIG. 18F. An exemplary embodiment of the exceptions 1890 of the Wide Multiply Matrix Galois instruction is shown in FIG. 18D.

Memory Operands of Either Little-Endian or Big-Endian Conventional Byte Ordering In another aspect of the invention, memory operands of either little-endian or big-endian conventional byte ordering are facilitated. Consequently, all Wide operand instructions are specified in two forms, one for little-endian byte ordering and one for big-endian byte ordering, as specified by a portion of the instruction. The byte order specifies to the memory system the order in which to deliver the bytes within units of the data path width (128 bits), as well as the order to place multiple memory words (128 bits) within a larger Wide operand.

Extraction of a High Order Portion of a Multiplier Product or Sum of Products

Another aspect of the present invention addresses extraction of a high order portion of a multiplier product or sum of products, as a way of efficiently utilizing a large multiplier array. Related U.S. Pat. Nos. 5,742,840 and 5,953,241 describe a system and method for enhancing the utilization of a multiplier array by adding specific classes of instructions to a general-purpose processor. This addresses the problem of making the most use of a large multiplier array that is fully used for high-precision arithmetic—for example a 64×64 bit multiplier is fully used by a 64-bit by 64-bit multiply, but only one quarter used for a 32-bit by 32-bit multiply) for (relative to the multiplier data width and registers) low-precision arithmetic operations. In particular, operations that perform a great many low-precision multiplies which are combined (added) together in various ways are specified. One of the overriding considerations in selecting the set of operations is a limitation on the size of the result operand. In an exemplary embodiment, for example, this size might be limited to on the order of 128 bits, or a single register, although no specific size limitation need exist.

The size of a multiply result, a product, is generally the sum of the sizes of the operands, multiplicands and multiplier. Consequently, multiply instructions specify operations in which the size of the result is twice the size of identically-sized input operands. For our prior art design, for example, a multiply instruction accepted two 64-bit register sources and produces a single 128-bit register-pair result, using an entire 64×64 multiplier array for 64-bit symbols, or half the multiplier array for pairs of 32-bit symbols, or one quarter the multiplier array for quads of 16-bit symbols. For all of these cases, note that two register sources of 64 bits are combined, yielding a 128-bit result.

In several of the operations, including complex multiplies, convolve, and matrix multiplication, low-precision multiplier products are added together. The additions further increase the required precision. The sum of two products requires one additional bit of precision; adding four products requires two, adding eight products requires three, adding sixteen products requires four. In some prior designs, some of this precision is lost, requiring scaling of the multiplier operands to avoid overflow, further reducing accuracy of the result.

The use of register pairs creates an undesirable complexity, in that both the register pair and individual register values must be bypassed to subsequent instructions. As a result, with prior art techniques only half of the source operand 128-bit register values could be employed toward producing a single-register 128-bit result.

In the present invention, a high-order portion of the multiplier product or sum of products is extracted, adjusted by a dynamic shift amount from a general register or an adjustment specified as part of the instruction, and rounded by a control value from a register or instruction portion as round-to-nearest/even, toward zero, floor, or ceiling. Overflows are handled by limiting the result to the largest and smallest values that can be accurately represented in the output result.

Extract Controlled by a Register

In the present invention, when the extract is controlled by a register, the size of the result can be specified, allowing rounding and limiting to a smaller number of bits than can fit in the result. This permits the result to be scaled to be used in subsequent operations without concern of overflow or rounding, enhancing performance.

Also in the present invention, when the extract is controlled by a register, a single register value defines the size of the operands, the shift amount and size of the result, and the rounding control. By placing all this control information in a single register, the size of the instruction is reduced over the number of bits that such a instruction would otherwise require, improving performance and enhancing flexibility of the processor.

The particular instructions included in this aspect of the present invention are Ensemble Convolve Extract, Ensemble Multiply Extract, Ensemble Multiply Add Extract and Ensemble Scale Add Extract.

Ensemble Extract Inplace

An exemplary embodiment of the Ensemble Extract Inplace instruction is shown in FIGS. 19A-19H. In an exemplary embodiment, several of these instructions (Ensemble Convolve Extract, Ensemble Multiply Add Extract) are typically available only in forms where the extract is specified as part of the instruction. An alternative embodiment can incorporate forms of the operations in which the size of the operand, the shift amount and the rounding can be controlled by the contents of a general register (as they are in the Ensemble Multiply Extract instruction). The definition of this kind of instruction for Ensemble Convolve Extract, and Ensemble Multiply Add Extract would require four source registers, which increases complexity by requiring additional general-register read ports.

In an exemplary embodiment, these operations take operands from four general registers, perform operations on partitions of bits in the operands, and place the concatenated results in a fourth general register. An exemplary embodiment of the format and operation codes 1910 of the Ensemble Extract Inplace instruction is shown in FIG. 19A.

An exemplary embodiment of the schematics 1930, 1945, 1960, and 1975 of the Ensemble Extract Inplace instruction is shown in FIGS. 19C, 19D, 19E, and 19F. In an exemplary embodiment, the contents of registers rd, rc, rb, and ra are fetched. The specified operation is performed on these operands. The result is placed into register rd.

In an exemplary embodiment, for the E.CON.X instruction, the contents of general registers rd and rc are catenated, as c||d, and used as a first value. A second value is the contents of register rb. The values are partitioned into groups of operands of the size specified and are convolved, producing a group of values. The group of values is rounded, limited and extracted as specified, yielding a group of results that is the size specified. The group of results is catenated and placed in register rd.

In an exemplary embodiment, for the E.MUL.ADD.X instruction, the contents of general registers rc and rb are partitioned into groups of operands of the size specified and are multiplied, producing a group of values to which are added the partitioned and extended contents of general register rd. The group of values is rounded, limited and extracted as specified, yielding a group of results that is the size specified. The group of results is catenated and placed in register rd.

Figure 19B:
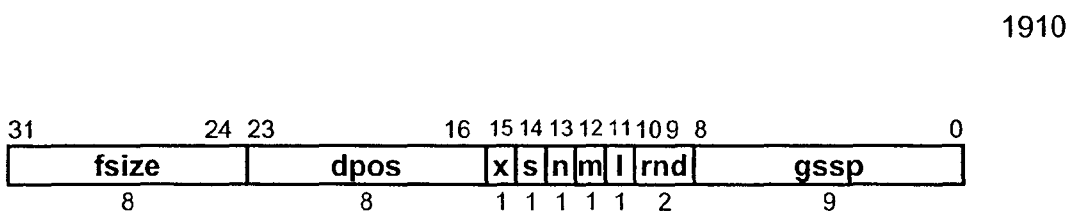

As shown in FIG. 19B, in an exemplary embodiment, bits 31 . . . 0 of the contents of register ra specifies several parameters that control the manner in which data is extracted, and for certain operations, the manner in which the operation is performed. The position of the control fields allows for the source position to be added to a fixed control value for dynamic computation, and allows for the lower 16 bits of the control field to be set for some of the simpler extract cases by a single GCOPYI.128 instruction. The control fields are further arranged so that if only the low order 8 bits are non-zero, a 128-bit extraction with truncation and no rounding is performed.

In an exemplary embodiment, the table below describes the meaning of each label:

| label | bits | meaning |
|---|---|---|
| fsize | 8 | field size |
| dpos | 8 | destination position |
| x | 1 | extended vs. group size result |
| s | 1 | signed vs. unsigned |
| n | 1 | complex vs. real multiplication |
| m | 1 | mixed-sign vs. same-sign multiplication |
| l | 1 | limit: saturation vs. truncation |
| rnd | 2 | rounding |
| gssp | 9 | group size and source position |

In an exemplary embodiment, the 9-bit gssp field encodes both the group size, gsize, and source position, spos, according to the formula gssp=512−4*gsize+spos. The group size, gsize, is a power of two in the range 1 . . . 128. The source position, spos, is in the range 0 . . . (2*gsize)−1.

In an exemplary embodiment, the values in the x, s, n, m, l, and rnd fields have the following meaning:

| values | x | s | n | m | l | rnd |
|---|---|---|---|---|---|---|
| 0 | group | unsigned | real | same-sign | truncate | F |
| 1 | extended | signed | complex | mixed-sign | saturate | Z |
| 2 | | | | | | N |
| 3 | | | | | | C |

These instructions are undefined and cause a reserved instruction exception if the specified group size is less than 8, or larger than 64 when complex or extended, or larger than 32 when complex and extended.

Ensemble Multiply Add Extract

The ensemble-multiply-add-extract instructions (E.MUL.ADD.X), when the x bit is set, multiply the low-order 64 bits of each of the rc and rb general registers and produce extended (double-size) results.

Figure 19C:
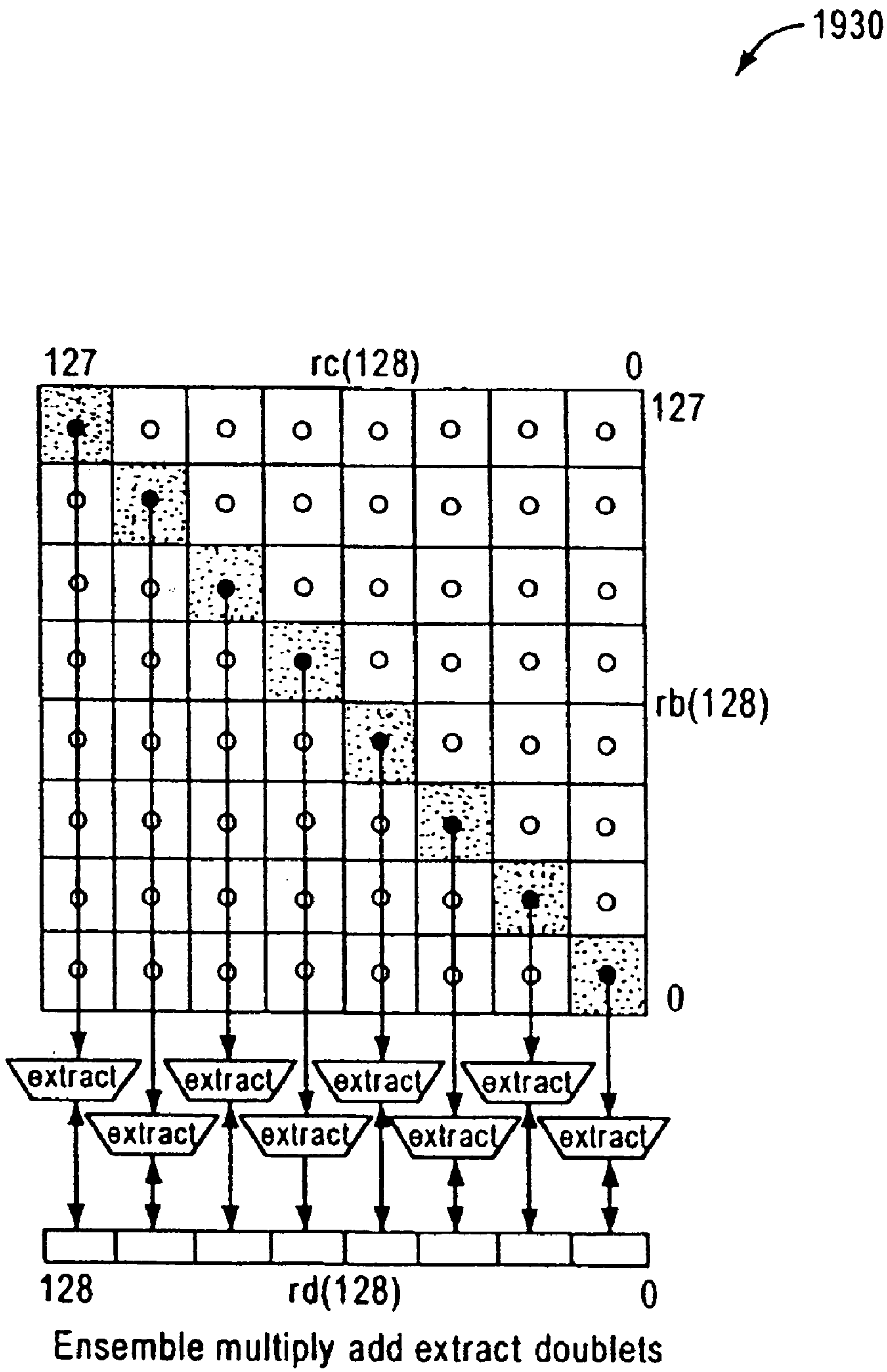

As shown in FIG. 19C, an exemplary embodiment of an ensemble-multiply-add-extract-doublets instruction (E.MULADDX) multiplies vector rc [h g f e d c b a] with vector rb [p o n m l k j i], and adding vector rd [x w v u t s r q], yielding the result vector rd [hp+x go+w fn+v em+u dl+t ck+s bj+r ai+q], rounded and limited as specified by ra31 . . . 0.

Figure 19D:
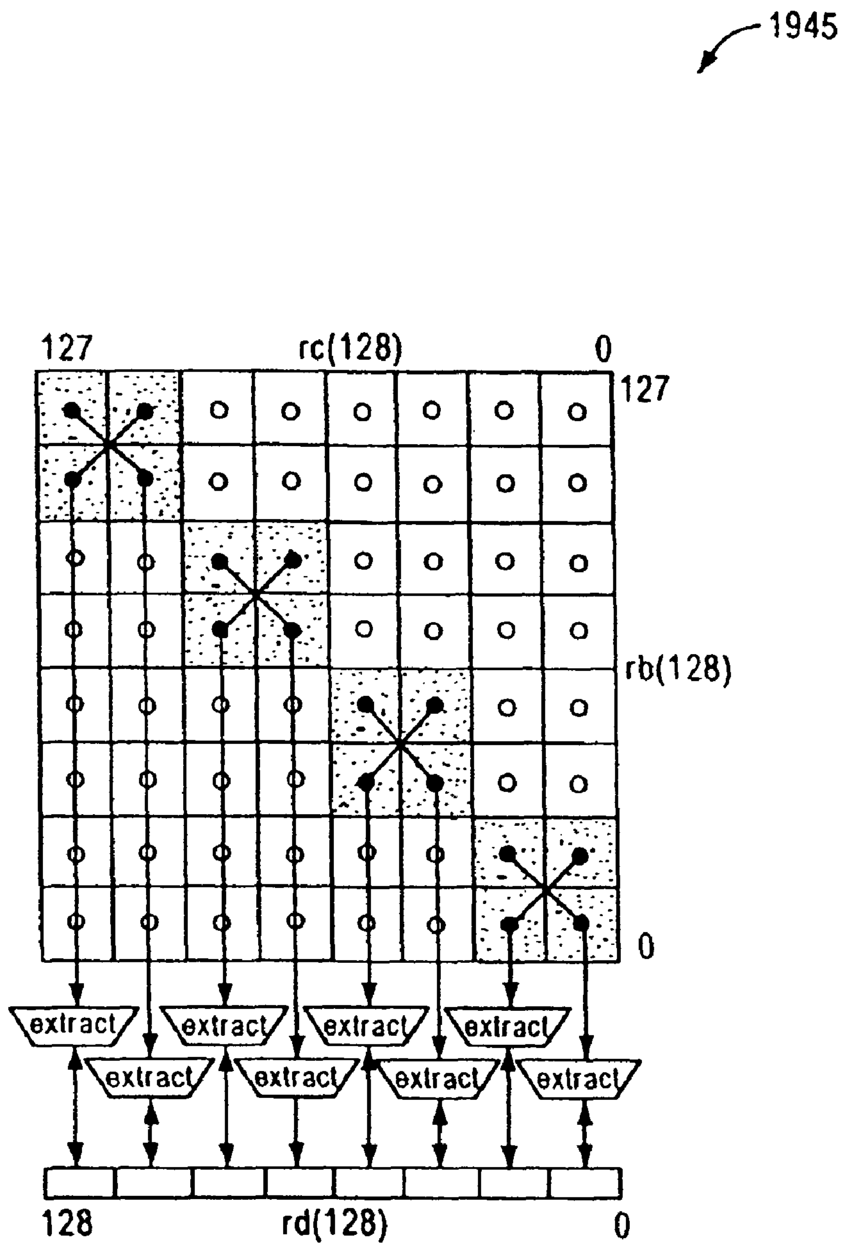

As shown in FIG. 19D, an exemplary embodiment of an ensemble-multiply-add-extract-doublets-complex instruction (E.MUL.X with n set) multiplies operand vector rc [h g f e d c b a] by operand vector rb [p o n m l k j i], yielding the result vector rd [gp+ho go−hp en+fm em−fn cl+dk ck−dl aj+bi ai−bj], rounded and limited as specified by ra31 . . . 0. Note that this instruction prefers an organization of complex numbers in which the real part is located to the right (lower precision) of the imaginary part.

Ensemble Convolve Extract

Figure 19E:
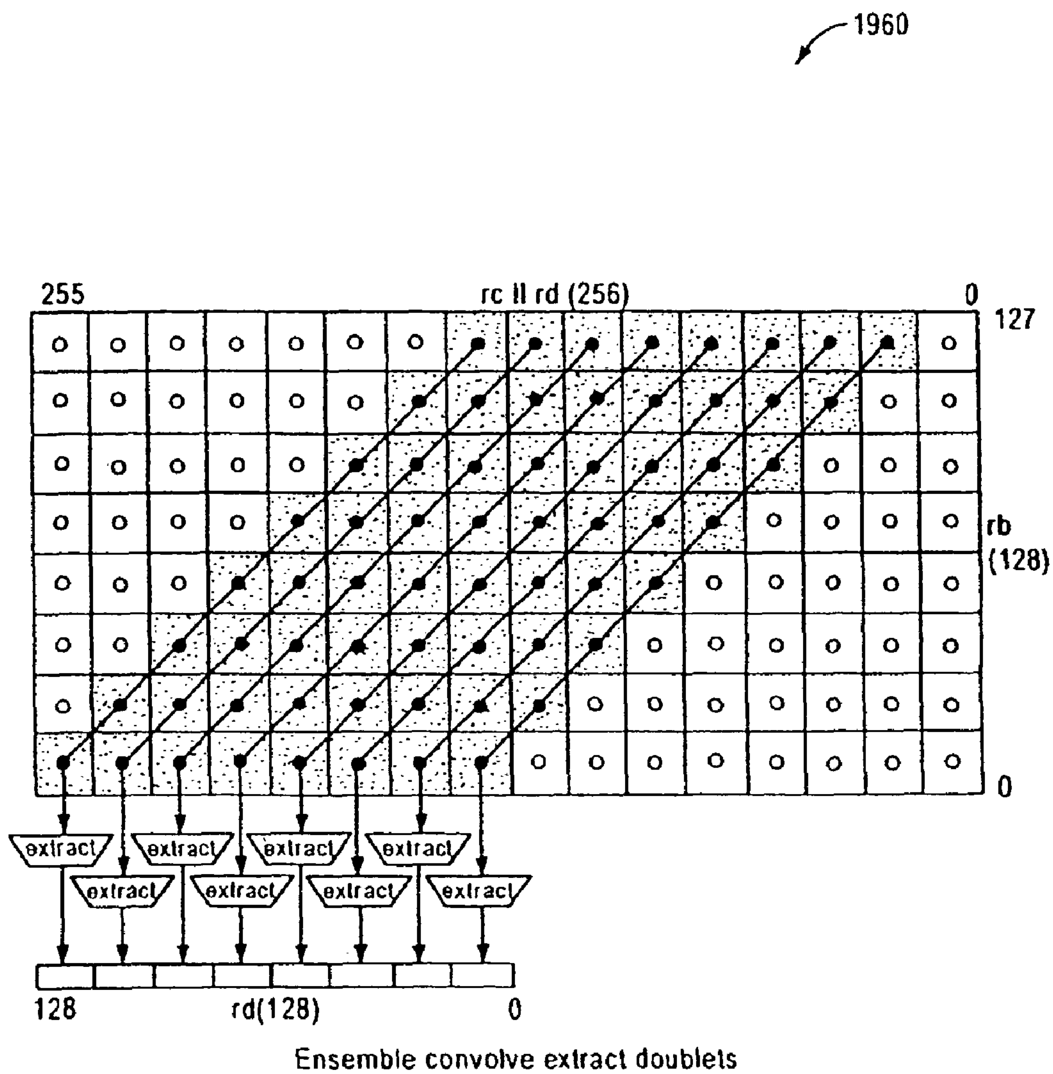

As shown in FIG. 19E, an exemplary embodiment of an ensemble-convolve-extract-doublets instruction (ECON.X with n=0) convolves vector rc||rd [x w v u t s r q p o n m l k j i] with vector rb [h g f e d c b a], yielding the products vector rd [ax+bw+cv+du+et+fs+gr+hq . . . as+br+cq+dp+eo+fn+gm+hl ar+bq+cp+do+en+fm+gl+hk aq+bp+co+dn+em+fl+gk+hj], rounded and limited as specified by $ra_{31\ldots0}$.

Note that because the contents of general register rd are overwritten by the result vector, that the input vector rc||rd is catenated with the contents of general register rd on the right, which is a form that is favorable for performing a small convolution (FIR) filter (only 128 bits of filter coefficients) on a little-endian data structure. (The contents of general register rc can be reused by a second E.CON.X instruction that produces the next sequential result.)

Figure 19F:
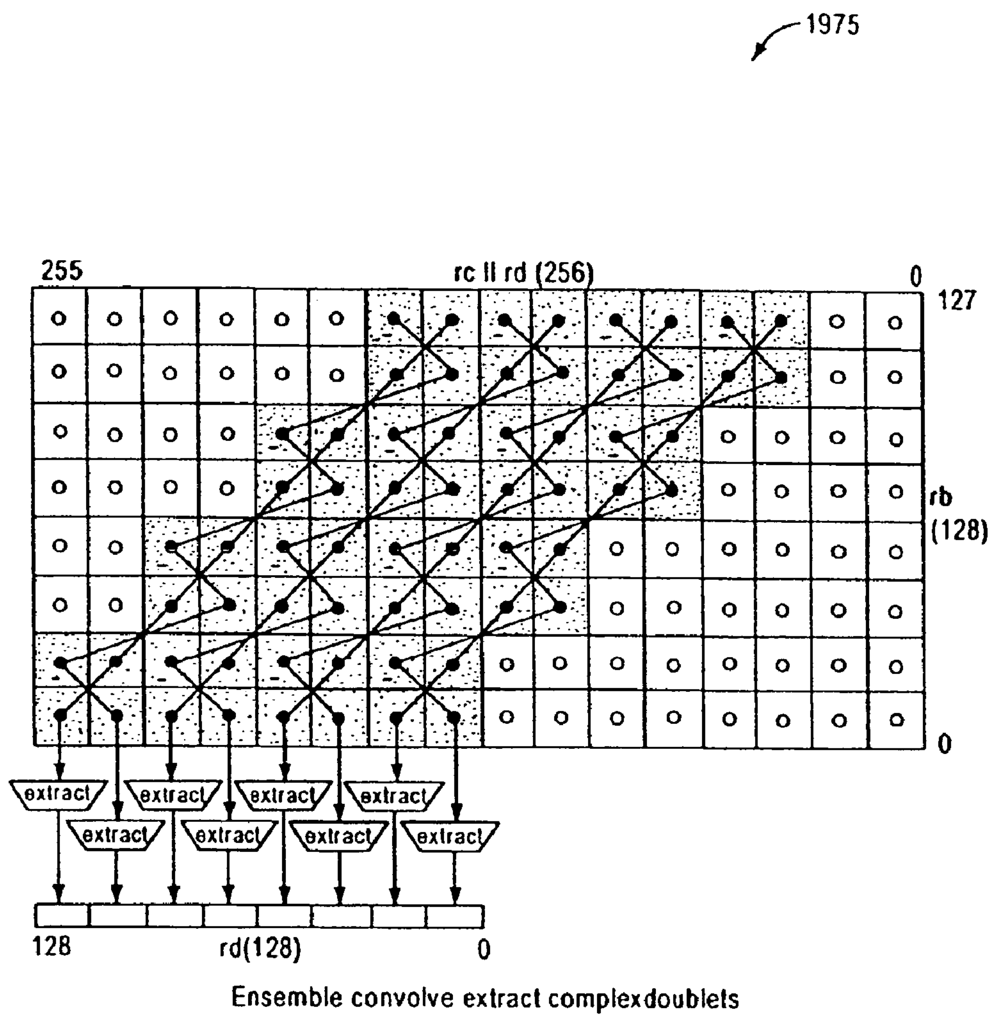

As shown in FIG. 19F, an exemplary embodiment of an ensemble-convolve-extract-complex-doublets instruction (ECON.X with n=1) convolves vector rd||rc [x w v u t s r q p o n m l k j i] with vector rb [h g f e d c b a], yielding the products vector rd [ax+bw+cv+du+et+fs+gr+hq . . . as−bt+cq−dr+eo−fp+gm−hn ar+bq+cp+do+en+fm+gl+hk aq−br+co−dp+em−fn+gk+hl], rounded and limited as specified by ra30 . . . 0.

Note that general register rd is overwritten, which favors a little-endian data representation as above. Further, the operation expects that the complex values are paired so that the real part is located in a less-significant (to the right of) position and the imaginary part is located in a more-significant (to the left of) position, which is also consistent with conventional little-endian data representation.

An exemplary embodiment of the pseudocode 1990 of Ensemble Extract Inplace instruction is shown in FIG. 19G. Referring to FIG. 19H, in an exemplary embodiment, there are no exceptions for the Ensemble Extract Inplace instruction.

Ensemble Extract

Figure 20B:
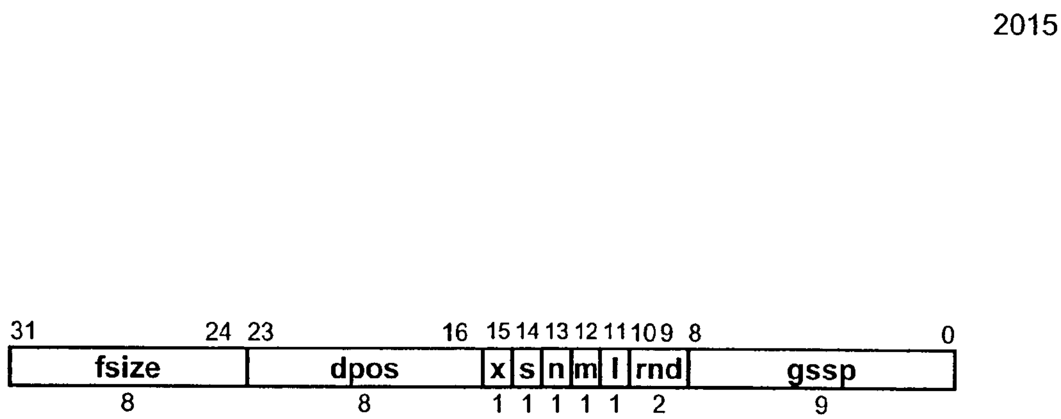

An exemplary embodiment of the Ensemble Extract instruction is shown in FIGS. 20A-20L. In an exemplary embodiment, these operations take operands from three general registers, perform operations on partitions of bits in the operands, and place the catenated results in a fourth register. An exemplary embodiment of the format and operation codes 2010 of the Ensemble Extract instruction is shown in FIG. 20A.

An exemplary embodiment of the schematics 2020, 2030, 2040, 2050, 2060, 2070, and 2080 of the Ensemble Extract Inplace instruction is shown in FIGS. 20C, 20D, 20E, 20F, 20G, 20H, and 20I. In an exemplary embodiment, the contents of general registers rd, rc, and rb are fetched. The specified operation is performed on these operands. The result is placed into register ra.

As shown in FIG. 20B, in an exemplary embodiment, bits 31 . . . 0 of the contents of general register rb specifies several parameters that control the manner in which data is extracted, and for certain operations, the manner in which the operation is performed. The position of the control fields allows for the source position to be added to a fixed control value for dynamic computation, and allows for the lower 16 bits of the control field to be set for some of the simpler extract cases by a single GCOPYI.128 instruction. The control fields are further arranged so that if only the low order 8 bits are non-zero, a 128-bit extraction with truncation and no rounding is performed.

In an exemplary embodiment, the table below describes the meaning of each label:

| label | bits | meaning |
|---|---|---|
| fsize | 8 | field size |
| dpos | 8 | destination position |
| x | 1 | extended vs. group size result |
| s | 1 | signed vs. unsigned |
| n | 1 | complex vs. real multiplication |
| m | 1 | merge vs. extract or mixed-sign vs. same-sign multiplication |
| l | 1 | limit: saturation vs. truncation |
| rnd | 2 | rounding |
| gssp | 9 | group size and source position |

In an exemplary embodiment, the 9-bit gssp field encodes both the group size, gsize, and source position, spos, according to the formula gssp=512 4*gsize+spos. The group size, gsize, is a power of two in the range 1 . . . 128. The source position, spos, is in the range 0 . . . (2*gsize)−1.

In an exemplary embodiment, the values in the x, s, n, m, l, and rnd fields have the following meaning:

| values | x | s | n | m | l | rnd |
|---|---|---|---|---|---|---|
| 0 | group | unsigned | real | extract/ same-sign | truncate | F |
| 1 | extended | signed | complex | merge/ mixed-sign | saturate | Z |
| 2 | | | | | | N |
| 3 | | | | | | C |

These instructions are undefined and cause a reserved instruction exception if, for E.SCAL.ADD.X instruction, the specified group size is less than 8 or larger than 32, or larger than 16 when complex, or for the E.MUL.X instruction, the specified group size is less than 8 or larger than 64 when complex or extended, or larger than 32 when complex and extended.

In an exemplary embodiment, for the E.SCAL.ADD.X instruction, bits 127 . . . 64 of the contents of register rb specifies the multipliers for the multiplicands in registers rd and rc. Specifically, bits 64+2*gsize−1 . . . 64+gsize is the multiplier for the contents of general register rc, and bits 64+gsize−1 . . . 64 is the multiplier for the contents of general register rd.

Ensemble Multiply Extract

The ensemble-multiply-extract instructions (E.MUL.X), when the x bit is set, multiply the low-order 64 bits of each of the rd and rc general registers and produce extended (double-size) results.

Figure 20C:
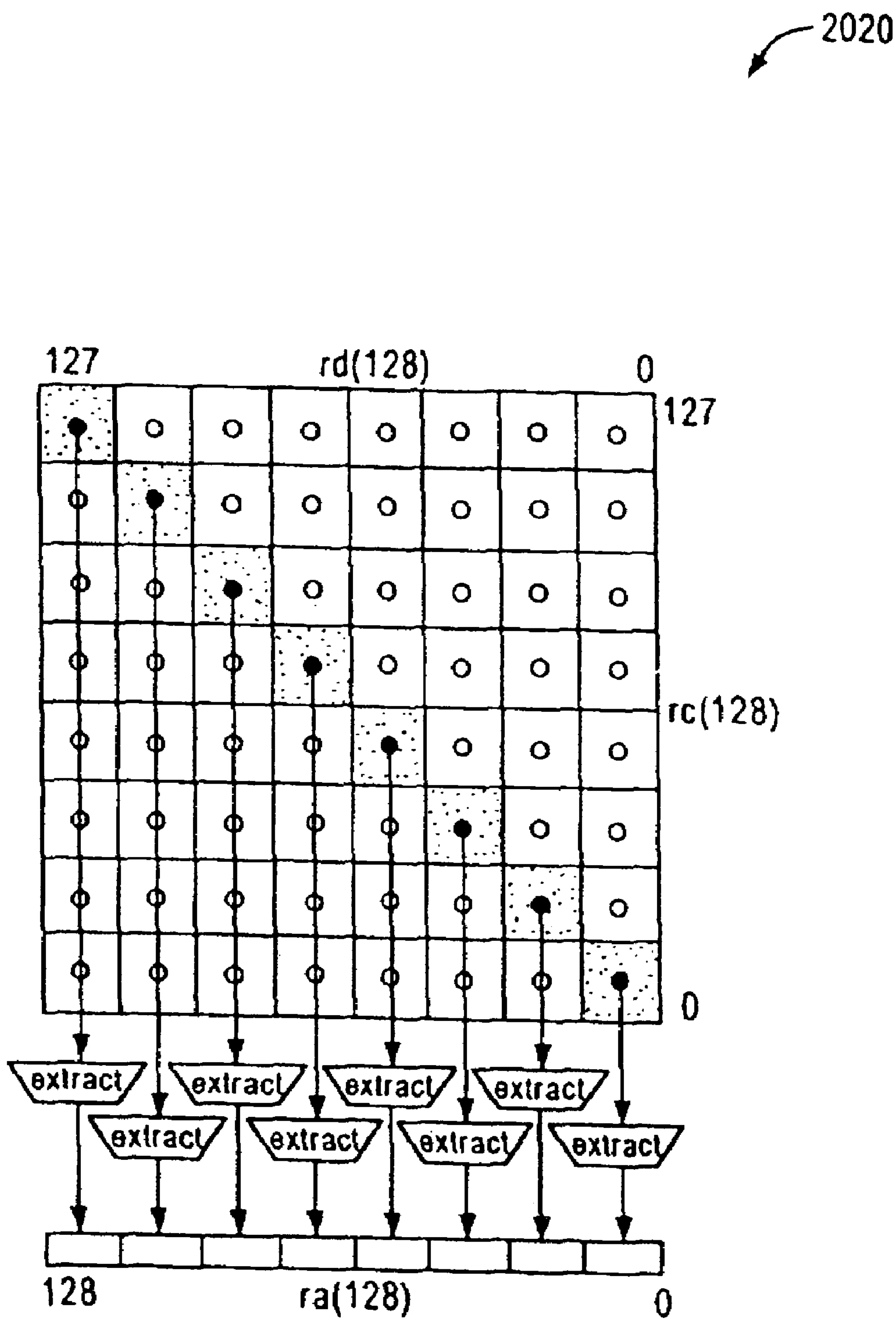

As shown in FIG. 20C, an exemplary embodiment of an ensemble-multiply-extract-doublets instruction (E.MULX) multiplies vector rd [h g f e d c b a] with vector rc [p o n m l k j i], yielding the result vector ra [hp go fn em dl ck bj ai], rounded and limited as specified by $rb_{31 \ldots 0}$.

Figure 20D:
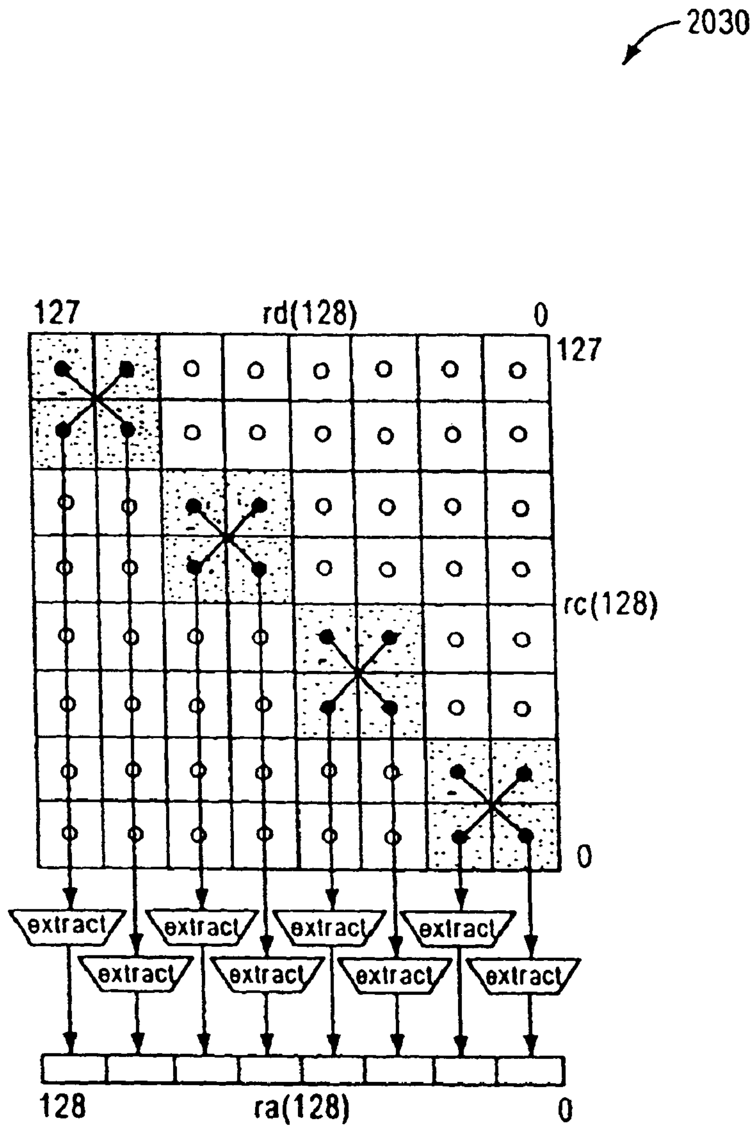

As shown in FIG. 20D, an exemplary embodiment of an ensemble-multiply-extract-doublets-complex instruction (E.MUL.X with n set) multiplies vector rd [h g f e d c b a] by vector rc [p o n m l k j i], yielding the result vector ra [gp+ho go−hp en+fm em−fn cl+dk ck−dl aj+bi ai−bj], rounded and limited as specified by $rb_{31 \ldots 0}$. Note that this instruction prefers an organization of complex numbers in which the real part is located to the right (lower precision) of the imaginary part.

Ensemble Scale Add Extract

An aspect of the present invention defines the Ensemble Scale Add Extract instruction, that combines the extract control information in a register along with two values that are used as scalar multipliers to the contents of two vector multiplicands.

This combination reduces the number of registers that would otherwise be required, or the number of bits that the instruction would otherwise require, improving performance. Another advantage of the present invention is that the combined operation may be performed by an exemplary embodiment with sufficient internal precision on the summation node that no intermediate rounding or overflow occurs, improving the accuracy over prior art operation in which more than one instruction is required to perform this computation.

The ensemble-scale-add-extract instructions (E.SCAL-ADD.X), when the x bit is set, multiply the low-order 64 bits of each of the rd and rc general registers by the rb general register fields and produce extended (double-size) results.

Figure 20E:
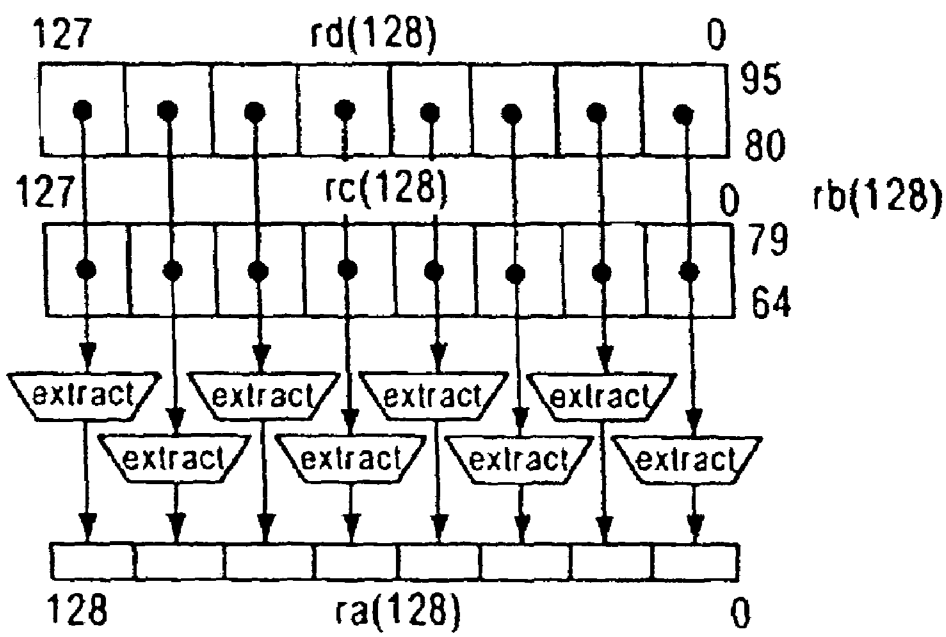

As shown in FIG. 20E, an exemplary embodiment of an ensemble-scale-add-extract-doublets instruction (E.SCAL.ADD.X) multiplies vector rc [h g f e d c b a] with $rb_{95 \ldots 80}$ [r] and adds the product to the product of vector rd [p o n m l k j i] with $rb_{79 \ldots 64}$ [q], yielding the result [hr+pq gr+oq fr+nq er+mq dr+lq cr+kq br+jq ar+iq], rounded and limited as specified by $rb_{31 \ldots 0}$.

Figure 20F:
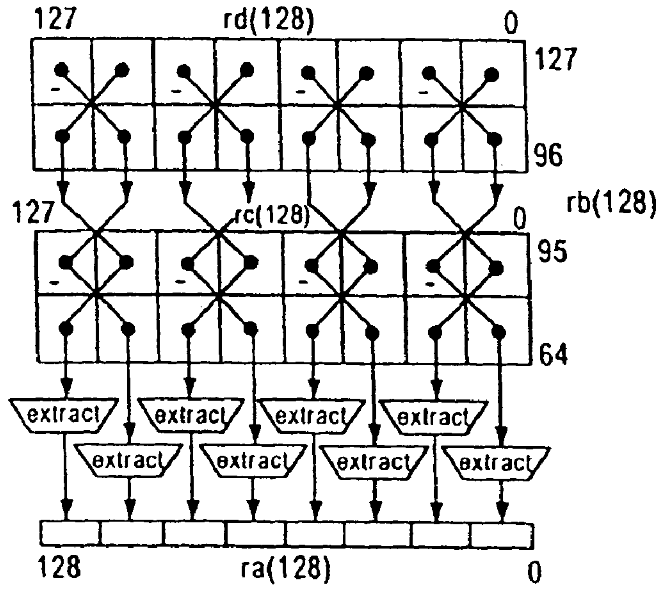

As shown in FIG. 20F, an exemplary embodiment of an ensemble-scale-add-extract-doublets-complex instruction (E.SCLADD.X with n set) multiplies vector rc [h g f e d c b a] with $rb_{127 \ldots 96}$ [t s] and adds the product to the product of vector rd [p o n m l k j i] with $rb_{95 \ldots 64}$ [r q], yielding the result [hs+gt+pq+ or gs−ht+oq−pr fs+et+nq+mr es−ft+mq−nr ds+ct+lq+kr cs−dt+kq−lr bs+at +jq+ir as−bt+iq−jr], rounded and limited as specified by $rb_{31 \ldots 0}$.

Ensemble Extract

Figure 20G:
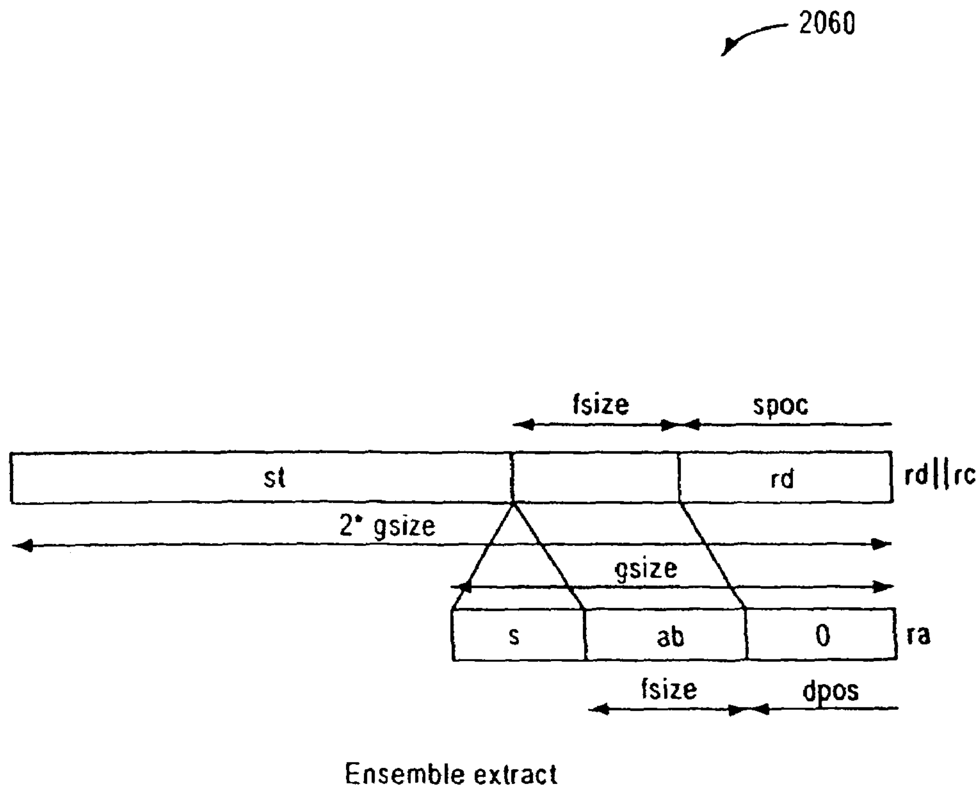

As shown in FIG. 20G, in an exemplary embodiment, for the E.EXTRACT instruction, when m=0 and x=0, the parameters specified by the contents of general register rb are interpreted to select fields from double size symbols of the catenated contents of general registers rd and rc, extracting values which are catenated and placed in general register ra.

Figure 20H:
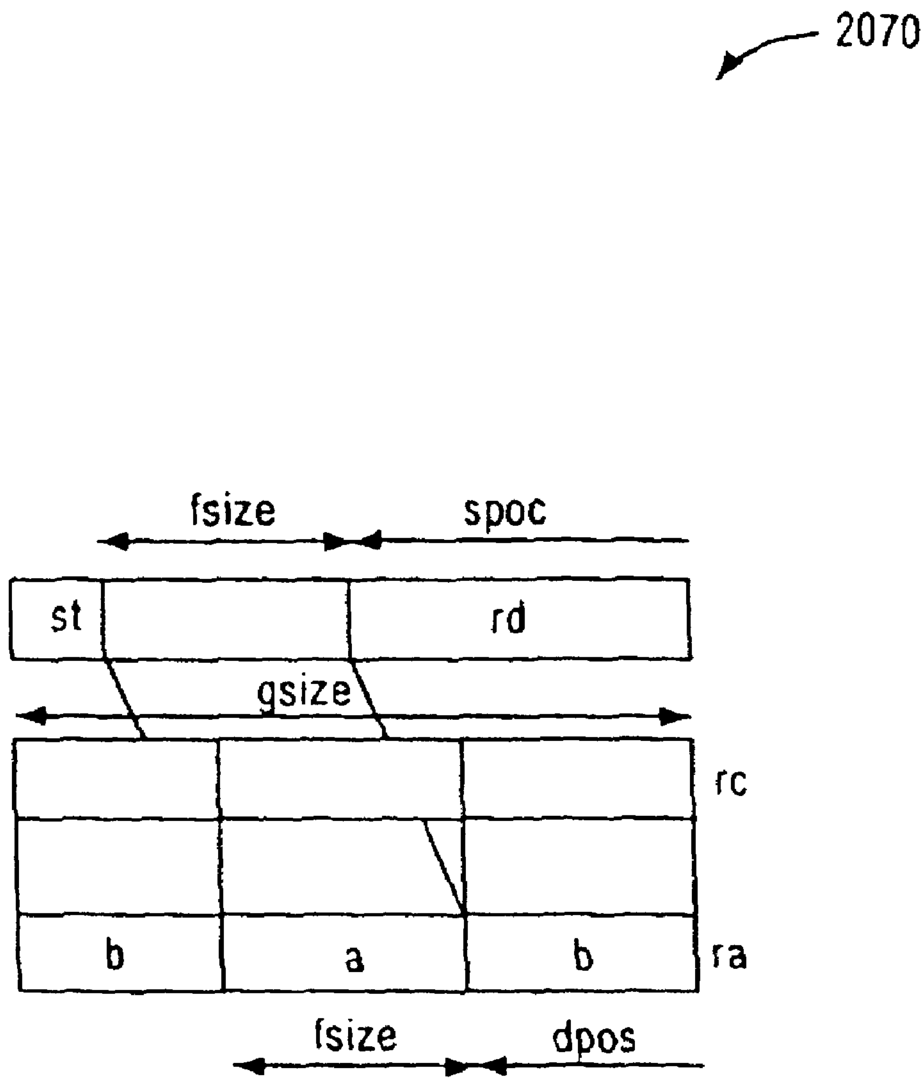

As shown in FIG. 20H, in an exemplary embodiment, for an ensemble-merge-extract (E.EXTRACT when m=1), the parameters specified by the contents of general register rb are interpreted to merge fields from symbols of the contents of general register rc with the contents of register rd. The results are catenated and placed in register ra. The x field has no effect when m=1.

Figure 20I:
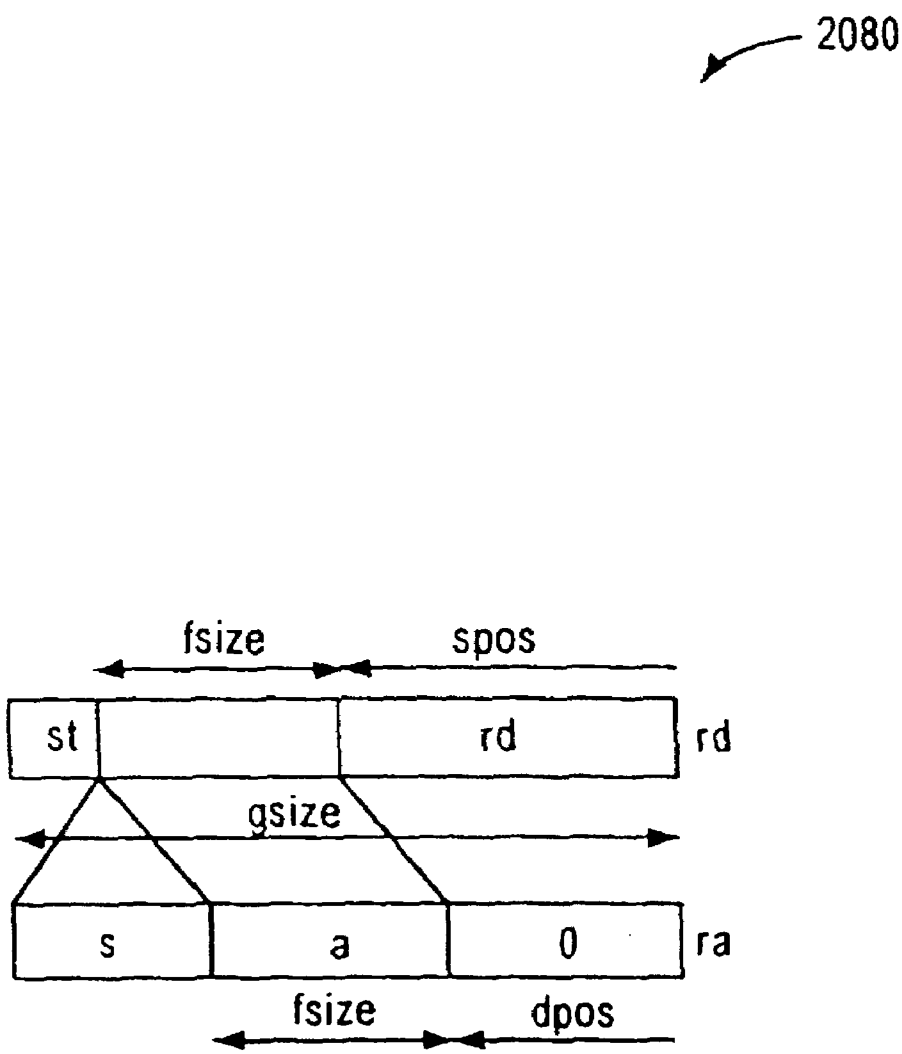

As shown in FIG. 20I, in an exemplary embodiment, for an ensemble-expand-extract (E.EXTRACT when m=0 and x=1), the parameters specified by the contents of general register rb are interpreted to extract fields from symbols of the contents of register rc. The results are catenated and placed in general register ra. Note that the value of rd is not used.

An exemplary embodiment of the pseudocode 2090 of Ensemble Extract instruction is shown in FIG. 20J. An alternative embodiment of the pseudocode of Ensemble Extract instruction is shown in FIG. 20L. Referring to FIG. 20K, in an exemplary embodiment, there are no exceptions for the Ensemble Extract instruction.

Reduction of Register Read Ports

Another alternative embodiment can reduce the number of register read ports required for implementation of instructions in which the size, shift and rounding of operands is controlled by a register. The value of the extract control register can be fetched using an additional cycle on an initial execution and retained within or near the functional unit for subsequent executions, thus reducing the amount of hardware required for implementation with a small additional performance penalty. The value retained would be marked invalid, causing a re-fetch of the extract control register, by instructions that modify the register, or alternatively, the retained value can be updated by such an operation. A re-fetch of the extract control register would also be required if a different register number were specified on a subsequent execution. It should be clear that the properties of the above two alternative embodiments can be combined.

Galois Field Arithmetic

Another aspect of the invention includes Galois field arithmetic, where multiplies are performed by an initial binary polynomial multiplication (unsigned binary multiplication with carries suppressed), followed by a polynomial modulo/remainder operation (unsigned binary division with carries suppressed). The remainder operation is relatively expensive in area and delay. In Galois field arithmetic, additions are performed by binary addition with carries suppressed, or equivalently, a bitwise exclusive or operation. In this aspect of the present invention, a matrix multiplication is performed using Galois field arithmetic, where the multiplies and additions are Galois field multiples and additions.

Using prior art methods, a 16 byte vector multiplied by a 16×16 byte matrix can be performed as 256 8-bit Galois field multiplies and 16*15=240 8-bit Galois field additions. Included in the 256 Galois field multiplies are 256 polynomial multiplies and 256 polynomial remainder operations.

By use of the present invention, the total computation is reduced significantly by performing 256 polynomial multiplies, 240 16-bit polynomial additions, and 16 polynomial remainder operations. Note that the cost of the polynomial additions has been doubled compared with the Galois field additions, as these are now 16-bit operations rather than 8-bit operations, but the cost of the polynomial remainder functions has been reduced by a factor of 16. Overall, this is a favorable tradeoff, as the cost of addition is much lower than the cost of remainder.

Decoupled Access from Execution Pipelines and Simultaneous Multithreading

Figure 4:
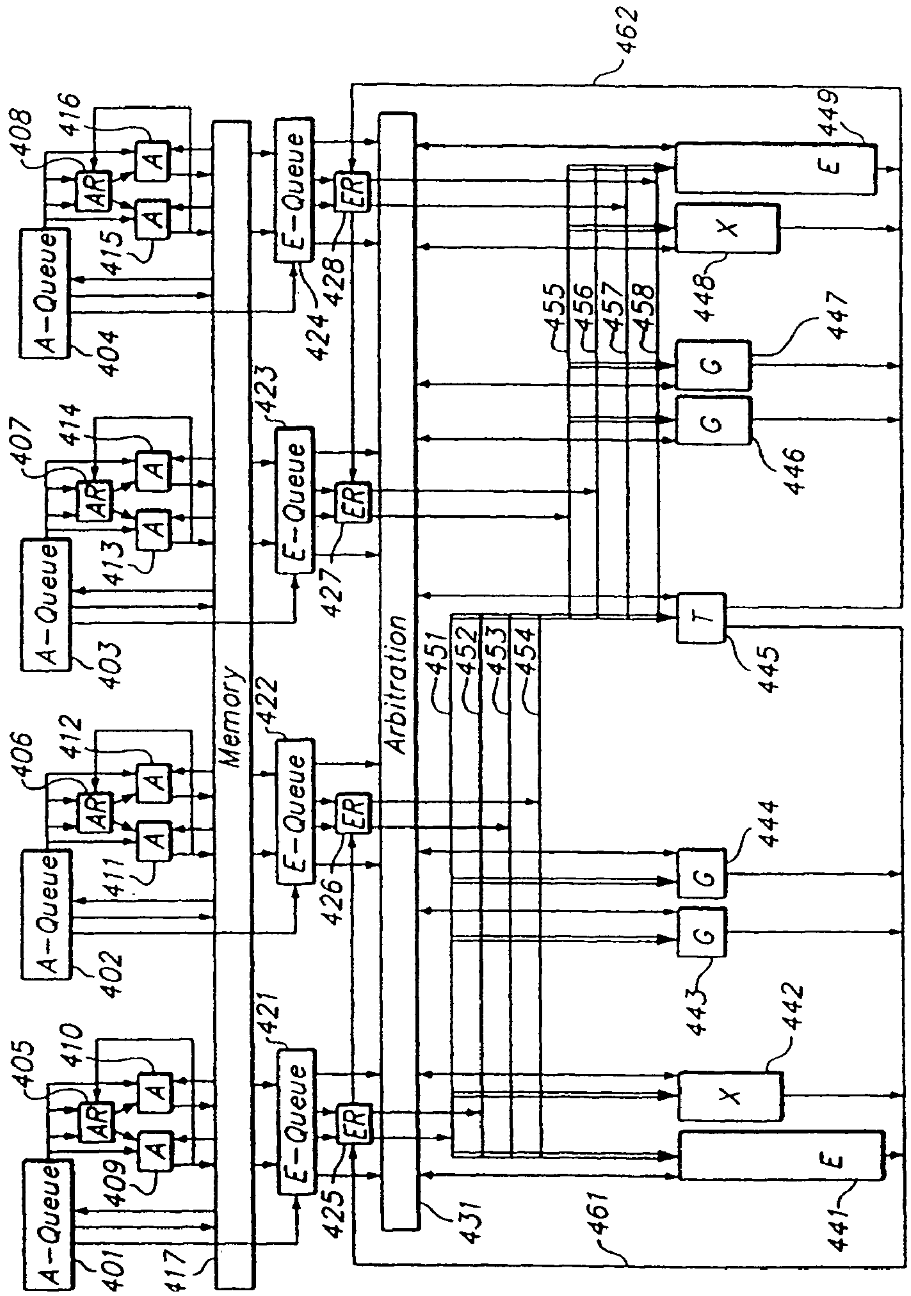
FIG. 4 is a system level diagram showing the functional blocks of a system incorporating a combined Simultaneous Multi Threading and Decoupled Access from Execution processor in accordance with an exemplary embodiment of the present invention.

In yet another aspect of the present invention, best shown in FIG. 4, the present invention employs both decoupled access from execution pipelines and simultaneous multithreading in a unique way. Simultaneous Multithreaded pipelines have been employed in prior art to enhance the utilization of data path units by allowing instructions to be issued from one of several execution threads to each functional unit (e.g. Dean M. Tullsen, Susan J. Eggers, and Henry M. Levy, "Simultaneous Multithreading: Maximizing On Chip Parallelism," Proceedings of the 22nd Annual International Symposium on Computer Architecture, Santa Margherita Ligure, Italy, June, 1995).

Decoupled access from execution pipelines have been employed in prior art to enhance the utilization of execution data path units by buffering results from an access unit, which computes addresses to a memory unit that in turn fetches the requested items from memory, and then presenting them to an execution unit (e.g. J. E. Smith, "Decoupled Access/Execute Computer Architectures", Proceedings of the Ninth Annual International Symposium on Computer Architecture, Austin, Tex. (Apr. 26 29, 1982), pp. 112-119).

Compared to conventional pipelines, the Eggers prior art used an additional pipeline cycle before instructions could be issued to functional units, the additional cycle needed to determine which threads should be permitted to issue instructions. Consequently, relative to conventional pipelines, the prior art design had additional delay, including dependent branch delay.

The present invention contains individual access data path units, with associated register files, for each execution thread. These access units produce addresses, which are aggregated together to a common memory unit, which fetches all the addresses and places the memory contents in one or more buffers. Instructions for execution units, which are shared to varying degrees among the threads are also buffered for later execution. The execution units then perform operations from all active threads using functional data path units that are shared.

For instructions performed by the execution units, the extra cycle required for prior art simultaneous multithreading designs is overlapped with the memory data access time from prior art decoupled access from execution cycles, so that no additional delay is incurred by the execution functional units for scheduling resources. For instructions performed by the access units, by employing individual access units for each thread the additional cycle for scheduling shared resources is also eliminated.

This is a favorable tradeoff because, while threads do not share the access functional units, these units are relatively small compared to the execution functional units, which are shared by threads.

With regard to the sharing of execution units, the present invention employs several different classes of functional units for the execution unit, with varying cost, utilization, and performance. In particular, the G units, which perform simple addition and bitwise operations is relatively inexpensive (in area and power) compared to the other units, and its utilization is relatively high. Consequently, the design employs four such units, where each unit can be shared between two threads. The X unit, which performs a broad class of data switching functions is more expensive and less used, so two units are provided that are each shared among two threads. The T unit, which performs the Wide Translate instruction, is expensive and utilization is low, so the single unit is shared among all four threads. The E unit, which performs the class of Ensemble instructions, is very expensive in area and power compared to the other functional units, but utilization is relatively high, so we provide two such units, each unit shared by two threads.

In FIG. 4, four copies of an access unit are shown, each with an access instruction fetch queue A-Queue 401-404, coupled to an access register file AR 405-408, each of which is, in turn, coupled to two access functional units A 409-416. The access units function independently for four simultaneous threads of execution. These eight access functional units A 409-416 produce results for access register files AR 405-408 and addresses to a shared memory system 417. The memory contents fetched from memory system 417 are combined with execute instructions not performed by the access unit and entered into the four execute instruction queues E-Queue 421-424. Instructions and memory data from E-queue 421-424 are presented to execution register files 425-428, which fetches execution register file source operands. The instructions are coupled to the execution unit arbitration unit Arbitration 431, that selects which instructions from the four threads are to be routed to the available execution units E 441 and 449, X 442 and 448, G 443-444 and 446-447, and T 445. The execution register file source operands ER 425-428 are coupled to the execution units 441-445 using source operand buses 451-454 and to the execution units 445-449 using source operand buses 455-458. The function unit result operands from execution units 441-445 are coupled to the execution register file using result bus 461 and the function units result operands from execution units 445-449 are coupled to the execution register file using result bus 462.

Improved Interprivilege Gateway

In a still further aspect of the present invention, an improved interprivilege gateway is described which involves increased parallelism and leads to enhanced performance. In related U.S. patent application Ser. No. 08/541,416, a system and method is described for implementing an instruction that, in a controlled fashion, allows the transfer of control (branch) from a lower privilege level to a higher privilege level. The present invention is an improved system and method for a modified instruction that accomplishes the same purpose but with specific advantages.

Many processor resources, such as control of the virtual memory system itself, input and output operations, and system control functions are protected from accidental or malicious misuse by enclosing them in a protective, privileged region. Entry to this region must be established only though particular entry points, called gateways, to maintain the integrity of these protected regions.

Prior art versions of this operation generally load an address from a region of memory using a protected virtual memory attribute that is only set for data regions that contain valid gateway entry points, then perform a branch to an address contained in the contents of memory. Basically, three steps were involved: load, then branch and check. Compared to other instructions, such as register to register computation instructions and memory loads and stores, and register based branches, this is a substantially longer operation, which introduces delays and complexity to a pipelined implementation.

In the present invention, the branch-gateway instruction performs two operations in parallel: 1) a branch is performed to the Contents of register 0 and 2) a load is performed using the contents of register 1, using a specified byte order (little-endian) and a specified size (64 bits). If the value loaded from memory does not equal the contents of register 0, the instruction is aborted due to an exception. In addition, 3) a return address (the next sequential instruction address following the branch-gateway instruction) is written into register 0, provided the instruction is not aborted. This approach essentially uses a first instruction to establish the requisite permission to allow user code to access privileged code, and then a second instruction is permitted to branch directly to the privileged code because of the permissions issued for the first instruction.

In the present invention, the new privilege level is also contained in register 0, and the second parallel operation does not need to be performed if the new privilege level is not greater than the old privilege level. When this second operation is suppressed, the remainder of the instruction performs an identical function to a branch-link instruction, which is used for invoking procedures that do not require an increase in privilege. The advantage that this feature brings is that the branch-gateway instruction can be used to call a procedure that may or may not require an increase in privilege.

The memory load operation verifies with the virtual memory system that the region that is loaded has been tagged as containing valid gateway data. A further advantage of the present invention is that the called procedure may rely on the fact that register 1 contains the address that the gateway data was loaded from, and can use the contents of register 1 to locate additional data or addresses that the procedure may require. Prior art versions of this instruction required that an additional address be loaded from the gateway region of memory in order to initialize that address in a protected manner—the present invention allows the address itself to be loaded with a "normal" load operation that does not require special protection.

The present invention allows a "normal" load operation to also load the contents of register 0 prior to issuing the branch-gateway instruction. The value may be loaded from the same memory address that is loaded by the branch-gateway instruction, because the present invention contains a virtual memory system in which the region may be enabled for normal load operations as well as the special "gateway" load operation performed by the branch-gateway instruction.

Improved Interprivilege Gateway—System and Privileged Library Calls

Figure 21A:
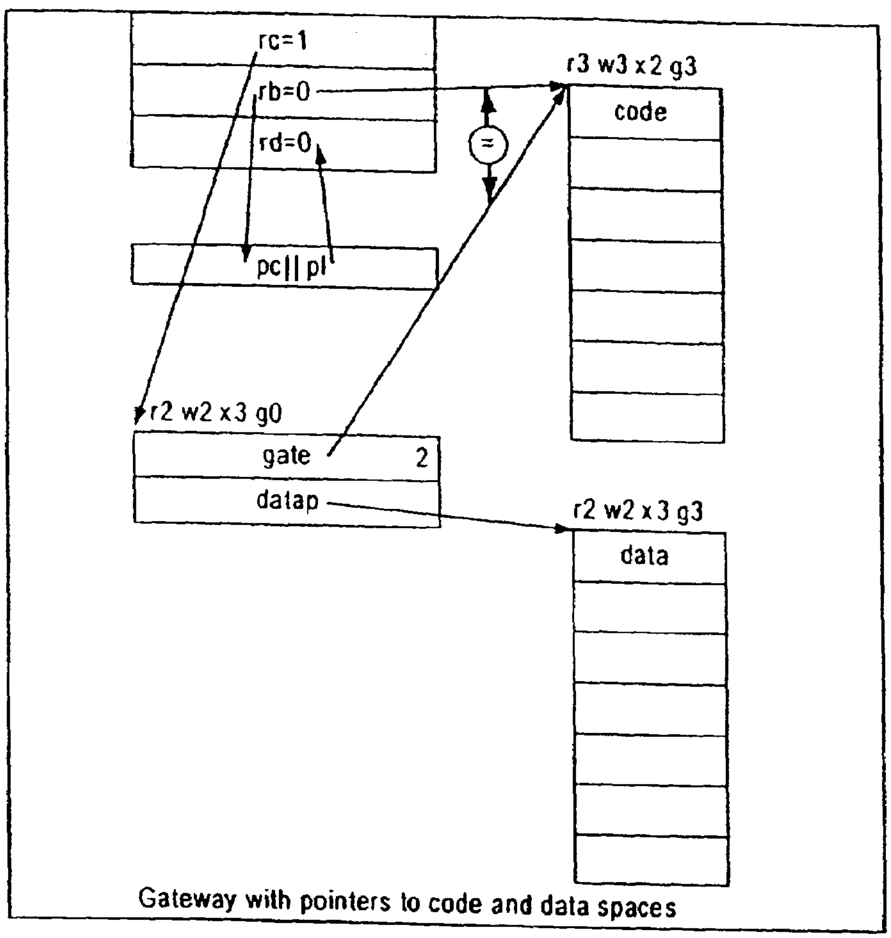

An exemplary embodiment of the System and Privileged Library Calls is shown in FIGS. 21A-21 B. An exemplary embodiment of the schematic 2110 of System and Privileged Library Calls is shown in FIG. 21A. In an exemplary embodiment, it is an objective to make calls to system facilities and privileged libraries as similar as possible to normal procedure calls as described above. Rather than invoke system calls as an exception, which involves significant latency and complication, a modified procedure call in which the process privilege level is quietly raised to the required level is used. To provide this mechanism safely, interaction with the virtual memory system is required.

In an exemplary embodiment, such a procedure must not be entered from anywhere other than its legitimate entry point, to prohibit entering a procedure after the point at which security checks are performed or with invalid register contents, otherwise the access to a higher privilege level can lead to a security violation. In addition, the procedure generally must have access to memory data, for which addresses must be produced by the privileged code. To facilitate generating these addresses, the branch-gateway instruction allows the privileged code procedure to rely on the fact that a single register has been verified to contain a pointer to a valid memory region.

In an exemplary embodiment, the branch-gateway instruction ensures both that the procedure is invoked at a proper entry point, and that other registers such as the data pointer and stack pointer can be properly set. To ensure this, the branch-gateway instruction retrieves a "gateway" directly from the protected virtual memory space. The gateway contains the virtual address of the entry point of the procedure and the target privilege level. A gateway can only exist in regions of the virtual address space designated to contain them, and can only be used to access privilege levels at or below the privilege level at which the memory region can be written to ensure that a gateway cannot be forged.

In an exemplary embodiment, the branch-gateway instruction ensures that register 1 (dp) contains a valid pointer to the gateway for this target code address by comparing the contents of register 0 (lp) against the gateway retrieved from memory and causing an exception trap if they do not match. By ensuring that register 1 points to the gateway, auxiliary information, such as the data pointer and stack pointer can be set by loading values located by the contents of register 1. For example, the eight bytes following the gateway may be used as a pointer to a data region for the procedure.

In an exemplary embodiment, before executing the branch-gateway instruction, register 1 must be set to point at the gateway, and register 0 must be set to the address of the target code address plus the desired privilege level. A "L.I.64.L.A r0=r1,0" instruction is one way to set register 0, if register 1 has already been set, but any means of getting the correct value into register 0 is permissible.

In an exemplary embodiment, similarly, a return from a system or privileged routine involves a reduction of privilege. This need not be carefully controlled by architectural facilities, so a procedure may freely branch to a less-privileged code address. Normally, such a procedure restores the stack frame, then uses the branch-down instruction to return.

An exemplary embodiment of the typical dynamic-linked, inter-gateway calling sequence 2130 is shown in FIG. 21B. In an exemplary embodiment, the calling sequence is identical to that of the inter-module calling sequence shown above, except for the use of the B.GATE instruction instead of a B.LINK instruction. Indeed, if a B.GATE instruction is used when the privilege level in the lp register is not higher than the current privilege level, the B.GATE instruction performs an identical function to a B.LINK.

In an exemplary embodiment, the callee, if it uses a stack for local variable allocation, cannot necessarily trust the value of the sp passed to it, as it can be forged. Similarly, any pointers which the callee provides should not be used directly unless it they are verified to point to regions which the callee should be permitted to address. This can be avoided by defining application programming interfaces (APIs) in which all values are passed and returned in registers, or by using a trusted, intermediate privilege wrapper routine to pass and return parameters. The method described below can also be used.

In an exemplary embodiment, it can be useful to have highly privileged code call less-privileged routines. For example, a user may request that errors in a privileged routine be reported by invoking a user-supplied error-logging routine. To invoke the procedure, the privilege can be reduced via the branch-down instruction. The return from the procedure actually requires an increase in privilege, which must be carefully controlled. This is dealt with by placing the procedure call within a lower-privilege procedure wrapper, which uses the branch-gateway instruction to return to the higher privilege region after the call through a secure re-entry point. Special care must be taken to ensure that the less-privileged routine is not permitted to gain unauthorized access by corruption of the stack or saved registers, such as by saving all registers and setting up a new stack frame (or restoring the original lower-privilege stack) that may be manipulated by the less-privileged routine. Finally, such a technique is vulnerable to an unprivileged routine attempting to use the re-entry point directly, so it may be appropriate to keep a privileged state variable which controls permission to enter at the re-entry point.

Improved Interprivilege Gateway—Branch Gateway

An exemplary embodiment of the Branch Gateway instruction is shown in FIGS. 21C-21H. In an exemplary embodiment, this operation provides a secure means to call a procedure, including those at a higher privilege level. An exemplary embodiment of the format and operation codes 2160 of the Branch Gateway instruction is shown in FIG. 21C.

Figure 21D:
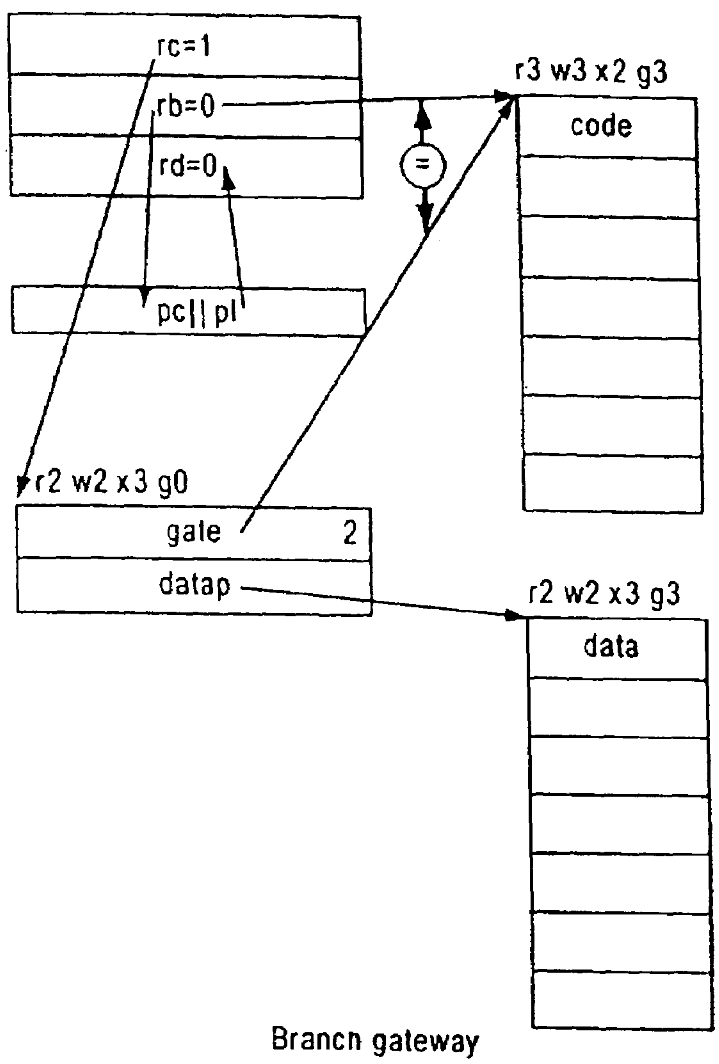

An exemplary embodiment of the schematic 2170 of the Branch Gateway instruction is shown in FIG. 21D. In an exemplary embodiment, the contents of register rb are a branch address in the high-order 62 bits and a new privilege level in the low-order 2 bits. A branch and link occurs to the branch address, and the privilege level is raised to the new privilege level. The high-order. 62 bits of the successor to the current program counter is catenated with the 2-bit current execution privilege and placed in register 0.

In an exemplary embodiment, if the new privilege level is greater than the current privilege level, an octlet of memory data is fetched from the address specified by register 1, using the little-endian byte order and a gateway access type. A GatewayDisallowed exception occurs if the original contents of register 0 do not equal the memory data.

In an exemplary embodiment, if the new privilege level is the same as the current privilege level, no checking of register 1 is performed.

In an exemplary embodiment, an AccessDisallowed exception occurs if the new privilege level is greater than the privilege level required to write the memory data, or if the old privilege level is lower than the privilege required to access the memory data as a gateway, or if the access is not aligned on an 8-byte boundary.

In an exemplary embodiment, a ReservedInstruction exception occurs if the rc field is not one or the rd field is not zero.

In an exemplary embodiment, in the example in FIG. 21 D, a gateway from level 0 to level 2 is illustrated. The gateway pointer, located by the contents of general register rc (1), is fetched from memory and compared against the contents of general register rb (0). The instruction may only complete if these values are equal. Concurrently, the contents of general register rb (0) is placed in the program counter and privilege level, and the address of the next sequential address and privilege level is placed into register rd (0). Code at the target of the gateway locates the data pointer at an offset from the gateway pointer (register 1), and fetches it into general register 1, making a data region available. A stack pointer may be saved and fetched using the data region, another region located from the data region, or a data region located as an offset from the original gateway pointer.

For additional information on the branch-gateway instruction, see the System and Privileged Library Calls section herein.

In an exemplary embodiment, this instruction gives the target procedure the assurances that general register 0 contains a valid return address and privilege level, that general register 1 points to the gateway location, and that the gateway location is octlet aligned. General register 1 can then be used to securely reach values in memory. If no sharing of literal pools is desired, register 1 may be used as a literal pool pointer directly. If sharing of literal pools is desired, general register 1 may be used with an appropriate offset to load a new literal pool pointer; for example, with a one cache line offset from the register 1. Note that because the virtual memory system operates with cache line granularity, that several gateway locations must be created together.

In an exemplary embodiment, software must ensure that an attempt to use any octlet within the region designated by virtual memory as gateway either functions properly or causes a legitimate exception. For example, if the adjacent octlets contain pointers to literal pool locations, software should ensure that these literal pools are not executable, or that by virtue of being aligned addresses, cannot raise the execution privilege level. If general register 1 is used directly as a literal pool location, software must ensure that the literal pool locations that are accessible as a gateway do not lead to a security violation.

In an exemplary embodiment, general register 0 contains a valid return address and privilege level, the value is suitable for use directly in the Branch down (B.DOWN) instruction to return to the gateway callee.

An exemplary embodiment of the pseudocode 2190 of the Branch Gateway instruction is shown in FIG. 21E. An alternative embodiment of the pseudocode of the Branch Gateway instruction is shown in FIG. 21G. An exemplary embodiment of the exceptions 2199 of the Branch Gateway instruction is shown in FIG. 21F.

Group Add

These operations take operands from two general registers, perform operations on partitions of bits in the operands, and place the concatenated results in a third general register.

In accordance with one embodiment of the invention, the processor handles a variety fix-point, or integer, group operations. For example, FIG. 26A presents various examples of Group Add instructions accommodating different operand sizes, such as a byte (8 bits), doublet (16 bits), quadlet (32 bits), octlet (64 bits), and hexlet (128 bits). FIGS. 26B and 26C illustrate an exemplary embodiment of a format and operation codes that can be used to perform the various Group Add instructions shown in FIG. 26A. As shown in FIGS. 26B and 26C, in this exemplary embodiment, the contents of general registers rc and rb are partitioned into groups of operands of the size specified and added, and if specified, checked for overflow or limited, yielding a group of results, each of which is the size specified. The group of results is catenated and placed in register rd. While the use of two operand registers and a different result register is described here and elsewhere in the present specification, other arrangements, such as the use of immediate values, may also be implemented. An alternative embodiment of the pseudocode of the Group Add instruction is shown in FIG. 26D.

In the present embodiment, for example, if the operand size specified is a byte (8 bits), and each register is 128-bit wide, then the content of each register may be partitioned into 16 individual operands, and 16 different individual add operations may take place as the result of a single Group Add instruction. Other instructions involving groups of operands may perform group operations in a similar fashion.

An exemplary embodiment of the exceptions of the Group Add instructions is shown in FIG. 26E.

Group Set and Group Subtract

These operations take two values from general registers, perform operations on partitions of bits in the operands, and place the concatenated results in a general register. Two values are taken from the contents of general registers rc and rb. The specified operation is performed, and the result is placed in general register rd.

Similarly, FIG. 27A presents various examples of Group Set instructions and Group Subtract instructions accommodating different operand sizes. FIGS. 27B and 27C illustrate an exemplary embodiment of a format and operation codes that can be used to perform the various Group Set instructions and Group Subtract instructions. As shown in FIGS. 27B and 27C, in this exemplary embodiment, the contents of registers rc and rb are partitioned into groups of operands of the size specified and for Group Set instructions are compared for a specified arithmetic condition or for Group Subtract instructions are subtracted, and if specified, checked for overflow or limited, yielding a group of results, each of which is the size specified. The group of results is catenated and placed in register rd. An alternative embodiment of the pseudocode of the Group Reversed instructions is shown in FIG. 27D. An exemplary embodiment of the exceptions of the Group Reversed instructions is shown in FIG. 27E.

Ensemble Convolve, Divide, Multiply, Multiply Sum

These operations take operands from two general registers, perform operations on partitions of bits in the operands, and place the concatenated results in a third general register. Two values are taken from the contents of general registers rc and rb. The specified operation is performed, and the result is placed in general register rd.

In the present embodiment, other fix-point group operations are also available. FIG. 28A presents various examples of Ensemble Convolve, Ensemble Divide, Ensemble Multiply, and Ensemble Multiply Sum instructions accommodating different operand sizes. FIGS. 28B and 28C illustrate an exemplary embodiment of a format and operation codes that can be used to perform the various Ensemble Convolve, Ensemble Divide, Ensemble Multiply and Ensemble Multiply Sum instructions. As shown in FIGS. 28B, 28C, and 28J in these exemplary and alternative embodiments, the contents of registers rc and rb are partitioned into groups of operands of the size specified and convolved or divided or multiplied, yielding a group of results, or multiplied and summed to a single result. The group of results is catenated and placed, or the single result is placed, in register rd. An exemplary embodiment of the exceptions of the Ensemble Convolve, Ensemble Divide, Ensemble Multiply, and Ensemble Multiply Sum instructions is shown in FIG. 13K.

An ensemble-multiply (E.MUL) instruction partitions the low-order 64 bits of the contents of general registers rc and rb into elements of the specified format and size, multiplies corresponding elements together and catenates the products, yielding a 128-bit result that is placed in general register rd.

Figure 28D:
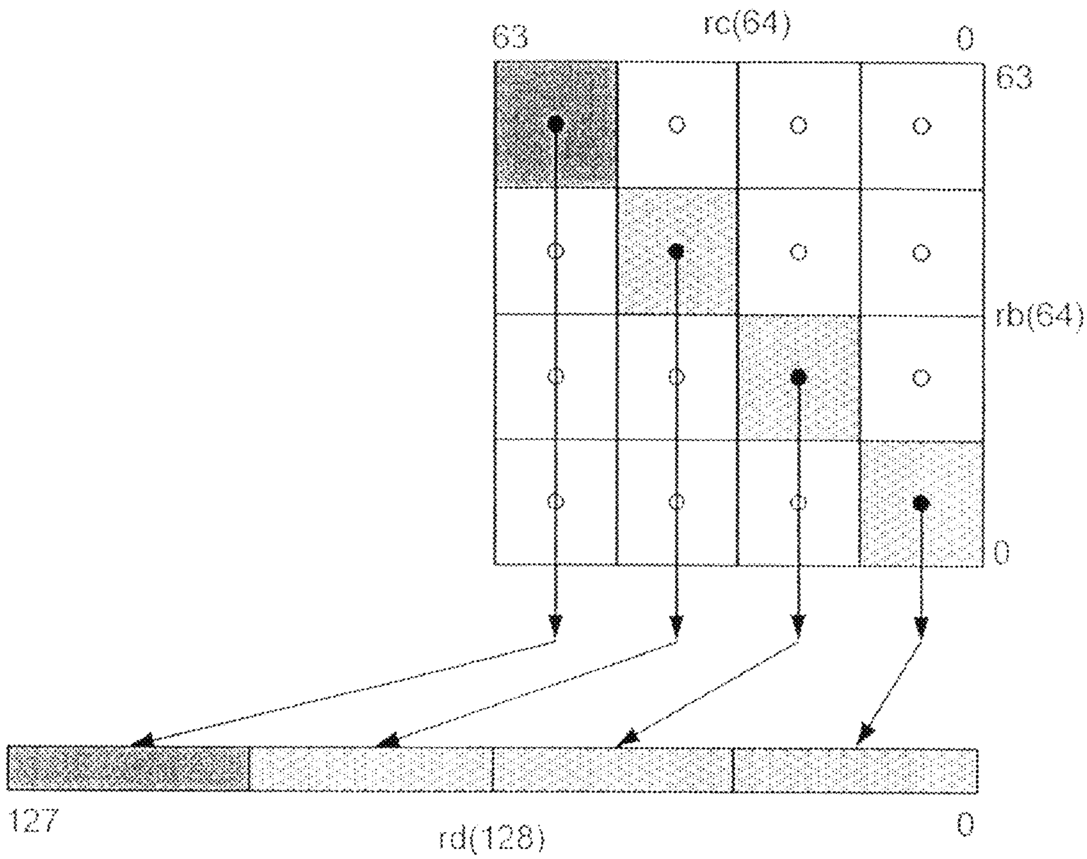
Figure 28E:
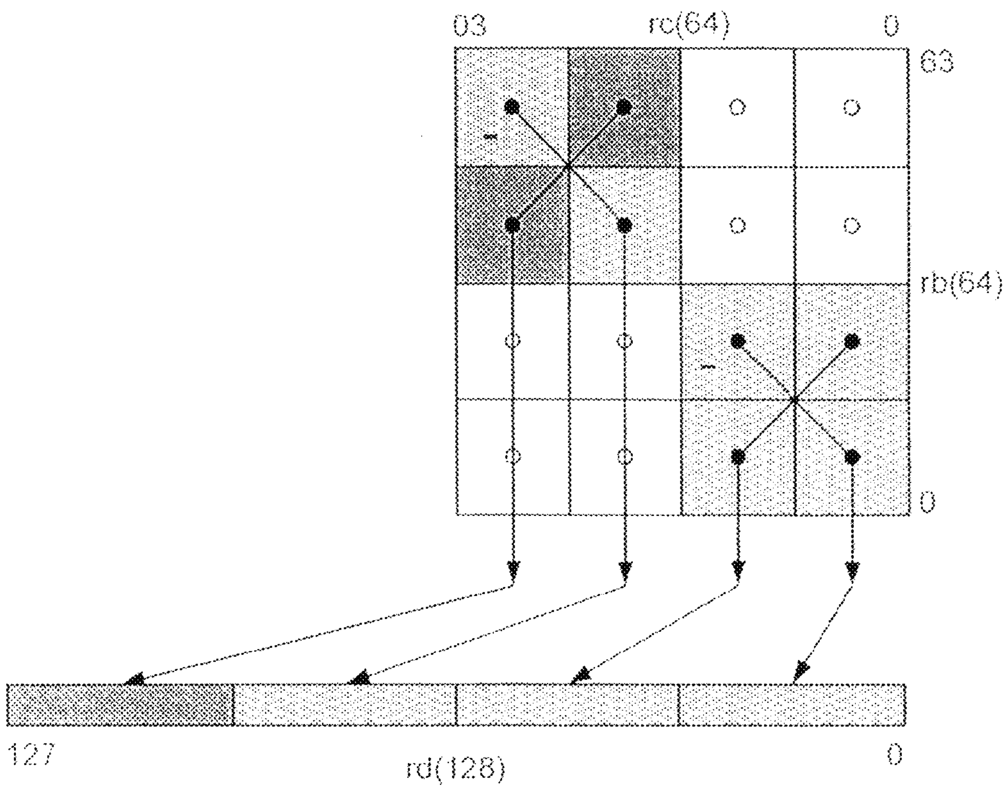

Referring to FIG. 28D, an ensemble-multiply-doublets instruction (EMUL.16, EMUL.M16, EMUL.U16, or E.MUL.P16) multiplies vector [h g f e] with vector [d c b a], yielding the products [hd gc fb ea]:

Referring to FIG. 28E, an ensemble-multiply-complex doublets instruction (EMUL.C16) multiplies vector [h g f e] with vector [d c b a], yielding the products [hc+gd gc−hd fa+eb ea−fb]:

An ensemble-multiply-sum (E.MUL.SUM) instruction partitions the 128 bits of the contents of general registers rc and rb into elements of the specified format and size, multiplies corresponding elements together and sums the products, yielding a 128-bit result that is placed in general register rd.

Figure 28F:
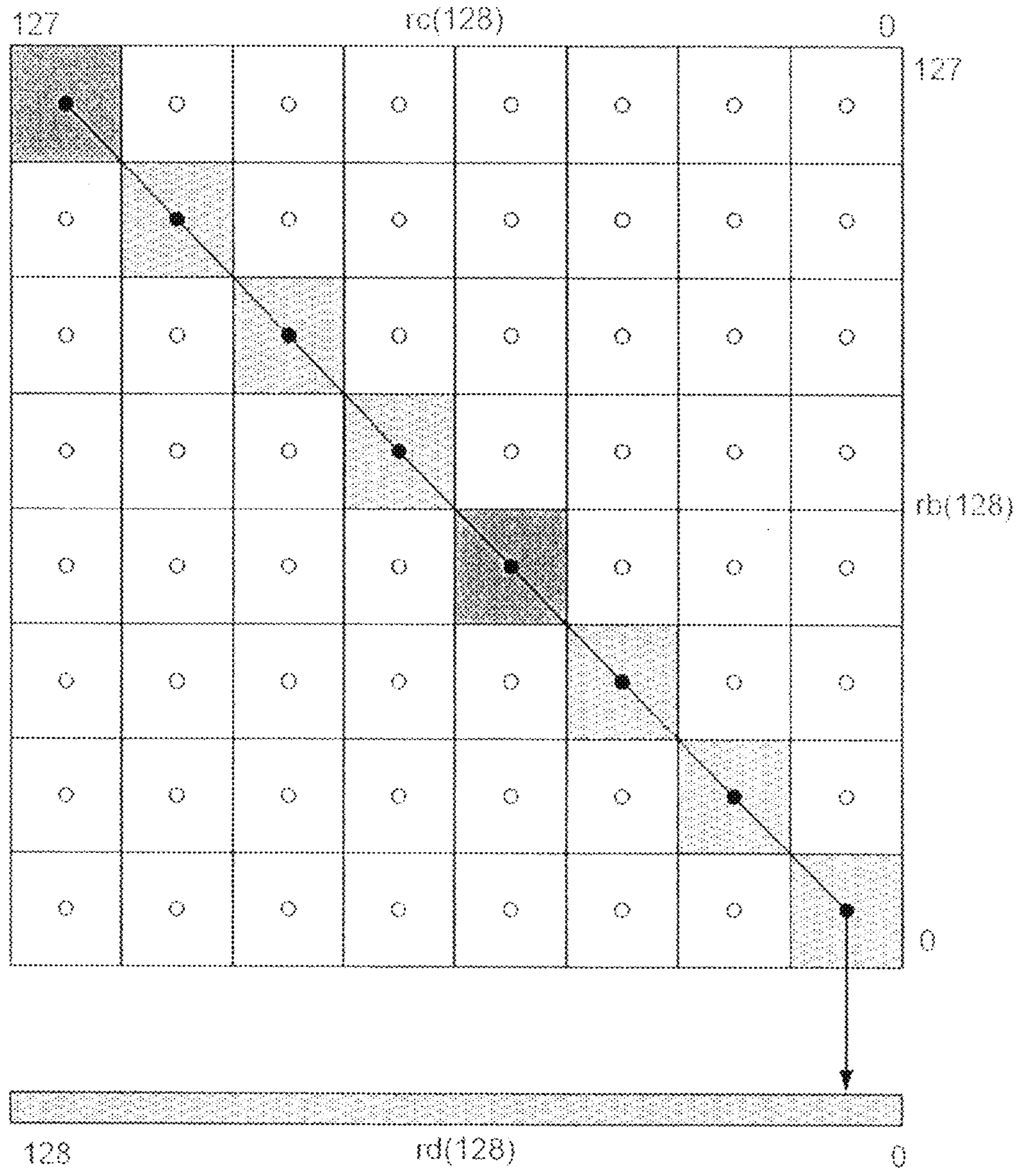
Figure 28G:
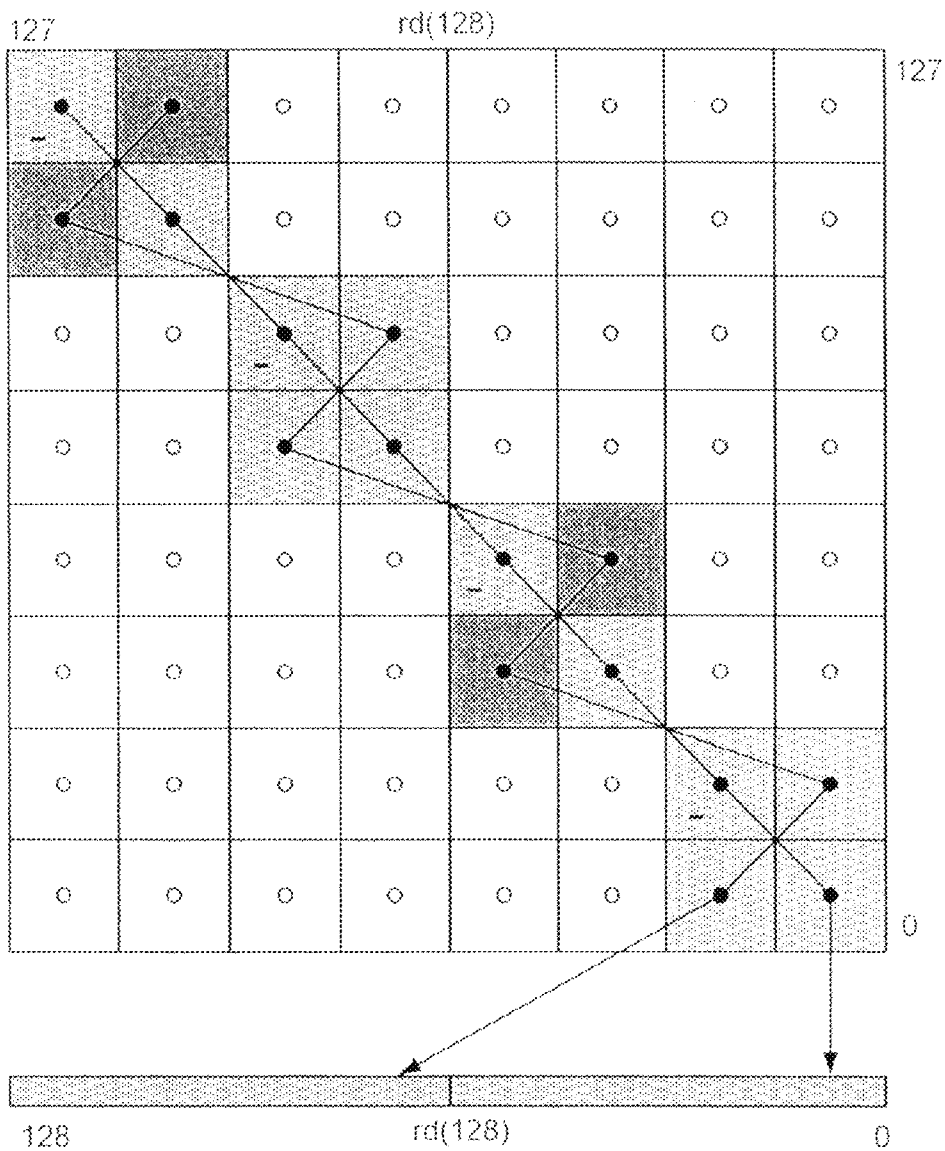

Referring to FIG. 28F, an ensemble-multiply-sum-doublets instruction (EMUL.SUM.16, EMUL.SUM.M16, or EMUL.SUM.U16) multiplies vector [p o n m l k j i] with vector [h g f e d c b a], and summing each product, yielding the result [hp+go+fn+em+dl+ck+bj+ai]:

Referring to FIG. 28G, an ensemble-multiply-sum-complex-doublets instruction (EMUL.SUM.C16) multiplies vector [p o n m l k j i] with vector [h g f e d c b a], and summing each product, yielding the result [ho+gp+fm+en+dk+cl+bi+aj go−hp+em−fn+ck−dl+ai−bj]:

An ensemble-convolve (E.CON) instruction partitions the contents of general register rc, with the least-significant element ignored, and the low-order 64 bits of the contents of general register rb into elements of the specified format and size, convolves corresponding elements together and catenates the products, yielding a 128-bit result that is placed in general register rd.

Figure 28H:
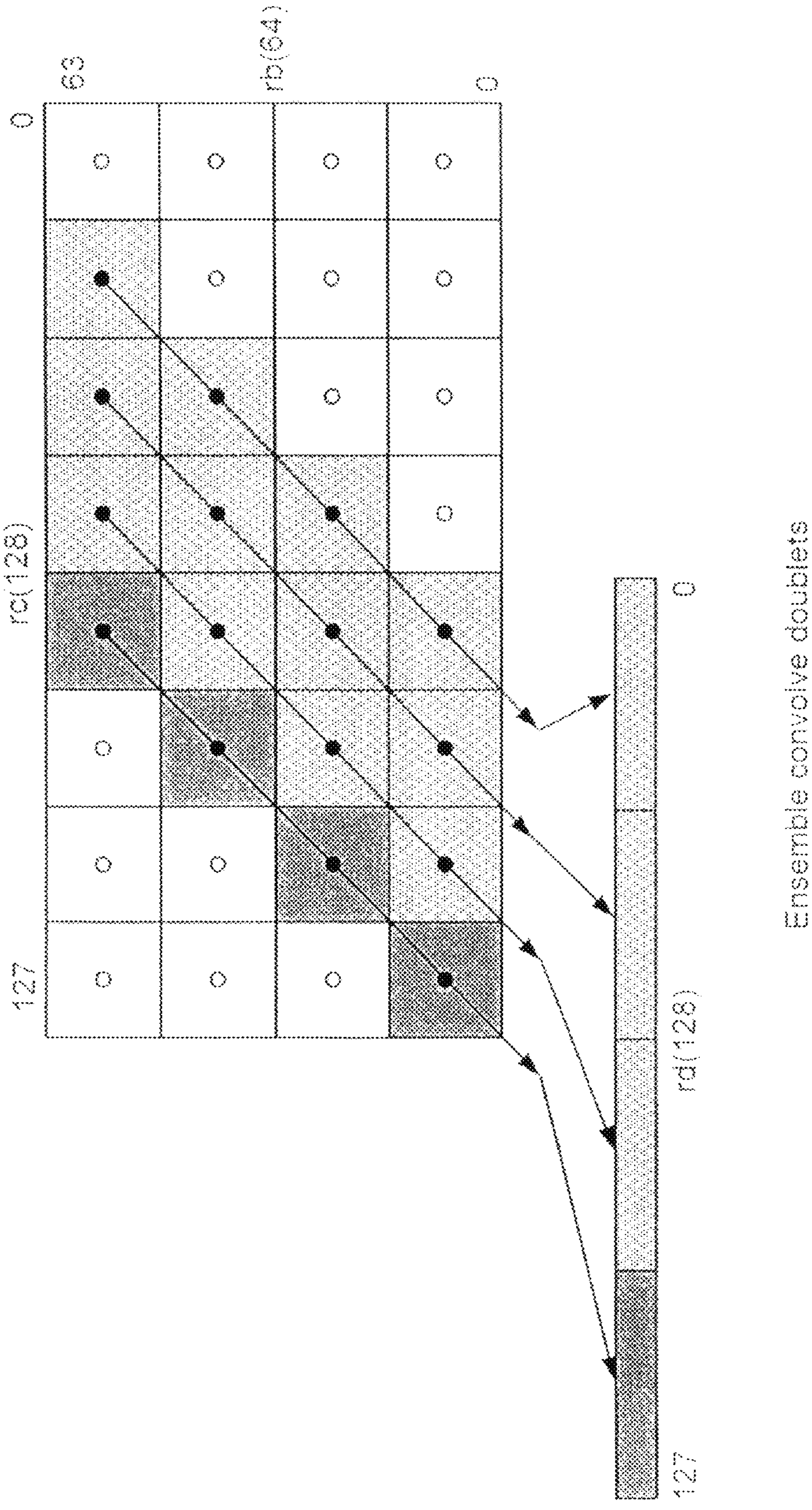
Figure 28I:
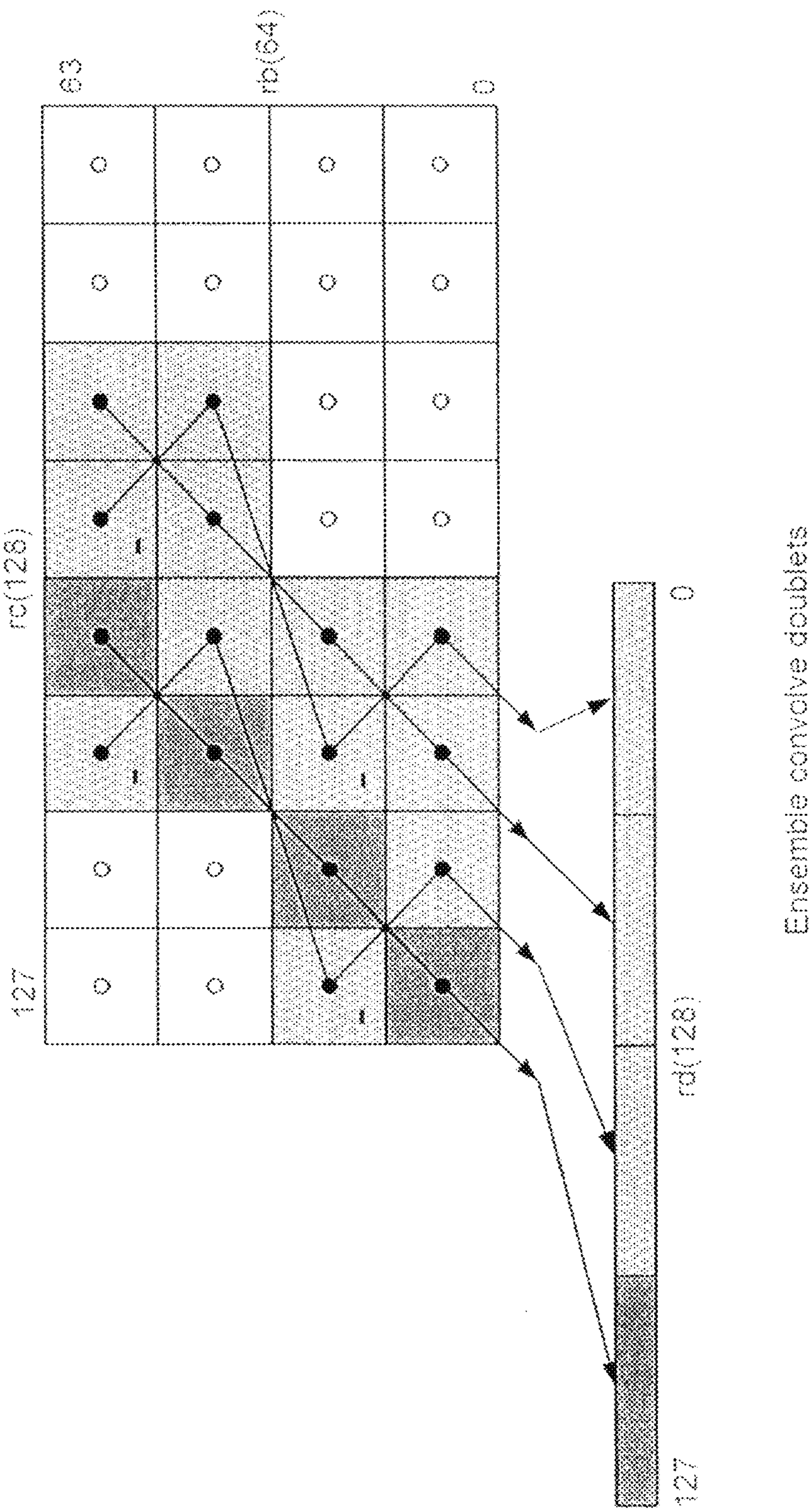

Referring to FIG. 28H, an ensemble-convolve-doublets instruction (ECON.16, ECON.M16, or ECON.U16) convolves vector [p o n m l k j i] with vector [d c b a], yielding the result [ap+bo+cn+dm ao+bn+cm+dl an+bm+cl+dk am+bl+ck+dj]:

Referring to FIG. 28I, an ensemble-convolve-complex-doublets instruction (ECON.C16) convolves vector [p o n m l k j i] with vector [d c b a], yielding the products [ap+bo+cn+dm ao−bp+cm−dn an+bm+cl+dk am−bn+ck−dl]:

An ensemble-divide (E.DIV) instruction divides the low-order 64 bits of contents of general register rc by the low-order 64 bits of the contents of general register rb. The 64-bit quotient and 64-bit remainder are catenated, yielding a 128-bit result that is placed in general register rd.

Ensemble Floating-Point Add, Divide, Multiply, and Subtract

These operations take two values from general registers, perform a group of floating-point arithmetic operations on partitions of bits in the operands, and place the catenated results in a general register.

The contents of general registers rc and rb are combined using the specified floating-point operation. The result is placed in general register rd. The operation is rounded using the specified rounding option or using round-to-nearest if not specified. If a rounding option is specified, the operation raises a floating-point exception if a floating-point invalid operation, divide by zero, overflow, or underflow occurs, or when specified, if the result is inexact. If a rounding option is not specified, floating-point exceptions are not raised, and are handled according to the default rules of IEEE 754.

In accordance with one embodiment of the invention, the processor also handles a variety floating-point group operations accommodating different operand sizes. Here, the different operand sizes may represent floating point operands of different precisions, such as half-precision (16 bits), single-precision (32 bits), double-precision (64 bits), and quad-precision (128 bits). FIG. 29 illustrates exemplary functions that are defined for use within the detailed instruction definitions in other sections and figures. In the functions set forth in FIG. 29, an internal format represents infinite-precision floating-point values as a four-element structure consisting of (1) s (sign bit): 0 for positive, 1 for negative, (2) t (type): NORM, ZERO, SNAN, QNAN, INFINITY, (3) e (exponent), and (4) f: (fraction). The mathematical interpretation of a normal value places the binary point at the units of the fraction, adjusted by the exponent: $(-1)^{s}*(2^{e})*f$. The function F converts a packed IEEE floating-point value into internal format. The function PackF converts an internal format back into IEEE floating-point format, with rounding and exception control.

FIGS. 30A and 31A present various examples of Ensemble Floating Point Add, Divide, Multiply, and Subtract instructions. FIGS. 30B-C and 31B-C illustrate an exemplary embodiment of formats and operation codes that can be used to perform the various Ensemble Floating Point Add, Divide, Multiply, and Subtract instructions. In these examples, Ensemble Floating Point Add, Divide, and Multiply instructions have been labeled as "EnsembleFloatingPoint." Also, Ensemble Floating-Point Subtract instructions have been labeled as "EnsembleReversedFloatingPoint." As shown in FIGS. 30B-C, 31B-C, and 30D in these exemplary and alternative embodiments, the contents of registers rc and rb are partitioned into groups of operands of the size specified, and the specified group operation is performed, yielding a group of results. The group of results is catenated and placed in register rd.

In the present embodiment, the operation is rounded using the specified rounding option or using round-to-nearest if not specified. If a rounding option is specified, the operation raises a floating-point exception if a floating-point invalid operation, divide by zero, overflow, or underflow occurs, or when specified, if the result is inexact. If a rounding option is not specified, floating-point exceptions are not raised, and are handled according to the default rules of IEEE 754.

An exemplary embodiment of the exceptions of the Ensemble Floating Point instructions is shown in FIG. 30E.

Ensemble Scale-Add Floating-Point

A novel instruction, Ensemble-Scale-Add improves processor performance by performing two sets of parallel multiplications and pairwise summing the products. This improves performance for operations in which two vectors must be scaled by two independent values and then summed, providing two advantages over nearest prior art operations of a fused-multiply-add. To perform this operation using prior art instructions, two instructions would be needed, an ensemble-multiply for one vector and one scaling value, and an ensemble-multiply-add for the second vector and second scaling value, and these operations are clearly dependent. In contrast, the present invention fuses both the two multiplies and the addition for each corresponding elements of the vectors into a single operation. The first advantage achieved is improved performance, as in an exemplary embodiment the combined operation performs a greater number of multiplies in a single operation, thus improving utilization of the partitioned multiplier unit. The second advantage achieved is improved accuracy, as an exemplary embodiment may compute the fused operation with sufficient intermediate precision so that no intermediate rounding the products is required.

An exemplary embodiment of the Ensemble Scale-Add Floating-point instruction is shown in FIGS. 22A-22B. In an exemplary embodiment, these operations take three values from general registers, perform a group of floating-point arithmetic operations on partitions of bits in the operands, and place the concatenated results in a general register. An exemplary embodiment of the format 2210 of the Ensemble Scale-Add Floating-point instruction is shown in FIG. 22A. An exemplary embodiment of the exceptions of the Ensemble Scale-Add Floating-point instruction is shown in FIG. 22C.

In an exemplary embodiment, the contents of general registers rd and rc are taken to represent a group of floating-point operands. Operands from general register rd are multiplied with a floating-point operand taken from the least-significant bits of the contents of general register rb and added to operands from general register rc multiplied with a floating-point operand taken from the next least-significant bits of the contents of general register rb. The results are rounded to the nearest representable floating-point value in a single floating-point operation. Floating-point exceptions are not raised, and are handled according to the default rules of IEEE 754. The results are catenated and placed in general register ra.

An exemplary embodiment of the pseudocode 2230 of the Ensemble Scale-Add Floating-point instruction is shown in FIG. 22B. In an exemplary embodiment, there are no exceptions for the Ensemble Scale-Add Floating-point instruction.

Performing a Three-Input Bitwise Boolean Operation in a Single Instruction (Group Boolean)

In a further aspect of the present invention, a system and method is provided for performing a three-input bitwise Boolean operation in a single instruction. A novel method is used to encode the eight possible output states of such an operation into only seven bits, and decoding these seven bits back into the eight states.

An exemplary embodiment of the Group Boolean instruction is shown in FIGS. 23A-23C. In an exemplary embodiment, these operations take operands from three registers, perform boolean operations on corresponding bits in the operands, and place the concatenated results in the third register. An exemplary embodiment of the format 2310 of the Group Boolean instruction is shown in FIG. 23A.

An exemplary embodiment of a procedure 2320 of Group Boolean instruction is shown in FIG. 23B. In an exemplary embodiment, three values are taken from the contents of registers rd, rc and rb. The ih and il fields specify a function of three bits, producing a single bit result. The specified function is evaluated for each bit position, and the results are catenated and placed in register rd. In an exemplary embodiment, register rd is both a source and destination of this instruction.

In an exemplary embodiment, the function is specified by eight bits, which give the result for each possible value of the three source bits in each bit position:

| | | | | | | | | |
|---|---|---|---|---|---|---|---|---|
| d | 1 | 1 | 1 | 1 | 0 | 0 | 0 | 0 |
| c | 1 | 1 | 0 | 0 | 1 | 1 | 0 | 0 |
| b | 1 | 0 | 1 | 0 | 1 | 0 | 1 | 0 |
| f(d, c, b) | $f_7$ | $f_6$ | $f_5$ | $f_4$ | $f_3$ | $f_2$ | $f_1$ | $f_0$ |

In an exemplary embodiment, a function can be modified by rearranging the bits of the immediate value. The table below shows how rearrangement of immediate value $f_{7 \ldots 0}$ can reorder the operands d,c,b for the same function.

| operation | immediate |
|---|---|
| f(d, c, b) | $f_7\ f_6\ f_5\ f_4\ f_3\ f_2\ f_1\ f_0$ |
| f(c, d, b) | $f_7\ f_6\ f_3\ f_2\ f_5\ f_4\ f_1\ f_0$ |
| f(d, b, c) | $f_7\ f_5\ f_6\ f_4\ f_3\ f_1\ f_2\ f_0$ |
| f(b, c, d) | $f_7\ f_3\ f_5\ f_1\ f_6\ f_2\ f_4\ f_0$ |
| f(c, b, d) | $f_7\ f_5\ f_3\ f_1\ f_6\ f_4\ f_2\ f_0$ |
| f(b, d, c) | $f_7\ f_3\ f_6\ f_2\ f_5\ f_1\ f_4\ f_0$ |

In an exemplary embodiment, by using such a rearrangement, an operation of the form: b=f(d,c,b) can be recoded into a legal form: b=f(b,d,c). For example, the function: b=f(d,c, b)=d?c:b cannot be coded, but the equivalent function: d=c?b:d can be determined by rearranging the code for d=f (d,c,b)=d?c: b, which is 1001010, according to the rule for f(d,c,b)⇒f(c,b,d), to the code 11011000.

Encoding

In an exemplary embodiment, some special characteristics of this rearrangement is the basis of the manner in which the eight function specification bits are compressed to seven immediate bits in this instruction. As seen in the table above, in the general case, a rearrangement of operands from f(d,c,b) to f(d,b,c).(interchanging rc and rb) requires interchanging the values of $f_6$ and $f_5$ and the values of $f_2$ and $f_1$.

In an exemplary embodiment, among the 256 possible functions which this instruction can perform, one quarter of them (64 functions) are unchanged by this rearrangement. These functions have the property that $f_6=f_5$ and $f_2=f_1$. The values of rc and rb (Note that rc and rb are the register specifiers, not the register contents) can be freely interchanged, and so are sorted into rising or falling order to indicate the value of $f_2$. (A special case arises when rc=rb, so the sorting of rc and rb cannot convey information. However, as only the values $f_7$, $f_4$, $f_3$, and $f_0$ can ever result in this case, $f_6$, $f_5$, $f_2$, and $f_1$ need not be coded for this case, so no special handling is required.) These functions are encoded by the values of $f_7$, $f_6$, $f_4$, $f_3$, and $f_0$ in the immediate field and $f_2$ by whether rc>rb, thus using 32 immediate values for 64 functions.

In an exemplary embodiment, another quarter of the functions have $f_6=1$ and $f_5=0$. These functions are recoded by interchanging rc and rb, $f_6$ and $f_5$, $f_2$ and $f_1$. They then share the same encoding as the quarter of the functions where $f_6=0$ and $f_5=1$, and are encoded by the values of $f_7$, $f_4$, $f_3$, $f_2$, $f_1$, and $f_0$ in the immediate field, thus using 64 immediate values for 128 functions.

In an exemplary embodiment, the remaining quarter of the functions have $f_6=f_5$ and $f_2 \neq f_1$. The half of these in which $f_2=1$ and $f_1=0$ are recoded by interchanging rc and rb, $f_6$ and $f_5$, $f_2$ and $f_1$. They then share the same encoding as the eighth of the functions where $f_2=0$ and $f_1=1$, and are encoded by the values of $f_7$, $f_6$, $f_4$, $f_3$, and $f_0$ in the immediate field, thus using 32 immediate values for 64 functions.

In an exemplary embodiment, the function encoding is summarized by the table:

| $f_7$ | $f_6$ | $f_5$ | $f_4$ | $f_3$ | $f_2$ | $f_1$ | $f_0$ | trc > trb | ih | $il_5$ | $il_4$ | $il_3$ | $il_2$ | $il_1$ | $il_0$ | rc | rb |
|---|---|---|---|---|---|---|---|---|---|---|---|---|---|---|---|---|---|
| | | $f_6$ | | | | $f_2$ | | $f_2$ | 0 | 0 | $f_6$ | $f_7$ | $f_4$ | $f_3$ | $f_0$ | trc | trb |
| | | $f_6$ | | | | $f_2$ | | $\sim f_2$ | 0 | 0 | $f_6$ | $f_7$ | $f_4$ | $f_3$ | $f_0$ | trb | trc |
| | | $f_6$ | | | 0 | 1 | | | 0 | 1 | $f_6$ | $f_7$ | $f_4$ | $f_3$ | $f_0$ | trc | trb |
| | | $f_6$ | | | 1 | 0 | | | 0 | 1 | $f_6$ | $f_7$ | $f_4$ | $f_3$ | $f_0$ | trb | trc |
| | 0 | 1 | | | | | | | 1 | $f_2$ | $f_1$ | $f_7$ | $f_4$ | $f_3$ | $f_0$ | trc | trb |
| | 1 | 0 | | | | | | | 1 | $f_1$ | $f_2$ | $f_7$ | $f_4$ | $f_3$ | $f_0$ | trb | trc |

In an exemplary embodiment, the function decoding is summarized by the table:

| ih | $il_5$ | $il_4$ | $il_3$ | $il_2$ | $il_1$ | $il_0$ | rc > rb | $f_7$ | $f_6$ | $f_5$ | $f_4$ | $f_3$ | $f_2$ | $f_1$ | $f_0$ |
|---|---|---|---|---|---|---|---|---|---|---|---|---|---|---|---|
| 0 | 0 | | | | | | 0 | $il_3$ | $il_4$ | $il_4$ | $il_2$ | $il_1$ | 0 | 0 | $il_0$ |
| 0 | 0 | | | | | | 1 | $il_3$ | $il_4$ | $il_4$ | $il_2$ | $il_1$ | 1 | 1 | $il_0$ |
| 0 | 1 | | | | | | | $il_3$ | $il_4$ | $il_4$ | $il_2$ | $il_1$ | 0 | 1 | $il_0$ |
| 1 | | | | | | | | $il_3$ | 0 | 1 | $il_2$ | $il_1$ | $il_5$ | $il_4$ | $il_0$ |

From the foregoing discussion, it can be appreciated that an exemplary embodiment of a compiler or assembler producing the encoded instruction performs the steps above to encode the instruction, comparing the f6 and f5 values and the f2 and f1 values of the immediate field to determine which one of several means of encoding the immediate field is to be employed, and that the placement of the trb and trc register specifiers into the encoded instruction depends on the values of f2 (or f1) and f6 (or f5).

An exemplary embodiment of the pseudocode 2330 of the Group Boolean instruction is shown in FIG. 23C. It can be appreciated from the code that an exemplary embodiment of a circuit that decodes this instruction produces the f2 and f1 values, when the immediate bits ih and il5 are zero, by an arithmetic comparison of the register specifiers rc and rb, producing a one (1) value for f2 and f1 when rc>rb. In an exemplary embodiment, there are no exceptions for the Group Boolean instruction. An alternative embodiment of the pseudocode of the Branch Gateway instruction is shown in FIG. 23D. An exemplary embodiment of the exceptions of the instruction is shown in FIG. 23E.

Improving the Branch Prediction of Simple Repetitive Loops of Code

In yet a further aspect to the present invention, a system and method is described for improving the branch prediction of simple repetitive loops of code. In such a simple loop, the end of the loop is indicated by a conditional branch backward to the beginning of the loop. The condition branch of such a loop is taken for each iteration of the loop except the final iteration, when it is not taken. Prior art branch prediction systems have employed finite state machine operations to attempt to properly predict a majority of such conditional branches, but without specific information as to the number of times the loop iterates, will make an error in prediction when the loop terminates.

The system and method of the present invention includes providing a count field for indicating how many times a branch is likely to be taken before it is not taken, which enhances the ability to properly predict both the initial and final branches of simple loops when a compiler can determine the number of iterations that the loop will be performed. This improves performance by avoiding misprediction of the branch at the end of a loop when the loop terminates and instruction execution is to continue beyond the loop, as occurs in prior art branch prediction hardware.

Branch Hint

An exemplary embodiment of the Branch Hint instruction is shown in FIGS. 24A-24C. In an exemplary embodiment, this operation indicates a future branch location specified by a general register value.

In an exemplary embodiment, this instruction directs the instruction fetch unit of the processor that a branch is likely to occur count times at simm instructions following the current successor instruction to the address specified by the contents of general register rd. An exemplary embodiment of the format 2410 of the Branch Hint instruction is shown in FIG. 24A.

In an exemplary embodiment, after branching count times, the instruction fetch unit should presume that the branch at simm instructions following the current successor instruction is not likely to occur. If count is zero, this hint directs the instruction fetch unit that the branch is likely to occur more than 63 times.

In an exemplary embodiment, an Access disallowed exception occurs if the contents of general register rd is not aligned on a quadlet boundary.

An exemplary embodiment of the pseudocode 2430 of the Branch Hint instruction is shown in FIG. 24B. An exemplary embodiment of the exceptions 2460 of the Branch Hint instruction is shown in FIG. 24C.

Incorporating Floating Point Information into Processor Instructions

In a still further aspect of the present invention, a technique is provided for incorporating floating point information into processor instructions. In related U.S. Pat. No. 5,812,439, a system and method are described for incorporating control of rounding and exceptions for floating-point instructions into the instruction itself. The present invention extends this invention to include separate instructions in which rounding is specified, but default handling of exceptions is also specified, for a particular class of floating-point instructions.

Ensemble Sink Floating-Point

In an exemplary embodiment, a Ensemble Sink Floating-point instruction, which converts floating-point values to integral values, is available with control in the instruction that include all previously specified combinations (default-near rounding and default exceptions, Z—round-toward-zero and trap on exceptions, N—round to nearest and trap on exceptions, F—floor rounding (toward minus infinity) and trap on exceptions, C—ceiling rounding (toward plus infinity) and trap on exceptions, and X—trap on inexact and other exceptions), as well as three new combinations (Z.D—round toward zero and default exception handling, F.D—floor rounding and default exception handling, and C.D—ceiling rounding and default exception handling). (The other combinations: N.D is equivalent to the default, and X.D—trap on inexact but default handling for other exceptions is possible but not particularly valuable).

An exemplary embodiment of the Ensemble Sink Floating-point instruction is shown in FIGS. 25A-25C. In an exemplary embodiment, these operations take one value from a register, perform a group of floating-point arithmetic conversions to integer on partitions of bits in the operands, and place the concatenated results in a register. An exemplary embodiment of the operation codes, selection, and format 2510 of Ensemble Sink Floating-point instruction is shown in FIG. 25A.

In an exemplary embodiment, the contents of register rc is partitioned into floating-point operands of the precision specified and converted to integer values. The results are catenated and placed in register rd.

In an exemplary embodiment, the operation is rounded using the specified rounding option or using round-to-nearest if not specified. If a rounding option is specified, unless default exception handling is specified, the operation raises a floating-point exception if a floating-point invalid operation, divide by zero, overflow, or underflow occurs, or when specified, if the result is inexact. If a rounding option is not specified or if default exception handling is specified, floating-point exceptions are not raised, and are handled according to the default rules of IEEE 754.

An exemplary embodiment of the pseudocode 2530 of the Ensemble Sink Floating-point instruction is shown in FIG. 25B. An exemplary embodiment of the exceptions 2560 of the Ensemble Sink Floating-point instruction is shown in FIG. 25C.

An exemplary embodiment of the pseudocode 2570 of the Floating-point instructions is shown in FIG. 25D.

Crossbar Compress, Expand, Rotate, and Shift

These operations take operands from two general registers, perform operations on partitions of bits in the operands, and place the concatenated results in a third general register. Two values are taken from the contents of general registers rc and rb. The specified operation is performed, and the result is placed in general register rd.

In one embodiment of the invention, crossbar switch units such as units 142 and 148 perform data handling operations, as previously discussed. As shown in FIG. 32A, such data handling operations may include various examples of Crossbar Compress, Crossbar Expand, Crossbar Rotate, and Crossbar Shift operations. FIGS. 32B and 32C illustrate an exemplary embodiment of a format and operation codes that can be used to perform the various Crossbar Compress, Crossbar Rotate, Crossbar Expand, and Crossbar Shift instructions. As shown in FIGS. 32B and 32C, in this exemplary embodiment, the contents of register rc are partitioned into groups of operands of the size specified, and compressed, expanded, rotated or shifted by an amount specified by a portion of the contents of register rb, yielding a group of results. The group of results is catenated and placed in register rd.

Figure 32D:
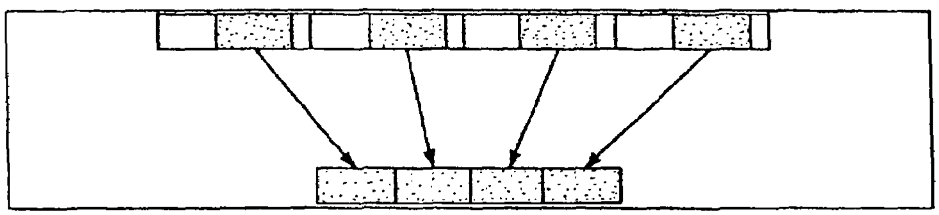

Various Group Compress operations may convert groups of operands from higher precision data to lower precision data. An arbitrary half-sized sub-field of each bit field can be selected to appear in the result. For example, FIG. 32D shows an X.COMPRESS rd=rc,16,4 operation, which performs a selection of bits 19 . . . 4 of each quadlet in a hexlet. Various Group Shift operations may allow shifting of groups of operands by a specified number of bits, in a specified direction, such as shift right or shift left. As can be seen in FIG. 32C, certain Group Shift Left instructions may also involve clearing (to zero) empty low order bits associated with the shift, for each operand. Certain Group Shift Right instructions may involve clearing (to zero) empty high order bits associated with the shift, for each operand. Further, certain Group Shift Right instructions may involve filling empty high order bits associated with the shift with copies of the sign bit, for each operand.

Extract

In one embodiment of the invention, data handling operations may also include a Crossbar Extract instruction. FIGS. 33A and 33B illustrate an exemplary embodiment of a format and operation codes that can be used to perform the Crossbar Extract instruction. As shown in FIGS. 33A and 33B, in this exemplary embodiment, the contents of general registers rd, rc, and rb are fetched. The specified operation is performed on these operands. The result is placed into general register ra. An alternative embodiment of the pseudocode of the Crossbar Extract instruction is shown in FIG. 33F. An exemplary embodiment of the exceptions of the Crossbar Extract instruction is shown in FIG. 33G.

The Crossbar Extract instruction allows bits to be extracted from different operands in various ways. Specifically, bits 31 . . . 0 of the contents of general register rb specifies several parameters that control the manner in which data is extracted, and for certain operations, the manner in which the operation is performed. The position of the control fields allows for the source position to be added to a fixed control value for dynamic computation, and allows for the lower 16 bits of the control field to be set for some of the simpler extract cases by a single GCOPYI.128 instruction. The control fields are further arranged so that if only the low order 8 bits are non-zero, a 128-bit extraction with truncation and no rounding is performed.

| 31 24 | 23 16 | 15 | 14 | 13 | 12 | 11 | 10 9 | 8 0 |
|---|---|---|---|---|---|---|---|---|
| fsize | dpos | x | s | n | m | l | rnd | gssp |
| 8 | 8 | 1 | 1 | 1 | 1 | 1 | 2 | 9 |

The table below describes the meaning of each label:

| label | bits | meaning |
|---|---|---|
| fsize | 8 | field size |
| dpos | 8 | destination position |
| x | 1 | reserved |
| s | 1 | signed vs. unsigned |
| n | 1 | reserved |
| m | 1 | merge vs. extract |
| l | 1 | reserved |
| rnd | 2 | reserved |
| gssp | 9 | group size and source position |

The 9-bit gssp field encodes both the group size, gsize, and source position, spos, according to the formula gssp=512−4*gsize+spos. The group size, gsize, is a power of two in the range 1 . . . 128. The source position, spos, is in the range 0 . . . (2*gsize)−1.

The values in the s, n, m, l, and rnd fields have the following meaning:

| values | x | s | n | m | l | rnd |
|---|---|---|---|---|---|---|
| 0 | group | unsigned | | extract | | |
| 1 | extended | signed | | merge | | |
| 2 | | | | | | |
| 3 | | | | | | |

Figure 33C:
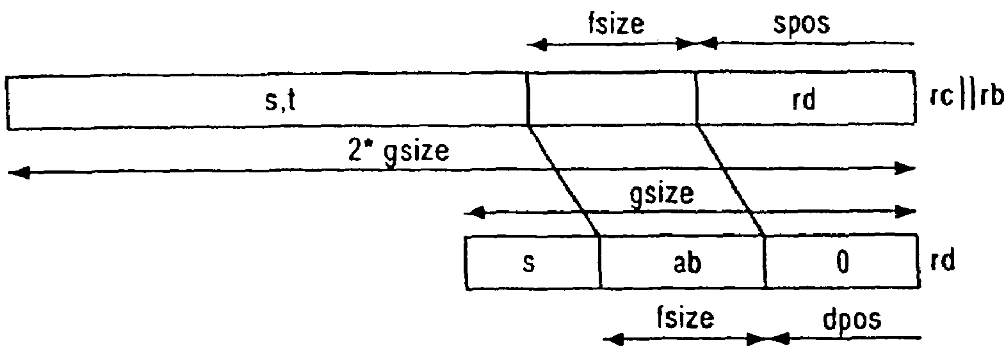
Figure 33D:
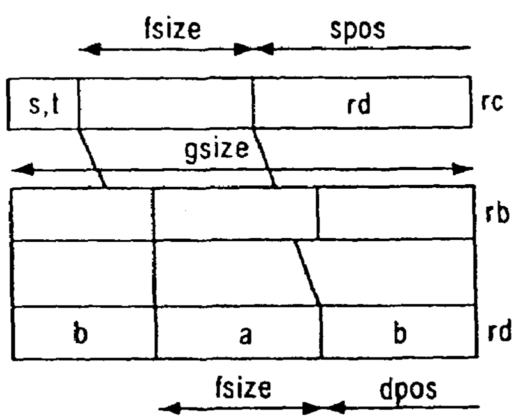

As shown in FIG. 33C, for the X.EXTRACT instruction, when m=0, the parameters are interpreted to select a fields from the catenated contents of registers rd and rc, extracting values which are catenated and placed in register ra. As shown in FIG. 33D, for a crossbar-merge-extract (X.EXTRACT when m=1), the parameters are interpreted to merge a fields from the contents of register rd with the contents of register rc. The results are catenated and placed in register ra.

As shown in FIG. 33C, for the X.EXTRACT instruction, when m=0 and x=0, the parameters specified by the contents of general register rb are interpreted to select a fields from double-size symbols of the catenated contents of general registers rd and rc (as c||d), extracting values which are catenated and placed in general register ra As shown in FIG. 33D, for a crossbar-merge-extract (X.EXTRACT when m=1), the parameters specified by the contents of general register rb are interpreted to merge a fields from symbols of the contents of general register rc with the contents of general register rd. The results are catenated and placed in general register ra. The x field has no effect when m=1.

Figure 33E:
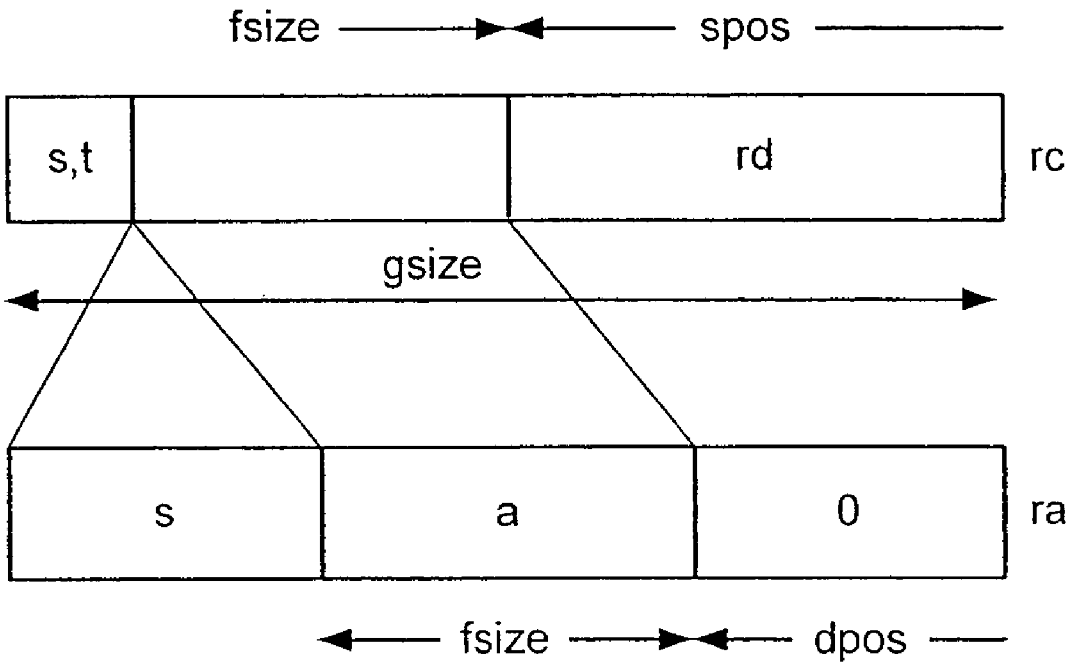
Figure 33F-2:
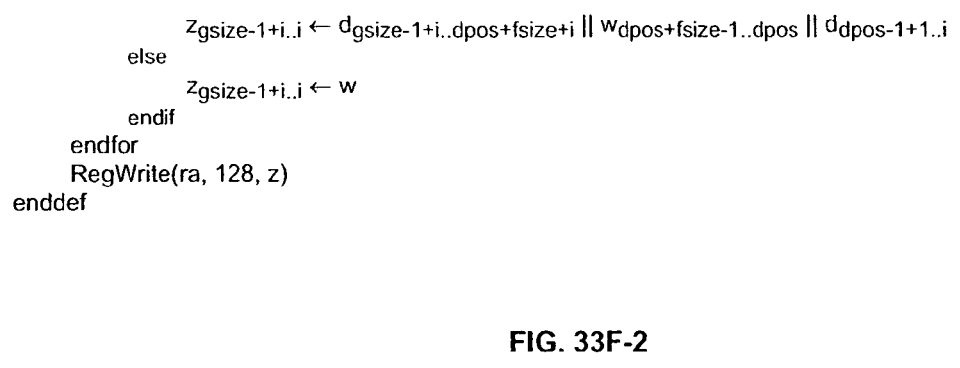

As shown in FIG. 33E, for an crossbar-expand-extract (X.EXTRACT when m=0 and x=1), the parameters specified by the contents of general register rb are interpreted to extract fields from symbols of the contents of general register rc. The results are catenated and placed in general register ra. Note that the value of rd is not used Shuffle As shown in FIG. 34A, in one embodiment of the invention, data handling operations may also include various Shuffle instructions, which allow the contents of registers to be partitioned into groups of operands and interleaved in a variety of ways. FIGS. 34B and 34C illustrate an exemplary embodiment of a format and operation codes that can be used to perform the various Shuffle instructions. As shown in FIGS. 34B and 34C, in this exemplary embodiment, one of two operations is performed, depending on whether the rc and rb fields are equal. Also, FIG. 34B and the description below illustrate the format of and relationship of the rd, rc, rb, op, v, w, h, and size fields. An alternative embodiment is illustrated in FIGS. 34F and 34G. An exemplary embodiment of the exceptions of the Shuffle instructions is shown in FIG. 34H.

In the present embodiment, if the rc and rb fields are equal, a 128-bit operand is taken from the contents of general register rc. Items of size v are divided into w piles and shuffled together, within groups of size bits, according to the value of op. The result is placed in general register rd.

Further, if the rc and rb fields are not equal, the contents of registers rc and rb are catenated into a 256-bit operand as (b||c). Items of size v are divided into w piles and shuffled together, according to the value of op. Depending on the value of h, a sub-field of op, the low 128 bits (h=0), or the high 128 bits (h=1) of the 256-bit shuffled contents are selected as the result. The result is placed in register rd.

This instruction is undefined and causes a reserved instruction exception if rc and rb are not equal and the op field is greater or equal to 56, or if rc and rb are equal and op4 . . . 0 is greater or equal to 28.

Figure 34D:
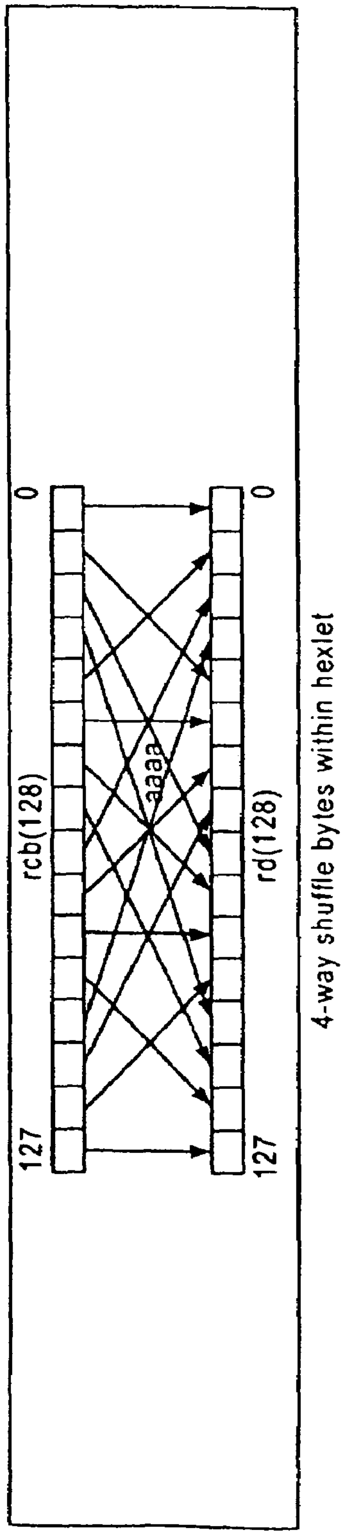

As shown in FIG. 34D, an example of a crossbar 4-way shuffle of bytes within hexlet instruction (X.SHUFFLE.128 rd=rcb,8,4) may divide the 128-bit operand into 16 bytes and partitions the bytes 4 ways (indicated by varying shade in the diagram below). The 4 partitions are perfectly shuffled, producing a 128-bit result. As shown in FIG. 33E, an example of a crossbar 4-way shuffle of bytes within triclet instruction (X.SHUFFLE.256 rd=rc,rb,8,4,0) may catenate the contents of rc and rb, then divides the 256-bit content into 32 bytes and partitions the bytes 4 ways (indicated by varying shade in the diagram below). The low-order halves of the 4 partitions are perfectly shuffled, producing a 128-bit result.

Figure 34E:
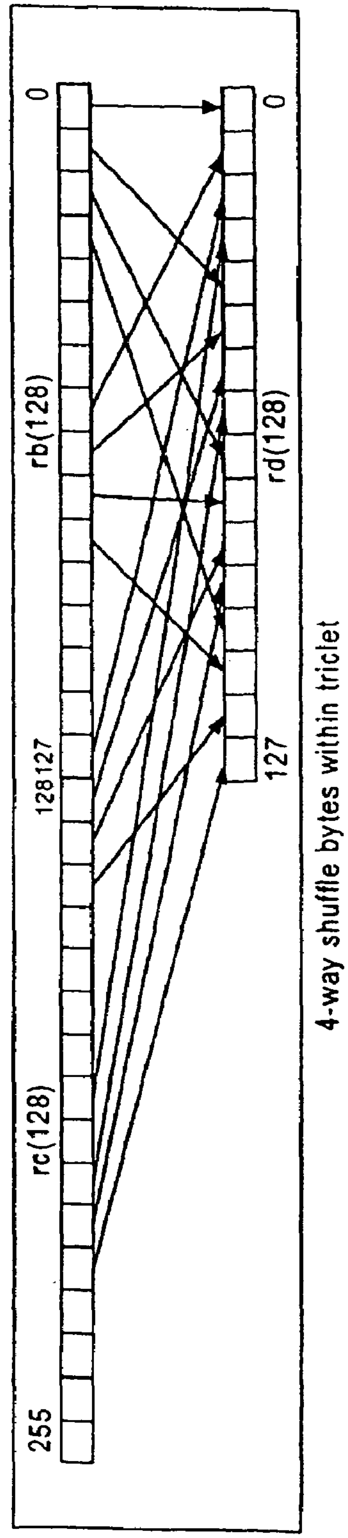

Referring again to FIG. 34D, an alternative embodiment of a crossbar 4-way shuffle of bytes within hexlet instruction (X.SHUFFLE rd=rcb,128,8,4) divides the 128-bit operand into 16 bytes and partitions the bytes 4 ways (indicated by varying shade in the diagram below). The 4 partitions are perfectly shuffled, producing a 128-bit result. Referring again to FIG. 34E, an alternative embodiment of a crossbar 4-way shuffle of bytes within triclet instruction (X.SHUFFLE.PAIR rd=rc,rb,8,4,0) catenates the contents of rc and rb, then divides the 256-bit content into 32 bytes and partitions the bytes 4 ways (indicated by varying shade in the diagram below). The low-order halves of the 4 partitions are perfectly shuffled, producing a 128-bit result.

Changing the last immediate value h to 1 (X.SHUFFLE.256 rd=rc,rb,8,4,1) may modify the operation to perform the same function on the high-order halves of the 4 partitions. Alternatively, changing the last immediate value h to 1 (X.SHUFFLE.PAIR rd=rc,rb,8,4,1) modifies the operation to perform the same function on the high-order halves of the 4 partitions. When rc and rb are equal, the table below shows the value of the op field and associated values for size, v, and w.

| op | size | v | w |
|---|---|---|---|
| 0 | 4 | 1 | 2 |
| 1 | 8 | 1 | 2 |
| 2 | 8 | 2 | 2 |
| 3 | 8 | 1 | 4 |
| 4 | 16 | 1 | 2 |
| 5 | 16 | 2 | 2 |
| 6 | 16 | 4 | 2 |
| 7 | 16 | 1 | 4 |
| 8 | 16 | 2 | 4 |
| 9 | 16 | 1 | 8 |
| 10 | 32 | 1 | 2 |
| 11 | 32 | 2 | 2 |
| 12 | 32 | 4 | 2 |
| 13 | 32 | 8 | 2 |
| 14 | 32 | 1 | 4 |
| 15 | 32 | 2 | 4 |
| 16 | 32 | 4 | 4 |
| 17 | 32 | 1 | 8 |
| 18 | 32 | 2 | 8 |
| 19 | 32 | 1 | 16 |
| 20 | 64 | 1 | 2 |
| 21 | 64 | 2 | 2 |
| 22 | 64 | 4 | 2 |
| 23 | 64 | 8 | 2 |
| 24 | 64 | 16 | 2 |
| 25 | 64 | 1 | 4 |
| 26 | 64 | 2 | 4 |
| 27 | 64 | 4 | 4 |
| 28 | 64 | 8 | 4 |
| 29 | 64 | 1 | 8 |
| 30 | 64 | 2 | 8 |
| 31 | 64 | 4 | 8 |
| 32 | 64 | 1 | 16 |
| 33 | 64 | 2 | 16 |
| 34 | 64 | 1 | 32 |
| 35 | 128 | 1 | 2 |
| 36 | 128 | 2 | 2 |
| 37 | 128 | 4 | 2 |
| 38 | 128 | 8 | 2 |
| 39 | 128 | 16 | 2 |
| 40 | 128 | 32 | 2 |
| 41 | 128 | 1 | 4 |
| 42 | 128 | 2 | 4 |
| 43 | 128 | 4 | 4 |
| 44 | 128 | 8 | 4 |
| 45 | 128 | 16 | 4 |
| 46 | 128 | 1 | 8 |
| 47 | 128 | 2 | 8 |
| 48 | 128 | 4 | 8 |
| 49 | 128 | 8 | 8 |
| 50 | 128 | 1 | 16 |
| 51 | 128 | 2 | 16 |
| 52 | 128 | 4 | 16 |
| 53 | 128 | 1 | 32 |
| 54 | 128 | 2 | 32 |
| 55 | 128 | 1 | 64 |

When rc and rb are not equal, the table below shows the value of the $op_{4...0}$ field and associated values for size, v, and w: $Op_5$ is the value of h, which controls whether the low-order or high-order half of each partition is shuffled into the result.

| op4 . . . 0 | size | v | w |
|---|---|---|---|
| 0 | 256 | 1 | 2 |
| 1 | 256 | 2 | 2 |
| 2 | 256 | 4 | 2 |

-continued

| op4 . . . 0 | size | v | w |
|---|---|---|---|
| 3 | 256 | 8 | 2 |
| 4 | 256 | 16 | 2 |
| 5 | 256 | 32 | 2 |
| 6 | 256 | 64 | 2 |
| 7 | 256 | 1 | 4 |
| 8 | 256 | 2 | 4 |
| 9 | 256 | 4 | 4 |
| 10 | 256 | 8 | 4 |
| 11 | 256 | 16 | 4 |
| 12 | 256 | 32 | 4 |
| 13 | 256 | 1 | 8 |
| 14 | 256 | 2 | 8 |
| 15 | 256 | 4 | 8 |
| 16 | 256 | 8 | 8 |
| 17 | 256 | 16 | 8 |
| 18 | 256 | 1 | 16 |
| 19 | 256 | 2 | 16 |
| 20 | 256 | 4 | 16 |
| 21 | 256 | 8 | 16 |
| 22 | 256 | 1 | 32 |
| 23 | 256 | 2 | 32 |
| 24 | 256 | 4 | 32 |
| 25 | 256 | 1 | 64 |
| 26 | 256 | 2 | 64 |
| 27 | 256 | 1 | 128 |

Wide Solve Galois

Figure 35A:
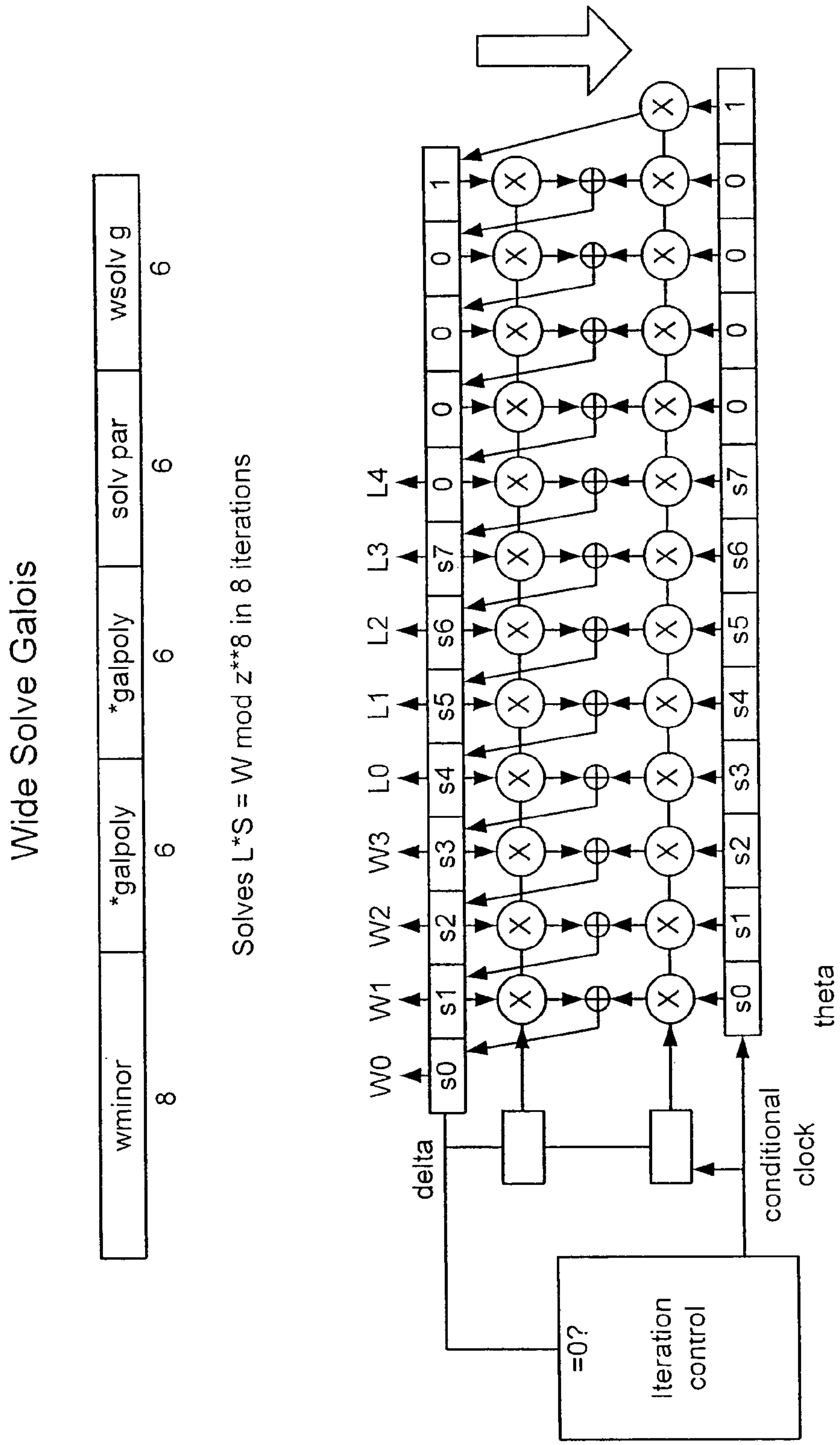

An exemplary embodiment of the Wide Solve Galois instruction is shown in FIGS. 35A-35B. FIG. 35A illustrates the present invention with a method and apparatus for solving equations iteratively. The particular operation described is a wide solver for the class of Galois polynomial congruence equations L*S=W (mod z**2T), where S, L, and W are polynomials in a galois field such as GF(256) of degree 2T, T+1, and T respectively. Solution of this problem is a central computational step in certain error correction codes, such as Reed-Solomon codes, that optimally correct up to T errors in a block of symbols in order to render a digital communication or storage medium more reliable. Further details of the mathematics underpinning this implementation may be obtained from (Sarwate, Dilip V. and Shanbhag, Naresh R. "High-Speed Architectures for Reed-Solomon Decoders", revised Jun. 7, 2000, Submitted to IEEE Trans. VLSI Systems, accessible from http://icims.csl.uiuc.edu/~shanbhag/vips/publications/bma.pdf and hereby incorporated by reference in its entirety.)

The apparatus in FIG. 35A contains memory strips, Galois multipliers, Galois adders, muxes, and control circuits that are already contained in the exemplary embodiments referred to in the present invention. As can be appreciated from the description of the Wide Matrix Multiply Galois instruction, the polynomial remainder step traditionally associated with the Galois multiply can be moved to after the Galois add by replacing the remainder then add steps with a polynomial add then remainder step.

This apparatus both reads and writes the embedded memory strips for multiple successive iterations steps, as specified by the iteration control block on the left. Each memory strip is initially loaded with polynomial S, and when 2T iterations are complete (in the example shown, T=4), the upper memory strip contains the desired solution polynomials L and W. The code block in FIG. 35B describes details of the operation of the apparatus of FIG. 35A, using a C language notation.

Similar code and apparatus can be developed for scalar multiply-add iterative equation solvers in other mathematical domains, such as integers and floating point numbers of various sizes, and for matrix operands of particular properties, such as positive definite matrices, or symetrix matrices, or upper or lower triangular matrices.

Wide Transform Slice

Figure 36A:
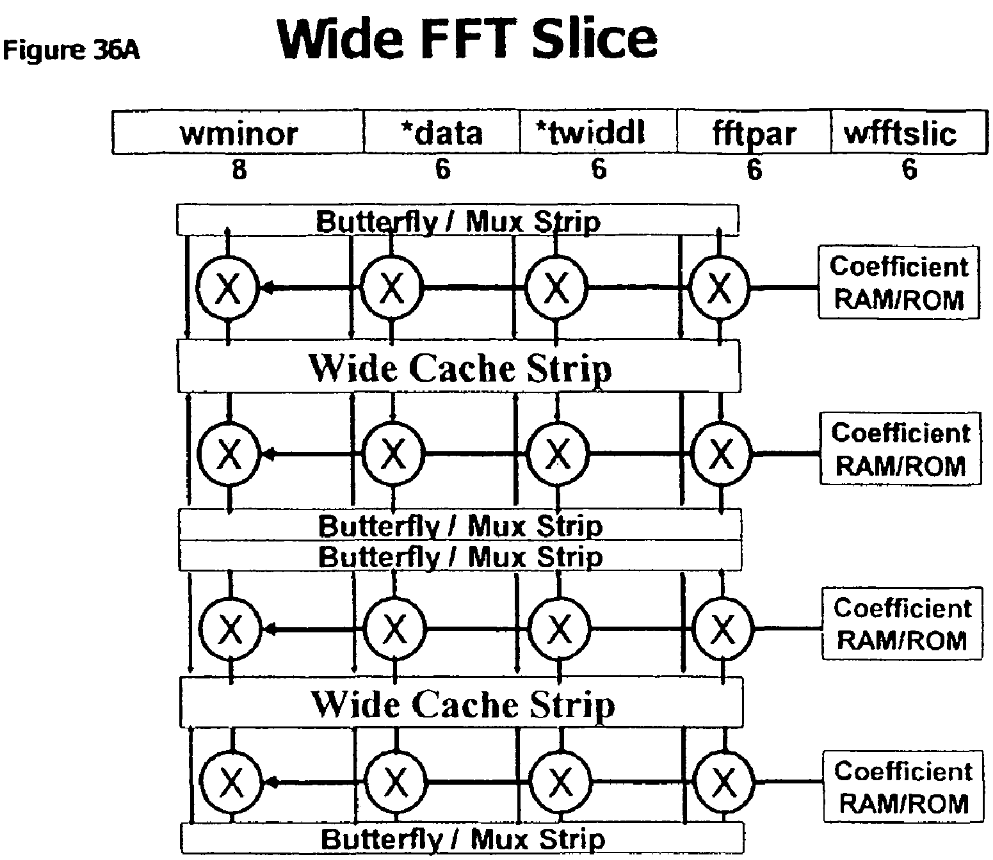

An exemplary embodiment of the Wide Transform Slice instruction is shown in FIGS. 36A-36B. FIG. 36A illustrates a method and apparatus for extremely fast computation of transforms, such as the Fourier Transform, which is needed for frequency-domain communications, image analysis, etc. In this apparatus, a 4×4 array of 16 complex multipliers is shown, each adjacent to a first wide operand cache. A second wide operand cache or embedded coefficient memory array supplies operands that are multiplied by the multipliers with the data access from the wide embedded cache. The resulting products are supplied to strips of atomic transforms—in this preferred embodiment, radix-4 or radix-2 butterfly units. These units receive the products from a row or column of multipliers, and deposit results with specified stride and digit reversal back into the first wide operand cache.

A general register ra contains both the address of the first wide operand as well as size and shape specifiers, and a second general register rb contains both the address of the second wide operand as well as size and shape specifiers.

An additional general register rc specifies further parameters, such as precision, result extraction parameters (as in the various Extract instructions described in the present invention).

In an alternative embodiment, the second memory operand may be located together with the first memory operand in an enlarged memory, using distinctive memory addressing to obtain either the first or second memory operand.

In an alternative embodiment, the results are deposited into a third wide operand cache memory. This third memory operand may be combined with the first memory operand, again using distinctive memory addressing. By relabeling of wide operand cache tags, the third memory may alternate storage locations with the first memory. Thus upon completion of the Wide Transform Slice instruction, the wide operand cache tags are relabeled to that the result appears in the location specified for the first memory operand. This alternation allows for the specification of not-in-place transform steps and permits the operation to be aborted and subsequently restarted if required as the result of interruption of the flow of execution.

The code block in FIG. 36B describes the details of the operation of the apparatus of FIG. 36A, using a C language notation. Similar code and apparatus can be developed for other transforms and other mathematical domains, such as polynomial, Galois field, and integer and floating point real and complex numbers of various sizes.

In an exemplary embodiment, the Wide Transform Slice instruction also computes the location of the most significant bit of all result elements, returning that value as a scalar result of the instruction to be placed in a general register rc. This is the same operand in which extraction control and other information is placed, but in an alternative embodiment, it could be a distinct register. Notably, this location of the most significant bit may be computed in the exemplary embodiment by a series of Boolean operations on parallel subsets of the result elements yielding vector Boolean results, and at the conclusion of the operation, by reduction of the vector of Boolean results to a scalar Boolean value, followed by a determination of the most significant bit of the scalar Boolean value.

By adding the values representing the extraction control and other information to this location of the most significant bit, an appropriate scaling parameter is obtained, for use in the subsequent stage of the Wide Transform Slice instruction. By accumulating the most significant bit information, an overall scaling value for the entire transform can be obtained, and the transformed results are maintained with additional precision over that of fixed scaling schemes in prior art.

Wide Convolve Extract

These instructions take two specifiers from general registers to fetch two large operands from memory, a third controlling operand from a general register, multiply, sum and extract partitions of bits in the operands, and catenate the results together, placing the result in a general register.

An exemplary embodiment of the Wide Convolve Extract instruction is shown in FIGS. 37A-37K. An alternative embodiment is shown in FIG. 37L. An exemplary embodiment of the exceptions of the Wide Convolve Extract instruction is shown in FIG. 37M. A similar method and apparatus can be applied to either digital filtering by methods of 1-D or 2-D convolution, or motion estimation by the method of 1-D or 2-D correlation. The same operation may be used for correlation, as correlation can be computed by reversing the order of the 1-D or 2-D pattern and performing a convolution. Thus, the convolution instruction described herein may be used for correlation, or a Wide Correlate Extract instruction can be constructed that is similar to the convolution instruction herein described except that the order of the coefficient operand block is 1-D or 2-D reversed.

Digital filter coefficients or a estimation template block is stored in one wide operand memory, and the image data is stored in a second wide operand memory. A single row or column of image data can be shifted into the image array, with a corresponding shift of the relationship of the image data locations to the template block and multipliers. By this method of partially updating and moving the data in the second embedded memory, The correlation of template against image can be computed with greatly enhanced effective bandwidth to the multiplier array. Note that in the present embodiment, rather than shifting the array, circular addressing is employed, and a shift amount or start location is specified as a parameter of the instruction.

Figure 37A:
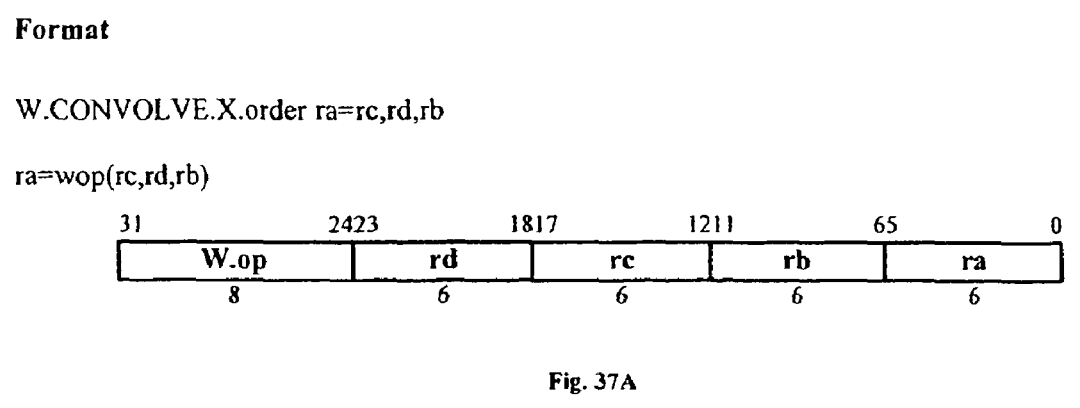

FIGS. 37A and 37B illustrate an exemplary embodiment of a format and operation codes that can be used to perform the Wide Convolve Extract instruction. As shown in FIGS. 37A and 37B, in this exemplary embodiment, the contents of general registers rc and rd are used as wide operand specifiers. These specifiers determine the virtual address, wide operand size and shape for wide operands. Using the virtual addresses and operand sizes, first and second values of specified size are loaded from memory. The group size and other parameters are specified from the contents of general register rb. The values are partitioned into groups of operands of the size and shape specified and are convolved, producing a group of values. The group of values is rounded, and limited as specified, yielding a group of results which is the size specified. The group of results is catenated and placed in general register ra.

The size of partitioned operands (group size) for this operation is determined from the contents of general register rb. We also use low order bits of rc and rd to designate a wide operand size and shape, which must be consistent with the group size. Because the memory operand is cached, the group size and other parameters can also be cached, thus eliminating decode time in critical paths from rb, rc or rd.

The wide-convolve-extract instructions (W.CONVOLVE.X.B, W.CONVOLVE.X.L) perform a partitioned array multiply of a maximum size limited only by the extent of the memory operands, not the size of the data path. The extent, size and shape parameters of the memory operands are always specified as powers of two; additional parameters may further limit the extent of valid operands within a power-of-two region.

Figure 37C:
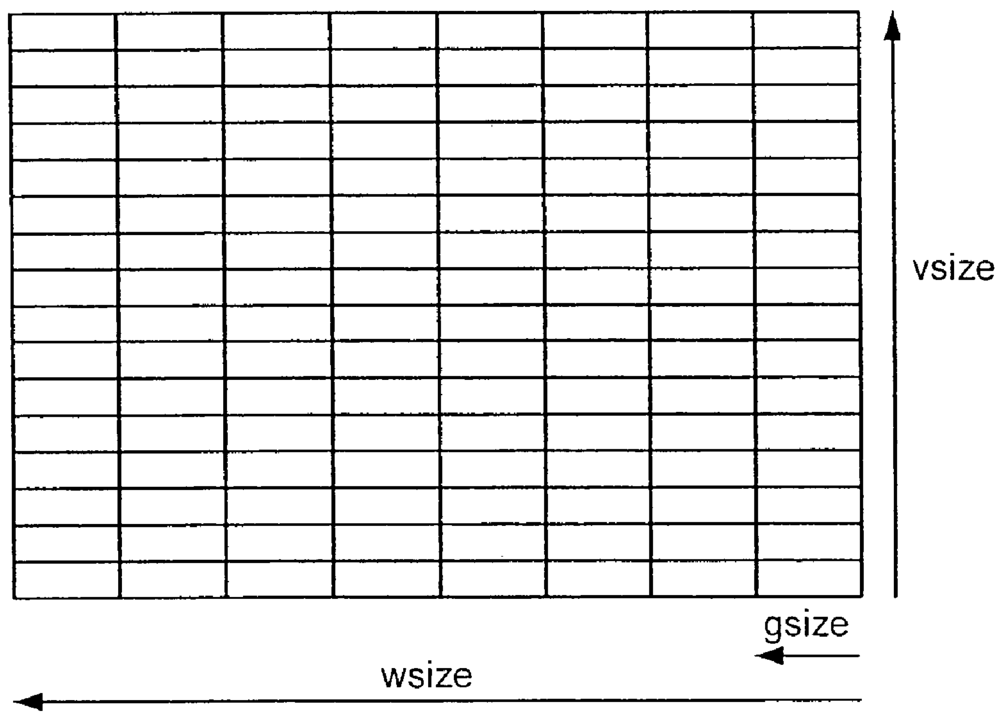

In an exemplary embodiment, as illustrated in FIG. 37C, each of the wide operand specifiers specifies a memory operand extent by adding one-half the desired memory operand extent in bytes to the specifiers. Each of the wide operand specifiers specifies a memory operand shape by adding one-fourth the desired width in bytes to the specifiers. The heights of each of the memory operands can be inferred by dividing the operand extent by the operand width. One-dimensional vectors are represented as matrices with a height of one and with width equal to extent. In an alternative embodiment, some of the specifications herein may be included as part of the instruction.

In an exemplary embodiment, the Wide Convolve Extract instruction allows bits to be extracted from the group of values computed in various ways. For example, bits 31 . . . 0 of the contents of general register rb specifies several parameters which control the manner in which data is extracted. The position and default values of the control fields allows for the source position to be added to a fixed control value for dynamic computation, and allows for the lower 16 bits of the control field to be set for some of the simpler cases by a single GCOPYI instruction. In an alternative embodiment, some of the specifications herein may be included as part of the instruction.

| 31 … 24 | 23 … 16 | 15 | 14 | 13 | 12 | 11 | 10 9 | 8 … 0 |
|---|---|---|---|---|---|---|---|---|
| fsize | dpos | x | s | n | m | l | rnd | gssp |
| 8 | 8 | 1 | 1 | 1 | 1 | 1 | 2 | 9 |

The table below describes the meaning of each label:

| label | bits | meaning |
|---|---|---|
| fsize | 8 | field size |
| dpos | 8 | destination position |
| x | 1 | extended vs. group size result |
| s | 1 | signed vs. unsigned |
| n | 1 | complex vs. real multiplication |
| m | 1 | mixed-sign vs. same-sign multiplication |
| l | 1 | saturation vs. truncation |
| rnd | 2 | rounding |
| gssp | 9 | group size and source position |

The 9-bit gssp field encodes both the group size, gsize, and source position, spos, according to the formula gssp=512−4*gsize+spos. The group size, gsize, is a power of two in the range 1 . . . 128. The source position, spos, is in the range 0 . . . (2*gsize)−1.

The values in the x, s, n, m, l, and rnd fields have the following meaning:

| values | x | s | n | m | l | rnd |
|---|---|---|---|---|---|---|
| 0 | group | unsigned | real | same-sign | truncate | F |
| 1 | extended | signed | complex | mixed-sign | saturate | Z |
| 2 | | | | | | N |
| 3 | | | | | | C |

Bits 95 . . . 32 of the contents of general register rb specifies several parameters which control the selection of partitions of the memory operands. The position and default values of the control fields allows the multiplier zero length field to default to zero and the multiplicand origin position field computation to wrap around without overflowing into any other field by using 32-bit arithmetic.

| 95 64 | 63 32 |
|---|---|
| mzero | mpos |
| 32 | 32 |

The table below describes the meaning of each label:

| label | bits | meaning |
|---|---|---|
| mpos | 32 | multiplicand origin position |
| mzero | 32 | multiplier zero length |

The 32-bit mpos field encodes both the horizontal and vertical location of the multiplicand origin, which is the location of the multiplicand element at which the zero-th element of the multiplier combines to produce the zero-th element of the result. Varying values in this field permit several results to be computed with no changes to the two wide operands. The mpos field is a byte offset from the beginning of the multiplicand operand.

The 32-bit mzero field encodes a portion of the multiplier operand that has a zero value and which may be omitted from the multiply and sum computation. Implementations may use a non-zero value in this field to reduce the time and/or power to perform the instruction, or may ignore the contents of this field. The implementation may presume a zero value for the multiplier operand in bits dmsize−1 . . . dmsize−(mzero*8), and skip the multiplication of any multiplier obtained from this bit range. The mzero field is a byte offset from the end of the multiplier operand.

The virtual addresses of the wide operands must be aligned, that is, the byte addresses must be an exact multiple of the operand extent expressed in bytes. If the addresses are not aligned the virtual address cannot be encoded into a valid specifier. Some invalid specifiers cause an "Operand Boundary" exception.

Z (zero) rounding is not defined for unsigned extract operations, so F (floor) rounding is substituted, which will properly round unsigned results downward.

An implementation may limit the extent of operands due to limits on the operand memory or cache, or of the number of values that may be accurately summed, and thereby cause a ReservedInstruction exception.

Figure 37D:
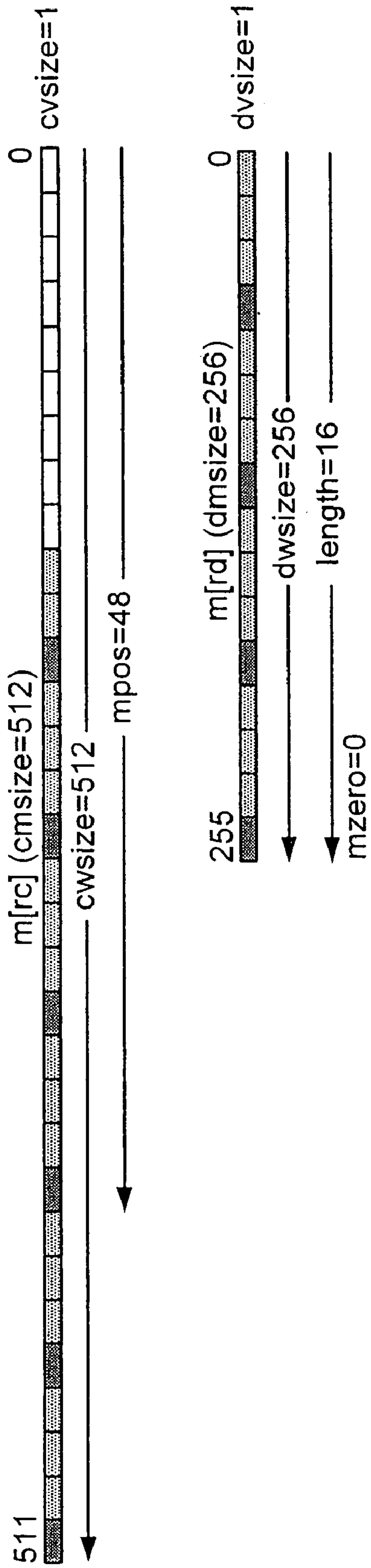
Figure 37E:
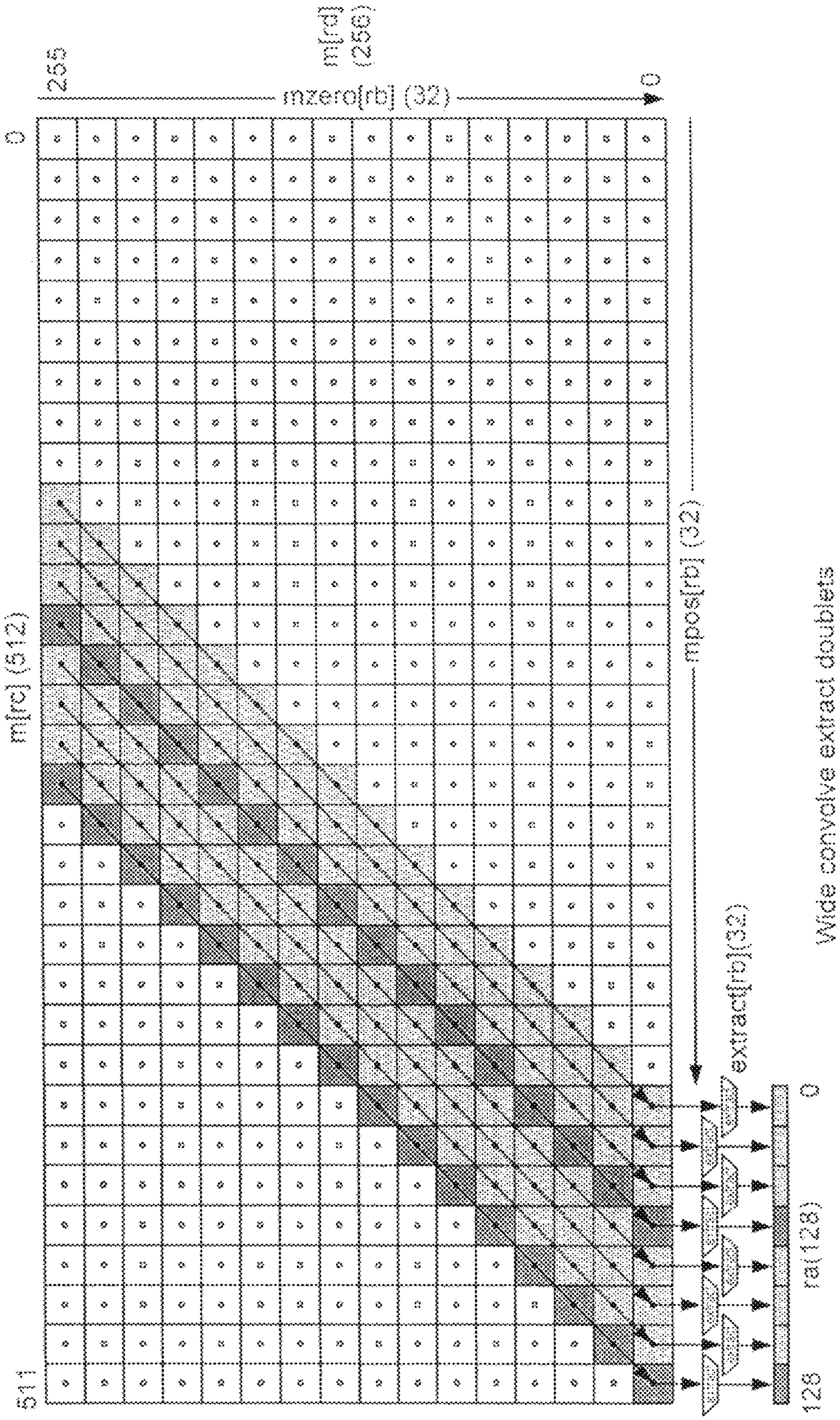

As shown in FIGS. 37D and 37E, as an example with specific register values, a wide-convolve-extract-doublets instruction (W.CONVOLVE.X.B or W.CONVOLVE.X.L), with start in rb=24, convolves memory vector rc [c31 c30 . . . c1 c0] with memory vector rd [d15 d14 . . . d1 d0], yielding the products [c16d15+c17d14+ . . . +c30d1+c31d0 c15d15+c16d14+ . . . +c29d1+c30d0 . . . c10d15+c11d14+ . . . +c24d1+c25d0 c9d15+c10d14+ . . . +c23d1+c24d0], rounded and limited as specified by the contents of general register rb. The values c8 . . . c0 are not used in the computation and may be any value.

Figure 37F:
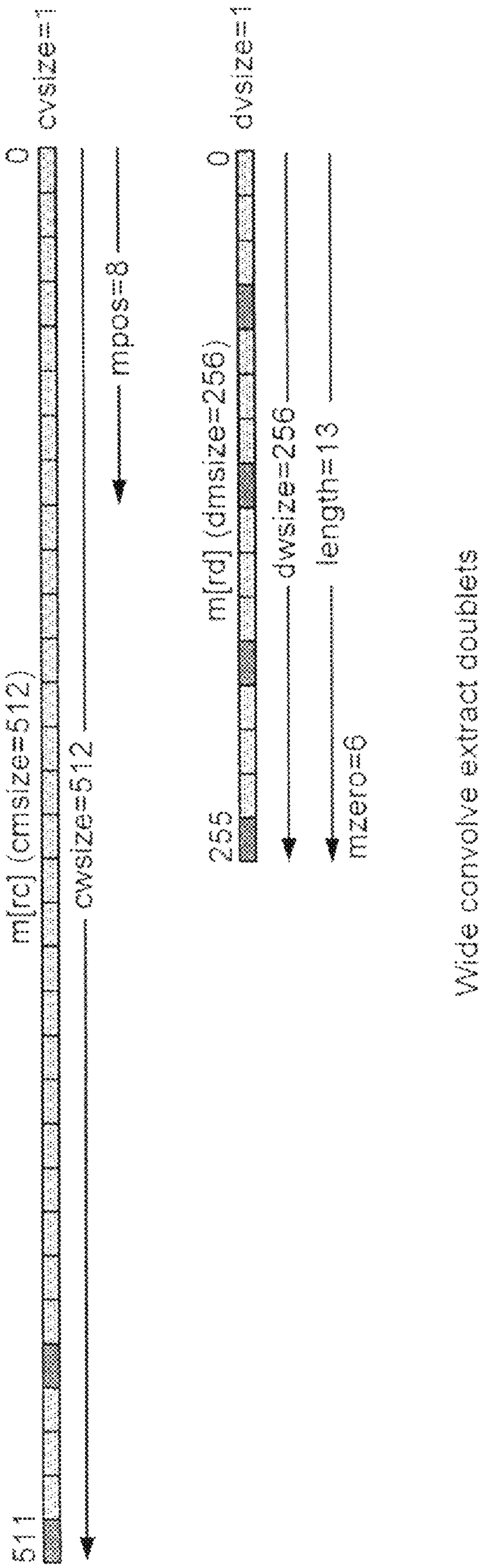
Figure 37G:
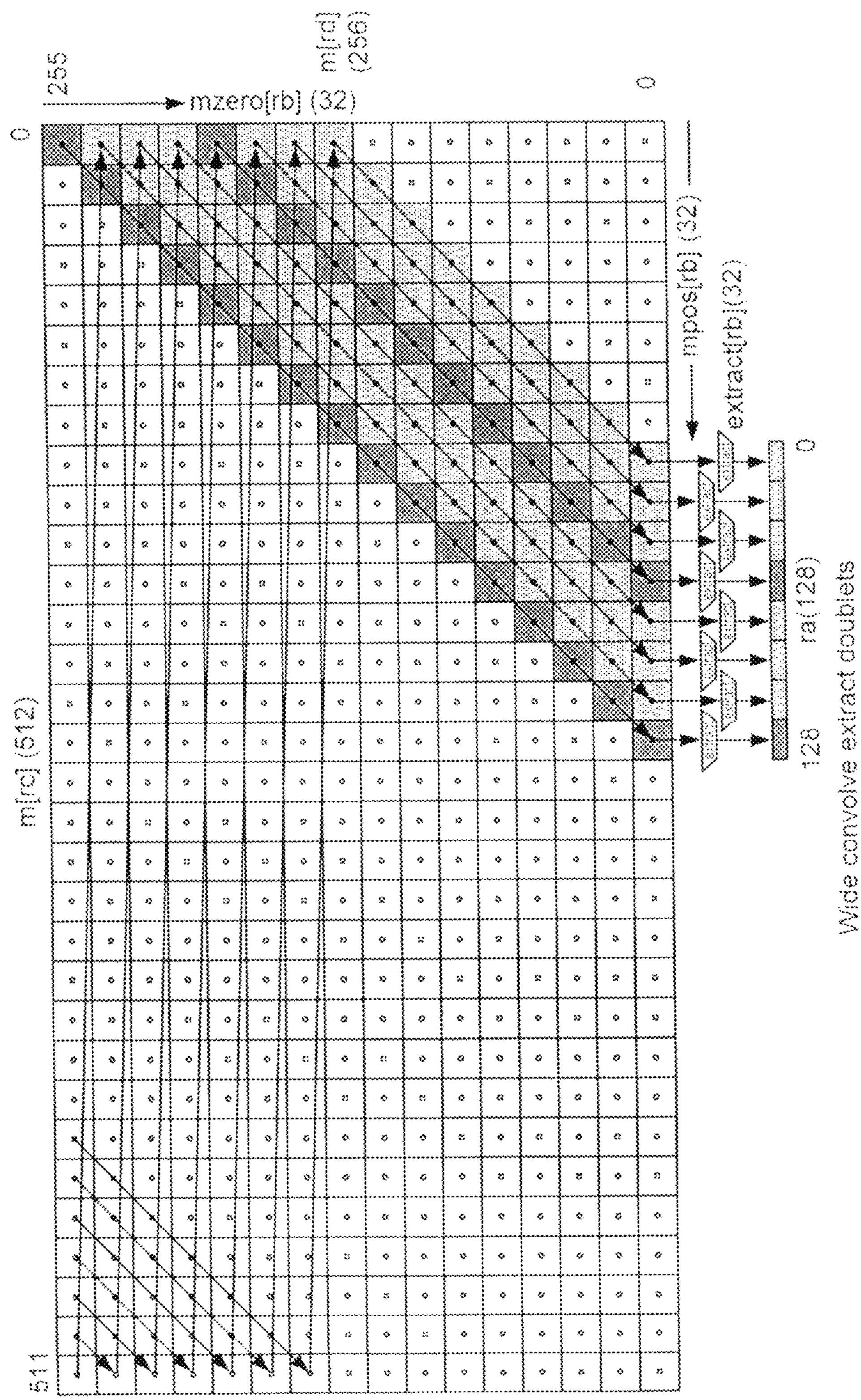

As shown in FIGS. 37F and 37G, as an example with specific register values, a wide-convolve-extract-doublets instruction (W.CONVOLVE.X.L), with mpos in rb=8 and mzero in rb=48 (so length=(512−mzero)*dmsize/512=13), convolves memory vector rc [c31 c30 . . . c1 c0] with memory vector rd [d15 d14 . . . d1 d0], yielding the products [c3d12+c4d1+ . . . +c14d1+c15d0c2d12+c3d11+ . . . +c13d1+c14d0 . . . c29d12+c30d11+ . . . +c8d1+c9d0c28d12+c29d11+ . . . +c7d1+c8d0], rounded and limited as specified. In this case, the starting position is located so that the useful range of values wraps around below c0, to c31 . . . 28. The values c27 . . . c16 are not used in the computation and may be any value. The length parameter is set to 13, so values of d15 . . . d13 must be zero.

In this case, the starting position is located so that the useful range of values wraps around below c0, to c31 . . . 25. The length parameter is set to 13, so values of d15 . . . d13 are expected to be zero.

Figure 37H:
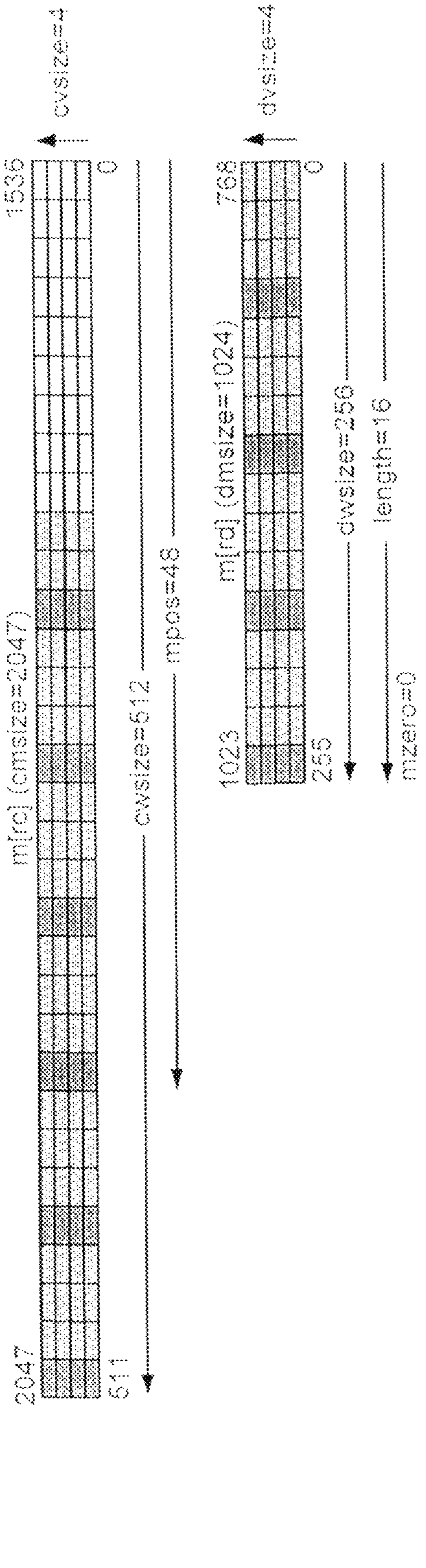
Figure 37I:
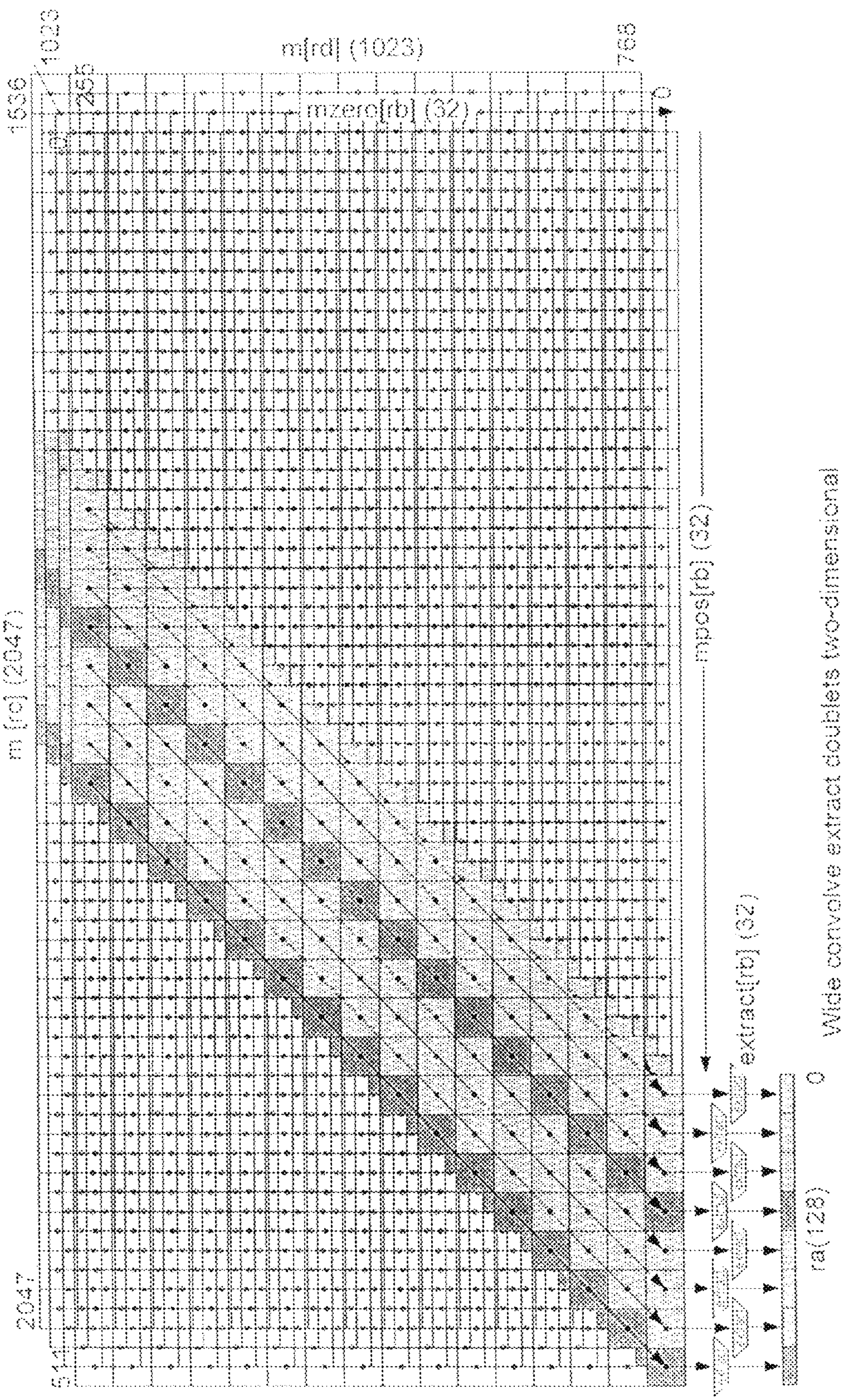

As shown in FIGS. 37H and 37I, as an example with specific register values, a wide-convolve-extract-doublets-two-dimensional instruction (W.CONVOLVE.X.B or W.CONVOLVE.X.L), with mpos in rb=24 and vsize in rc and rd=4, convolves memory vector rc [c127 c126 . . . c31 c30 . . . c1 c0] with memory vector rd [d63 d62 . . . d15 d14 . . . d1 d0], yielding the products [c113d63+c112d62+ . . . +c16d15+c17d14+ . . . +c30d1+c31d0 c112d63+c111d62+ . . . +c15d15+c16d14+ . . . +c29d1+c30d0 . . . c107d63+c106d62+ . . . +c10d15+c11d14+ . . . +c24d1+c25d0 c106d63+c105d62+ . . . +c9d15+c10d14+ . . . +c23d1+c24d0], rounded and limited as specified by the contents of general register rb.

Figure 37J:
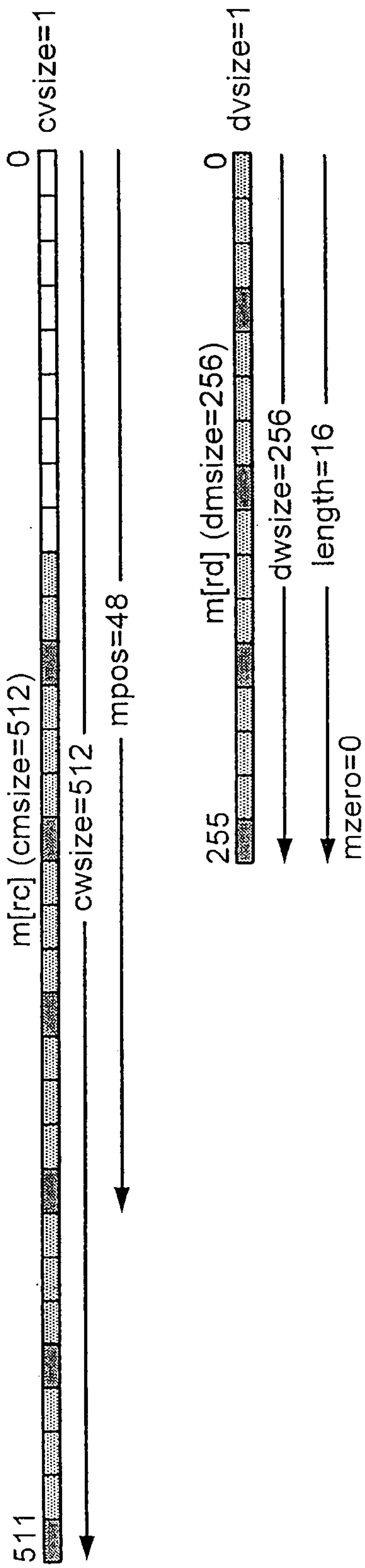
Figure 37K:
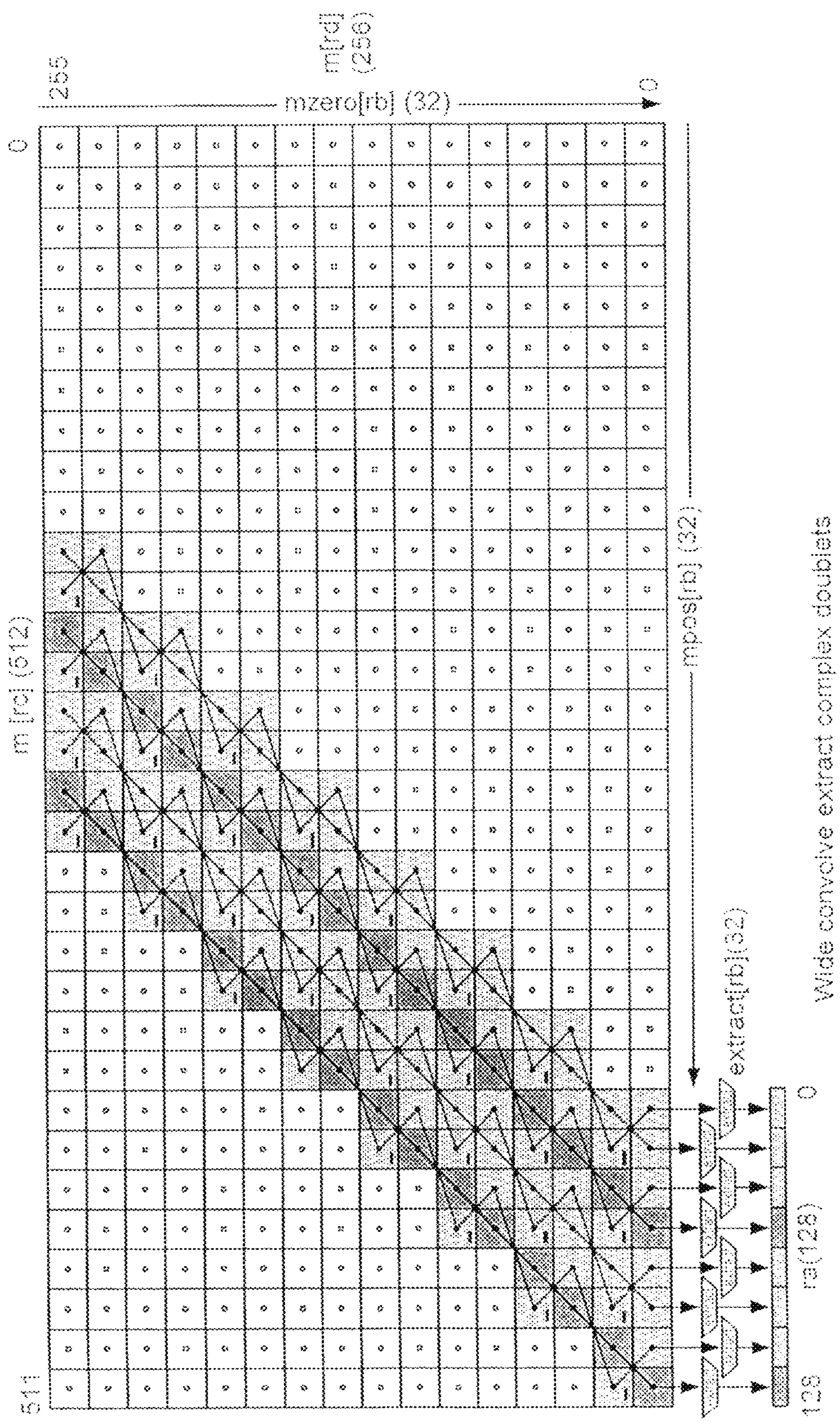

As shown in FIGS. 37J and 37K, as an example with specific register values, a wide-convolve-extract-complex-doublets instruction (W.CONVOLVE.X.B or W.CONVOLVE.X.L with n set in rb), with mpos in rb=12, convolves memory vector rc [c15 c14 . . . c1 c0] with memory vector rd [d7 d6 . . . d1 d0], yielding the products [c8d7+c9d6+ . . . +c16d1+c15d0c7d7+c8d6+ . . . +c13d1+c14d0c6d7+c7d6+ . . . +c12d1+c13d0 c5d7+c6d6+ . . . +c11d1+c12d0], rounded and limited as specified by the contents of general register rb.

Wide Convolve Floating-Point

A Wide Convolve Floating-point instruction operates similarly to the Wide Convolve Extract instruction described above, except that the multiplications and additions of the operands proceed using floating-point arithmetic. The representation of the multiplication products and intermediate sums in an exemplary embodiment are performed without rounding with essentially unbounded precision, with the final results subject to a single rounding to the precision of the result operand. In an alternative embodiment, the products and sums are computed with extended, but limited precision. In another alternative embodiment, the products and sums are computed with precision limited to the size of the operands.

The Wide Convolve Floating-point instruction in an exemplary embodiment may use the same format for the general register rb fields as the Wide Convolve Extract instruction, except for sfields which are not applicable to floating-point arithmetic. For example, the fsize, dpos, s, m, and l fields and the spos parameter of the gssp field may be ignored for this instruction. In an alternative embodiment, some of the remaining information may be specified within the instruction, such as the gsize parameter or the n parameter, or may be fixed to specified values, such as the rounding parameter may be fixed to round-to-nearest. In an alternative embodiment, the remaining fields may be rearranged, for example, if all but the mpos field are contained within the instruction or ignored, the mpos field alone may be contained in the least significant portion of the general register rb contents.

Wide Decode

Another category of enhanced wide operations is useful for error correction by means of Viterbi or turbo decoding. In this case, embedded memory strips are employed to contain state metrics and pre-traceback decision digits. An array of Add-Compare-Swap or log-MAP units receive a small number of branch metrics, such as 128 bits from an external register in our preferred embodiment. The array then reads, recomputes, and updates the state metric memory entries which for many practical codes are very much larger. A number of decision digits, typically 4-bits each with a radix-16 pre-traceback method, is accumulated in a the second traceback memory. The array computations and state metric updates are performed iteratively for a specified number of cycles. A second iterative operation then traverses the traceback memory to resolve the most likely path through the state trellis.

Wide Boolean

Another category of enhanced wide operations are Wide Boolean operations that involve an array of small look up tables (LUTs), typically with 8 or 16 entries each specified by 3 or 4 bits of input address, interconnected with nearby multiplexors and latches. The control of the LUT entries, multiplexor selects, and latch clock enables is specified by an embedded wide cache memory. This structure provides a mean to provide a strip of field programmable gate array that can perform iterative operations on operands provided from the registers of a general purpose microprocessor. These operations can iterate over multiple cycles, performing randomly specifiable logical operations that update both the internal latches and the memory strip itself.

Transfers Between Wide Operand Memories

The method and apparatus described here are widely applicable to the problem of increasing the effective bandwidth of microprocessor functional units to approximate what is achieved in application-specific integrated circuits (ASICs). When two or more functional units capable of handling wide operands are present at the same time, the problem arises of transferring data from one functional unit that is producing it into an embedded memory, and through or around the memory system, to a second functional unit also capable of handling wide operands that needs to consume that data after loading it into its wide operand memory. Explicitly copying the data from one memory location to another would accomplish such a transfer, but the overhead involved would reduce the effectiveness of the overall processor.

FIG. 38 describes a method and apparatus for solving this problem of transfer between two or more units with reduced overhead. The embedded memory arrays function as caches that retain local copies of data which is conceptually present in a single global memory space. A cache coherency controller monitors the address streams of cache activities, and employs one of the coherency protocols, such as MOESI or MESI, to maintain consistency up to a specified standard. By proper initialization of the cache coherency controller, software running on the general purpose microprocessor can enable the transfer of data between wide units to occur in background, overlapped with computation in the wide units, reducing the overhead of explicit loads and stores.

Always Reserved

This operation generates a reserved instruction exception.

The reserved instruction exception is raised. Software may depend upon this major operation code raising the reserved instruction exception in all implementations. The choice of operation code intentionally ensures that a branch to a zeroed memory area will raise an exception.

Figure 41A:
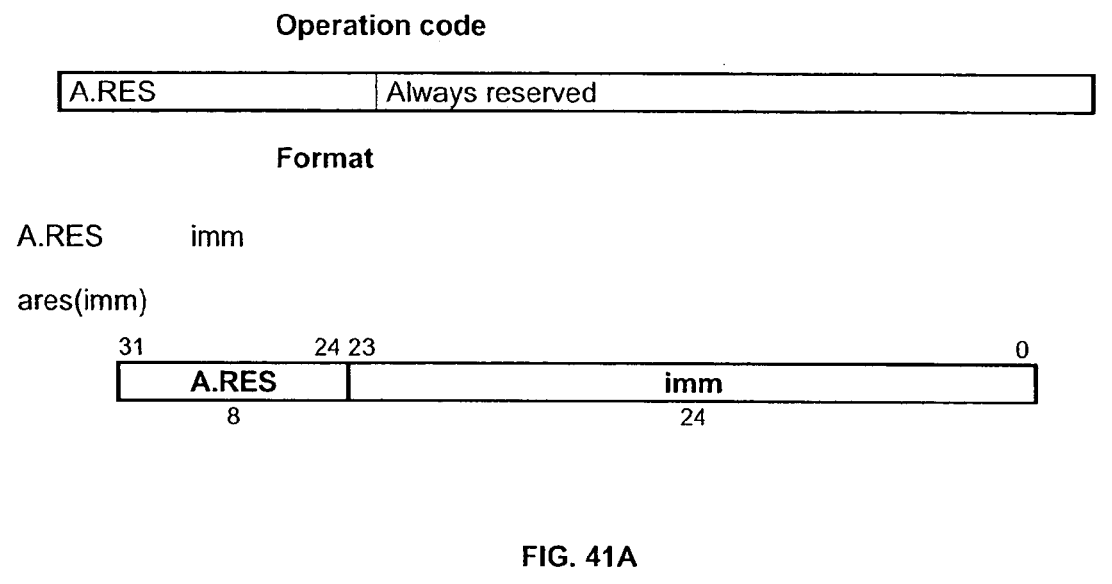

An exemplary embodiment of the Always Reserved instruction is shown in FIGS. 41A-41C.

Address

These operations perform address-sized scalar calculations with two general register values, placing the result in a general register. If specified as an option, an overflow raises a fixed-point arithmetic exception.

The contents of general registers rc and rb are fetched and the specified operation is performed on these operands. The result is placed into general register rd.

If specified, the operation is checked for signed or unsigned overflow. If overflow occurs, a FixedPointArithmetic exception is raised.

An exemplary embodiment of the Address instruction is shown in FIGS. 42A-42C.

Address Compare

These operations perform a scalar fixed-point arithmetic comparison between two general register values and raise a fixed-point arithmetic exception if the condition specified is met.

The contents of general registers rd and rc are fetched and the specified scalar arithmetic comparison is performed on these operands. If the specified condition is true, a fixed-point arithmetic exception is raised. This instruction generates no general register results.

An exemplary embodiment of the Address Compare instruction is shown in FIGS. 43A-43C.

Address Compare Floating-Point

These operations perform a scalar floating-point arithmetic comparison between two general register values and raise a floating-point arithmetic exception if the condition specified is met.

The contents of general registers rd and rc are arithmetically compared as scalar values at the specified floating-point precision. If the specified condition is true, a floating-point arithmetic exception is raised. This instruction generates no general register results. Floating-point exceptions due to signaling or quiet NaNs, comprising an IEEE-754 invalid operation, are not raised, but are handled according to the default rules of IEEE 754.

Quad-precision floating-point values may be compared using similarly-named G.COM instructions.

Figure 44A-2:
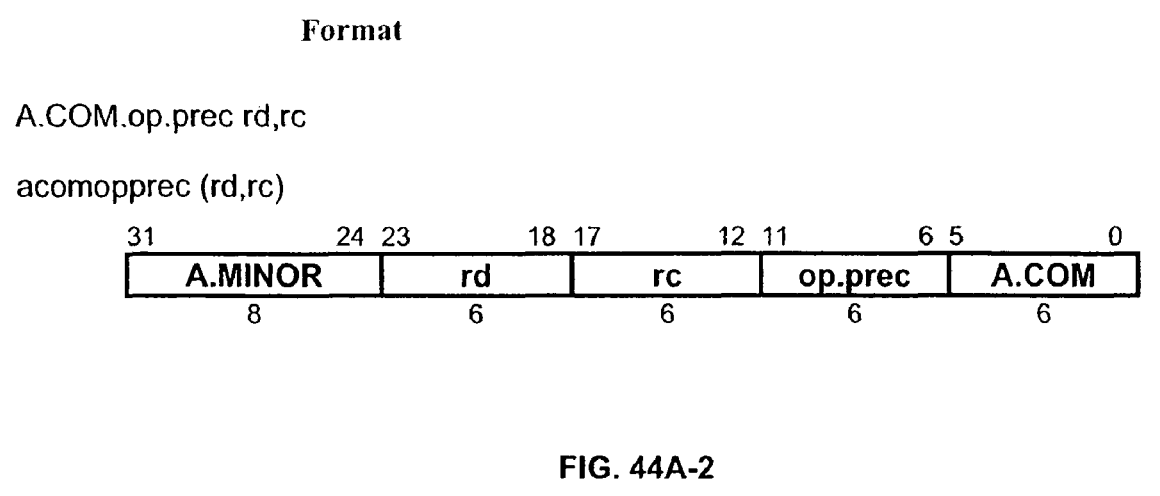

An exemplary embodiment of the Address Compare Floating-point instruction is shown in FIGS. 44A-44C.

Address Copy Immediate

This operation produces one immediate value, placing the result in a general register.

An immediate value is sign-extended from the 18-bit imm field. The result is placed into general register rd.

An exemplary embodiment of the Address Copy Immediate instruction is shown in FIGS. 45A-45C.

Address Immediate

These operations perform address-sized scalar calculations with one general register value and one immediate value, placing the result in a general register. If specified as an option, an overflow raises a fixed-point arithmetic exception.

An exemplary embodiment of the Address Immediate instruction is shown in FIGS. 46A-46C.

Address Immediate Reversed

These operations perform a subtraction with one general register value and one immediate value, placing the result in a general register. If specified as an option, an overflow raises a fixed-point arithmetic exception.

The contents of general register rc is fetched, and a 64-bit immediate value is sign-extended from the 12-bit imm field. The specified subtraction operation is performed on these operands. The result is placed into general register rd.

If specified, the operation is checked for signed or unsigned overflow. If overflow occurs, a FixedPointArithmetic exception is raised.

An exemplary embodiment of the Address Immediate Reversed instruction is shown in FIGS. 47A-47C.

Address Immediate Set

These operations perform a scalar fixed-point arithmetic comparison between one general register value and one immediate value, placing the result in a general register.

The contents of general register rc is fetched, and a 128-bit immediate value is sign-extended from the 12-bit imm field. The specified scalar arithmetic comparison is performed on these operands. The result is placed into general register rd.

An exemplary embodiment of the Address Immediate Set instruction is shown in FIGS. 48A-48C.

Address Reversed

These operations perform address-sized scalar subtraction with two general register values, placing the result in a general register. If specified as an option, an overflow raises a fixed-point arithmetic exception.

The contents of general registers rc and rb are fetched and the specified subtraction operation is performed on these operands. The result is placed into general register rd.

If specified, the operation is checked for signed or unsigned overflow. If overflow occurs, a FixedPointArithmetic exception is raised.

An exemplary embodiment of the Address Reversed instruction is shown in FIGS. 49A-49C.

Address Set

These operations perform a scalar fixed-point arithmetic comparison between two general register values, placing the result in a general register.

The contents of general registers rc and rb are fetched and the specified arithmetic comparison is performed on these operands. The result is placed into general register rd.

An exemplary embodiment of the Address Set instruction is shown in FIGS. 50A-50C.

Address Set Floating-point

These operations perform a scalar floating-point arithmetic comparison of two general register values, and placing the result in a general register.

The contents of general registers rb and rc are arithmetically compared using the specified floating-point operation. The result is placed in general register rd. Floating-point exceptions due to sigNaling or quiet NaNs, comprising an IEEE-754 invalid operation, are not raised, but are handled according to the default rules of IEEE 754.

An exemplary embodiment of the Address Set Floating-point instruction is shown in FIGS. 51A-51C.

Address Shift Left Immediate Add

These operations shift left one scalar address-sized general register value by a small immediate value and add a second scalar address-sized general register value, placing the result in a general register.

The contents of general register rb are shifted left by the immediate amount and added to the contents of general register rc. The result is placed into general register rd.

An exemplary embodiment of the Address Shift Left Immediate Add instruction is shown in FIGS. 52A-52C.

Address Shift Left Immediate Subtract

These operations shift left one scalar address-sized general register value by a small amount and subtract a second scalar address-sized general register value, placing the result in a general register.

The contents of general register rc is subtracted from the contents of general register rb shifted left by the immediate amount. The result is placed into general register rd.

An exemplary embodiment of the Address Shift Left Immediate Subtract instruction is shown in FIGS. 53A-53C.

Address Shift Immediate

These operations shift left or right one scalar address-sized general register value by an immediate value, placing the result in a general register. If specified as an option, an overflow raises a fixed-point arithmetic exception.

The contents of general register rc is fetched, and a 6-bit immediate value is taken from the 6-bit simm field. The specified operation is performed on these operands. The result is placed into general register rd.

If specified, the operation is checked for signed or unsigned overflow. If overflow occurs, a FixedPointArithmetic exception is raised.

An exemplary embodiment of the Address Shift Immediate instruction is shown in FIGS. 54A-54C.

Address Ternary

This operation uses the bits of scalar address-sized general register value to select bits from two other general register values, placing the result in a fourth general register.

The contents of general registers rd, rc, and rb are fetched. For each bit, the contents of general register rd selects either the contents of general register rc or the contents of general register rb. The result is placed into general register ra.

An exemplary embodiment of the Address Ternary instruction is shown in FIGS. 55A-55C.

Branch

This operation branches to a location specified by a general register value.

Execution branches to the address specified by the contents of general register rd.

If the contents of general register rd are not aligned to a quadlet, the OperandBoundary exception is raised.

An exemplary embodiment of the Branch instruction is shown in FIGS. 56A-56C.

Branch Back

This operation branches to a location specified by the previous contents of general register 0, reduces the current privilege level, loads a value from memory, and restores general register 0 to the value saved on a previous exception.

Processor context, including program counter and privilege level is restored from general register 0, where it was saved at the last exception. Exception state, if set, is cleared, re-enabling normal exception handling. The contents of general register 0 saved at the last exception is restored from memory. The privilege level is only lowered, so that this instruction need not be privileged.

If the previous exception was an AccessDetail exception, Continuation State set at the time of the exception affects the operation of the next instruction after this Branch Back, causing the previous AccessDetail exception to be inhibited. If software is performing this instruction to abort a sequence ending in an AccessDetail exception, it should abort by branching to an instruction that is not affected by Continuation State.

Figure 57A:
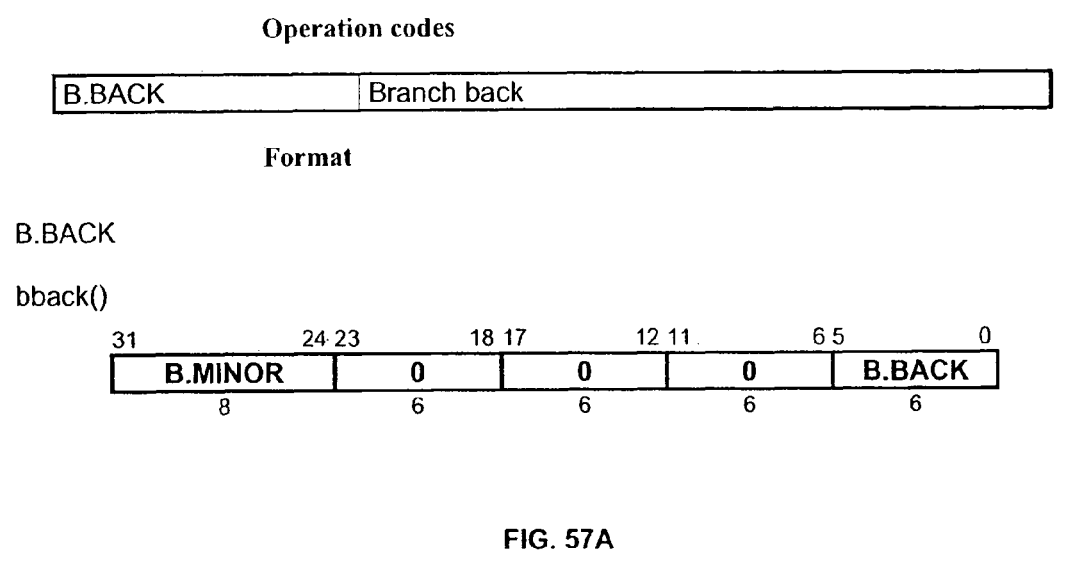

An exemplary embodiment of the Branch Back instruction is shown in FIGS. 57A-57C.

Branch Barrier

This operation stops the current thread until all pending stores are completed, then branches to a location specified by a general register value.

The instruction fetch unit is directed to cease execution until all pending stores are completed. Following the barrier, any previously pre-fetched instructions are discarded and execution branches to the address specified by the contents of general register rd.

Access disallowed exception occurs if the contents of general register rd is not aligned on a quadlet boundary.

Self-modifying, dynamically-generated, or loaded code may require use of this instruction between storing the code into memory and executing the code.

An exemplary embodiment of the Branch Barrier instruction is shown in FIGS. 58A-58C.

Branch Conditional

These operations compare two scalar fixed-point general register values, and depending on the result of that comparison, conditionally branches to a nearby code location.

The contents of general registers rd and rc are compared, as specified by the op field. If the result of the comparison is true, execution branches to the address specified by the offset field. Otherwise, execution continues at the next sequential instruction.

An exemplary embodiment of the Branch Conditional instruction is shown in FIGS. 59A-59C.

With regards to note number 1 in FIG. 59A, B.G.Z is encoded as B.L.U with both instruction fields rd and rc equal.

With regards to note number 2 in FIG. 59A, B.GE.Z is encoded as B.GE with both instruction fields rd and rc equal.

With regards to note number 3 in FIG. 59A, B.L.Z is encoded as B.L with both instruction fields rd and rc equal.

With regards to note number 4 in FIG. 59A, B.LE.Z is encoded as B.GE.U with both instruction fields rd and rc equal.

Branch Conditional Floating-Point

These operations compare two scalar floating-point general register values, and depending on the result of that comparison, conditionally branches to a nearby code location.

The contents of general registers rc and rd are compared, as specified by the op field. If the result of the comparison is true, execution branches to the address specified by the offset field. Otherwise, execution continues at the next sequential instruction.

An exemplary embodiment of the Branch Conditional Floating-Point instructions is shown in FIGS. 60A-60C.

Branch Conditional Visibility Floating-Point

These operations compare two vector-floating-point general register values, and depending on the result of that comparison, conditionally branches to a nearby code location.

The contents of general registers rc and rd are compared, as specified by the op field. If the result of the comparison is true, execution branches to the address specified by the offset field. Otherwise, execution continues at the next sequential instruction.

Each operand is assumed to represent a vertex of the form: [w z y x] packed into a single general register. The comparisons check for visibility of a line connecting the vertices against a standard viewing volume, defined by the planes: x=w,x=−w,y=w,y=−w,z=0,z=1. A line is visible (V) if the vertices are both within the volume. A line is not visible (NV) is either vertex is outside the volume—in such a case, the line may be partially visible. A line is invisible (I) if the vertices are both outside any face of the volume. A line is not invisible (NI) if the vertices are not both outside any face of the volume.

An exemplary embodiment of the Conditional Visibility Floating-Point instructions is shown in FIGS. 61A-61C.

Branch Down

This operation branches to a location specified by a general register value, optionally reducing the current privilege level.

Execution branches to the address specified by the contents of general register rd. The current privilege level is reduced to the level specified by the low order two bits of the contents of general register rd.

An exemplary embodiment of the Branch Down instruction is shown in FIGS. 62A-62C.

Branch Halt

This operation stops the current thread until an exception occurs.

This instruction directs the instruction fetch unit to cease execution until an exception occurs.

Figure 63A:
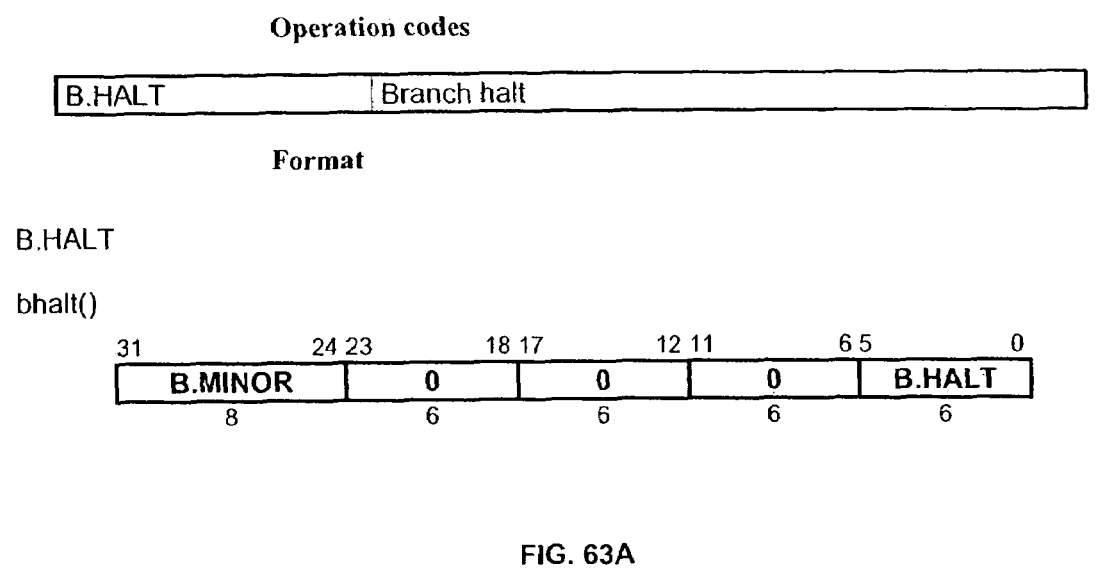

An exemplary embodiment of the Branch Halt instruction is shown in FIGS. 63A-63C.

Branch Hint Immediate

This operation indicates a future branch location specified as an offset from the program counter.

This instruction directs the instruction fetch unit of the processor that a branch is likely to occur count times at simm instructions following the current successor instruction to the address specified by the offset field.

After branching count times, the instruction fetch unit should presume that the branch at simm instructions following the current successor instruction is not likely to occur. If count is zero, this hint directs the instruction fetch unit that the branch is likely to occur more than 63 times.

An exemplary embodiment of the Branch Hint Immediate instruction is shown in FIGS. 64A-64C.

Branch Immediate

This operation branches to a location that is specified as an offset from the program counter.

Execution branches to the address specified by the offset field.

An exemplary embodiment of the Branch Immediate instruction is shown in FIGS. 65A-65C.

Branch Immediate Link

This operation branches to a location that is specified as an offset from the program counter, saving the value of the program counter into general register 0.

The address of the instruction following this one is placed into general register 0. Execution branches to the address specified by the offset field.

Figure 66A:
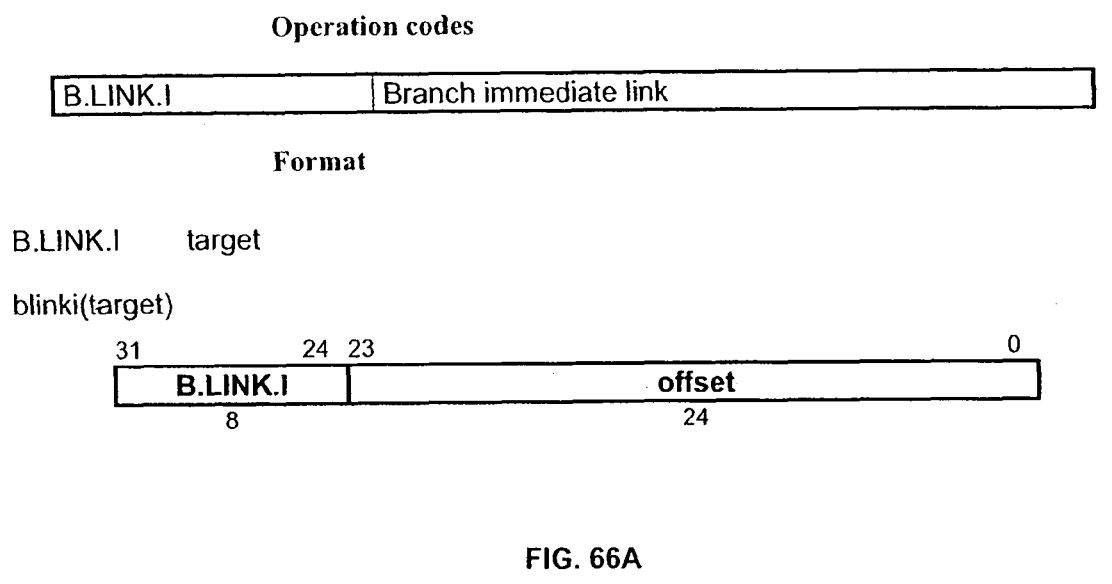

An exemplary embodiment of the Branch Immediate Link instruction is shown in FIGS. 66A-66C.

Branch Link

This operation branches to a location specified by a general register, saving the value of the program counter into a general register.

The address of the instruction following this one is placed into general register rd. Execution branches to the address specified by the contents of general register rc.

Access disallowed exception occurs if the contents of general register rc is not aligned on a quadlet boundary.

Reserved instruction exception occurs if rb is not zero.

An exemplary embodiment of the Branch Link instruction is shown in FIGS. 67A-67C.

Load

These operations add the contents of a first general register to the shifted and possibly incremented contents of a second general register to produce a virtual address, load data from memory, sign- or zero-extending the data to fill a third destination general register.

An operand size, expressed in bytes, is specified by the instruction. A virtual address is computed from the sum of the contents of general register rc and the sum of the immediate value and the contents of general register rb multiplied by operand size. The contents of memory using the specified byte order are read, treated as the size specified, zero-extended or sign-extended as specified, and placed into general register rd.

If alignment is specified, the computed virtual address must be aligned, that is, it must be an exact multiple of the size expressed in bytes. If the address is not aligned an "Operand Boundary" exception occurs.

An exemplary embodiment of the Load instruction is shown in FIGS. 68A-68C.

With regards to note number 5 in FIG. 68A, L.8 need not distinguish between little-endian and big-endian ordering, nor between aligned and unaligned, as only a single byte is loaded.

With regards to note number 6 in FIG. 68A, L.128.B need not distinguish between signed and unsigned, as the hexlet fills the destination register.

With regards to note number 7 in FIG. 68A, L.128.AB need not distinguish between signed and unsigned, as the hexlet fills the destination register.

With regards to note number 8 in FIG. 68A, L.128.L need not distinguish between signed and unsigned, as the hexlet fills the destination register.

With regards to note number 9 in FIG. 68A, L.128.AL need not distinguish between signed and unsigned, as the hexlet fills the destination register.

With regards to note number 10 in FIG. 68A, L.U8 need not distinguish between little-endian and big-endian ordering, nor between aligned and unaligned, as only a single byte is loaded.

Load Immediate

These operations compute a virtual address from the contents of a general register and a sign-extended and shifted immediate value, load data from memory, sign- or zero-extending the data to fill the destination general register.

An operand size, expressed in bytes, is specified by the instruction. A virtual address is computed from the sum of the contents of general register rc and the sign-extended value of the offset field, multiplied by the operand size. The contents of memory using the specified byte order are read, treated as the size specified, zero-extended or sign-extended as specified, and placed into general register rd.

If alignment is specified, the computed virtual address must be aligned, that is, it must be an exact multiple of the size expressed in bytes. If the address is not aligned an "Operand Boundary" exception occurs.

An exemplary embodiment of the Load Immediate instruction is shown in FIGS. 69A-69C.

With regards to note 11 number in FIG. 69A, LI.8 need not distinguish between little-endian and big-endian ordering, nor between aligned and unaligned, as only a single byte is loaded.

With regards to note 12 number in FIG. 69A, LI.128.AB need not distinguish between signed and unsigned, as the hexlet fills the destination register.

With regards to note 13 number in FIG. 69A, LI.128.B need not distinguish between signed and unsigned, as the hexlet fills the destination register.

With regards to note 14 number in FIG. 69A, LI.128.AL need not distinguish between signed and unsigned, as the hexlet fills the destination register.

With regards to note 15 number in FIG. 69A, LI.128.L need not distinguish between signed and unsigned, as the hexlet fills the destination register.

With regards to note 16 number in FIG. 69A, LI.U8 need not distinguish between little-endian and big-endian ordering, nor between aligned and unaligned, as only a single byte is loaded.

Store

These operations add the contents of a first general register to the shifted and possibly incremented contents of a second general register to produce a virtual address, and store the contents of a third general register into memory.

An operand size, expressed in bytes, is specified by the instruction. A virtual address is computed from the sum of the contents of general register rc and the sum of the immediate value and the contents of general register rb multiplied by operand size. The contents of general register rd, treated as the size specified, is stored in memory using the specified byte order.

If alignment is specified, the computed virtual address must be aligned, that is, it must be an exact multiple of the size expressed in bytes. If the address is not aligned an "Operand Boundary" exception occurs.

An exemplary embodiment of the Store instruction is shown in FIGS. 70A-70C.

With regards to note 17 number in FIG. 70A, S.8 need not specify byte ordering, nor need it specify alignment checking, as it stores a single byte.

Store Double Compare Swap

These operations compare two 64-bit values in the upper half of two general registers against two 64-bit values read from two 64-bit memory locations, as specified by two 64-bit addresses in the lower half of the two general registers, and if equal, store two new 64-bit values from a third general register into the memory locations. The values read from memory are catenated and placed in the third general register.

Two virtual addresses are extracted from the low order bits of the contents of general registers rc and rb. Two 64-bit comparison values are extracted from the high order bits of the contents of general registers rc and rb. Two 64-bit replacement values are extracted from the contents of general register rd. The contents of memory using the specified byte order are read from the specified addresses, treated as 64-bit values, compared against the specified comparison values, and if both read values are equal to the comparison values, the two replacement values are written to memory using the specified byte order. If either are unequal, no values are written to memory. The loaded values are catenated and placed in the general register specified by rd.

The virtual addresses must be aligned, that is, it must be an exact multiple of the size expressed in bytes. If the address is not aligned an "Operand Boundary" exception occurs.

An exemplary embodiment of the Store Double Compare Swap instruction is shown in FIGS. 71A-71C.

Store Immediate

These operations add the contents of a general register to a sign-extended and shifted immediate value to produce a virtual address, and store the contents of a general register into memory.

An operand size, expressed in bytes, is specified by the instruction. A virtual address is computed from the sum of the contents of general register rc and the sign-extended value of the offset field, multiplied by the operand size. The contents of general register rd, treated as the size specified, are written to memory using the specified byte order.

The computed virtual address must be aligned, that is, it must be an exact multiple of the size expressed in bytes. If the address is not aligned an "Operand Boundary" exception occurs.

An exemplary embodiment of the X instruction is shown in FIGS. 72A-72C.

With regards to note number 17 in FIG. 72A, SI.8 need not specify byte ordering, nor need it specify alignment checking, as it stores a single byte Store Immediate Inplace These operations add the contents of a general register to a sign-extended and shifted immediate value to produce a virtual address, and store the contents of a general register into memory.

An operand size of 8 bytes is specified. A virtual address is computed from the sum of the contents of general register rc and the sign-extended value of the offset field, multiplied by the operand size. The contents of memory using the specified byte order are read and treated as a 64-bit value. A specified operation is performed between the memory contents and the original contents of general register rd, and the result is written to memory using the specified byte order. The original memory contents are placed into general register rd.

The computed virtual address must be aligned, that is, it must be an exact multiple of the size expressed in bytes. If the address is not aligned an "Operand Boundary" exception occurs.

For the store-compare-swap instruction, prior to executing the operation, general register rd contains the catenation of the new value (in the high-order bits) and the comparison value (in the low-order bits). A shuffle (X.SHUFFLE.256 both=new,comp,64,2,0) instruction places the value in the form needed for the store-compare-swap instruction. A branch-not-equal instruction can force the operation to be repeated if the store-compare-swap operation did not write to memory.

Using the above note, there are two ways that a value (held in general register value) can be indivisibly added to an octlet of memory (specified by general register base and immediate offset). In the code below, the contents of memory is read, added to, then written back using a store-compare-swap instruction. If memory is altered between the load and the write-back, the branch-not-equal operation forces the operation to be attempted again:

```
1:  L.I.64.A.L       comp=base,offset
    G.ADD.64         new=comp,value
    X.SHUFFLE.256    both=new,comp,64,2,0
    S.CS.I.64.A.L both@base,offset
    B.NE both,comp,1b
```

The code above is functionally equivalent to the simpler code below, in which the store-add-swap instruction directly adds a value to memory indivisibly, returning the original value to a general register:

```
G.COPY              both=value
S.AS.I.64.A.L       both@base,offset
```

Similarly, there are two sequences for indivisibly placing a value under a mask into an octlet of memory (specified by general register base and immediate offset). In the code below, the contents of memory is read, multiplexed to, then written back using a store-compare-swap instruction. If memory is altered between the load and the write-back, the branch-not-equal operation forces the operation to be attempted again:

```
1:  L.I.64.A.L          comp=base,offset
    G.MUX               new=mask,value,comp
```

-continued

```
    X.SHUFFLE.256       both=new,comp,64,2,0
    S.CS.I.64.A.L       both@base,offset
    B.NE                both,comp,1b
```

The code above is functionally equivalent to the simpler code below, in which the store-mux-swap instruction directly places a value under a mask into memory indivisibly, returning the original value to a general register:

```
X.SHUFFLE.256       both=value,mask,64,2,0
S.MS.I.64.A.L       both@base,offset
```

An exemplary embodiment of the Store Immediate Inplace instruction is shown in FIGS. 73A-73C.

Store Inplace

These operations add the contents of a first general register to the shifted and possibly incremented contents of a second general register to produce a virtual address, and store the contents of a third general register into memory.

An operand size, expressed in bytes, is specified by the instruction. A virtual address is computed from the sum of the contents of general register rc and the sum of the immediate value and the contents of general register rb multiplied by operand size. The contents of memory using the specified byte order are read and treated as 64 bits. A specified operation is performed between the memory contents and the original contents of general register rd, and the result is written to memory using the specified byte order. The original memory contents are placed into general register rd.

The computed virtual address must be aligned, that is, it must be an exact multiple of the size expressed in bytes. If the address is not aligned an "Operand Boundary" exception occurs.

For the store-compare-swap instruction, prior to executing the operation, general register rd contains the catenation of the new value (in the high-order bits) and the comparison value (in the low-order bits). A shuffle (X.SHUFFLE.256 both=new,comp,64,2,0) instruction places the value in the form needed for the store-compare-swap instruction. A branch-not-equal instruction can force the operation to be repeated if the store-compare-swap operation did not write to memory.

Using the above note, there are two ways that a value (held in general register increm) can be indivisibly added to an octlet of memory (specified by general registers base and index). In the code below, the contents of memory is read, added to, then written back using a store-compare-swap instruction. If memory is altered between the load and the write-back, the branch-not-equal operation forces the operation to be attempted again:

```
1:  L.64.A.L         comp=base,index
    G.ADD.64         new=comp,increm
    X.SHUFFLE.256    both=new,comp,64,2,0
    S.CS.64.A.L both@base,index
    B.NE both,comp,1b
```

The code above is functionally equivalent to the simpler code below, in which the store-add-swap instruction directly adds a value to memory indivisibly, returning the original value to a general register:

| | |
|---|---|
| G.COPY | both=increm |
| S.AS.64.A.L | both@base,index |

Similarly, there are two sequences for indivisibly placing a value under a mask into an octlet of memory (specified by general registers base and index). In the code below, the contents of memory is read, multiplexed to, then written back using a store-compare-swap instruction. If memory is altered between the load and the write-back, the branch-not-equal operation forces the operation to be attempted again:

| | | |
|---|---|---|
| 1: | L.64.A.L | comp=base,index |
| | G.MUX | new=mask,value,comp |
| | X.SHUFFLE.256 | both=new,comp,64,2,0 |
| | S.CS.64.A.L | both@base,index |
| | B.NE | both,comp,1b |

The code above is functionally equivalent to the simpler code below, in which the store-mux-swap instruction directly places a value under a mask into memory indivisibly, returning the original value to a general register:

| | |
|---|---|
| X.SHUFFLE.256 | both=value,mask,64,2,0 |
| S.MS.64.A.L | both@base,index |

An exemplary embodiment of the Store Inplace instruction is shown in FIGS. 74A-74C.

Group Add Halve

These operations take operands from two general registers, perform operations on partitions of bits in the operands, and place the concatenated results in a third general register.

The contents of general registers rc and rb are partitioned into groups of operands of the size specified, added, halved, and rounded as specified, yielding a group of results, each of which is the size specified. The results never overflow, so limiting is not required by this operation. The group of results is catenated and placed in general register rd.

Z (zero) rounding is not defined for unsigned operations, and a ReservedInstruction exception is raised if attempted. F (floor) rounding will properly round unsigned results downward.

An exemplary embodiment of the Group Add Halve instruction is shown in FIGS. 75A-75C.

Group Compare

These operations perform calculations on partitions of bits in two general register values, and generate a fixed-point arithmetic exception if the condition specified is met.

Two values are taken from the contents of general registers rd and rc. The specified condition is calculated on partitions of the operands. If the specified condition is true for any partition, a fixed-point arithmetic exception is generated. This instruction generates no general purpose general register results.

An exemplary embodiment of the Group Compare instruction is shown in FIGS. 76A-76C.

Group Compare Floating-Point

These operations perform calculations on partitions of bits in two general register values, and generate a floating-point arithmetic exception if the condition specified is met.

The contents of general registers rd and rc are compared using the specified floating-point condition. If the result of the comparison is true for any corresponding pair of elements, a floating-point exception is raised. If a rounding option is specified, the operation raises a floating-point exception if a floating-point invalid operation occurs. If a rounding option is not specified, floating-point exceptions are not raised, and are handled according to the default rules of IEEE 754.

An exemplary embodiment of the Group Compare Floating-point instruction is shown in FIGS. 77A-77C.

Group Copy Immediate

This operation copies an immediate value to a general register.

A 128-bit immediate value is produced from the operation code, the size field and the 16-bit imm field. The result is placed into general register ra.

An exemplary embodiment of the Group Copy Immediate instruction is shown in FIGS. 78A-78C.

Group Immediate

These operations take operands from a general register and an immediate value, perform operations on partitions of bits in the operands, and place the concatenated results in a second general register.

The contents of general register rc is fetched, and a 128-bit immediate value is produced from the operation code, the size field and the 10-bit imm field. The specified operation is performed on these operands. The result is placed into general register ra.

Figure 79A-3:
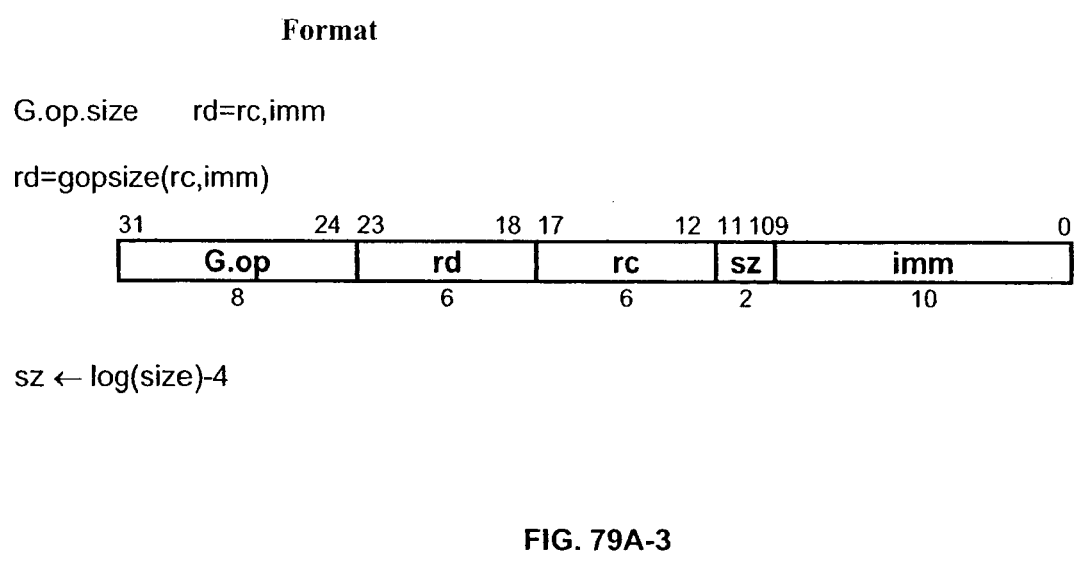
Figure 79B-2:
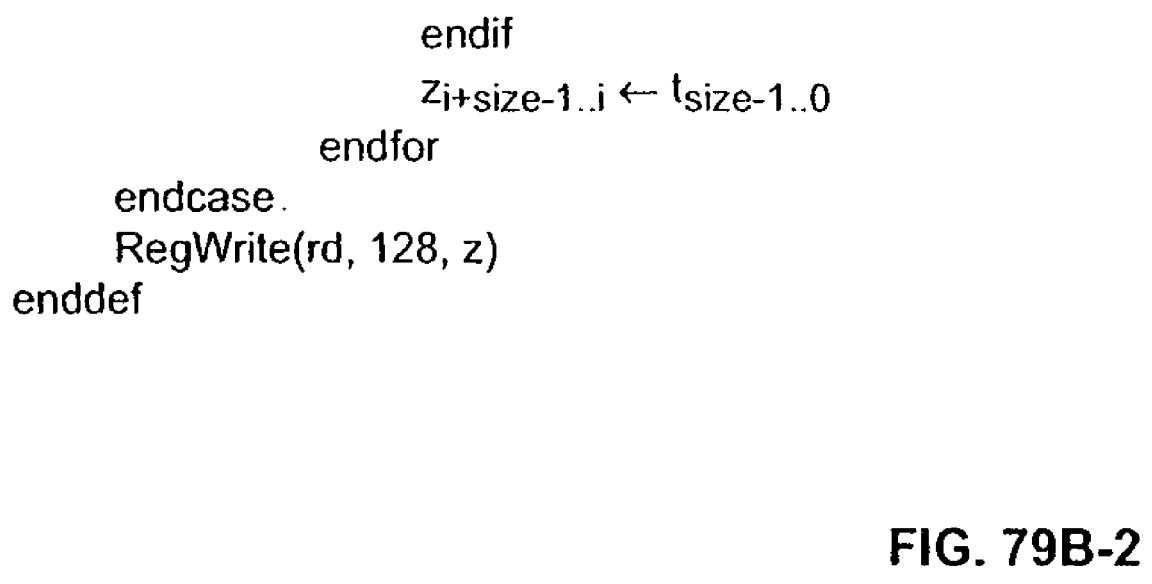

An exemplary embodiment of the Group Immediate instruction is shown in FIGS. 79A-79C.

Group Immediate Reversed

These operations take operands from a general register and an immediate value, perform operations on partitions of bits in the operands, and place the concatenated results in a second general register.

The contents of general register rc is fetched, and a 128-bit immediate value is produced from the operation code, the size field and the 10-bit imm field. The specified operation is performed on these operands. The result is placed into general register rd.

An exemplary embodiment of the Group Immediate Reversed instruction is shown in FIGS. 80A-80C.

Group Inplace

These operations take operands from three general registers, perform operations on partitions of bits in the operands, and place the concatenated results in the third general register.

The contents of general registers rd, rc and rb are fetched. The specified operation is performed on these operands. The result is placed into general register rd.

General register rd is both a source and destination of this instruction.

An exemplary embodiment of the Group Inplace instruction is shown in FIGS. 81A-81C.

Group Reversed Floating-Point

These operations take two values from general registers, perform a group of floating-point arithmetic operations on partitions of bits in the operands, and place the concatenated results in a general register.

The contents of general registers ra and rb are combined using the specified floating-point operation. The result is placed in general register rc. The operation is rounded using the specified rounding option or using round-to-nearest if not specified. If a rounding option is specified, the operation raises a floating-point exception if a floating-point invalid operation, divide by zero, overflow, or underflow occurs, or when specified, if the result is inexact. If a rounding option is not specified, floating-point exceptions are not raised, and are handled according to the default rules of IEEE 754.

An exemplary embodiment of the Group Reversed Floating-point instruction is shown in FIGS. 82A-82C.

Group Shift Left Immediate Add

These operations take operands from two general registers, perform operations on partitions of bits in the operands, and place the concatenated results in a third general register.

The contents of general registers rc and rb are partitioned into groups of operands of the size specified. Partitions of the contents of general register rb are shifted left by the amount specified in the immediate field and added to partitions of the contents of general register rc, yielding a group of results, each of which is the size specified. Overflows are ignored, and yield modular arithmetic results. The group of results is catenated and placed in general register rd.

An exemplary embodiment of the Group Shift Left Immediate Add instruction is shown in FIGS. 83A-83C.

Group Shift Left Immediate Subtract

These operations take operands from two general registers, perform operations on partitions of bits in the operands, and place the concatenated results in a third general register.

The contents of general registers rc and rb are partitioned into groups of operands of the size specified. Partitions of the contents of general register rc are subtracted from partitions of the contents of general register rb shifted left by the amount specified in the immediate field, yielding a group of results, each of which is the size specified. Overflows are ignored, and yield modular arithmetic results. The group of results is catenated and placed in general register rd.

An exemplary embodiment of the Group Shift Left Immediate Subtract instruction is shown in FIGS. 84A-84C.

Group Subtract Halve

These operations take operands from two general registers, perform operations on partitions of bits in the operands, and place the concatenated results in a third general register.

The contents of general registers rc and rb are partitioned into groups of operands of the size specified and subtracted, halved, rounded and limited as specified, yielding a group of results, each of which is the size specified. The group of results is catenated and placed in general register rd.

The result of this operation is always signed, whether the operands are signed or unsigned.

An exemplary embodiment of the Group Subtract Halve instruction is shown in FIGS. 85A-85C.

Group Ternary

These operations take three values from general registers, perform a group of calculations on partitions of bits of the operands and place the catenated results in a fourth general register.

The contents of general registers rd, rc, and rb are fetched. Each bit of the result is equal to the corresponding bit of rc, if the corresponding bit of rd is set, otherwise it is the corresponding bit of rb. The result is placed into general register ra.

An exemplary embodiment of the Group Ternary instruction is shown in FIGS. 86A-86C.

Crossbar Field

These operations take operands from a general register and two immediate values, perform operations on partitions of bits in the operands, and place the concatenated results in the second general register.

The contents of general register rc is fetched, and 7-bit immediate values are taken from the 2-bit ih and the 6-bit gsfp and gsfs fields. The specified operation is performed on these operands. The result is placed into general register rd.

Figure 87B:
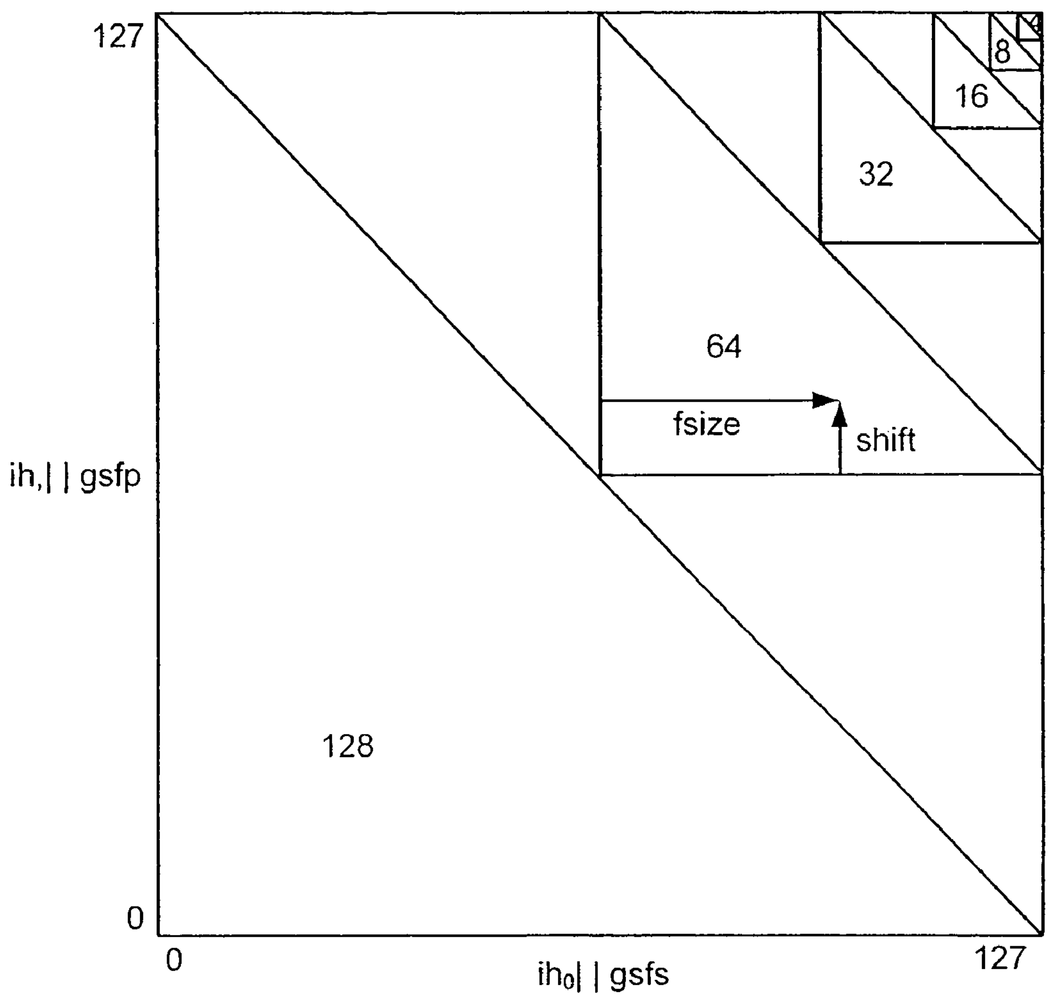

FIG. 87B shows legal values for the ih, gsfp and gsfs fields, indicating the group size to which they apply.

The ih, gsfp and gsfs fields encode three values: the group size, the field size, and a shift amount. The shift amount can also be considered to be the source bit field position for group-withdraw instructions or the destination bit field position for group-deposit instructions. The encoding is designed so that combining the gsfp and gsfs fields with a bitwise-and produces a result which can be decoded to the group size, and so the field size and shift amount can be easily decoded once the group size has been determined.

Figure 87C:
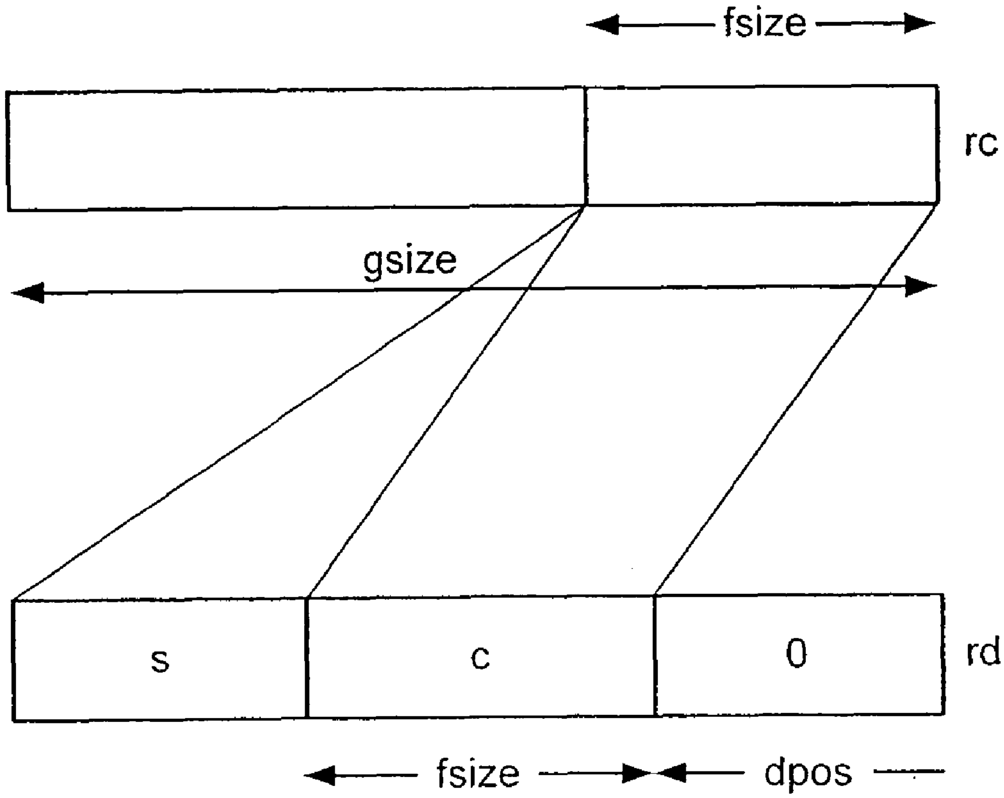

Referring to FIG. 87C, the crossbar-deposit instructions deposit a bit field from the lower bits of each group partition of the source to a specified bit position in the result. The value is either sign-extended or zero-extended, as specified.

Figure 87D:
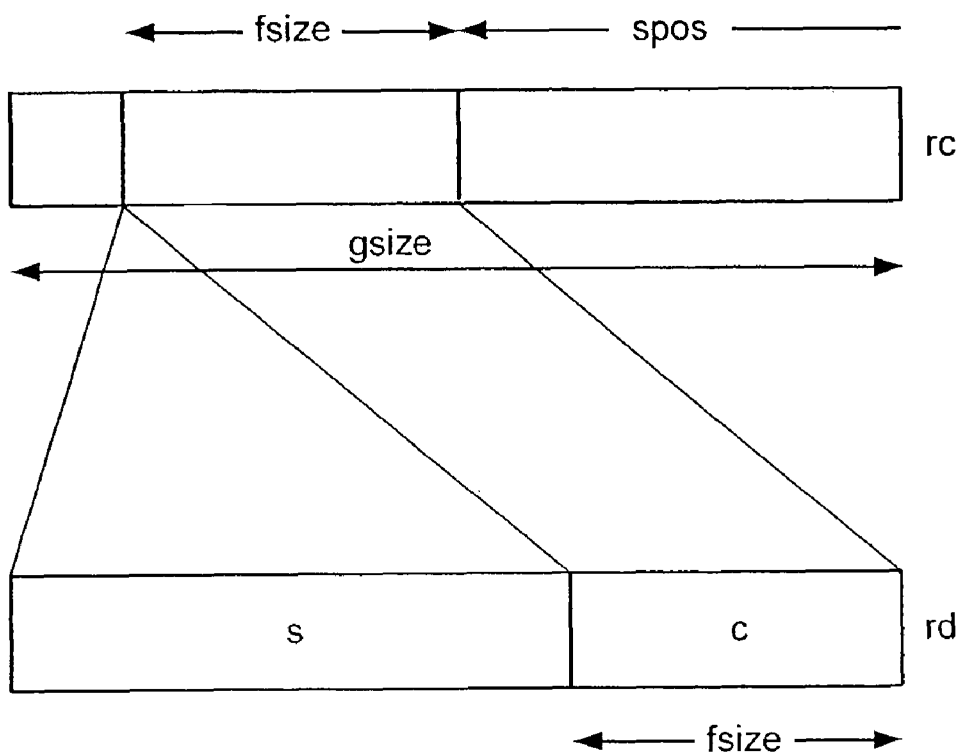

Referring to FIG. 87D, the crossbar-withdraw instructions withdraw a bit field from a specified bit position in the each group partition of the source and place it in the lower bits in the result. The value is either sign-extended or zero-extended, as specified.

An exemplary embodiment of the Crossbar Field instruction is shown in FIGS. 87A-87F.

Crossbar Field Inplace

These operations take operands from two general registers and two immediate values, perform operations on partitions of bits in the operands, and place the concatenated results in the second general register.

The contents of general registers rd and rc are fetched, and 7-bit immediate values are taken from the 2-bit ih and the 6-bit gsfp and gsfs fields. The specified operation is performed on these operands. The result is placed into general register rd.

Figure 88B:
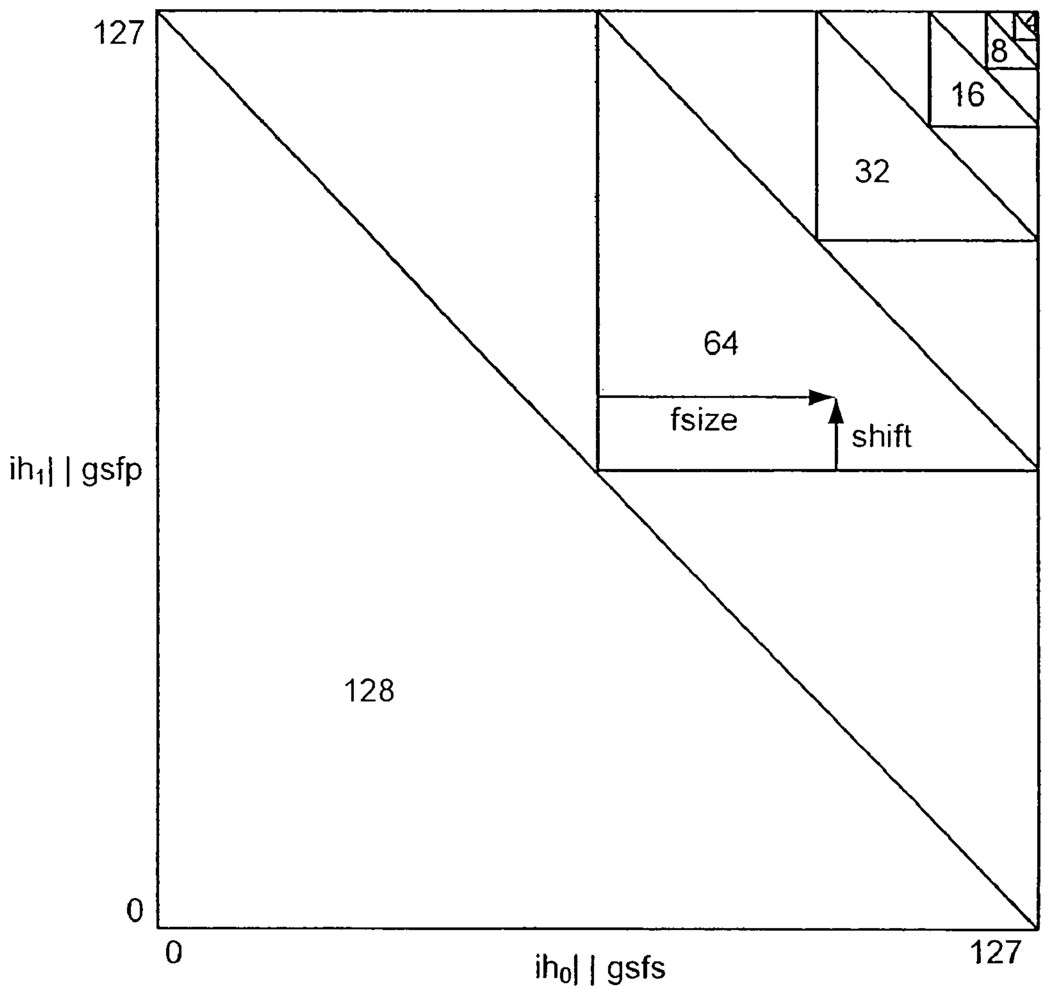

FIG. 88B shows legal values for the ih, gsfp and gsfs fields, indicating the group size to which they apply.

The ih, gsfp and gsfs fields encode three values: the group size, the field size, and a shift amount. The shift amount can also be considered to be the source bit field position for group-withdraw instructions or the destination bit field position for group-deposit instructions. The encoding is designed so that combining the gsfp and gsfs fields with a bitwise-and produces a result which can be decoded to the group size, and so the field size and shift amount can be easily decoded once the group size has been determined.

Figure 88C:
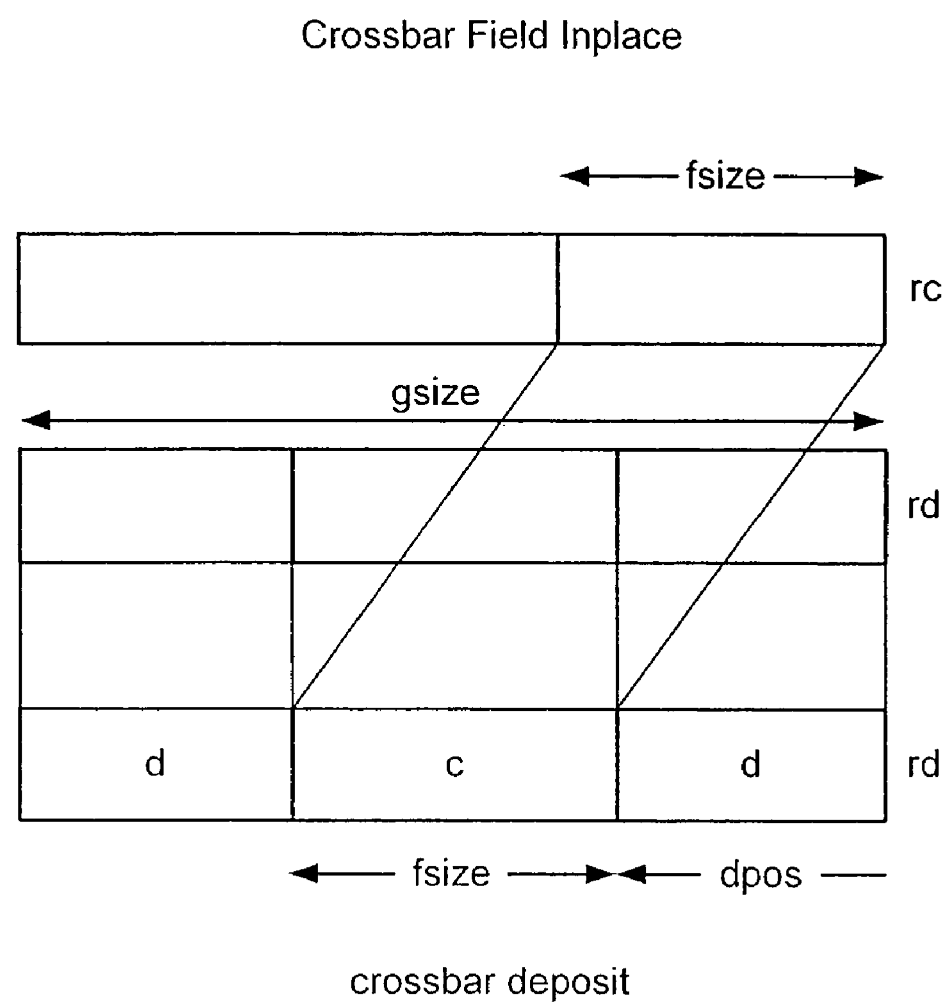

Referring to FIG. 88C, the crossbar-deposit-merge instructions deposit a bit field from the lower bits of each group partition of the source to a specified bit position in the result. The value is merged with the contents of general register rd at bit positions above and below the deposited bit field. No sign- or zero-extension is performed by this instruction.

An exemplary embodiment of the Crossbar Field Inplace instruction is shown in FIGS. 88A-88E.

Crossbar Inplace

These operations take operands from three general registers, perform operations on partitions of bits in the operands, and place the concatenated results in the third general register.

The contents of general registers rd, rc and rb are fetched. The specified operation is performed on these operands. The result is placed into general register rd.

General register rd is both a source and destination of this instruction.

An exemplary embodiment of the Crossbar Inplace instruction is shown in FIGS. 89A-89C.

Crossbar Short Immediate

These operations take operands from a general register and a short immediate value, perform operations on partitions of bits in the operands, and place the concatenated results in a general register.

A 128-bit value is taken from the contents of general register rc. The second operand is taken from simm. The specified operation is performed, and the result is placed in general register rd.

Figure 90B-3:
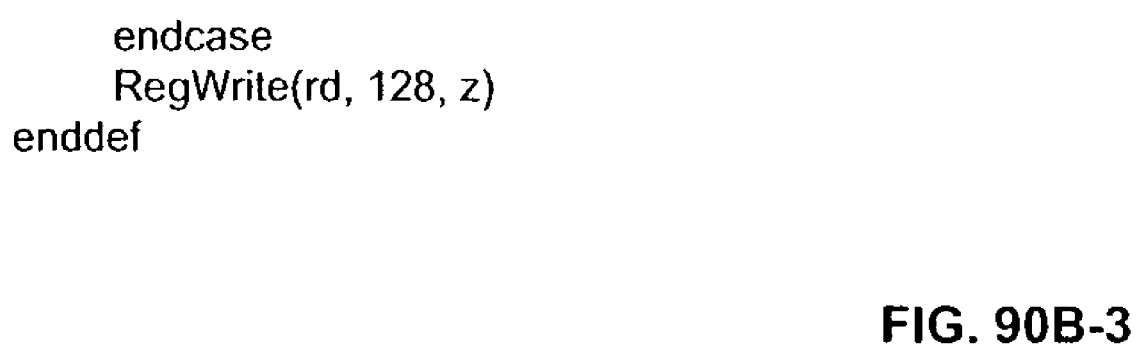

An exemplary embodiment of the Crossbar Short Immediate instruction is shown in FIGS. 90A-90C.

Crossbar Short Immediate Inplace

These operations take operands from two general registers and a short immediate value, perform operations on partitions of bits in the operands, and place the concatenated results in the second general register.

Two 128-bit values are taken from the contents of general registers rd and rc. A third operand is taken from simm. The specified operation is performed, and the result is placed in general register rd.

This instruction is undefined and causes a reserved instruction exception if the simm field is greater or equal to the size specified.

An exemplary embodiment of the Crossbar Short Immediate Inplace instruction is shown in FIGS. 91A-91C.

Crossbar Swizzle

These operations perform calculations with a general register value and immediate values, placing the result in a general register.

The contents of general register rc are fetched, and 7-bit immediate values, icopy and iswap, are constructed from the 2-bit ih field and from the 6-bit icopya and iswapa fields. The specified operation is performed on these operands. The result is placed into general register rd/

An exemplary embodiment of the Crossbar Swizzle instruction is shown in FIGS. 92A-92C.

Crossbar Ternary

These operations take three values from general registers, perform a group of calculations on partitions of bits of the operands and place the catenated results in a fourth general register.

The contents of general registers rd, rc, and rb are fetched. The specified operation is performed on these operands. The result is placed into general register ra.

Figure 93B:
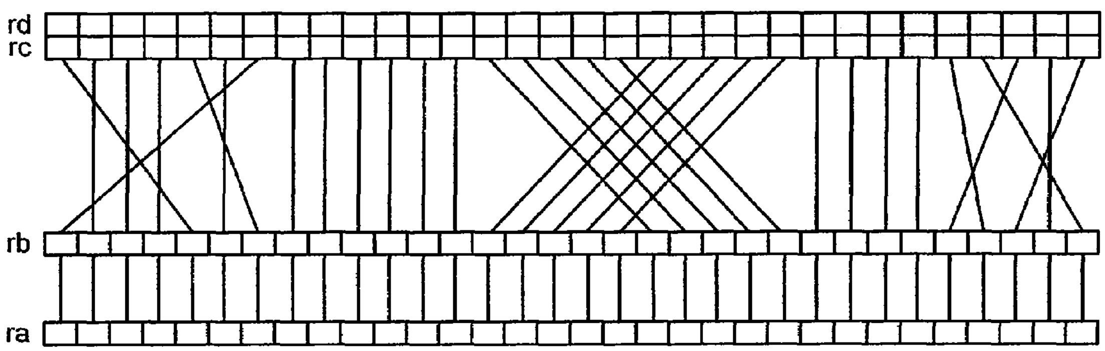

Referring to FIG. 93B, the crossbar select bytes instruction (X.SELECT.8) takes the catenation of the contents of general registers rd and rc (as c||d) as one operand, and the contents of general register rb as a second operand. Each operand is partitioned into bytes, and the low-order 5 bits of bytes of the second operand are used to select bytes of the first operand, numbered in little-endian ordering. The selected bytes are catenated to form a 128-bit result, which is placed in general register ra. The contents of the high-order 3 bits of each byte of general register rb is ignored.

An exemplary embodiment of the Crossbar Ternary instruction is shown in FIGS. 93A-93D.

Ensemble Extract Immediate

These operations take operands from two general registers and a short immediate value, perform operations on partitions of bits in the operands, and place the concatenated results in a third general register.

For the E.EXTRACT.I instruction, the contents of general registers rc and rb are catenated (as b||c) and partitioned into operands of twice the size specified. The group of values is rounded, limited and extracted as specified, yielding a group of results, each of which is the size specified. The group of results is catenated and placed in general register rd. The results are signed or unsigned as specified, N (nearest) rounding is used, and all results are limited to maximum representable signed or unsigned values.

For the E.MUL.X.I instruction, the contents of general registers rc and rb are partitioned into groups of operands of the size specified and are multiplied, producing a group of values. The group of values is rounded, limited and extracted as specified, yielding a group of results that is the size specified. The group of results is catenated and placed in general register rd. All results are signed, N (nearest) rounding is used, and all results are limited to maximum representable signed values.

Figure 94B:
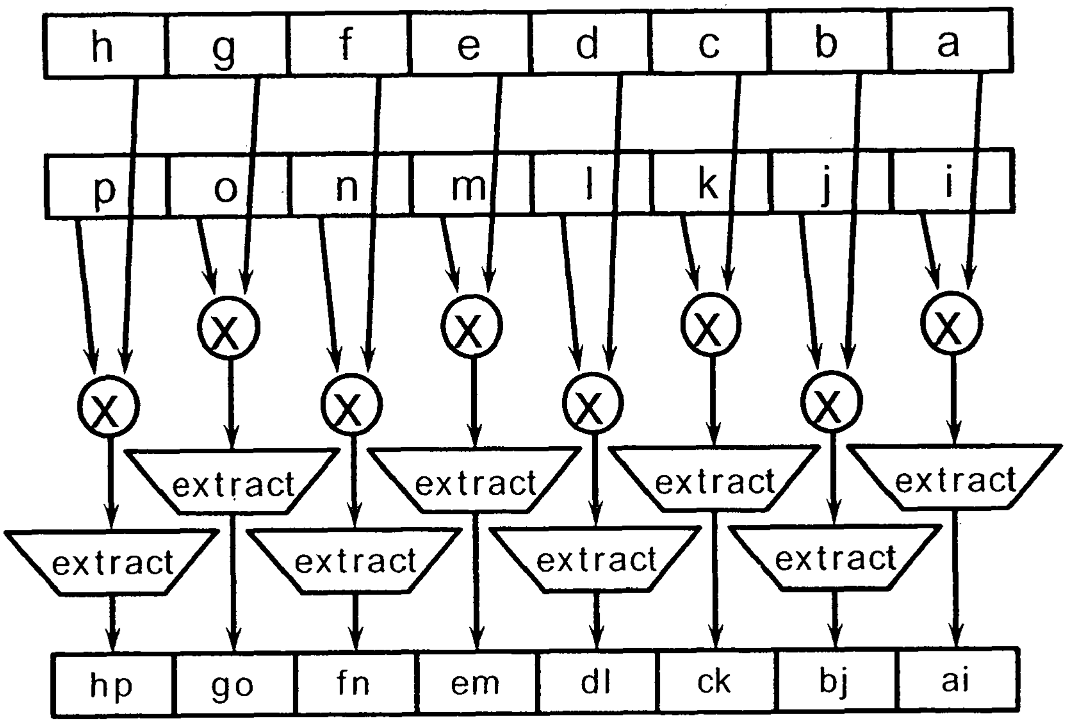

Referring to FIG. 94B, an ensemble multiply extract immediate doublets instruction (E.MUL.X.I.16) multiplies operand [h g f e d c b a] by operand [p o n m l k j i], yielding the products [hp go fn em dl ck bj ai], rounded and limited as specified.

Figure 94C:
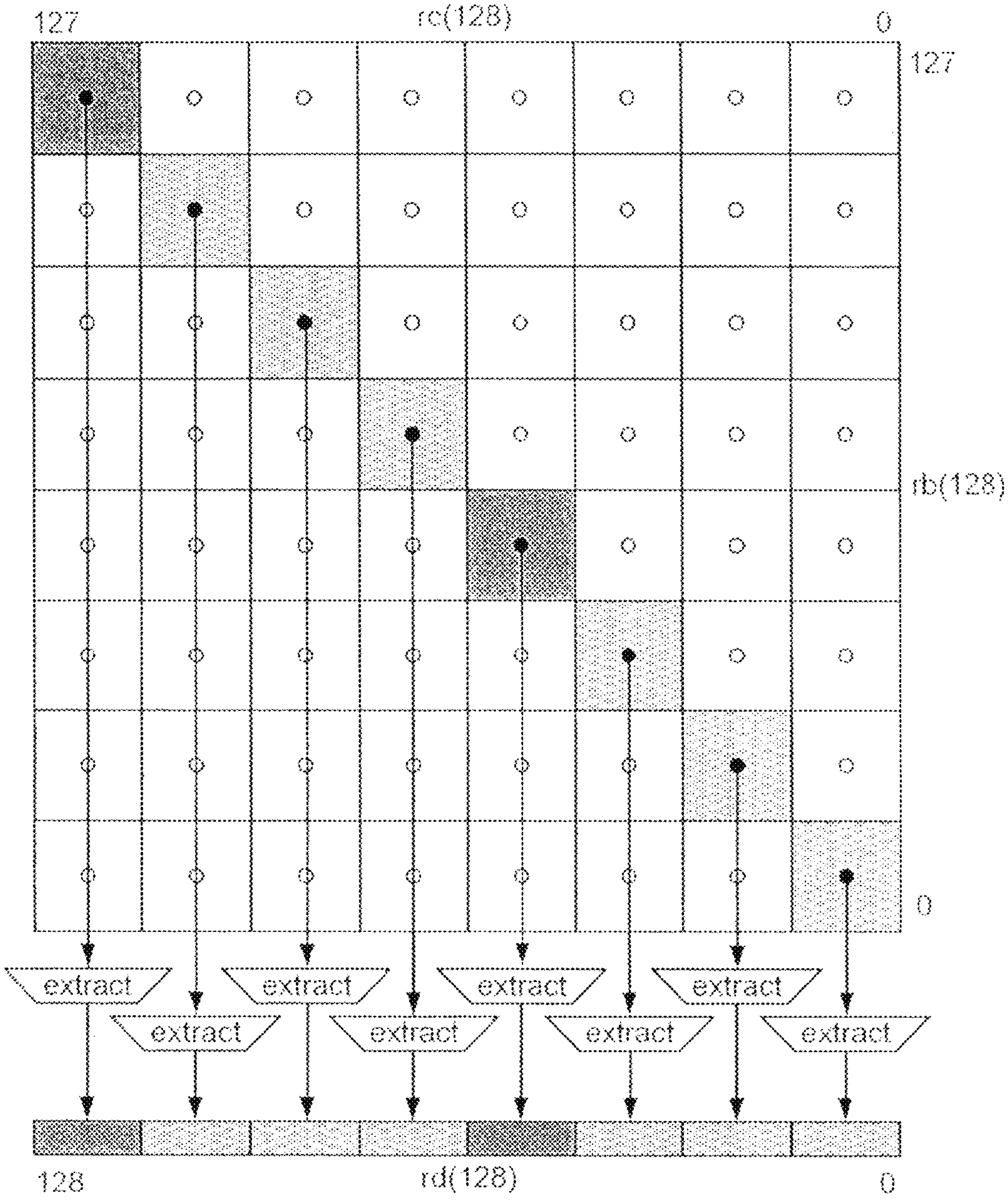
Figure 94D:
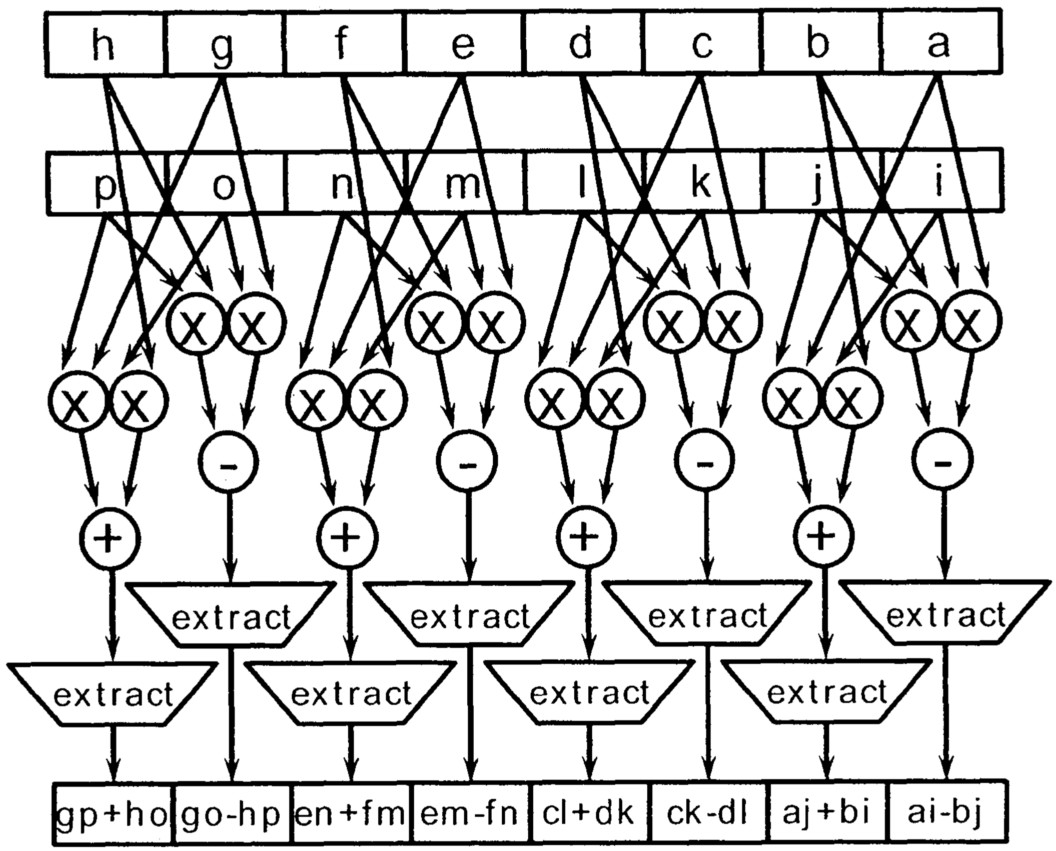

Referring to FIG. 94C, another illustration of ensemble multiply extract immediate doublets instruction (E.MUL.X.I.16):

Referring to FIG. 94D, an ensemble multiply extract immediate complex doublets instruction (E.MUL.X.I.C.16) multiplies operand [h g f e d c b a] by operand [p o n m l k j i], yielding the result [gp+ho go−hp en+fm em−fn cl+dk ck−dl aj+bi ai−bj], rounded and limited as specified. Note that this instruction prefers an organization of complex numbers in which the real part is located to the right (lower precision) of the imaginary part.

Figure 94E:
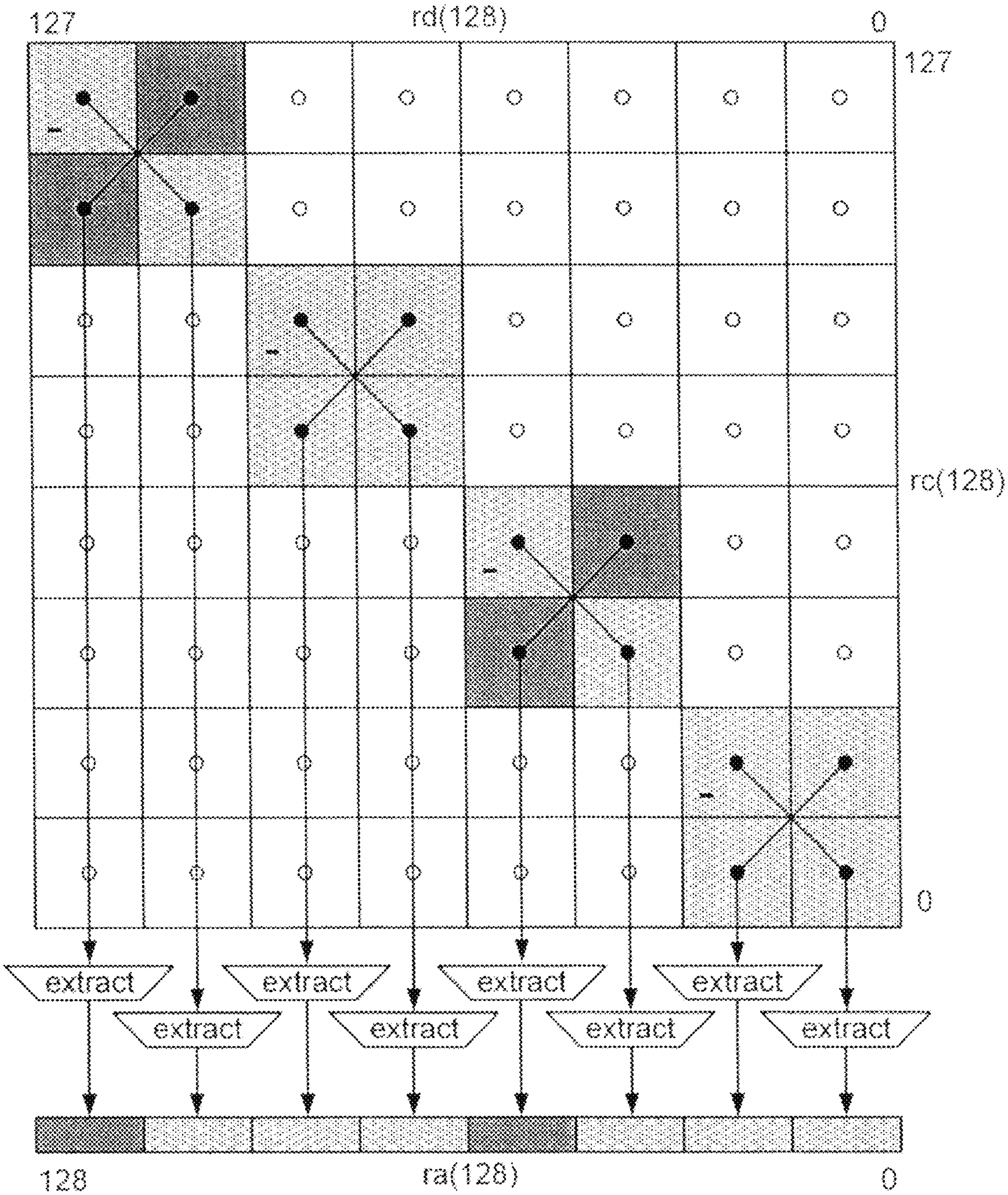

Referring to FIG. 94E, another illustration of ensemble multiply extract immediate complex doublets instruction (E.MUL.X.I.C.16).

An exemplary embodiment of the Ensemble Extract Immediate instruction is shown in FIGS. 94A-94G.

Ensemble Extract Immediate Inplace

These operations take operands from three general registers and a short immediate value, perform operations on partitions of bits in the operands, and place the catenated results in the third general register.

The contents of general registers rd, rc, and rb are fetched. The specified operation is performed on these operands. The result is placed into general register rd.

For the E.CON.X.I instruction, the contents of general registers rd and rc are catenated, as c||d, and used as a first value. A second value is the contents of general register rb. The values are partitioned into groups of operands of the size specified and are convolved, producing a group of values. The group of values is rounded, and limited as specified, yielding a group of results that is the size specified. The group of results is catenated and placed in general register rd.

For the E.MUL.ADD.X.I instruction, the contents of general registers rc and rb are partitioned into groups of operands of the size specified and are multiplied, producing a group of values to which are added the partitioned and extended contents of general register rd. The group of values is rounded, limited and extracted as specified, yielding a group of results that is the size specified. The group of results is catenated and placed in general register rd.

All results are signed, N (nearest) rounding is used, and all results are limited to maximum representable signed values for all instructions of this class.

For the E.CON.X.I instruction, the order in which the contents of general registers rd and rc are catenated is significant because the contents of general register rd is overwritten. The contents are catenated so that the contents of general register rc is most significant (left) and the contents of general register rd is least significant (right). This order is favorable for small convolution (FIR) filters using little-endian operand ordering where the filter coefficients are no more than 128 bits, as the contents of general register rc can be reused as the contents of general register rd by a subsequent E.CON.XI instruction to compute the next sequential vector result.

Figure 95B:
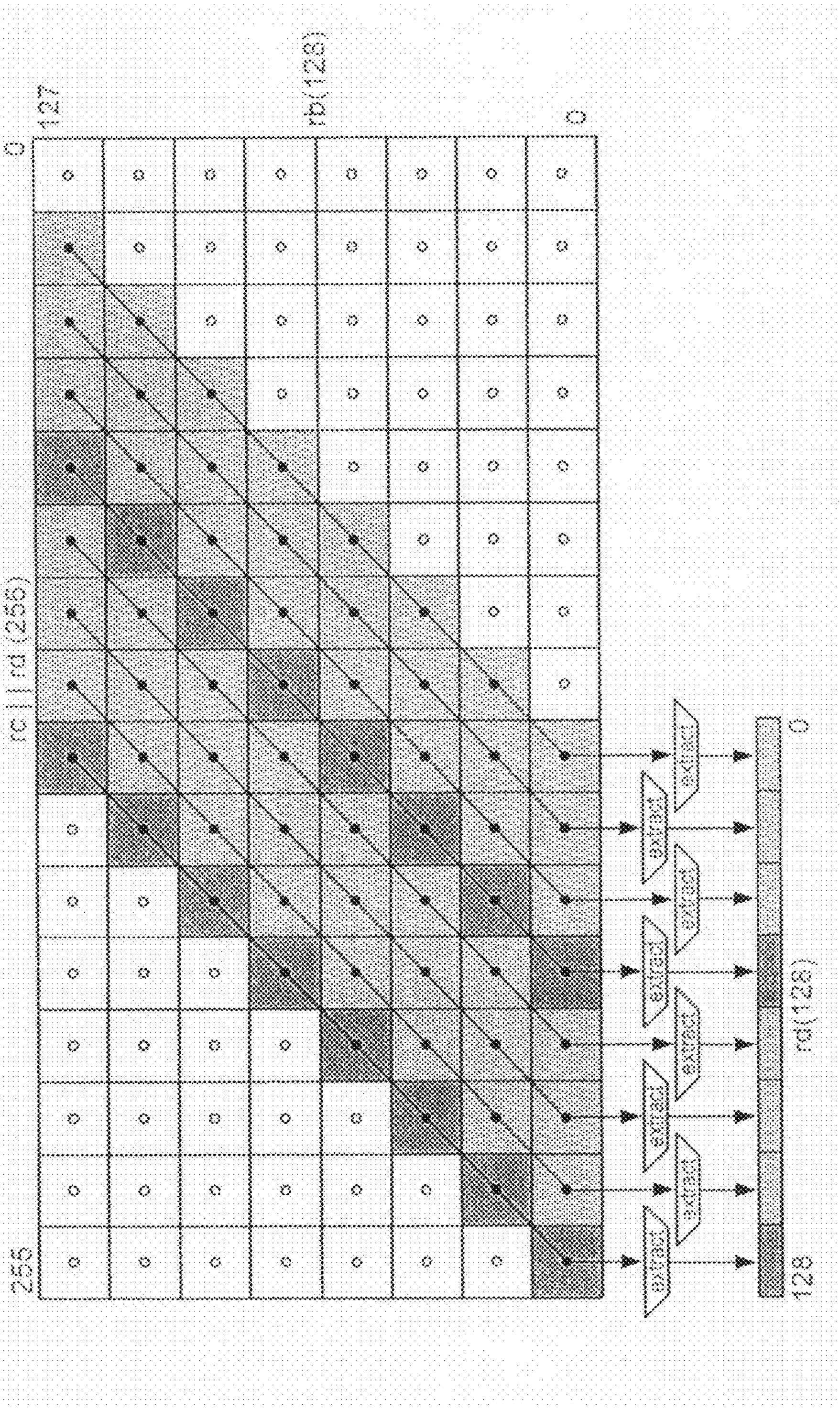

Referring to FIG. 95B, an ensemble-convolve-extract-immediate-doublets instruction (ECON.X.I.16, ECON.X.I.M16, or ECON.X.I.U16) convolves vector [x w v u t s r q p o n m l k j i] with vector [h g f e d c b a], yielding the products [ax+bw+cv+du+et+fs+gr+hq . . . as+br+cq+dp+eo+ fn+gm+hl ar+bq+cp+do+en+fm+gl+hk aq+bp+co+dn+em+fl+gk+hj], rounded and limited as specified.

Note that because the contents of general register rd is overwritten by the result vector, that the input vector rc||rd is catenated with the contents of general register rd on the right, which is a form that is favorable for performing a small convolution (FIR) filter (only 128 bits of filter coefficients) on a little-endian data structure. (The contents of general register rc can be reused as the contents of general register rd by a second E.CON.X instruction that produces the next sequential vector result.)

Figure 95C:
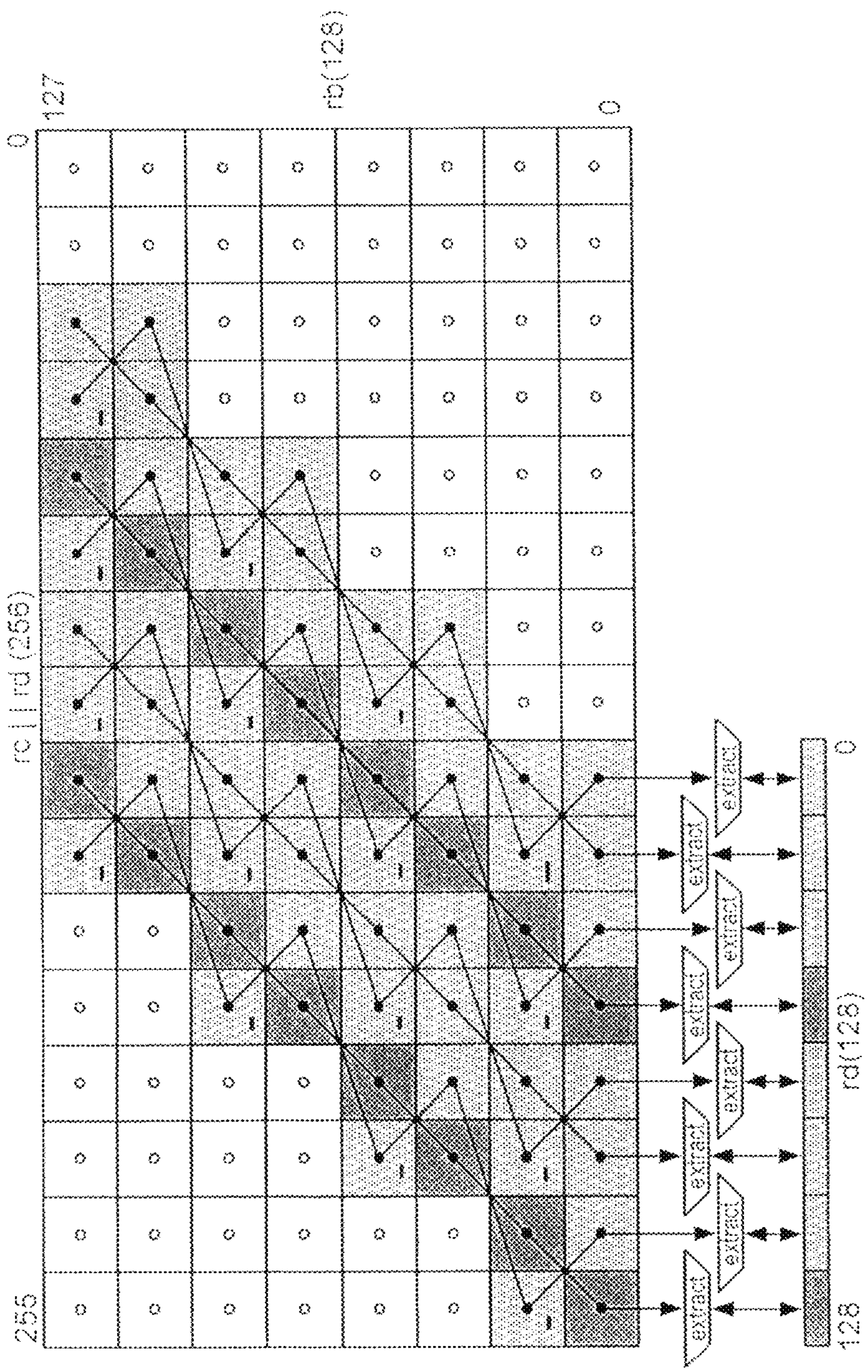

Referring to FIG. 95C, an ensemble-convolve-extract-immediate-complex-doublets instruction (ECON.X.I.C16) convolves vector [x w v u t s r q p o n m l k j i] with vector [h g f e d c b a], yielding the products [ax+bw+cv+du+et+fs+gr+hq . . . as−bt+cq−dr+eo−fp+gm−hn ar+bq+cp+do+en+fm+gl+hk aq−br+co−dp+em−fn+gk+hl], rounded and limited as specified.

Note that general register rd is overwritten, which favors a little-endian data representation as above. Further, the operation expects that the complex values are paired so that the real part is located in a less-significant (to the right of) position and the imaginary part is located in a more-significant (to the left of) position, which is also consistent with conventional little-endian data representation.

Figure 95D:
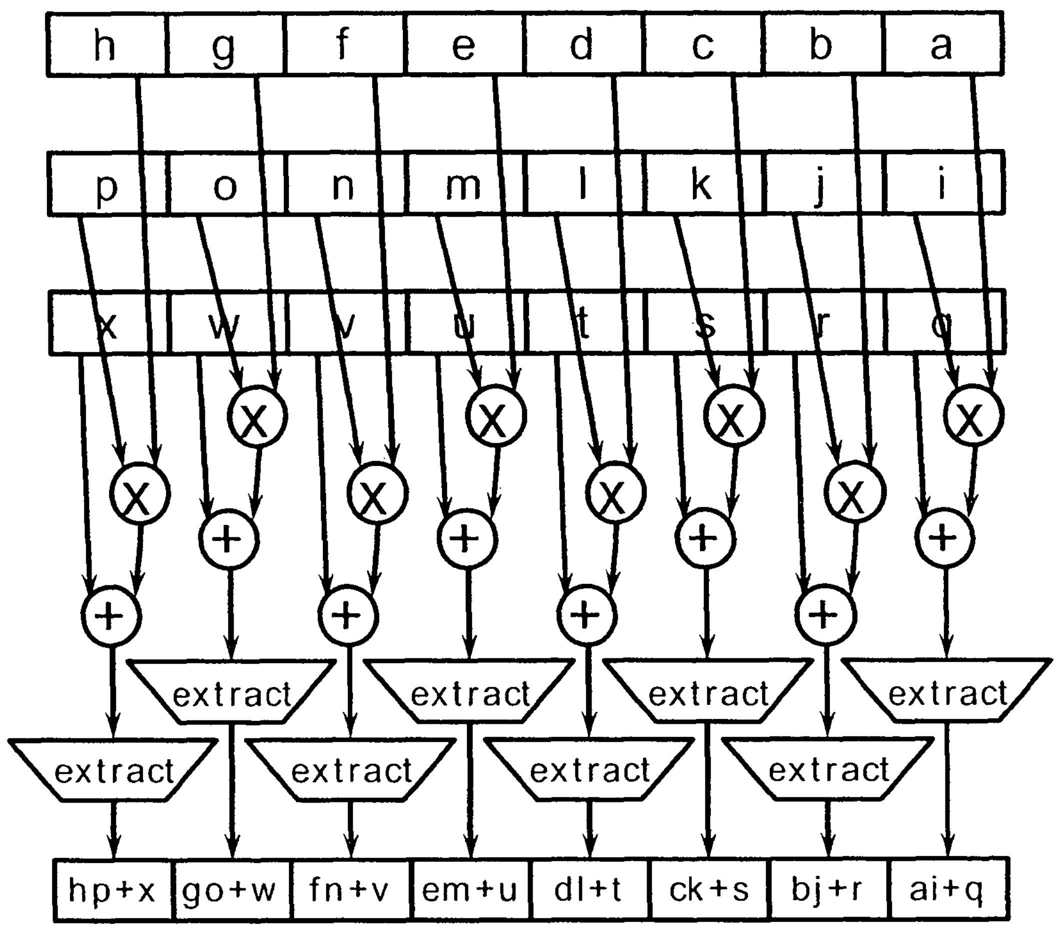

Referring to FIG. 95D, an ensemble multiply add extract immediate doublets instruction (E.MUL.ADD.X.I.16) multiplies operand [h g f e d c b a] by operand [p o n m l k j i], then adding [x w v u t s r q], yielding the products [hp+x go+w fn+v em+u dl+t ck+s bj+r ai+q], rounded and limited as specified.

Figure 95E:
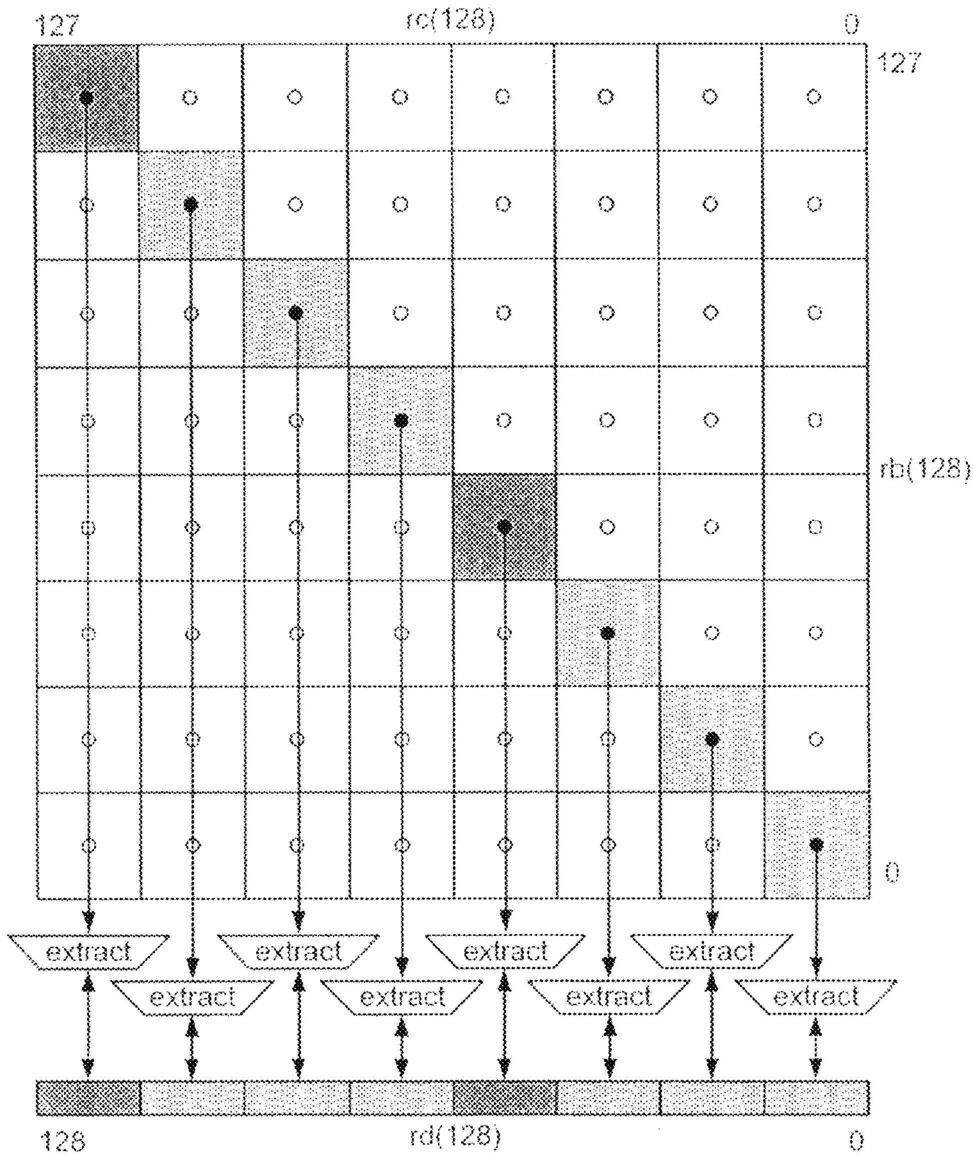

Referring to FIG. 95E, another illustration of ensemble multiply add extract immediate doublets instruction (E.MUL.ADDXI.16).

Figure 95F:
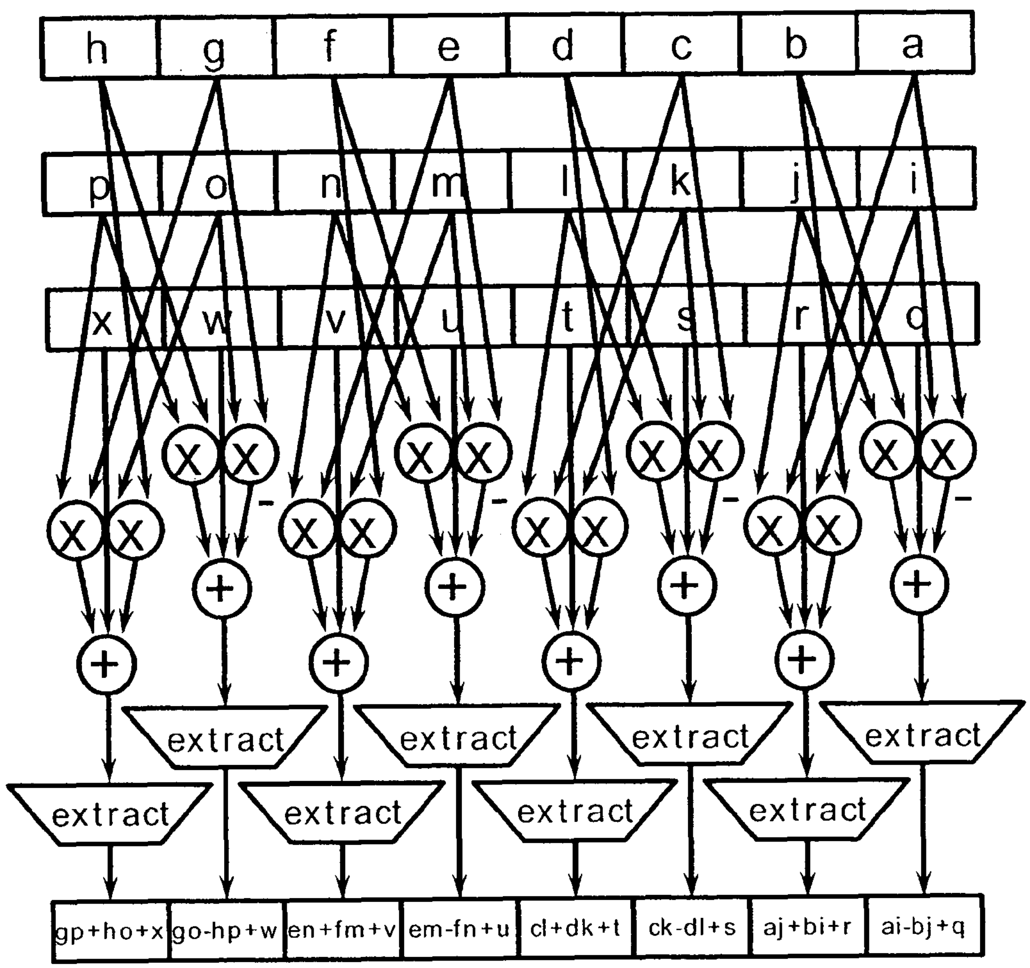

Referring to FIG. 95F, an ensemble multiply add extract immediate complex doublets instruction (E.MUL.ADD.X.I.C.16) multiplies operand [h g f e d c b a] by operand [p o n m l k j i], then adding [x w v u t s r q], yielding the result [gp+ho+x go−hp+w en+fm+v em−fn+u cl+dk+t ck−dl+s aj+bi+r ai−bj+q], rounded and limited as specified. Note that this instruction prefers an organization of complex numbers in which the real part is located to the right (lower precision) of the imaginary part.

Figure 95G:
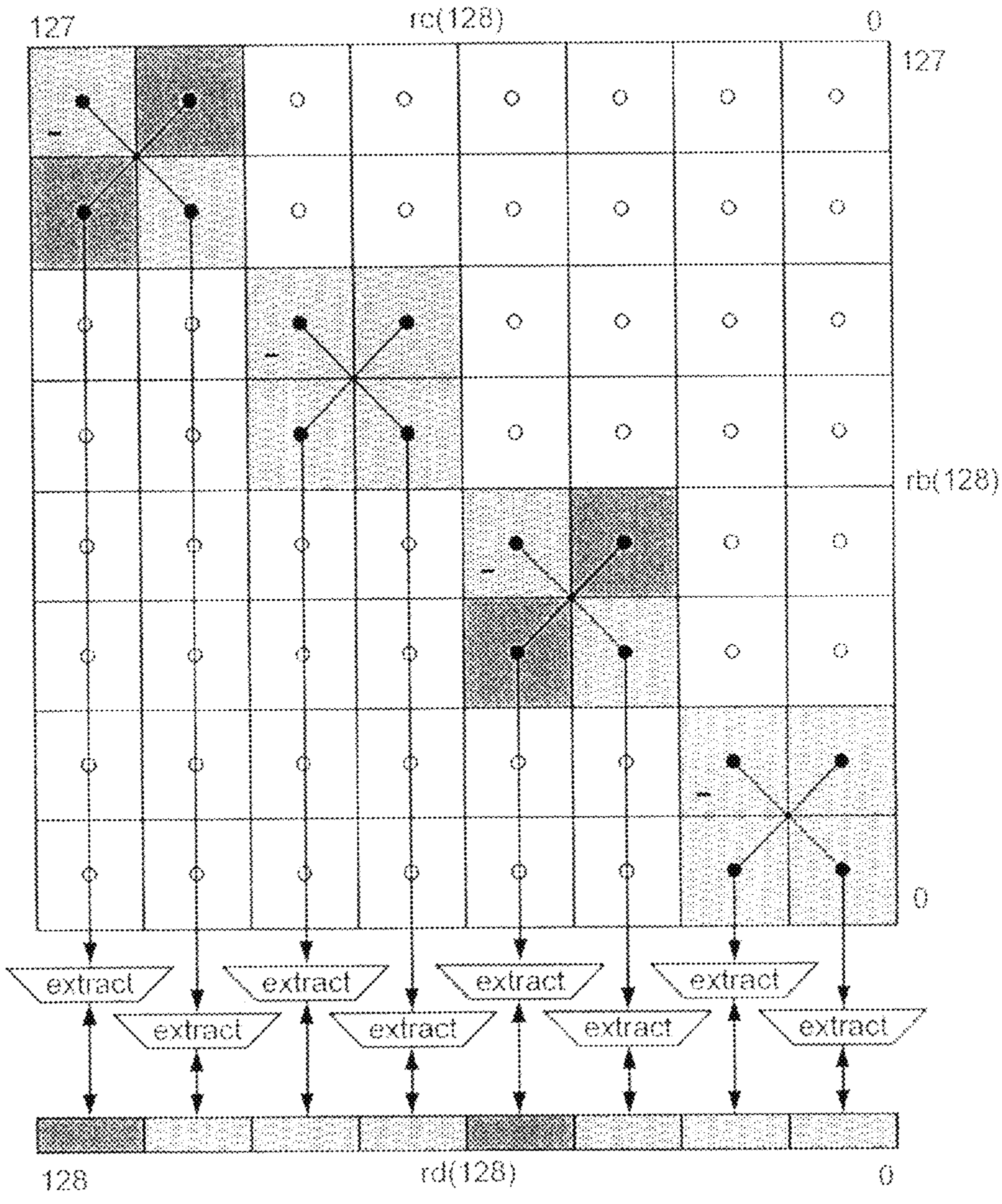

Referring to FIG. 95G, another illustration of ensemble multiply add extract immediate complex doublets instruction (E.MUL.ADD.X.I.C.16).

Ensemble Inplace

These operations take operands from three general registers, perform operations on partitions of bits in the operands, and place the concatenated results in the third general register.

The contents of general registers rd, rc and rb are fetched. The specified operation is performed on these operands. The result is placed into general register rd.

An exemplary embodiment of the Ensemble Inplace instruction is shown in FIGS. 95A-95I.

Ensemble Inplace Floating-Point

These operations take operands from three general registers, perform operations on partitions of bits in the operands, and place the catenated results in the third general register.

The contents of general registers rd, rc and rb are fetched. The specified operation is performed on these operands. The result is placed into general register rd.

General register rd is both a source and destination of this instruction.

For E.CON instructions, a first value is the catenation of the contents of general register rc and rd. A second value is the contents of general register rb. The values are partitioned into groups of operands of the size specified. The second values are multiplied with the first values, then summed, producing a group of result values. The results are rounded to the nearest representable floating-point value in a single floating-point operation. Floating-point exceptions are not raised, and are handled according to the default rules of IEEE 754. The group of result values is catenated and placed in general register rd.

For E.MUL.ADD instructions, a first and second value are the contents of general register rc and rb. A third value is the contents of general register rd. The values are partitioned into groups of operands of the size specified. The second values are multiplied with the first values, then added to or subtracted from the third values, producing a group of result values. The operation is rounded using the specified rounding option or using round-to-nearest if not specified. If a rounding option is specified, unless default exception handling is specified, the operation raises a floating-point exception if a floating-point invalid operation, overflow, or underflow occurs, or when specified, if the result is inexact. If a rounding option is not specified or if default exception handling is specified, floating-point exceptions are not raised, and are handled according to the default rules of IEEE 754. The group of result values is catenated and placed in general register rd.

For E.MUL.SUB instructions, a first and second value are the contents of general register rc and rb. A third value is the contents of general register rd. The values are partitioned into groups of operands of the size specified. The second values are multiplied with the first values, then added to or subtracted from the third values, producing a group of result values. The results are rounded to the nearest representable floating-point value in a single floating-point operation. Floating-point exceptions are not raised, and are handled according to the default rules of IEEE 754. The group of result values is catenated and placed in general register rd.

Figure 96B:
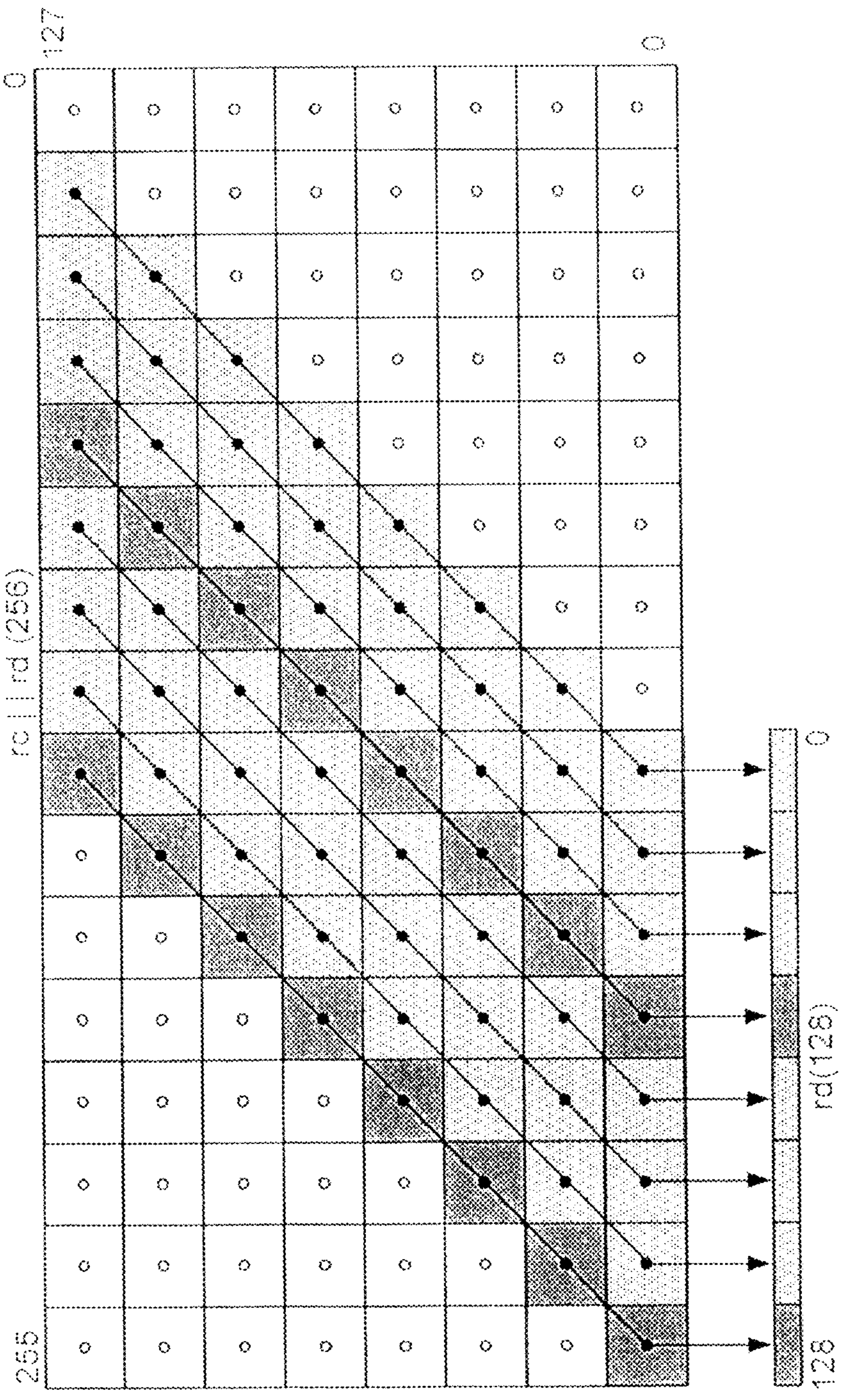

Referring to FIG. 96B, an ensemble-convolve-floating-point-half instruction (E.CON.F.16) convolves vector [x w v u t s r q p o n m l k j i] with vector [h g f e d c b a], yielding the products [ax+bw+cv+du+et+fs+gr+hq . . . as+br+cq+dp+eo+fn+gm+hl ar+bq+cp+do+en+fm+gl+hk aq+bp+co+dn+em+fl+gk+hj].

Note that because the contents of general register rd is overwritten by the result vector, that the input vector rc||rd is catenated with the contents of general register rd on the right, which is a form that is favorable for performing a small convolution (FIR) filter (only 128 bits of filter coefficients) on a little-endian data structure. (The contents of general register rc can be reused by a second E.CON.X instruction that produces the next sequential vector result.)

Figure 96C:
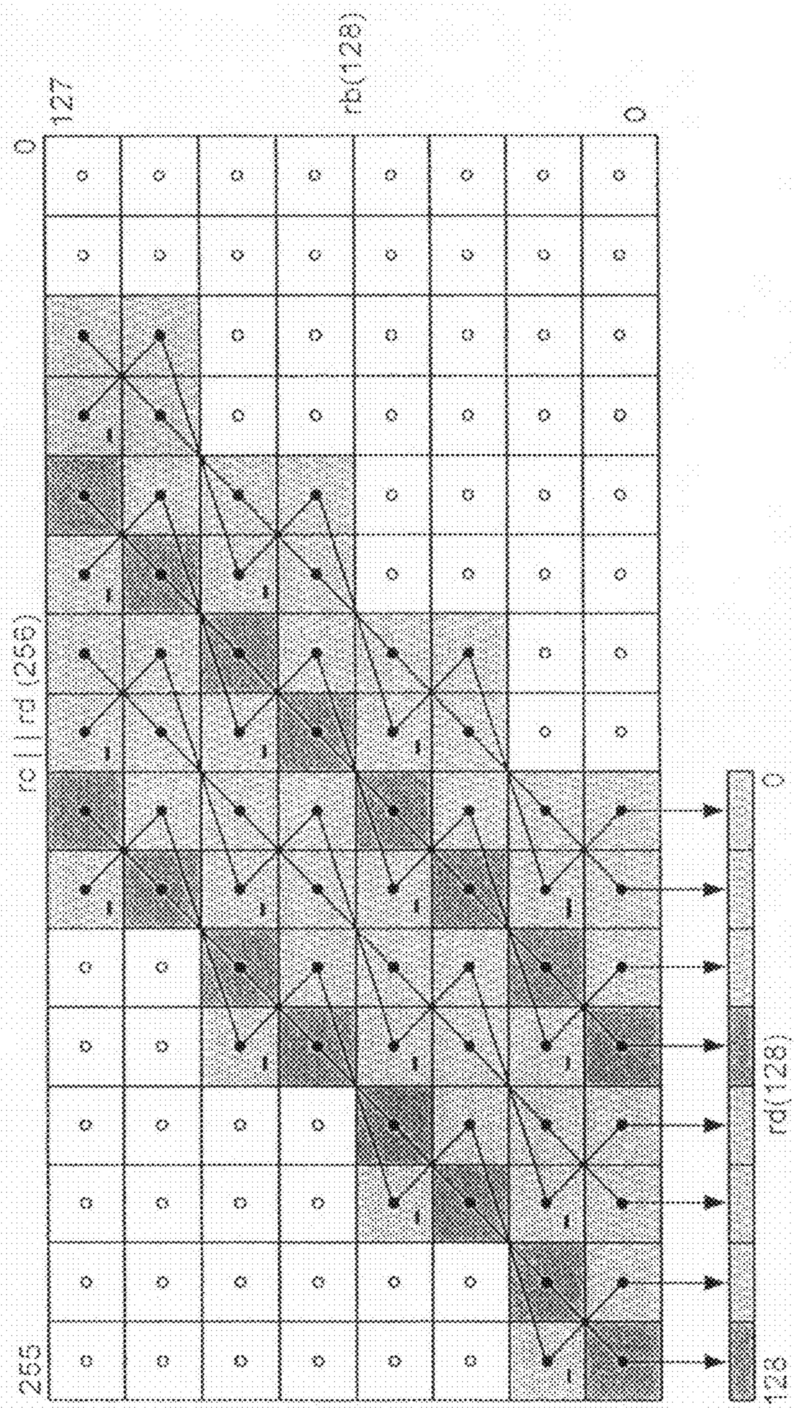

Referring to FIG. 96C, an ensemble-convolve-complex-floating-point-half instruction (E.CON.C.F.16) convolves vector [x w v u t s r q p o n m l k j i] with vector [h g f e d c b a], yielding the products [ax+bw+cv+du+et+fs+gr+hq . . . as−bt+cq−dr+eo−fp+gm−hn ar+bq+cp+do+en+fm+gl+hk aq−br+co−dp+em−fn+gk+hl].

Note that general register rd is overwritten, which favors a little-endian data representation as above. Further, the operation expects that the complex values are paired so that the real part is located in a less-significant (to the right of) position and the imaginary part is located in a more-significant (to the left of) position, which is also consistent with conventional little-endian data representation.

An exemplary embodiment of the Ensemble Inplace Floating-point instruction is shown in FIGS. 96A-96E.

Ensemble Ternary

These operations take three values from general registers, perform a group of calculations on partitions of bits of the operands and place the catenated results in a fourth general register.

The contents of general registers rd, rc, and rb are fetched. The specified operation is performed on these operands. The result is placed into general register ra.

The contents of general registers rd and rc are partitioned into groups of operands of the size specified and multiplied in the manner of polynomials. The group of values is reduced modulo the polynomial specified by the contents of general register rb, yielding a group of results, each of which is the size specified. The group of results is catenated and placed in general register ra.

EXAMPLE

Figure 97B:
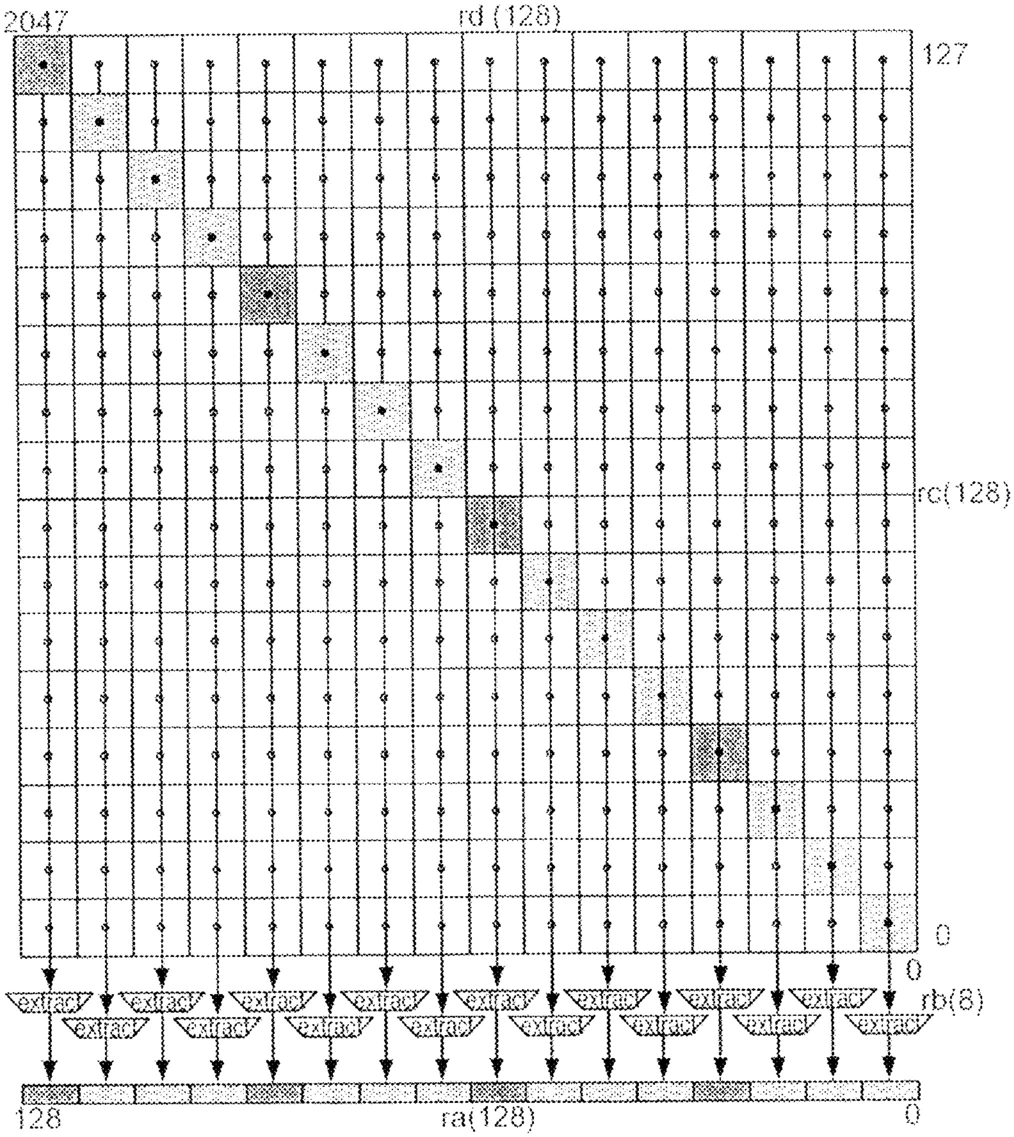

Referring to FIG. 97B, an ensemble-multiply-Galois-field-bytes instruction (E.MULG.8) multiplies operand [d15 d14 d13 d12 d11 d10 d9 d8 d7 d6 d5 d4 d3 d2 d1 d0] by operand [c15 c14 c13 c12 c11 c10 c9 c8 c7 c6 c5 c4 c3 c2 c1 c0], modulo polynomial [b], yielding the results [(d15c15 mod b) (d14c14 mod b) . . . (d0c0 mod b).

An exemplary embodiment of the Ensemble Ternary instruction is shown in FIGS. 97A-97D.

Ensemble Unary

These operations take operands from a general register, perform operations on partitions of bits in the operand, and place the concatenated results in a second general register.

Values are taken from the contents of general register rc. The specified operation is performed, and the result is placed in general register rd.

Figure 98A-2:
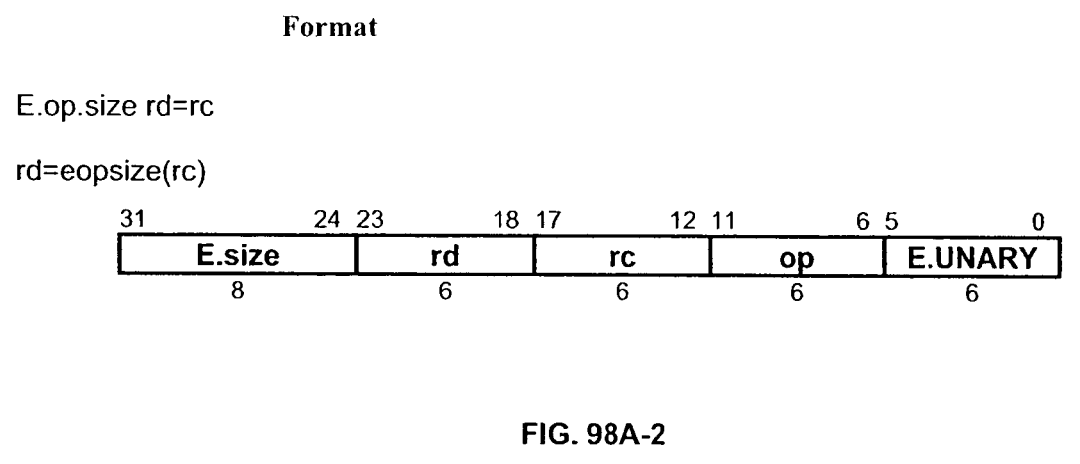

An exemplary embodiment of the Ensemble Unary instruction is shown in FIGS. 98A-98C.

With regards to note 18 number in FIG. 98A, E.SUM.U.1 is encoded as E.SUM.U.128.

With regards to note 19 number in FIG. 98A, E.SUM.U.1 is encoded as E.SUM.U.128.

Ensemble Unary Floating-Point

These operations take one value from a general register, perform a group of floating-point arithmetic operations on partitions of bits in the operands, and place the concatenated results in a general register.

The contents of general register rc is used as the operand of the specified floating-point operation. The result is placed in general register rd.

The operation is rounded using the specified rounding option or using round-to-nearest if not specified. If a rounding option is specified, unless default exception handling is specified, the operation raises a floating-point exception if a floating-point invalid operation, divide by zero, overflow, or underflow occurs, or when specified, if the result is inexact. If a rounding option is not specified or if default exception handling is specified, floating-point exceptions are not raised, and are handled according to the default rules of IEEE 754.

The reciprocal estimate and reciprocal square root estimate instructions compute an exact result for half precision, and a result with at least 12 bits of significant precision for larger formats.

An exemplary embodiment of the Ensemble Unary Floating-point instruction is shown in FIGS. 99A-99C.

Memory Management

This section discusses the caches, the translation mechanisms, the memory interfaces, and how the multiprocessor interface is used to maintain cache coherence.

Overview

The Zeus processor provides for both local and global virtual addressing, arbitrary page sizes, and coherent-cache multiprocessing. The memory management system is designed to provide the requirements for implementation of virtual machines as well as virtual memory.

All facilities of the memory management system are themselves memory mapped, in order to provide for the manipulation of these facilities by high-level language, compiled code.

The translation mechanism is designed to allow full byte-at-a-time control of access to the virtual address space, with the assistance of fast exception handlers.

Privilege levels provide for the secure transition between insecure user code and secure system facilities. Instructions execute with a privilege specified by a two-bit field in the access information. Zero is the least-privileged level, and three is the most-privileged level.

Figure 100:
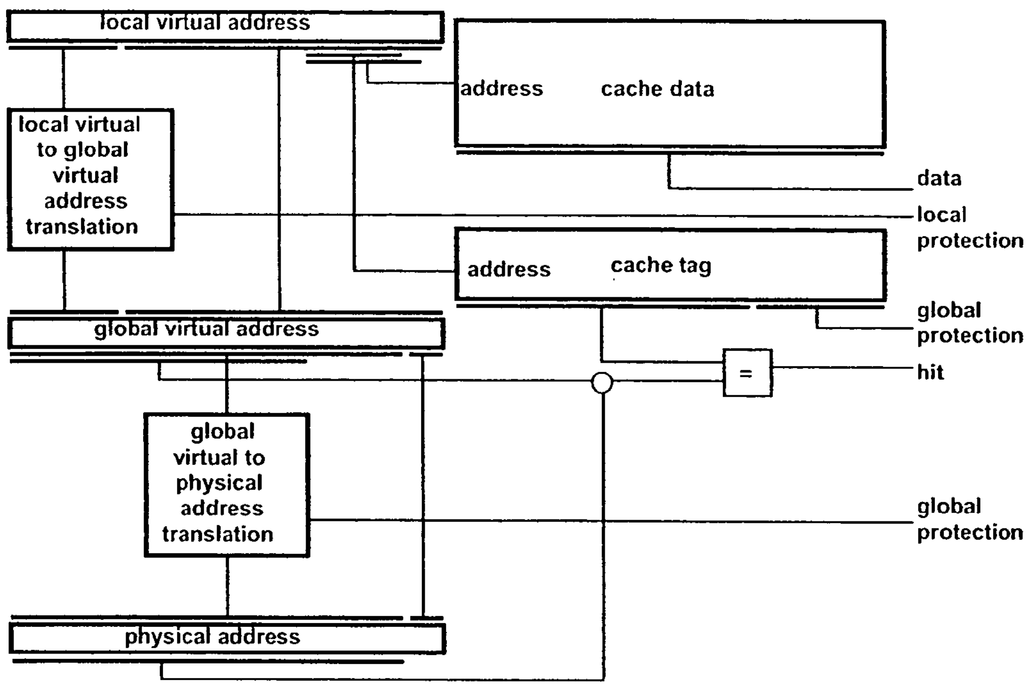
FIG. 100 is a block diagram showing the organization of the memory management system in accordance with an exemplary embodiment of the present invention.

Referring to FIG. 100, the diagram sketches the basic organization of the memory management system.

In general terms, the memory management starts from a local virtual address. The local virtual address is translated to a global virtual address by a LTB (Local Translation Buffer). In turn, the global virtual address is translated to a physical address by a GTB (Global Translation Buffer). One of the addresses, a local virtual address, a global virtual address, or a physical address, is used to index the cache data and cache tag arrays, and one of the addresses is used to check the cache tag array for cache presence. Protection information is assembled from the LTB, GTB, and optionally the cache tag, to determine if the access is legal.

This form varies somewhat, depending on implementation choices made. Because the LTB leaves the lower 48 bits of the address alone, indexing of the cache arrays with the local virtual address is usually identical to cache arrays indexed by the global virtual address. However, indexing cache arrays by the global virtual address rather than the physical address produces a coherence issue if the mapping from global virtual address to physical is many-to-one.

Starting from a local virtual address, the memory management system performs three actions in parallel: the low-order bits of the virtual address are used to directly access the data in the cache, a low-order bit field is used to access the cache tag, and the high-order bits of the virtual address are translated from a local address space to a global virtual address space.

Following these three actions, operations vary depending upon the cache implementation. The cache tag may contain either a physical address and access control information (a physically-tagged cache), or may contain a global virtual address and global protection information (a virtually-tagged cache).

For a physically-tagged cache, the global virtual address is translated to a physical address by the GTB, which generates global protection information. The cache tag is checked against the physical address, to determine a cache hit. In parallel, the local and global protection information is checked.

For a virtually-tagged cache, the cache tag is checked against the global virtual address, to determine a cache hit, and the local and global protection information is checked. If the cache misses, the global virtual address is translated to a physical address by the GTB, which also generates the global protection information.

Local Translation Buffer

The 64-bit global virtual address space is global among all tasks. In a multitask environment, requirements for a task-local address space arise from operations such as the UNIX "fork" function, in which a task is duplicated into parent and child tasks, each now having a unique virtual address space. In addition, when switching tasks, access to one task's address space must be disabled and another task's access enabled.

Zeus provides for portions of the address space to be made local to individual tasks, with a translation to the global virtual space specified by four 16-bit registers for each local virtual space. The registers specify a mask selecting which of the high-order 16 address bits are checked to match a particular value, and if they match, a value with which to modify the virtual address. Zeus avoids setting a fixed page size or local address size; these can be set by software conventions.

A local virtual address space is specified by the following:

| field name | size | description |
|---|---|---|
| lm | 16 | mask to select fields of local virtual address to perform match over |
| la | 16 | value to perform match with masked local virtual address |
| lx | 16 | value to xor with local virtual address if matched |
| lp | 16 | local protection field (detailed later) |

Physical Address

There are as many LTB as threads, and up to $2^3$ (8) entries per LTB. Each entry is 128 bits, with the high order 64 bits reserved. The physical address of a LTB entry for thread th, entry en, byte b is:

| 63 … 24 | 23 … 19 | 18 … 7 | 6 … 4 | 3 … 0 |
|---|---|---|---|---|
| FFFF FFFF 0A00 0000 $_{63..24}$ | th | 0 | en | b |
| 40 | 5 | 12 | 3 | 4 |

Definition

```
def data,flags ← AccessPhysicalLTB(pa,op,wdata) as
        th ← pa23..19
        en ← pa6..4
        if (en < (1 || 0^LE)) and (th < T) and (pa18..6=0) then
                case op of
                        R:
                                data ← 0^64 || LTBArray[th][en]
                        W:
                                LocalTB[th][en] ← wdata63..0
                endcase
        else
                data ← 0
        endif
enddef
```

Entry Format

These 16-bit values are packed together into a 64-bit LTB entry as follows:

| 63 … 48 | 47 … 32 | 31 … 16 | 15 … 0 |
|---|---|---|---|
| lm | la | lx | lp |
| 16 | 16 | 16 | 16 |

The LTB contains a separate context of register sets for each thread, indicated by the th index above. A context consists of one or more sets of lm/la/lx/lp registers, one set for each simultaneously accessible local virtual address range, indicated by the en index above. This set of registers is called the "Local TB context," or LTB (Local Translation Buffer) context. The effect of this mechanism is to provide the facilities normally attributed to segmentation. However, in this system there is no extension of the address range, instead, segments are local nicknames for portions of the global virtual address space.

A failure to match a LTB entry results either in an exception or an access to the global virtual address space, depending on privilege level. A single bit, selected by the privilege level active for the access from a four bit control register field, global access, ga determines the result. If $gap_L$ is zero (0), the failure causes an exception, if it is one (1), the failure causes the address to be directly used as a global virtual address without modification.

Global Access (Fields of Control Register)

| 11 | 10 | 9 | 8 |
|---|---|---|---|
| ga 3 | ga 2 | ga 1 | ga 0 |
| 1 | 1 | 1 | 1 |

Usually, global access is a right conferred to highly privilege levels, so a typical system may be configured with ga0 and ga1 clear (0), but ga2 and ga3 set (1). A single low-privilege (0) task can be safely permitted to have global access, as accesses are further limited by the rwxg privilege fields. A concrete example of this is an emulation task, which may use global addresses to simulate segmentation, such as an x86 emulation. The emulation task then runs as privilege 0, with ga0 set, while most user tasks run as privilege 1, with ga1 clear. Operating system tasks then use privilege 2 and 3 to communicate with and control the user tasks, with ga2 and ga3 set.

For tasks that have global access disabled at their current privilege level, failure to match a LTB entry causes an exception. The exception handler may load an LTB entry and continue execution, thus providing access to an arbitrary number of local virtual address ranges.

When failure to match a LTB entry does not cause an exception, instructions may access any region in the local virtual address space, when a LTB entry matches, and may access regions in the global virtual address space when no LTB entry matches. This mechanism permits privileged code to make judicious use of local virtual address ranges, which simplifies the manner in which privileged code may manipulate the contents of a local virtual address range on behalf of a less-privileged client. Note, however, that under this model, an LTB miss does not cause an exception directly, so the use of more local virtual address ranges than LTB entries requires more care: the local virtual address ranges should be selected so as not to overlap with the global virtual address ranges, and GTB misses to LVA regions must be detected and cause the handler to load an LTB entry.

Each thread has an independent LTB, so that threads may independently define local translation. The size of the LTB for each thread is implementation dependent and defined as the LE parameter in the architecture description register. LE is the log of the number of entries in the local TB per thread; an implementation may define LE to be a minimum of 0, meaning one LTB entry per thread, or a maximum of 3, meaning eight LTB entries per thread. For the initial Zeus implementation, each thread has two entries and LE=1.

A minimum implementation of an LTB context is a single set of lm/la/lx/lp registers per thread. However, the need for the LTB to translate both code addresses and data addresses imposes some limits on the use of the LTB in such systems. We need to be able to guarantee forward progress. With a single LTB set per thread, either the code or the data must use global addresses, or both must use the same local address range, as must the LTB and GTB exception handler. To avoid this restriction, the implementation must be raised to two sets per thread, at least one for code and one for data, to guarantee forward progress for arbitrary use of local addresses in the user code (but still be limited to using global addresses for exception handlers).

A single-set LTB context may be further simplified by reserving the implementation of the lm and la registers, setting them to a read-only zero value: Note that in such a configuration, only a single LA region can be implemented.

| 63 … 32 | 31 … 16 | 15 … 0 |
|---|---|---|
| 0 | lx | lp |
| 16 | 16 | 16 |

If the largest possible space is reserved for an address space identifier, the virtual address is partitioned as shown below. Any of the bits marked as "local" below may be used as "offset" as desired.

| 63 … 48 | 47 … 0 |
|---|---|
| local | offset |
| 16 | 48 |

To improve performance, an implementation may perform the LTB translation on the value of the base general register (rc) or unincremented program counter, provided that a check is performed which prohibits changing the unmasked upper 16 bits by the add or increment. If this optimization is provided and the check fails, an OperandBoundary should be signaled. If this optimization is provided, the architecture description parameter LB=1. Otherwise LTB translation is performed on the local address, la, no checking is required, and LB=0.

The LTB protect field controls the minimum privilege level required for each memory action of read (r), write (w), execute (x), and gateway (g), as well as memory and cache attributes of cache control (cc), strong ordering (so), and detail access (da). These fields are combined with corresponding bits in the GTB protect field to control these attributes for the mapped memory region.

lp0:

| 7 | 6 | 5 | 4 | 3 | 2 … 0 |
|---|---|---|---|---|---|
| 0 | 0 | 0 | da | so | cc |
| 1 | 1 | 1 | 1 | 1 | 3 |

lp1:

| 15 … 14 | 13 … 12 | 11 … 10 | 9 … 8 |
|---|---|---|---|
| g | x | w | r |
| 2 | 2 | 2 | 2 |

Field Description

The meaning of the fields are given by the following table:

| name | size | meaning |
|---|---|---|
| g | 2 | minimum privilege required for gateway access |
| x | 2 | minimum privilege required for execute access |
| w | 2 | minimum privilege required for write access |
| r | 2 | minimum privilege required for read access |

-continued

| name | size | meaning |
|---|---|---|
| 0 | 1 | reserved |
| da | 1 | detail access |
| so | 1 | strong ordering |
| cc | 3 | cache control |

Definition

```
def ga,LocalProtect ← LocalTranslation(th,ba,la,pl) as
    if LB & (ba63..48 ≠ la63..48) then
        raise OperandBoundary
    endif
    me ← NONE
    for i ← 0 to (1 || 0^LE)−1
        if (la63..48 & ~LocalTB[th][i]63..48) = LocalTB[th][i]47..32
        then
            me ← i
        endif
    endfor
    if me = NONE then
        if ~ControlRegister_pl+8 then
            raise LocalTBMiss
        endif
        ga ← la
        LocalProtect ← 0
    else
        ga ← (la63..48 ^ LocalTB[th][me]31..16) || la47..0
        LocalProtect ← LocalTB[th][me]15..0
    endif
enddef
```

Global Translation Buffer

Global virtual addresses which fail to be accessed in either the LZC, the MTB, the BTB, or PTB are translated to physical references in a table, here named the "Global Translation Buffer," (GTB).

Each processor may have one or more GTB's, with each GTB shared by one or more threads. The parameter GT, the base-two log of the number of threads which share a GTB, and the parameter T, the number of threads, allow computation of the number of GTBs ($T/2^{GT}$), and the number of threads which share each GTB ($2^{GT}$).

If there are two GTBs and four threads (GT=1, T=4), GTB 0 services references from threads 0 and 1, and GTB 1 services references from threads 2 and 3.

In the first implementation, there is one GTB, shared by all four threads (GT=2, T=4). The GTB has 128 entries (G=7).

Per clock cycle, each GTB can translate one global virtual address to a physical address, yielding protection information as a side effect.

A GTB miss causes a software trap. This trap is designed to permit a fast handler for GlobalTBMiss to be written in software, by permitting a second GTB miss to occur as an exception, rather than a machine check.

Physical Address

There may be as many GTB as threads, and up to $2^{15}$ entries per GTB. The physical address of a GTB entry for thread th, entry en, byte b is:

| 63 … 24 | 23 … 19 | 18 … 4 | 3 … 0 |
|---|---|---|---|
| FFFF FFFF 0C00 0000 $_{63..24}$ | th | en | b |
| 40 | 5 | 15 | 4 |

Note that in the diagram above, the low-order GT bits of the th value are ignored, reflecting that $2^{GT}$ threads share a single GTB. A single GTB shared between threads appears multiple times in the address space. GTB entries are packed together so that entries in a GTB are consecutive:

Definition

```
def data,flags ← AccessPhysicalGTB(pa,op,wdata) as
        th ← pa_{23..19+GT} || 0^{GT}
        en ← pa_{18..4}
        if (en < (1 || 0^G)) and (th < T) and (pa_{18+GT..19} = 0) then
                case op of
                        R:
                                data ← GTBArray[th_{5..GT}][en]
                        W:
                                GTBArray[th_{5..GT}][en] ← wdata
                endcase
        else
                data ← 0
        endif
enddef
```

Entry Format

Each GTB entry is 128 bits. The format of a GTB entry is:

| 63 … 7 | 6 … 0 |
|---|---|
| gs | gp0 |
| 57 | 7 |

| 127 … 72 | 71 … 64 |
|---|---|
| px | gp1 |
| 40 | 8 |

gp0:

| 6 | 5 | 4 | 3 | 2 … 0 |
|---|---|---|---|---|
| 0 | 0 | da | so | cc |
| 1 | 1 | 1 | 1 | 3 |

gp1:

| 71 … 70 | 69 … 68 | 67 … 66 | 65 … 64 |
|---|---|---|---|
| g | x | w | r |
| 2 | 2 | 2 | 2 |

Field Description gs=ga+size/2: $256 \leqq size \leqq 2^{64}$, ga, global address, is aligned (a multiple of) size.

px=pa^ga. pa, ga, and px are all aligned (a multiple of) size

The meaning of the fields are given by the following table:

| name | size | meaning |
|---|---|---|
| gs | 57 | global address with size |
| px | 56 | physical xor |
| g | 2 | minimum privilege required for gateway access |
| x | 2 | minimum privilege required for execute access |
| w | 2 | minimum privilege required for write access |
| r | 2 | minimum privilege required for read access |
| 0 | 1 | reserved |
| da | 1 | detail access |
| so | 1 | strong ordering |
| cc | 3 | cache control |

If the entire contents of the GTB entry is zero (0), the entry will not match any global address at all. If a zero value is written, a zero value is read for the GTB entry. Software must not write a zero value for the gs field unless the entire entry is a zero value.

It is an error to write GTB entries that multiply match any global address; all GTB entries must have unique, non-overlapping coverage of the global address space. Hardware may produce a machine check if such overlapping coverage is detected, or may produce any physical address and protection information and continue execution.

Limiting the GTB entry size to 128 bits allows up to replace entries atomically (with a single store operation), which is less complex than the previous design, in which the mask portion was first reduced, then other entries changed, then the mask is expanded. However, it is limiting the amount of attribute information or physical address range we can specify. Consequently, we are encoding the size as a single additional bit to the global address in order to allow for attribute information.

Definition

```
def pa,GlobalProtect ← GlobalAddressTranslation(th,ga,pl,lda) as
    me ← NONE
    for i ← 0 to (1 || 0^G) −1
        if GlobalTB[th_{5..GT}][i] ≠ 0 then
            size ← (GlobalTB[th_{5..GT}][i]_{63..7} and
            (0^{64}−GlobalTB(th_{5..GT}][i]_{63..7})) || 0^8
            if ((ga_{63..8}||0^8) ^ (GlobalTB[th_{5..GT}][i]_{63..8}||0^8))
            and (0^{64}−size)) = 0 then
                me ← GlobalTB[th_{5..GT}][i]
            endif
        endif
    endfor
    if me = NONE then
        if lda then
            PerformAccessDetail(AccessDetailRequiredByLocalTB)
        endif
        raise GlobalTBMiss
    else
        pa ← (ga_{63..8} ^ GlobalTB[th_{5..GT}][me]_{127..72}) || ga_{7..0}
        GlobalProtect ← GlobalTB[th_{5..GT}][me]_{71..64} || 0^1 ||
        GlobalTB[th_{5..GT}][me]_{6..0}
    endif
enddef
```

GTB Registers memory exceptions, it is possible for two threads to nearly simultaneously invoke software GTB miss exception handlers for the same memory region. In order to avoid producing improper GTB state in such cases, the GTB includes access facilities for indivisibly checking and then updating the contents of the GTB as a result of a memory write to specific addresses.

A 128-bit write to the address GTBUpdateFill (fill=1), as a side effect, causes first a check of the global address specified in the data against the GTB. If the global address check results in a match, the data is directed to write on the matching entry. If there is no match, the address specified by GTBLast is used, and GTBLast is incremented. If incrementing GTBLast results in a zero value, GTBLast is reset to GTBFirst, and GTBBump is set. Note that if the size of the updated value is not equal to the size of the matching entry, the global address check may not adequately ensure that no other entries also cover the address range of the updated value. The operation is unpredictable if multiple entries match the global address.

The GTBUpdateFill register is a 128-bit memory-mapped location, to which a write operation performes the operation defined above. A read operation returns a zero value. The format of the GTBUpdateFill register is identical to that of a GTB entry.

An alternative write address, GTBUpdate, (fill=0) updates a matching entry, but makes no change to the GTB if no entry matches. This operation can be used to indivisibly update a GTB entry as to protection or physical address information.

Definition

```
def GTBUpdateWrite(th,fill,data) as
    me ← NONE
    for i ← 0 to (1 || 0^G) −1
        size ← (GlobalTB[th_5..GT][i]_63..7 and
        (0^64−GlobalTB(th_5..GT][i]_63..7)) || 0^8
        if ((data_63..8||0^8) ^ (GlobalTB[th_5..GT][i]_63..8||0^8))
        and (0^64−size) = 0 then
            me ← i
        endif
    endfor
    if me = NONE then
        if fill then
            GlobalTB[th_5..GT][GTBLast[th_5..GT]] ← data
            GTBLast[th_5..GT] ← (GTBLast[th_5..GT] + 1)_G−1..0
            if GTBLast[th_5..GT] = 0 then
                GTBLast[th_5..GT] ← GTBFirst[th_5..GT]
                GTBBump[th_5..GT] ← 1
            endif
        endif
    else
        GlobalTB[th_5..GT][me] ← data
    endif
enddef
```

Physical Address

There may be as many GTB as threads, and up to $2^{11}$ registers per GTB (5 registers are implemented). The physical address of a GTB control register for thread th, register rn, byte b is:

| 63 … 24 | 23 … 19 | 18 … 8 | 7 … 4 | 3 … 0 |
|---|---|---|---|---|
| FFFF FFFF 0D00 0000 $_{63..24}$ | th | rn | 0 | b |
| 40 | 5 | 11 | 4 | 4 |

Note that in the diagram above, the low-order GT bits of the th value are ignored, reflecting that $2^{GT}$ threads share single GTB registers. A single set of GTB registers shared between threads appears multiple times in the address space, and manipulates the GTB of the threads with which the registers are associated.

The GTBUpdate register is a 128-bit memory-mapped location, to which a write operation performes the operation defined above. A read operation returns a zero value. The format of the GTBUpdateFill register is identical to that of a GTB entry.

The registers GTBLast, GTBFirst, and GTBBump are memory mapped. The GTBLast and GTBFirst registers are G bits wide, and the GTBBump register is one bit.:

| 63 … G | G-1 … 0 |
|---|---|
| 0 | GTBLast |
| 48 | G |

| 63 … G | G-1 … 0 |
|---|---|
| 0 | GTBFirst |
| 48 | G |

Definition

-continued

```
def data,flags ← AccessPhysicalGTBRegisters(pa,op,wdata) as
    th ← pa_23..19+GT || 0^GT
    rn ← pa_18..8
    if (rn < 5) and (th < T) and (pa_18+GT..19 = 0) and (pa_7..4 = 0) then
        case rn || op of
            0 || R, 1 || R:
                data ← 0
            0 || W, 1 || W:
                GTBUpdateWrite(th,rn_0,wdata)
            2 || R:
                data ← 0^64−G || GTBLast[th_5..GT]
            2 || W:
                GTBLast[th_5..GT] ← wdata_G−1..0
            3 || R:
                data ← 0^64−G || GTBFirst[th_5..GT]
            3 || W:
                GTBFirst[th_5..GT] ← wdata_G−1..0
            3 || R:
                data ← 0^63 || GTBBump[th_5..GT]
            3 || W:
                GTBBump[th_5..GT] ← wdata_0
        endcase
    else
        data ← 0
    endif
enddef
```

Level One Cache

The next cache level, here named the "Level One Cache," (LOC) is four-set-associative and indexed by the physical address. The eight memory addresses are partitioned into up to eight addresses for each of eight independent memory banks. The LOC has a cache block size of 256 bytes, with triclet (32-byte) sub-blocks.

The LOC may be partitioned into two sections, one part used as a cache, and the remainder used as "niche memory." Niche memory is at least as fast as cache memory, but unlike cache, never misses to main memory. Niche memory may be placed at any virtual address, and has physical addresses fixed in the memory map. The nl field in the control register configures the partitioning of LOC into cache memory and niche memory.

The LOC data memory is (256+8)×4×(128+2) bits, depth to hold 256 entries in each of four sets, each entry consisting of one hexlet of data (128 bits), one bit of parity, and one spare bit. The additional 8 entries in each of four sets hold the LOC tags, with 128 bits per entry for 1/8 of the total cache, using 512 bytes per data memory and 4K bytes total.

There are 128 cache blocks per set, or 512 cache blocks total. The maximum capacity of the LOC is 128 k bytes. Used as a cache, the LOC is partitioned into 4 sets, each 32 k bytes. Physically, the LOC is partitioned into 8 interleaved physical blocks, each holding 16 k bytes.

The physical address $pa_{63...0}$ is partitioned as below into a 52 to 54 bit tag (three to five bits are duplicated from the following field to accommodate use of portion of the cache as niche), 8-bit address to the memory bank (7 bits are physical address (pa), 1 bit is virtual address (v)), 3 bit memory bank select (bn), and 4-bit byte address (bt). All access to the LOC are in units of 128 bits (hexlets), so the 4-bit byte address (bt) does not apply here. The shaded field (pa,v) is translated via nl to a cache identifier (ci) and set identifier (si) and presented to the LOC as the LOC address to LOC bank bn.

| 63 … 15 | 14 … 8 | 7 | 6 … 4 | 3 … 0 |
|---|---|---|---|---|
| tag | pa | v | bn | bt |
| 49 | 7 | 1 | 3 | 4 |

The LOC tag consists of 64 bits of information, including a 52 to 54-bit tag and other cache state information. Only one MTB entry at a time may contain a LOC tag.

With 256 byte cache lines, there are 512 cache blocks. At 64 bits per tag, the cache tags require 4 k bytes of storage. This storage is adjacent to the LOC data memory itself, using physical addresses=1024 . . . 1055. Alternatively (see detailed description below), physical addresses=0 . . . 31 may be used.

The format of a LOC tag entry is shown below.

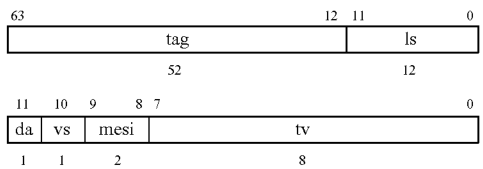

The meaning of the fields are given by the following table:

| name | size | meaning |
|---|---|---|
| tag | 52 | physical address tag |
| da | 1 | detail access (or physical address bit 11) |
| vs | 1 | victim select (or physical address bit 10) |
| mesi | 2 | coherency: modified (3), exclusive (2), shared (1), invalid (0) |
| tv | 8 | triclet valid (1) or invalid (0) |

To access the LOC, a global address is supplied to the Micro-Tag Buffer (MTB), which associatively looks up the global address into a table holding a subset of the LOC tags. In particular, each MTB table entry contains the cache index derived from physical address bits 14 . . . 8, ci, (7 bits) and set identifier, si, (2 bits) required to access the LOC data. Each MTB table entry also contains the protection information of the LOC tag.

With an MTB hit, protection information is supplied from the MTB. The MTB supplies the resulting cache index (ci, from the MTB), set identifier, si, (2 bits) and virtual address (bit 7, v, from the LA), which are applied to the LOC data bank selected from bits 6 . . . 4 of the LA. The diagram below shows the address presented to LOC data bank bn.

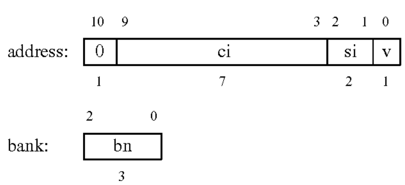

With an MTB miss, the GTB (described below) is referenced to obtain a physical address and protection information.

To select the cache line, a 7-bit niche limit register nl is compared against the value of $pa_{14 \ldots 8}$ from the GTB. If $pa_{14 \ldots 8}$<nl, a 7-bit address modifier register am is inclusive-or'ed against $pa_{14 \ldots 8}$, producing a cache index, ci. Otherwise, $pa_{14 \ldots 8}$ is used as ci. Cache lines 0 . . . nl−1, and cache tags 0 . . . nl−1, are available for use as niche memory. Cache lines nl . . . 127 and cache tags nl . . . 127 are used as LOC.

$$ci\square(pa_{14 \ldots 8}<nl)?(pa_{14 \ldots 8}\|am):pa_{14 \ldots 8}$$

The address modifier am is $(1^{7-log(128-nl)}\|0^{log(128-nl)})$. The bt field specifies the least-significant bit used for tag, and is (nl<112) ? 12:8+log(128−nl):

| nl | am | bt |
|---|---|---|
| 0 | 0 | 12 |
| 1 . . . 64 | 64 | 12 |
| 65 . . . 96 | 96 | 12 |
| 97 . . . 112 | 112 | 12 |
| 113 . . . 120 | 120 | 11 |
| 121 . . . 124 | 124 | 10 |
| 125 . . . 126 | 126 | 9 |
| 127 | 127 | 8 |

Values for nl in the range 113 . . . 127 require more than 52 physical address tag bits in the LOC tag and a requisite reduction in LOC features. Note that the presence of bits 14 . . . 10 of the physical address in the LOC tag is a result of the possibility that, with am=64 . . . 127, the cache index value ci cannot be relied upon to supply bit 14 . . . 8. Bits 9 . . . 8 can be safely inferred from the cache index value ci, so long as nl is in the range 0 . . . 124. When nl is in the range 113 . . . 127, the da bit is used for bit 111 of the physical address, so the Tag detail access bit is suppressed. When nl is in the range 121 . . . 127, the vs bit is used for bit 10 of the physical address, so victim selection is performed without state bits in the LOC tag. When nl is in the range 125 . . . 127, the set associativity is decreased, so that $si_1$ is used for bit 9 of the physical address and when nl is 127, $si_0$ is used for bit 8 of the physical address.

Four tags are fetched from the LOC tags and compared against the PA to determine which of the four sets contain the data. The four tags are contained in two consecutive banks; they may be simultaneously or independently fetched. The diagram below shows the address presented to LOC data bank $(ci_{1 \ldots 0}\|si_1)$.

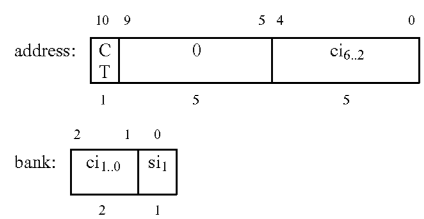

Note that the CT architecture description variable is present in the above address. CT describes whether dedicated locations exist in the LOC for tags at the next power-of-two boundary above the LOC data. The niche-mapping mechanism can provide the storage for the LOC tags, so the existence of these dedicated tags is optional: If CT=0, addresses at the beginning of the LOC (0 . . . 31 for this implementation) are used for LOC tags, and the nl value should be adjusted accordingly by software.

The LOC address (ci||si) uniquely identifies the cache location, and this LOC address is associatively checked against all MTB entries on changes to the LOC tags, such as by cache block replacement, bus snooping, or software modification. Any matching MTB entries are flushed, even if the MTB entry specifies a different global address—this permits address aliasing (the use of a physical address with more than one global address.

With an LOC miss, a victim set is selected (LOC victim selection is described below), whose contents, if any sub-block is modified, is written to the external memory. A new LOC entry is constructed with address and protection information from the GTB, and data fetched from external memory.

The diagram below shows the contents of LOC data memory banks 0 . . . 7 for addresses 0 . . . 2047:

| address | bank 7 | . . . | bank 1 | bank 0 |
|---|---|---|---|---|
| 0 | line 0, hexlet 7, set 0 | | line 0, hexlet 1, set 0 | line 0, hexlet 0, set 0 |
| 1 | line 0, hexlet 15, set 0 | | line 0, hexlet 9, set 0 | line 0, hexlet 8, set 0 |
| 2 | line 0, hexlet 7, set 1 | | line 0, hexlet 1, set 1 | line 0, hexlet 0, set 1 |
| 3 | line 0, hexlet 15, set 1 | | line 0, hexlet 9, set 1 | line 0, hexlet 8, set 1 |
| 4 | line 0, hexlet 7, set 2 | | line 0, hexlet 1, set 2 | line 0, hexlet 0, set 2 |
| 5 | line 0, hexlet 15, set 2 | | line 0, hexlet 9, set 2 | line 0, hexlet 8, set 2 |
| 6 | line 0, hexlet 7, set 3 | | line 0, hexlet 1, set 3 | line 0, hexlet 0, set 3 |
| 7 | line 0, hexlet 15, set 3 | | line 0, hexlet 9, set 3 | line 0, hexlet 8, set 3 |
| 8 | line 1, hexlet 7, set 0 | | line 1, hexlet 1, set 0 | line 1, hexlet 0, set 0 |
| 9 | line 1, hexlet 15, set 0 | | line 1, hexlet 9, set 0 | line 1, hexlet 8, set 0 |
| 10 | line 1, hexlet 7, set 1 | | line 1, hexlet 1, set 1 | line 1, hexlet 0, set 1 |
| 11 | line 1, hexlet 15, set 1 | | line 1, hexlet 9, set 1 | line 1, hexlet 8, set 1 |
| 12 | line 1, hexlet 7, set 2 | | line 1, hexlet 1, set 2 | line 1, hexlet 0, set 2 |
| 13 | line 1, hexlet 15, set 2 | | line 1, hexlet 9, set 2 | line 1, hexlet 8, set 2 |
| 14 | line 1, hexlet 7, set 3 | | line 1, hexlet 1, set 3 | line 1, hexlet 0, set 3 |
| 15 | line 1, hexlet 15, set 3 | | line 1, hexlet 9, set 3 | line 1, hexlet 8, set 3 |
| . . . | . . . | | . . . | . . . |
| 1016 | line 127, hexlet 7, set 0 | | line 127, hexlet 1, set 0 | line 127, hexlet 0, set 0 |
| 1017 | line 127, hexlet 15, set 0 | | line 127, hexlet 9, set 0 | line 127, hexlet 8, set 0 |
| 1018 | line 127, hexlet 7, set 1 | | line 127, hexlet 1, set 1 | line 127, hexlet 0, set 1 |
| 1019 | line 127, hexlet 15, set 1 | | line 127, hexlet 9, set 1 | line 127, hexlet 8, set 1 |
| 1020 | line 127, hexlet 7, set 2 | | line 127, hexlet 1, set 2 | line 127, hexlet 0, set 2 |
| 1021 | line 127, hexlet 15, set 2 | | line 127, hexlet 9, set 2 | line 127, hexlet 8, set 2 |
| 1022 | line 127, hexlet 7, set 3 | | line 127, hexlet 1, set 3 | line 127, hexlet 0, set 3 |
| 1023 | line 127, hexlet 15, set 3 | | line 127, hexlet 9, set 3 | line 127, hexlet 8, set 3 |
| 1024 | tag line 3, sets 3 and 2 | | tag line 0, sets 3 and 2 | tag line 0, sets 1 and 0 |
| 1025 | tag line 7, sets 3 and 2 | | tag line 4, sets 3 and 2 | tag line 4, sets 1 and 0 |
| . . . | . . . | | . . . | . . . |
| 1055 | tag line 127, sets 3 and 2 | | tag line 124, sets 3 and 2 | tag line 124, sets 1 and 0 |
| 1056 | reserved | | reserved | reserved |
| . . . | . . . | | . . . | . . . |
| 2047 | reserved | | reserved | reserved |

The following table summarizes the state transitions required by the LOC cache:

| cc | op | mesi | v | bus op | c | x | mesi | v | w | m | notes |
|---|---|---|---|---|---|---|---|---|---|---|---|
| NC | R | x | x | uncached read | | | | | | | |
| NC | W | x | x | uncached write | | | | | | | |
| CD | R | I | x | uncached read | | | | | | | |
| CD | R | x | 0 | uncached read | | | | | | | |
| CD | R | MES | 1 | (hit) | | | | | | | |
| CD | W | I | x | uncached write | | | | | | | |
| CD | W | x | 0 | uncached write | | | | | | | |
| CD | W | MES | 1 | uncached write | | | | | | 1 | |
| WT/WA | R | I | x | triclet read | 0 | x | | | | | |
| WT/WA | R | I | x | triclet read | 1 | 0 | S | 1 | | | |
| WT/WA | R | I | x | triclet read | 1 | 1 | E | 1 | | | |
| WT/WA | R | MES | 0 | triclet read | 0 | x | | | | | inconsistent KEN# |
| WT/WA | R | S | 0 | triclet read | 1 | 0 | | 1 | | | |
| WT/WA | R | S | 0 | triclet read | 1 | 1 | | 1 | | | E->S: extra sharing |
| WT/WA | R | E | 0 | triclet read | 1 | 0 | | 1 | | | |
| WT/WA | R | E | 0 | triclet read | 1 | 1 | S | 1 | | | shared block |
| WT/WA | R | M | 0 | triclet read | 1 | 0 | S | 1 | | | other subblocks M->I |
| WT/WA | R | M | 0 | triclet read | 1 | 1 | | 1 | | | E->M: extra dirty |
| WT/WA | R | MES | 1 | (hit) | | | | | | | |
| WT | W | I | x | uncached write | | | | | | | |
| WT | W | x | 0 | uncached write | | | | | | | |
| WT | W | MES | 1 | uncached write | | | | | | 1 | |
| WA | W | I | x | triclet read | 0 | x | | | 1 | | throwaway read |
| WA | W | I | x | triclet read | 1 | 0 | S | 1 | 1 | 1 | |
| WA | W | I | x | triclet read | 1 | 1 | M | 1 | | 1 | |
| WA | W | MES | 0 | triclet read | 0 | x | | | 1 | 1 | inconsistent KEN# |
| WA | W | S | 0 | triclet read | 1 | 0 | S | 1 | 1 | 1 | |
| WA | W | S | 0 | triclet read | 1 | 1 | M | 1 | | 1 | |
| WA | W | S | 1 | write | | 0 | S | 1 | | 1 | |
| WA | W | S | 1 | write | | 1 | S | 1 | | 1 | E->S: extra sharing |
| WA | W | E | 0 | triclet read | 1 | 0 | S | 1 | 1 | 1 | |
| WA | W | E | 0 | triclet read | 1 | 1 | E | 1 | 1 | 1 | |

-continued

| cc | op | mesi | v | bus op | c | x | mesi | v | w | m | notes |
|---|---|---|---|---|---|---|---|---|---|---|---|
| WA | W | E | 1 | (hit) | | x | M | 1 | | | E->M: extra dirty |
| WA | W | M | 0 | triclet read | 1 | 0 | M | 1 | 1 | 1 | |
| WA | W | M | 0 | triclet read | 1 | 1 | M | 1 | | 1 | |
| WA | W | M | 1 | (hit) | | x | M | 1 | | | |

| | |
|---|---|
| cc | cache control |
| op | operation: R = read, W = write |
| mesi | current mesi state |
| v | current tv state |
| bus op | bus operation |
| c | cachable (triclet) result |
| x | exclusive result |
| mesi | new mesi state |
| v | new tv state |
| w | cacheable write after read |
| m | merge store data with cache line data |
| notes | other notes on transition |

Definition

```
def data,tda ← LevelOneCacheAccess(pa,size,lda,gda,cc,op,wd) as
        // cache index
        am ← (1^{7−log(128−nl)} || 0^{log(128−nl)})
        ci ← (pa_{14..8}<nl) ? (pa_{14..8}||am) : pa_{14..8}
        bt ← (nl≦112) ? 12 : 8+log(128−nl)
        // fetch tags for all four sets
        tag10 ← ReadPhysical(0xFFFFFFFF00000000_{63..19}||CT||0^5||ci||0^1||0^4, 128)
        Tag[0] ← tag10_{63..0}
        Tag[1] ← tag10_{127..64}
        tag32 ← ReadPhysical(0xFFFFFFFF00000000_{63..19}||CT||0^5||ci||1^1||0^4, 128)
        Tag[2] ← tag32_{63..0}
        Tag[3] ← tag32_{127..64}
        vsc ← (Tag[3]_{10} || Tag[2]_{10}) ^ (Tag[1]_{10} || Tag[0]_{10})
        // look for matching tag
        si ← MISS
        for i ← 0 to 3
                if (Tag[i]_{63..10} || i_{1..0} || 0^7)_{63..bt} = pa_{63..bt} then
                        si ← i
                endif
        endfor
        // detail access checking on MISS
        if (si = MISS) and (lda ≠ gda) then
                if gda then
                        PerformAccessDetail(AccessDetailRequiredByGlobalTB)
                else
                        PerformAccessDetail(AccessDetailRequiredByLocalTB)
                endif
        endif
        // if no matching tag or invalid MESI or no sub-block, perform cacheable read/write
        bd ← (si = MISS) or (Tag[si]_{9..8} = I) or ((op=W) and (Tag[si]_{9..8} = S)) or ~Tag[si]_{pa7..5}
if bd then
        if (op=W) and (cc ≧ WA) and ((si = MISS) or ~Tag[si]_{pa7..5} or (Tag(si)_{9..8} ≠ S)) then
                data,cen,xen ← AccessPhysical(pa,size,cc,R,0)
                //if cache disabled or shared, do a write through
                if ~cen or ~xen then
                        data,cen,xen ← AccessPhysical(pa,size,cc,W,wd)
                endif
        else
                data,cen,xen ← AccessPhysical(pa,size,cc,op,wd)
        endif
        al ← cen
else
        al ← 0
endif
// find victim set and eject from cache
if al and (si = MISS or Tag[si]_{9..8} = I) then
        case bt of
                12..11:
                        si ← vsc
                10..8:
                        gvsc ← gvsc + 1
                        si ← (bt≦9) : pa_9 : gvsc_1 ^ pa_{11} || (bt≦8) : pa_8 : gvsc_0 ^ pa_{10}
        endcase
        if Tag[si]_{9..8} = M then
```

-continued

```
            for i ← 0 to 7
                if Tag[si]_i then
                    vca ← 0xFFFFFFFF00000000_{63..19}||0||ci||si||i_{2..0}||0^4
                    vdata ← ReadPhysical(vca, 256)
                    vpa ← (Tag[si]_{63..10} || si_{1..0} || 0^7)_{63..bt}||pa_{bt-1..8}||i_{2..0}||0||0^4
                    WritePhysical(vpa, 256, vdata)
                endif
            endfor
        endif
        if Tag[vsc+1]_{9..8} = I then
            nvsc ← vsc + 1
        elseif Tag[vsc+2]_{9..8} = I then
            nvsc ← vsc + 2
        elseif Tag[vsc+3]_{9..8} = I then
            nvsc ← vsc + 3
        else
            case cc of
                NC, CD, WT, WA, PF:
                    nvsc ← vsc + 1
                LS, SS:
                    nvsc ← vsc //no change
                endif
            endcase
        endif
        tda ← 0
        sm ← 0^{7-pa7..5} || 1^1 || 0^{pa}_{7..5}
else
        nvsc ← vsc
        tda ← (bt>11) ? Tag[si]_{11} : 0
            if al then
                sm ← Tag[si]_{7..1+pa7..5} || 1^1 || Tag[si]_{pa7..5}-1..0
            endif
        endif
        // write new data into cache and update victim selection and other tag fields
        if al then
            if op=R then
                mesi ← xen ? E : S
            else
                mesi ← xen ? M : I TODO
            endif
            case bt of
                12:
                    Tag[si] ← pa_{63..bt} || tda || Tag[si^2]_{10} ^ nvsc_{si_0} || mesi || sm
                    Tag[si^1]_{10} ← Tag[si^3]_{10} ^ nvsc_{1^si_0}
                11:
                    Tag[si] ← pa_{63..bt} || Tag[si^2]_{10} ^ nvsc_{si_0} || mesi || sm
                    Tag[si^1]_{10} ← Tag[si^3]_{10} ^ nvsc_{1^si_0}
                10:
                    Tag[si] ← pa_{63..bt} || mesi || sm
            endcase
            dt ← 1
            nca ← 0xFFFFFFFF00000000_{63..19}||0||ci||si||pa_{7..5}||0^4
            WritePhysical(nca, 256, data)
        endif
        // retrieve data from cache
        if ~bd then
            nca ← 0xFFFFFFFF00000000_{63..19}||0||ci||si||pa_{7..5}||0^4
            data ← ReadPhysical(nca, 128)
        endif
        // write data into cache
        if (op=W) and bd and al then
            nca ← 0xFFFFFFFF00000000_{63..19}||0||ci||si||pa_{7..5}||0^4
            data ← ReadPhysical(nca, 128)
            mdata ← data_{127..8*(size+pa3..0)} || wd_{8*(size+pa3..0)-1..8*pa3..0} || data_{8*pa3..0..0}
            WritePhysical(nca, 128, mdata)
        endif
        // prefetch into cache
        if al=bd and (cc=PF or cc=LS) then
            af ← 0 // abort fetch if af becomes 1
            for i ← 0 to 7
                if ~Tag[si]_i and ~af then
                    data,cen,xen ← AccessPhysical(pa_{63..8}||i_{2..0}||0||0^4,256,cc,R,0)
                    if cen then
                        nca ← 0xFFFFFFFF00000000_{63..19}||0||ci||si||i_{2..0}||0^4
                        WritePhysical(nca, 256, data)
                        Tag[si]_i ← 1
                        dt ← 1
                    else
                        af ← 1
                    endif
```

-continued

```
                endif
            endfor
        endif
        // cache tag writeback if dirty
        if dt then
            nt ← Tag[si_1||1^1) || Tag[si_1||0^1)
            WritePhysical(0xFFFFFFFF00000000_63..19||CT||0^5||ci||si_1||0^4, 128, nt)
        endif
enddef
```

Physical Address

The LOC data memory banks are accessed implicitly by cached memory accesses to any physical memory location as shown above. The LOC data memory banks are also accessed explicitly by uncached memory accesses to particular physical address ranges. The address mapping of these ranges is designed to facilitate use of a contiguous portion of the LOC cache as niche memory.

The physical address of a LOC hexlet for LOC address ba, bank bn, byte b is:

| 63 … 18 | 17 … 7 | 6 … 4 | 3 … 0 |
|---|---|---|---|
| FFFF FFFF 0000 0000 $_{63..18}$ | ba | bn | b |
| 46 | 11 | 3 | 4 |

Within the explicit LOC data range, starting from a physical address $pa_{17...0}$, the diagram below shows the LOC address ($pa_{17...7}$) presented to LOC data bank ($pa_{6...4}$).

| | 10 … 0 | | 2 … 0 |
|---|---|---|---|
| address: | $pa_{17..7}$ | bank: | $pa_{6..4}$ |
| | 11 | | 3 |

The diagram below shows the LOC data memory bank and address referenced by byte address offsets in the explicit LOC data range. Note that this mapping includes the addresses use for LOC tags.

| Byte offset | |
|---|---|
| 0 | bank 0, address 0 |
| 16 | bank 1, address 0 |
| 32 | bank 2, address 0 |
| 48 | bank 3, address 0 |
| 64 | bank 4, address 0 |
| 80 | bank 5, address 0 |
| 96 | bank 6, address 0 |
| 112 | bank 7, address 0 |
| 128 | bank 0, address 1 |
| 144 | bank 1, address 1 |
| 160 | bank 2, address 1 |
| 176 | bank 3, address 1 |
| 192 | bank 4, address 1 |
| 208 | bank 5, address 1 |
| 224 | bank 6, address 1 |
| 240 | bank 7, address 1 |
| ... | ... |
| 262016 | bank 0, address 2047 |
| 262032 | bank 1, address 2047 |
| 262048 | bank 2, address 2047 |
| 262064 | bank 3, address 2047 |
| 262080 | bank 4, address 2047 |
| 262096 | bank 5, address 2047 |

-continued

| Byte offset | |
|---|---|
| 262112 | bank 6, address 2047 |
| 262128 | bank 7, address 2047 |

Definition

```
def data ← AccessPhysicalLOC(pa,op,wd) as
    bank ← pa_6..4
    addr ← pa_17..7
    case op of
        R:
            rd ← LOCArray[bank][addr]
            crc ← LOCRedundancy[bank]
            data ← (crc and rd_130..2) or (~crc and rd_128..0)
            p[0] ← 0
            for i ← 0 to 128 by 1
                p[I+1] ← p[i] ^ data_i
            endfor
            if ControlRegister_61 and (p[129] ≠ 1) then
                raise CacheError
            endif
        W:
            p[0] ← 0
            for I ← 0 to 127 by 1
                p[I+1] ← p[i] ^ wd_i
            endfor
            wd_128 ← ~p[128]
            crc ← LOCRedundancy[bank]
            rdata ← (crc_126..0 and wd_126..0) or
            (~crc_126..0 and wd_128..2)
            LOCArray[bank][addr] ← wd_128..127 || rdata || wd_1..0
    endcase
enddef
```

Level One Cache Stress Control

LOC cells may be fabricated with marginal parameters, for which changes in clock timing or power supply voltage may cause these LOC cells to fail or pass. When testing the LOC while the part is in a normal circuit environment, rather than a special test environment with changeable power supply levels, cells with marginal parameters may not reliably fail testing.

To combat this problem, two bits of the control register, LOC stress, may be set to stress the circuit environment while testing. Under normal operation, these bits are cleared (00), while during stress testing, one or more of these bits are set (01, 10, 11). Self-testing should be performed in each of the environment settings, and the detected failures combined together to produce a reliable test for cells with marginal parameters.

Level One Cache Redundancy

The LOC contains facilities that can be used to avoid minor defects in the LOC data array.

Each LOC bank has three additional bits of data storage for each 128 bits of memory data (for a total of 131 bits). One of these bits is used to retain odd parity over the 128 bits of memory data, and the other two bits are spare, which can be pressed into service by setting a non-zero value in the LOC redundancy control register for that bank.

Each row of a LOC bank contains 131 bits: 128 bits of memory data, one bit for parity, and two spare bits:

| 130 129 | 128 | 127 0 |
|---|---|---|
| spare | p | data |
| 2 | 1 | 128 |

| 128 | 127 0 |
|---|---|
| pc | control |
| 1 | 128 |

Each bit set in the control word causes the corresponding data bit to be selected from a bit address increased by two:

$$\text{output} \leftarrow (\text{data and} \sim\text{control}) \text{ or } ((\text{spare}_0 \| p \| \text{data}_{127 \ldots 2}) \text{ and control})$$

$$\text{parity} \leftarrow (p \text{ and} \sim pc) \text{ or } (\text{spare}_1 \text{ and } pc)$$

The LOC redundancy control register has 129 bits, but is written with a 128-bit value. To set the pc bit in the LOC redundancy control, a value is written to the control with either bit 124 set (1) or bit 126 set (1). To set bit 124 of the LOC redundancy control, a value is written to the control with both bit 124 set (1) and 126 set (1). When the LOC redundancy control register is read, the process is reversed by selecting the pc bit instead of control bit 124 for the value of bit 124 if control bit 126 is zero (0).

This system can remove one defective column at an even bit position and one defective column at an odd bit position within each LOC block. For each defective column location, x, LOC control bit must be set at bits x, x+2, x+4, x+6, . . . . If the defective column is in the parity location (bit 128), then set bit 124 only. The following table defines the control bits for parity, bit 126 and bit 124: (other control bits are same as values written)

| $value_{126}$ | $value_{124}$ | pc | $control_{126}$ | $control_{124}$ |
|---|---|---|---|---|
| 0 | 0 | 0 | 0 | 0 |
| 0 | 1 | 1 | 0 | 0 |
| 1 | 0 | 1 | 1 | 0 |
| 1 | 1 | 1 | 1 | 1 |

Physical Address

The LOC redundancy controls are accessed explicitly by uncached memory accesses to particular physical address ranges.

The physical address of a LOC redundancy control for LOC bank bn, byte b is:

| 63 7 |
|---|
| FFFF FFFF 0900 $0000_{63 \ldots 7}$ |
| 57 |

Definition:

```
def data ← AccessPhysicalLOCRedundancy(pa,op,wd) as
    bank ← pa6..4
    case op of
        R:
            rd ← LOCRedundancy[bank]
            data ← rd127..125 || (rd126 ? rd124 : rd128) || rd123..0
```

-continued

```
        W:
            rd ← (wd126 or wd124) || wd127..125 || (wd126 and wd124) || wd123..0
            LOCRedundancy[bank] ← rd
    endcase
enddef
```

Memory Attributes

Fields in the LTB, GTB and cache tag control various attributes of the memory access in the specified region of memory. These include the control of cache consultation, updating, allocation, prefetching, coherence, ordering, victim selection, detail access, and cache prefetching.

Cache Control

The cache may be used in one of five ways, depending on a three-bit cache control field (cc) in the LTB and GTB. The cache control field may be set to one of seven states: NC, CD, WT, WA, PF, SS, and LS:

| | | read | | write | | read/write | |
|---|---|---|---|---|---|---|---|
| State | | consult | allocate | update | allocate | victim | prefetch |
| No Cache | 0 | No | No | No | No | No | No |
| Cache Disable | 1 | Yes | No | Yes | No | No | No |
| Write Through | 2 | Yes | Yes | Yes | No | No | No |
| reserved | 3 | | | | | | |
| Write Allocate | 4 | Yes | Yes | Yes | Yes | No | No |
| PreFetch | 5 | Yes | Yes | Yes | Yes | No | Yes |
| SubStream | 6 | Yes | Yes | Yes | Yes | Yes | No |
| Line-Stream | 7 | Yes | Yes | Yes | Yes | Yes | Yes |

The Zeus processor controls cc as an attribute in the LTB and GTB, thus software may set this attribute for certain address ranges and clear it for others. A three-bit field indicates the choice of caching, according to the table above. The maximum of the three-bit cache control field (cc) values of the LTB and GTB indicates the choice of caching, according to the table above.

No Cache

No Cache (NC) is an attribute that can be set on a LTB or GTB translation region to indicate that the cache is to be not to be consulted. No changes to the cache state result from reads or writes with this attribute set, (except for accesses that directly address the cache via memory-mapped region).

Cache Disable

Cache Disable (CD) is an attribute that can be set on a LTB or GTB translation region to indicate that the cache is to be consulted and updated for cache lines which are already present, but no new cache lines or sub-blocks are to be allocated when the cache does not already contain the addressed memory contents.

The "Socket 7" bus also provides a mechanism for supporting chip sets to decide on each access whether data is to be cached, using the CACHE# and KEN# signals. Using these signals, external hardware may cause a region selected as WT, WA or PF to be treated as CD. This mechanism is only active on the first such access to a memory region if caching is enabled, as the cache may satisfy subsequent references without a bus transaction.

Write Through

Write Through (WT) is an attribute that can be set on a LTB or GTB translation region to indicate that the writes to the cache must also immediately update backing memory. Reads to addressed memory that is not present in the cache cause cache lines or sub-blocks to be allocated. Writes to addressed memory that is not present in the cache does not modify cache state.

The "Socket 7" bus also provides a mechanism for supporting chip sets to decide on each access whether data is to be written through, using the PWT and WB/WT# signals. Using these signals, external hardware may cause a region selected as WA or PF to be treated as WT. This mechanism is only active on the first write to each region of memory; as on subsequent references, if the cache line is in the Exclusive or Modified state and writeback caching is enabled on the first reference, no subsequent bus operation occurs, at least until the cache line is flushed.

Write Allocate

Write allocate (WA) is an attribute that can be set of a LTB or GTB translation region to indicate that the processor is to allocate a memory block to the cache when the data is not previously present in the cache and the operation to be performed is a store. Reads to addressed memory that is not present in the cache cause cache lines or sub-blocks to be allocated. For cacheable data, write allocate is generally the preferred policy, as allocating the data to the cache reduces further bus traffic for subsequent references (loads or stores) or the data. Write allocate never occurs for data which is not cached. A write allocate brings in the data immediately into the Modified state.

Other "socket 7" processors have the ability to inhibit write allocate to cached locations under certain conditions, related by the address range. K6, for example, can inhibit write allocate in the range of 15-16 Mbyte, or for all addresses above a configurable limit with 4 Mbyte granularity. Pentium has the ability to label address ranges over which write allocate can be inhibited.

PreFetch

Prefetch (PF) is an attribute that can be set on a LTB or GTB translation region to indicate that increased prefetching is appropriate for references in this region. Each program fetch, load or store to a cache line that or does not already contain all the sub-blocks causes a prefetch allocation of the remaining sub-blocks. Cache misses cause allocation of the requested sub-block and prefetch allocation of the remaining sub-blocks. Prefetching does not necessarily fill in the entire cache line, as prefetch memory references are performed at a lower priority to other cache and memory reference traffic. A limited number of prefetches (as low as one in the initial implementation) can be queued; the older prefetch requests are terminated as new ones are created.

In other respects, the PF attribute is handled in the manner of the WA attribute. Prefetching is considered an implementation-dependent feature, and an implementation may choose to implement region with the PF attribute exactly as with the WA attribute.

Implementations may perform even more aggressive prefetching in future versions. Data may be prefetched into the cache in regions that are cacheable, as a result of program fetches, loads or stores to nearby addresses. Prefetches may extend beyond the cache line associated with the nearby address. Prefetches shall not occur beyond the reach of the GTB entry associated with the nearby address. Prefetching is terminated if an attempted cache fill results in a bus response that is not cacheable. Prefetches are implementation-dependent behavior, and such behavior may vary as a result of other memory references or other bus activity.

SubStream

SubStream (SS) is an attribute that can be set on a LTB or GTB translation region to indicate that references in this region are to be selected as the next victim on a cache miss. In particular, cache misses, which normally place the cache line in the last-to-be-victim state, instead place the cache line in the first-to-be-victim state, except relative to cache lines in the I state.

In other respects, the SS attribute is handled in the manner of the WA attribute. SubStream is considered an implementation-dependent feature, and an implementation may choose to implement region with the SS attribute exactly as with the WA attribute.

The SubStream attribute is appropriate for regions which are large data structures in which the processor is likely to reference the memory data just once or a small number of times, but for which the cache permits the data to be fetched using burst transfers. By making it a priority for victimization, these references are less likely to interfere with caching of data for which the cache performs a longer-term storage function.

LineStream

LineStream (LS) is an attribute that can be set on a LTB or GTB translation region to indicate that references in this region are to be selected as the next victim on a cache miss, and to enable prefetching. In particular, cache misses, which normally place the cache line in the last-to-be-victim state, instead place the cache line in the first-to-be-victim state, except relative to cache lines in the I state.

In other respects, the LS attribute is handled in the manner of the PF attribute. LineStream is considered an implementation-dependent feature, and an implementation may choose to implement region with the SS attribute exactly as with the PF or WA attributes.

Like the SubStream attribute, the LineStream attribute is particularly appropriate for regions for which large data structures are used in sequential fashion. By prefetching the entire cache line, memory traffic is performed as large sequential bursts of at least 256 bytes, maximizing the available bus utilization.

Cache Coherence

Cache coherency is maintained by using MESI protocols, for which each cache line (256 bytes) the cache data is kept in one of four states: M, E, S, I:

| State | | this Cache data | other Cache data | Memory data |
|---|---|---|---|---|
| Modified | 3 | Data is held exclusively in this cache. | No data is present in other caches. | The contents of main memory are now invalid. |
| Exclusive | 2 | Data is held exclusively in this cache. | No data is present in other caches. | Data is the same as the contents of main memory |
| Shared | 1 | Data is held in this cache, and possibly others. | Data is possibly in other caches. | Data is the same as the contents of main memory. |
| Invalid | 0 | No data for this location is present in the cache. | Data is possibly in other caches. | Data is possibly present in main memory. |

The state is contained in the mesi field of the cache tag.

In addition, because the "Socket 7" bus performs block transfers and cache coherency actions on triclet (32 byte) blocks, each cache line also maintains 8 bits of triclet valid (tv) state. Each bit of tv corresponds to a triclet sub-block of the cache line; bit 0 for bytes 0 . . . 31, bit 1 for bytes 32 . . . 63, bit 2 for bytes 64 . . . 95, etc. If the tv bit is zero (0), the coherence state for that triclet is I, no matter what the value of the mesi field. If the tv bit is one (1), the coherence state is defined by the mesi field. If all the tv bits are cleared (0), the mesi field must also be cleared, indicating an invalid cache line.

Cache coherency activity generally follows the protocols defined by the "Socket 7" bus, as defined by Pentium and K6-2 documentation. However, because the coherence state of a cache line is represented in only 10 bits per 256 bytes (1.25 bits per triclet), a few state transistions are defined differently. The differences are a direct result of attempts to set triclets within a cache line to different MES states that cannot be represented. The data structure allows any triclet to be changed to the I state, so state transitions in this direction match the Pentium processor exactly.

On the Pentium processor, for a cache line in the M state, an external bus Inquiry cycle that does not require invalidation (INV=0) places the cache line in the S state. On the Zeus processor, if no other triclet in the cache line is valid, the mesi field is changed to S. If other triclets in the cache line are valid, the mesi field is left unchanged, and the tv bit for this triclet is turned off, effectively changing it to the I state.

On the Pentium processor, for a cache line in the E state, an external bus Inquiry cycle that does not require invalidation (INV=0) places the cache line in the S state. On the Zeus processor, the mesi field is changed to S. If other triclets in the cache line are valid, the MESI state is effectively changed to the S state for these other triclets.

On the Pentium processor, for a cache line in the S state, an internal store operation causes a write-through cycle and a transition to the E state. On the Zeus processor, the mesi field is changed to E. Other triclets in the cache line are invalidated by clearing the tv bits; the MESI state is effectively changed to the I state for these other triclets.

When allocating data into the cache due to a store operation, data is brought immediately into the Modified state, setting the mesi field to M. If the previous mesi field is S, other triclets which are valid are invalidated by clearing the tv bits. If the previous mesi field is E, other triclets are kept valid and therefore changed to the M state.

When allocating data into the cache due to a load operation, data is brought into the Shared state, if another processor reports that the data is present in its cache or the mesi field is already set to S, the Exclusive state, if no processor reports that the data is present in its cache and the mesi field is currently E or I, or the Modified state if the mesi field is already set to M. The determination is performed by driving PWT low and checking whether WB/WT# is sampled high; if so the line is brought into the Exclusive state. (See page 202 (184) of the K6-2 documentation).

Strong Ordering

Strong ordering (so) is an attribute which permits certain memory regions to be operated with strong ordering, in which all memory operations are performed exactly in the order specified by the program and others to be operated with weak ordering, in which some memory operations may be performed out of program order.

The Zeus processor controls strong ordering as an attribute in the LTB and GTB, thus software may set this attribute for certain address ranges and clear it for others. A one bit field indicates the choice of access ordering. A one (1) bit indicates strong ordering, while a zero (0) bit indicates weak ordering.

With weak ordering, the memory system may retain store operations in a store buffer indefinitely for later storage into the memory system, or until a synchronization operation to any address performed by the thread that issued the store operation forces the store to occur. Load operations may be performed in any order, subject to requirements that they be performed logically subsequent to prior store operations to the same address, and subsequent to prior synchronization operations to any address. Under weak ordering it is permitted to forward results from a retained store operation to a future load operation to the same address. Operations are considered to be to the same address when any bytes of the operation are in common. Weak ordering is usually appropriate for conventional memory regions, which are side-effect free.

With strong ordering, the memory system must perform load and store operations in the order specified. In particular, strong-ordered load operations are performed in the order specified, and all load operations (whether weak or strong) must be delayed until all previous strong-ordered store operations have been performed, which can have a significant performance impact. Strong ordering is often required for memory-mapped I/O regions, where store operations may have a side-effect on the value returned by loads to other addresses. Note that Zeus has memory-mapped I/O, such as the TB, for which the use of strong ordering is essential to proper operation of the virtual memory system.

The EWBE# signal in "Socket 7" is of importance in maintaining strong ordering. When a write is performed with the signal inactive, no further writes to E or M state lines may occur until the signal becomes active. Further details are given in Pentium documentation (K6-2 documentation may not apply to this signal.)

Victim Selection

One bit of the cache tag, the vs bit, controls the selection of which set of the four sets at a cache address should next be chosen as a victim for cache line replacement. Victim selection (vs) is an attribute associated with LOC cache blocks. No vs bits are present in the LTB or GTB.

There are two hexlets of tag information for a cache line, and replacement of a set requires writing only one hexlet. To update priority information for victim selection by writing only one hexlet, information in each hexlet is combined by an exclusive-or. It is the nature of the exclusive-or function that altering either of the two hexlets can change the priority information.

Full Victim Selection Ordering for Four Sets

There are 4*3*2*1=24 possible orderings of the four sets, which can be completely encoded in as few as 5 bits: 2 bits to indicate highest priority, 2 bits for second-highest priority, 1 bit for third-highest priority, and 0 bits for lowest priority. Dividing this up per set and duplicating per hexlet with the exclusive-or scheme above requires three bits per set, which suggests simply keeping track of the three-highest priority sets with 2 bits each, using 6 bits total and three bits per set.

Specifically, vs bits from the four sets are combined to produce a 6-bit value:

$$vsc \leftarrow (vs[3] \| vs[2]) \hat{\ } (vs[1] \| vs[0])$$

The highest priority for replacement is set $vsc_{1 \ldots 0}$, second highest priority is set $vsc_{3 \ldots 2}$, third highest priority is set $vsc_{5 \ldots 4}$, and lowest priority is $vsc_{5 \ldots 4} \hat{\ } vsc_{3 \ldots 2} \hat{\ } vsc_{1 \ldots 0}$. When the highest priority set is replaced, it becomes the new lowest priority and the others are moved up, computing a new vsc by:

$$vsc \leftarrow vsc_{5 \ldots 4} \hat{\ } vsc_{3 \ldots 2} \hat{\ } vsc_{1 \ldots 0} \| vsc_{5 \ldots 2}$$

When replacing set vsc for a LineStream or SubStream replacement, the priority for replacement is unchanged, unless another set contains the invalid MESI state, computing a new vsc by:

$$vsc \leftarrow mesi[vsc_{5 \ldots 4} \hat{\ } vsc_{3 \ldots 2} \hat{\ } vsc_{1 \ldots 0}]=I)? vsc_{5 \ldots 4} \hat{\ } vsc_{3 \ldots 2} \hat{\ } vsc_{1 \ldots 0} \| vsc_{5 \ldots 2} : (mesi [vsc_{5 \ldots 4}]=I)? vsc_{1 \ldots 0} \| vsc_{5 \ldots 2} : (mesi [vsc_{3 \ldots 2}]=I)? vsc_{5 \ldots 4} \| vsc_{1 \ldots 0} \| vsc_{3 \ldots 2} : vsc$$

Cache flushing and invalidations can cause cache lines to be cleared out of sequential order. Flushing or invalidating a cache line moves that set to highest priority. If that set is already highest priority, the vsc is unchanged. If the set was second or third highest or lowest priority, the vsc is changed to move that set to highest priority, moving the others down.

$$vsc \leftarrow ((fs=vsc_{1 \ldots 0} \text{ or } fs=vsc_{3 \ldots 2})? vsc_{5 \ldots 4} : vsc_{3 \ldots 2}) \| (fs=vsc_{1 \ldots 0} ? vsc_{3 \ldots 2} : vsc_{1 \ldots 0}) \| fs$$

When updating the hexlet containing vs[1] and vs[0], the new values of vs[1] and vs[0] are:

$$vs[1] \leftarrow vs[3] \hat{\ } vsc_{5 \ldots 3}$$

$$vs[0] \leftarrow vs[2] \hat{\ } vsc_{2 \ldots 0}$$

When updating the hexlet containing vs[3] and vs[2], the new values of vs[3] and vs[2] are:

$$vs[3] \leftarrow vs[1] \hat{\ } vsc_{5 \ldots 3}$$

$$vs[2] \leftarrow vs[0] \hat{\ } vsc_{2 \ldots 0}$$

Software must initialize the vs bits to a legal, consistent state. For example, to set the priority (highest to lowest) to (0, 1, 2, 3), vsc must be set to 0b100100. There are many legal solutions that yield this vsc value, such as vs[3]←1, vs[2]←0, vs[1]←4,vs[0]←4.

Simplified Victim Selection Ordering for Four Sets

However, the orderings are simplified in the first Zeus implementation, to reduce the number of vs bits to one per set, keeping a two bit vsc state value:

$$vsc \leftarrow (vs[3] \| vs[2]) \hat{\ } (vs[1] \| vs[0])$$

The highest priority for replacement is set vsc, second highest priority is set vsc+1, third highest priority is set vsc+2, and lowest priority is vsc+3. When the highest priority set is replaced, it becomes the new lowest priority and the others are moved up. Priority is given to sets with invalid MESI state, computing a new vsc by:

$$vsc \leftarrow mesi[vsc+1]=I)? vsc+1 : (mesi[vsc+2]=I)? vsc+2 : (mesi[vsc+3]=I)? vsc+3 : vsc+1$$

When replacing set vsc for a LineStream or SubStream replacement, the priority for replacement is unchanged, unless another set contains the invalid MESI state, computing a new vsc by:

$$vsc \leftarrow mesi[vsc+1]=I)? vsc+1 : (mesi[vsc+2]=I)? vsc+2 : (mesi[vsc+3]=I)? vsc+3 : vsc$$

Cache flushing and invalidations can cause cache sets to be cleared out of sequential order. If the current highest priority for replacement is a valid set, the flushed or invalidated set is made highest priority for replacement.

$$vsc \leftarrow (mesi[vsc]=I)? vsc : fs$$

When updating the hexlet containing vs[1] and vs[0], the new values of vs[1] and vs[0] are:

$$vs[1] \leftarrow vs[3] \hat{\ } vsc_1$$

$$vs[0] \leftarrow vs[2] \hat{\ } vsc_0$$

When updating the hexlet containing vs[3] and vs[2], the new values of vs[3] and vs[2] are:

$$vs[3] \leftarrow vs[1] \hat{\ } vsc_1$$

$$vs[2] \leftarrow vs[0] \hat{\ } vsc_0$$

Software must initialize the vs bits, but any state is legal. For example, to set the priority (highest to lowest) to (0, 1, 2, 3), vsc must be set to 0b00. There are many legal solutions that yield this vsc value, such as vs[3]←0, vs[2]←0, vs[1]←0,vs[0]←0.

Full Victim Selection Ordering for Additional Sets

To extend the full-victim-ordering scheme to eight sets, 3*7=21 bits are needed, which divided among two tags is 11 bits per tag. This is somewhat generous, as the minimum required is 8*7*6*5*4*3*2*1=40320 orderings, which can be represented in as few as 16 bits. Extending the full-victim-ordering four-set scheme above to represent the first 4 priorities in binary, but to use 2 bits for each of the next 3 priorities requires 3+3+3+3+2+2+2=18 bits. Representing fewer distinct orderings can further reduce the number of bits used. As an extreme example, using the simplified scheme above with eight sets requires only 3 bits, which divided among two tags is 2 bits per tag.

Victim Selection Without LOC Tag Bits

At extreme values of the niche limit register (nl in the range 121 . . . 124), the bit normally used to hold the vs bit is usurped for use as a physical address bit. Under these conditions, no vsc value is maintained per cache line, instead a single, global vsc value is used to select victims for cache replacement. In this case, the cache consists of four lines, each with four sets. On each replacement a new Si valus is computed from:

$$gvsc \leftarrow gvsc+1$$

$$si \leftarrow gvsc \hat{\ } pa_{11 \ldots 10}$$

The algorithm above is designed to utilize all four sets on sequential access to memory.

Victim Selection Encoding LOC Tag Bits

At even more extreme values of the niche limit register (nl in the range 125 . . . 127), not only is the bit normally used to hold the vs bit is usurped for use as a physical address bit, but there is a deficit of one or two physical address bits. In this case, the number of sets can be reduced to encode physical address bits into the victim selection, allowing the choice of set to indicate physical address bits 9 or bits 9 . . . 8. On each replacement a new vsc valus is computed from:

$$gvsc \leftarrow gvsc+1$$

$$si \leftarrow pa_9 \| (nl=127)? pa_8 : gvsc \hat{\ } pa_{10}$$

The algorithm above is designed to utilize all four sets on sequential access to memory.

Detail Access

Detail access is an attribute which can be set on a cache block or translation region to indicate that software needs to be consulted on each potential access, to determine whether the access should proceed or not. Setting this attribute causes an exception trap to occur, by which software can examine the virtual address, by for example, locating data in a table, and if indicated, causes the processor to continue execution. In continuing, ephemeral state is set upon returning to the re-execution of the instruction that prevents the exception trap from recurring on this particular re-execution only. The ephemeral state is cleared as soon as the instruction is either completed or subject to another exception, so DetailAccess exceptions can recur on a subsequent execution of the same instruction. Alternatively, if the access is not to proceed, execution has been trapped to software at this point, which can abort the thread or take other corrective action.

The detail access attribute permits specification of access parameters over memory region on arbitrary byte boundaries. This is important for emulators, which must prevent store access to code which has been translated, and for simulating machines which have byte granularity on segment boundaries. The detail access attribute can also be applied to debuggers, which have the need to set breakpoints on byte-level data, or which may use the feature to set code breakpoints on instruction boundaries without altering the program code, enabling breakpoints on code contained in ROM.

A one bit field indicates the choice of detail access. A one (1) bit indicates detail access, while a zero (0) bit indicates no detail access. Detail access is an attribute that can be set by the LTB, the GTB, or a cache tag.

The table below indicates the proper status for all potential values of the detail access bits in the LTB, GTB, and Tag:

| LTB | GTB | Tag | status |
|---|---|---|---|
| 0 | 0 | 0 | OK - normal |
| 0 | 0 | 1 | AccessDetailRequiredByTag |
| 0 | 1 | 0 | AccessDetailRequiredByGTB |
| 0 | 1 | 1 | OK - GTB inhibited by Tag |
| 1 | 0 | 0 | AccessDetailRequiredByLTB |
| 1 | 0 | 1 | OK - LTB inhibited by Tag |
| 1 | 1 | 0 | OK - LTB inhibited by GTB |
| 1 | 1 | 1 | AccessDetailRequiredByTag |
| 0 | Miss | | GTBMiss |
| 1 | Miss | | AccessDetailRequiredByLTB |
| 0 | 0 | Miss | Cache Miss |
| 0 | 1 | Miss | AccessDetailRequiredByGTB |
| 1 | 0 | Miss | AccessDetailRequiredByLTB |
| 1 | 1 | Miss | Cache Miss |

The first eight rows show appropriate activities when all three bits are available. The detail access attributes for the LTB, GTB, and cache tag work together to define whether and which kind of detail access exception trap occurs. Generally, setting a single attribute bit causes an exception, while setting two bits inhibits such exceptions. In this way, a detail access exception can be narrowed down to cause an exception over a specified region of memory: Software generally will set the cache tag detail access bit only for regions in which the LTB or GTB also has a detail access bit set. Because cache activity may flush and refill cache lines implicity, it is not generally useful to set the cache tag detail access bit alone, but if this occurs, the AccessDetailRequiredByTag exception catches such an attempt.

The next two rows show appropropriate activities on a GTB miss. On a GTB miss, the detail access bit in the GTB is not present. If the LTB indicates detail access and the GTB misses, the AccessDetailRequiredByLTB exception should be indicated. If software continues from the AccessDetailRequiredByLTB exception and has not filled in the GTB, the GTBMiss exception happens next. Since the GTBMiss exection is not a continuation exception, a re-execution after the GTBMiss exception can cause a reoccurence of the AccessDetailRequiredByLTB exception. Alternatively, if software continues from the AccessDetailRequiredByLTB exception and has filled in the GTB, the AccessDetailRequiredByLTB exception is inhibited for that reference, no matter what the status of the GTB and Tag detail bits, but the re-executed instruction is still subject to the AccessDetailRequiredByGTB and AccessDetailRequiredByTag exceptions.

The last four rows show appropriate activities for a cache miss. On a cache miss, the detail access bit in the tag is not present. If the LTB or GTB indicates detail access and the cache misses, the AccessDetailRequiredByLTB or AccessDetailRequiredByGTB exception should be indicated. If software continues from these exceptions and has not filled in the cache, a cache miss happens next. If software continues from the AccessDetailRequiredByLTB or AccessDetailRequiredByGTB exception and has filled in the cache, the previous exception is inhibited for that reference, no matter what the status of the Tag detail bit, but is still subject to the AccessDetailRequiredByTag exception. When the detail bit must be created from a cache miss, the initial value filled in is zero. Software may set the bit, thus turning off AccessDetailRequired exceptions per cache line. If the cache line is flushed and refilled, the detail access bit in the cache tag is again reset to zero, and another AccessDetailRequired exception occurs.

Settings of the niche limit parameter to values that require use of the da bit in the LOC tag for retaining the physical address usurp the capability to set the Tag detail access bit. Under such conditions, the Tag detail access bit is effectively always zero (0), so it cannot inhibit AccessDetailRequiredByLTB, inhibit AccessDetailRequiredByGTB, or cause AccessDetailRequiredByTag.

The execution of a Zeus instruction has a reference to one quadlet of instruction, which may be subject to the DetailAccess exceptions, and a reference to data, which may be unaligned or wide. These unaligned or wide references may cross GTB or cache boundaries, and thus involve multiple separate reference that are combined together, each of which may be subject to the DetailAccess exception. There is sufficient information in the DetailAccess exception handler to process unaligned or wide references.

The implementation is free to indicate DetailAccess exceptions for unaligned and wide data references either in combined form, or with each sub-reference separated. For example, in an unaligned reference that crosses a GTB or cache boundary, a DetailAccess exception may be indicated for a portion of the reference. The exception may report the virtual address and size of the complete reference, and upon continuing, may inhibit reoccurrence of the DetailAccess exception for any portion of the reference. Alternatively, it may report the virtual address and size of only a reference portion and inhibit reoccurrence of the DetailAccess exception for only that portion of the reference, subject to another DetailAccess exception occurring for the remaining portion of the reference.

Microarchitecture

This section discusses details of the initial implementation that are not generally visible to software and do not affect its function, other than performance rates. The details in this section are specific to the initial implementation of the Zeus architecture; other implementations may be markedly different without affecting software compatibility. Certain aspects that may vary between implementations are described by the value of architectural parameters in the ROM, so that software may adjust itself to these parameters.

Overview

One embodiment of Zeus provides four threads of simultaneous instruction execution—each thread has distinct general register file, program counter, and local TB storage. Each thread has distinct address units that perform the A, L, S, B classes of instructions, but share other aspects of the memory system and share functional units that perform the more resource-intensive G, X, E, and W classes of instructions.

Referring to FIG. 1, the microarchitecture of the initial implementation is indicated by the diagram.

Referring to FIG. 1, four copies of an access unit are shown, each with an access instruction fetch queue A-Queue, coupled to an access general register file AR, each of which is, in turn, coupled to two access functional units A. The access units function independently for four simultaneous threads of execution. These eight access functional units A produce results for access general register files AR and addresses to a shared memory system. The memory contents fetched from the memory system are combined with execute instructions not performed by the access unit and entered into the four execute instruction queues E-Queue. Instructions and memory data from the E-queue are presented to execution general register files, which fetch execution general register file source operands. The instructions are coupled to the execution unit by arbitration unit Arbitration, that selects which instructions from the four threads are to be routed to the available execution units E, X, G, and T. The execution general register file source operands ER are coupled to the execution units using the source operand buses and to the execution units using the source operand buses. The function unit result operands from execution units are coupled to the execution general register file using the result bus. The function units result operands from the execution units are coupled to the execution general register file using the result bus.

Instruction Scheduling

The detailed pipeline organization for Zeus has a significant influence on instruction scheduling. Here we elaborate some general rules for effective scheduling by a compiler. Specific information on numbers of functional units, functional unit parallelism and latency is quite implementation-dependent: values indicated here are valid for Zeus's first implementation.

Separate Addressing from Execution

Zeus has separate function units to perform addressing operations (A, L, S, B instructions) from execution operations (G, X, E, W instructions). When possible, Zeus will execute all the addressing operations of an instruction stream, deferring execution of the execution operations until dependent load instructions are completed. Thus, the latency of the memory system is hidden, so long as addressing operations themselves do not need to wait for memory operands or results from the execution operations.

Software Pipeline

For best performance, instructions should be scheduled so that previous dependent operations can be completed at the time of issue. When this is not possible, the processor inserts sufficient empty cycles to perform the instructions as if performed one after the other—explicit no-operation instructions are not required.

Multiple Issue

Zeus can issue up to two addressing operations and up to two execution operations per cycle per thread. Considering functional unit parallelism, described below, as many of four instruction issues per cycle are possible per thread.

Functional Unit Parallelism

Zeus has separate function units for several classes of execution operations. An A unit performs scalar add, subtract, boolean, and shift-add operations for addressing and branch calculations. The remaining functional units are execution resources, which perform operations subsequent to memory loads and which operate on values in a parallel, partitioned form. A G unit performs add, subtract, boolean, and shift-add operations. An X unit performs general shift operations. An E unit performs multiply and floating-point operations. A T unit performs table-look-up operations.

Each instruction uses one or more of these units, according to the table below.

| Instruction | A | G | X | E | T |
|---|---|---|---|---|---|
| A. | x | | | | |
| B | x | | | | |
| L | x | | | | |
| S | x | | | | |
| G | | x | | | |
| X | | | x | | |
| E | | | | x | |
| W.TRANSLATE | x | | | | x |
| W.MULMAT | x | | | x | |
| W.SWITCH | x | | x | | |

Scheduling Latency

The latency of each functional unit depends on what operation is performed in the unit, and where the result is used. The aggressive nature of the pipeline makes it difficult to characterize the latency of each operation with a single number.

The latency figures below indicate the number of cycles between the issue of the predecessor instruction (the last instruction to produce a general register result) and the issue of the successor instruction.

Because the addressing unit is decoupled from the execution unit, the latency of load operations is generally hidden, unless the result of a load instruction or execution unit operation must be returned to the addressing unit. For each cycle in which a load result or address unit result is not available to a dependent execution unit instruction, the E-queue accepts the dependent instructions for later execution, thus increasing the decoupling.

Store instructions must be able to compute the address to which the data is to be stored in the addressing unit, but the data will not be irrevocably stored until the data is available and it is valid to retire the store instruction. However, under certain conditions, data may be forwarded from a store instruction to subsequent load instructions, once the data is available.

When the result of a load instruction or execution unit operation is returned to the addressing unit to perform a dependent operation, the full latency that was avoided from decoupling is now incurred.

The latency of each of these units, for the initial Zeus implementation is indicated below:

| Unit | instruction | Latency rules |
|---|---|---|
| A. | A | 1 cycle to A unit, Latency is 0 to G, X, E, T units, as these operations are buffered in the E-queue until the address unit result is available. |
| | L | Address operands must be ready in order to issue, When cache hits or niche access performed, latency is 2-3 cycles to A unit, Latency is extended when cache misses or is delayed. Latency is 0 to G, X, E, T units, as these operations are buffered in the E-queue until the load result is available. |

-continued

| Unit | instruction | Latency rules |
|---|---|---|
| | S | Address operands must be ready in order to issue, Store occurs when data is ready and instruction may be retired, but data may be forwarded as soon as it is ready. |
| | B | Conditional branch operands may be provided from the A unit (64-bit values), or the G unit (128-bit values). 4 cycles for mispredicted branch |
| | W | Address operand must be ready to issue, |
| G | G | 1 cycle |
| X | X, W.SWITCH | 1 cycle for data operands, 2 cycles for shift amount or control operand |
| E | E, W.MULMAT | 4 cycles |
| T | W.TRANSLATE | 1 cycle |

Pipeline Organization

Zeus performs all instructions as if executed one-by-one, in-order, with precise exceptions always available. Consequently, code that ignores the subsequent discussion of Zeus pipeline implementations will still perform correctly. However, the highest performance of the Zeus processor is achieved only by matching the ordering of instructions to the characteristics of the pipeline. In the following discussion, the general characteristics of all Zeus implementations precede discussion of specific choices for specific implementations.

Classical Pipeline Structures

Pipelining in general refers to hardware structures that overlap various stages of execution of a series of instructions so that the time required to perform the series of instructions is less than the sum of the times required to perform each of the instructions separately. Additionally, pipelines carry to connotation of a collection of hardware structures which have a simple ordering and where each structure performs a specialized function.

The diagram below shows the timing of what has become a canonical scalar pipeline structure for a simple RISC processor, with time on the horizontal axis increasing to the right, and successive instructions on the vertical axis going downward. The stages I, R, E, M, and W refer to units which perform instruction fetch, general register file fetch, execution, data memory fetch, and general register file write. The stages are aligned so that the result of the execution of an instruction may be used as the source of the execution of an immediately following instruction, as seen by the fact that the end of an E stage (bold in line 1) lines up with the beginning of the E stage (bold in line 2) immediately below. Also, it can be seen that the result of a load operation executing in stages E and M (bold in line 3) is not available in the immediately following instruction (line 4), but may be used two cycles later (line 5); this is the cause of the load delay slot seen on some RISC processors.

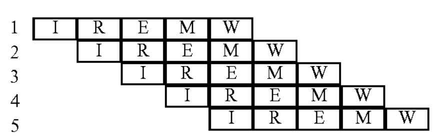

In the diagrams below, we simplify the diagrams somewhat by eliminating the pipe stages for instruction fetch, general register file fetch, and general register file write, which can be understood to precede and follow the portions of the pipelines diagrammed. The diagram above is shown again in this new format, showing that the scalar pipeline has very little overlap of the actual execution of instructions.

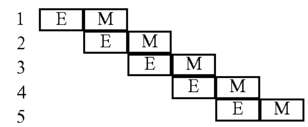

A superscalar pipeline is one capable of simultaneously issuing two or more instructions which are independent, in that they can be executed in either order and separately, producing the same result as if they were executed serially. The diagram below shows a two-way superscalar processor, where one instruction may be a general register-to-general register operation (using stage E) and the other may be a general register-to-general register operation (using stage A) or a memory load or store (using stages A and M).

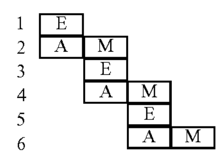

Superscalar Pipeline

A superpipelined pipeline is one capable is issuing simple instructions frequently enough that the result of a simple instruction must be independent of the immediately following one or more instructions. The diagram below shows a two-cycle superpipelined implementation:

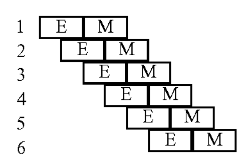

In the diagrams below, pipeline stages are labelled with the type of instruction that may be performed by that stage. The position of the stage further identifies the function of that stage, as for example a load operation may require several L stages to complete the instruction.

Superstring Pipeline

Zeus architecture provides for implementations designed to fetch and execute several instructions in each clock cycle. For a particular ordering of instruction types, one instruction of each type may be issued in a single clock cycle. The ordering required is A, L, E, S, B; in other words, a general register-to-general register address calculation, a memory load, a general register-to-general register data calculation, a memory store, and a branch. Because of the organization of the pipeline, each of these instructions may be serially dependent. Instructions of type E include the fixed-point execute-phase instructions as well as floating-point and digital signal processing instructions. We call this form of pipeline organization "superstring," (Readers with a background in theoretical physics may have seen this term in an other, unrelated, context.) because of the ability to issue a string of dependent instructions in a single clock cycle, as distinguished from superscalar or superpipelined organizations, which can only issue sets of independent instructions.

These instructions take from one to four cycles of latency to execute, and a branch prediction mechanism is used to keep the pipeline filled. The diagram below shows a box for the interval between issue of each instruction and the completion. Bold letters mark the critical latency paths of the instructions, that is, the periods between the required availability of the source general registers and the earliest availability of the result general registers. The A-L critical latency path is a special case, in which the result of the A instruction may be used as the base general register of the L instruction without penalty. E instructions may require additional cycles of latency for certain operations, such as fixed-point multiply and divide, floating-point and digital signal processing operations.

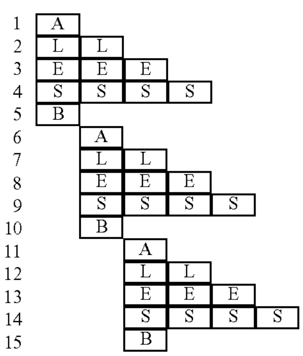

Superspring Pipeline

Zeus architecture provides an additional refinement to the organization defined above, in which the time permitted by the pipeline to service load operations may be flexibly extended. Thus, the front of the pipeline, in which A, L and B type instructions are handled, is decoupled from the back of the pipeline, in which E, and S type instructions are handled. This decoupling occurs at the point at which the data cache and its backing memory is referenced; similarly, a FIFO that is filled by the instruction fetch unit decouples instruction cache references from the front of the pipeline shown above. The depth of the FIFO structures is implementation-dependent, i.e. not fixed by the architecture.

Figure 101:
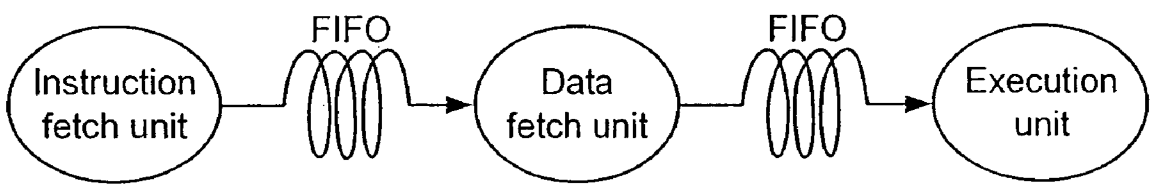
FIG. 101 illustrates a pipeline organization in accordance with an exemplary embodiment of the present invention.

The separation of access unit operations from execution unit operations has been called "decoupled access from execution" (Smith, James E.). FIG. 101 indicates why we call this pipeline organization feature "superspring," an extension of our superstring organization.

With the super-spring organization, the latency of load instructions can be hidden, as execute instructions are deferred until the results of the load are available. Nevertheless, the execution unit still processes instructions in normal order, and provides precise exceptions.

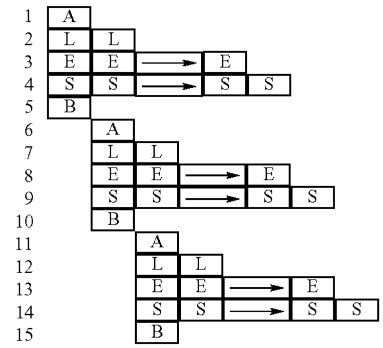

Superthread Pipeline

This technique is not employed in the initial Zeus implementation, though it was present in an earlier prototype implementation.

A difficulty of superpipelining is that dependent operations must be separated by the latency of the pipeline, and for highly pipelined machines, the latency of simple operations can be quite significant. The Zeus "superthread" pipeline provides for very highly pipelined implementations by alternating execution of two or more independent threads. In this context, a thread is the state required to maintain an independent execution; the architectural state required is that of the general register file contents, program counter, privilege level, local TB, and when required, exception status. Ensuring that only one thread may handle an exception at one time may minimize the latter state, exception status. In order to ensure that all threads make reasonable forward progress, several of the machine resources must be scheduled fairly.

An example of a resource that is critical that it be fairly shared is the data memory/cache subsystem. In a prototype implementation, Zeus is able to perform a load operation only on every second cycle, and a store operation only on every fourth cycle. Zeus schedules these fixed timing resources fairly by using a round-robin schedule for a number of threads that is relatively prime to the resource reuse rates. For this implementation, five simultaneous threads of execution ensure that resources which may be used every two or four cycles are fairly shared by allowing the instructions which use those resources to be issued only on every second or fourth issue slot for that thread. Three or seven simultaneous threads of execution (any relatively prime number) would also have the same property.

In the diagram below, the thread number which issues an instruction is indicated on each clock cycle, and below it, a list of which functional units may be used by that instruction. The diagram repeats every 20 cycles, so cycle 20 is similar to cycle 0, cycle 21 is similar to cycle 1, etc. This schedule ensures that no resource conflict occur between threads for these resources. Thread 0 may issue an E, L, S or B on cycle 0, but on its next opportunity, cycle 5, may only issue E or B, and on cycle 10 may issue E, L or B, and on cycle 15, may issue E or B.

| cycle | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| thread | 0 | 1 | 2 | 3 | 4 | 0 | 1 | 2 | 3 | 4 | 0 | 1 | 2 | 3 | 4 | 0 | 1 | 2 | 3 | 4 |
| | E | E | E | E | E | E | E | E | E | E | E | E | E | E | E | E | E | E | E | E |
| | L | | L | | L | | L | | L | | L | | L | | L | | L | | L | |
| | S | | | | S | | | | S | | | | S | | | | S | | | |
| | B | B | B | B | B | B | B | B | B | B | B | B | B | B | B | B | B | B | B | B |

When seen from the perspective of an individual thread, the resource use diagram looks similar to that of the collection. Thus an individual thread may use the load unit every two instructions, and the store unit every four instructions.

| cycle | 0 | 5 | 10 | 15 | 20 | 25 | 30 | 35 | 40 | 45 | 50 | 55 | 60 | 65 | 70 | 75 | 80 | 85 | 90 | 95 |
|---|---|---|---|---|---|---|---|---|---|---|---|---|---|---|---|---|---|---|---|---|
| thread | 0 | 0 | 0 | 0 | 0 | 0 | 0 | 0 | 0 | 0 | 0 | 0 | 0 | 0 | 0 | 0 | 0 | 0 | 0 | 0 |
| | E | E | E | E | E | E | E | E | E | E | E | E | E | E | E | E | E | E | E | E |
| | L | | L | | L | | L | | L | | L | | L | | L | | L | | L | |
| | S | | | | S | | | | S | | | | S | | | | S | | | |
| | B | B | B | B | B | B | B | B | B | B | B | B | B | B | B | B | B | B | B | B |

A Zeus Superthread pipeline, with 5 simultaneous threads of execution, permits simple operations, such as general register-to-general register add (G.ADD), to take 5 cycles to complete, allowing for an extremely deeply pipelined implementation.

Simultaneous Multithreading

Simultaneous Multithreading is another form of multithreaded processor, where the threads are simultaneously performed and compete for access to shared functional units. In designs employing simultaneous multithreading, instruction issue for each thread must be modified to incorporate arbitration between threads as they compete for access to shared functional units. Simultaneous multithreaded pipelines enhance the utilization of data path units by allowing instructions to be issued from one of several execution threads to each functional unit (Eggers, Susan, University of Washington.).

The initial Zeus implementation performs simultaneous multithreading among 4 threads. Each of the 4 threads share a common memory system, a common T unit. Pairs of threads share two G units, one X unit, and one E unit. Each thread individually has two A units. A fair allocation scheme balances access to the shared resources by the four threads.

In Zeus, simultaneous multithreading is combined with the "SuperString" pipeline in a unique way. Compared to conventional pipelines, prior simultaneous multithreading designs used an additional pipeline cycle before instructions could be issued to functional units, the additional cycle needed to determine which threads should be permitted to issue instructions. Consequently, relative to conventional pipelines, this design had additional delay, including dependent branch delay.

Zeus contains individual access data path units, with associated general register files, for each execution thread. These access units produce addresses, which are aggregated together to a common memory unit, which fetches all the addresses and places the memory contents in one or more buffers. Instructions for execution units, which are shared to varying degrees among the threads are also buffered for later execution. The execution units then perform operations from all active threads using functional data path units that are shared.

For instructions performed by the execution units, the extra cycle required for prior simultaneous multithreading designs is overlapped with the memory data access time from decoupled access from execution cycles, so that no additional delay is incurred by the execution functional units for scheduling resources. For instructions performed by the access units, by employing individual access units for each thread the additional cycle for scheduling shared resources is also eliminated.

This is a favorable tradeoff because, while threads do not share the access functional units, these units are relatively small compared to the execution functional units, which are shared by threads.

With regard to the sharing of execution units, the Zeus implementation employs several different classes of functional units for the execution unit, with varying cost, utilization, and performance. In particular, the G units, which perform simple addition and bitwise operations is relatively inexpensive (in area and power) compared to the other units, and its utilization is relatively high. Consequently, the design employs four such units, where each unit can be shared between two threads. The X unit, which performs a broad class of data switching functions is more expensive and less used, so two units are provided that are each shared among two threads. The T unit, which performs the Wide Translate instruction, is expensive and utilization is low, so the single unit is shared among all four threads. The E unit, which performs the class of Ensemble instructions, is very expensive in area and power compared to the other functional units, but utilization is relatively high, so we provide two such units, each unit shared by two threads.

Branch/Fetch Prediction

Zeus does not have delayed branch instructions, and so relies upon branch or fetch prediction to keep the pipeline full around unconditional and conditional branch instructions. In the simplest form of branch prediction, as in Zeus's first implementation, a taken conditional backward (toward a lower address) branch predicts that a future execution of the same branch will be taken. More elaborate prediction may cache the source and target addresses of multiple branches, both conditional and unconditional, and both forward and reverse.

The hardware prediction mechanism is tuned for optimizing conditional branches that close loops or express frequent alternatives, and will generally require substantially more cycles when executing conditional branches whose outcome is not predominately taken or not-taken. For such cases of unpredictable conditional results, the use of code that avoids conditional branches in favor of the use of compare-set and multiplex instructions may result in greater performance.

Under some conditions, the above technique may not be applicable, for example if the conditional branch "guards" code which cannot be performed when the branch is taken. This may occur, for example, when a conditional branch tests for a valid (non-zero) pointer and the conditional code performs a load or store using the pointer. In these cases, the conditional branch has a small positive offset, but is unpredictable. A Zeus pipeline may handle this case as if the branch is always predicted to be not taken, with the recovery of a misprediction causing cancellation of the instructions which have already been issued but not completed which would be skipped over by the taken conditional branch. This "conditional-skip" optimization is performed by the initial Zeus implementation and requires no specific architectural feature to access or implement.

A Zeus pipeline may also perform "branch-return" optimization, in which a branch-link instruction saves a branch target address that is used to predict the target of the next returning branch instruction. This optimization may be implemented with a depth of one (only one return address kept), or as a stack of finite depth, where a branch and link pushes onto the stack, and a branch-register pops from the stack. This optimization can eliminate the misprediction cost of simple procedure calls, as the calling branch is susceptible to hardware prediction, and the returning branch is predictable by the branch-return optimization. Like the conditional-skip optimization described above, this feature is performed by the initial Zeus implementation and requires no specific architectural feature to access or implement.

Zeus implements two related instructions that can eliminate or reduce branch delays for conditional loops, conditional branches, and computed branches. The "branch-hint" instruction has no effect on architectural state, but informs the instruction fetch unit of a potential future branch instruction, giving the addresses of both the branch instruction and of the branch target. The two forms of the instruction specify the branch instruction address relative to the current address as an immediate field, and one form (branch-hint-immediate) specifies the branch target address relative to the current address as an immediate field, and the other (branch-hint) specifies the branch target address from a general register. The branch-hint-immediate instruction is generally used to give advance notice to the instruction fetch unit of a branch-conditional instruction, so that instructions at the target of the branch can be fetched in advance of the branch-conditional instruction reaching the execution pipeline. Placing the branch hint as early as possible, and at a point where the extra instruction will not reduce the execution rate optimizes performance. In other words, an optimizing compiler should insert the branch-hint instruction as early as possible in the basic block where the parcel will contain at most one other "front-end" instruction.

Additional Load and Execute Resources

Studies of the dynamic distribution of Zeus instructions on various benchmark suites indicate that the most frequently-issued instruction classes are load instructions and execute instructions. In a high-performance Zeus implementation, it is advantageous to consider execution pipelines in which the ability to target the machine resources toward issuing load and execute instructions is increased.

One of the means to increase the ability to issue execute-class instructions is to provide the means to issue two execute instructions in a single-issue string. The execution unit actually requires several distinct resources, so by partitioning these resources, the issue capability can be increased without increasing the number of functional units, other than the increased general register file read and write ports.

The partitioning in the initial implementation places all instructions that involve shifting and shuffling in one execution unit, and all instructions that involve multiplication, including fixed-point and floating-point multiply and add in another unit. Resources used for implementing add, subtract, and bitwise logical operations are duplicated, being modest in size compared to the shift and multiply units, or shared between the two units, as the operations have low-enough latency that two operations might be pipelined within a single issue cycle. These instructions must generally be independent, except perhaps that two simple add, subtract, or bitwise logical instructions may be performed dependently, if the resources for executing simple instructions are shared between the execution units.

One of the means to increase the ability to issue load-class instructions is to provide the means to issue two load instructions in a single-issue string. This would generally increase the resources required of the data fetch unit and the data cache, but a compensating solution is to steal the resources for the store instruction to execute the second load instruction. Thus, a single-issue string can then contain either two load instructions, or one load instruction and one store instruction, which uses the same general register read ports and address computation resources as the basic 5-instruction string. This capability also may be employed to provide support for unaligned load and store instructions, where a single-issue string may contain as an alternative a single unaligned load or store instruction which uses the resources of the two load-class units in concert to accomplish the unaligned memory operation.

Result Forwarding

When temporally adjacent instructions are executed by separate resources, the results of the first instruction must generally be forwarded directly to the resource used to execute the second instruction, where the result replaces a value which may have been fetched from a general register file. Such forwarding paths use significant resources. A Zeus implementation must generally provide forwarding resources so that dependencies from earlier instructions within a string are immediately forwarded to later instructions, except between a first and second execution instruction as described above. In addition, when forwarding results from the execution units back to the data fetch unit, additional delay may be incurred.

Overall Pipeline

Starting with the thread program counter, instructions are prefetched into the program microcache (PMC or A-queue), read from the program microcache (PMC), aligned into bundles of up to four instructions, and decisions are made to issue up to four instructions. Two initial instructions are sent to the address unit, and two additional instructions are sent to the execution unit queue (E-queue, or spring). The addresses from the address units are fetched from the memory system. Results from the address units or from the memory system are also placed into the E-queue. Instructions and data are read from the E-queue and issued to the execution units (G, X, E, T). Results from the address units and execution units are stored into memory.

The following sections describe the major units for the pipeline described above.

Program Microcache

The initial implementation includes a program microcache (PMC or A-queue or AQ) which holds only program code for each thread. The program microcache is flushed by reset, or by executing a B.BARRIER instruction. The program microcache is always clean, and is not snooped by writes or otherwise kept coherent, except by flushing as indicated above. The microcache is not altered by writing to the LTB or GTB, and software must execute a B.BARRIER instruction before expecting the new contents of the LTB or GTB to affect determination of PMC hit or miss status on program fetches.

In the initial implementation, the program microcache holds simple loop code. The microcache holds two separately addressed cache lines: 512 bytes or 128 instructions. Branches or execution beyond this region cause the microcache to be flushed and refilled at the new address, provided that the addresses are executable by the current thread. The program microcache uses the B.HINT and B.HINT.I to accelerate fetching of program code when possible. The program microcache generally functions as a prefetch buffer, except that short forward or backward branches within the region covered maintain the contents of the microcache.

Program fetches into the microcache are requested on any cycle in which less than two load/store addresses are generated by the address unit, unless the microcache is already full. System arbitration logic gives program fetches lower priority than load/store references when first presented, then equal priority if the fetch fails arbitration a certain number of times. The delay until program fetches have equal priority should be based on the expected time the program fetch data will be executed; it may be as small as a single cycle, or greater for fetches which are far ahead of the execution point.

Program Counter Queue

The depth of the processor pipeline, and the width of program counter addresses (64 bits) makes storage of the program counter for each instruction expensive. To reduce the cost of this storage, the program counter for each parcel is represented by an up to 4-bit pcqid and an 6-bit pcqoff. The current privilege level is also retained as a 2-bit pcqpl. The size of the Program Counter Queue (PCQ) is implementation-dependent: for the first implementation, 4 entries per thread are used (and 2 bits per pcqid are used).

pc:

| 9 8 | 7 2 | 1 0 |
|---|---|---|
| pcqid | pcqoff | pcqpl |
| 2 | 6 | 2 |

The meaning of the fields are given by the following table:

| name | size | meaning |
|---|---|---|
| pcqid | 2 | Identify PC-queue entry used for this parcel |
| pcqoff | 6 | Offset from PC-queue for this parcel |
| pcqpl | 2 | Privilege level for this parcel |

A new entry is allocated on each taken branch and when the pcqoff field overflows. The pcqoff field expresses an offset from the stored program counter, shifted by two bits. An entry is deallocated when the last instruction using that pcqid is retired. If there is need to allocate a new entry and one is not available, instruction issue is halted until an entry is available. Consequently, the number of entries should reflect the depth of the pipeline compared to the number of parcels between taken branches. For an inner loop, a second taken branch need only reset the pcqoff value, leaving the pcqid alone, so that an inner loop of fewer than 256 instructions need only use one entry.

It is possible to integrate handling of the PCQ with the PMC, using the "front" two entries as program code address tags for the PMC. As a new cache line is brought into the PMC, a new pcqid is allocated for it, in round-robin fashion, and the "back" two entries have already been issued and now require only handling as the PCQ. The pcqoff field may be limited to 6 bits to match the PMC structure.

Instruction Fetch

Up to four instructions, forming a parcel, are fetched from the program microcache (PMC) on each cycle. The four instructions are examined for their ability to be issued; any unissued instruction is the first instruction of the parcel on the next cycle.

The diagram below illustrates, in the little-endian ordering that is required of instructions, the four-instruction parcel.

| 128 96 | 95 64 | 63 32 | 31 0 |
|---|---|---|---|
| fourth | third | second | first |
| 32 | 32 | 32 | 32 |

Only the first two instructions of the parcel are candidates for issue to the A functional units. The A units may issue zero, the first one, or the first two instructions from the parcel. If the first two instructions are dependent, only the first will be issued. If either of the first two instructions are an unaligned load, unaligned store or branch gateway instruction, both A units will be employed to perform this instruction, so the second instruction will not be issued to the A unit. If either of the first two instructions are W instructions, the address unit is used to check availability of the memory operand or to begin fetching the memory operand if missed in the wide microcache. If either of the first two instructions require general registers which are absent from the AR (see below), they are not issued until the value of the general registers are copied from the ER to the AR.

The diagram below illustrates the possible configurations in which zero, one or two instructions are issued to the two A functional units. The matching pattern in the list below controls the number and selection of instructions that are candidates for issue. As the pattern illustrates, all A, B, L, or S class instructions must preceed the G, E, X, or W class instructions in order to be simultaneously issued.

| 128 96 | 95 64 | 63 32 | 31 0 | |
|---|---|---|---|---|
| fourth | third | second | first | A |
| | | | GEX | 0 |
| | | GEX | ABLS | 1 |
| | | ABLSGEX | W | 1 |
| | | ABLSW | ABLS | 2 |
| | | W | W | 2 |
| 32 | 32 | 32 | 32 | |

Up to two remaining instructions of the parcel, after the 0-2 issued to the A units, but including any W instructions, are candidates for issue to the execution unit. Thus, any two consecutive instructions or any one of the first three instructions of the four instruction parcel may be issued to the execution unit.

The diagram below illustrates the possible configurations in which zero, one or two instructions are issued to the two execution functional units. The largest (last) pattern in the list that matches the parcel controls the number and selection of instructions that are candidates for issue.

| 128–96 | 95–64 | 63–32 | 31–0 | E |
|---|---|---|---|---|
| fourth | third | second | first | E |
| | | ABLS | GEXW | 1 |
| | | GEXW | GEXW | 2 |
| | ABLS | GEXW | ABLS | 1 |
| | GEXW | GEXW | ABLS | 2 |
| ABLS | GEXW | ABLS | ABLS | 1 |
| GEXW | GEXW | ABLS | ABLS | 2 |
| 32 | 32 | 32 | 32 | |

For several of these patterns, a W instruction may be issued, but may not be checked by the address unit, as it appears in the third or fourth instruction of the parcel or follows a G, E, or X instruction. For such cases, if the address general register is not recognized as referencing a wide microcache entry (if, for example, the general register has been changed from a previous usage), the instruction will fail to issue and will be checked on the following cycle.

For execution unit instructions (G, E, X, W) the unavailability of source general registers do not prevent their issue, as this aspect will be examined as the instructions are fetched from the E-queue. If any required general registers are absent from the ER (execution unit general register file), pseudo operations are inserted into the E-queue to copy values from the AR to the ER. The status of result operand general registers of execution unit instructions are set to E, marking their absence from the AR.

Dual General Register Files

Each thread has two general register files, one that is 64 bits wide and associated with the address units (AR), and one that is 128 bits wide and associated with the execution units (ER). A general register may be present in AR or ER, or both. Since the AR is 64 bits, the upper 64 bits of these general registers are assumed to be the sign extension of the lower 64 bits. Status bits associated with each general register keep track of the presence of the value in AR and in ER, and the completeness of the value in AR.

| | Status | AR | ER | meaning |
|---|---|---|---|---|
| 0 | A | present, complete | absent | AR only |
| 1 | EA | present, modulo | present | $AR = ER^{63 \ldots 0}$, $ER^{128 \ldots 64} \neq ER_{63}^{64}$ |
| 2 | AE | present, complete | present | AR = ER |
| 3 | E | absent | present | ER only |

General register source operands are fetched from AR or ER, depending on the class of the instruction and the operand. A and B instruction operands are generally fetched from AR, except that general register operands with status of E or EA for A.SET.cond or B.cond instructions are fetched from ER, as the comparison is performed in a G execution unit. (If both general register operands have status of A or AE, the comparison is performed in an A address unit.) L instruction operands and S instruction address operands are fetched from AR. 8 bit to 64 bit S instruction rd general register operand is fetched from AR if the status is A, EA, or AE, or fetched from ER is the status is E. 128 bit instruction rd general register operand is fetched from AR if the status is A or AE, or fetched from ER if the status is EA or E. G, E, X, and W instructions read source operands from ER, except that W instruction rc operands are fetched from AR.

General register results from performing instructions may be written to just one or both of the general register files. A or B instructions write results to the address unit general register file (AR), L instructions write results to both general register files (AR and ER), G, E, X, and W instructions write results to the execution units general register file (ER). When a result is written to only one general register file, it is absent (not present) in the other general register file. This has the beneficial effect of reducing the average number of writes that are performed to the general register files.

| | old | register reads | | register writes | | new |
|---|---|---|---|---|---|---|
| Class | status | AR | ER | AR | ER | status |
| A | | x | | x | | A |
| A.cond | A AE | x | | x | | A |
| A.cond | E EA | | x | x | | A |
| B | | x | | x | | A |
| B.cond | A AE | x | | x | | A |
| B.cond | E EA | | x | x | | A |
| L | | rc, rb | | x | x | AE, EA |
| S 8-64 | A EA AE | x | rd | | | |
| S 8-64 | E | rc, rb | rd | | | |
| S 128 | A AE | x | rd | | | |
| S 128 | EA E | rc, rb | rd | | | |
| G | | | x | | x | E |
| E | | | x | | x | E |
| X | | | x | | x | E |
| W | | rc | x | | x | E |

At the time of issue to the address unit, each of the source general registers that will be fetched from the address unit general register file (or associated bypass logic) must be present and available, and if a 128-bit operand, complete. Each of the source general registers that will be fetched from the execution unit general register file must be present.

When a general register value is absent, the value is copied from the other general register file. For copying from the ER to the AR, values are read from the ER onto the KillerBus as if performing a store operation and written to the AR. When the value is present in the AR, instruction issue is resumed. For copying from the AR to the ER, the value is read from the AR and stuffed into the EQ as if performing a load, inserting a pseudo-operation into the EQ.

Values that are about to be written to a general register file are bypassed to the source operand data ports, so values that are about to be retired can be considered available for use as sources.

Execution Queue

The execution queue (E-queue or EQ) retains issued execution unit instructions and general register file values, permitting the address unit to continue performing operations while the execution unit is waiting for memory operands. The address unit places values into the rear of the queue, and the execution unit removes entries from the front of the queue, while the memory unit inserts values into allocated spaces in the queue as load operations are completed (possibly out of order).

The format of an EQ entry is wide enough to contain two 128-bit load results, two 6-bit destination general registers these were loaded to, two one-bit flags that indicate that the results have been filled in, and two 31-bit back-end instructions (G, X, E, W)

Each EQ entry consists of 347 bits of information.

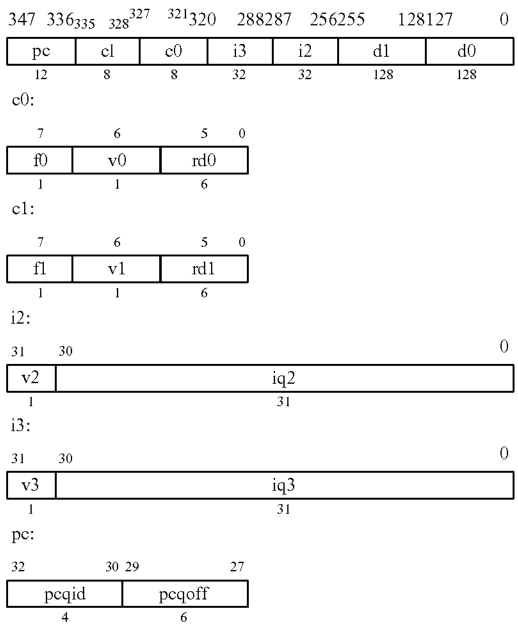

The meaning of the fields are given by the following table:

| name | size | meaning |
|---|---|---|
| d0 | 128 | data from instruction 0 of parcel |
| d1 | 128 | data from instruction 1 of parcel |
| rd0 | 6 | target general register from instruction 0 |
| rd1 | 6 | target general register from instruction 1 |
| f0 | 1 | filled instruction 0 |
| f1 | 1 | filled instruction 1 |
| v0 | 1 | valid instruction 0 |
| v1 | 1 | valid instruction 1 |
| v2 | 1 | valid instruction 2 |
| v3 | 1 | valid instruction 2 |
| iq2 | 31 | low-order 31 bits of GXEW instruction 2 |
| iq3 | 31 | low-order 31 bits of GXEW instruction 2 |
| pcqid | 4 | Identify PC-queue entry used for this parcel |
| pcqoff | 8 | Offset from PC-queue for this parcel |

In parsing a four-instruction parcel, values that the address unit loads from memory or that are copied from the address unit general register file to the execution unit are placed into the d0 and d1 fields. The latter constraint minimizes the number of values copied from address to execution via the FIFO, though in some cases extra delay is required when too many general registers are to copies into the EQ. For cycles in which more d0/d1 slots are available, this facility can be used to copy general registers that have A (address-unit only) status into the EQ, thus permitting more room in the EQ when otherwise more than two general registers would require copying.

Address Generation

The goal of the memory system is to provide high-bandwidth access to each of the four threads of execution for both instruction and data reads and data writes, over a wide variety of access patterns, yet consume a minimum amount of area and use a minimum of external bandwidth. To build a system that is robust in this way turns out to be surprisingly intricate. Simple designs of such a system that perform well for random access patterns tend to perform poorly for sequential access patterns, and vice-versa. The memory system design presented here employs multiple caching strategies to avoid poor performance pitfalls.

The performance of the memory system for several different patterns form a model of the combined patterns that we expect to encounter in general programs:

Instruction sequence or program code references tend to be relatively sequential and consume bandwidth at the rate of 32 bits per instruction. With a peak execution rate of four instructions per cycle, this pattern can consume as much as 128 bits per cycle. We assume that branch prediction mechanisms and prefetching allow the memory system to perform program code reads using otherwise available bandwidth. To attain an average rate of 128 bits per cycle, peak rates must sometime be well above this rate.

Sequential data reads occur frequently, using data sizes of 128 bits or less. For data sizes less than 128 bits, the LZC holds previously read hexlets of data that reduces the strain on the LOC. Note that for sequential byte reads, the LZC hits up to 15⁄16 of the time, while for sequential octlet reads, the LZC hits up to ½ of the time, and the sequential hexlet reads, the LZC is of no use at all, except to buffer data between the LOC and the KillerBus. A particular problem of sequential references is that most exceptional conditions in the cache affect not just one reference, but several of the references that follow, when more than one cycle is required to recover.

Sequential data writes are also frequent, and the LZC is used to buffer the LOC's 128 bit reads and writes and perform byte merging. By buffering data in the LZC, a single LOC write may retire information for several sequential stores. Stores must not be committed into the memory system until all previous instructions are retired (or we know that they will be eventually retired), so the LZC plays an important role in holding store data until commitment.

Random data reads will likely miss in the LZC, and get their data from the LOC. The MTB may hit or miss—a miss will require the use of more resources: the GTB, and LOC tags to resolve the reference. Making such references non-blocking with respect to the address unit allows the LOC to receive a high request rate that is essential to maintaing a high average throughput.

Random data writes require the use the LZC for byte merging and buffering. There are several independent activities that must each be completed before retiring a store, including resolving the cache status, reading surrounding bytes into the LZC, obtaining the store data itself from the address or execution unit, and retiring or clearing all previous instructions. Only then can the write of the LZC into the LOC be scheduled.

The address units of each of the four threads provide up to two global virtual addresses of load, store, or wide instructions, for a total of eight addresses. LTB units associated with each thread translate the local addresses into global addresses. The LZC operates on global addresses. MTB, BTB, and PTB units associated with each thread translate the global addresses into physical addresses and cache addresses. (A PTB unit associated with each thread produces physical addresses and cache addresses for program counter references. —this is optional, as by limiting address generation to two per thread, the MTB can be used for program references.) Cache addresses are presented to the LOC as required, and physical addresses are checked against cache tags as required.

Each thread has two address generation units, capable of producing two aligned, or one unaligned load or store operation per cycle. Alternatively, these units may produce a single load or store address and a branch target address.

Each thread has a LTB, which translates the two addresses into global virtual addresses.

Each thread has a MTB, which looks up the two references into the LOC. The optional PTB provides for additional references that are program code fetches.

In parallel with the MTB, these two references are combined with the six references from the other threads and partitioned into even and odd hexlet references. Up to four references are selected for each of the even and odd portions of the LZC. One reference for each of the eight banks of the LOC (four are even hexlets; four are odd hexlets) are selected from the eight load/store/branch references and the PTB references.

Some references may be directed to both the LZC and LOC, in which case the LZC hit causes the LOC data to be ignored. An LZC miss which hits in the MTB is filled from the LOC to the LZC. An LZC miss which misses in the MTB causes a GTB access and LOC tag access, then an MTB fill and LOC access, then an LZC fill.

At the LOC, a number of competing references may attempt to access a single LOC cache bank, and a fair but effective arbitration scheme is required to determine which reference to select. Fairness is important so that no thread consistently receives more access to shared resources than the others. There are also constraints introduced by the bus interface (Inquiry cycles must be responded to immediately; limited FIFO space in the bus interface may require high priority to avoid FIFO overrun), and demands for optimizing forward progress (Store should have high priority to release pipeline resources, program fetch low priority to avoid delaying loads). The general priority of access: (highest/lowest) is (0) cache inquiry, (1) cache dump, (2) cache fill, (3) store, (4) load, (5) program.

Figure 102:
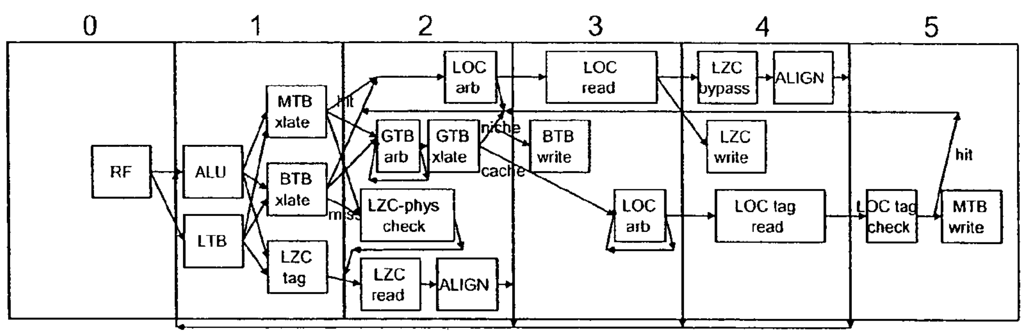
FIG. 102 is a system-level diagram showing a memory pipeline in accordance with an exemplary embodiment of the present invention.

FIG. 102 illustrates the operations that are performed to complete a load operation and the cycles in which they are performed:

The following sections specify the operation of the memory pipeline in additional detail:

Cycle 0

During the issue cycle, within each thread, the first one or two instructions are decoded and source general registers are fetched. As the general register sources are at a fixed location in the instruction and only the first two instructions are candidates for issue to the A-units, the general register fetches are performed unconditionally and in parallel with instruction decoding.

Cycle 1

During the first address generation cycle, for each thread, fetched general registers are updated with bypassed results from previous instructions, and either one or two addresses are computed.

For unaligned load and store operations, the two address units are both used to compute both the lowest address (an offset of 0) and the highest address (an offset of size−1) that is the memory target of the unaligned operation, thus only one such operation is performed at a time per thread. If these addresses cross a hexlet boundary, one address is to an odd hexlet and the other is to an even hexlet.

If both the first and second instructions are aligned load or store instructions, two independent addresses are produced. These two addresses may be two even hexlets or two odd hexlets, or one even hexlet and one odd hexlet.

If one or both of the first and second instructions are not load or store instructions, up to two additional addresses are selected using the currently fetching program counter, filling the queue with two address references.

The high order bits of the base general registers of both addresses are run through the LTB, producing two global addresses. Because the base general registers rather than the addresses are translated, the translation can be performed in parallel with the address addition. Because only high-order bits are affected, the low-order bits including particularly the "hexlet bit" are unchanged by the LTB.

The MTB attempts to translate these two global addresses to cache addresses, and the BTB attempts to translate these two global addresses to niche addresses. Either of these translation can result in a reference to the LOC (MTB as cache, BTB as niche). If both structures miss for a global address, the GTB must be consulted to resolve the address, which may eventually reach the cache, niche, or other memory-mapped structures.

The two physical or cache addresses from each thread are combined with the addresses from the other three threads, producing two collections: (0) four even hexlet addresses and (1) four odd hexlet addresses. Arbitration selects an appropriate subset of the available references for servicing, taking into account priority based on the type of reference (instruction vs. data) and queue position (higher priority for earlier instructions).

The global addresses are checked against the LZC tag for conflicts or hits.

Cycle 2

Any of the addresses that hit in the LZC on the previous cycle are accessed. Read values are sent through the aligner to the Killer-Bus and made available to the A-unit general register bypass.

Up to eight of the LOC banks are scheduled to be fetched using niche or cache addresses from the previous cycle that hit in the MTB or BTB.

The physical or cache addresses are checked against LZC physical tags for hits that were missed by a comparison of global address—these cause LZC data to be used in preference to LOC data—LZC data will be fetched on cycle 3, if present, or stalled if not present (due to pending store).

If the MTB/BTB misses, on this cycle the GTB is accessed. The access is classified as a BTB miss if the address is not cached, or an MTB miss if cached.

For an MTB miss, two LOC tag hexlets are scheduled to be fetched from the LOC, values are eventually placed into the MTB.

Cycle 3

Load results may be freely used on this cycle if fetched from the LZC.

Up to eight of the LOC banks are accessed using niche or cache addresses from the previous cycle.

For a BTB miss, the translation is placed into the BTB and a LOC niche access is scheduled to be fetched from the LOC.

Cycle 4

Accesses from the LOC on the previous cycle are sent through the LZC bypass and the aligner to the Killer Bus and made available to the A-unit general register bypass. Results are also loaded in the LZC for future use.

On a BTB miss, the LOC accesses the hexlet scheduled from the previous cycle.

On an MTB miss, the LOC accesses up to two LOC tag hexlets from the previous cycle.

Cycle 5

Load results may be freely used on this cycle if fetched from the LOC.

On an MTB miss, the MTB is updated, and a LOC fetch is scheduled for the following cycle—continue at cycle 2.

Load Latency

The latency required to service a load instruction is given by the following, assuming no collistion cycles with other memory operations: The latency is the number of clock cycles later that an instruction may use the result of an earlier load instruction.

| Condition | Latency |
|---|---|
| LZC virtual hit | 2 |
| LZC virt miss, phys hit | 3 |
| MTB hit, LOC hit | 4 |
| BTB miss | 5 |
| MTB miss, LOC hit | 7 |
| LOC miss | You want it when? |

Burst Misses

A particular concern is the effect that the latency of the MTB miss has on memory bandwidth. For sequential (stride 1) memory references of 128 bits (16 bytes), an MTB miss occurs every 16 cycles with one reference per cycle. As the MTB write does not occur until cycle 5, which is three cycles after the MTB xlate in cycle 1, there are 4 cycles in which a memory request occurs to the same cache block as the original MTB miss. Since these requests are to addresses that are not yet resolved, the MTB miss causes these references to stack up in cycle 1. Even if these references are queued, performance is not enhanced unless they can be completed in out-of-order fashion with respect to future references.

A four-cycle delay every 16 cycles is not so bad, but for two interleaved sequential references, the figure could easily be 8 cycles for every 16, or 50% degradation. Non-unit strides would induce further degradation of available rate.

To continue operation through the MTB miss, we need to detect that these additional references are to the same address as the original MTB miss, and buffer the requests accordingly. Note that after cycle 2, the address has been translated by the GTB and is known, though we do not know whether the cache block is present, or which set is employed until cycle 5. The LOC address used in cycle 6 can be employed simultaneously for all LOC banks that have been refenced, thus allowing the memory system to catch up with the references.

To implement this, we need only keep track of the attachment of these additional references to the original MTB-miss causing reference, and keep a bitwise map of which banks are to be read upon verification of the cache hit. If not all banks are successfully allocated to the reference, additional cycles are then employed until the group reference is satisfied. If the cache misses, the bitwise map can again be employed to determine which sub-blocks to fill.

To attach these references to the original MTB miss, the virtual address of the MTB miss must be compared against each additional memory reference address that is attempted. A match causes the bitwise map to be set for the indicated reference.

Since there are 8 banks in the LOC, only half of the cache line can be simultaneously referenced. This overlapped handling may be limited to one-half of the cache line, which still allows for as many as eight cycles to be handled in this way.

One way to handle the comparison is to create a matching MTB entry with the virtual address filled in, but a distinct state showing an unresolved MTB miss. The bitwise map may be retained in the tv bits of the MTB. The state may use bits 5-6 otherwise currently unspecified. This MTB entry could be filled in as soon as the MTB miss is detected, though this risks burning out a valid MTB entry whenever there is a BTB miss. (Otherwise this can be performed as soon as the GTB contents indicate a cacheable MTB miss.) By immediately filling in the MTB, up to two simultaneous MTB misses can be handled on each cycle, so that address generation need not stop for MTB misses. The two addresses generated on one cycle must also be compared against each other so that a single MTB entry is created with two simultaneous references experience the same MTB miss.

If the reference turns out to be a BTB miss or uncached memory reference, the MTB data can be used to keep appropriate LOC bank or sub-line information.

Memory Banks

The LZC has two banks, each servicing up to four requests. The LOC has eight banks, each servicing at most one request.

Figure 103:
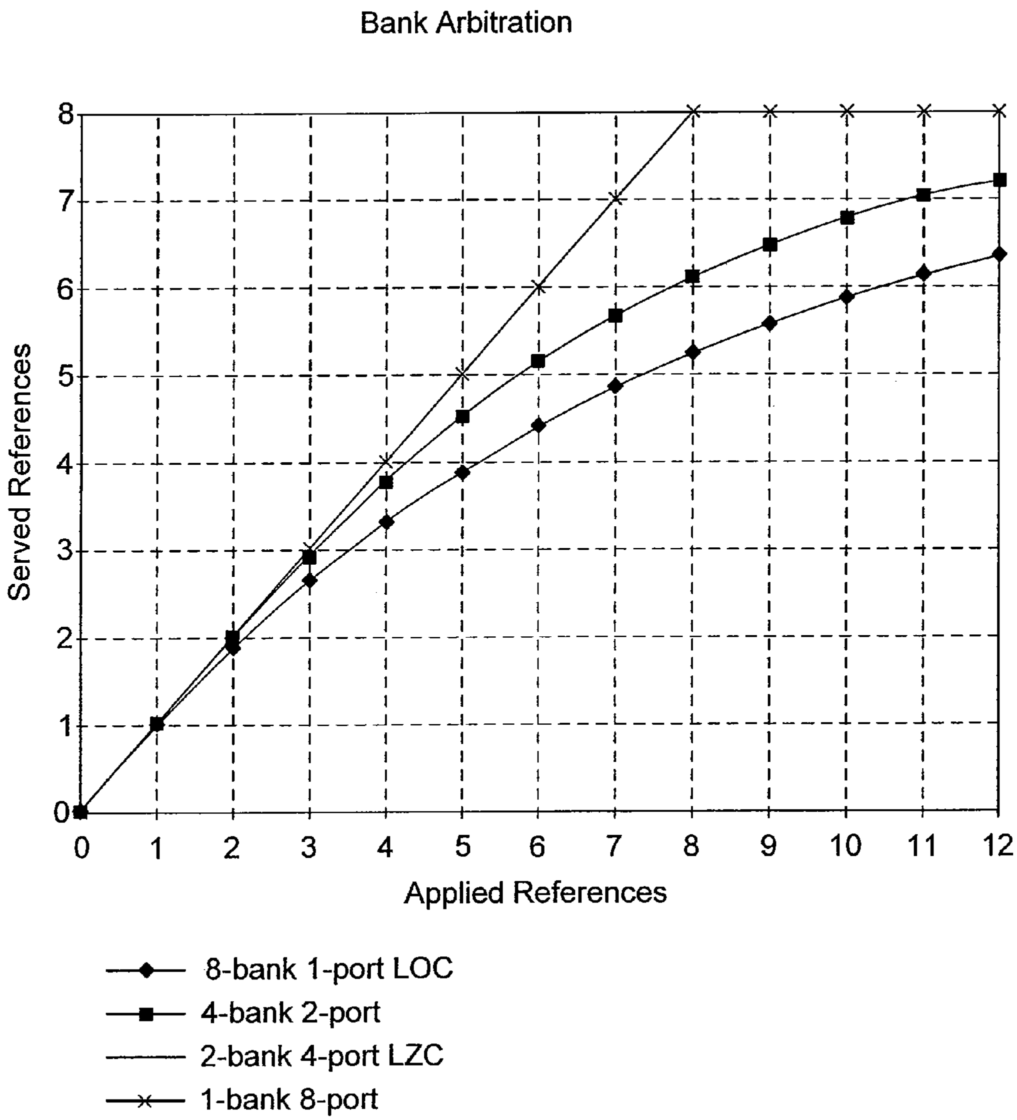
FIG. 103 illustrates an expected rate at which memory requests are serviced in accordance with an exemplary embodiment of the present invention.

Assuming random request addresses, FIG. 103 shows the expected rate at which requests are serviced by multi-bank/multi-port memories that have 8 total ports and divided into 1, 2, 4, or 8 interleaved banks. The LZC is 2 banks, each with 4 ports, and the LOC is 8 banks, each 1 port.

Note a small difference between applying 12 references versus 8 references for the LOC (6.5 vs 5.2), and for the LZC (7.8 vs. 6.9). This suggests that simplifying the system to produce two address per thread (program+load/store or two load/store) will not overly hurt performance. A closer simulation, taking into account the sequential nature of the program and load/store traffic may well yield better numbers, as threads will tend to line up in non-interfering patterns, and program microcaching reduces program fetching.

Figure 104:
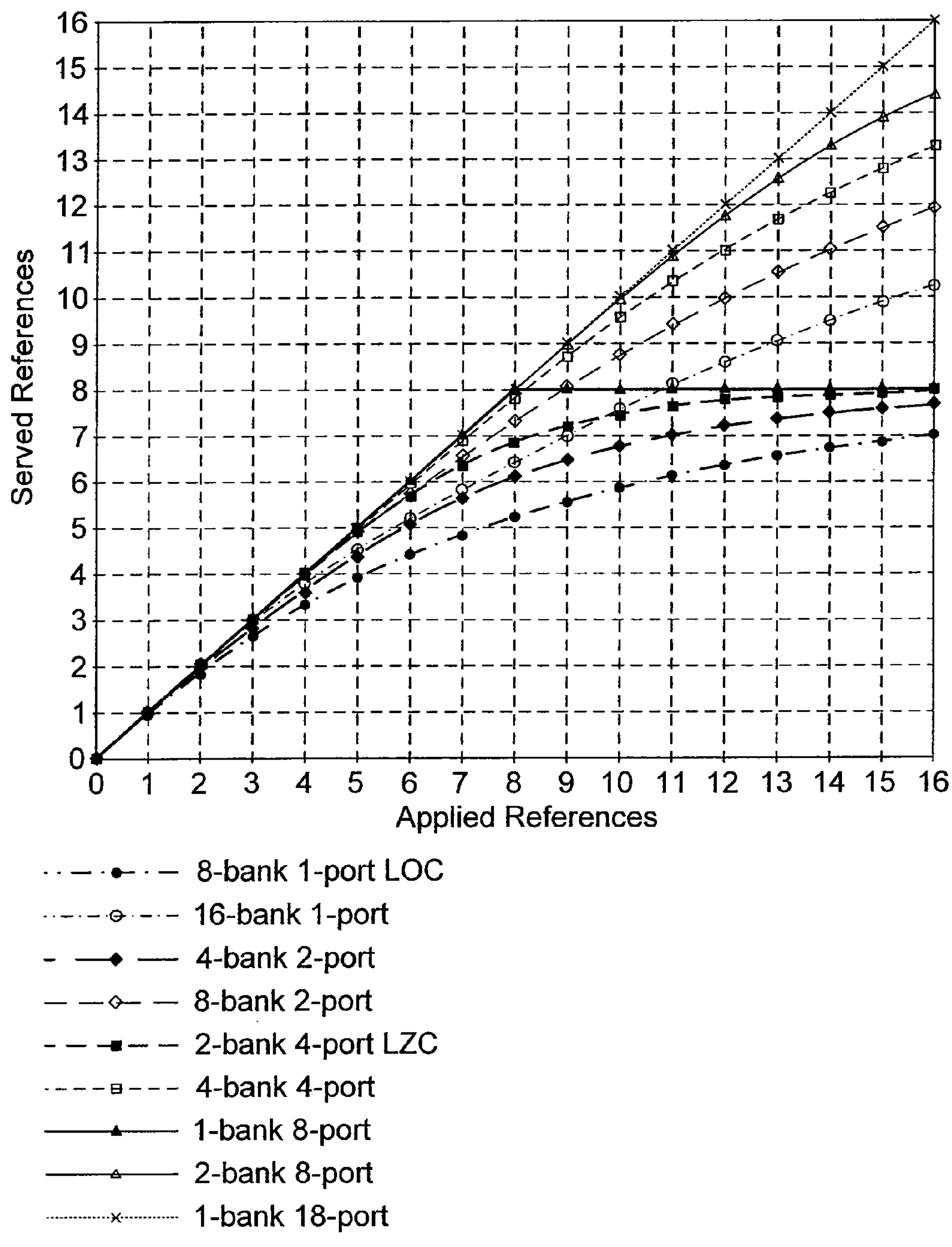
FIG. 104 illustrates an expected rate at which memory requests are serviced in accordance with an exemplary embodiment of the present invention.

FIG. 104 shows the rates for both 8 total ports and 16 total ports.

Note significant differences between 8-port systems and 16-port systems, even when used with a maximum of 8 applied references. In particular, a 16-bank 1-port system is better than a 4-bank 2-port system with more than 6 applied references. Current layout estimates would require about a 14% area increase (assuming no savings from smaller/simpler sense amps) to switch to a 16-port LOC, with a 22% increase in 8-reference throughput.

Wide Microcache

A wide microcache (WMC) holds only data fetched for wide (W) instructions, for each unit which implements one or more wide (W) instructions.

The wide (W) instructions each operate on a block of data fetched from memory and the contents of one or more general registers, producing a result in a general register. Generally, the amount of data in the block exceeds the maximum amount of data that the memory system can supply in a single cycle, so caching the memory data is of particular importance. All the wide (W) instructions require that the memory data be located at an aligned address, an address that is a multiple of the size of the memory data, which is always a power of two.

The wide (W) instructions are performed by functional units which normally perform execute or "back-end" instructions, though the loading of the memory data requires use of the access or "front-end" functional units. To minimize the use of the "front-end" functional units, special rules are used to maintain the coherence of a wide microcache (WMC).

Execution of a wide (W) instruction has a residual effect of loading the specified memory data into a wide microcache (WMC). Under certain conditions, a future wide (W) instruction may be able to reuse the WMC contents.

FIG. 7 illustrates the specific structures required to implement the wide microcache:

First of all, any store or cache coherency action on the physical addresses referenced by the WMC will invalidate the contents of the WMC. The minimum translation unit of the virtual memory system, 256 bytes, defines the number of physical address blocks which must be checked by any store. A WMC for the W.TABLE instruction may be as large as 4096 bytes, and so requires as many as 16 such physical address blocks to be checked for each WMC entry. A WMC for the W.SWITCH or W.MUL.* instructions need check only one address block for each WMC entry, as the maximum size is 128 bytes.

By making these checks on the physical addresses, we do not need to be concerned about changes to the virtual memory mapping from virtual to physical addresses, and the virtual memory state can be freely changed without invalidating any WMC.

Absent any of the above changes, the WMC is only valid if it contains the contents relevant to the current wide (W) instruction. To check this with minimal use of the front-end units, each WMC entry contains a first tag with the thread and address general register for which it was last used. If the current wide (W) instruction uses the same thread and address general register, it may proceed safely. Any intervening writes to that address general register by that thread invalidates the WMC thread and address general register tag.

If the above test fails, the front-end is used to fetch the address general register and check its contents against a second WMC tag, with the physical addresses for which it was last used. If the tag matches, it may proceed safely. As detailed above, any intervening stores or cache coherency action by any thread to the physical addresses invalidates the WMC entry.

If both the above tests fail for all relevant WMC entries, there is no alternative but to load the data from the virtual memory system into the WMC. The front-end units are responsible for generating the necessary addresses to the virtual memory system to fetch the entire data block into a WMC.

For the first implementation, it is anticipated that there be eight WMC entries for each of the two X units (for W.SWITCH instructions), eight WMC entries for each of the two E units (for W.MUL instructions), and four WMC entries for the single T unit. The total number of WMC address tags requires is 8*2*1+8*2*1+4*1*16=96 entries.

The number of WMC address tags can be substantially reduced to 32+4=36 entries by making an implementation restriction requiring that a single translation block be used to translate the data address of W.TABLE instructions. With this restriction, each W.TABLE WMC entry uses a contiguous and aligned physical data memory block, for which a single address tag can contain the relevant information. The size of such a block is a maximum of 4096 bytes. The restriction can be checked by examining the size field of the referenced GTB entry.

Referring to FIG. 9, the following data structures are employed to implement the wide microcache.

The flow chart in FIG. 8 illustrates the algorithm employed by the wide microcache control logic to ensure that the microcache is valid.

The diarams in FIGS. 10-11 illustrate the implementation of the microcache control:

Level Zero Cache

The innermost cache level, here named the "Level Zero Cache," (LZC) is fully associative and indexed by global address. Entries in the LZC contain global addresses and previously fetched data from the memory system. The LZC is an implementation feature, not visible to the Zeus architecture.

Entries in the LZC are also used to hold the global addresses of store instructions that have been issued, but not yet completed in the memory system. The LZC entry may also contain the data associated with the global address, as maintained either before or after updating with the store data. When it contains the post-store data, results of stores may be forwarded directly to the requested reference.

With an LZC hit, data is returned from the LZC data, and protection from the LZC tag. No LOC access is required to complete the reference.

All loads and program fetches are checked against the LZC for conflicts with entries being used as store buffer. On a LZC hit on such entries, if the post-store data is present, data may be returned by the LZC to satisfy the load or program fetch. If the post-store data is not present, the load or program fetch must stall until the data is available.

With an LZC miss, a victim entry is selected, and if dirty, the victim entry is written to the LOC. An entry allocated as store buffer, but that has not yet been retired, is not a suitable choice as victim entry. The LOC cache is accessed, and a valid LZC entry is constructed from data from the LOC and tags from the LOC protection information.

All stores are checked against the LZC for conflicts, and further allocate an entry in the LZC, or "take over" a previously clean LZC entry for the purpose of store buffering. Unaligned stores may require two entries in the LZC. At time of allocation, the address is filled in.

Two operations then occur in parallel—1) for write-back cached references, the remaining bytes of the hexlet are loaded from the LOC (or LZC), and 2) the addressed bytes are filled in with data from data path. If an exception causes the store to be purged before retirement, the LZC entry is marked invalid, and not written back. When the store is retired, the LZC entry can be written back to LOC or external interface.

Physical Address Coherency

When the mapping from global address to physical address is many-to-one, that is more than one global address may map to a single physical address, special consideration must be given to coherence of memory transactions. For each LZC entry, either the physical address (for references that are not cached) or the cache physical address (for cache or niche references) is retained. Each store operation produces the niche address from the BTB or the cache address from the MTB, or the physical address from the GTB, and a comparison of physical tags is used to serialize references for which the physical tags match.

When a store address matches an LZC entry, even though the global address did not match, the matching LZC entry must be retired or purged. When a load address matches an LZC entry, even though the global address did not match, the matching LZC entry must be retired, purged, or retagged with the global address.

Each of the WMC entries must be checked for coherency as well—this is performed with a similar structure (and similar timing) as the LZC physical tag check. The effect of a match is to invalidate the WMC when such a store address matches the WMC physical address.

Structure

The eight memory addresses are partitioned into up to four odd addresses, and four even addresses.

The LZC contains 16 fully associative entries that may each contain a single hexlet of data at even hexlet addresses (LZCE), and another 16 entries for odd hexlet addresses (LZCO). The maximum capacity of the LZC is 16*32=512 bytes.

The tags for these entries are indexed by global virtual address (63 . . . 5), and contain access control information, detailed below.

The address of entries accessed associatively is also encoded into binary and provided as output from the tags for use in updating the LZC, through its write ports.

8 bit rwxg
16 bit valid
16 bit dirty
4 bit L0$ address
16 bit protection
56-bit physical address
1-bit LOC presence

```
def data,protect,valid,dirty,match ← LevelZeroCacheRead(ga) as
   eo ← ga_4
   match ← NONE
   for i ← 0 to LevelZeroCacheEntries/2−1
      if (ga_63..5 = LevelZeroTag[eo][i] then
         match ← i
      endif
   endfor
   if match = NONE then
      raise LevelZeroCacheMiss
   else
      data ← LevelZeroData[eo][match]_127..0
      valid ← LevelZeroData[eo][match]_143..128
      dirty ← LevelZeroData[eo][match]_159..144
      protect ← LevelZeroData[eo][match]_167..160
   endif
enddef
```

Micro Translation Buffer

The Micro Translation Buffer (MTB) is an implementation-dependent structure which reduces the access traffic to the GTB and the LOC tags. The MTB contains and caches information read from the GTB and LOC tags, and is consulted on each access to the LOC.

To access the LOC, a global address is supplied to the Micro-Translation Buffer (MTB), which associatively looks up the global address into a table holding a subset of the LOC tags. In addition, each table entry contains the physical address bits 14 . . . 8 (7 bits) and set identifier (2 bits) required to access the LOC data.

In the first Zeus implementation, there are two MTB blocks—MTB 0 is used for threads 0 and 1, and MTB 1 is used for threads 2 and 3. Per clock cycle, each MTB block can check for 4 simultaneous references to the LOC. Each MTB block has 16 entries.

Each MTB entry consists of a bit less than 128 bits of information, including a 56-bit global address tag, 8 bits of privilege level required for read, write, execute, and gateway access, a detail bit, and 10 bits of cache state indicating for each triclet (32 bytes) sub-block, the MESI state.

Match

| 63 … 8 | 7 … 4 | 3 … 0 |
|---|---|---|
| ga | | |
| 56 | 4 | 4 |

Output

The output of the MTB combines physical address and protection information from the GTB and the referenced cache line.

| 56 … 48 | 47 … 39 | 38 … 27 | 26 … 16 | 15 … 8 | 7 … 0 |
|---|---|---|---|---|---|
| gi | xi | vs | ct | gp1 | gp0 |
| 9 | 9 | 12 | 11 | 8 | 8 |

gp0:

| 6 | 5 | 4 | 3 … 0 (so) | cc … 0 |
|---|---|---|---|---|
| 0 | 0 | da | so | cc |
| 1 | 1 | 1 | 1 | 3 |

gp1:

| 15 … 14 | 13 … 12 | 11 … 10 | 9 … 8 |
|---|---|---|---|
| g | x | w | r |
| 2 | 2 | 2 | 2 |

ct:

| 26 | 25 … 24 | 23 … 16 |
|---|---|---|
| da | mesi | tv |
| 1 | 2 | 8 |

vs:

| 38 … 36 | 35 … 33 | 32 … 30 | 29 … 27 |
|---|---|---|---|
| vs3 | vs2 | vs1 | vs0 |
| 3 | 3 | 3 | 3 |

xi:

| 47 … 41 | 40 … 39 |
|---|---|
| ci | si |
| 7 | 2 |

gi:

| 56 … 48 |
|---|
| gi |
| 9 |

The meaning of the fields are given by the following table:

| name | size | meaning |
|---|---|---|
| ga | 56 | global address |
| gi | 9 | GTB index |
| ci | 7 | cache index |
| si | 2 | set index |
| vs | 12 | victim select |
| da | 1 | detail access (from cache line) |
| mesi | 2 | coherency: modified (3), exclusive (2), shared (1), invalid (0) |
| tv | 8 | triclet valid (1) or invalid (0) |
| g | 2 | minimum privilege required for gateway access |
| x | 2 | minimum privilege required for execute access |
| w | 2 | minimum privilege required for write access |
| r | 2 | minimum privilege required for read access |
| 0 | 1 | reserved |
| da | 1 | detail access (from GTB) |

-continued

| name | size | meaning |
|---|---|---|
| so | 1 | strong ordering |
| cc | 3 | cache control |

With an MTB hit, the resulting cache index (14 . . . 8 from the MTB, bit 7 from the LA) and set identifier (2 bits from the MTB) are applied to the LOC data bank selected from bits 6 . . . 4 of the GVA. The access protection information (pr and rwxg) is supplied from the MTB.

With an MTB (and BTB) miss, a victim entry is selected for replacement. The MTB and BTB are always clean, so the victim entry is discarded without a writeback. The GTB (described below) is referenced to obtain a physical address and protection information. Depending on the access information in the GTB, either the MTB or BTB is filled.

Note that the processing of the physical address $pa_{14 \ldots 8}$ against the niche limit nl can be performed on the physical address from the GTB, producing the LOC address, ci. The LOC address, after processing against the nl is placed into the MTB directly, reducing the latency of an MTB hit.

Four tags are fetched from the LOC tags and compared against the PA to determine which of the four sets contain the data. If one of the four sets contains the correct physical address, a victim MTB entry is selected for replacement, the MTB is filled and the LOC access proceeds. If none of the four sets is a hit, an LOC miss occurs.

The operation of the MTB is largely not visible to software—hardware mechanisms are responsible for automatically initializing, filling and flushing the MTB. Activity that modifies the GTB or LOC tag state may require that one or more MTB entries are flushed.

A write to the GTBUpdate register that updates a matching entry, a write to the GTBUpdateFill register, or a direct write to the GTB all flush relevant entries from the MTB. MTB flushing is accomplished by searching MTB entries for values that match on the gi field with the GTB entry that has been modified. Each such matching MTB entry is flushed.

The MTB is kept synchronous with the LOC tags, particularly with respect to MESI state. On an LOC miss or LOC snoop, any changes in MESI state update (or flush) MTB entries which physically match the address. If the MTB may contain less than the full physical address: it is sufficient to retain the LOC physical address (ci||v||si).

Block Translation Buffer

Zeus has a per thread "Block Translation Buffer" (BTB). The BTB retains GTB information for uncached address blocks. An implementation may limit use of the BTB to address blocks that reference the LOC niche, as is done in the first implementation, or alternatively may permit the BTB to contain any uncache address block. The BTB is used in parallel with the MTB—at most one of the BTB or MTB may translate a particular reference. When both the BTB and MTB miss, the GTB is consulted, and depending on the result, the block is filled into either the MTB or BTB as appropriate. In the first Zeus implementation, the BTB has 2 entries for each thread.

BTB entries cover any power-of-two granularity, as they retain the size information from the GTB. BTB entries contain no MESI state, as they only contain uncached blocks.

Each BTB entry consists of 128 bits of information, containing the same information in the same format as a GTB entry, although if limited in use to the LOC niche, only the LOC physical address must be maintained, and sufficient block size to cover the LOC niche.

The operation of the BTB is largely not visible to software—hardware mechanisms are responsible for automatically initializing, filling and flushing the BTB. Activity that modifies the GTB may require that one or more BTB entries are flushed.

A write to the GTBUpdate register that updates a matching entry, a write to the GTBUpdateFill register, or a direct write to the GTB all flush relevant entries from the BTB. BTB flushing is accomplished by searching BTB entries for values that match on the gi field with the GTB entry that has been modified. Each such matching BTB entry is flushed.

Niche blocks are indicated by GTB information, and correspond to blocks of data that are retained in the LOC and never miss. A special physical address range indicates niche blocks. For this address range, the BTB enables use of the LOC as a niche memory, generating the "set select" address bits from low-order address bits. There is no checking of the LOC tags for consistent use of the LOC as a niche—the nl field must be preset by software so that LOC cache replacement never claims the LOC niche space, and only BTB miss and protection bits prevent software from using the cache portion of the LOC as niche.

Other address ranges include other on-chip resources, such as bus interface registers, the control register and status register, as well as off-chip memory, accessed through the bus interface. Each of these regions are accessible as uncached memory.

Program Translation Buffer

Later implementations of Zeus may optionally have a per-thread "Program Translation Buffer" (PTB). The PTB retains GTB and LOC cache tag information. The PTB enables generation of LOC instruction fetching in parallel with load/store fetching. The PTB is updated when instruction fetching crosses a cache line boundary (each 64 instructions in straight-line code). The PTB functions similarly to a one-entry MTB, but can use the sequential nature of program code fetching to avoid checking the 56-bit match. The PTB is flushed at the same time as the MTB.

The initial implementation of Zeus has no PTB—the MTB suffices for this function.

Global Virtual Cache

The initial implementation of Zeus contains cache which is both indexed and tagged by a physical address. Other prototype implementations have used a global vitual address to index and/or tag an internal cache. This section will define the required characteristics of a global vitually-indexed cache. TODO Memory Interface Dedicated hardware mechanisms are provided to fetch data blocks in the levels zero and one caches, provided that a matching entry can be found in the MTB or GTB (or if the MMU is disabled). Dedicated hardware mechanisms are provided to store back data blocks in the level zero and one caches, regardless of the state of the MTB and GTB. When no entry is to be found in the GTB, an exception handler is invoked either to generate the required information from the virtual address, or to place an entry in the GTB to provide for automatic handling of this and other similarly addressed data blocks.

The initial implementation of Zeus accesses the remainder of the memory system through the "Socket 7" interface. Via this interface, Zeus accesses a secondary cache, DRAM memory, external ROM memory, and an I/O system The size and presence of the secondary cache and the DRAM memory array, and the contents of the external ROM memory and the I/O system are variables in the processor environment.

Snoop

The "Super Socket 7" bus requires certain bus accesses to be checked against on-chip caches. On a bus read, the address is checked against the on-chip caches, with accesses aborted when requested data is in an internal cache in the M state, and the E state, the internal cache is changed to the S state. On a bus write, data written must update data in on-chip caches. To meet these requirements, physical bus addresses must be checked against the LOC tags.

The SS7 bus requires that responses to inquire cycles occur with fixed timing. At least with certain combinations of bus and processor clock rate, inquire cycles will require top priority to meet the inquire response timing requirement.

Synchronization operations must take into account bus activity—generally a synchronization operation can only proceed on cached data which is in Exclusive or Modified—if cached data in Shared state, ownership must be obtained. Data that is not cached must be accessed using locked bus cycles.

Load

Load operations require partitioning into reads that do not cross a hexlet (128 bit) boundary, checking for store conflicts, checking the LZC, checking the LOC, and reading from memory. Execute and Gateway accesses are always aligned and since they are smaller than a hexlet, do not cross a hexlet boundary.

Note: S7 processors perform unaligned operations LSB first, MSB last, up to 64 bits at a time. Unaligned 128 bit loads need 3 64-bit operations, LSB, octlet, MSB. Transfers which are smaller than a hexlet but larger than an octlet are further divided in the S7 bus unit.

Definition

```
def data ← LoadMemoryX(ba,la,size,order)
    assert (order = L) and ((la and (size/8−1)) = 0) and (size = 32)
    hdata ← TranslateAndCacheAccess(ba,la,size,X,0)
    data ← hdata_{31+8*(la and 15)..8*(la and 15)}
enddef
def data ← LoadMemoryG(ba,la,size,order)
    assert (order = L) and ((la and (size/8−1)) = 0) and (size = 64)
    hdata ← TranslateAndCacheAccess(ba,la,size,G,0)
    data ← hdata_{63+8*(la and 15)..8*(la and 15)}
enddef
def data ← LoadMemory(ba,la,size,order)
    if (size > 128) then
        data0 ← LoadMemory(ba, la,size/2, order)
        data1 ← LoadMemory(ba, la+(size/2), size/2, order)
        case order of
            L:
                data □ data1 || data0
            B:
                data □ data0 || data1
        endcase
    else
        bs ← 8*la_{4..0}
        be ← bs + size
        if be > 128 then
            data0 ← LoadMemory(ba, la, 128 − bs, order)
            data1 ← LoadMemory(ba, (la_{63..5} + 1) || 0^4, be − 128, order)
```

-continued

```
            case order of
                L:
                    data ← (data1 || data0)
                B:
                    data ← (data0 || data1)
            endcase
        else
            hdata ← TranslateAndCacheAccess(ba,la,size,R,0)
            for i ← 0 to size−8 by 8
                j ← bs + ((order=L) ? i : size−8−i)
                data_{i+7..i} ← hdata_{j+7..j}
            endfor
        endif
    endif
enddef
```

Store

Store operations requires partitioning into stores less than 128 bits that do not cross hexlet boundaries, checking for store conflicts, checking the LZC, checking the LOC, and storing into memory.

Definition

```
def StoreMemory(ba,la,size,order,data)
    bs ← 8*la_{4..0}
    be ← bs + size
    if be > 128 then
        case order of
            L:
                data0 ← data_{127−bs..0}
                data1 ← data_{size−1..128−bs}
            B:
                data0 ← data_{size−1..be−128}
                data1 ← data_{be−129..0}
        endcase
        StoreMemory(ba, la, 128 − bs, order, data0)
        StoreMemory(ba, (la_{63..5} + 1) || 0^4, be − 128, order, data1)
    else
        for i ← 0 to size−8 by 8
            j ← bs + ((order=L) ? i : size−8−i)
            hdata_{j+7..j} ← data_{i+7..i}
        endfor
        xdata ← TranslateAndCacheAccess(ba, la, size, W, hdata)
    endif
enddef
```

Memory

Memory operations require first translating via the LTB and GTB, checking for access exceptions, then accessing the cache.

Definition

```
def hdata ← TranslateAndCacheAccess(ba,la,size,rwxg,hwdata)
  if ControlRegister62 then
    case rwxg of
      R:
        at ← 0
      W:
        at ← 1
      X:
        at ← 2
      G:
        at ← 3
    endcase
    rw ← (rwxg=W) ? W : R
    ga,LocalProtect ← LocalTranslation(th,ba,la,pl)
    if LocalProtect9+2*at..8+2*at < pl then
      raise AccessDisallowedByLTB
    endif
    lda ← LocalProtect4
    pa,GlobalProtect ← GlobalTranslation(th,ga,pl,lda)
    if GlobalProtect9+2*at..8+2*at < pl then
      raise AccessDisallowedByGTB
    endif
    cc ← (LocalProtect2..0 > GlobalProtect2..0) ? LocalProtect2..0 : GlobalProtect2..0
    so ← LocalProtect3 or GlobalProtect3
    gda ← GlobalProtect4
    hdata,TagProtect ← LevelOneCacheAccess(pa,size,lda,gda,cc,rw,hwdata)
    if (lda ^ gda ^ TagProtect) = 1 then
      if TagProtect then
        PerformAccessDetail(AccessDetailRequiredByTag)
      elseif gda then
        PerformAccessDetail(AccessDetailRequiredByGlobalTB)
      else
        PerformAccessDetail(AccessDetailRequiredByLocalTB)
      endif
    endif
  else
    case rwxg of
      R, X, G:
        hdata ← ReadPhysical(la,size)
      W:
        WritePhysical(la,size,hwdata)
    endcase
  endif
enddef
```

Bus Interface

The initial implementation of the Zeus processor uses a "Super Socket 7 compatible" (SS7) bus interface, which is generally similar to and compatible with other "Socket 7" and "Super Socket 7" processors such as the Intel Pentium, Pentium with MMX Technology; AMD K6, K6-11, K6-III; IDT Winchip C6, 2, 2A, 3, 4; Cyrix 6×86, etc. and other "Socket 7" chipsets listed below.

The SS7 bus interface behavior is quite complex, but well-known due to the leading position of the Intel Pentium design. This document does not ye2t contain all the detailed information related to this bus, and will concentrate on the differences between the Zeus SS7 bus and other designs. For functional specification and pin interface behavior, the *Pentium Processor Family Developer's Manual* is a primary reference. For 100 MHz SS7 bus timing data, the *AMD K6-2 Processor Data Sheet* is a primary reference.

Motherboard Chipsets

The following motherboard chipsets are designed for the 100 MHz "Socket 7" bus:

| Manufacturer | Website | Chipset | clock rate | North bridge | South bridge |
|---|---|---|---|---|---|
| VIA technologies, Inc. | www.via.com.tw | Apollo MVP3 | 100 MHz | vt82c598at | vt82c598b |
| Silicon Integrated Systems | www.sis.com.tw | SiS 5591/5592 | 75 MHz | SiS 5591 | SiS 5595 |
| Acer Laboratories, Inc. | www.acerlabs.com | Ali Aladdin V | 100 MHz | M1541 | M1543C |

The following processors are designed for a "Socket 7" bus:

| Manufacturer | Website | Chips | clock rate |
|---|---|---|---|
| Advanced Micro Devices | www.amd.com | K6-2 | 100 MHz |
| Advanced Micro Devices | www.amd.com | K6-3 | 100 MHz |
| Intel | www.intel.com | Pentium MMX | 66 MHz |

-continued

| Manufacturer | Website | Chips | clock rate |
|---|---|---|---|
| IDT/Centaur | www.winchip.com | Winchip C6 | 75 MHz |
| IDT/Centaur | www.winchip.com | Winchip 2 | 100 MHz |
| IDT/Centaur | www.winchip.com | Winchip 2A | 100 MHz |
| IDT/Centaur | www.winchip.com | Winchip 4 | 100 MHz |
| NSM/Cyrix | www.cyrix.com | | |

Pinout

Figure 105:
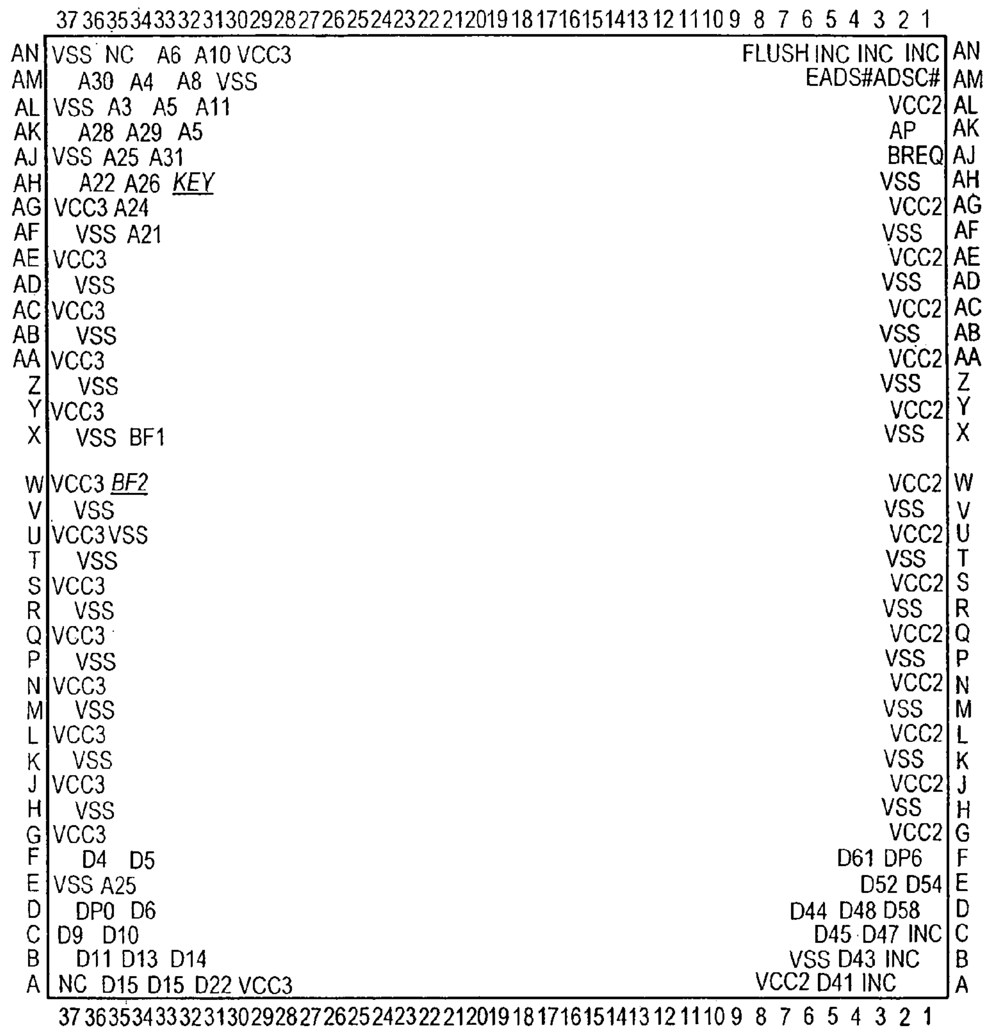
FIG. 105 is a pinout diagram in accordance with an exemplary embodiment of the present invention.

In FIG. 105, signals which are different from Pentium pinout, are indicated by italics and underlining. Generally, other Pentium-compatible processors (such as the AMD K6-2) define these signals.

Pin Summary

| | | |
|---|---|---|
| A20M# | I | Address bit 20 Mask is an emulator signal. |
| A31 . . . A3 | IO | Address, in combination with byte enable, indicate the physical addresses of memory or device that is the target of a bus transaction. This signal is an output, when the processor is initiating the bus transaction, and an input when the processor is receiving an inquire transaction or snooping another processor's bus transaction. |
| ADS# | IO | ADdress Strobe, when asserted, indicates new bus transaction by the processor, with valid address and byte enable simultaneously driven. |
| ADSC# | O | Address Strobe Copy is driven identically to address strobe |
| AHOLD | I | Address HOLD, when asserted, causes the processor to cease driving address and address parity in the next bus clock cycle. |
| AP | IO | Address Parity contains even parity on the same cycle as address. Address parity is generated by the processor when address is an output, and is checked when address is an input. A parity error causes a bus error machine check. |
| APCHK# | O | Address Parity CHecK is asserted two bus clocks after EADS# if address parity is not even parity of address. |
| APICEN | I | Advanced Programmable Interrupt Controller ENable is not implemented. |
| BE7# . . . BE0# | IO | Byte Enable indicates which bytes are the subject of a read or write transaction and are driven on the same cycle as address. |
| BF1 . . . BF0 | I | Bus Frequency is sampled to permit software to select the ratio of the processor clock to the bus clock. |
| BOFF# | I | BackOFF is sampled on the rising edge of each bus clock, and when asserted, the processor floats bus signals on the next bus clock and aborts the current bus cycle, until the backoff signal is sampled negated. |
| BP3 . . . BP0 | O | BreakPoint is an emulator signal. |
| BRDY# | I | Bus ReaDY indicates that valid data is present on data on a read transaction, or that data has been accepted on a write transaction. |
| BRDYC# | I | Bus ReaDY Copy is identical to BRDY#; asserting either signal has the same effect. |
| BREQ | O | Bus REQuest indicates a processor initiated bus request. |
| BUSCHK# | I | BUS CHecK is sampled on the rising edge of the bus clock, and when asserted, causes a bus error machine check. |
| CACHE# | O | CACHE, when asserted, indicates a cacheable read transaction or a burst write transaction. |
| CLK | I | bus CLocK provides the bus clock timing edge and the frequency reference for the processor clock. |
| CPUTYP | I | CPU TYPe, if low indicates the primary processor, if high, the dual processor. |
| D/C# | I | Data/Code is driven with the address signal to indicate data, code, or special cycles. |
| D63 . . . D0 | IO | Data communicates 64 bits of data per bus clock. |
| D/P# | O | Dual/Primary is driven (asserted, low) with address on the primary processor |
| DP7 . . . DP0 | IO | Data Parity contains even parity on the same cycle as data. A parity error causes a bus error machine check. |
| DPEN# | IO | Dual Processing Enable is asserted (driven low) by a Dual processor at reset and sampled by a Primary processor at the falling edge of reset. |
| EADS# | I | External Address Strobe indicates that an external device has driven address for an inquire cycle. |
| EWBE# | I | External Write Buffer Empty indicates that the external system has no pending write. |
| FERR# | O | Floating point ERRor is an emulator signal. |
| FLUSH# | I | cache FLUSH is an emulator signal. |
| FRCMC# | I | Functional Redundancy Checking Master/Checker is not implemented. |
| HIT# | IO | HIT indicates that an inquire cycle or cache snoop hits a valid line. |
| HITM# | IO | HIT to a Modfied line indicates that an inquire cycle or cache snoop hits a sub-block in the M cache state. |

-continued

| | | |
|---|---|---|
| HLDA | O | bus HoLD Acknowlege is asserted (driven high) to acknowlege a bus hold request |
| HOLD | I | bus HOLD request causes the processor to float most of its pins and assert bus hold acknowlege after completing all outstanding bus transactions, or during reset. |
| IERR# | O | Internal ERRor is an emulator signal. |
| IGNNE# | I | IGNore Numeric Error is an emulator signal. |
| INIT | I | INITialization is an emulator signal. |
| INTR | I | maskable INTeRrupt is an emulator signal. |
| INV | I | INValidation controls whether to invalidate the addressed cache sub-block on an inqure transaction. |
| KEN# | I | Cache ENable is driven with address to indicate that the read or write transaction is cacheable. |
| LINT1 . . . LINT0 | I | Local INTerrupt is not implemented. |
| LOCK# | O | bus LOCK is driven starting with address and ending after bus ready to indicate a locked series of bus transactions. |
| M/IO# | O | Memory/Input Output is driven with address to indicate a memory or I/O transaction. |
| NA# | I | Next Address indicates that the external system will accept an address for a new bus cycle in two bus clocks. |
| NMI | I | Non Maskable Interrupt is an emulator signal. |
| PBGNT# | IO | Private Bus GraNT is driven between Primary and Dual processors to indicate that bus arbitration has completed, granting a new master access to the bus. |
| PBREQ# | IO | Private Bus REQuest is driven between Primary and Dual processors to request a new master access to the bus. |
| PCD | O | Page Cache Disable is driven with address to indicate a not cacheable transaction. |
| PCHK# | O | Parity CHecK is asserted (driven low) two bus clocks after data appears with odd parity on enabled bytes. |
| PHIT# | IO | Private HIT is driven between Primary and Dual processors to indicate that the current read or write transaction addresses a valid cache sub-block in the slave processor. |
| PHITM# | IO | Private HIT Modified is driven between Primary and Dual processors to indicate that the current read or write transaction addresses a modified cache sub-block in the slave processor. |
| PICCLK | I | Programmable Interrupt Controller CLocK is not implemented. |
| PICD1 . . . PICD0 | IO | Programmable Interrupt Controller Data is not implemented. |
| PEN# | I | Parity Enable, if active on the data cycle, allows a parity error to cause a bus error machine check. |
| PM1 . . . PM0 | O | Performance Monitoring is an emulator signal. |
| PRDY | O | Probe ReaDY is not implemented. |
| PWT | O | Page Write Through is driven with address to indicate a not write allocate transaction. |
| R/S# | I | Run/Stop is not implemented. |
| RESET | I | RESET causes a processor reset. |
| SCYC | O | Split CYCle is asserted during bus lock to indicate that more than two transactions are in the series of bus transactions. |
| SMI# | I | System Management Interrupt is an emulator signal. |
| SMIACT# | O | System Management Interrupt ACTive is an emulator signal. |
| STPCLK# | I | SToP CLocK is an emulator signal. |
| TCK | I | Test CLocK follows IEEE 1149.1. |
| TDI | I | Test Data Input follows IEEE 1149.1. |
| TDO | O | Test Data Output follows IEEE 1149.1. |
| TMS | I | Test Mode Select follows IEEE 1149.1. |
| TRST# | I | Test ReSeT follows IEEE 1149.1. |
| VCC2 | I | VCC of 2.8 V at 25 pins |
| VCC3 | I | VCC of 3.3 V at 28 pins |
| VCC2DET# | O | VCC2 DETect sets appropriate VCC2 voltage level. |
| VSS | I | VSS supplied at 53 pins |
| W/R# | O | Write/Read is driven with address to indicate write vs. read transaction. |
| WB/WT# | I | Write Back/Write Through is returned to indicate that data is permitted to be cached as write back. |

Electrical Specifications

These preliminary electrical specifications provide AC and DC parameters that are required for "Super Socket 7" compatibility.

| Clock rate | 66 MHz | | 75 MHz | | 100 MHz | | 133 MHz | | |
|---|---|---|---|---|---|---|---|---|---|
| Parameter | min | max | min | max | min | max | min | max | unit |
| CLK frequency | 33.3 | 66.7 | 37.5 | 75 | 50 | 100 | | 133 | MHz |
| CLK period | 15.0 | 30.0 | 13.3 | 26.3 | 10.0 | 20.0 | | | ns |
| CLK high time (≧2 v) | 4.0 | | 4.0 | | 3.0 | | | | ns |
| CLK low time (≦0.8 V) | 4.0 | | 4.0 | | 3.0 | | | | ns |
| CLK rise time (0.8 V->2 V) | 0.15 | 1.5 | 0.15 | 1.5 | 0.15 | 1.5 | | | ns |
| CLK fall time (2 V->0.8 V) | 0.15 | 1.5 | 0.15 | 1.5 | 0.15 | 1.5 | | | ns |
| CLK period stability | | 250 | | 250 | | 250 | | | ps |
| A31..3 valid delay | 1.1 | 6.3 | 1.1 | 4.5 | 1.1 | 4.0 | | | ns |
| A31..3 float delay | | 10.0 | | 7.0 | | 7.0 | | | ns |
| ADS# valid delay | 1.0 | 6.0 | 1.0 | 4.5 | 1.0 | 4.0 | | | ns |
| ADS# float delay | | 10.0 | | 7.0 | | 7.0 | | | ns |
| ADSC# valid delay | 1.0 | 7.0 | 1.0 | 4.5 | 1.0 | 4.0 | | | ns |
| ADSC# float delay | | 10.0 | | 7.0 | | 7.0 | | | ns |
| AP valid delay | 1.0 | 8.5 | 1.0 | 5.5 | 1.0 | 5.5 | | | ns |
| AP float delay | | 10.0 | | 7.0 | | 7.0 | | | ns |
| APCHK# valid delay | 1.0 | 8.3 | 1.0 | 4.5 | 1.0 | 4.5 | | | ns |
| BE7..0# valid delay | 1.0 | 7.0 | 1.0 | 4.5 | 1.0 | 4.0 | | | ns |
| BE7..0# float delay | | 10.0 | | 7.0 | | 7.0 | | | ns |
| BP3..0 valid delay | 1.0 | 10.0 | | | | | | | ns |
| BREQ valid delay | 1.0 | 8.0 | 1.0 | 4.5 | 1.0 | 4.0 | | | ns |
| CACHE# valid delay | 1.0 | 7.0 | 1.0 | 4.5 | 1.0 | 4.0 | | | ns |
| CACHE# float delay | | 10.0 | | 7.0 | | 7.0 | | | ns |
| D/C# valid delay | 1.0 | 7.0 | 1.0 | 4.5 | 1.0 | 4.0 | | | ns |
| D/C# float delay | | 10.0 | | 7.0 | | 7.0 | | | ns |
| D63..0 write data valid delay | 1.3 | 7.5 | 1.3 | 4.5 | 1.3 | 4.5 | | | ns |
| D63..0 write data float delay | | 10.0 | | 7.0 | | 7.0 | | | ns |
| DP7..0 write data valid delay | 1.3 | 7.5 | 1.3 | 4.5 | 1.3 | 4.5 | | | ns |
| DP7..0 write data float delay | | 10.0 | | 7.0 | | 7.0 | | | ns |
| FERR# valid delay | 1.0 | 8.3 | 1.0 | 4.5 | 1.0 | 4.5 | | | ns |
| HIT# valid delay | 1.0 | 6.8 | 1.0 | 4.5 | 1.0 | 4.0 | | | ns |
| HITM# valid delay | 1.1 | 6.0 | 1.1 | 4.5 | 1.1 | 4.0 | | | ns |
| HLDA valid delay | 1.0 | 6.8 | 1.0 | 4.5 | 1.0 | 4.0 | | | ns |
| IERR# valid delay | 1.0 | 8.3 | | | | | | | ns |
| LOCK# valid delay | 1.1 | 7.0 | 1.1 | 4.5 | 1.1 | 4.0 | | | ns |
| LOCK# float delay | | 10.0 | | 7.0 | | 7.0 | | | ns |
| M/IO# valid delay | 1.0 | 5.9 | 1.0 | 4.5 | 1.0 | 4.0 | | | ns |
| M/IO# float delay | | 10.0 | | 7.0 | | 7.0 | | | ns |
| PCD valid delay | 1.0 | 7.0 | 1.0 | 4.5 | 1.0 | 4.0 | | | ns |
| PCD float delay | | 10.0 | | 7.0 | | 7.0 | | | ns |
| PCHK# valid delay | 1.0 | 7.0 | 1.0 | 4.5 | 1.0 | 4.5 | | | ns |
| PM1..0 valid delay | 1.0 | 10.0 | | | | | | | ns |
| PRDY valid delay | 1.0 | 8.0 | | | | | | | ns |
| PWT valid delay | 1.0 | 7.0 | 1.0 | 4.5 | 1.0 | 4.0 | | | ns |
| PWT float delay | | 10.0 | | 7.0 | | 7.0 | | | ns |
| SCYC valid delay | 1.0 | 7.0 | 1.0 | 4.5 | 1.0 | 4.0 | | | ns |
| SCYC float delay | | 10.0 | | 7.0 | | 7.0 | | | ns |
| SMIACT# valid delay | 1.0 | 7.3 | 1.0 | 4.5 | 1.0 | 4.0 | | | ns |
| W/R# valid delay | 1.0 | 7.0 | 1.0 | 4.5 | 1.0 | 4.0 | | | ns |
| W/R# float delay | | 10.0 | | 7.0 | | 7.0 | | | ns |
| A31..5 setup time | 6.0 | | 3.0 | | 3.0 | | | | ns |
| A31..5 hold time | 1.0 | | 1.0 | | 1.0 | | | | ns |
| A20M# setup time | 5.0 | | 3.0 | | 3.0 | | | | ns |
| A20M# hold time | 1.0 | | 1.0 | | 1.0 | | | | ns |
| AHOLD setup time | 5.5 | | 3.5 | | 3.5 | | | | ns |
| AHOLD hold time | 1.0 | | 1.0 | | 1.0 | | | | ns |
| AP setup time | 5.0 | | 1.7 | | 1.7 | | | | ns |
| AP hold time | 1.0 | | 1.0 | | 1.0 | | | | ns |
| BOFF# setup time | 5.5 | | 3.5 | | 3.5 | | | | ns |
| BOFF# hold time | 1.0 | | 1.0 | | 1.0 | | | | ns |
| BRDY# setup time | 5.0 | | 3.0 | | 3.0 | | | | ns |
| BRDY# hold time | 1.0 | | 1.0 | | 1.0 | | | | ns |
| BRDYC# setup time | 5.0 | | 3.0 | | 3.0 | | | | ns |
| BRDYC# hold time | 1.0 | | 1.0 | | 1.0 | | | | ns |
| BUSCHK# setup time | 5.0 | | 3.0 | | 3.0 | | | | ns |
| BUSCHK# hold time | 1.0 | | 1.0 | | 1.0 | | | | ns |
| D63..0 read data setup time | 2.8 | | 1.7 | | 1.7 | | | | ns |
| D63..0 read data hold time | 1.5 | | 1.5 | | 1.5 | | | | ns |
| DP7..0 read data setup time | 2.8 | | 1.7 | | 1.7 | | | | ns |
| DP7..0 read data hold time | 1.5 | | 1.5 | | 1.5 | | | | ns |
| EADS# setup time | 5.0 | | 3.0 | | 3.0 | | | | ns |

-continued

| Clock rate | 66 MHz | | 75 MHz | | 100 MHz | | 133 MHz | | |
|---|---|---|---|---|---|---|---|---|---|
| Parameter | min | max | min | max | min | max | min | max | unit |
| EADS# hold time | 1.0 | | 1.0 | | 1.0 | | | | ns |
| EWBE# setup time | 5.0 | | 1.7 | | 1.7 | | | | ns |
| EWBE# hold time | 1.0 | | 1.0 | | 1.0 | | | | ns |
| FLUSH# setup time | 5.0 | | 1.7 | | 1.7 | | | | ns |
| FLUSH# hold time | 1.0 | | 1.0 | | 1.0 | | | | ns |
| FLUSH# async pulse width | 2 | | 2 | | 2 | | | | CLK |
| HOLD setup time | 5.0 | | 1.7 | | 1.7 | | | | ns |
| HOLD hold time | 1.5 | | 1.5 | | 1.5 | | | | ns |
| IGNNE# setup time | 5.0 | | 1.7 | | 1.7 | | | | ns |
| IGNNE# hold time | 1.0 | | 1.0 | | 1.0 | | | | ns |
| IGNNE# async pulse width | 2 | | 2 | | 2 | | | | CLK |
| INIT setup time | 5.0 | | 1.7 | | 1.7 | | | | ns |
| INIT hold time | 1.0 | | 1.0 | | 1.0 | | | | ns |
| INIT async pulse width | 2 | | 2 | | 2 | | | | CLK |
| INTR setup time | 5.0 | | 1.7 | | 1.7 | | | | ns |
| INTR hold time | 1.0 | | 1.0 | | 1.0 | | | | ns |
| INV setup time | 5.0 | | 1.7 | | 1.7 | | | | ns |
| INV hold time | 1.0 | | 1.0 | | 1.0 | | | | ns |
| KEN# setup time | 5.0 | | 3.0 | | 3.0 | | | | ns |
| KEN# hold time | 1.0 | | 1.0 | | 1.0 | | | | ns |
| NA# setup time | 4.5 | | 1.7 | | 1.7 | | | | ns |
| NA# hold time | 1.0 | | 1.0 | | 1.0 | | | | ns |
| NMI setup time | 5.0 | | 1.7 | | 1.7 | | | | ns |
| NMI hold time | 1.0 | | 1.0 | | 1.0 | | | | ns |
| NMI async pulse width | 2 | | 2 | | 2 | | | | CLK |
| PEN# setup time | 4.8 | | 1.7 | | 1.7 | | | | ns |
| PEN# hold time | 1.0 | | 1.0 | | 1.0 | | | | ns |
| R/S# setup time | 5.0 | | 1.7 | | 1.7 | | | | ns |
| R/S# hold time | 1.0 | | 1.0 | | 1.0 | | | | ns |
| R/S# async pulse width | 2 | | 2 | | 2 | | | | CLK |
| SMI# setup time | 5.0 | | 1.7 | | 1.7 | | | | ns |
| SMI# hold time | 1.0 | | 1.0 | | 1.0 | | | | ns |
| SMI# async pulse width | 2 | | 2 | | 2 | | | | CLK |
| STPCLK# setup time | 5.0 | | 1.7 | | 1.7 | | | | ns |
| STPCLK# hold time | 1.0 | | 1.0 | | 1.0 | | | | ns |
| WB/WT# setup time | 4.5 | | 1.7 | | 1.7 | | | | ns |
| WB/WT# hold time | 1.0 | | 1.0 | | 1.0 | | | | ns |
| RESET setup time | 5.0 | | 1.7 | | 1.7 | | | | ns |
| RESET hold time | 1.0 | | 1.0 | | 1.0 | | | | ns |
| RESET pulse width | 15 | | 15 | | 15 | | | | CLK |
| RESET active | 1.0 | | 1.0 | | 1.0 | | | | ms |
| BF2..0 setup time | 1.0 | | 1.0 | | 1.0 | | | | ms |
| BF2..0 hold time | 2 | | 2 | | 2 | | | | CLK |
| BRDYC# hold time | 1.0 | | 1.0 | | 1.0 | | | | ns |
| BRDYC# setup time | 2 | | 2 | | 2 | | | | CLK |
| BRDYC# hold time | 2 | | 2 | | 2 | | | | CLK |
| FLUSH# setup time | 5.0 | | 1.7 | | 1.7 | | | | ns |
| FLUSH# hold time | 1.0 | | 1.0 | | 1.0 | | | | ns |
| FLUSH# setup time | 2 | | 2 | | 2 | | | | CLK |
| FLUSH# hold time | 2 | | 2 | | 2 | | | | CLK |
| PBREQ# flight time | 0 | 2.0 | | | | | | | ns |
| PBGNT# flight time | 0 | 2.0 | | | | | | | ns |
| PHIT# flight time | 0 | 2.0 | | | | | | | ns |
| PHITM# flight time | 0 | 1.8 | | | | | | | ns |
| A31..5 setup time | 3.7 | | | | | | | | ns |
| A31..5 hold time | 0.8 | | | | | | | | ns |
| D/C# setup time | 4.0 | | | | | | | | ns |
| D/C# hold time | 0.8 | | | | | | | | ns |
| W/R# setup time | 4.0 | | | | | | | | ns |
| W/R# hold time | 0.8 | | | | | | | | ns |
| CACHE# setup time | 4.0 | | | | | | | | ns |
| CACHE# hold time | 1.0 | | | | | | | | ns |
| LOCK# setup time | 4.0 | | | | | | | | ns |
| LOCK# hold time | 0.8 | | | | | | | | ns |
| SCYC setup time | 4.0 | | | | | | | | ns |
| SCYC hold time | 0.8 | | | | | | | | ns |
| ADS# setup time | 5.8 | | | | | | | | ns |
| ADS# hold time | 0.8 | | | | | | | | ns |
| M/IO# setup time | 5.8 | | | | | | | | ns |
| M/IO# hold time | 0.8 | | | | | | | | ns |
| HIT# setup time | 6.0 | | | | | | | | ns |
| HIT# hold time | 1.0 | | | | | | | | ns |
| HITM# setup time | 6.0 | | | | | | | | ns |
| HITM# hold time | 0.7 | | | | | | | | ns |
| HLDA setup time | 6.0 | | | | | | | | ns |
| HLDA hold time | 0.8 | | | | | | | | ns |

-continued

| Clock rate | 66 MHz | | 75 MHz | | 100 MHz | | 133 MHz | | |
|---|---|---|---|---|---|---|---|---|---|
| Parameter | min | max | min | max | min | max | min | max | unit |
| DPEN# valid time | | 10.0 | | | | | | | CLK |
| DPEN# hold time | 2.0 | | | | | | | | CLK |
| D/P# valid delay (primary) | 1.0 | 8.0 | | | | | | | ns |
| TCK frequency | | 25 | | | | 25 | | | MHz |
| TCK period | 40.0 | | | | 40.0 | | | | ns |
| TCK high time (≧2 v) | 14.0 | | | | 14.0 | | | | ns |
| TCK low time (≦0.8 V) | 14.0 | | | | 14.0 | | | | ns |
| TCK rise time (0.8 V−>2 V) | | 5.0 | | | | 5.0 | | | ns |
| TCK fall time (2 V−>0.8 V) | | 5.0 | | | | 5.0 | | | ns |
| TRST# pulse width | 30.0 | | | | 30.0 | | | | ns |
| TDI setup time | 5.0 | | | | 5.0 | | | | ns |
| TDI hold time | 9.0 | | | | 9.0 | | | | ns |
| TMS setup time | 5.0 | | | | 5.0 | | | | ns |
| TMS hold time | 9.0 | | | | 9.0 | | | | ns |
| TDO valid delay | 3.0 | 13.0 | | | 3.0 | 13.0 | | | ns |
| TDO float delay | | 16.0 | | | | 16.0 | | | ns |
| all outputs valid delay | 3.0 | 13.0 | | | 3.0 | 13.0 | | | ns |
| all outputs float delay | | 16.0 | | | | 16.0 | | | ns |
| all inputs setup time | 5.0 | | | | 5.0 | | | | ns |
| all inputs hold time | 9.0 | | | | 9.0 | | | | ns |

Bus Control Register

The Bus Control Register provides direct control of Emulator signals, selecting output states and active input states for these signals.

The layout of the Bus Control Register is designed to match the assignment of signals to the Event Register.

| number | control |
|---|---|
| 0 | Reserved |
| 1 | A20M# active level |
| 2 | BF0 active level |
| 3 | BF1 active level |
| 4 | BF2 active level |
| 5 | BUSCHK active level |
| 6 | FLUSH# active level |
| 7 | FRCMC# active level |
| 8 | IGNNE# active level |
| 9 | INIT active level |
| 10 | INTR active level |
| 11 | NMI active level |
| 12 | SMI# active level |
| 13 | STPCLK# active level |
| 14 | CPUTYP active at reset |
| 15 | DPEN#active at reset |
| 16 | FLUSH# active at reset |
| 17 | INIT active at reset |
| 31 . . . 18 | Reserved |
| 32 | Bus lock |
| 33 | Split cycle |
| 34 | BP0 output |
| 35 | BP1 output |
| 36 | BP2 output |
| 37 | BP3 output |
| 38 | FERR# output |
| 39 | IERR# output |
| 40 | PM0 output |
| 41 | PM1 output |
| 42 | SMIACT# output |
| 63 . . . 43 | Reserved |

Emulator Signals

Several of the signals, A20M#, INIT, NMI, SMI#, STPCLK#, IGNNE# are inputs that have purposes primarily defined by the needs of x86 processor emulation. They have no direct purpose in the Zeus processor, other than to signal an event, which is handled by software. Each of these signals is an input sampled on the rising edge of each bus clock, if the input signal matches the active level specified in the bus control register, the corresponding bit in the event register is set. The bit in the event register remains set even if the signal is no longer active, until cleared by software. If the event register bit is cleared by software, it is set again on each bus clock that the signal is sampled active.

A20M#

A20M# (address bit 20 mask inverted), when asserted (low), directs an x86 emulator to generate physical addresses for which bit 20 is zero.

The A20M# bit of the bus control register selects which level of the A20M# signal will generate an event in the A20M# bit of the event register. Clearing (to 0) the A20M# bit of the bus control register will cause the A20M# bit of the event register to be set when the A20M# signal is asserted (low).

Asserting the A20M# signal causes the emulator to modify all current TB mappings to produce a zero value for bit 20 of the byte address. The A20M# bit of the bus control register is then set (to 1) to cause the A20M# bit of the event register to be set when the A20M# signal is released (high).

Releasing the A20M# signal causes the emulator to restore the TB mapping to the original state. The A20M# bit of the bus control register is then cleared (to 0) again, to cause the A20M# bit of the event register to be set when the A20M# signal is asserted (low).

INIT

INIT (initialize) when asserted (high), directs an x86 emulator to begin execution of the external ROM BIOS.

The INIT bit of the bus control register is normally set (to 1) to cause the INIT bit of the event register to be set when the INIT signal is asserted (high).

INTR

INTR (maskable interrupt) when asserted (high), directs an x86 emulator to simulate a maskable interrupt by generating two locked interrupt acknowledge special cycles. External hardware will normally release the INTR signal between the first and second interrupt acknowledge special cycle.

The INTR bit of the bus control register is normally set (to 1) to cause the INTR bit of the event register to be set when the INTR signal is asserted (high).

NMI

NMI (non-maskable interrupt) when asserted (high), directs an x86 emulator to simulate a non-maskable interrupt. External hardware will normally release the NMI signal.

The NMI bit of the bus control register is normally set (to 1) to cause the NMI bit of the event register to be set when the NMI signal is asserted (high).

SMI#

SMI# (system management interrupt inverted) when asserted (low), directs an x86 emulator to simulate a system management interrupt by flushing caches and saving registers, and asserting (low) SMIACT# (system management interrupt active inverted). External hardware will normally release the SMI#.

The SMI# bit of the bus control register is normally cleared (to 0) to cause the SMI# bit of the event register to be set when the SMI# signal is asserted (low).

STPCLK#

STPCLK# (stop clock inverted) when asserted (low), directs an x86 emulator to simulate a stop clock interrupt by flushing caches and saving registers, and performing a stop grant special cycle.

The STPCLK# bit of the bus control register is normally cleared (to 0) to cause the STPCLK# bit of the event register to be set when the STPCLK# signal is asserted (low).

Software must set (to 1) the STPCLK# bit of the bus control register to cause the STPCLK# bit of the event register to be set when the STPCLK# signal is released (high) to resume execution. Software must cease producing bus operations after the stop grant special cycle. Usually, software will use the B.HALT instruction in all threads to cease performing operations. The processor PLL continues to operate, and the processor must still sample INIT, INTR, RESET, NMI, SMI# (to place them in the event register) and respond to RESET and inquire and snoop transactions, so long as the bus clock continues operating.

The bus clock itself cannot be stopped until the stop grant special cycle. If the bus clock is stopped, it must stop in the low (0) state. The bus clock must be operating at frequency for at least 1 ms before releasing STPCLK# or releasing RESET. While the bus clock is stopped, the processor does not sample inputs or responds to RESET or inquire or snoop transactions.

External hardware will normally release STPCLK# when it is desired to resume execution. The processor should respond to the STPCLK# bit in the event register by awakening one or more threads.

IGNNE#

IGNNE# (address bit 20 mask inverted), when asserted (low), directs an x86 emulator to ignore numeric errors.

The IGNNE# bit of the bus control register selects which level of the IGNNE# signal will generate an event in the IGNNE# bit of the event register. Clearing (to 0) the IGNNE# bit of the bus control register will cause the IGNNE# bit of the event register to be set when the IGNNE# signal is asserted (low).

Asserting the IGNNE# signal causes the emulator to modify its processing to ignore numeric errors, if suitably enabled to do so. The IGNNE# bit of the bus control register is then set (to 1) to cause the IGNNE# bit of the event register to be set when the IGNNE# signal is released (high).

Releasing the IGNNE# signal causes the emulator to restore the emulation to the original state. The IGNNE# bit of the bus control register is then cleared (to 0) again, to cause the IGNNE# bit of the event register to be set when the IGNNE# signal is asserted (low).

Emulator Output Signals

Several of the signals, BP3 . . . BP0, FERR#, ERR#, PM1 . . . PM0, SMIACT# are outputs that have purposes primarity defined by the needs of x86 processor emulation. They are driven from the bus control register that can be written by software.

Bus Snooping

Zeus support the "Socket 7" protocols for inquiry, invalidation and coherence of cache lines. The protocols are implemented in hardware and do not interrupt the processor as a result of bus activity. Cache access cycles may be "stolen" for this purpose, which may delay completion of processor memory activity.

Definition

```
def SnoopPhysicaBus as
    //wait for transaction on bus or inquiry cycle
    do
        wait
    while BRDY# = 0
    pa31..3 ← A31..3
    op ← W/R# ? W : R
    cc ← CACHE# || PWT || PCD
enddef
```

Locked Cycles

Locked cycles occur as a result of synchronization operations (Store-swap instructions) performed by the processor. For x86 emulation, locked cycles also occur as a result of setting specific memory-mapped control registers.

Locked Synchronization Instruction

Bus lock (LOCK#) is asserted (low) automatically as a result of store-swap instructions that generate bus activity, which always perform locked read-modify-write cycles on 64 bits of data. Note that store-swap instructions that are performed on cache sub-blocks that are in the E or M state need not generate bus activity.

Locked Sequences of Bus Transactions

Bus lock (LOCK#) is also asserted (low) on subsequent bus transactions by writing a one (1) to the bus lock bit of the bus control register. Split cycle (SCYC) is similarly asserted (high) if a one (1) is also written to the split cycle bit of the bus emulation control register.

All subsequent bus transactions will be performed as a locked sequence of transactions, asserting bus lock (LOCK# low) and optionally split cycle (SCYC high), until zeroes (0) are written to the bus lock and split cycle bits of the bus control register. The next bus transaction completes the locked sequence, releasing bus lock (LOCK# high) and split cycle (SCYC low) at the end of the transaction. If the locked transaction must be aborted because of bus activity such as backoff, a lock broken event is signalled and the bus lock is released.

Unless special care is taken, the bus transactions of all threads occur as part of the locked sequence of transactions. Software can do so by interrupting all other threads until the locked sequence is completed. Software should also take case to avoid fetching instructions during the locked sequence, such as by executing instructions out of niche or ROM memory. Software should also take care to avoid terminating the sequence with event handling prior to releasing the bus lock, such as by executing the sequence with events disabled (other than the lock broken event).

The purpose of this facility is primarily for x86 emulation purposes, in which we are willing to perform acts (such as stopping all the other threads) in the name of compatibility. It is possible to take special care in hardware to sort out the activity of other threads, and break the lock in response to events. In doing so, the bus unit must defer bus activity generated by other threads until the locked sequence is completed. The bus unit should inhibit event handling while the bus is locked.

Sampled at Reset

Certain pins are sampled at reset and made available in the event register.

CPUTYP Primary or Dual processor
PICD0[DPEN#] Dual processing enable
FLUSH#Tristate test mode
INIT Built-in self-test Sampled Per Clock Certain pins are sampled per clock and changes are made available in the event register.

A20M# address bit 20 mask
BF[1:0] bus frequency
BUSCHK# bus check
FLUSH#cache flush request
FRCMC# functional redundancy check—not implemented on Pentium MMX
IGNNE# ignore numeric error
INIT re-initialize pentium processor
INTR external interrupt
NMI non-maskable interrupt
R/S# run/stop
SMI# system management
STPCLK# stop clock Bus Access The “Socket 7” bus performs transfers of 1-8 bytes within an octlet boundary or 32 bytes on a triclet boundary.

Transfers sized at 16 bytes (hexlet) are not available as a single transaction, they are performed as two bus transactions.

Bus transactions begin by gaining control of the bus (TODO: not shown), and in the initial cycle, asserting ADS#, M/IO#, A, BE#, W/R#, CACHE#, PWT, and PCD. These signals indicate the type, size, and address of the transaction. One or more octlets of data are returned on a read (the external system asserts BRDY# and/or NA# and D), or accepted on a write (TODO not shown).

The external system is permitted to affect the cacheability and exclusivity of data returned to the processor, using the KEN# and WB/WT# signals.

Definition

```
def data,cen ← AccessPhysicaBus(pa,size,cc,op,wd) as
    // divide transfers sized between octlet and hexlet into two parts
    // also divide transfers which cross octlet boundary into two parts
    if (64<size≦128) or ((size<64) and (size+8*pa_{2..0}>64)) then
        data0,cen ← AccessPhysicalBus(pa,64−8*pa_{2..0},cc,op,wd)
        if cen=0 then
            pa1 ← pa_{63..4}||1||0^3
            data1,cen ←
            AccessPhysicalBus(pa1,size+8*pa_{2..0}−64,cc,op,wd)
            data ← data1_{127..64} || data0_{63..0}
        endif
    else
        ADS# ← 0
        M/IO# ← 1
        A_{31..3} ← pa_{31..3}
        for i ← 0 to 7
            BE_i# ← pa_{2..0} ≦ i < pa_{2..0}+size/8
        endfor
        W/R# ← (op = W)
        if (op=R) then
            CACHE# ← ~(cc ≧ WT)
```

-continued

```
            PWT ← (cc = WT)
            PCD ← (cc ≦ CD)
            do
                wait
            while (BRDY# = 1) and (NA# = 1)
            //Intel spec doesn't say whether KEN# should be ignored
            if no CACHE#
            //AMD spec says KEN# should be ignored if no CACHE#
            cen ← ~KEN# and (cc ≧ WT) //cen=1 if triclet is
            cacheable
            xen ← WB/WT# and (cc ≠ WT) //xen=1 if triclet is
            exclusive
            if cen then
                os ← 64*pa_{4..3}
                data_{63+os..os} ← D_{63..0}
                do
                    wait
                while BRDY# = 1
                data_{63+(64^os)..(64^os)} ← D_{63..0}
                do
                    wait
                while BRDY# = 1
                data_{63+(128^os)..(128^os)} ← D_{63..0}
                do
                    wait
                while BRDY# = 1
                data_{63+(192^os)..(192^os)} ← D_{63..0}
            else
                os ← 64*pa_3
                data_{63+os..os} ← D_{63..0}
            endif
        else
            CACHE# ← ~(size = 256)
            PWT ← (cc = WT)
            PCD ← (cc ≦ CD)
            do
                wait
            while (BRDY# = 1) and (NA# = 1)
            xen ← WB/WT# and (cc ≠ WT)
        endif
    endif
    flags ← cen || xen
enddef
```

Other Bus Cycles

Input/Output transfers, Interrupt acknowledge and special bus cycles (stop grant, flush acknowledge, writeback, halt, flush, shutdown) are performed by uncached loads and stores to a memory-mapped control region.

| M/IO# | D/C# | W/R# | CACHE# | KEN# | cycle |
|---|---|---|---|---|---|
| 0 | 0 | 0 | 1 | x | interrupt acknowledge |
| 0 | 0 | 1 | 1 | x | special cycles (intel pg 6-33) |
| 0 | 1 | 0 | 1 | x | I/O read, 32-bits or less, non-cacheable, 16-bit address |
| 0 | 1 | 1 | 1 | x | I/O write, 32-bits or less, non-cacheable, 16-bit address |
| 1 | 0 | x | x | x | code read (not implemented) |
| 1 | 1 | 0 | 1 | x | non-cacheable read |
| 1 | 1 | 0 | x | 1 | non-cacheable read |
| 1 | 1 | 0 | 0 | 0 | cacheable read |
| 1 | 1 | 1 | 1 | x | non-cacheable write |
| 1 | 1 | 1 | 0 | x | cache writeback |

Special Cycles

An interrupt acknowledge cycle is performed by two byte loads to the control space (dc=1), the first with a byte address (ba) of 4 (A31 . . . 3=0, BE4#=0, BE7 . . . 5,3 . . . 0#=1), the second with a byte address (ba) of 0 (A31 . . . 3=0, BE0#=0, BE7 . . . 1#=1). The first byte read is ignored; the second byte contains the interrupt vector. The external system normally releases INTR between the first and second byte load.

A shutdown special cycle is performed by a byte store to the control space (dc=1) with a byte address (ba) of 0 (A31 . . . 3=0, BE0#=0, BE7 . . . 1#=1).

A flush special cycle is performed by a byte store to the control space (dc=1) with a byte address (ba) of 1 (A31 . . . 3=0, BE1#=0, BE7 . . . 2,0#=1).

A halt special cycle is performed by a byte store to the control space (dc=1) with a byte address (ba) of 2 (A31 . . . 3=0, BE2#=0, BE7 . . . 3,1 . . . 0#=1).

A stop grant special cycle is performed by a byte store to the control space (dc=1) with a byte address (ba) of 0x12 (A31 . . . 3=2, BE2#=0, BE7 . . . 3,1 . . . 0#=1).

A writeback special cycle is performed by a byte store to the control space (dc=1) with a byte address (ba) of 3 (A31 . . . 3=0, BE3#=0, BE7 . . . 4,2 . . . 0#=1).

A flush acknowledge special cycle is performed by a byte store to the control space (dc=1) with a byte address (ba) of 4 (A31 . . . 3=0, BE4#=0, BE7 . . . 5,3 . . . 0#=1).

A back trace message special cycle is performed by a byte store to the control space (dc=1) with a byte address (ba) of 5 (A31 . . . 3=0, BE5#=0, BE7 . . . 6,4 . . . 0#=1).

Performing load or store operations of other sizes (doublet, quadlet, octlet, hexlet) to the control space (dc=1) or operations with other byte address (ba) values produce bus operations which are not defined by the "Super Socket 7" specifications and have undefined effect on the system.

I/O Cycles

An input cycle is performed by a byte, doublet, or quadlet load to the data space (dc=0), with a byte address (ba) of the I/O address. The address may not be aligned, and if it crosses an octlet boundary, will be performed as two separate cycles.

An output cycle is performed by a byte, doublet, or quadlet store to the data space (dc=0), with a byte address (ba) of the I/O address. The address may not be aligned, and if it crosses an octlet boundary, will be performed as two separate cycles.

Performing load or store operations of other sizes (octlet, hexlet) to the data space (dc=0) produce bus operations which are not defined by the "Super Socket 7" specifications and have undefined effect on the system.

Physical Address

The other bus cycles are accessed explicitly by uncached memory accesses to particular physical address ranges. Appropriately sized load and store operations must be used to perform the specific bus cycles required for proper operations. The dc field must equal 0 for I/O operations, and must equal 1 for control operations. Within this address range, bus transactions are sized no greater than 4 bytes (quadlet) and do not cross quadlet boundaries.

The physical address of a other bus cycle data/control dc, byte address ba is:

| 63 … 24 | 23 … 16 | 15 … 0 |
|---|---|---|
| FFFF FFFF 0B00 $0000_{63\ldots24}$ | dc | ba |
| 40 | 8 | 16 |

Definition

```
def data ← AccessPhysicalOtherBus(pa,size,op,wd) as
    // divide transfers sized between octlet and hexlet into two parts
    // also divide transfers which cross octlet boundary into two parts
    if (64<size≦128) or ((size<64) and (size+8*pa2..0>64)) then
        data0 ← AccessPhysicaOtherBus(pa,64−8*pa2..0,op,wd)
        pa1 ← pa63..4||1||0^3
        data1 ← AccessPhysicaOtherBus(pa1,size+8*pa2..0−64,op,wd)
        data ← data1 127..64 || data0 63..0
    else
        ADS# ← 0
        M/IO# ← 0
        D/C# ← ~pa16
        A31..3 ← 0^16 || pa15..3
        for i ← 0 to 7
            BEi# ← pa2..0 ≦ i < pa2..0+size/8
        endfor
        W/R# ← (op = W)
        CACHE# ← 1
        PWT ← 1
        PCD ← 1
        do
            wait
        while (BRDY# = 1) and (NA# = 1)
        if (op=R) then
            os ← 64*pa3
            data63+os..os ← D63..0
        endif
    endif
enddef
```

Events and Threads

Exceptions signal several kinds of events: (1) events that are indicative of failure of the software or hardware, such as arithmetic overflow or parity error, (2) events that are hidden from the virtual process model, such as translation buffer misses, (3) events that infrequently occur, but may require corrective action, such as floating-point underflow. In addition, there are (4) external events that cause scheduling of a computational process, such as clock events or completion of a disk transfer.

Each of these types of events require the interruption of the current flow of execution, handling of the exception or event, and in some cases, descheduling of the current task and rescheduling of another. The Zeus processor provides a mechanism that is based on the multi-threaded execution model of Mach. Mach divides the well-known UNIX process model into two parts, one called a task, which encompasses the virtual memory space, file and resource state, and the other called a thread, which includes the program counter, stack space, and other general register file state. The sum of a Mach task and a Mach thread exactly equals one UNIX process, and the Mach model allows a task to be associated with several threads. On one processor at any one moment in time, at least one task with one thread is running.

In the taxonomy of events described above, the cause of the event may either be synchronous to the currently running thread, generally types 1, 2, and 3, or asynchronous and associated with another task and thread that is not currently running, generally type 4.

For these events, Zeus will suspend the currently running thread in the current task, saving a minimum of general registers, and continue execution at a new program counter. The event handler may perform some minimal computation and return, restoring the current threads' general registers, or save the remaining general registers and switch to a new task or thread context.

Facilities of the exception, memory management, and interface systems are themselves memory mapped, in order to provide for the manipulation of these facilities by high-level language, compiled code. The sole exception is the general register file itself, for which standard store and load instructions can save and restore the state.

Definition

```
def Thread(th) as
    forever
        catch exception
            if ((EventRegister and EvenMask[th]) ≠ 0) then
                if ExceptionState=0 then
                    raise EventInterrupt
                endif
            endif
            inst ← LoadMemoryX(ProgramCounter,ProgramCounter,32,L)
            Instruction(inst)
        endcatch
        case exception of
            EventInterrupt,
            ReservedInstruction,
            OperandBoundary,
            AccessDisallowedByTag,
            AccessDisallowedByGlobalTB,
            AccessDisallowedByLocalTB,
            AccessDetailRequiredByTag,
            AccessDetailRequiredByGlobalTB,
            AccessDetailRequiredByLocalTB,
            MissInGlobalTB,
            MissInLocalTB,
            FixedPointArithmetic,
            FloatingPointArithmetic,
            GatewayDisallowed:
                case ExceptionState of
                    0:
                        PerformException(exception)
                    1:
                        PerformException(SecondException)
                    2:  raise ThirdException
                endcase
            TakenBranch:
                ContinuationState ← (ExceptionState=0) ? 0 : ContinuationState
            TakenBranchContinue:
                /* nothing */
            none, others:
                ProgramCounter ← ProgramCounter + 4
                ContinuationState ← (ExceptionState=0) ? 0 : ContinuationState
        endcase
    endforever
enddef
```

Definition

```
def PerformException(exception) as
    v ← (exception > 7) ? 7 : exception
    t ← LoadMemory(ExceptionBase,ExceptionBase+Thread*128+64+8*v,64,L)
    if ExceptionState = 0 then
    u ← RegRead(3,128) || RegRead(2,128) || RegRead(1,128) || RegRead(0,128)
    StoreMemory(ExceptionBase,ExceptionBase+Thread*128,512,L,u)
    RegWrite(0,64,ProgramCounter63..2 || PrivilegeLevel
    RegWrite(1,64,ExceptionBase+Thread*128)
    RegWrite(2,64,exception)
    RegWrite(3,64,FailingAddress)
endif
PrivilegeLevel ← t1..0
ProgramCounter ← t63..2 || 0^2
case exception of
    AccessDetailRequiredByTag,
    AccessDetailRequiredByGlobalTB,
    AccessDetailRequiredByLocalTB:
        ContinuationState ← ContinuationState + 1
    others:
        /* nothing */
endcase
ExceptionState ← ExceptionState + 1
enddef
```

Definition

```
def PerformAccessDetail(exception) as
    if (ContinuationState = 0) or (ExceptionState ≠ 0) then
        raise exception
    else
        ContinuationState ← ContinuationState − 1
    endif
enddef
```

Definition

```
def BranchBack(rd,rc,rb) as
  c ← RegRead(rc, 64)
  if (rd ≠ 0) or(rc ≠ 0) or (rb ≠ 0) then
    raise ReservedInstruction
  endif
  a ← LoadMemory(ExceptionBase,ExceptionBase+Thread*128,128,L)
  if PrivilegeLevel ← c1..0 then
    PrivilegeLevel ← c1..0
  endif
  ProgramCounter ← c63..2 || 0^2
  ExceptionState ← 0
  RegWrite(rd,128,a)
  raise TakenBranchContinue
enddef
```

The following data is stored into memory at the Exception Storage Address

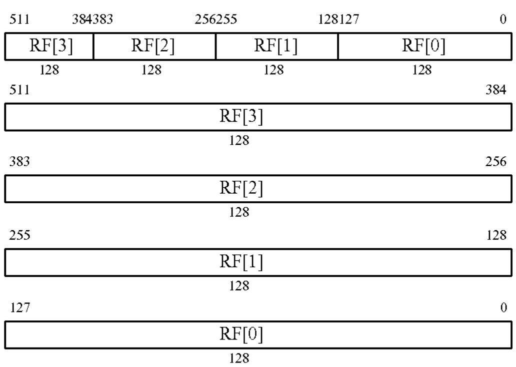

The following data is loaded from memory at the Exception Vector Address:

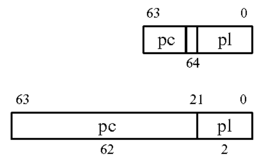

The following data replaces the original contents of RF[3 . . . 0]:

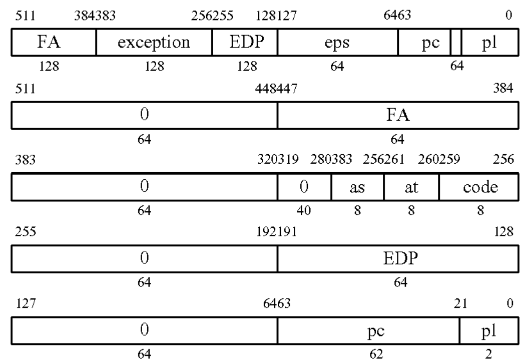

at: access type: 0=r, 1=w, 2=x, 3=g as: access size in bytes

TODO: add size, access type to exception data in pseudocode.

Ephemeral Program State

Ephemeral Program State (EPS) is defined as program state which affects the operation of certain instructions, but which does not need to be saved and restored as part of user state.

Because these bits are not saved and restored, the sizes and values described here are not visible to software. The sizes and values described here were chosen to be convenient for the definitions in this documentation. Any mapping of these values which does not alter the functions described may be used in a conforming implementation. For example, either of the EPS states may be implemented as a thermometer-coded vector, or the ContinuationState field may be represented with specific values for each AccessDetailRequired exception which an instruction execution may encounter.

There are eight bits of EPS:

| bit# | Name | Meaning |
| --- | --- | --- |
| 1 . . . 0 | ExceptionState | 0: Normal processing. Asynchronous events and Synchronous exceptions enabled.<br>1: Event/Exception handling: Synchronous exceptions cause SecondException. Asynchronous events are masked.<br>2: Second exception handling: Synchronous exceptions cause a machine check. Asynchronous events are masked.<br>3: illegal state<br>This field is incremented by handling an event or exception, and cleared by the Branch Back instruction. |
| 7 . . . 2 | ContinuationState | Continuation state for AccessDetailRequired exceptions. A value of zero enables all exceptions of this kind. The value is increased by one for each AccessDetailRequired exception handled, for which that many AccessDetailRequired exceptions are continued past (ignored) on re-execution in normal processing (ex = 0). |

-continued

| bit# | Name | Meaning |
|---|---|---|
| | | Any other kind of exception, or the completion of an instruction under normal processing causes the continuation state to be reset to zero. State does not need to be saved on context switch. |

The ContinuationState bits are ephemeral because if they are cleared as a result of a context switch, the associated exceptions can happen over again. The AccessDetail exception handlers will then set the bits again, as they were before the context switch. In the case where an AccessDetail exception handler must indicate an error, care must be taken to perform some instruction at the target of the Branch Back instruction by the exception handler is exited that will operate properly with ContinuationState≠0.

The ExceptionState bits are ephemeral because they are explicitly set by event handling and cleared by the termination of event handling, including event handling that results in a context switch.

Event Register

Events are single-bit messages used to communicate the occurrence of events between threads and interface devices.

| 63 0 |
|---|
| event |
| 64 |

The Event Register appears at several locations in memory, with slightly different side effects on read and write operations.

| offset | side effect on read | side effect on write |
|---|---|---|
| 0 | none: return event register contents | normal: write data into event register |
| ~~**256**~~ | ~~**stall thread until contents of event register is non-zero,then return event register contents**~~ | ~~**stall thread until bitwise and of data and event register contents is non zero**~~ |
| 512 | return zero value (so read-modify-write for byte/doublet/quadlet store works) | one bits in data set (to one) corresponding event register bits |
| 768 | return zero value (so read-modify-write for byte/doublet/quadlet store works) | one bits in data clear (to zero) corresponding event register bits |

Physical Address

The Event Register appears at three different locations, for which three functions of the Event Register are performed as described above. The physical address of an Event Register for function f, byte b is:

| 63 24 | 23 10 | 9 8 | 7 3 | 2 0 |
|---|---|---|---|---|
| FFFF FFFF 0F00 $0000_{63...24}$ | 0 | f | 0 | b |
| 40 | 14 | 2 | 5 | 3 |

Definition

```
def data ← AccessPhysicalEventRegister(pa,op,wdata) as
    f ← pa9..8
    if (pa23..10 = 0) and (pa7..4 = 0) and (f ≠ 1) then
```

-continued

```
        case f || op of
            0 || R:
                data ← 0^64 || EventRegister
            2 || R, 3 || R:
                data ← 0
            0 || W:
                EventRegister ← wdata63..0
            2 || W:
                EventRegister ← EventRegister or wdata63..0
            3 || W:
                EventRegister ← EventRegister and ~wdata63..0
        endcase
    else
        data ← 0
    endif
enddef
```

Events:

The table below shows the events and their corresponding event number. The priority of these events is soft, in that dispatching from the event register is controlled by software.

Using the E.LOGMOST.U instruction is useful for prioritizing these events.

| number | event |
|---|---|
| 0 | Clock |
| 1 | A20M# active |
| 2 | BF0 active |
| 3 | BF1 active |
| 4 | BF2 active |
| 5 | BUSCHK# active |
| 6 | FLUSH# active |
| 7 | FRCMC# active |
| 8 | IGNNE# active |
| 9 | INIT active |
| 10 | INTR active |
| 11 | NMI active |
| 12 | SMI# active |
| 13 | STPCLK# active |
| 14 | CPUTYP active at reset (Primary vs Dual processor) |
| 15 | DPEN#active at reset (Dual processing enable - driven low by dual processor) |
| 16 | FLUSH# active at reset (tristate test mode) |
| 17 | INIT active at reset |
| 18 | Bus lock broken |
| 19 | BRYRC# active at reset (drive strength) |
| 20 | |

Event Mask

The Event Mask (one per thread) control whether each of the events described above is permitted to cause an exception in the corresponding thread.

Physical Address

There are as many Event Masks as threads. The physical address of an Event Mask for thread th, byte b is:

| 63 … 24 | 23 … 19 | 18 … 3 | 2 … 0 |
|---|---|---|---|
| FFFF FFFF 0E00 $0000_{63..24}$ | th | 0 | b |
| 40 | 5 | 16 | 3 |

Definition

```
def data ← AccessPhysicalEventMask(pa,op,wdata) as
    th ← pa23..19
    if (th < T) and (pa18..4 = 0) then
        case op of
            R:
                data ← 0^64 || EventMask[th]
            W:
                EventMask[th] ← wdata63..0
        endcase
    else
        data ← 0
    endif
enddef
```

Exceptions:

The table below shows the exceptions, the corresponding exception number, and the parameter supplied by the exception handler in general register 3.

| number | exception | parameter (general register 3) |
|---|---|---|
| 0 | EventInterrupt | |
| 1 | MissInGlobalTB | global address |
| 2 | AccessDetailRequiredByTag | global address |
| 3 | AccessDetailRequiredByGlobalTB | global address |
| 4 | AccessDetailRequiredByLocalTB | local address |
| 5 | | |
| 6 | SecondException | |
| 7 | ReservedInstruction | instruction |
| 8 | OperandBoundary | instruction |
| 9 | AccessDisallowedByTag | global address |
| 10 | AccessDisallowedByGlobalTB | global address |
| 11 | AccessDisallowedByLocalTB | local address |
| 12 | MissInLocalTB | local address |
| 13 | FixedPointArithmetic | instruction |
| 14 | FloatingPointArithmetic | instruction |
| 15 | GatewayDisallowed | none |
| 16 | | |
| 17 | | |
| 18 | | |
| 19 | | |
| 20 | | |
| 21 | | |
| 22 | | |
| 23 | | |
| 24 | | |
| 25 | | |
| | TakenBranch | |
| | TakenBranchContinue | |

GlobalTBMiss Handler

The GlobalTBMiss exception occurs when a load, store, or instruction fetch is attempted while none of the GlobalTB entries contain a matching virtual address. The Zeus processor uses a fast software-based exception handler to fill in a missing GlobalTB entry.

There are several possible ways that software may maintain page tables. For purposes of this discussion, it is assumed that a virtual page table is maintained, in which 128 bit GTB values for each 4 k byte page in a linear table which is itself in virtual memory. By maintaining the page table in virtual memory, very large virtual spaces may be managed without keeping a large amount of physical memory dedicated to page tables.

Because the page table is kept in virtual memory, it is possible that a valid reference may cause a second GTBMiss exception if the virtual address that contains the page table is not present in the GTB. The processor is designed to permit a second exception to occur within an exception handler, causing a branch to the SecondException handler. However, to simplify the hardware involved, a SecondException exception saves no specific information about the exception—handling depends on keeping enough relevant information in general registers to recover from the second exception.

Zeus is a multithreaded processor, which creates some special considerations in the exception handler. Unlike a single-threaded processor, it is possible that multiple threads may nearly simultaneously reference the same page and invoke two or more GTB misses, and the fully-associative construction of the GTB requires that there be no more than one matching entry for each global virtual address. Zeus provides a search-and-insert operation (GTBUpdateFill) to simplify the handling of the GTB. This operation also uses hardware GTB pointer registers to select GTB entries for replacement in FIFO priority.

A further problem is that software may need to modify the protection information contained in the GTB, such as to remove read and/or write access to a page in order to infer which parts of memory are in use, or to remove pages from a task. These modifications may occur concurrently with the GTBMiss handler, so software must take care to properly synchronize these operations. Zeus provides a search-and-update operation (GTBUpdate) to simplify updating GTB entries.

When a large number of page table entries must be changed, noting the limited capacity of the GTB can reduce the work. Reading the GTB can be less work than matching all modified entries against the GTB contents. To facilititate this, Zeus also provides read access to the hardware GTB pointers to further permit scanning the GTB for entries which have been replaced since a previous scan. GTB pointer wraparound is also logged, so it can be determined that the entire GTB needs to be scanned if all entries have been replaced since a previous scan.

In the code below, offsets from r1 are used with the following data structure

| Offset | Meaning |
|---|---|
| 0 . . . 15 | r0 save |
| 16 . . . 32 | r1 save |
| 32 . . . 47 | r2 save |
| 48 . . . 63 | r3 save |
| 512 . . . 527 | r4 save |
| 528 . . . 535 | BasePT |
| 536 . . . 543 | GTBUpdateFill |
| 544 . . . 559 | DummyPT |
| 560 . . . 639 | available 96 bytes |

BasePT = 512 + 16
GTBUpdateFill = BasePT + 8
DummyPT = GTBUpdateFill + 8

On a GTBMiss, the handler retrieves a base address for the virtual page table and constructs an index by shifting away the page offset bits of the virtual address. A single 128-bit indexed load retrieves the new GTB entry directly (except that a virtual page table miss causes a second exception, handled below). A single 128-bit store to the GTBUpdateFill location places the entry into the GTB, after checking to ensure that a concurrent handler has not already placed the entry into the GTB.

Code for GlobalTBMiss:

```
    li64la   r2= r1,BasePT          //base address for page table
    ashri    r3 @ 12                //4k pages
    l128la   r3=r2,r3               //retrieve page table, SecExc if bad
                                    va
2:  li64la   r2=r1,GTBUpdateFill    //pointer to GTB update location
    si128la  r3,r2,0                //save new TB entry
    li128la  r3=r1,48               //restore r3
    li128la  r2=r1,32               //restore r2
    li128la  r1=r1,16               //restore r1
    bback                           //restore r0 and return
```

A second exception occurs on a virtual page table miss. It is possible to service such a page table miss directly, however, the page offset bits of the virtual address have been shifted away, and have been lost. These bits can be recovered: in such a case, a dummy GTB entry is constructed, which will cause an exception other than GTBMiss upon returning. A re-execution of the offending code will then invoke a more extensive handler, making the full virtual address available.

For purposes of this example, it is assumed that checking the contents of r2 against the contents of BasePT is a good way to ensure that the second exception handler was entered from the GlobalTBMiss handler.

Code for SecondException:

```
    si128la     r4,r1,512       //save r4
    li64la      r4=r1,BasePT    //base address for page table
    bne         r2,r4,1f        //did we lose at page table load?
    li128la     r2=r1,DummyPT   //dummy page table, shifted left
                                64-12 bits
    xshlmi128   r3@r2,64+12     //combine page number with
                                dummy entry
    li128la     r4=r1,512       //restore r4
    b           2b              //fall back into GTB Miss handler
1:
```

Exceptions in Detail

There are no special registers to indicate details about the exception, such as the virtual address at which an access was attempted, or the operands of a floating-point operation that results in an exception. Instead, this information is available via general registers or registers stored in memory.

When a synchronous exception or asynchronous event occurs, the original contents of general registers 0 . . . 3 are saved in memory and replaced with (0) program counter, privilege level, and ephemeral program state, (1) event data pointer, (2) exception code, and (3) when applicable, failing address or instruction. A new program counter and privilege level is loaded from memory and execution begins at the new address. After handling the exception and restoring all but one general register, a branch-back instruction restores the final general register and resumes execution.

During exception handling, any asynchronous events are kept pending until a BranchBack instruction is performed. By this mechanism, we can handle exceptions and events one at a time, without the need to interrupt and stack exceptions. Software should take care to avoid keeping the handling of asynchronous events pending for too long.

When a second exception occurs in a thread which is handling an exception, all the above operations occur, except for the saving and replacing of general registers 0 . . . 3 in memory. A distinct exception code SecondException replaces the normal exception code. By this mechanism, a fast exception handler for GlobalTBMiss can be written, in which a second GlobalTBMiss or FixedPointOverflow exception may safely occur.

When a third exception occurs in a thread which is handling an exception, an immediate transfer of control occurs to the machine check vector address, with information about the exception available in the machine check cause field of the status register. The transfer of control may overwrite state that may be necessary to recover from the exception; the intent is to provide a satisfactory post-mortem indication of the characteristics of the failure.

This section describes in detail the conditions under which exceptions occur, the parameters passed to the exception handler, and the handling of the result of the procedure.

Reserved Instruction

The ReservedInstruction exception occurs when an instruction code which is reserved for future definition as part of the Zeus architecture is executed, or when an instruction code which is specified by the architecture, but not implemented is executed.

General register 3 contains the 32-bit instruction.

Operand Boundary

This exception occurs when a load, store, branch, or gateway refers to an aligned memory operand with an improperly aligned address, or if architecture description parameter LB=1, may also occur if the add or increment of the base general register or program counter which generates the address changes the unmasked upper 16 bits of the local address. This exception also occurs when a wide operand instruction refers to wide operand with an improperly aligned address or size or shape that exceeds the boundaries of the architecture or implementation. This exception also occurs when the element size or element type specification depends on the value of a register parameter and the value of parameter is not supported in the architecture or implementation or not consistent with other specified values.

General register 3 contains the 32-bit instruction.

Access Disallowed by Tag

This exception occurs when a read (load), write (store), execute, or gateway attempts to access a virtual address for which the matching cache tag entry does not permit this access.

General register 3 contains the global address to which the access was attempted.

Access Detail Required by Tag

This exception occurs when a read (load), write (store), or execute attempts to access a virtual address for which the matching virtual cache entry would permit this access, but the detail bit is set.

General register 3 contains the global address to which the access was attempted.

The exception handler should determine accessibility. If the access should be allowed, the continuepastdetail bit is set and execution returns. Upon return, execution is restarted and the access will be retried. Even if the detail bit is set in the matching virtual cache entry, access will be permitted.

Access Disallowed by Global TB

This exception occurs when a read (load), write (store), execute, or gateway attempts to access a virtual address for which the matching global TB entry does not permit this access.

General register 3 contains the global address to which the access was attempted.

The exception handler should determine accessibility, modify the virtual memory state if desired, and return if the access should be allowed. Upon return, execution is restarted and the access will be retried.

Access Detail Required by Global TB

This exception occurs when a read (load), write (store), execute, or gateway attempts to access a virtual address for which the matching global TB entry would permit this access, but the detail bit in the global TB entry is set.

General register 3 contains the global address to which the access was attempted.

The exception handler should determine accessibility and return if the access should be allowed. Upon return, execution is restarted and the access will be allowed. If the access is not to be allowed, the handler should not return.

Global TB Miss

This exception occurs when a read (load), write (store), execute, or gateway attempts to access a virtual address for which no global TB entry matches.

General register 3 contains the global address to which the access was attempted.

The exception handler should load a global TB entry that defines the translation and protection for this address. Upon return, execution is restarted and the global TB access will be attempted again.

Access Disallowed by Local TB

This exception occurs when a read (load), write (store), execute, or gateway attempts to access a virtual address for which the matching local TB entry does not permit this access.

General register 3 contains the local address to which the access was attempted.

The exception handler should determine accessibility, modify the virtual memory state if desired, and return if the access should be allowed. Upon return, execution is restarted and the access will be retried.

Access Detail Required by Local TB

This exception occurs when a read (load), write (store), execute, or gateway attempts to access a virtual address for which the matching local TB entry would permit this access, but the detail bit in the local TB entry is set.

General register 3 contains the local address to which the access was attempted.

The exception handler should determine accessibility and return if the access should be allowed. Upon return, execution is restarted and the access will be allowed. If the access is not to be allowed, the handler should not return.

Local TB Miss

This exception occurs when a read (load), write (store), execute, or gateway attempts to access a virtual address for which no local TB entry matches.

General register 3 contains the local address to which the access was attempted.

The exception handler should load a local TB entry that defines the translation and protection for this address. Upon return, execution is restarted and the local TB access will be attempted again.

Floating-Point Arithmetic

General register 3 contains the 32-bit instruction.

The address of the instruction that was the cause of the exception is passed as the contents of general register 0. The exception handler should attempt to perform the function specified in the instruction and service any exceptional conditions that occur.

Fixed-Point Arithmetic

This exception occurs when an arithmetic operation for which overflow checking has been specified produces a result which is not accurately representable in the destination format. This exception also occurs when an operation for which parameters are specified in register operands encounters parameters which cannot be performed because the values exceed a boundary condition specified by the architecture.

General register 3 contains the 32-bit instruction.

The address of the instruction which was the cause of the exception is passed as the contents of general register 0. The exception handler should attempt to perform the function specified in the instruction and service any exceptional conditions that occur.

Reset and Error Recovery

Certain external and internal events cause the processor to invoke reset or error recovery operations. These operations consist of a full or partial reset of critical machine state, including initialization of the threads to begin fetching instructions from the start vector address. Software may determine the nature of the reset or error by reading the value of the control register, in which finding the reset bit set (1) indicates that a reset has occurred, and finding both the reset bit cleared (0) indicates that a machine check has occurred. When either a reset or machine check has been indicated, the contents of the status register contain more detailed information on the cause.

Definition

```
def PerformMachineCheck(cause) as
    ResetVirtualMemory( )
    ProgramCounter ← StartVectorAddress
    PrivilegeLevel ← 3
    StatusRegister ← cause
enddef
```

Reset

A reset may be caused by a power-on reset, a bus reset, a write of the control register which sets the reset bit, or internally detected errors including meltdown detection, and double check.

A reset causes the processor to set the configuration to minimum power and low clock speed, note the cause of the reset in the status register, stabilize the phase locked loops, disable the MMU from the control register, and initialize a all threads to begin execution at the start vector address.

Other system state is left undefined by reset and must be explicitly initialized by software; this explicitly includes the thread register state, LTB and GTB state, superspring state, and external interface devices. The code at the start vector address is responsible for initializing these remaining system facilities, and reading further bootstrap code from an external ROM.

Power-On Reset

A reset occurs upon initial power-on. The cause of the reset is noted by initializing the Status Register and other registers to the reset values noted below.

Bus Reset

A reset occurs upon observing that the RESET signal has been at active. The cause of the reset is noted by initializing the Status Register and other registers to the reset values noted below.

Control Register Reset

A reset occurs upon writing a one to the reset bit of the Control Register. The cause of the reset is noted by initializing the Status Register and other registers to the reset values noted below.

Meltdown Detected Reset

A reset occurs if the temperature is above the threshold set by the meltdown margin field of the configuration register. The cause of the reset is noted by setting the meltdown detected bit of the Status Register.

Double Check Reset

A reset occurs if a second machine check occurs that prevents recovery from the first machine check. Specifically, the occurrence of an exception in event thread, watchdog timer error, or bus error while any machine check cause bit is still set in the Status Register results in a double machine check reset. The cause of the reset is noted by setting the double check bit of the Status Register.

Machine Check

Detected hardware errors, such as communications errors in the bus, a watchdog timeout error, or internal cache parity errors, invoke a machine check. A machine check will disable the MMU, to translate all local virtual addresses to equal physical addresses, note the cause of the exception in the Status Register, and transfer control of the all threads to the start vector address. This action is similar to that of a reset, but differs in that the configuration settings, and thread state are preserved.

Recovery from machine checks depends on the severity of the error and the potential loss of information as a direct cause of the error. The start vector address is designed to reach internal ROM memory, so that operation of machine check diagnostic and recovery code need not depend on proper operation or contents of any external device. The program counter and general register file state of the thread prior to the machine check is lost (except for the portion of the program counter saved in the Status Register), so diagnostic and recovery code must not assume that the general register file state is indicative of the prior operating state of the thread. The state of the thread is frozen similarly to that of an exception.

Machine check diagnostic code determines the cause of the machine check from the processor's Status Register, and as required, the status and other registers of external bus devices.

Recovery code will generally consume enough time that real-time interface performance targets may have been missed. Consequently, the machine check recovery software may need to repair further damage, such as interface buffer underruns and overruns as may have occurred during the intervening time.

This final recovery code, which re-initializes the state of the interface system and recovers a functional event thread state, may return to using the complete machine resources, as the condition which caused the machine check will have been resolved.

The following table lists the causes of machine check errors.

| |
|---|
| Parity or uncorrectable error in on-chip cache |
| Parity or communications error in system bus |
| Event Thread exception |
| Watchdog timer |

Parity or Uncorrectable Error in Cache

When a parity or uncorrectable error occurs in an on-chip cache, such an error is generally non-recoverable. These errors are non-recoverable because the data in such caches may reside anywhere in memory, and because the data in such caches may be the only up-to-date copy of that memory contents. Consequently, the entire contents of the memory store is lost, and the severity of the error is high enough to consider such a condition to be a system failure.

The machine check provides an opportunity to report such an error before shutting down a system for repairs.

There are specific means by which a system may recover from such an error without failure, such as by restarting from a system-level checkpoint, from which a consistent memory state can be recovered.

Parity or Communications Error in Bus

When a parity or communications error occurs in the system bus, such an error may be partially recoverable.

Bits corresponding to the affected bus operation are set in the processor's Status Register. Recovery software should determine which devices are affected, by querying the Status Register of each device on the affected MediaChannel channels.

A bus timeout may result from normal self-configuration activities.

If the error is simply a communications error, resetting appropriate devices and restarting tasks may recover from the error. Read and write transactions may have been underway at the time of a machine check and may or may not be reflected in the current system state.

If the error is from a parity error in memory, the contents of the affected area of memory is lost, and consequently the tasks associated with that memory must generally be aborted, or resumed from a task-level checkpoint. If the contents of the affected memory can be recovered from mass storage, a complete recovery is possible.

If the affected memory is that of a critical part of the operating system, such a condition is considered a system failure, unless recovery can be accomplished from a system-level checkpoint.

Watchdog Timeout Error

A watchdog timeout error indicates a general software or hardware failure. Such an error is generally treated as non-recoverable and fatal.

Event Thread Exception

When an event thread suffers an exception, the cause of the exception and a portion of the virtual address at which the exception occurred are noted in the Status Register. Because under normal circumstances, the event thread should be designed not to encounter exceptions, such exceptions are treated as non-recoverable, fatal errors.

Reset State

A reset or machine check causes the Zeus processor to stabilize the phase locked loops, disable the local and global TB, to translate all local virtual addresses to equal physical addresses, and initialize all threads to begin execution at the start vector address.

Start Address

The start address is used to initialize the threads with a program counter upon a reset, or machine check. These causes of such initialization can be differentiated by the contents of the Status Register.

The start address is a virtual address which, when "translated" by the local TB and global TB to a physical address, is designed to access the internal ROM code. The internal ROM space is chosen to minimize the number of internal resources and interfaces that must be operated to begin execution or recover from a machine check.

| Virtual/physical address | description |
|---|---|
| 0xFFFF FFFF FFFF FFFC | start vector address |

Definition

```
def StartProcessor as
    forever
        catch check
            EnableWatchdog ← 0
            fork RunClock
            ControlRegister62 ← 0
            for th ← 0 to T−1
                ProgramCounter[th] ← 0xFFFF FFFF FFFF FFFC
                PrivilegeLevel[th] ← 3
                fork Thread(th)
            endfor
        endcatch
        kill RunClock
        for th ← 0 to T−1
            kill Thread(th)
        endfor
        PerformMachineCheck(check)
    endforever
enddef
```

-continued

```
def PerformMachineCheck(check) as
    case check of
        ClockWatchdog:
        CacheError:
        ThirdException:
    endcase
enddef
```

Internal ROM Code

Zeus internal ROM code performs reset initialization of on-chip resources, including the LZC and LOC, followed by self-testing. The BIOS ROM should be scanned for a special prefix that indicates that Zeus native code is present in the ROM, in which case the ROM code is executed directly, otherwise execution of a BIOS-level x86 emulator is begun.

Memory and Devices

Physical Memory Map

Zeus defines a 64-bit physical address, but while residing in a S7 pin-out, can address a maximum of 4 Gb of main memory. In other packages the core Zeus design can provide up to 64-bit external physical address spaces. Bit 63 . . . 32 of the physical address distinguishes between internal (on-chip) physical addresses, where bits 63 . . . 32=FFFFFFFF, and external (off-chip) physical addresses, where bits 63 . . . 32≠FFFFFFFF.

| Address range | bytes | Meaning |
|---|---|---|
| 0000 0000 0000 0000 . . . 0000 0000 FFFF FFFF | 4G | External Memory |
| 0000 0001 0000 0000 . . . FFFF FFFE FFFF FFFF | 16E−8G | External Memory expansion |
| FFFF FFFF 0000 0000 . . . FFFF FFFF 0002 0FFF | 128K+4K | Level One Cache |
| FFFF FFFF 0002 1000 . . . FFFF FFFF 08FF FFFF | 144M−132K | Level One Cache expansion |
| FFFF FFFF 0900 0000 . . . FFFF FFFF 0900 007F | 128 | Level One Cache redundancy |
| FFFF FFFF 0900 0080 . . . FFFF FFFF 09FF FFFF | 16M−128 | LOC redundancy expansion |
| FFFF FFFF 0A00 $0000+t*2^{19}+e*16$ | $8*T*2^{LE}$ | LTB thread t entry e |
| FFFF FFFF 0A00 0000 . . . FFFF FFFF 0AFF FFFF | $8*T*2^{LE}$ | LTB max $8*T*2^{LE}=16M$ bytes |
| FFFF FFFF 0B00 0000 . . . FFFF FFFF 0BFF FFFF | 16M | Special Bus Operations |
| FFFF FFFF 0C00 $0000+t_{5 \ldots GT}*2^{19+GT}+e*16$ | $T2^{4+GE-GT}$ | GTB thread t entry e |
| FFFF FFFF 0C00 0000 . . . FFFF FFFF 0CFF FFFF | $T2^{4+GE-GT}$ | GTB max $2^{5+4+15}=16M$ bytes |
| FFFF FFFF 0D00 $0000+t_{5 \ldots GT}*2^{19+GT}$ | $16*T*2^{-GT}$ | GTBUpdate thread t |
| FFFF FFFF 0D00 $0100+t_{5 \ldots GT}*2^{19+GT}$ | $16*T*2^{-GT}$ | GTBUpdateFill thread t |
| FFFF FFFF 0D00 $0200+t_{5 \ldots GT}*2^{19+GT}$ | $8*T*2^{-GT}$ | GTBLast thread t |
| FFFF FFFF 0D00 $0300+t_{5 \ldots GT}*2^{19+GT}$ | $8*T*2^{-GT}$ | GTBFirst thread t |
| FFFF FFFF 0D00 $0400+t_{5 \ldots GT}*2^{19+GT}$ | $8*T*2^{-GT}$ | GTBBump thread t |
| FFFF FFFF 0E00 $0000+t*2^{19}$ | 8T | Event Mask thread t |
| FFFF FFFF 0F00 0000 . . . FFFF FFFF 0F00 0007 | 8 | Event Register |
| FFFF FFFF 0F00 0008 . . . FFFF FFFF 0F00 00FF | 256−8 | Reserved |
| FFFF FFFF 0F00 0100 . . . FFFF FFFF 0F00 0107 | **8** | ~~**Event Register with stall**~~ |
| FFFF FFFF 0F00 0108 . . . FFFF FFFF 0F00 01FF | 256−8 | Reserved |
| FFFF FFFF 0F00 0200 . . . FFFF FFFF 0F00 0207 | 8 | Event Register bit set |
| FFFF FFFF 0F00 0208 . . . FFFF FFFF 0F00 02FF | 256−8 | Reserved |
| FFFF FFFF 0F00 0300 . . . FFFF FFFF 0F00 0307 | 8 | Event Register bit clear |
| FFFF FFFF 0F00 0308 . . . FFFF FFFF 0F00 03FF | 256−8 | Reserved |
| FFFF FFFF 0F00 0400 . . . FFFF FFFF 0F00 0407 | 8 | Clock Cycle |
| FFFF FFFF 0F00 0408 . . . FFFF FFFF 0F00 04FF | 256−8 | Reserved |
| FFFF FFFF 0F00 0500 . . . FFFF FFFF 0F00 0507 | 8 | Thread |
| FFFF FFFF 0F00 0508 . . . FFFF FFFF 0F00 05FF | 256−8 | Reserved |
| FFFF FFFF 0F00 0600 . . . FFFF FFFF 0F00 0607 | 8 | Clock Event |
| FFFF FFFF 0F00 0608 . . . FFFF FFFF 0F00 06FF | 256−8 | Reserved |
| FFFF FFFF 0F00 0700 . . . FFFF FFFF 0F00 0707 | 8 | Clock Watchdog |
| FFFF FFFF 0F00 0708 . . . FFFF FFFF 0F00 07FF | 256−8 | Reserved |
| FFFF FFFF 0F00 0800 . . . FFFF FFFF 0F00 0807 | 8 | Tally Counter 0 |
| FFFF FFFF 0F00 0808 . . . FFFF FFFF 0F00 08FF | 256−8 | Reserved |
| FFFF FFFF 0F00 0900 . . . FFFF FFFF 0F00 0907 | 8 | Tally Control 0 |
| FFFF FFFF 0F00 0908 . . . FFFF FFFF 0F00 09FF | 256−8 | Reserved |
| FFFF FFFF 0F00 0A00 . . . FFFF FFFF 0F00 0A07 | 8 | Tally Counter 1 |
| FFFF FFFF 0F00 0A08 . . . FFFF FFFF 0F00 0AFF | 256−8 | Reserved |

-continued

| Address range | bytes | Meaning |
|---|---|---|
| FFFF FFFF 0F00 0B00 . . . FFFF FFFF 0F00 0B07 | 8 | Tally Control 1 |
| FFFF FFFF 0F00 0B08 . . . FFFF FFFF 0F00 0BFF | 256−8 | Reserved |
| FFFF FFFF 0F00 0C00 . . . FFFF FFFF 0F00 0C07 | 8 | Exception Base |
| FFFF FFFF 0F00 0C08 . . . FFFF FFFF 0F00 0CFF | 256−8 | Reserved |
| FFFF FFFF 0F00 0D00 . . . FFFF FFFF 0F00 0D07 | 8 | Bus Control Register |
| FFFF FFFF 0F00 0D08 . . . FFFF FFFF 0F00 0DFF | 256−8 | Reserved |
| FFFF FFFF 0F00 0E00 . . . FFFF FFFF 0F00 0E07 | 8 | Status Register |
| FFFF FFFF 0F00 0E08 . . . FFFF FFFF 0F00 0EFF | 256−8 | Reserved |
| FFFF FFFF 0F00 0F00 . . . FFFF FFFF 0F00 0F07 | 8 | Control Register |
| FFFF FFFF 0F00 0F08 . . . FFFF FFFF FEFF FFFF | 4G−256M−3848 | Reserved |
| FFFF FFFF FF00 0000 . . . FFFF FFFF FFFE FFFF | 16M−64k | Internal ROM expansion |
| FFFF FFFF FFFF 0000 . . . FFFF FFFF FFFF FFFF | 64K | Internal ROM |

The suffixes in the table above have the following meanings:

| letter | name | $_2$x | "binary" | $_{10}$y | "decimal" |
|---|---|---|---|---|---|
| b | bits | | | | |
| B | bytes | 0 | 1 | 0 | 1 |
| K | kilo | 10 | 1 024 | 3 | 1 000 |
| M | mega | 20 | 1 048 576 | 6 | 1 000 000 |
| G | giga | 30 | 1 073 741 824 | 9 | 1 000 000 000 |
| T | tera | 40 | 1 099 511 627 776 | 12 | 1 000 000 000 000 |
| P | peta | 50 | 1 125 899 906 842 624 | 15 | 1 000 000 000 000 000 |
| E | exa | 60 | 1 152 921 504 606 846 976 | 18 | 1 000 000 000 000 000 000 |

Definition

```
def data ← ReadPhysical(pa,size) as
      data,flags ← AccessPhysical(pa,size,WA,R,0)
enddef
def WritePhysical(pa,size,wdata) as
      data,flags ← AccessPhysical(pa,size,WA,W,wdata)
enddef
def data,flags ← AccessPhysical(pa,size,cc,op,wdata) as
      if (0x0000000000000000 ≦ pa ≦ 0x00000000FFFFFFFF) then
            data,flags ← AccessPhysicalBus(pa,size,cc,op,wdata)
      else
            data ← AccessPhyiscalDevices(pa,size,op,wdata)
            flags ← 1
      endif
enddef
def data ← AccessPhysicalDevices(pa,size,op,wdata) as
      if (size=256) then
            data0 ← AccessPhysicalDevices(pa,128.op.wdata_{127..0})
            data1 ← AccessPhysicalDevices(pa+16,128.op.wdata_{255..128})
            data ← data1 || data0
      elseif (0xFFFFFFFF0B000000 ≦ pa ≦ 0xFFFFFFFF0BFFFFFF)
      then
            //don't perform RMW on this region
            data ← AccessPhysicalOtherBus(pa,size,op,wdata)
      elseif (op=W) and (size<128) then
            //this code should change to check pa4..0≠0 and size<sizeofreg
            rdata ← AccessPhysicalDevices(pa and ~15,128,R,0)
            bs ← 8*(pa and 15)
            be ← bs + size
            hdata ← rdata_{127..be} || wdata_{be−1..bs} || rdata_{bs−1..0}
            data ← AccessPhysicalDevices(pa and ~15,128,W,hdata)
      elseif (0x0000000100000000 ≦ pa ≦ 0xFFFFFFFEFFFFFFFF) then
            data ← 0
      elseif (0xFFFFFFFF00000000 ≦ pa ≦ 0xFFFFFFFF08FFFFFF) then
            data,← AccessPhysicalLOC(pa,op,wdata)
      elseif (0xFFFFFFFF09000000 ≦ pa ≦ 0xFFFFFFFF09FFFFFF) then
            data ← AccessPhysicalLOCRedundancy(pa,op,wdata)
      elseif (0xFFFFFFFF0A000000 ≦ pa ≦ 0xFFFFFFFF0AFFFFFF)
      then
            data ← AccessPhysicalLTB(pa,op,wdata)
```

-continued

```
      elseif (0xFFFFFFFF0C000000 ≦ pa ≦ 0xFFFFFFFF0CFFFFFF)
      then
            data ← AccessPhysicalGTB(pa,op,wdata)
      elseif (0xFFFFFFFF0D000000 ≦ pa ≦ 0xFFFFFFFF0DFFFFFF)
      then
            data ← AccessPhysicalGTBRegisters(pa,op,wdata)
      elseif (0xFFFFFFFF0E000000 ≦ pa ≦ 0xFFFFFFFF0EFFFFFF) then
            data ← AccessPhysicalEventMask(pa,op,wdata)
      elseif (0xFFFFFFFF0F000000 ≦ pa ≦ 0xFFFFFFFF0FFFFFFF) then
            data ← AccessPhysicalSpecialRegisters(pa,op,wdata)
      elseif (0xFFFFFFFF10000000 ≦ pa ≦ 0xFFFFFFFFFEFFFFFF) then
            data ← 0
      elseif (0xFFFFFFFFFF000000 ≦ pa ≦ 0xFFFFFFFFFFFFFFFF) then
            data ← AccessPhysicalROM(pa,op,wdata)
      endif
enddef
def data ← AccessPhysicalSpecialRegisters(pa,op,wdata) as
      if (pa_{7..0} ≧ 0x10) then
            data ← 0
      elseif (0xFFFFFFFF0F000000 ≦ pa ≦ 0xFFFFFFFF0F0003FF) then
            data ← AccessPhysicalEventRegister(pa,op,wdata)
      elseif (0xFFFFFFFF0F000500 ≦ pa ≦ 0xFFFFFFFF0F0005FF) then
            data,← AccessPhysicalThread(pa,op,wdata)
      elseif (0xFFFFFFFF0F000400 ≦ pa ≦ 0xFFFFFFFF0F0007FF) then
            data,← AccessPhysicalClock(pa,op,wdata)
      elseif (0xFFFFFFFF0F000800 ≦ pa ≦ 0xFFFFFFFF0F000BFF) then
            data,← AccessPhysicalTally(pa,op,wdata)
      elseif (0xFFFFFFFF0F000C00 ≦ pa ≦ 0xFFFFFFFF0F000CFF) then
            data,← AccessPhysicalExceptionBase(pa,op,wdata)
      elseif (0xFFFFFFFF0F000D00 ≦ pa ≦ 0xFFFFFFFF0F000DFF)
      then
            data,← AccessPhysicalBusControl(pa,op,wdata)
      elseif (0xFFFFFFFF0F000E00 ≦ pa ≦ 0xFFFFFFFF0F000EFF) then
            data,← AccessPhysicalStatus(pa,op,wdata)
      elseif (0xFFFFFFFF0F000F00 ≦ pa ≦ 0xFFFFFFFF0F000FFF) then
            data,← AccessPhysicalControl(pa,op,wdata)
      endif
enddef
```

Architecture Description Register

The last hexlet of the internal ROM contains data that describes implementation-dependent choices within the architecture specification. The last quadlet of the internal ROM contains a branch-immediate instruction, so the architecture description is limited to 96 bits.

| Address range | bytes | Meaning |
|---|---|---|
| FFFF FFFF FFFF FFFC . . . FFFF FFFF FFFF FFFF | 4 | Reset address |
| FFFF FFFF FFFF FFF0 . . . FFFF FFFF FFFF FFFB | 12 | Architecture Description Register |

The table below indicates the detailed layout of the Architecture Description Register.

| bits | field name | value | range | interpretation |
|---|---|---|---|---|
| 127 . . . 96 | bi start | | | Contains a branch instruction for bootstrap from internal ROM |
| 95 . . . 23 | 0 | 0 | 0 | reserved |
| 22 . . . 21 | GT | 1 | 0 . . . 3 | $\log_2$ threads which share a global TB |
| 20 . . . 17 | GE | 7 | 0 . . . 15 | $\log_2$ entries in global TB |
| 16 | LB | 1 | 0 . . . 1 | local TB based on base register |
| 15 . . . 14 | LE | 1 | 0 . . . 3 | $\log_2$ entries in local TB (per thread) |
| 13 | CT | 1 | 0 . . . 1 | dedicated tags in first-level cache |
| 12 . . . 10 | CS | 2 | 0 . . . 7 | $\log_2$ cache blocks in first-level cache set |
| 9 . . . 5 | CE | 9 | 0 . . . 31 | $\log_2$ cache blocks in first-level cache |
| 4 . . . 0 | T | 4 | 1 . . . 31 | number of execution threads |

The architecture description register contains a machine-readable version of the architecture framework parameters: T, CE, CS, CT, LE, GE, and GT described in the Architectural Framework section previously presented.

Status Register

The status register is a 64-bit register with both read and write access, though the only legal value which may be written is a zero, to clear the register. The result of writing a non-zero value is not specified.

The event exception bit of the status register is set when an event thread suffers an exception, which causes a machine check. The exception code is loaded into the machine check detail field of the status register, and the machine check program counter is loaded with the low-order 32 bits of the program counter and privilege level.

The watchdog timeout bit of the status register is set when the watchdog timer register is equal to the clock cycle register, causing a machine check.

| bits | field name | value | range | interpretation |
|---|---|---|---|---|
| 63 | power-on | 1 | 0 . . . 1 | This bit is set when a power-on reset has caused a reset. |
| 62 | internal reset | 0 | 0 . . . 1 | This bit is set when writing to the control register caused a reset. |
| 61 | bus reset | 0 | 0 . . . 1 | This bit is set when a bus reset has caused a reset. |
| 60 | double check | 0 | 0 . . . 1 | This bit is set when a double machine check has caused a reset. |
| 59 | meltdown | 0 | 0 . . . 1 | This bit is set when the meltdown detector has caused a reset. |
| 58 . . . 56 | 0 | 0* | 0 | Reserved for other machine check causes. |
| 55 | event exception | 0 | 0 . . . 1 | This bit is set when an exception in event thread has caused a machine check. |
| 54 | watchdog timeout | 0 | 0 . . . 1 | This bit is set when a watchdog timeout has caused a machine check. |
| 53 | bus error | 0 | 0 . . . 1 | This bit is set when a bus error has caused a machine check. |
| 52 | cache error | 0 | 0 . . . 1 | This bit is set when a cache error has caused a machine check. |
| 51 | vm error | 0 | 0 . . . 1 | This bit is set when a virtual memory error has caused a machine check. |
| 50 . . . 48 | 0 | 0* | 0 | Reserved for other machine check causes. |
| 47 . . . 32 | machine check detail | 0* | 0 . . . 4095 | Set to exception code if Exception in event thread. Set to bus error code is bus error. |
| 31 . . . 0 | machine check program counter | 0 | 0 | Set to indicate bits 31 . . . 0 of the value of the thread 0 program counter at the initiation of a machine check. |

The power-on bit of the status register is set upon the completion of a power-on reset.

The bus reset bit of the status register is set upon the completion of a bus reset initiated by the RESET pin of the Socket 7 interface.

The double check bit of the status register is set when a second machine check occurs that prevents recovery from the first machine check, or which is indicative of machine check recovery software failure. Specifically, the occurrence of an event exception, watchdog timeout, bus error, or meltdown while any reset or machine check cause bit of the status register is still set results in a double check reset.

The meltdown bit of the status register is set when the meltdown detector has discovered an on-chip temperature above the threshold set by the meltdown threshold field of the control register, which causes a reset to occur.

The bus error bit of the status register is set when a bus transaction error (bus timeout, invalid transaction code, invalid address, parity errors) has caused a machine check.

The cache error bit of the status register is set when a cache error, such as a cache parity error has caused a machine check.

The vm error bit of the status register is set when a virtual memory error, such as a GTB multiple-entry selection error has caused a machine check.

The machine check detail field of the status register is set when a machine check has been completed. For an exception in event thread, the value indicates the type of exception for which the most recent machine check has been reported. For a bus error, this field may indicate additional detail on the cause of the bus error. For a cache error, this field may indicate the address of the error at which the cache parity error was detected The machine check program counter field of the status register is loaded with bits 31 . . . 0 of the program counter and privilege level at which the most recent machine check has occurred. The value in this field provides a limited diagnostic capability for purposes of software development, or possibly for error recovery.

Physical Address

The physical address of the Status Register, byte b is:

| 63 … 32 | 0 |
|---|---|
| FFFF FFFF 0F00 0E00$_{63..3}$ | b |
| 61 | 3 |

Definition

```
def data ← AccessPhysicalStatus(pa,op,wdata) as
    case op of
        R:
            data ← 0^64 || StatusRegister
        W:
            StatusRegister ← wdata63..0
    endcase
enddef
```

Control Register

The control register is a 64-bit register with both read and write access. It is altered only by write access to this register.

| bits | field name | value | range | interpretation |
|---|---|---|---|---|
| 63 | reset | 0 | 0 . . . 1 | set to invoke internal reset |
| 62 | MMU | 0 | 0 . . . 1 | set to enable the MMU |
| 61 | LOC parity | 0 | 0 . . . 1 | set to enable LOC parity |
| 60 | meltdown | 0 | 0 . . . 1 | set to enable meltdown detector |
| 59 . . . 57 | LOC timing | 0 | 0 . . . 7 | adjust LOC timing 0 ⇒ slow . . . 7 ⇒ fast |
| 56 . . . 55 | LOC stress | 0 | 0 . . . 3 | adjust LOC stress 0 ⇒ normal |
| 54 . . . 52 | clock timing | 0 | 0 . . . 7 | adjust clock timing 0 ⇒ slow . . . 7 ⇒ fast |
| 51 . . . 12 | 0 | 0 | 0 | Reserved |
| 11 . . . 8 | global access | 0* | 0 . . . 15 | global access |
| 7 . . . 0 | niche limit | 0* | 0 . . . 127 | niche limit |

The reset bit of the control register provides the ability to reset an individual Zeus device in a system. Writing a one (1) to this bit is equivalent to a power-on reset or a bus reset. The duration of the reset is sufficient for the operating state changes to have taken effect. At the completion of the reset operation, the internal reset bit of the status register is set and the reset bit of the control register is cleared (0).

The MMU bit of the control register provides the ability to enable or disable the MMU features of the Zeus processor. Writing a zero (0) to this bit disables the MMU, causing all MMU-related exceptions to be disabled and causing all load, store, program and gateway virtual addresses to be treated as physical addresses. Writing a one (1) to this bit enables the MMU and MMU-related exceptions. On a reset or machine check, this bit is cleared (0), thus disabling the MMU.

The parity bit of the control register provides the ability to enable or disable the cache parity feature of the Zeus processor. Writing a zero (0) to this bit disables the parity check, causing the parity check machine check to be disabled. Writing a one (1) to this bit enables the cache parity machine check. On a reset or machine check, this bit is cleared (0), thus disabling the cache parity check.

The meltdown bit of the control register provides the ability to enable or disable the meltdown detection feature of the Zeus processor. Writing a zero (0) to this bit disables the meltdown detector, causing the meltdown detected machine check to be disabled. Writing a one (1) to this bit enables the meltdown detector. On a reset or machine check, this bit is cleared (0), thus disabling the meltdown detector.

The LOC timing bits of the control register provide the ability to adjust the cache timing of the Zeus processor. Writing a zero (0) to this field sets the cache timing to its slowest state, enhancing reliability but limiting clock rate. Writing a seven (7) to this field sets the cache timing to its fastest state, limiting reliability but enhancing performance. On a reset or machine check, this field is cleared (0), thus providing operation at low clock rate. Changing this register should be performed when the cache is not actively being operated.

The LOC stress bits of the control register provide the ability to stress the LOC parameters by adjusting voltage levels within the LOC. Writing a zero (0) to this field sets the cache parameters to its normal state, enhancing reliability. Writing a non-zero value (1, 2, or 3) to this field sets the cache parameters to levels at which cache reliability is slightly compromised. The stressed parameters are used to cause LOC cells with marginal performance to fail during self-test, so that redundancy can be employed to enhance reliability. On a reset or machine check, this field is cleared (0), thus providing operation at normal parameters. Changing this register should be performed when the cache is not actively being operated.

The clock timing bits of the control register provide the ability to adjust the clock timing of the Zeus processor. Writing a zero (0) to this field sets the clock timing to its slowest state, enhancing reliability but limiting clock rate. Writing a seven (7) to this field sets the clock timing to its fastest state, limiting reliability but enhancing performance. On a power on reset, bus reset, or machine check, this field is cleared (0), thus providing operation at low clock rate. The internal clock rate is set to (clock timing+1)/2*(external clock rate). Changing this register should be performed along with a control register reset.

The global access bits of the control register determine whether a local TB miss cause an exceptions or treatment as a global address. A single bit, selected by the privilege level active for the access from four bit configuration register field, "Global Access," (GA) determines the result. If $GA_{PL}$ is zero (0), the failure causes an exception, if it is one (1), the failure causes the address to be used as a global address directly.

The niche limit bits of the control register determine which cache lines are used for cache access, and which lines are used for niche access. For addresses $pa_{14 \ldots 8}$<nl, a 7-bit address modifier register am is inclusive-or'ed against $pa_{14 \ldots 8}$ to determine the cache line. The cache modifier am must be set to $(1^{7-log(128-nl)} \| 0^{log(128-nl)})$ for proper operation. The am value does not appear in a register and is generated from the nl value.

Physical Address

The physical address of the Control Register, byte b is:

| 63 … 32 | 0 |
|---|---|
| FFFF FFFF 0F00 0F00$_{63..3}$ | b |
| 61 | 3 |

Definition

```
def data ← AccessPhysicalControl(pa,op,wdata) as
    case op of
        R:
            data ← 0^64 || ControlRegister
        W:
            ControlRegister ← wdata63..0
    endcase
enddef
```

Clock

The Zeus processor provides internal clock facilities using three registers, a clock cycle register that increments one every cycle, a clock event register that sets the clock bit in the event register, and a clock watchdog register that invokes a clock watchdog machine check. These registers are memory mapped.

Clock Cycle

Each Zeus processor includes a clock that maintains processor-clock-cycle accuracy. The value of the clock cycle register is incremented on every cycle, regardless of the number of instructions executed on that cycle. The clock cycle register is 64-bits long.

For testing purposes the clock cycle register is both readable and writable, though in normal operation it should be written only at system initialization time; there is no mechanism provided for adjusting the value in the clock cycle counter without the possibility of losing cycles.

| 63 … 0 |
|---|
| clock cycle |
| 64 |

Clock Event

An event is asserted when the value in the clock cycle register is equal to the value in the clock event register, which sets the clock bit in the event register.

It is required that a sufficient number of bits be implemented in the clock event register so that the comparison with the clock cycle register overflows no more frequently than once per second. 32 bits is sufficient for a 4 GHz clock. The remaining unimplemented bits must be zero whenever read, and ignored on write. Equality is checked only against bits that are implemented in both the clock cycle and clock event registers.

For testing purposes the clock event register is both readable and writable, though in normal operation it is normally written to.

| 63 … 0 |
|---|
| clock event |
| 64 |

Clock Watchdog

A Machine Check is asserted when the value in the clock cycle register is equal to the value in the clock watchdog register, which sets the watchdog timeout bit in the control register.

A Machine Check or a Reset, of any cause including a clock watchdog, disables the clock watchdog machine check. A write to the clock watchdog register enables the clock watchdog machine check.

It is required that a sufficient number of bits be implemented in the clock watchdog register so that the comparison with the clock cycle register overflows no more frequently than once per second. 32 bits is sufficient for a 4 GHz clock. The remaining unimplemented bits must be zero whenever read, and ignored on write. Equality is checked only against bits that are implemented in both the clock cycle and clock watchdog registers.

The clock watchdog register is both readable and writable, though in normal operation it is usually and periodically written with a sufficiently large value that the register does not equal the value in the clock cycle register before the next time it is written.

| 63 … 0 |
|---|
| clock watchdog |
| 64 |

Physical Address

The Clock registers appear at three different locations, for which three registers of the Clock are mapped. The Clock Cycle counter is register 0, the Clock Event is register 2, and ClockWatchdog is register 3. The physical address of a Clock Register f, byte b is:

| 63 … 10 | 9 … 8 | 7 … 3 | 2 … 0 |
|---|---|---|---|
| FFFF FFFF 0F00 0400 63..10 | f | 0 | b |
| 54 | 2 | 5 | 3 |

Definition

```
def data ← AccessPhysicalClock(pa,op,wdata) as
    f ← pa9..8
    case f || op of
        0 || R:
            data ← 0^64 || ClockCycle
        0 || W:
            ClockCycle ← wdata63..0
        2 || R:
            data ← 0^96 || ClockEvent
        2 || W:
            ClockEvent ← wdata31..0
        3 || R:
            data ← 0^96 || ClockWatchdog
        3 || W:
            ClockWatchdog ← wdata31..0
            EnableWatchdog ← 1
    endcase
enddef
def RunClock as
    forever
        ClockCycle ← ClockCycle + 1
        if EnableWatchdog and (ClockCycle31..0 = ClockWatchdog31..0) then
            raise ClockWatchdogMachineCheck
        elseif (ClockCycle31..0 = ClockEvent31..0) then
            EventRegister0 ← 1
        endif
        wait
    endforever
enddef
```

Tally Counter

Each processor includes two counters that can tally processor-related events or operations. The values of the tally counter registers are incremented on each processor clock cycle in which specified events or operations occur. The tally counter registers do not signal events.

It is required that a sufficient number of bits be implemented so that the tally counter registers overflow no more frequently than once per second. 32 bits is sufficient for a 4 GHz clock. The remaining unimplemented bits must be zero whenever read, and ignored on write.

For testing purposes each of the tally counter registers are both readable and writable, though in normal operation each should be written only at system initialization time; there is no mechanism provided for adjusting the value in the event counter registers without the possibility of losing counts.

| 63 0 | | 63 0 |
|---|---|---|
| tally counter 0 | | tally counter 1 |
| 64 | | 64 |

Physical Address

The Tally Counter registers appear at two different locations, for which the two registers are mapped. The physical address of a Tally Counter register f, byte b is:

| 63 | 10 | 9 8 | 3 2 0 |
|---|---|---|---|
| FFFF FFFF 0F00 $0800_{63..10}$ | f | 0 | b |
| 54 | 1 | 6 | 3 |

Tally Control

The tally counter control registers each select one metric for one of the tally counters.

| 63 16 | 15 0 | | 63 16 | 15 0 |
|---|---|---|---|---|
| 0 | tally control 0 | | 0 | tally control 1 |
| 48 | 16 | | 48 | 16 |

Each control register is loaded with a value in one of the following formats:

| 15 | 14 13 | 12 8 | 7 | 6 | 5 | 4 | 3 | 2 | 1 | 0 |
|---|---|---|---|---|---|---|---|---|---|---|
| 0 | flag | thread | W | E | X | G | S | L | B | A |
| 1 | 2 | 5 | 1 | 1 | 1 | 1 | 1 | 1 | 1 | 1 |

| flag | meaning |
|---|---|
| 0 | count instructions issued |
| 1 | count instructions retired (differs by branch mispred, exceptions) |
| 2 | count cycles in which at least one instruction is issued |
| 3 | count cycles in which next instruction is waiting for issue |

W E X G S L B A: include instructions of these classes

| 15 | 14 | 13 | 12 8 | 7 4 | 3 | 2 | 1 | 0 |
|---|---|---|---|---|---|---|---|---|
| 1 | 0 | 0 | thread | flag | S | L | W | I |
| 1 | 1 | 1 | 5 | 4 | 1 | 1 | 1 | 1 |

| flag | meaning |
|---|---|
| 0 | count bytes transferred cache/buffer to/from processor |
| 1 | count bytes transferred memory to/from cache/buffer |
| 2 | |
| 3 | |
| 4 | count cache hits |
| 5 | count cycles in which at least one cache hit occurs |
| 6 | count cache misses |
| 7 | count cycles in which at least one cache miss occurs |
| 8 . . . 15 | |

S L W I: include instructions of these classes (Store, Load, Wide, Instruction fetch)

| 15 | 14 | 13 | 12 8 | 7 6 | 5 | 4 | 3 | 2 | 1 | 0 |
|---|---|---|---|---|---|---|---|---|---|---|
| 1 | 0 | 1 | thread | flag | n | E | X | T | G | A |
| 1 | 1 | 1 | 5 | 2 | 1 | 1 | 1 | 1 | 1 | 1 |

| flag | meaning |
|---|---|
| 0 | count cycles in which a new instruction is issued |
| 1 | count cycles in which an execution unit is busy |
| 2 | |
| 3 | count cycles in which an instruction is waiting for issue |

n select unit number for G or A unit

E X T G A: include units of these classes (Ensemble, Crossbar, Translate, Group, Address)

| 15 | 14 | 13 | 12 | 11 | 10 | 9 | 8 | 7 | 6 | 5 0 |
|---|---|---|---|---|---|---|---|---|---|---|
| 1 | 1 | 0 | 0 | 0 | 0 | 0 | 0 | 0 | 0 | event |
| 1 | 1 | 1 | 1 | 1 | 1 | 1 | 1 | 1 | 1 | 6 |

event: select event number from event register

| 15 | 14 | 13 | 12 | 11 | 10 | 9 | 8 | 7 | 6 | 5 0 |
|---|---|---|---|---|---|---|---|---|---|---|
| 1 | 1 | 1 | 0 | 0 | 0 | 0 | 0 | 0 | 0 | other |
| 1 | 1 | 1 | 1 | 1 | 1 | 1 | 1 | 1 | 1 | 6 |

Other valid values for the tally control fields are given by the following table:

| other | meaning |
|---|---|
| 0 | count number of instructions waiting to issue each cycle |
| 1 | count number of instructions waiting in spring each cycle |
| 2 . . . 63 | Reserved |

Physical Address

The Tally Control registers appear at two different locations, for which the two registers are mapped. The physical address of a Tally Control register f, byte b is:

| 63 | 10 | 9 8 | 3 2 0 |
|---|---|---|---|
| FFFF FFFF 0F00 $0900_{63..10}$ | f | 32 | b |
| 54 | 1 | 6 | 3 |

Definition

```
def data ← AccessPhysicalTally(pa,op,wdata) as
    f ← pa_9
    case pa_8 || op of
        0 || R:
            data ← 0^96 || TallyCounter[f]
        0 || W:
            TallyCounter[f] ← wdata_31..0
        1 || R:
            data ← 0^112 || TallyControl[f]
        1 || W:
            TallyControl[f] ← wdata_15..0
    endcase
enddef
```

Thread Register

The Zeus processor includes a register that effectively contains the current thread number that reads the register. In this way, threads running identical code can discover their own identity.

It is required that a sufficient number of bits be implemented so that each thread receives a distinct value. Values must be consecutive, unsigned and include a zero value. The remaining unimplemented bits must be zero whenever read. Writes to this register are ignored.

Physical Address

The physical address of the Thread Register, byte b is:

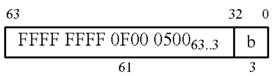

Definition

```
def data ← AccessPhysicalThread(pa,op,wdata) as
    case op of
        R:
            data ← 0^64 || Thread
        W:
            // nothing
    endcase
enddef
```

CONCLUSION

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A data processing system comprising:

a programmable processor on a single integrated circuit;

a main memory external to the single integrated circuit;

a bus coupled to the main memory;

the programmable processor including:

a bus interface coupling the programmable processor to the bus;

a first data path having a first bit width coupled to the bus interface;

a second data path having a second bit width greater than the first bit width;

a plurality of third data paths having a combined bit width less than the second bit width;

a wide operand storage, coupled to the first data path and to the second data path, for storing a wide operand received over the first data path, the wide operand having a size with a number of bits greater than the first bit width;

a register file including registers, the register file being connected to the third data paths, and including at least one wide operand specifier register storing a wide operand specifier which specifies an address of the wide operand;

a functional unit capable of performing operations in response to instructions, the functional unit coupled by the second data path to the wide operand storage, and coupled by the third data paths to the register file; and wherein the functional unit executes a single wide switch instruction containing instruction fields specifying (i) the wide operand specifier register to cause retrieval of the wide operand for storage in the wide operand storage, (ii) a source register in the register file, and (iii) a results register in the register file, the single wide switch instruction causing bits from the source register to be copied into the results register at locations specified on a bit-by-bit basis by the wide operand.

2. A system as in claim 1 wherein for each bit in the results register, the wide operand provides a multiple number of bits that specify a location within the source register from which that bit is copied.

3. A system as in claim 1 wherein the functional unit is capable of initiating only one instruction at a time, and the wide operand specifier register includes information that specifies both the address and size of the wide operand in the main memory.

4. A system as in claim 3 wherein when the wide switch instruction is executed:

the processor reads the wide operand specifier; and wherein more significant bits in the wide operand specifier provide the address in the main memory from which to fetch the wide operand, and less significant bits in the wide operand specifier specify the size of the wide operand, and wherein the address in the main memory is aligned so that the less significant bits are not required for retrieval of the wide operand from the main memory.

5. A system as in claim 3 wherein in performing a later operation specifying the wide operand stored in the wide operand storage, the system:

determines if the wide operand is already stored within the wide operand storage; and if the wide operand is already stored in the wide operand storage, reuses the wide operand from the wide operand storage in the later operation.

6. A system as in claim 1 wherein if the wide operand has been changed, the wide operand called for by the later operation is retrieved from the main memory.

7. A system as in claim 1 wherein the wide switch instruction causes copying of contents from a plurality of source registers to the results register.

8. A system as in claim 1 wherein the wide operand rearranges contents from two source registers in the register file and places the results into the results register.

9. An article of manufacture for use with a processor including a first data path having a first bit width, a second data path having a second bit width greater than the first bit width, a plurality of third data paths having a combined bit width less than the second bit width, a wide operand storage coupled to the first data path and the second data path for storing a wide operand received over the first data path, the wide operand having a size with a number of bits greater than the first bit width, a register file including registers having the first bit width, the register file being connected to the third data paths, and including a wide operand register storing a wide operand specifier that specifies an address of the wide operand, the article of manufacture comprising a non-transitory computer readable medium having computer readable code therein for causing the processor to perform steps of:

executing a wide switch instruction containing instruction fields specifying the wide operand register, a source register in the register file, and a results register in the register file; and performing a rearrangement operation wherein bits from the source register are copied into the results register at locations in the results register, the locations being specified on a bit-by-bit basis by the wide operand.

10. An article of manufacture as in claim 9 wherein for each bit in the results register, the wide operand provides a multiple number of bits that specify a location within the source register from which that bit is copied.

11. An article of manufacture as in claim 9 wherein in response to execution of the wide switch instruction, a step is performed in which the processor reads the wide operand specifier from the wide operand register, uses more significant bits in the wide operand specifier as an address in a memory from which to fetch the wide operand, and uses less significant bits in the wide operand specifier to specify the size of the wide operand.

12. A data processing system comprising:

a programmable processor on a single integrated circuit;

a main memory external to the single integrated circuit;

a bus coupled to the main memory;

the programmable processor including:

a bus interface coupling the programmable processor to the bus;

a first data path having a first bit width coupled to the bus interface;

a second data path having a second bit width greater than the first bit width;

a plurality of third data paths having a combined bit width less than the second bit width;

a wide operand storage coupled to the first data path and to the second data path for storing a wide operand received over the first data path, the wide operand having a size with a number of bits greater than the first bit width;

a register file including registers, the register file being connected to the third data paths, and including at least one wide operand register storing a wide operand specifier for specifying an address of the wide operand;

a functional unit capable of performing operations in response to instructions, the functional unit coupled by the second data path to the wide operand storage, and coupled by the third data paths to the register file; and wherein the functional unit executes a single wide translate instruction containing instruction fields specifying (i) the wide operand register to cause retrieval of the wide operand for storage in the wide operand storage, the wide operand comprising a table of values; (ii) a source register x bytes wide containing data elements; and (iii) a results register, wherein the data elements of the source register specify rows in the table, and positions of those data elements within the source register specify columns in the table, and wherein the wide translate instruction causes the values at the intersections of the specified row and the specified column for every data element in the source register to be copied at the same time in parallel into the results register at the same position as the data element within the source register.

13. A system as in claim 12 wherein the functional unit is capable of initiating only one instruction at a time, and the wide operand register includes information that specifies both the address and size of the wide operand in the main memory.

14. A system as in claim 13 wherein when the wide translate instruction is executed the processor reads the wide operand specifier from wide operand register, and more significant bits in the wide operand specifier provide an address in the main memory from which to fetch the wide operand, and less significant bits in the wide operand specifier specify the size of the wide operand, and wherein the address in the main memory is aligned so that the less significant bits are not required for retrieval of the wide operand from the main memory.

15. A system as in claim 13 wherein in performing a later operation specifying the wide operand stored in the wide operand storage, the system:

determines if the wide operand is already stored within the wide operand storage; and if the wide operand is already stored in the wide operand storage, reuses the wide operand from the wide operand storage in the later operation.

16. A system as in claim 15 wherein if the wide operand has been changed, the wide operand called for by the later operation is retrieved from the main memory.

17. A system as in claim 12 wherein the source register comprises a register having at least 16 8-bit bytes, the eight bits in each byte specifying one row of 256 rows in the table.

18. A system as in claim 12 wherein the instruction fields in the wide translate instruction further specify the size of the data elements within the source register.

19. A system as in claim 18 wherein the wide translate instruction partitions the source register into data elements of 1, 2, 4, or 8 bytes.

20. A system as in claim 19 wherein the wide translate instruction defines the number of rows within the table.

21. A system as in claim 20 wherein the table has 4, 8, 16, 32, 64, 128 or 256 rows.

22. A system as in claim 12 wherein the table is specified up to a depth of 256 entries and width of up to 128 bits.

23. A system as in claim 12 wherein if the table size is narrower than x bytes, then at least one bit of each data element is ignored.

24. A system as in claim 12 wherein if the size of the table specified by the wide operand is narrower than x bytes, at least one additional copy of the table is made, such that each data element in the source register has a corresponding column of data elements in a copy of the table.

25. A system as in claim 12 wherein if the table has fewer rows than the size of the data elements can specify, at least one bit in each data element is ignored in specifying the row in the table.

26. A system as in claim 25 wherein if the table specified by the wide operand has fewer rows than the size of the data elements can specify, multiple copies of the table are made, such that every bit in each data element specifies a row in the table.

27. An article of manufacture for use with a processor including a first data path having a first bit width, a second data path having a second bit width greater than the first bit width, a plurality of third data paths having a combined bit width less than the second bit width, a wide operand storage coupled to the first data path and the second data path for storing a wide operand received over the first data path, the wide operand having a size with a number of bits greater than the first bit width, a register file including registers having the first bit width, the register file being connected to the third data paths, and including a wide operand register storing a wide operand specifier that specifies an address of the wide operand, a non-transitory computer readable medium having computer readable code therein for causing the processor to perform steps comprising:

executing a single wide translate instruction containing instruction fields specifying the wide operand register to cause retrieval of the wide operand for storage in the wide operand storage, the wide operand comprising a table of values; the fields of the wide translate instruction further specifying a source register x bytes wide containing data elements, and a results register;

the wide translate instruction causing the processor to select data elements within the source register, wherein the data elements specify rows in the table, and positions of those data elements within the source register specify columns in the table; and the wide translate instruction causing the values at the intersections of the specified row and the specified column for every data element in the source register to be copied at the same time in parallel into the results register at the same position as the data element in the source register.

* * * * *